US009849723B2

(12) United States Patent
LaFever

(10) Patent No.: US 9,849,723 B2
(45) Date of Patent: Dec. 26, 2017

(54) ADJUSTABLE HEIGHT PLATFORM

(71) Applicant: Rene LaFever, Bainbridge Island, WA (US)

(72) Inventor: Rene LaFever, Bainbridge Island, WA (US)

( * ) Notice: Subject to any disclaimer, the term of this patent is extended or adjusted under 35 U.S.C. 154(b) by 743 days.

(21) Appl. No.: 14/298,645

(22) Filed: Jun. 6, 2014

(65) Prior Publication Data

US 2015/0354678 A1 Dec. 10, 2015
US 2016/0138688 A9 May 19, 2016

Related U.S. Application Data

(60) Provisional application No. 61/831,957, filed on Jun. 6, 2013.

(51) Int. Cl.
*B60B 33/06* (2006.01)

(52) U.S. Cl.
CPC ....... *B60B 33/066* (2013.01); *Y10T 74/18888* (2015.01)

(58) Field of Classification Search
CPC ....... B60B 33/04; B60B 33/06; B60B 33/066; Y10T 74/18888; Y10T 16/1943; Y10T 16/193; A45C 2005/147
See application file for complete search history.

(56) References Cited

U.S. PATENT DOCUMENTS

| | | | | |
|---|---|---|---|---|
| 1,058,837 A * | 4/1913 | Zikmund | B60B 33/06 | 16/34 |
| 2,490,953 A * | 12/1949 | Eriksen | A47C 7/006 | 16/33 |
| 2,663,048 A * | 12/1953 | Ross, Jr. | B60B 33/06 | 16/34 |
| 2,779,049 A * | 1/1957 | Hoddevik | B60B 33/06 | 16/34 |
| 5,253,389 A * | 10/1993 | Colin | B60B 33/06 | 16/30 |
| 5,347,682 A * | 9/1994 | Edgerton, Jr. | A61G 7/012 | 16/32 |
| 5,375,294 A * | 12/1994 | Garrett | B60B 33/06 | 16/34 |
| 5,628,522 A * | 5/1997 | Hall | B60B 33/06 | 280/43.14 |
| 6,507,975 B2 * | 1/2003 | Maupin | B60B 33/0005 | 16/19 |
| 8,109,525 B2 * | 2/2012 | Salus | A61G 7/08 | 180/209 |
| 8,662,217 B2 * | 3/2014 | Block | A61G 7/08 | 180/15 |

(Continued)

FOREIGN PATENT DOCUMENTS

DE 10126962 A1 * 10/2002 ......... B60B 33/0007

*Primary Examiner* — Adam D Rogers
(74) *Attorney, Agent, or Firm* — Martin Spencer Garthwaite

(57) ABSTRACT

Disclosed is a cyclic mechanism for engaging or disengaging a switch with the stage of the cycle being determined by a height to which a first object is lifted relative to a second object. The mechanism has few moving parts, is inexpensive to manufacture, is reliable, can be incorporated into a wide range of devices or structures, and operates as an incident to raising or lowering a first object relative to a second.

28 Claims, 261 Drawing Sheets

(56) References Cited

U.S. PATENT DOCUMENTS

| | | | | |
|---|---|---|---|---|
| 8,914,943 | B2 * | 12/2014 | Grassia | B60B 5/02 16/19 |
| 9,586,442 | B2 * | 3/2017 | Trickle | B60B 33/06 |
| 2005/0217071 | A1 * | 10/2005 | Shinner | B60B 33/0028 16/19 |

* cited by examiner

100

100

100

200

400

400

ADJUSTABLE HEIGHT PLATFORM

CROSS-REFERENCE TO RELATED APPLICATIONS

This application claims the benefit of U.S. provisional patent application, Ser. No. 61/831,957, filed Jun. 6, 2013, which application is incorporated herein for all purposes.

BACKGROUND

Many objects periodically need to be relocated in horizontal position ("position") and/or vertical position ("elevation"), relative to a gravitational field. Table saws need to be repositioned within workshops; shipping containers need to have elevation and position changed; a flower container may need to be relocated on a deck. Some objects never experience a change in elevation or position; some experience one or more generally unrelated changes in elevation and/or position; some experience a cyclic change in elevation and/or position (for example, the objects are cyclically lifted up and down); while some experience change more often in one direction than another.

Many technologies have been developed over the years to change the position or elevation of objects. Cars and trucks have wheels; fork lifts and cranes can change the elevation of shipping containers; furniture has casters, including retractable casters. These technologies appear to be specific to the application. For example, in the context of retractable casters, U.S. Pat. Nos. 2,490,953 and 2,779,049 illustrate technologies which require that the object supported by the caster be tilted in a specific direction to engage the caster and then a different direction to disengage the caster; other existing examples, such as the example illustrated in U.S. Pat. No. 2,663,048, require additional parts, such as load-bearing cams or, as in U.S. Pat. No. 6,507,975, require manipulation of an external articulator to engage or disengage the caster.

Existing technologies, however, often require specific equipment or infrastructure, and/or require that the position and/or elevation changing equipment be manipulated in particular way, and/or require relatively expensive components which must be precisely engineered for the application context and/or which must be maintained over time.

In addition, existing technologies do not approach the problem from the perspective of a kinematic finite state machine, which can be in a finite number of different states, with transitions between the states caused by triggering events, in which the states define the memory condition of the state machine, the events define how the memory conditions may be processed, where the states are equivalent to logical statements, where there may be an order of the logical statements, and where the state machine may be reprogrammed.

SUMMARY

A first object and a second object each comprise a surface, each of which defines a coordinate function. The coordinate functions of the first and second objects together form a composite surface defining a composite coordinate function. The composite surface contacts a switch; the switch only moves relative to the first and second objects in response to gravity and acceleration. The first and second objects have an allowed range of motion relative to one another. When the first and second objects move relative to one another within the allowed range of motion, the composite coordinate function transmits a force at a force vector to the switch, which force and force vector may change the position or orientation of the switch in the finite state machine. When certain of such movements pass one or more points of no return, events occur which change the state of the machine. The then-current state and the event determine the state of the finite state machine in the following state. In the states, the switch either i) experiences no more force than the force produced by its own weight on the surface(s) of the object(s) or ii) it contacts both objects and transports a force at a force vector across the two objects, which force is greater than the force produced by the weight of the switch. As used herein, "weight" is defined as mass multiplied by acceleration, whether the acceleration comes from a gravitation field or acceleration due to movement.

The first object is active; it may be repositioned by an external force. The second object and the switch are passive, reacting to forces provided by the first object. Except for one state, the first and second objects are in a passive kinematic relationship, in which the number of degrees of freedom of motion between the two objects does not change. However, in at least one state, referred to herein as the "engaged" state, the number of degrees of freedom of motion between the two objects is limited by the switch and the switch has zero degrees of freedom of motion. In the non-engaged state(s), the switch does not limit the number degrees of freedom between the first two objects and the switch's number of degrees of freedom of motion is greater than zero.

For example, in a first state the switch may not be interposed between the objects and the first object may be free to translate vertically and come to rest on, for example, the ground; in another state, the switch may be interposed between the objects such that a reactive force is transmitted through the switch from the second object to the first object, such that the second object supports the first object via the switch, subjecting the switch to a force greater than the force produced by the weight of the switch and limiting the degrees of freedom of both the first object and the switch.

BRIEF DESCRIPTION OF THE DRAWINGS

Certain of the drawings illustrate motion through a flip-book effect. To experience this effect in a PDF, the viewer may set the display resolution to show one complete page per display-page and then hit "page down" or equivalent.

FIG. 167 illustrates a side elevation view of exploded components of the Third Embodiment, FIG. 168 illustrates a top three-quarter wire frame view of the exploded components of the Third Embodiment, FIG. 169 illustrates a section perspective view of the Third Embodiment with the components assembled and in State One of the state machine, and FIGS. 170 to 177 illustrate elevation views of the Third Embodiment, assembled, and show the states and events of this embodiment of the finite state machine as the first body moves.

DETAILED DESCRIPTION

Figure 1A:
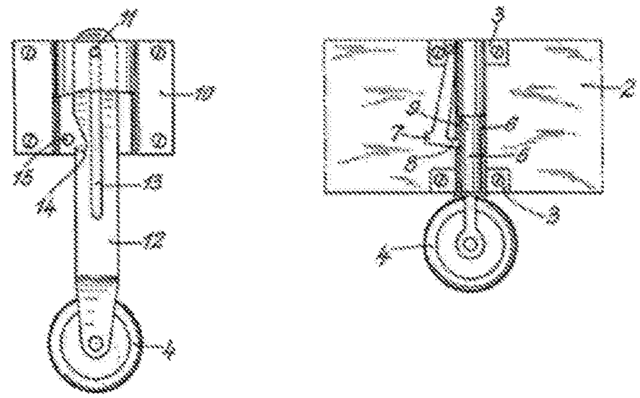
FIG. 1A to 1C illustrate prior art.
Figure 1B:
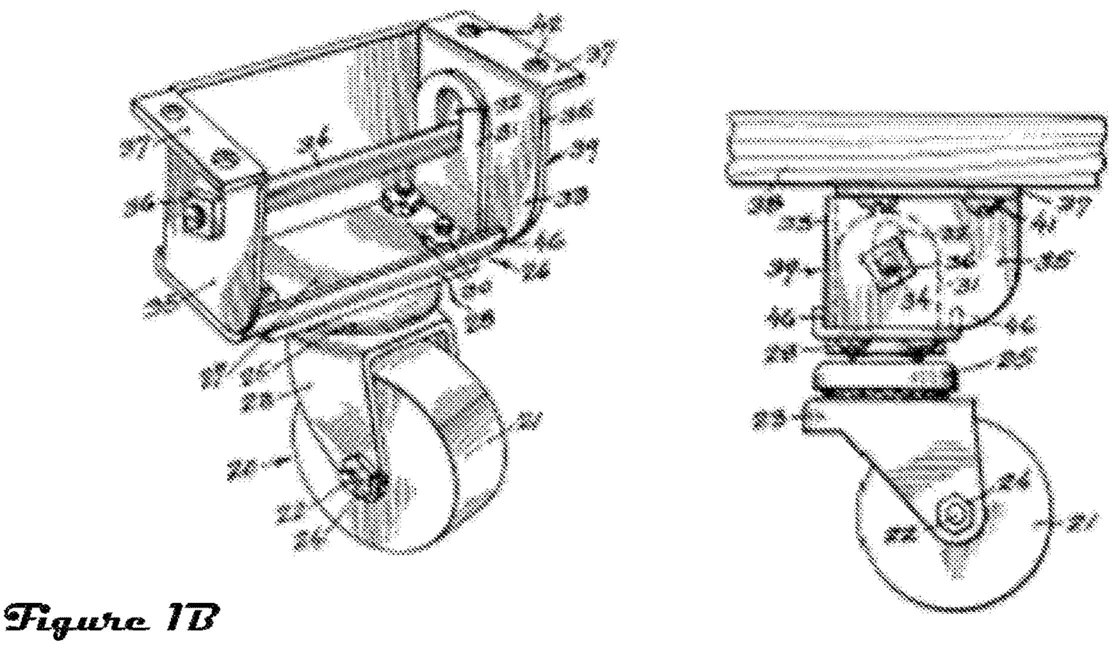
Figure 1C:
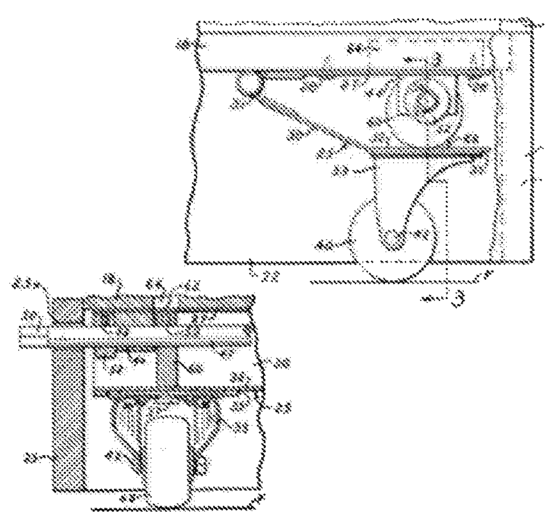

As used herein, a kinematic finite state machine comprises at least two bodies and a switch. For the sake of convenience, the first body may be referred to herein as "a Housing" while the second body may be referred to herein as "a Platform". Each body may be one continuous structure or may comprise multiple bodies or plates permanently or at least semi-permanently joined together to form one continuous structure. As used herein, permanently or semi-permanently joined bodies, or "joined bodies" or "joined plates", are bodies requiring tools (including hand tools) or removal of a pin or the like to disassemble the joined parts. As discussed herein, the Housing may be part of or may be attached to a "solid body", such as a table, chair, shipping container, refrigerator, or the like.

As used herein, the Housing is supported against gravity (and/or against another acceleration force) by i) an external surface, ii) the switch which transfers the weight of or other forces from the Housing to the Platform and then by the Platform to the external surface (potentially via an accessory), or iii) by an external force provided by a human, a fork lift, a crane, or another machine. The Housing may move relative to the Platform and relative to an external surface, upon which the Platform may rest. Motion of the Housing is generally described in terms of one degree of freedom, such as up/down or rotation about an axis, though additional degrees of freedom may also be utilized. The Housing discussed herein is described as an active component, because the position of the Housing is actively changed by the external force.

As discussed herein, an active component acts on a passive component, such as when a Housing is actively translated or rotated by an external force.

As discussed herein, prismatic kinematic pairs may act upon a Switch. As discussed herein, revolute kinematic pairs act upon the Platform in the kinematic chain.

As used herein, the Platform is supported against gravity (and/or against another acceleration force) by an external surface and/or by a joint or revolute kinematic chain with the Housing, when the Housing and Platform are connected by an axle. Between the Platform and the external surface may be an "accessory", such as, for example, a leg, a wheel-axle combination, an adjustable length leg, a scale, a vibration dampener and the like. Many accessories may be used in addition to these examples. The Platform discussed herein is a passive component, because the Platform only moves, if at all, in reaction to movement of the Housing by the external force.

The Housing and/or Platform may comprise a Housing-Platform restraint to limit the range of motion between the Housing and Platform and to prevent the Housing and Platform from traversing beyond the allowed range. The Housing-Platform restraint may allow the Housing and Platform to move in a piston-type relationship, wherein a gap (within allowable tolerances) between the Housing and Platform allow the Housing to raise and lower relative to the Platform. The Housing-Platform restrain may comprise a hinge, which causes the Platform to rotate about the hinge when the Housing is raised. The Housing may be lifted vertically, without a rotational component, or the Housing may be lifted by rotation about a corner.

The Housing and/or Platform together form a composite coordinate function in a variable surface which contacts the Switch and which transmits a force at a force vector determined by the Switch and the Switch geometry. The Housing, Platform, and Switch system may occupy states, which states are changed by events. The Platform may be secured to accessories.

As used herein, the "switch" is a rigid body in contact with the Housing and/or Platform. The switch either i) experiences no more force than the force produced by its own weight on the surface(s) of the object(s) or ii) when the kinematic state machine is in the engaged state, the switch contacts both first and second objects and transports a force at a force vector across the two objects, which force is greater than the force produced by the weight of the switch. In the engaged state, the number of degrees of freedom of motion between the two objects is limited by the switch and the switch has zero degrees of freedom of motion. In the non-engaged state(s), the switch does not limit the number degrees of freedom between the first two objects and the switch's number of degrees of freedom of motion is greater than zero.

Figure 2:
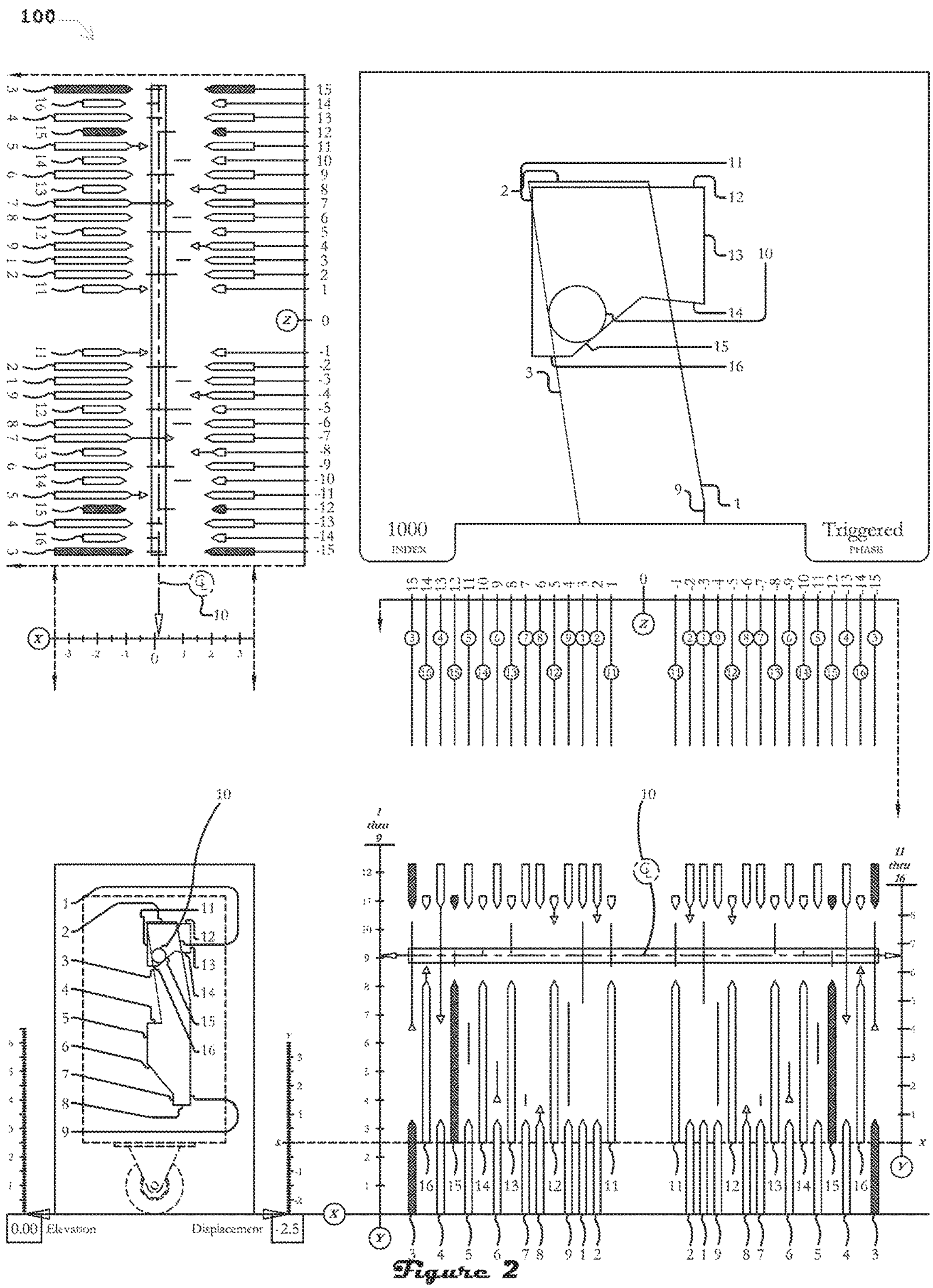
FIGS. 2 to 133 illustrate elevation and top plan views of a First Embodiment of a kinematic finite state machine, in which the first and second bodies are provided be separate sets of joined plates, in which the first and second bodies have a piston-type relationship and the switch has a round vertical cross section, and show the states and events of this embodiment of the finite state machine as the first body moves.
Figure 3:
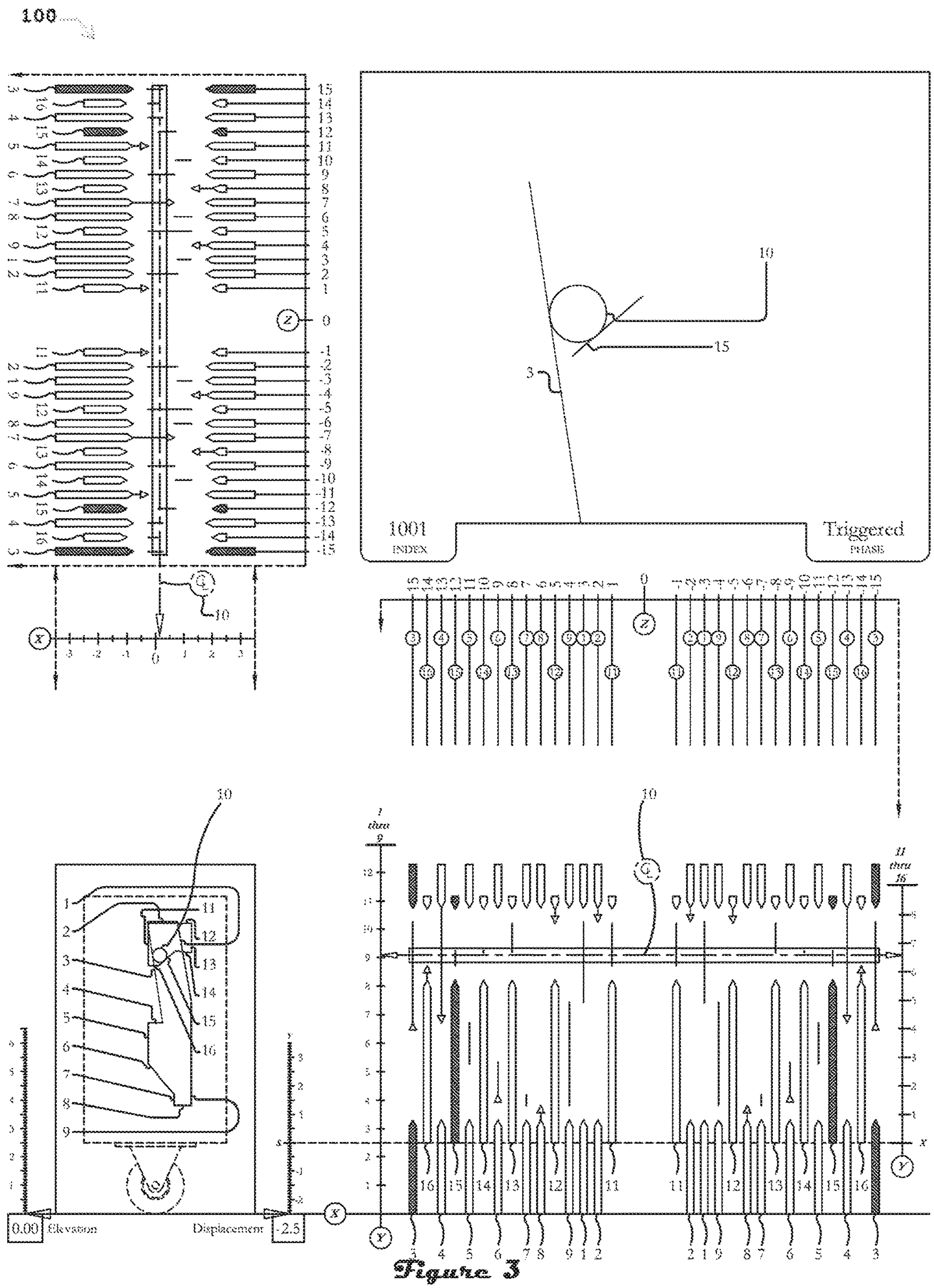
Figure 4:
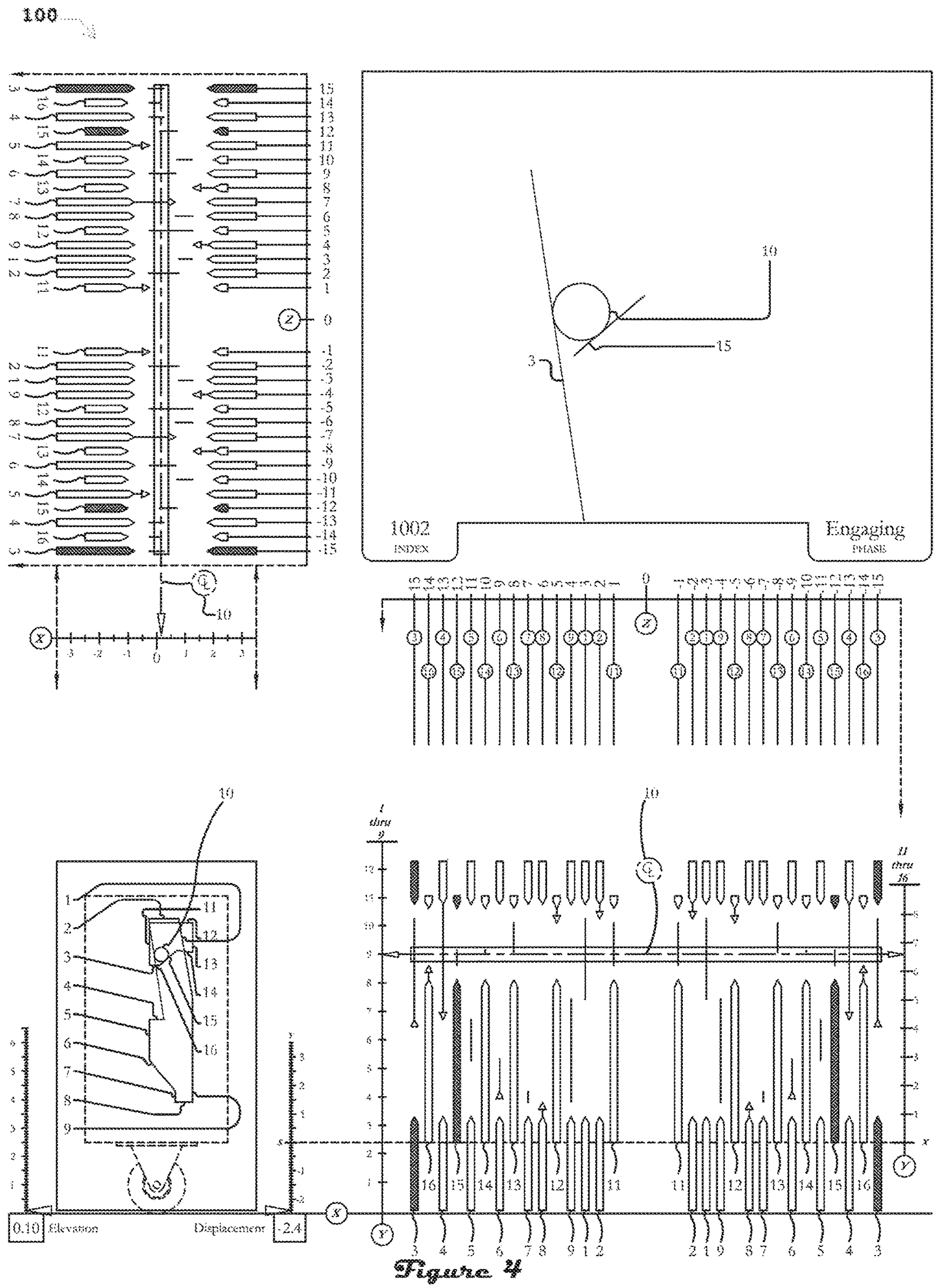
Figure 5:
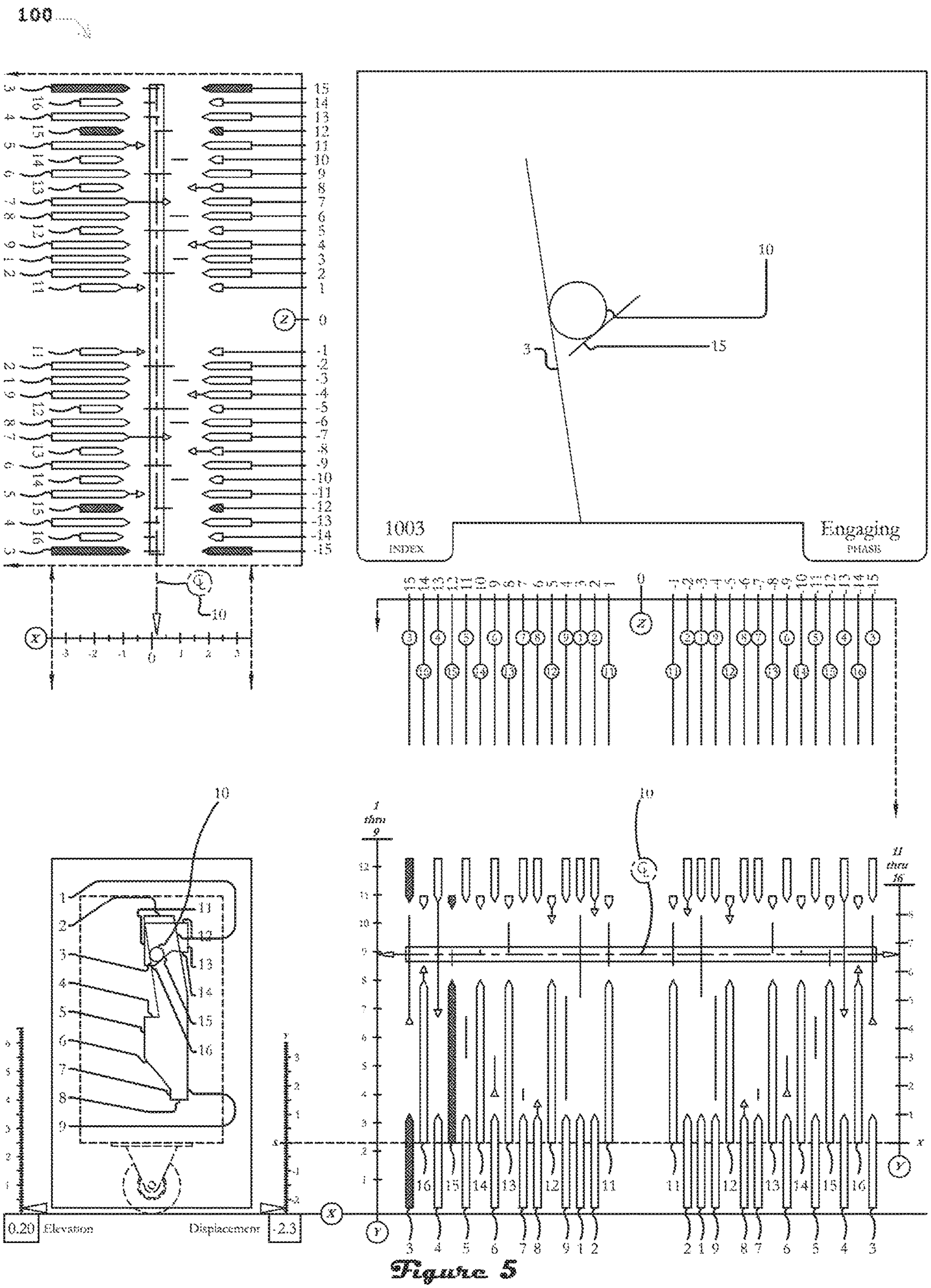
Figure 6:
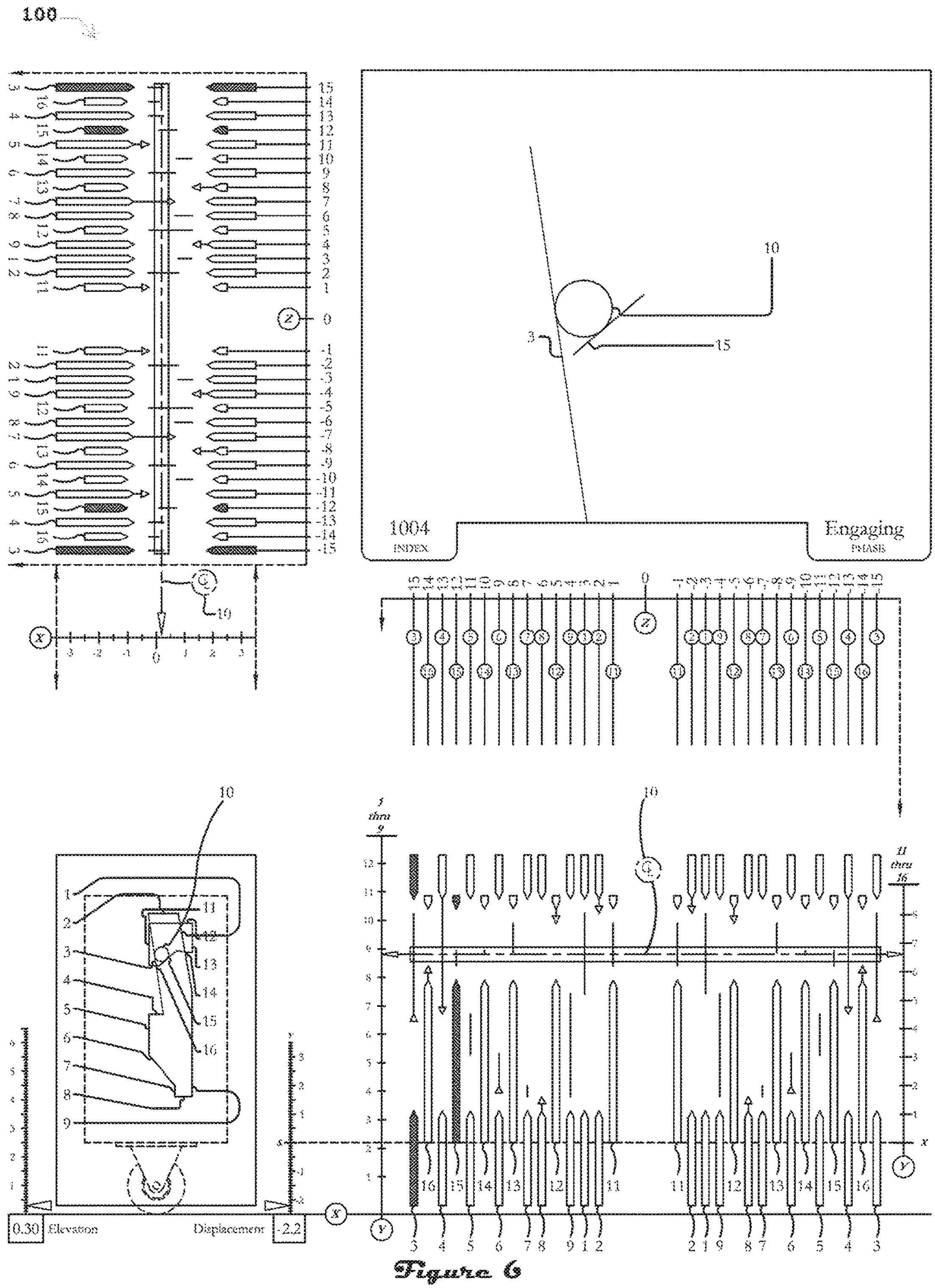
Figure 7:
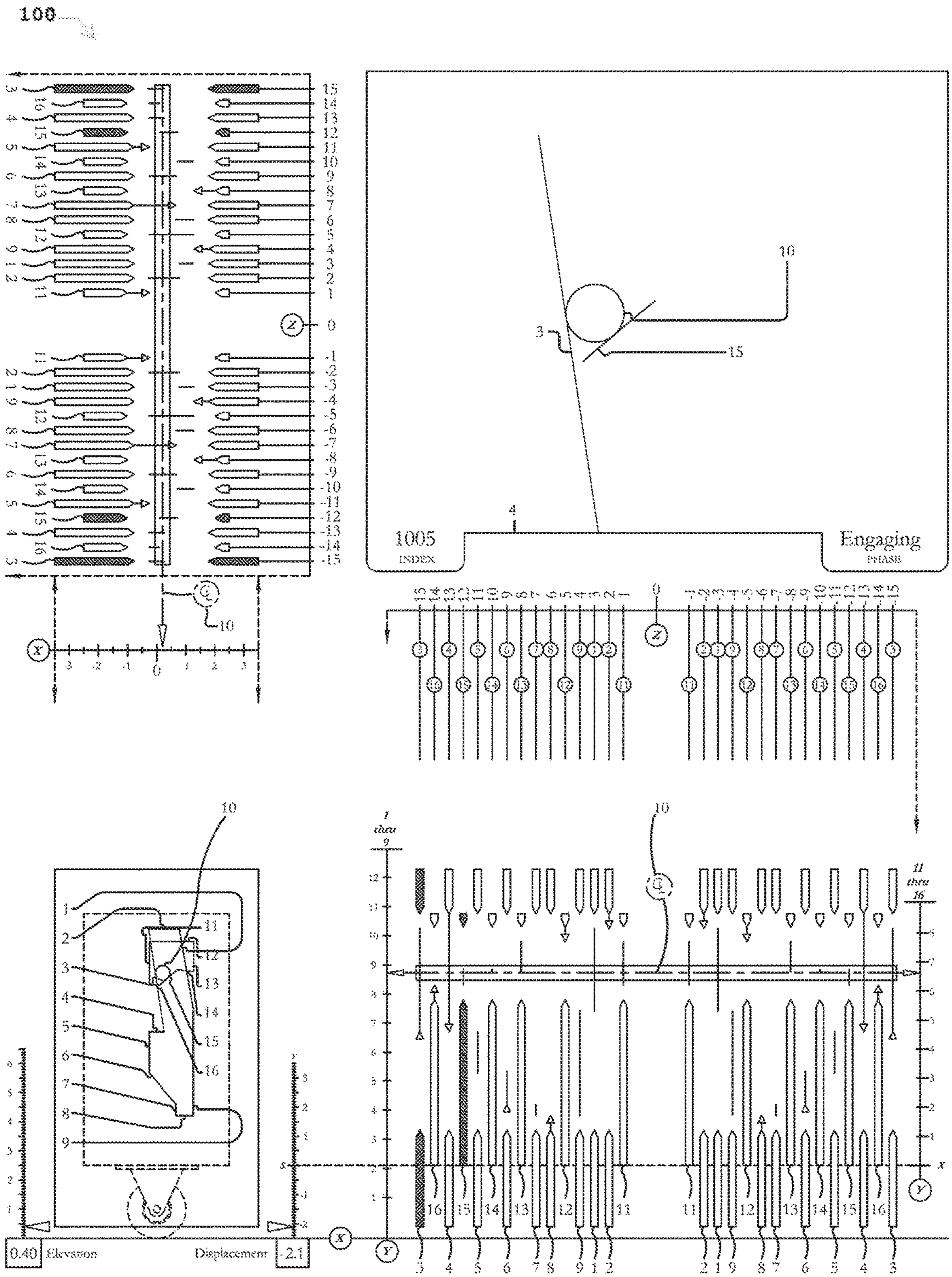
Figure 8:
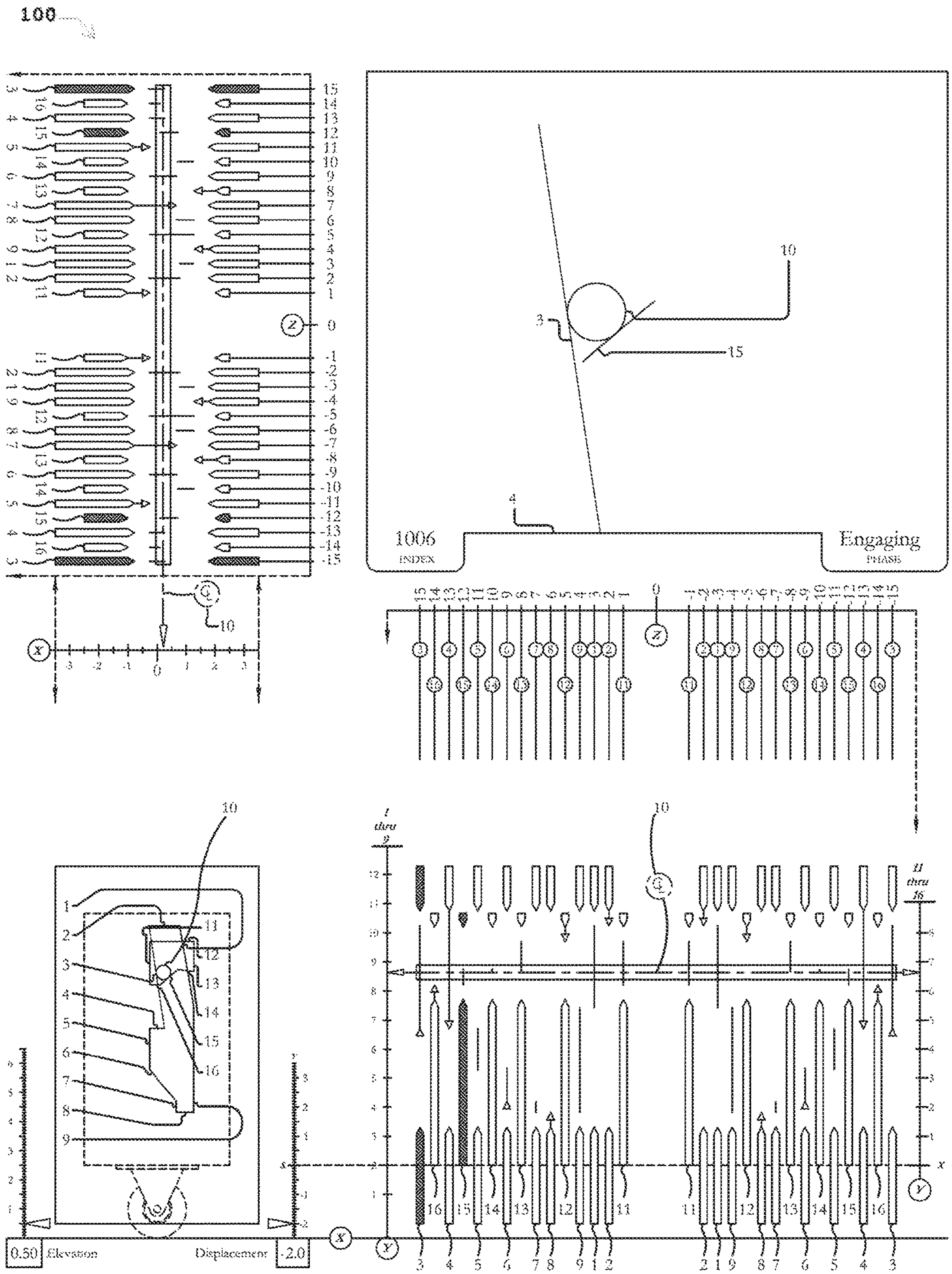
Figure 9:
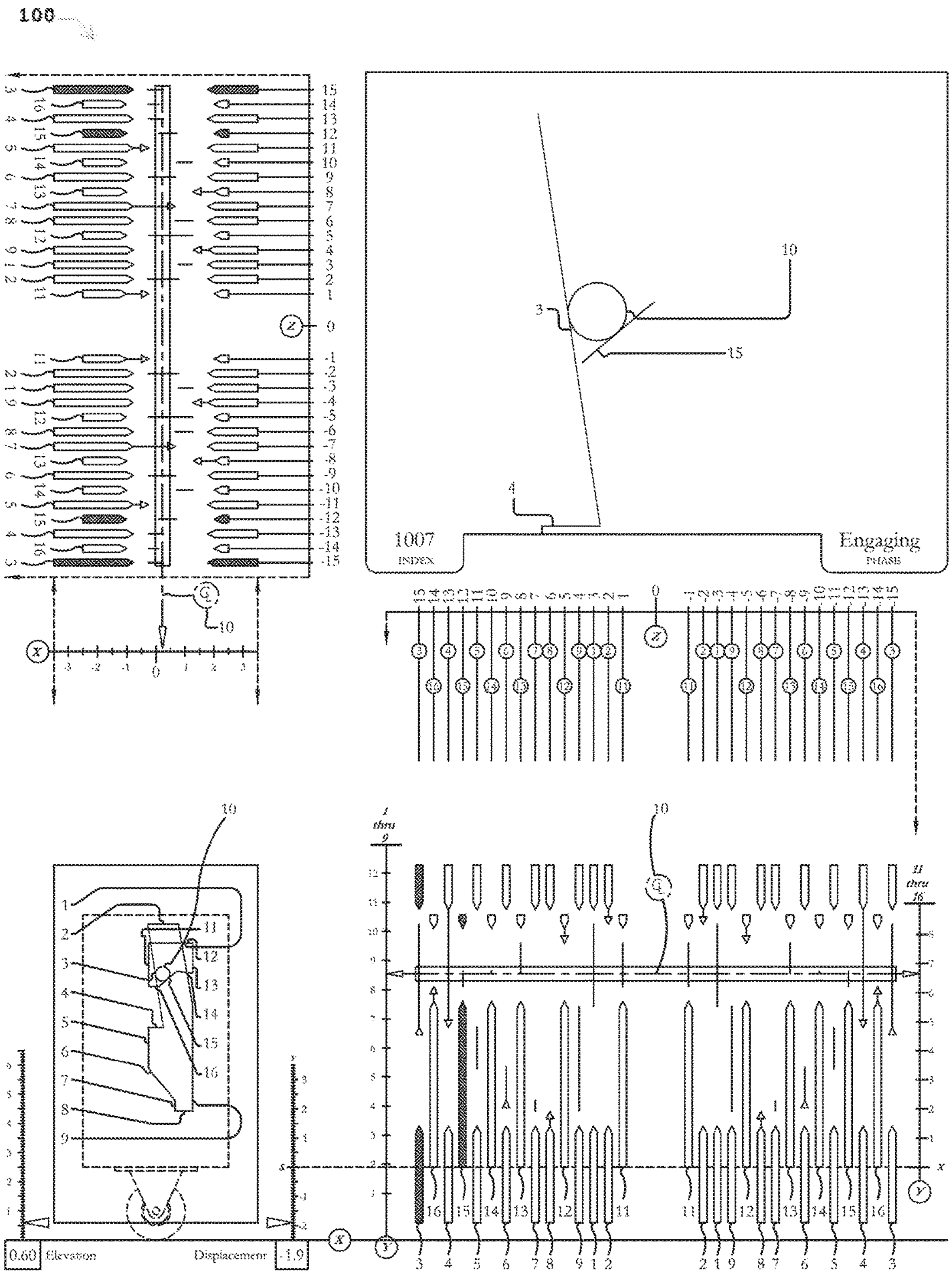
Figure 10:
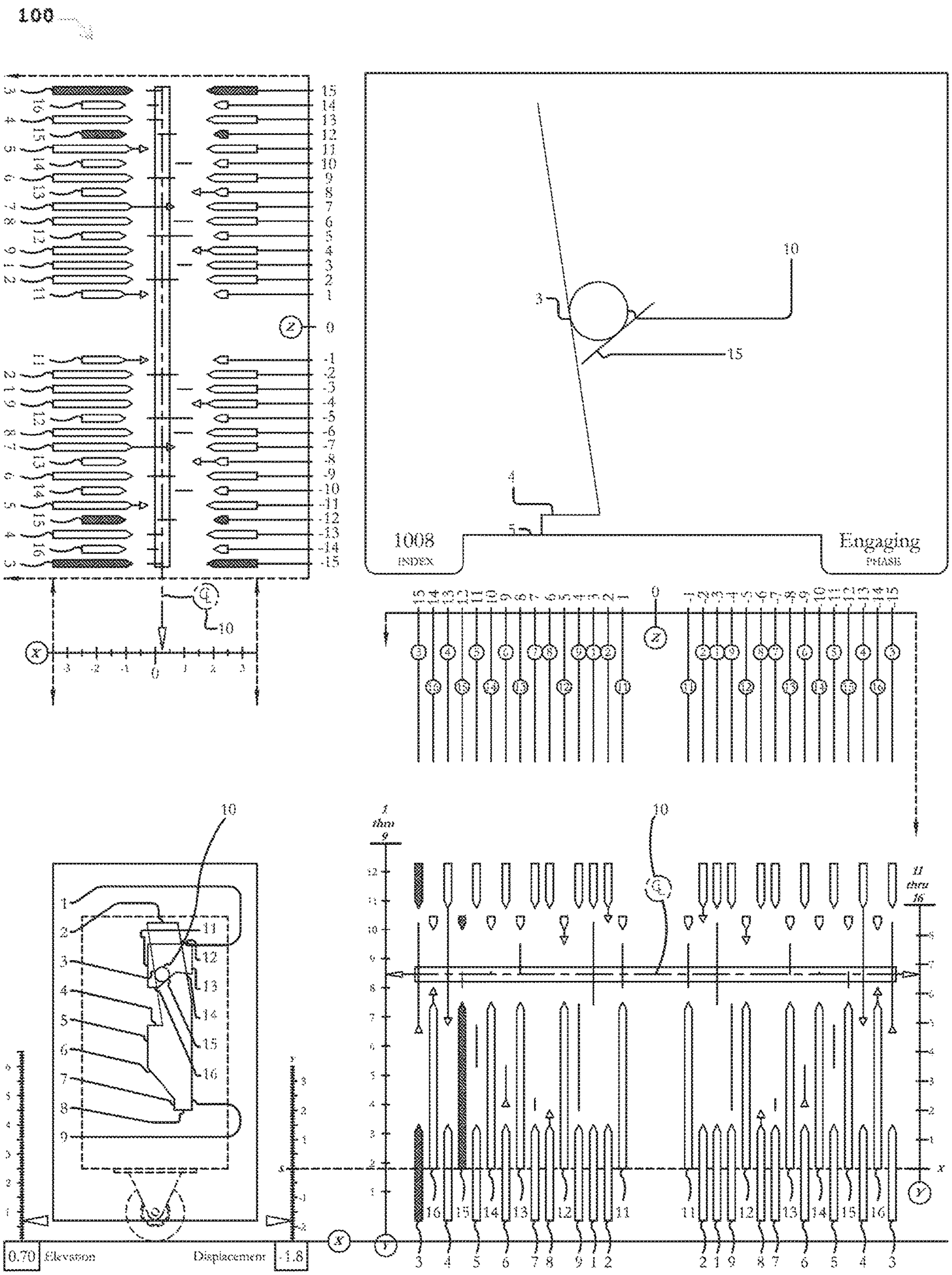
Figure 11:
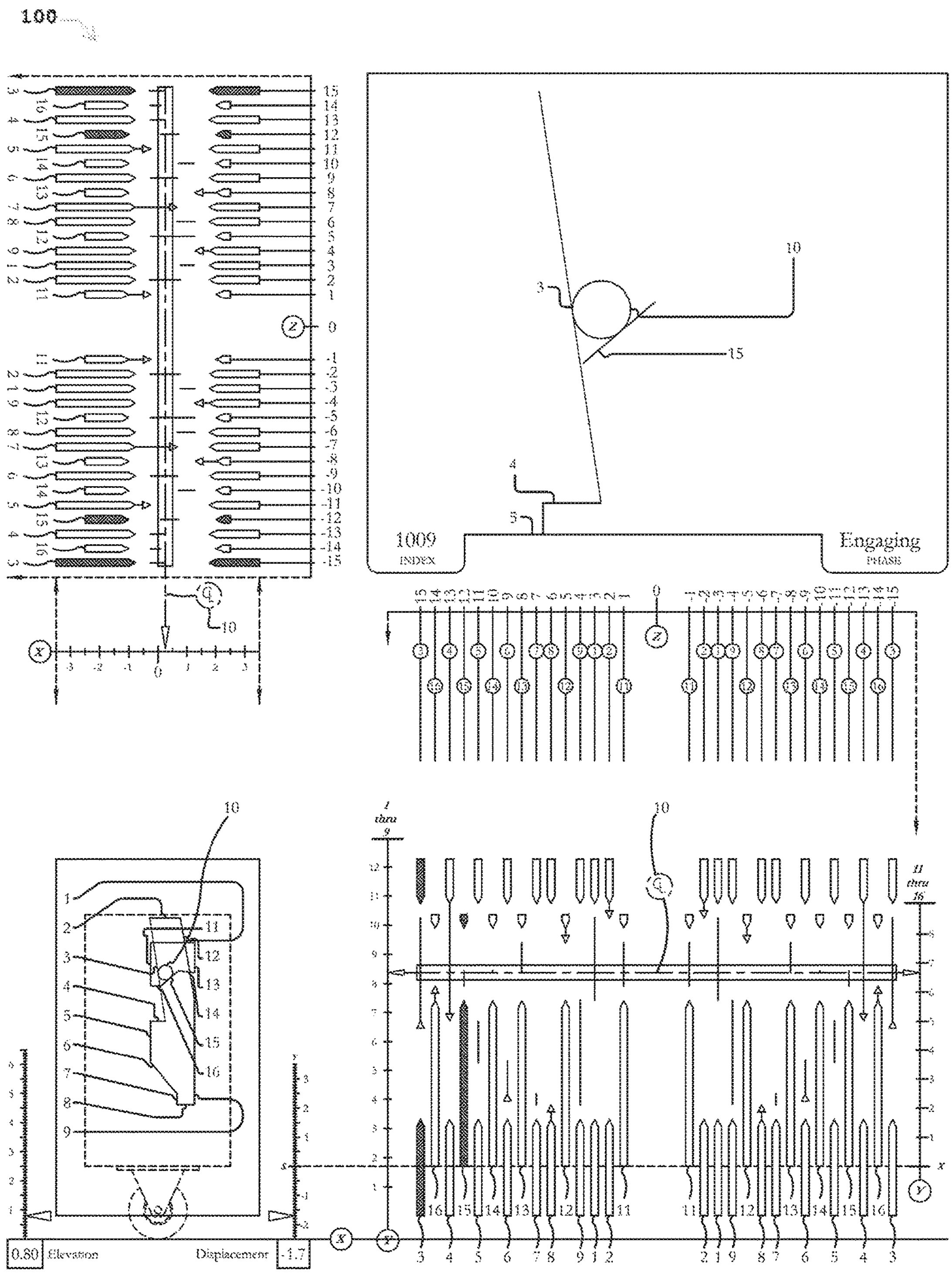
Figure 12:
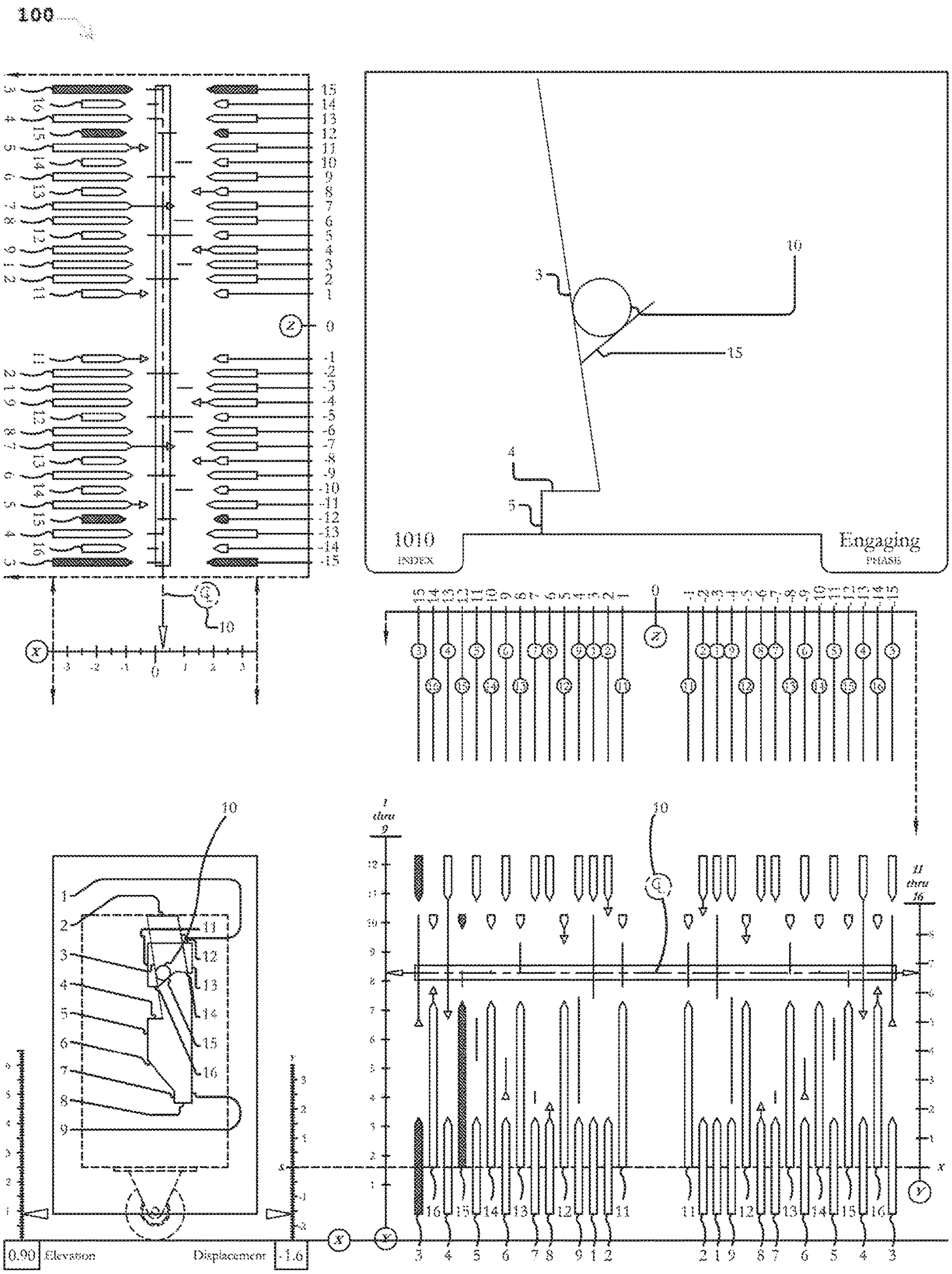
Figure 13:
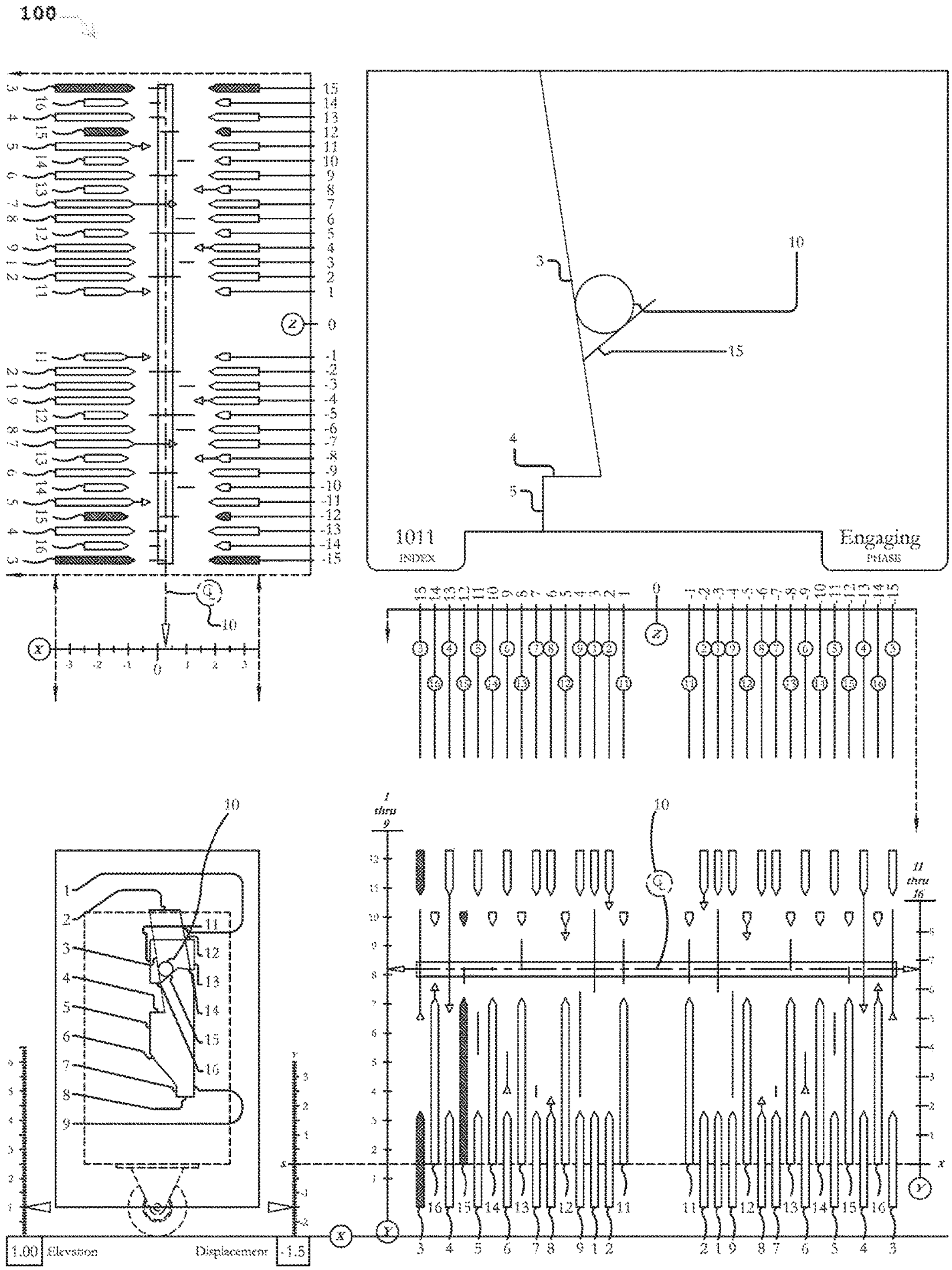
Figure 14:
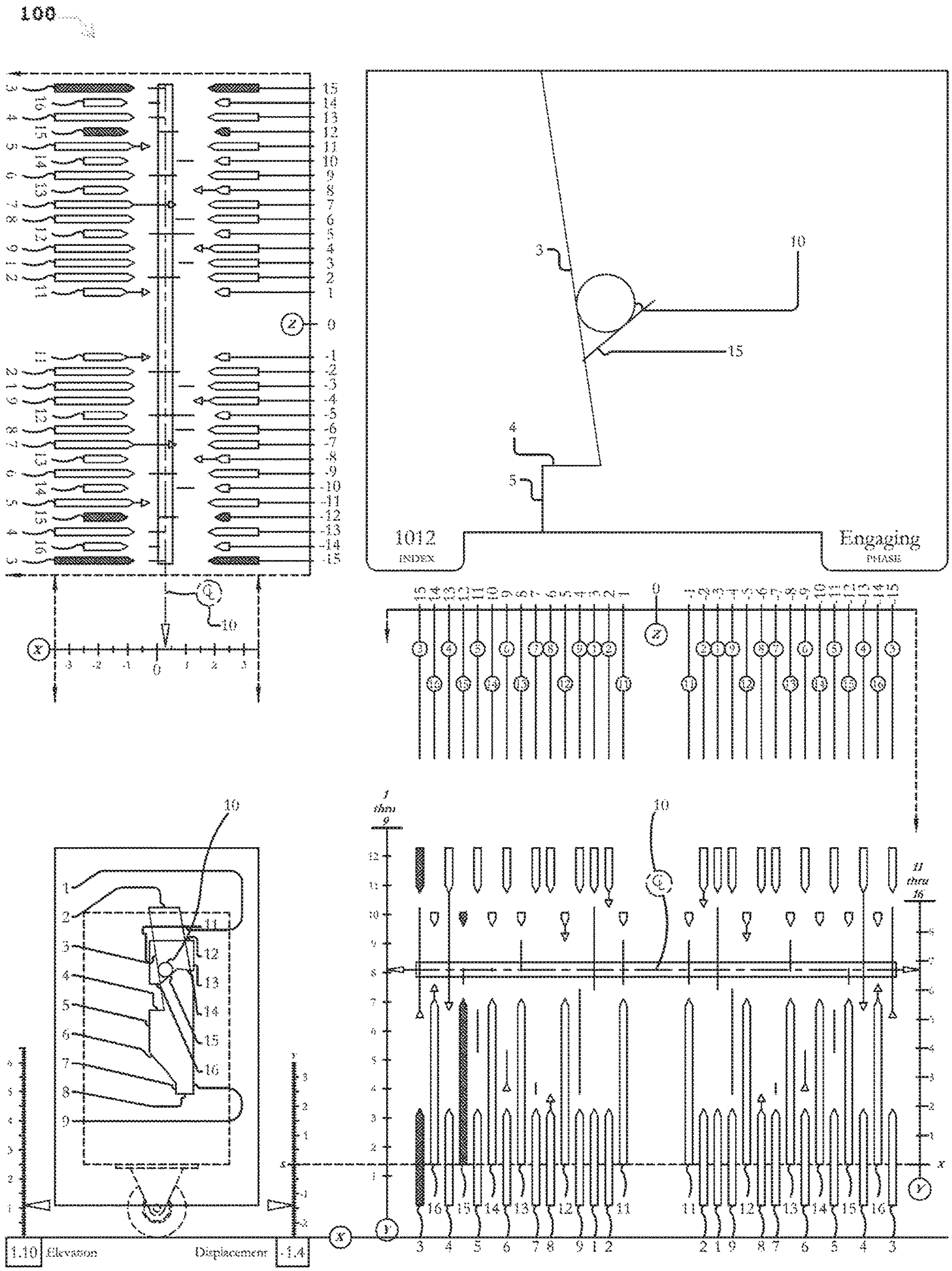
Figure 15:
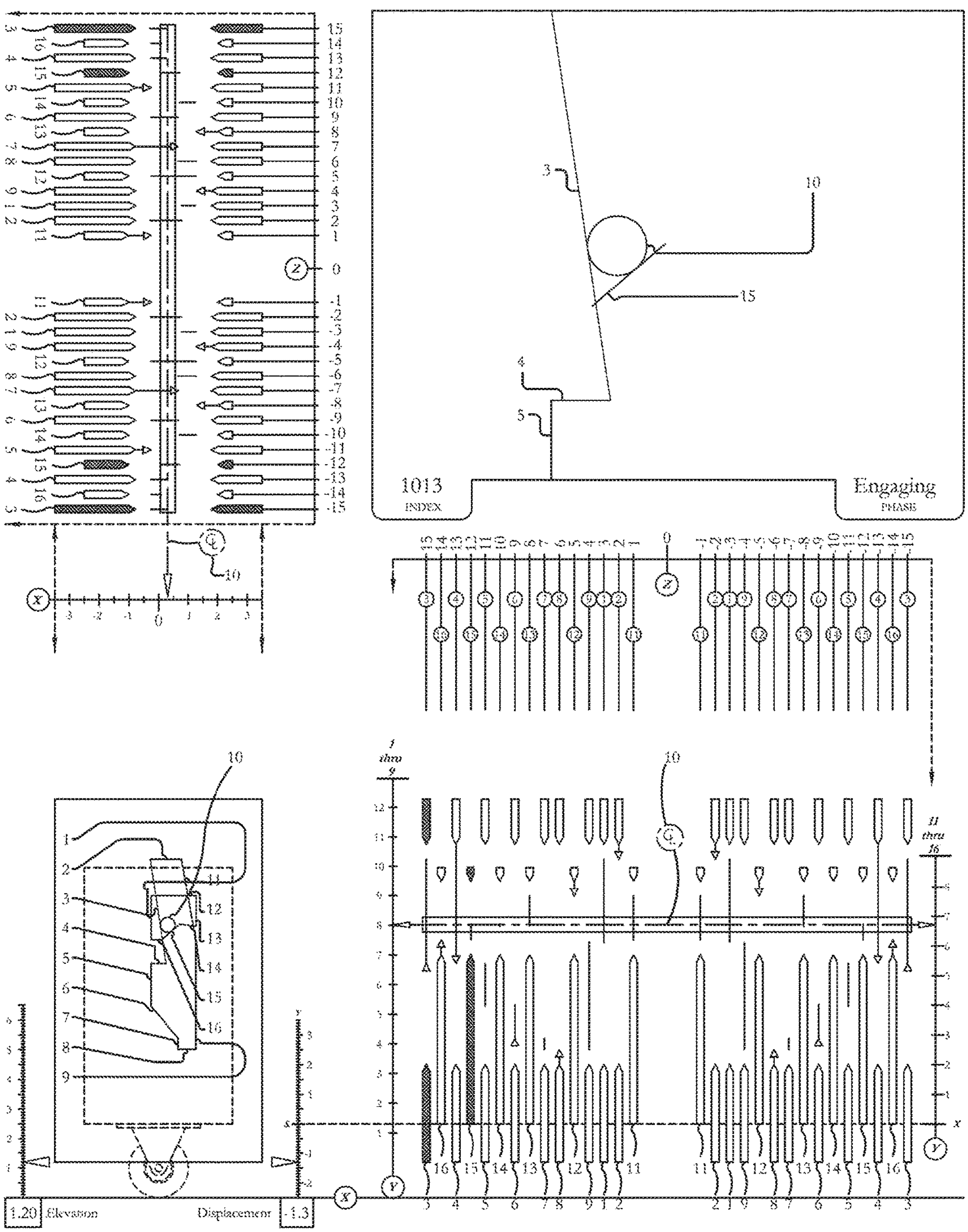
Figure 16:
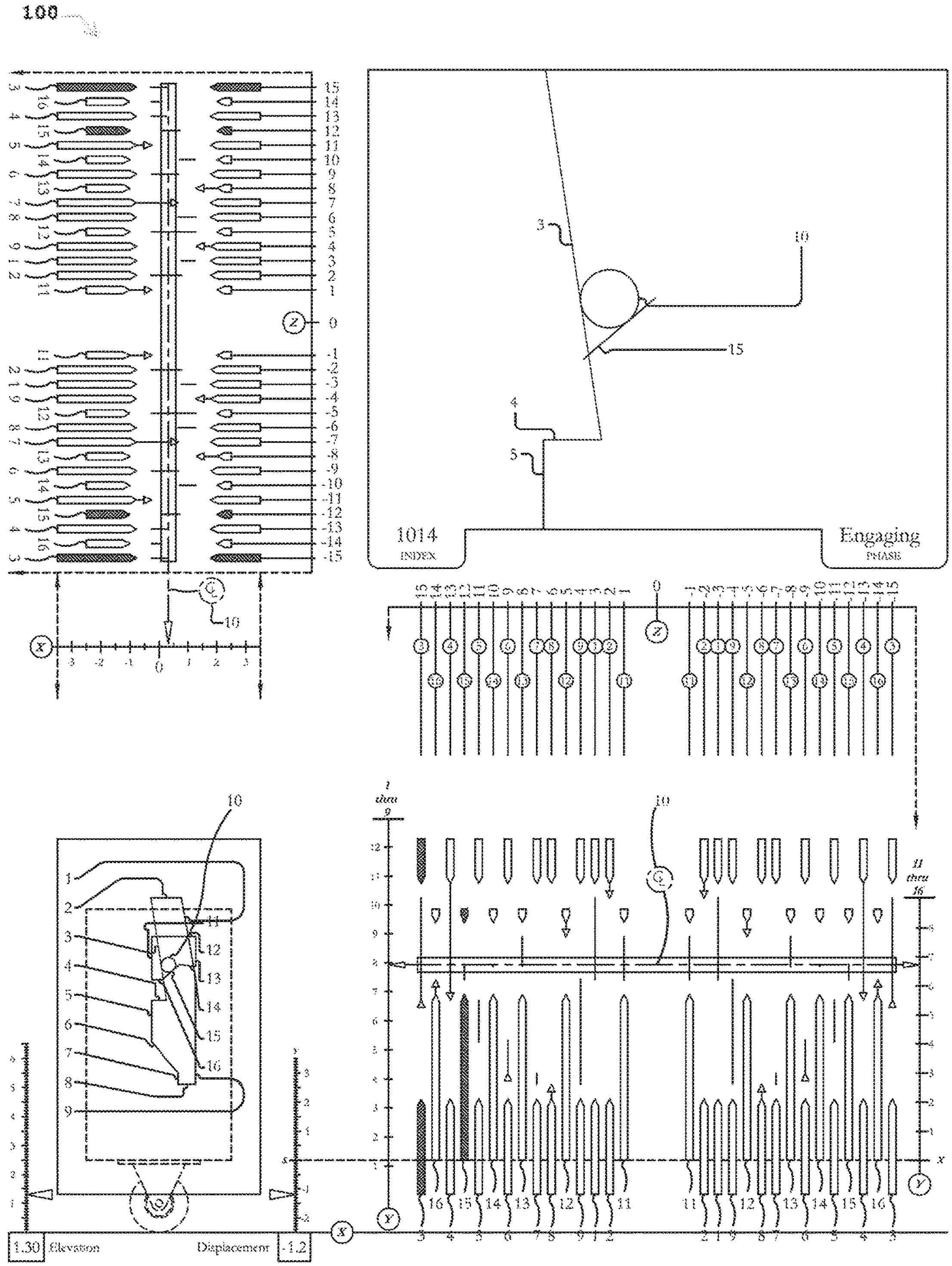
Figure 17:
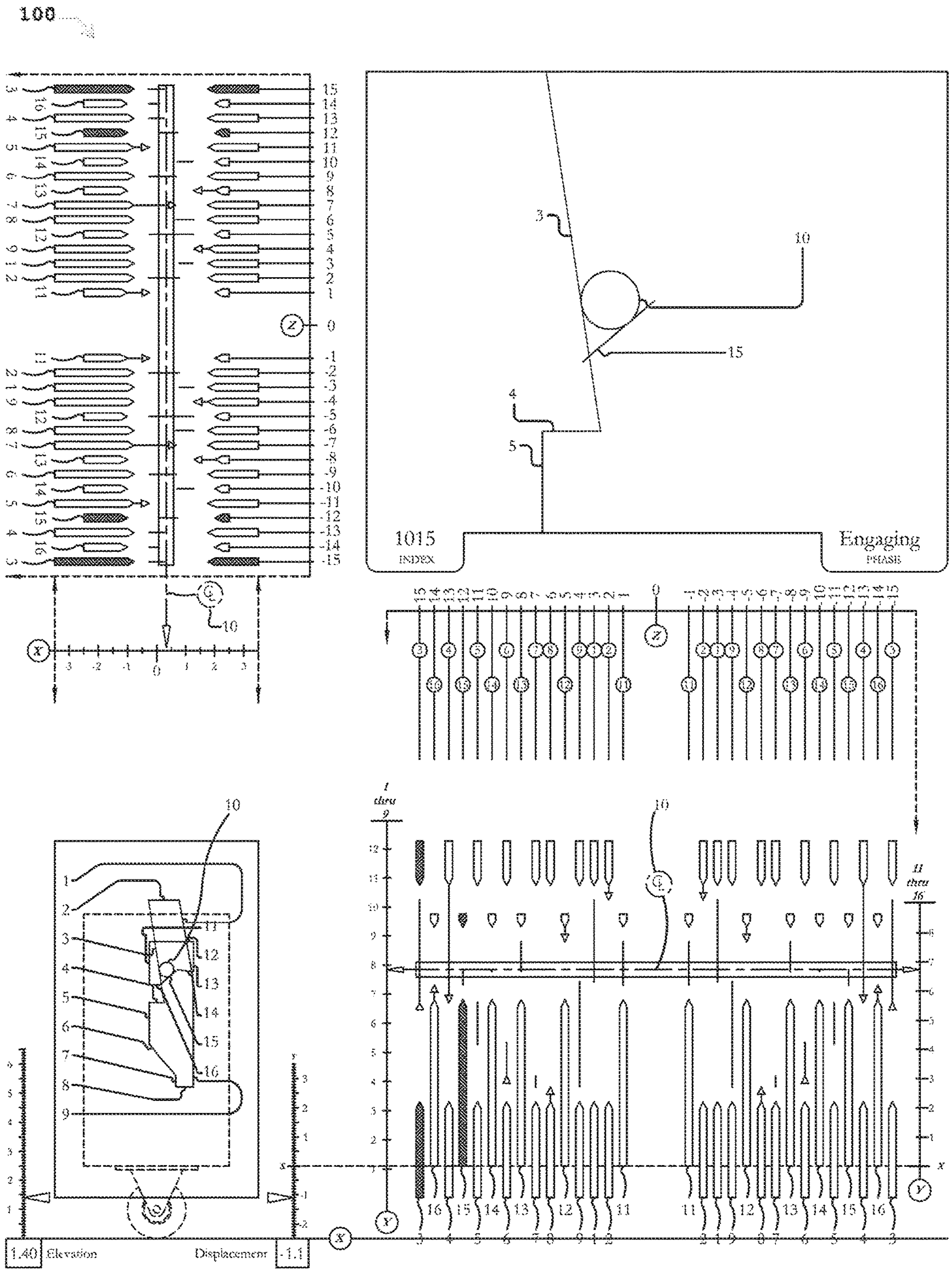
Figure 18:
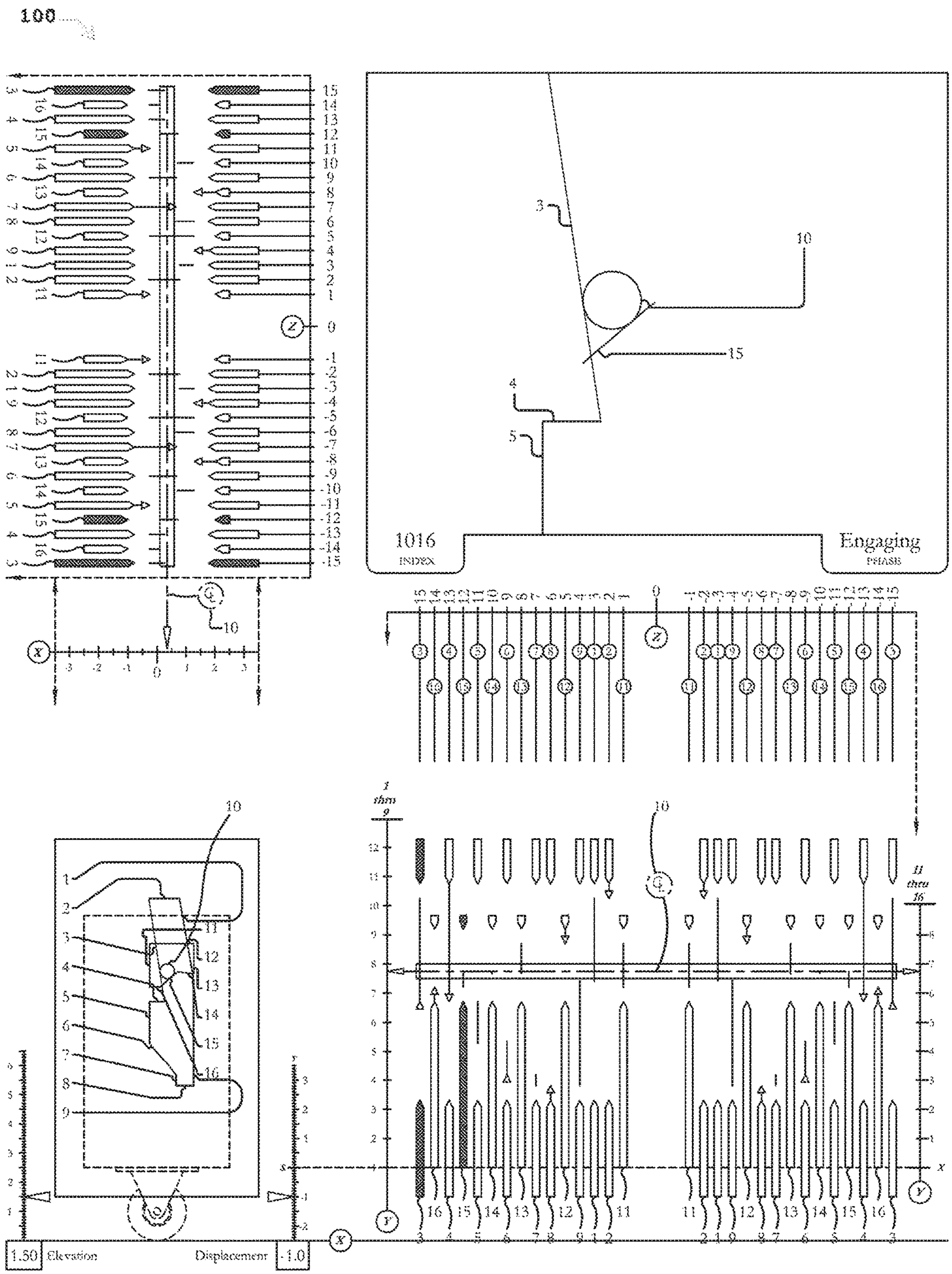
Figure 19:
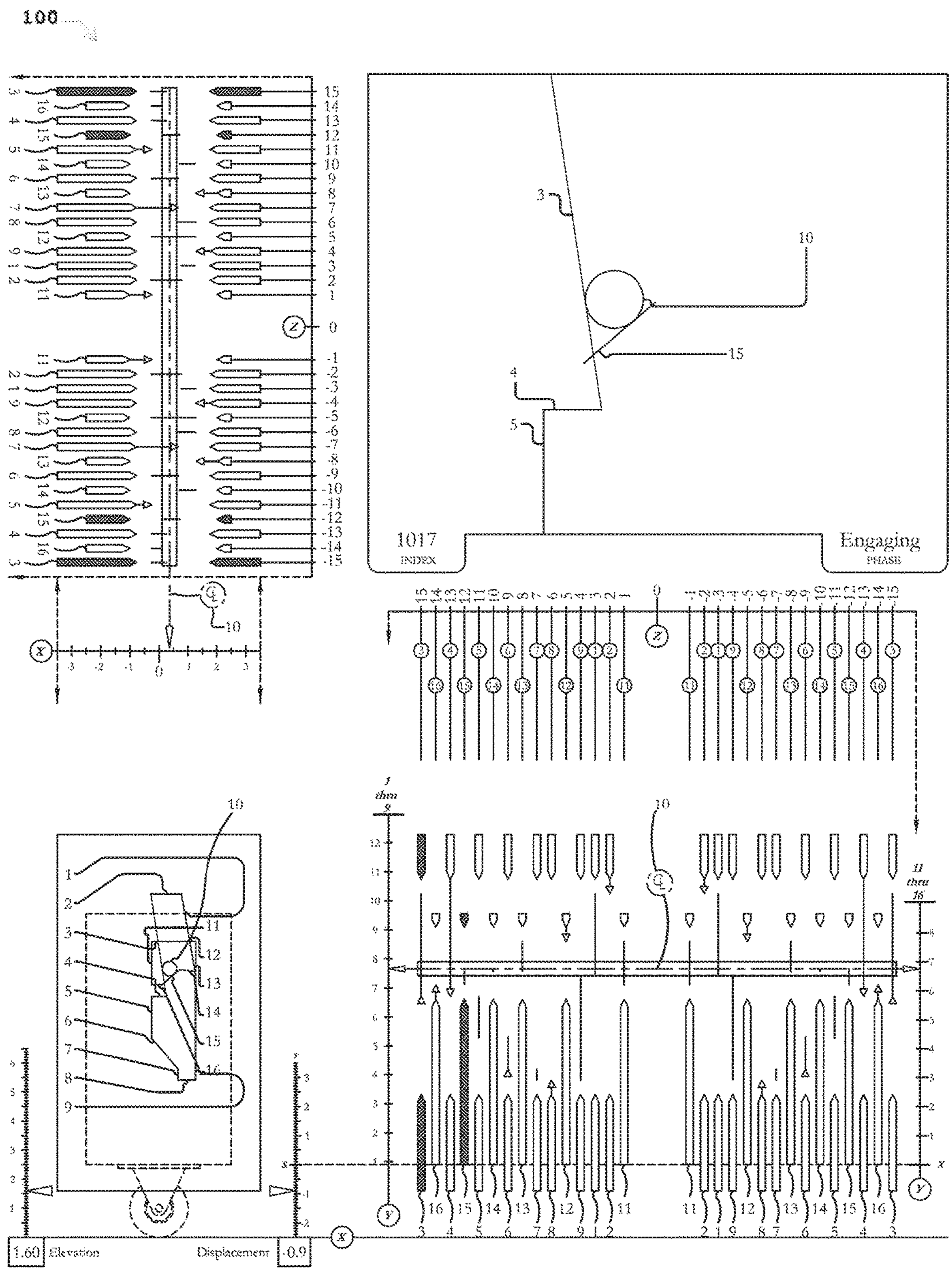
Figure 20:
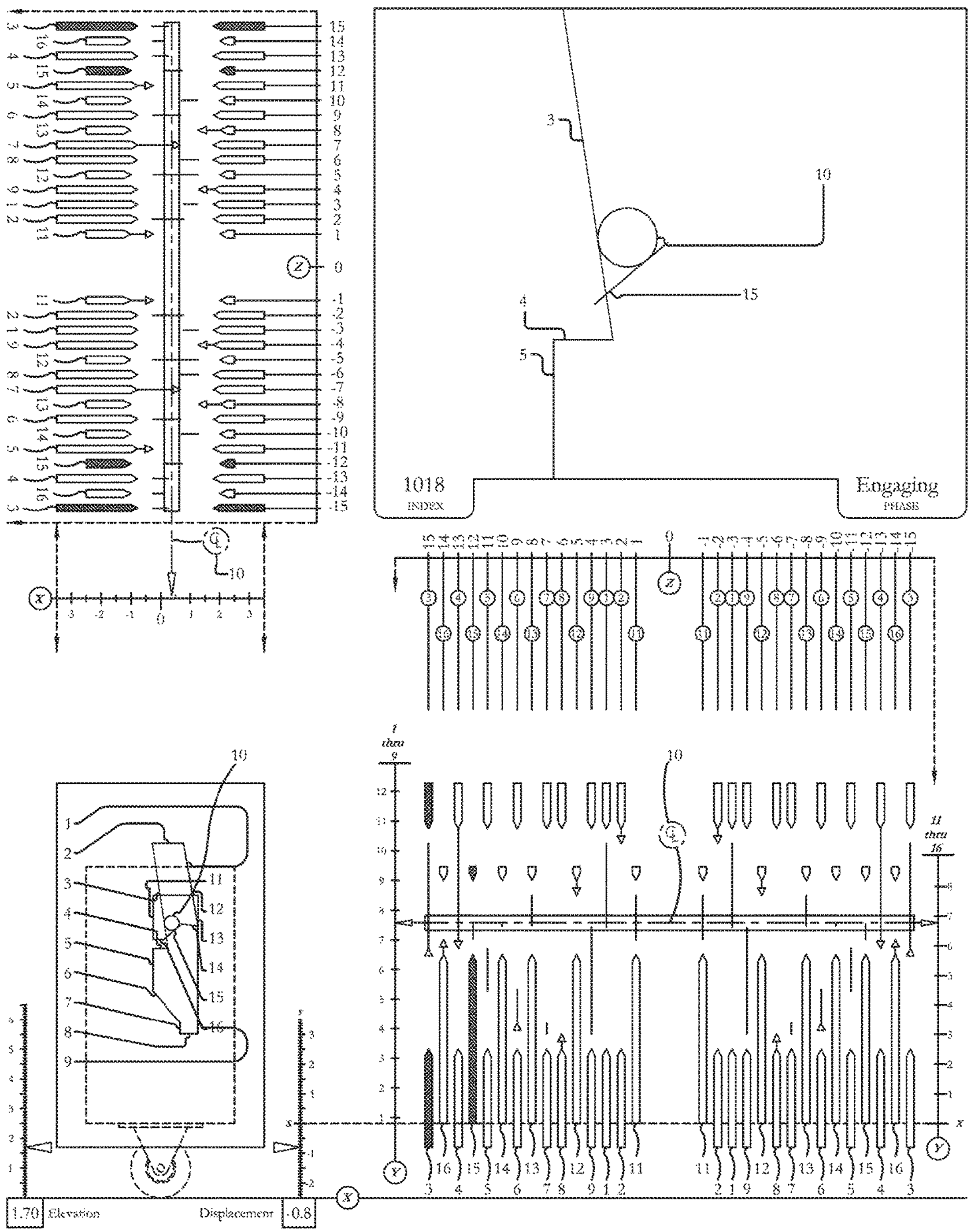
Figure 21:
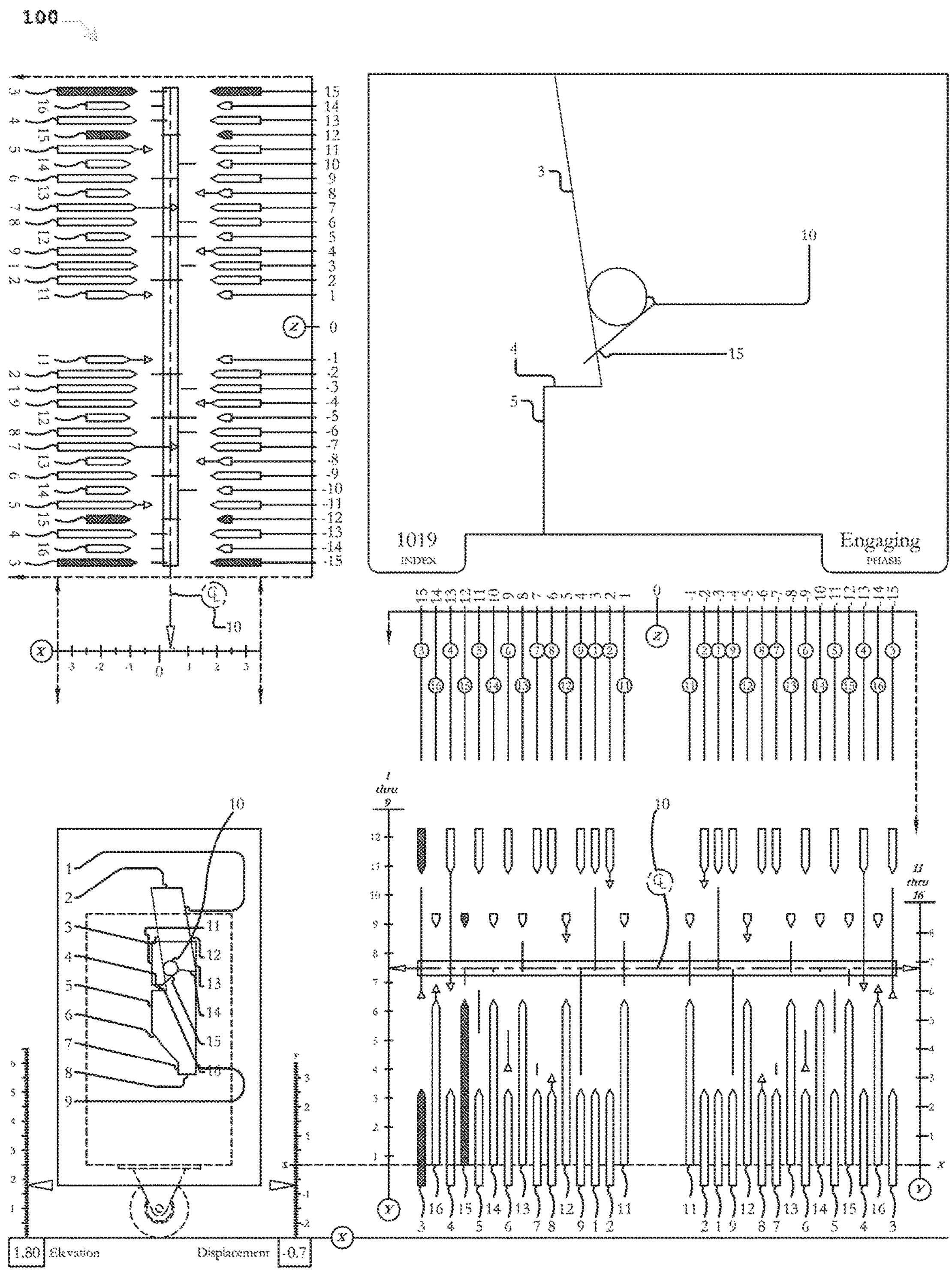
Figure 22:
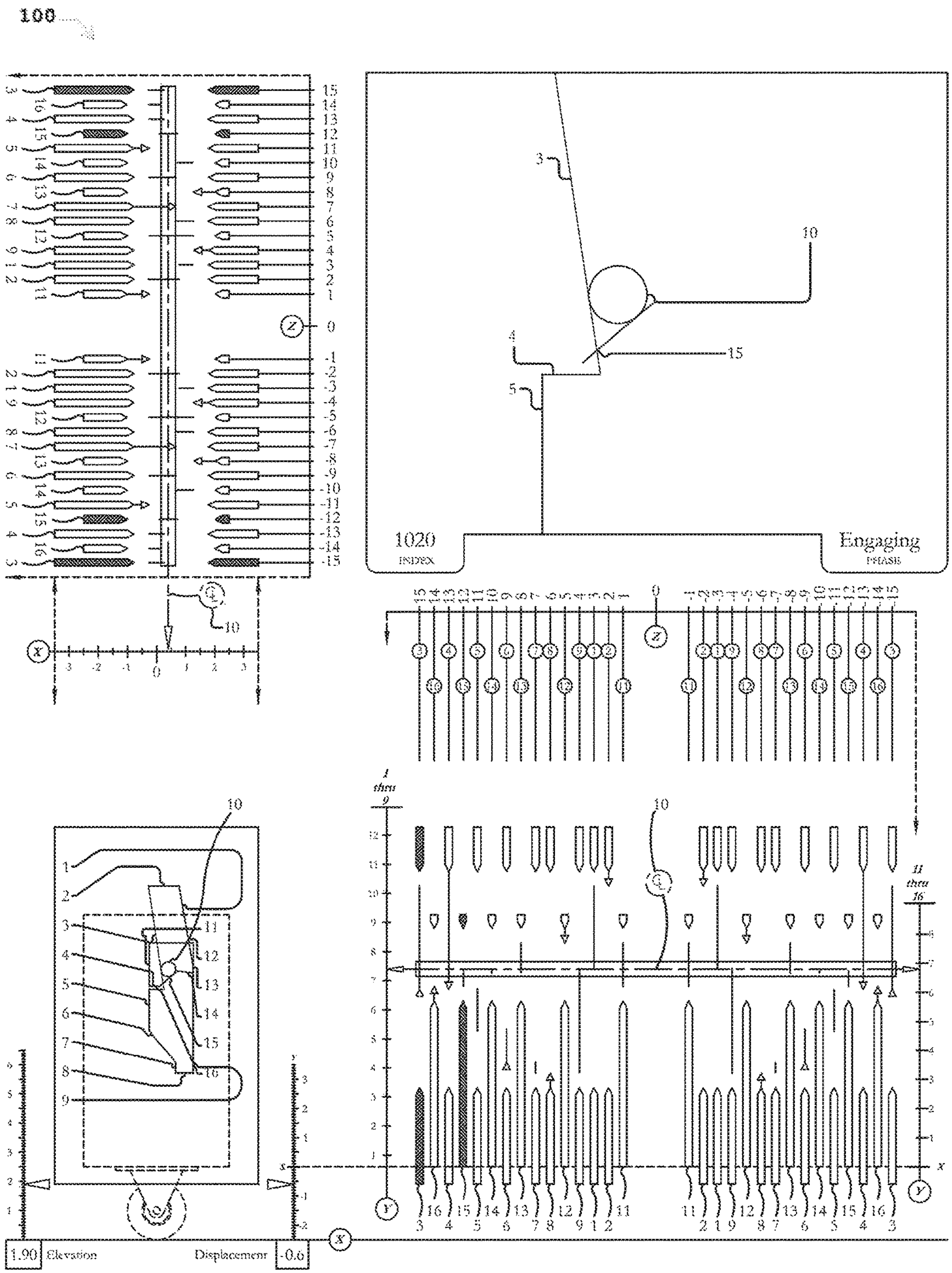
Figure 23:
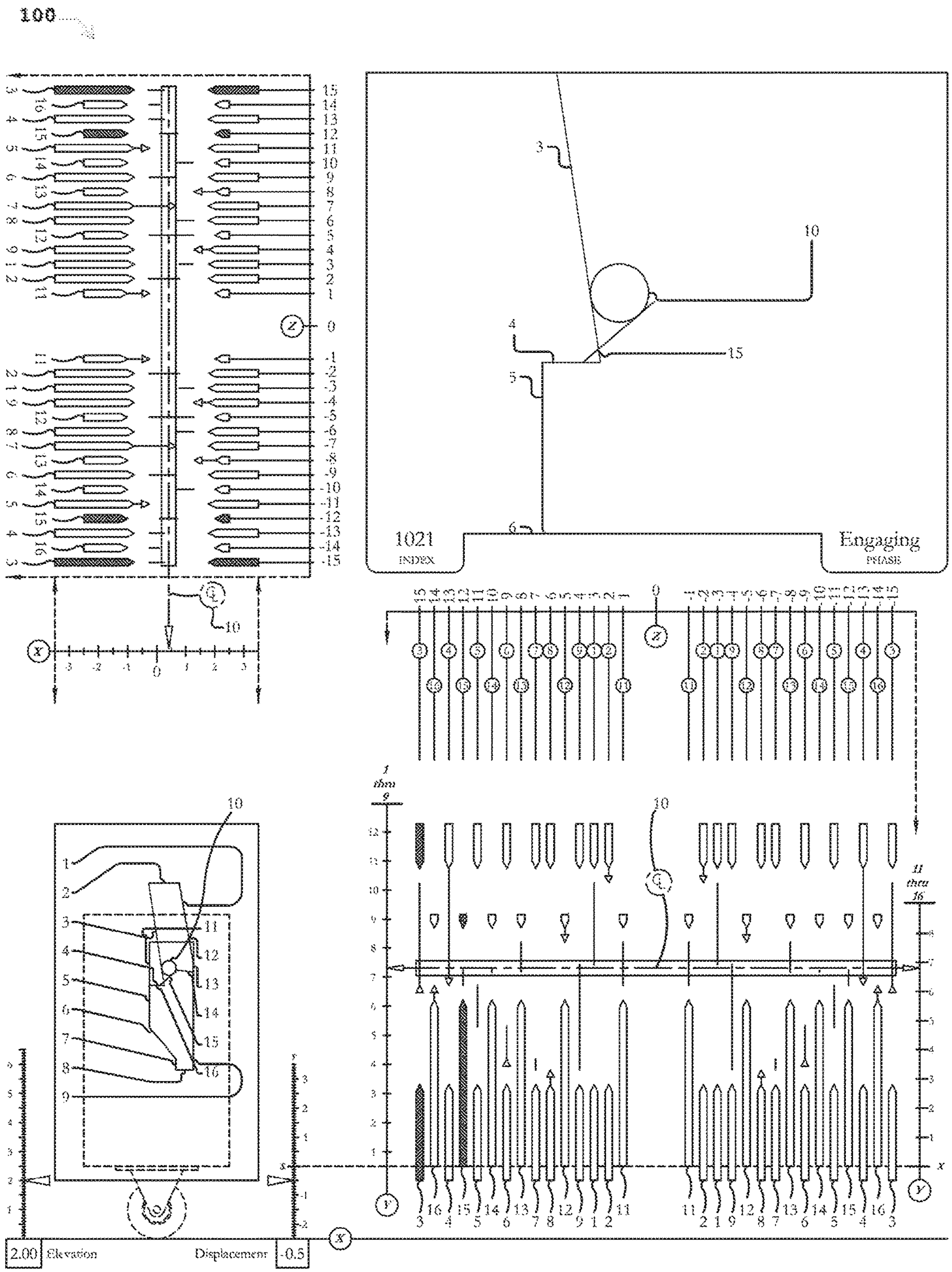
Figure 24:
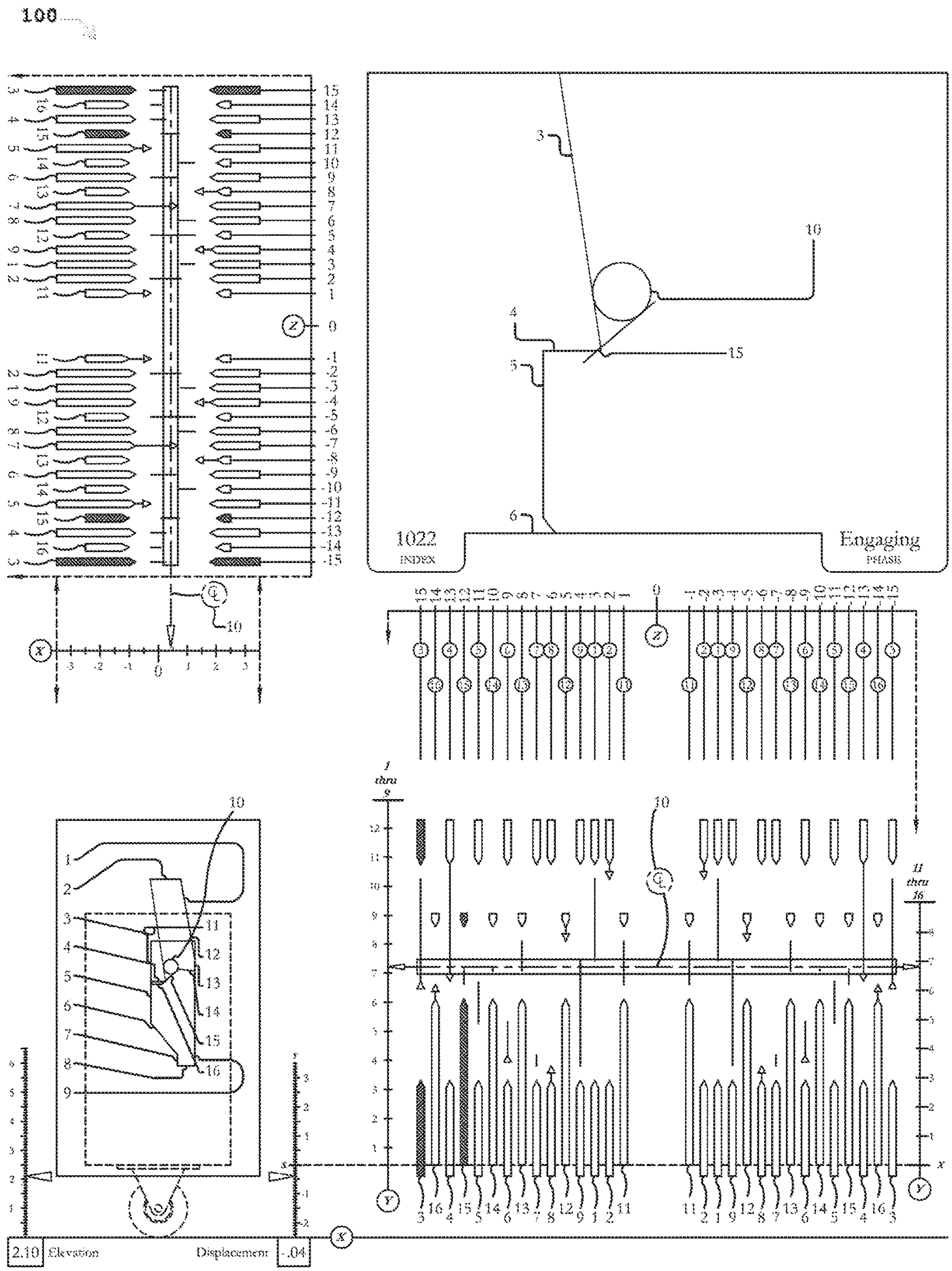
Figure 25:
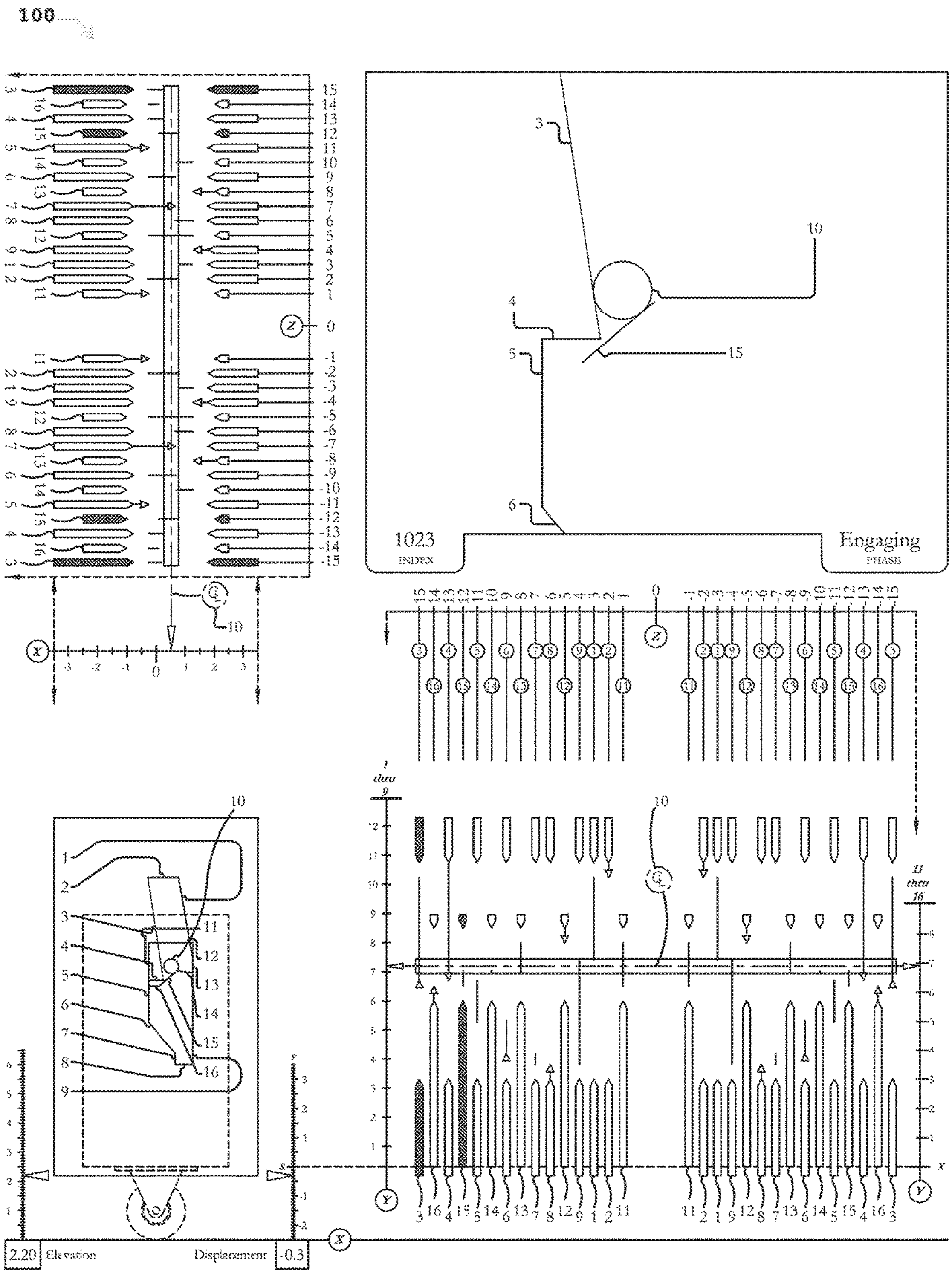
Figure 26:
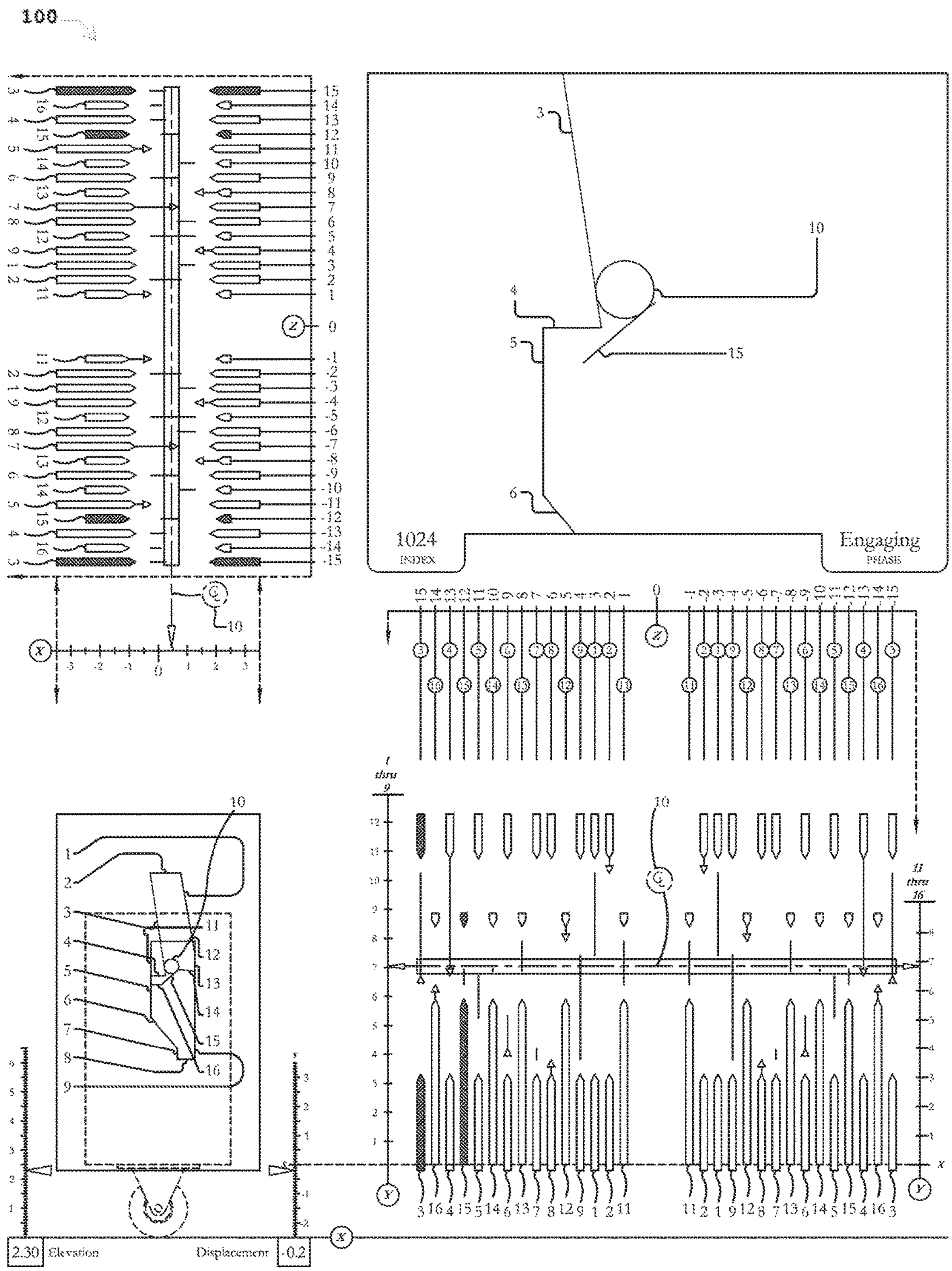
Figure 27:
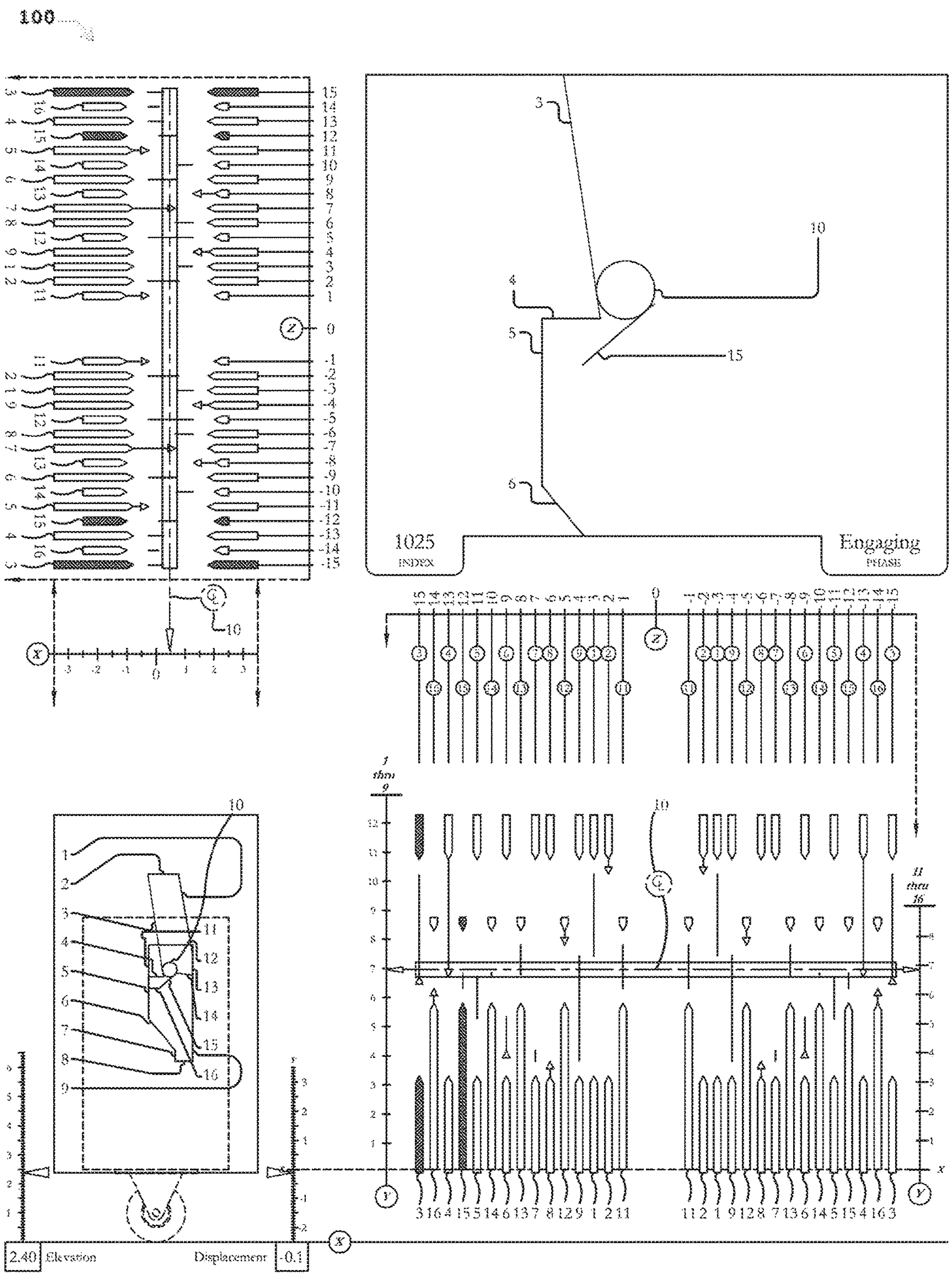
Figure 28:
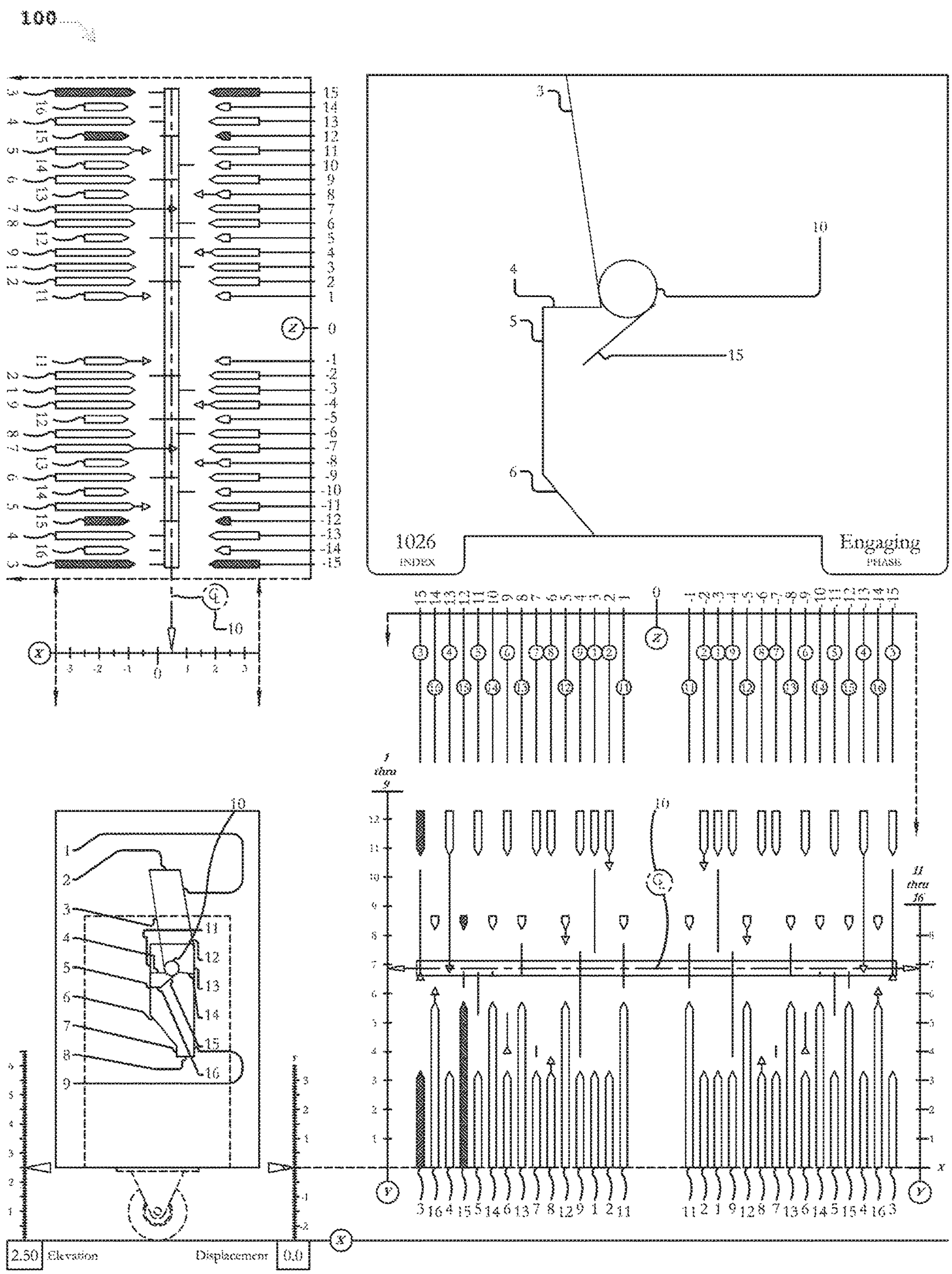
Figure 133:
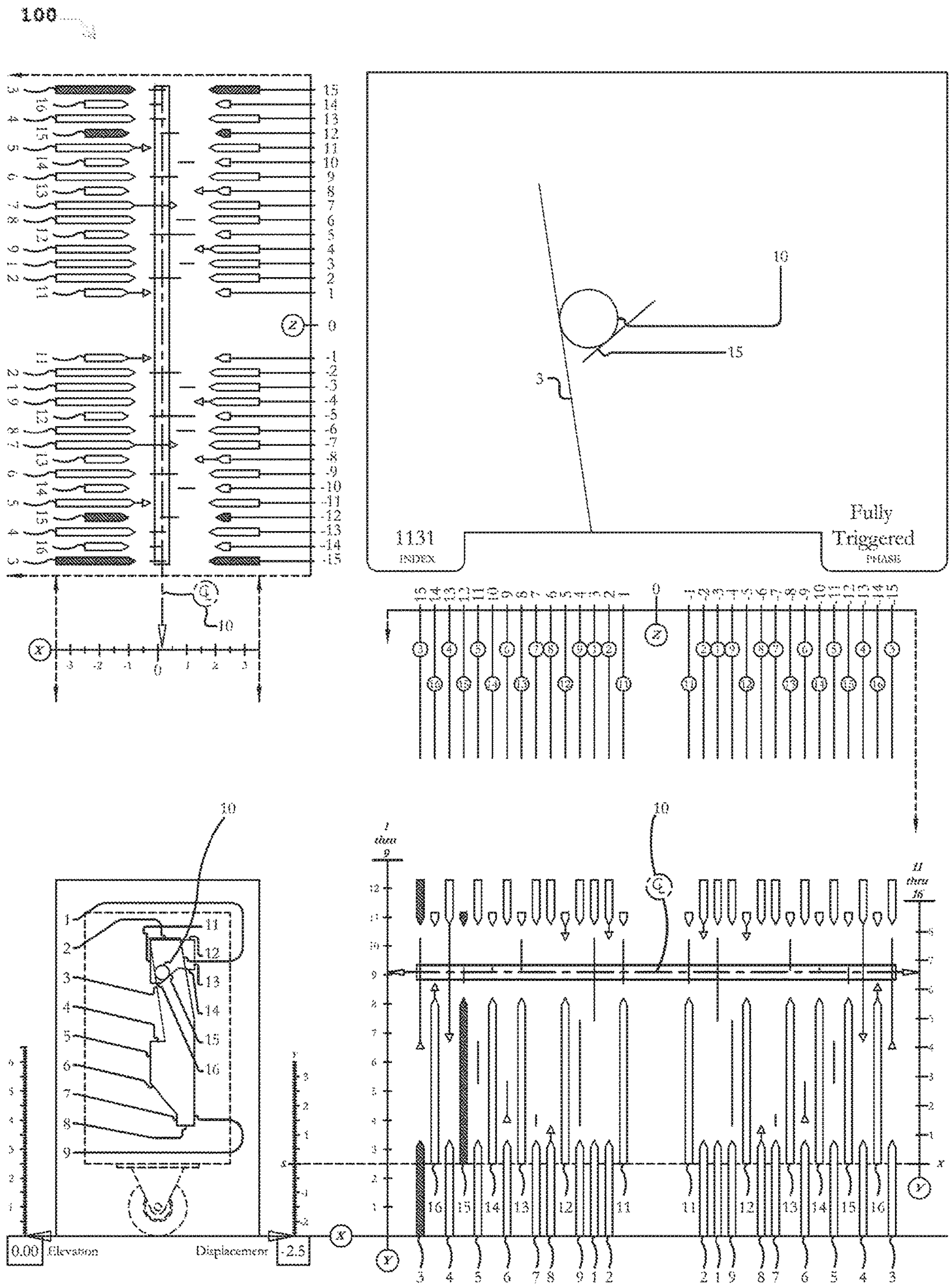

FIGS. 2 to 133 illustrate elevation and top plan views of a First Embodiment 100 of a kinematic finite state machine, in which the first and second bodies are provided be separate sets of joined plates, in which the first and second bodies have a piston-type relationship and the switch has a round vertical cross section, and show the states and events of this embodiment of the finite state machine as the first body moves. In the First Embodiment 100, the kinematic pairing between the first and second bodies imposes five constraints on the degrees of freedom in relative movement between the bodies; because unconstrained bodies have a maximum of six degrees of freedom (three translational degrees: up, down, side-to-side; and three rotational degrees: roll, yaw, pitch), constraints on five degrees leaves one degree of freedom. In the First Embodiment 100, the kinematic pairing is prismatic.

In FIGS. 2 through 133, elements 1 through 9 illustrate a set of joined plates comprising the Housing. The plates comprising the Housing may be joined by screws, bolts, nails, glue, epoxy, or the like (not shown in FIGS. 2 through 133). In FIGS. 2 through 133, elements 11 through 16 illustrate a set of joined plates comprising the Platform. Similarly, the plates comprising the Platform may be joined by screws, bolts, nails, glue, epoxy, or the like (not shown in FIGS. 2 through 133). The Housing and Platform plates are arranged in a matrix which allows the Housing and Platform to translate vertically relative to one another, but which does not allow the Housing and Platform to translate horizontally relative to one another (movement of the Housing in the horizontal plane will also move the Platform). The plates of the Housing form a first coordinate function, while the plates of the Platform form a second coordinate function.

Together, the first and second coordinate functions form a variable composite coordinate function. As the Housing is lifted, the variable composite coordinate function transmits forces at force vectors to Switch 10, which vectors are determined by Switch 10, generally orthogonal to the slope of the points where the composite coordinate function contacts the Switch. The forces and force vectors trigger events which change the state of this First Embodiment 100 of the state machine. As described further below, these figures show the states and the triggering events of this embodiment of the finite state machine.

In FIGS. 2 through 133, element 10 illustrates Switch 10, in this First Embodiment 100 a rod, such as a one-half inch diameter steel rod (other materials may be used). As illustrated in FIGS. 2 through 133, the Housing and Platform may move separately. In the illustrations of FIGS. 2 through 133, the Platform is generally resting on an external surface, while the Housing may rest upon the external surface, but may also be lifted, translating the Housing vertically.

Switch 10. Among other features, this bottom-right quadrant illustrates, with pointer and ruler, how the center line of Switch 10 translates vertically as the displacement of Housing changes relative to Platform.

The bottom-left quadrant illustrates a side elevation view of the First Embodiment. The bottom-left quadrant illustrates, with broken lines, the perimeter of the Platform and an accessory (a wheel) attached to the Platform.

Both bottom quadrants illustrate, with pointers and rulers, elevation-view displacement meters.

In the top-left and bottom right-quadrants in these Figures, plates in contact with and transmitting a force vector to or receiving a force vector from the switch are cross-hatched.

In all of these views, a force is transmitted to Switch 10 from the Housing. The force has a magnitude, generated by the rate of the relative displacement of the Housing and Platform, and a force vector orthogonal to the slope of the points where the composite coordinate function of the surfaces of the Housing and Platform contact the Switch.

FIGS. 2 through 133 illustrate the following states and events:

TABLE 1

Figure 29:
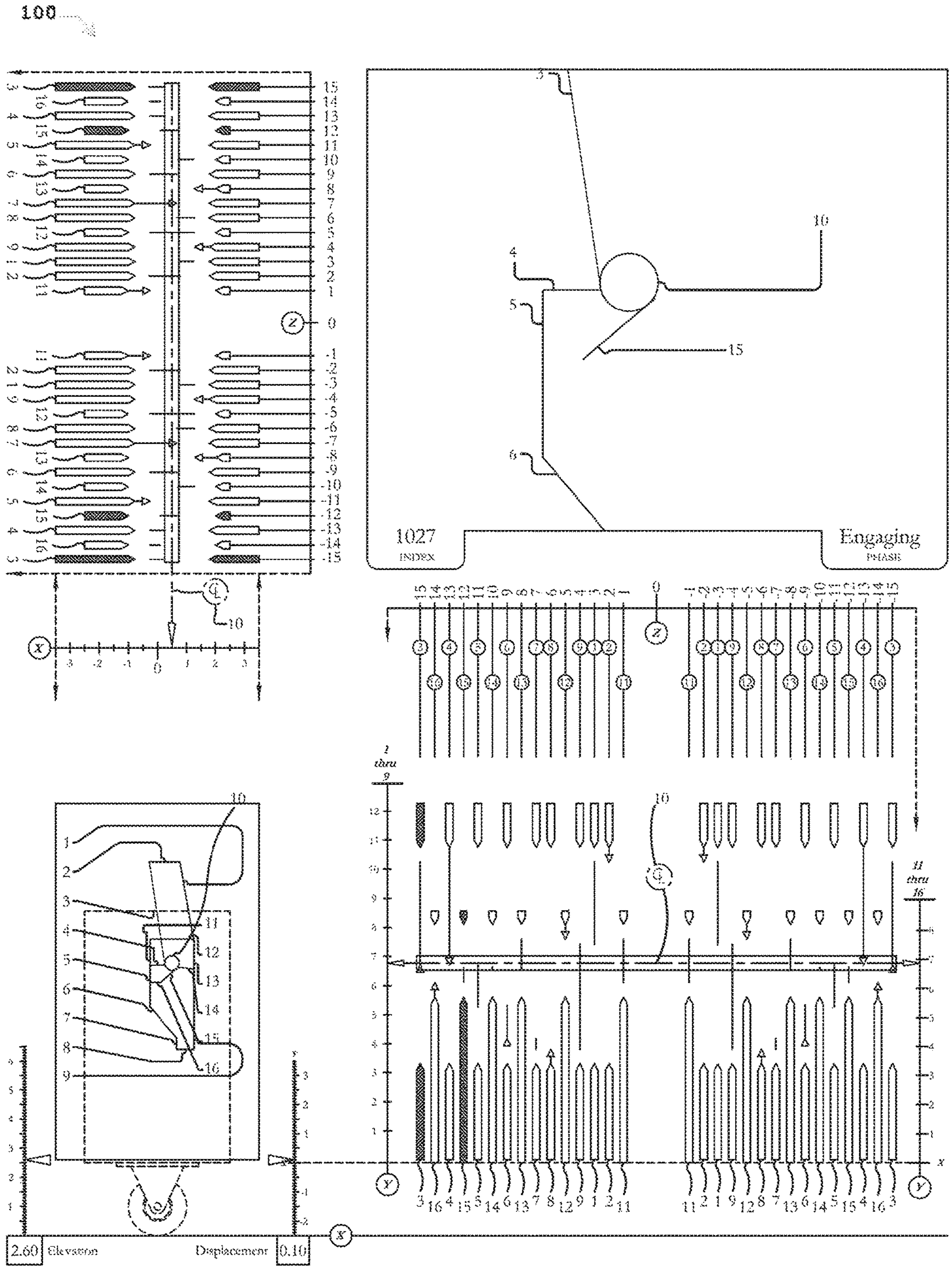
Figure 30:
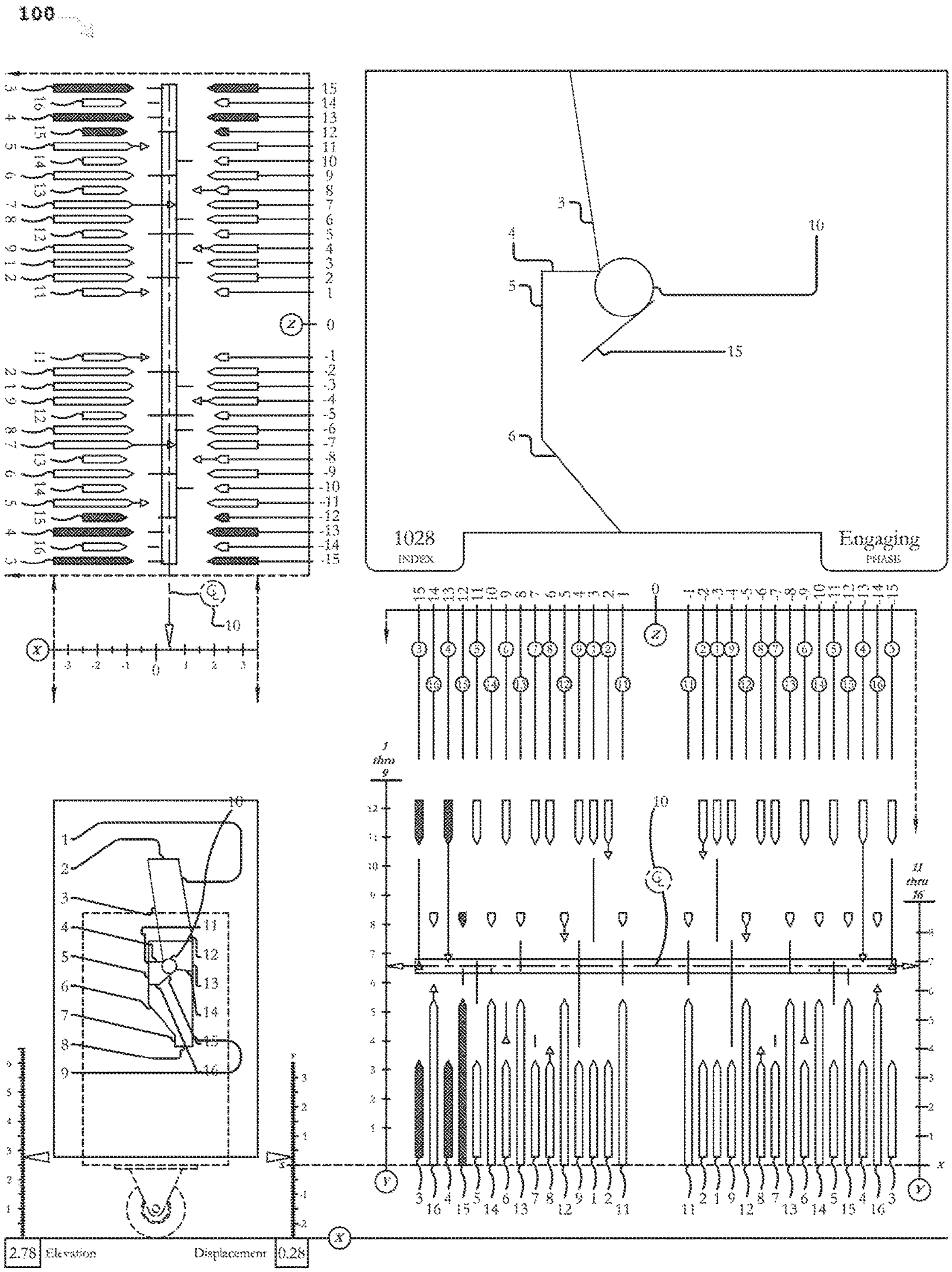
Figure 31:
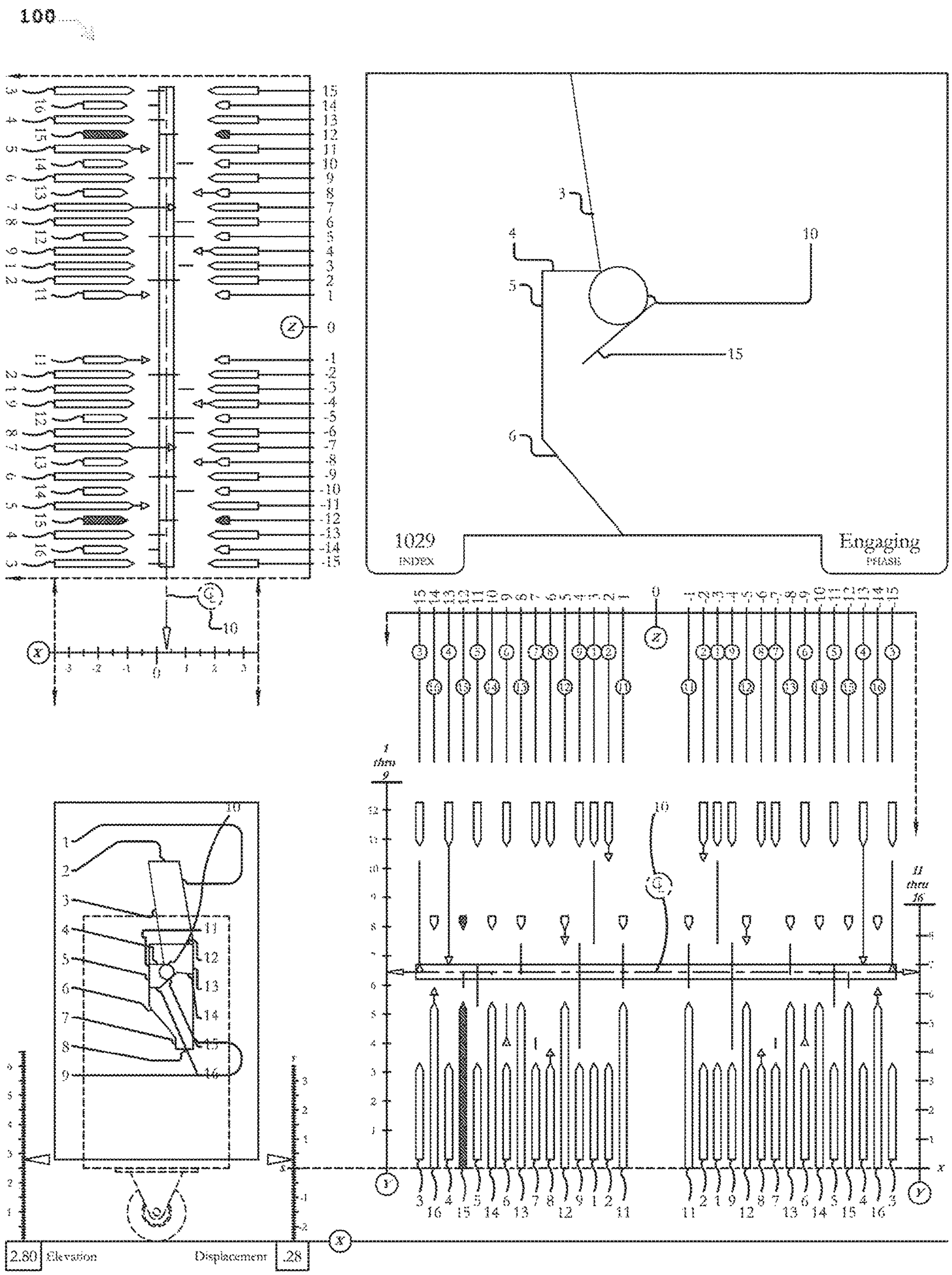
Figure 32:
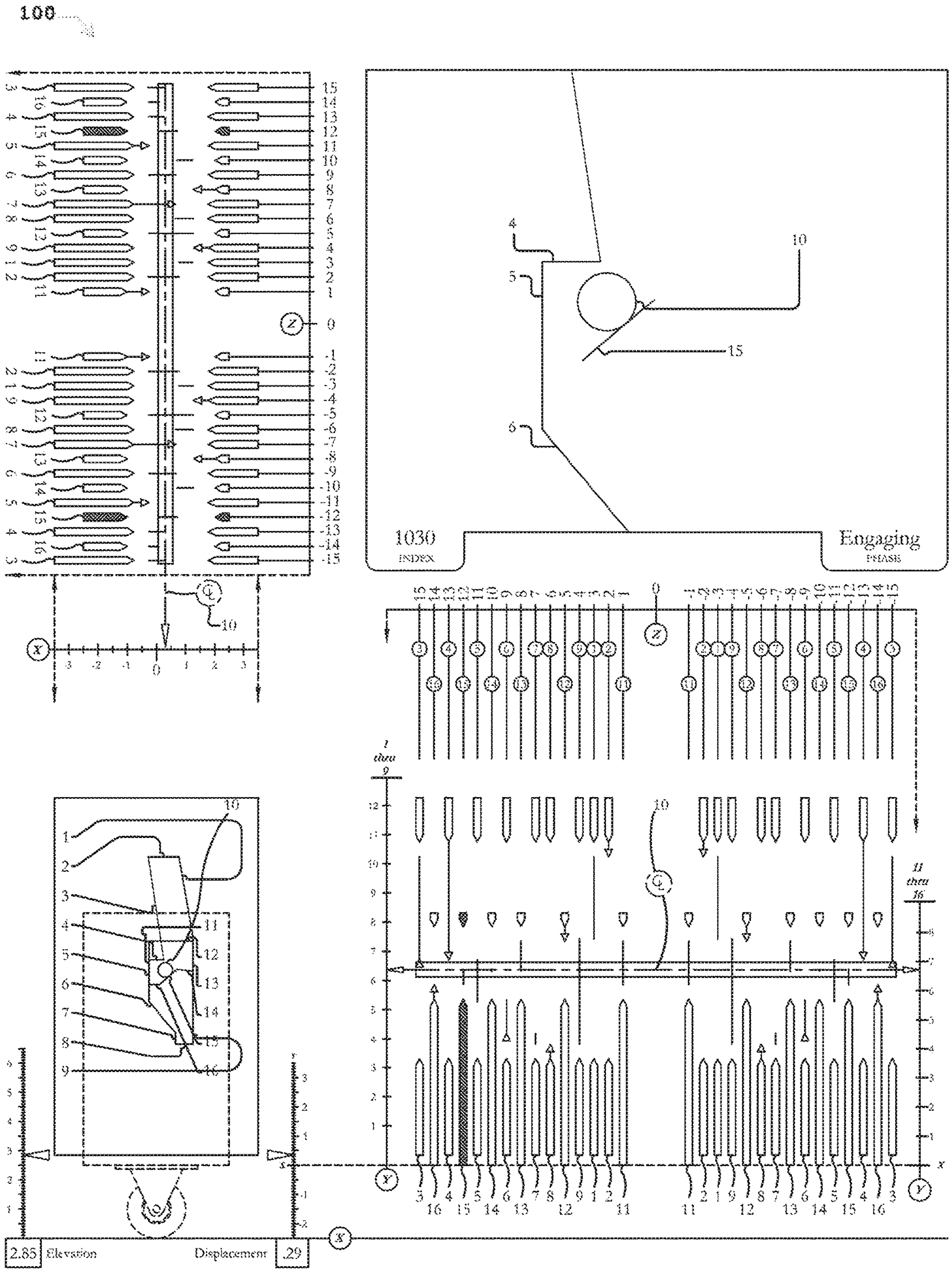
Figure 33:
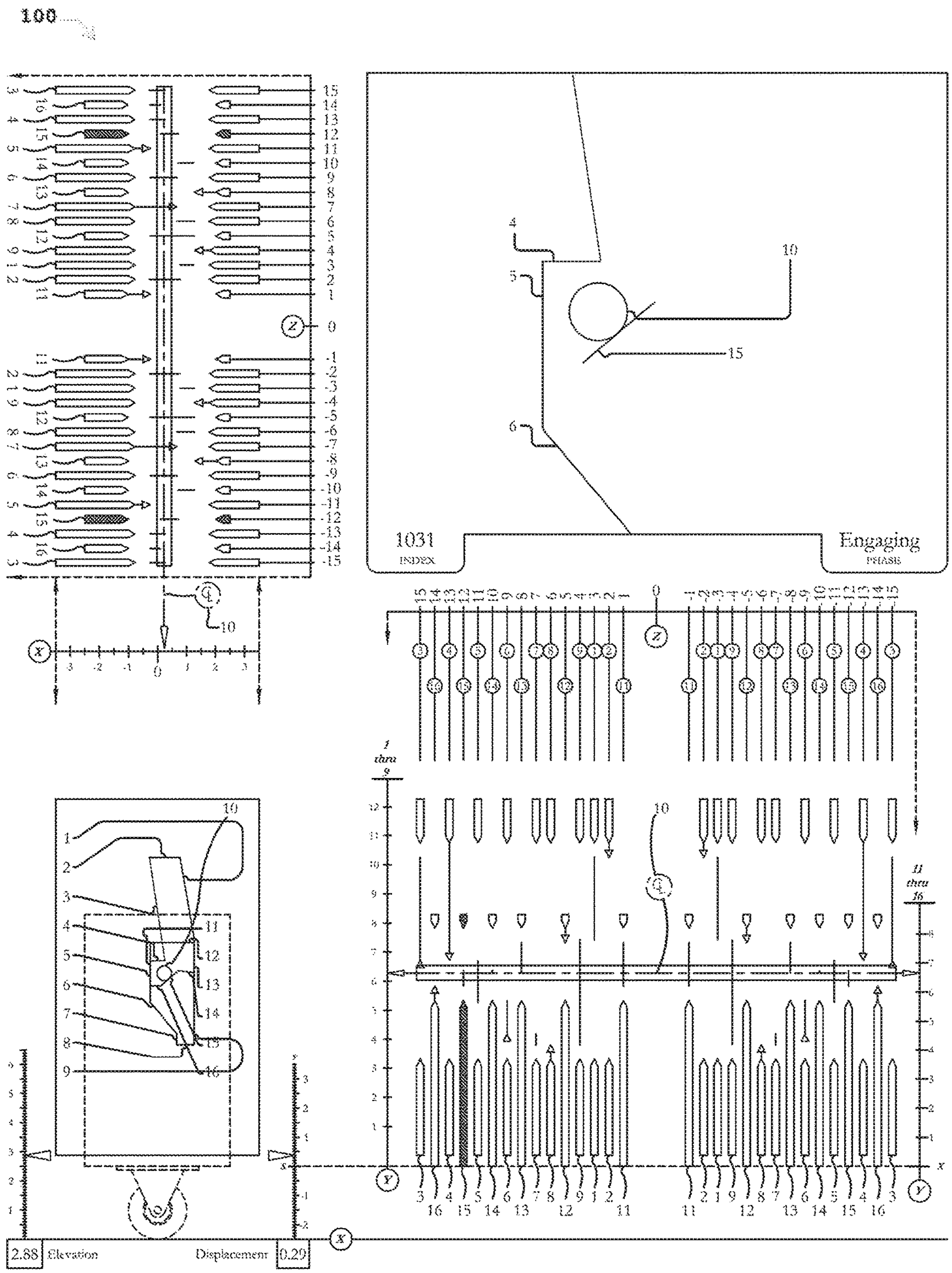
Figure 34:
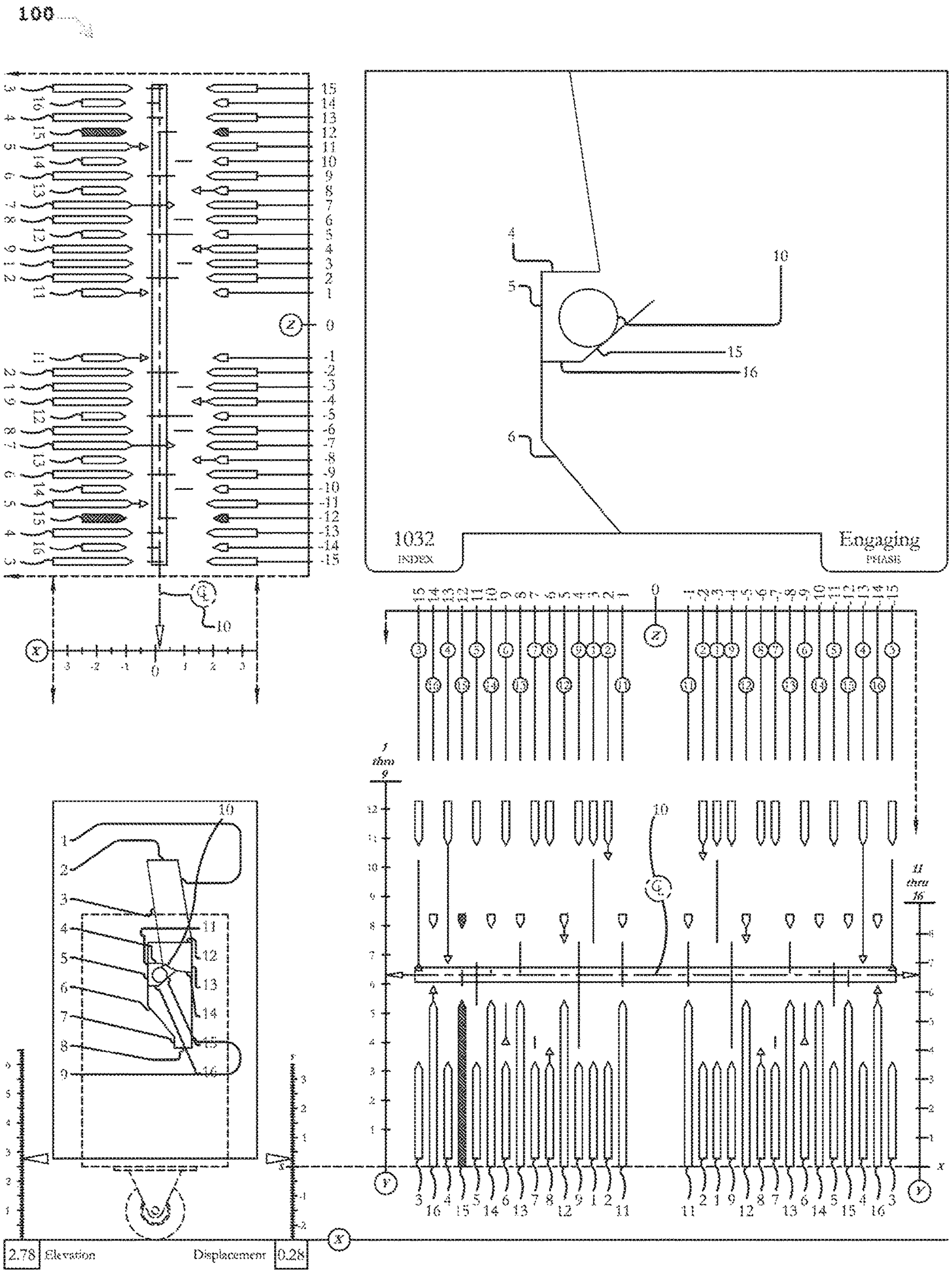
Figure 35:
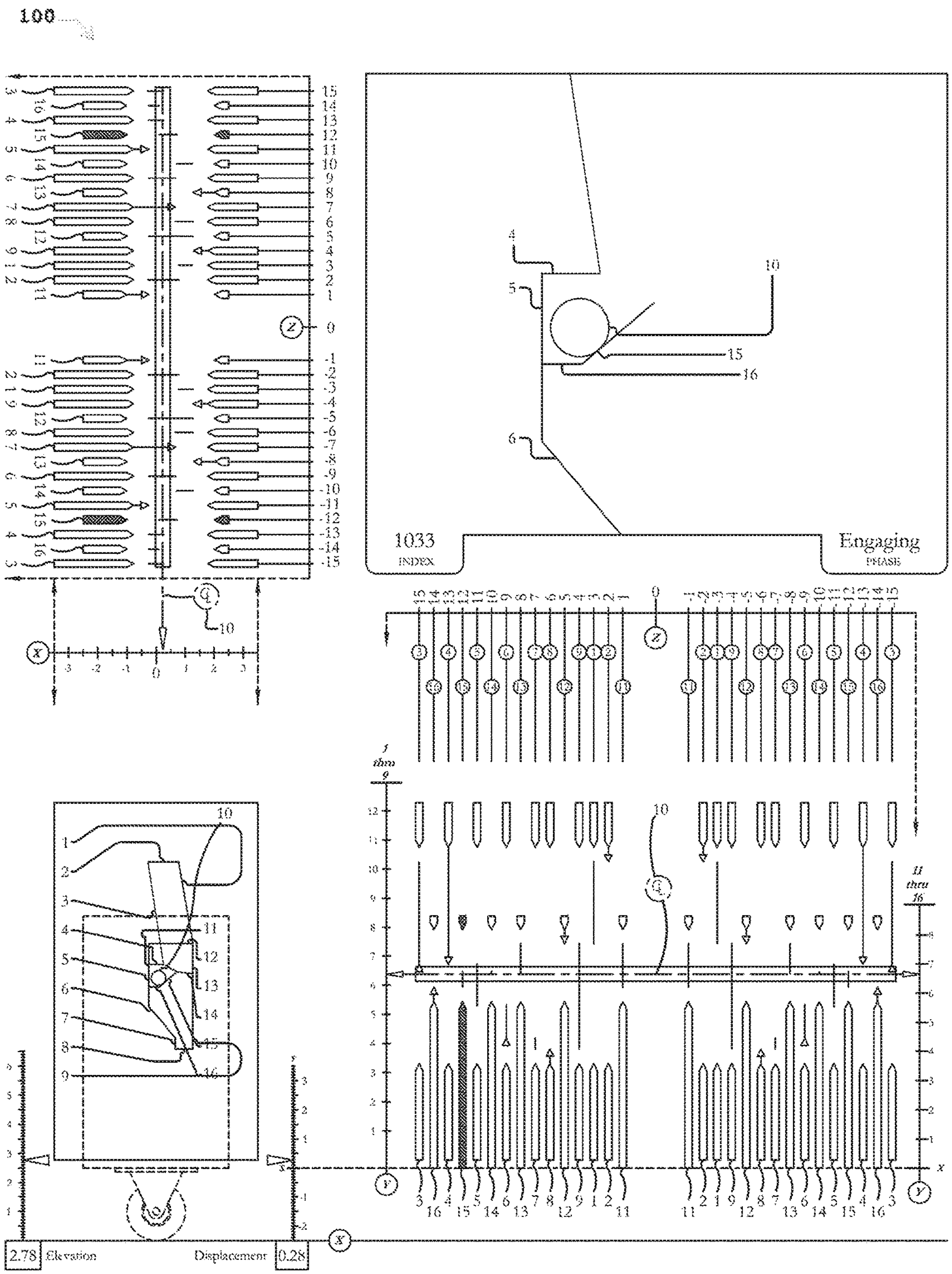
Figure 36:
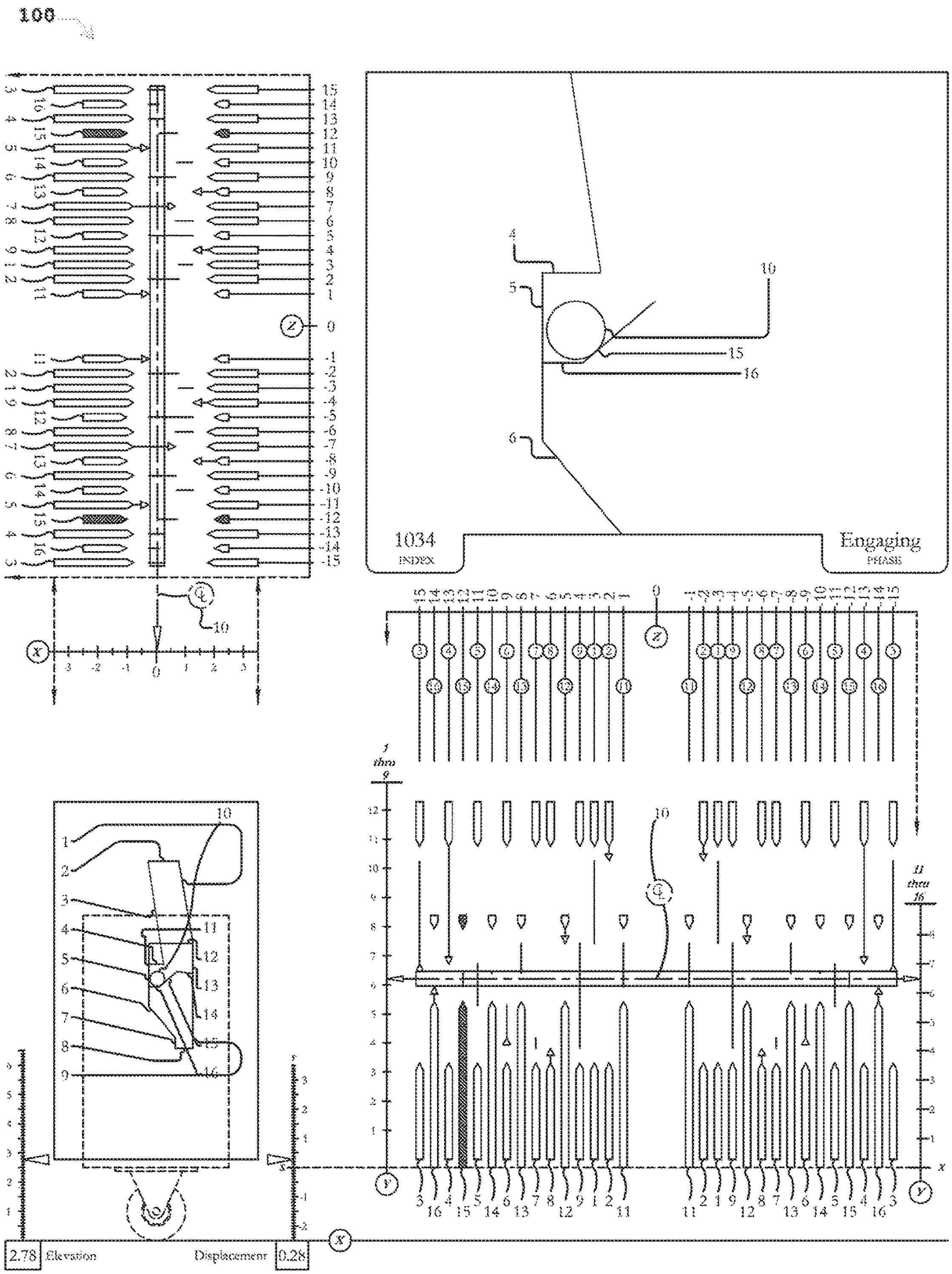
Figure 37:
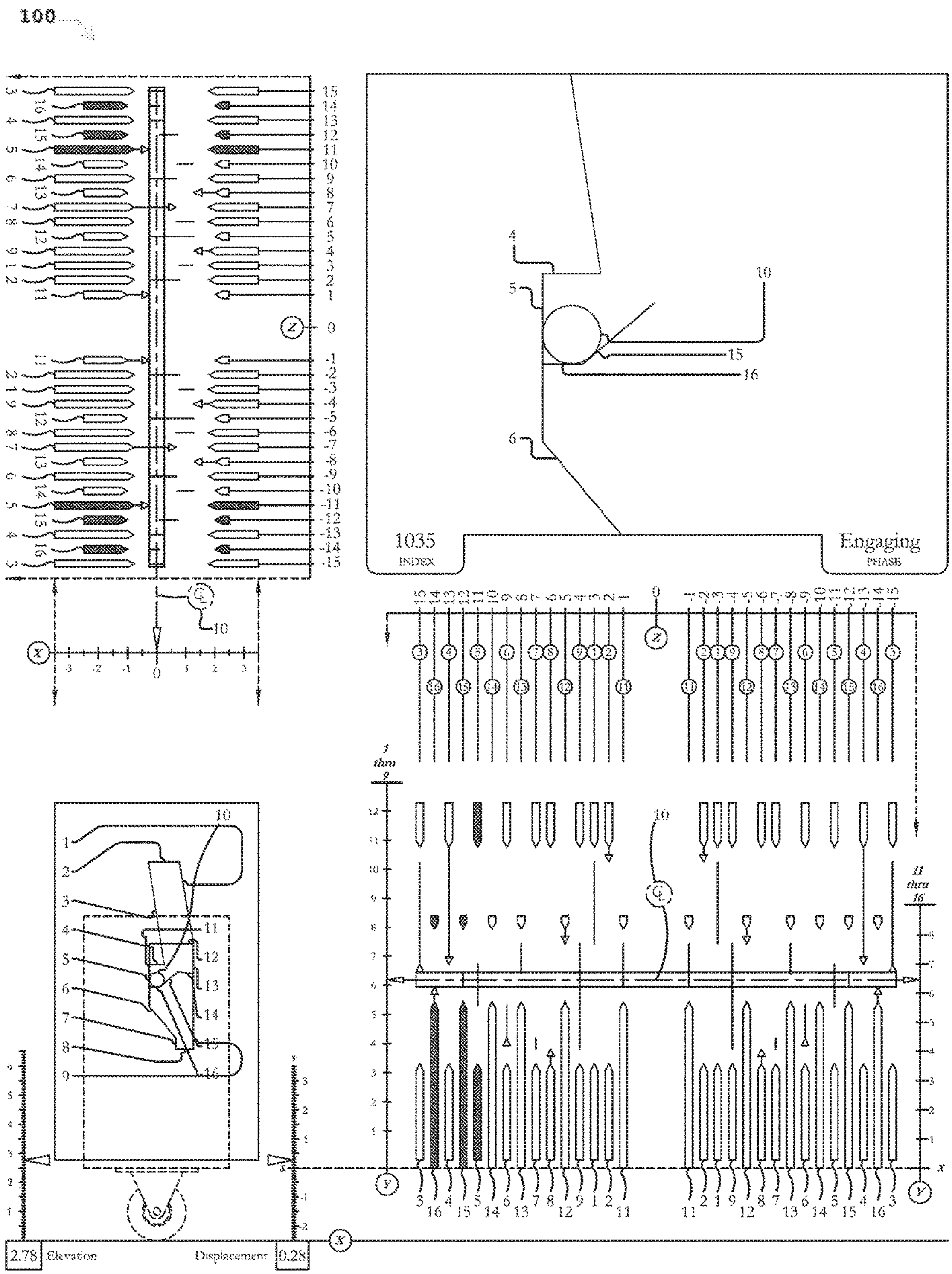
Figure 38:
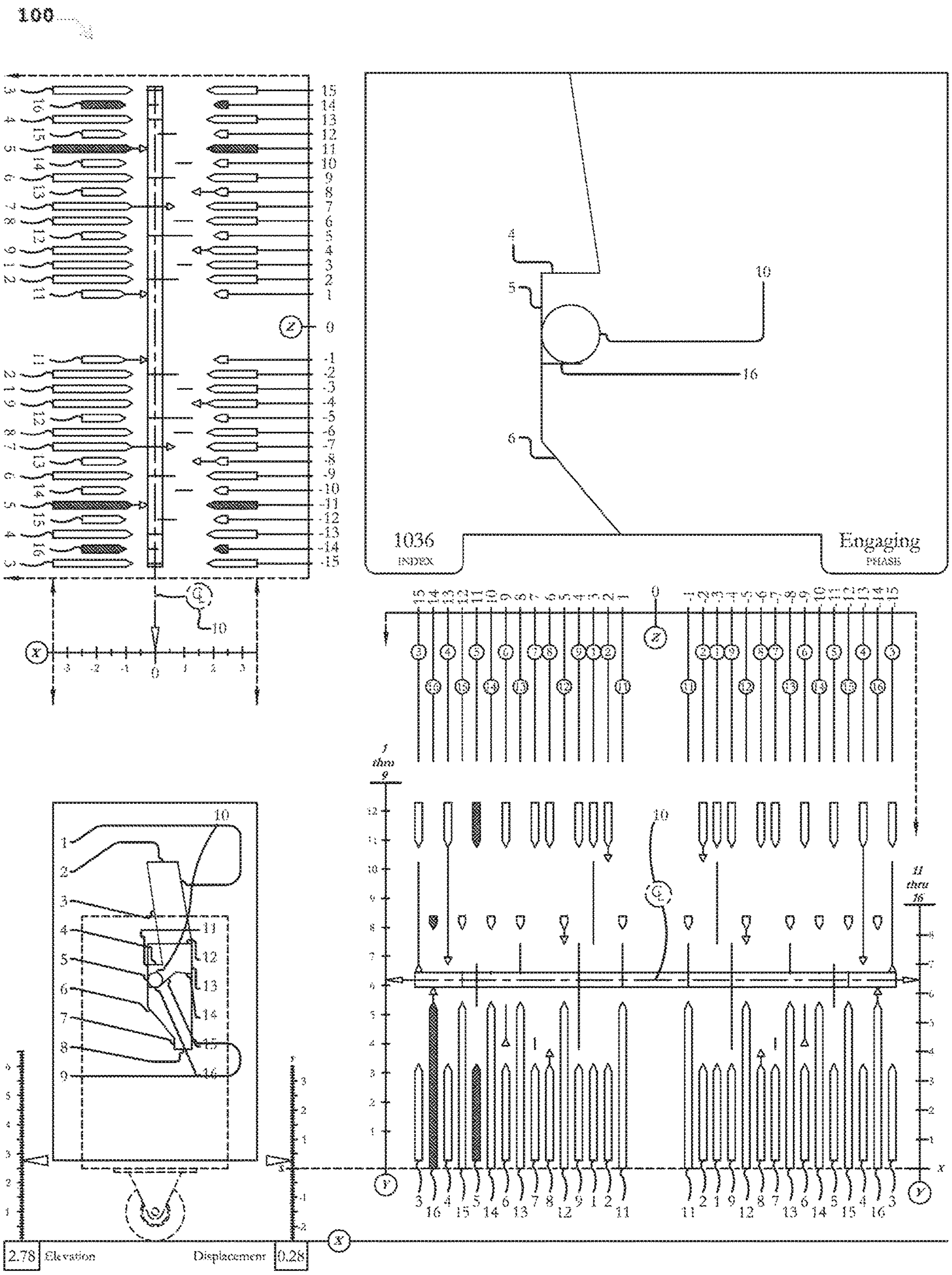
Figure 39:
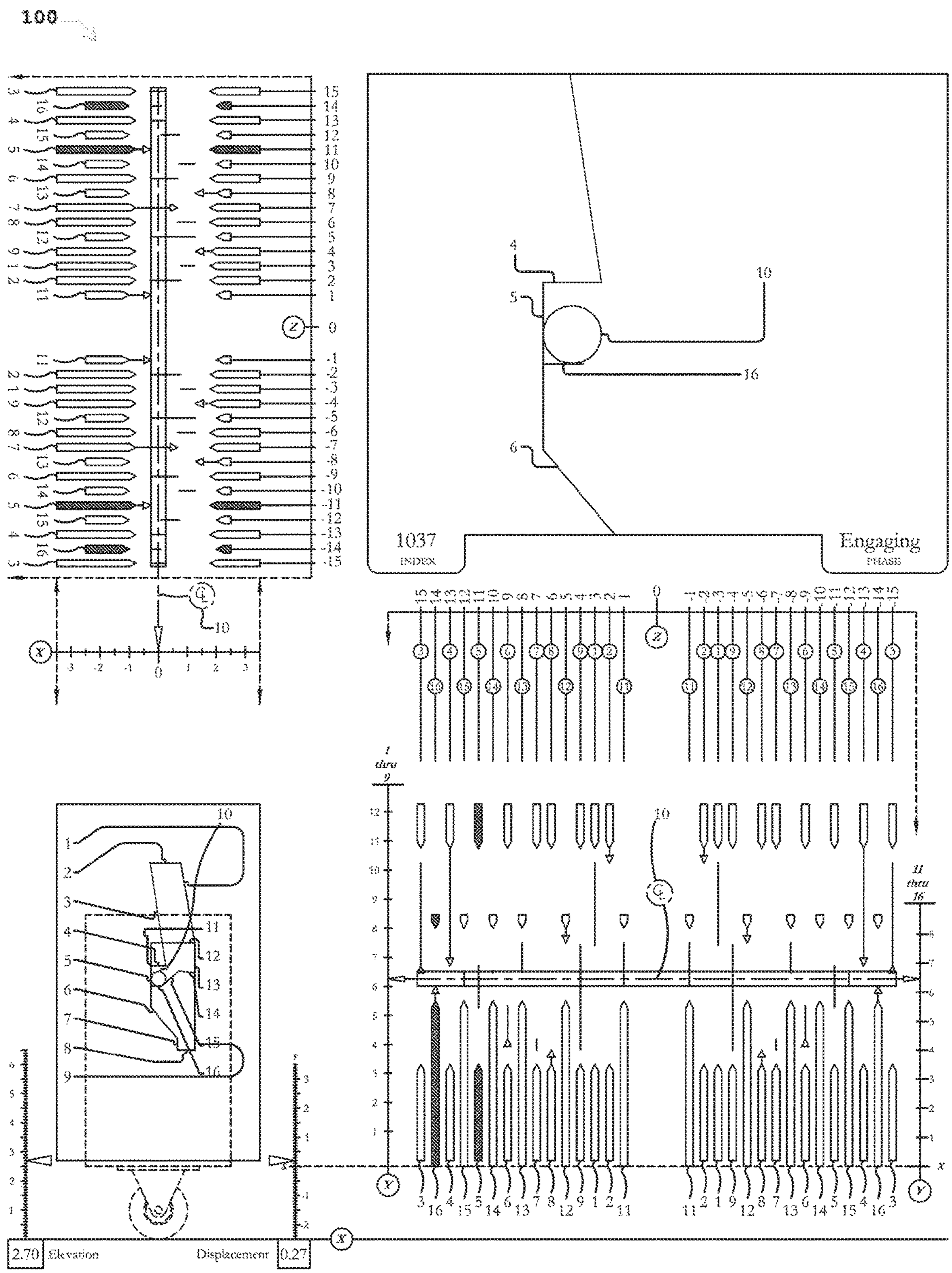
Figure 40:
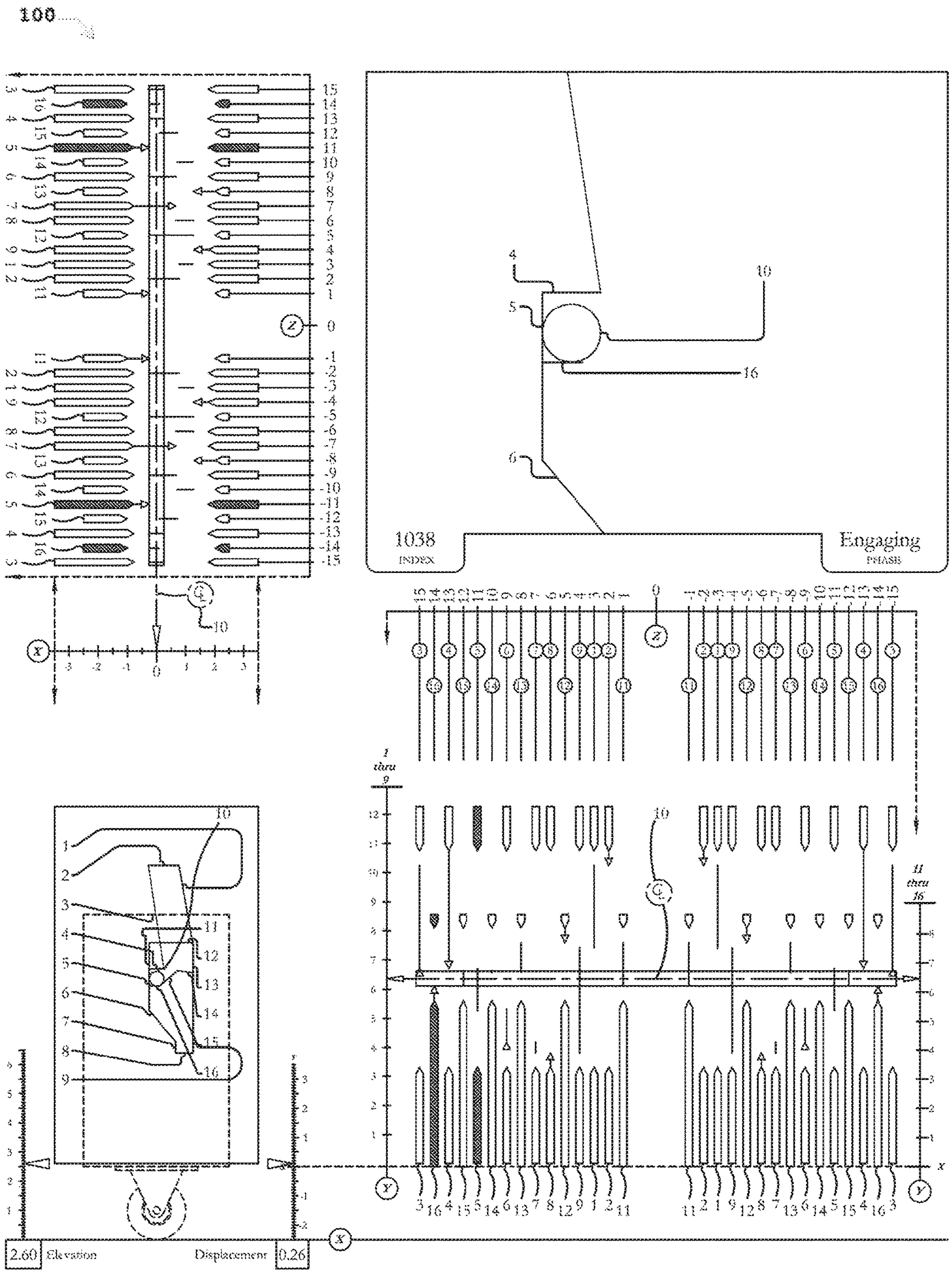
Figure 41:
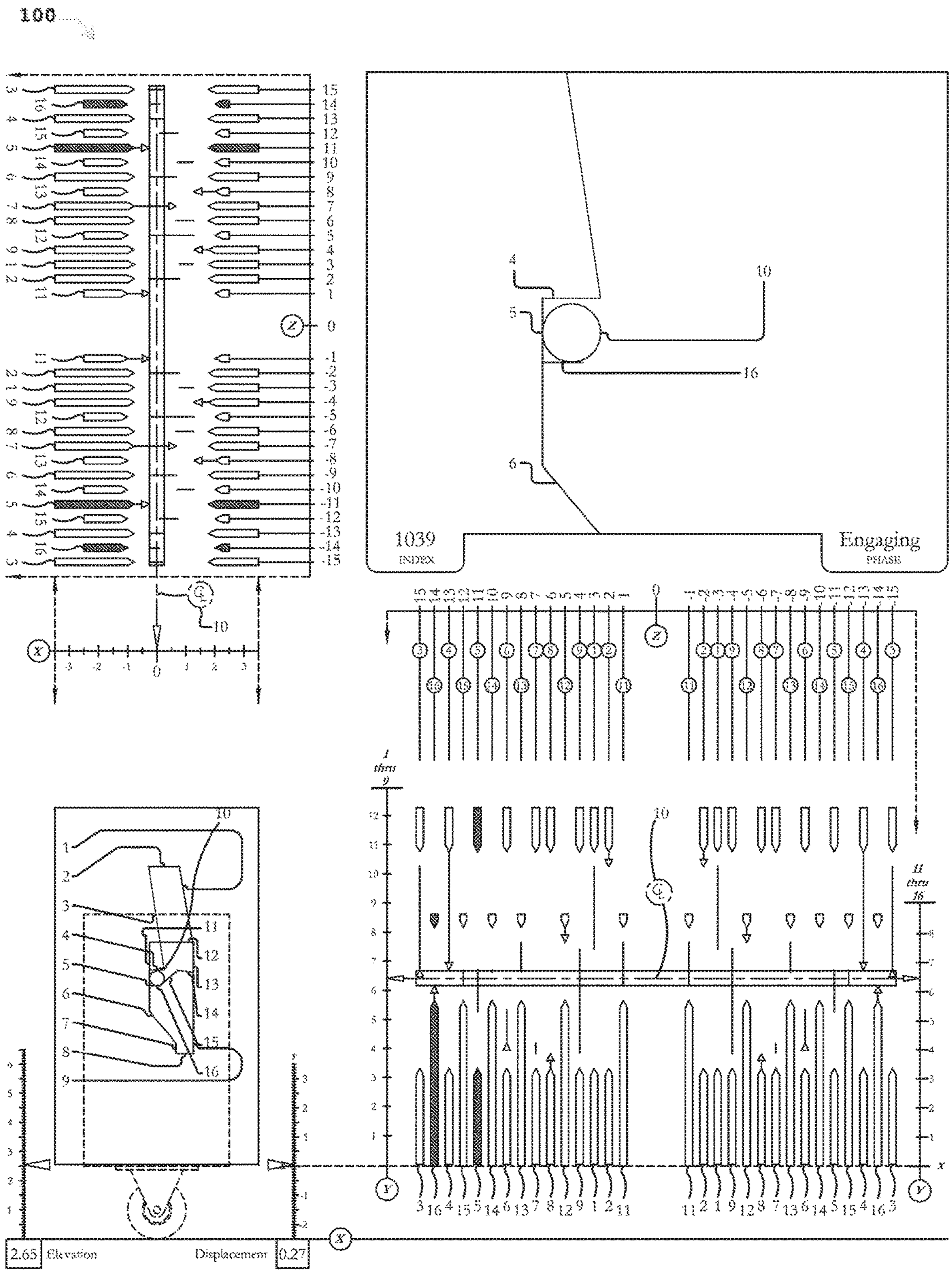
Figure 42:
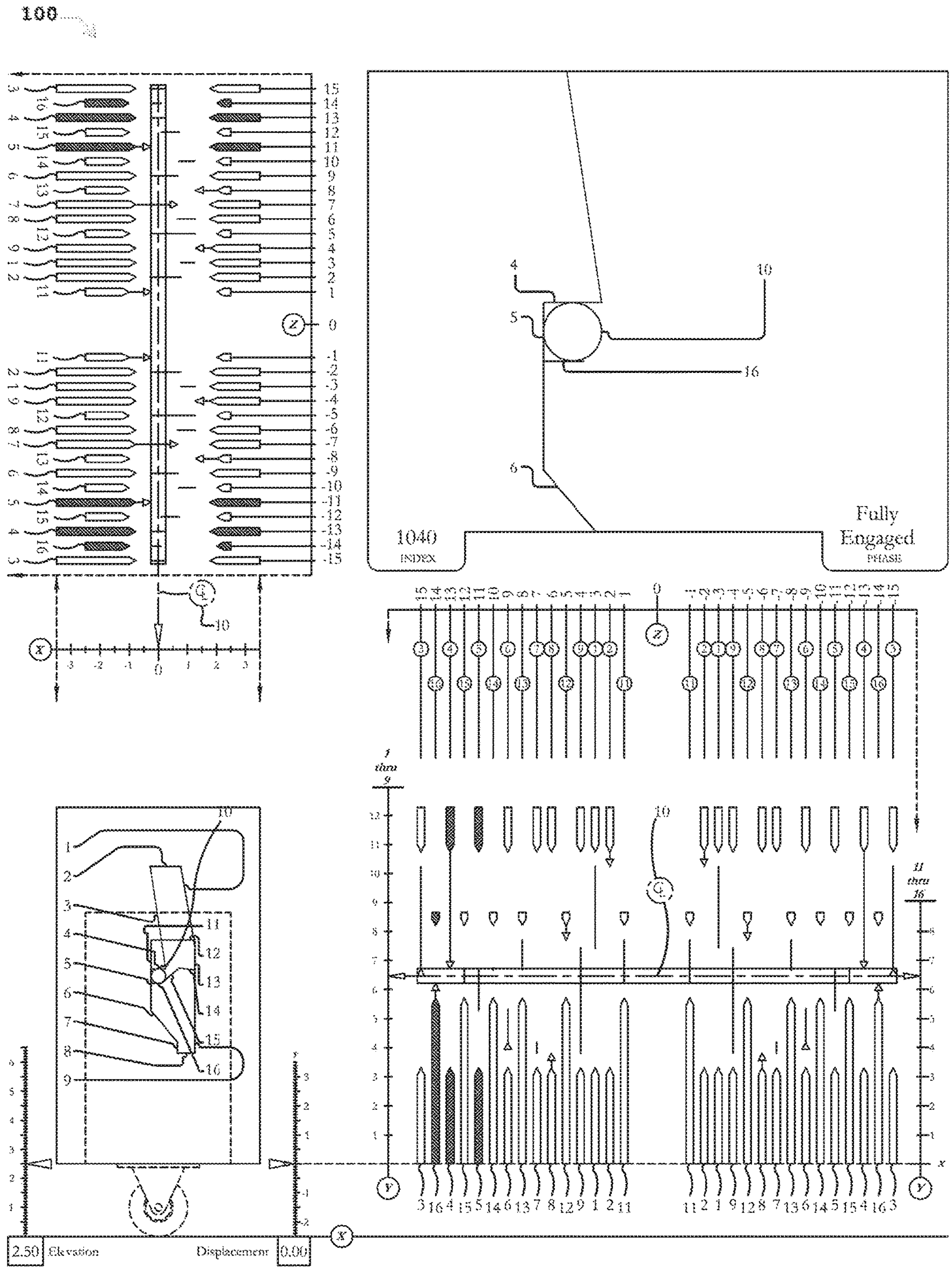
Figure 43:
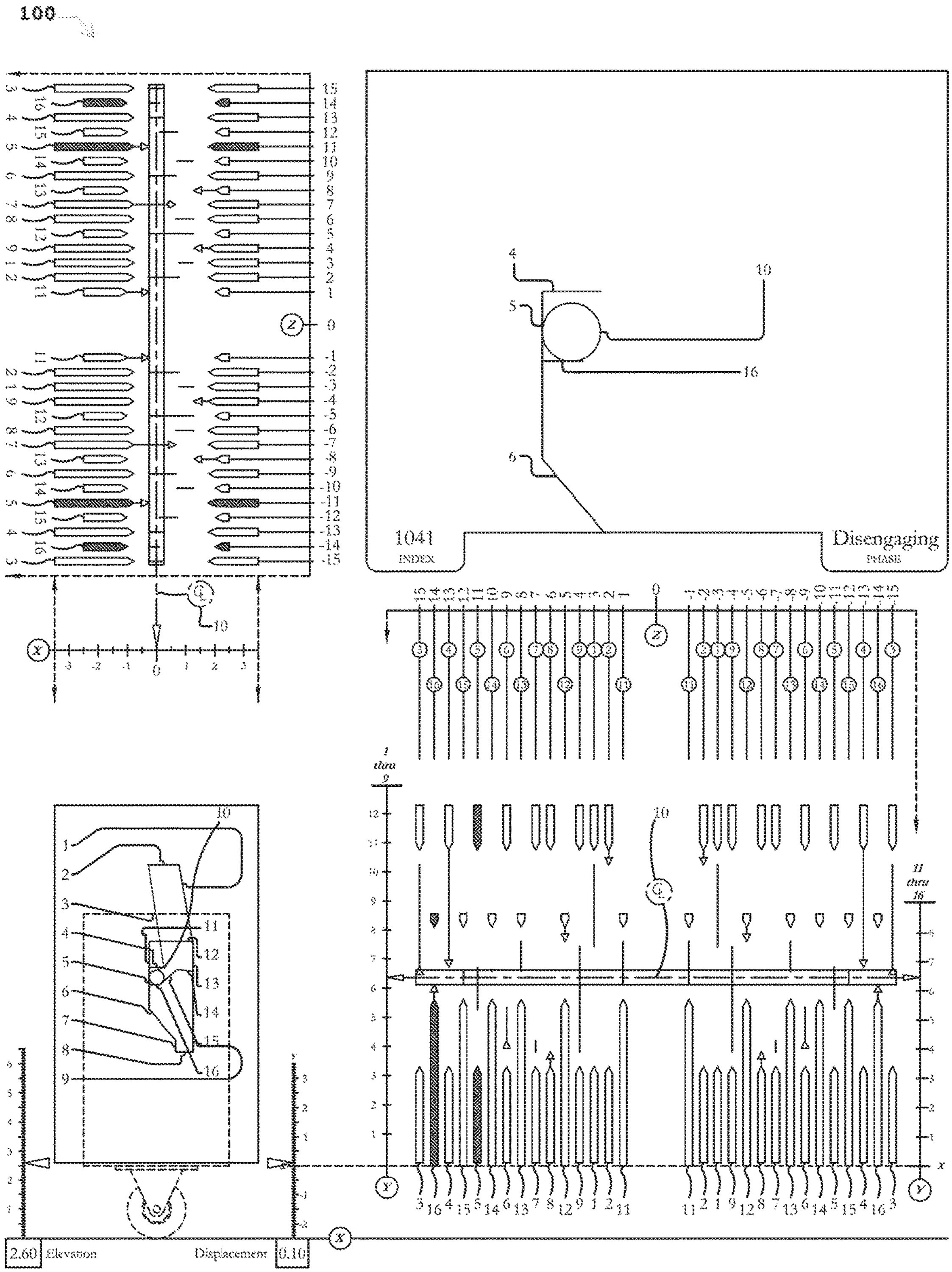
Figure 44:
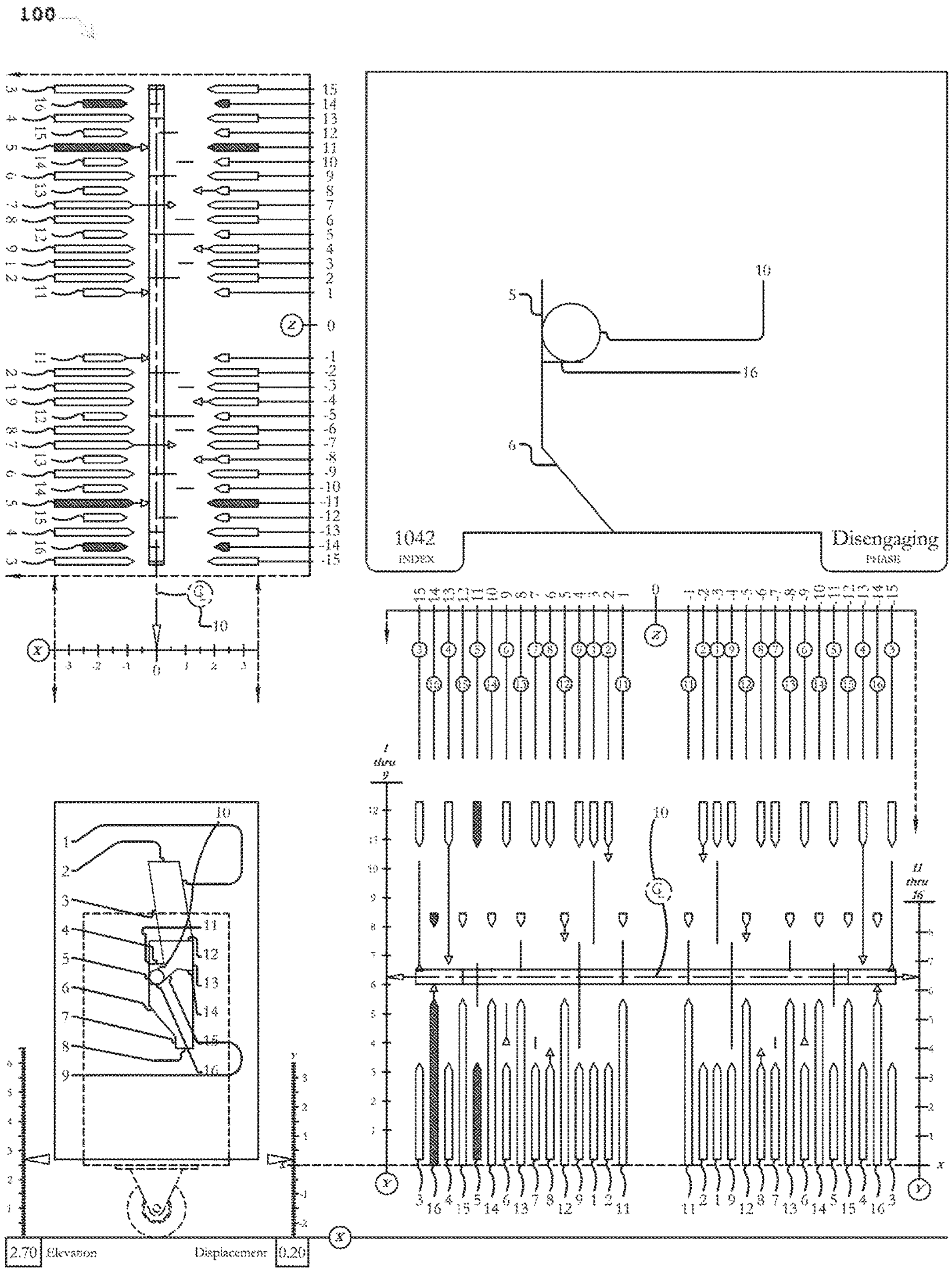
Figure 45:
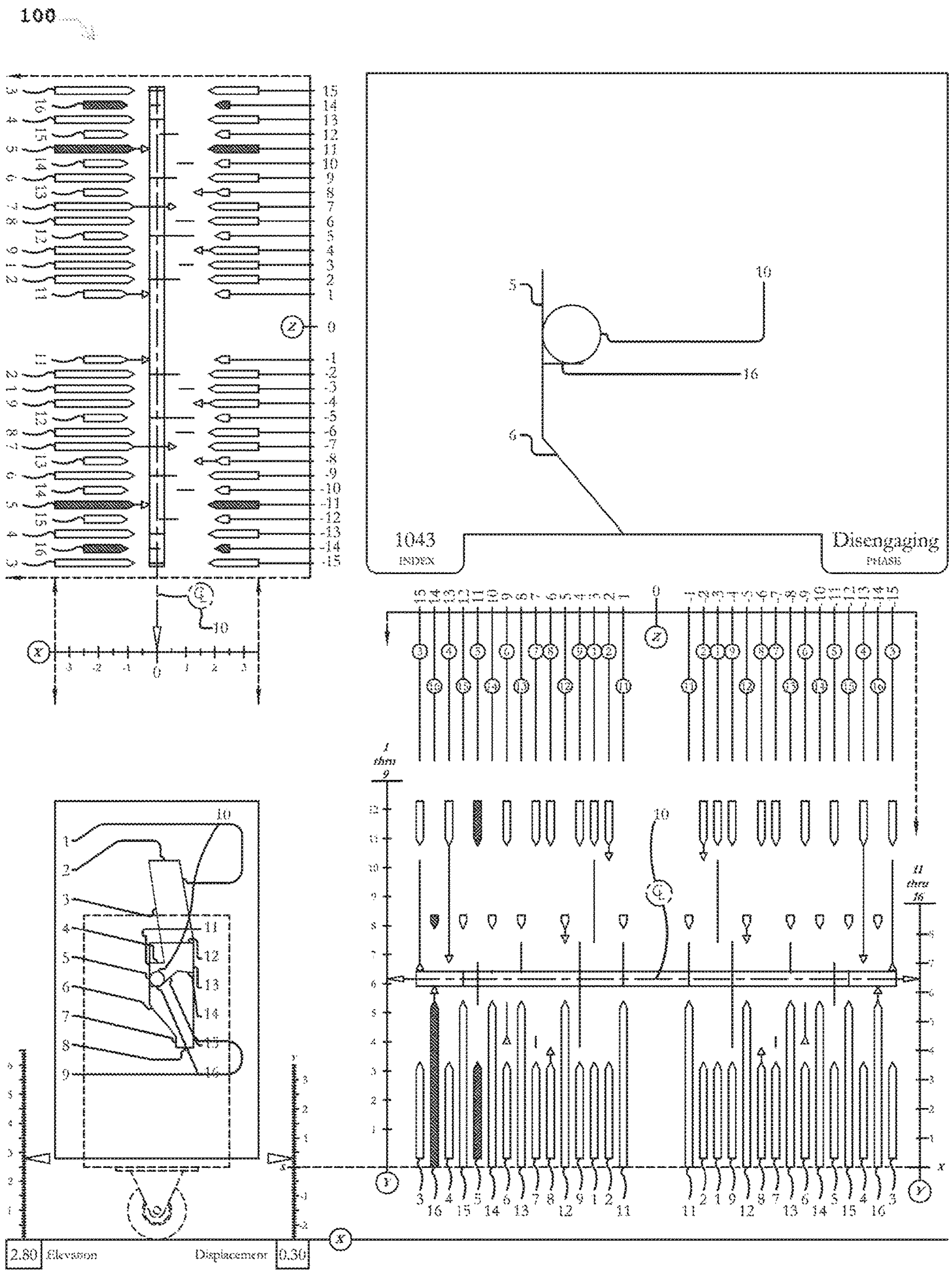
Figure 46:
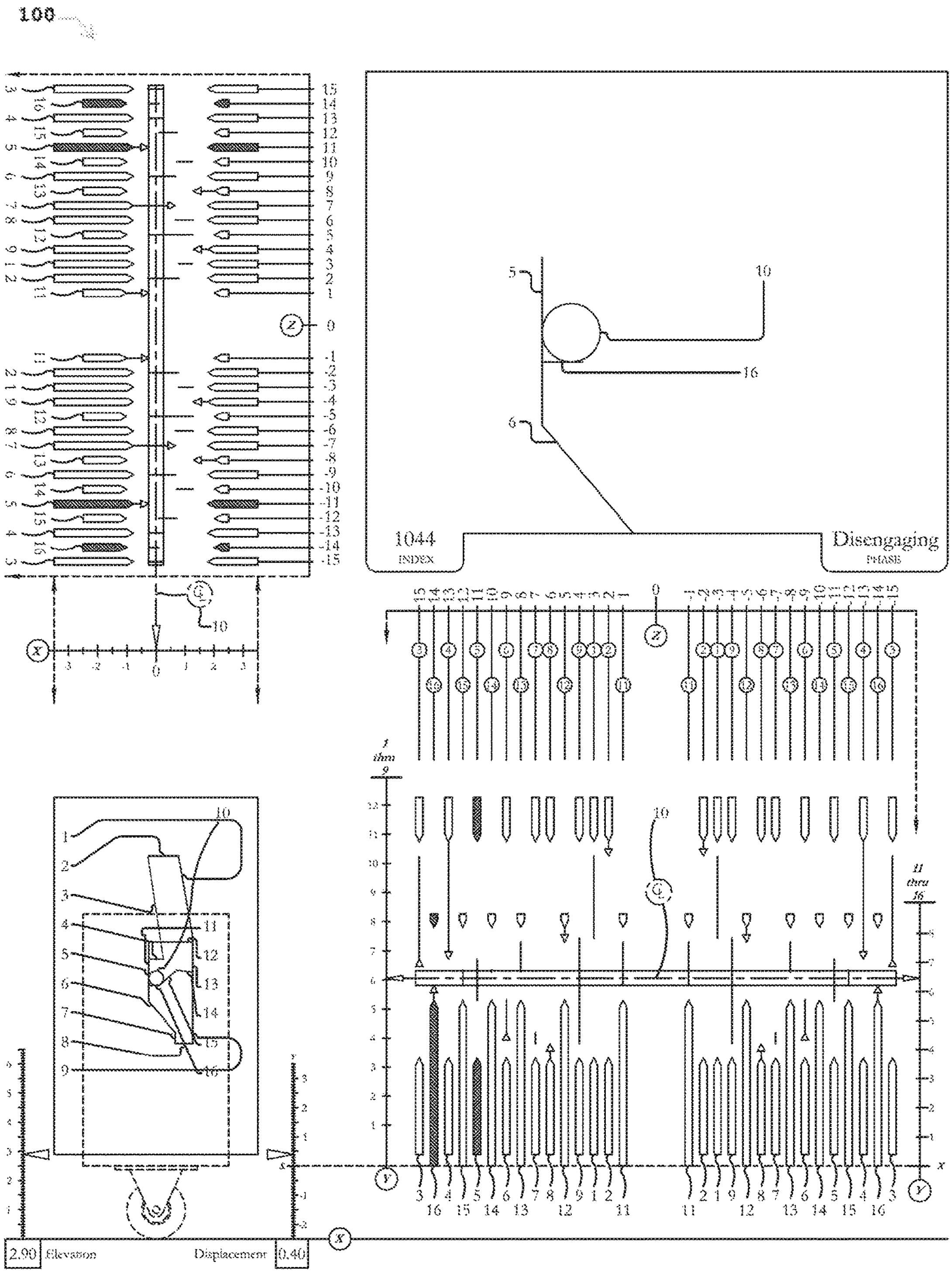
Figure 47:
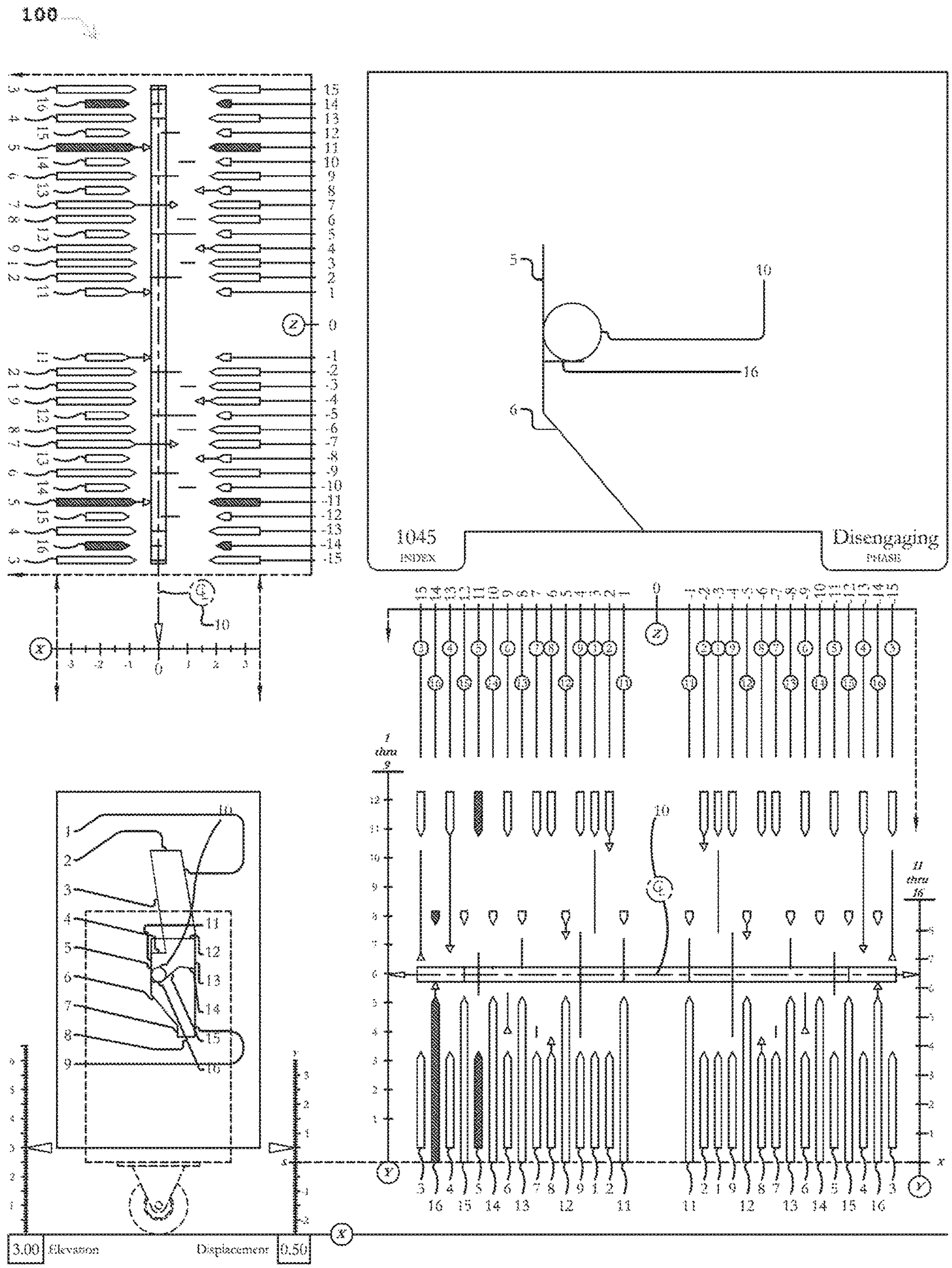
Figure 48:
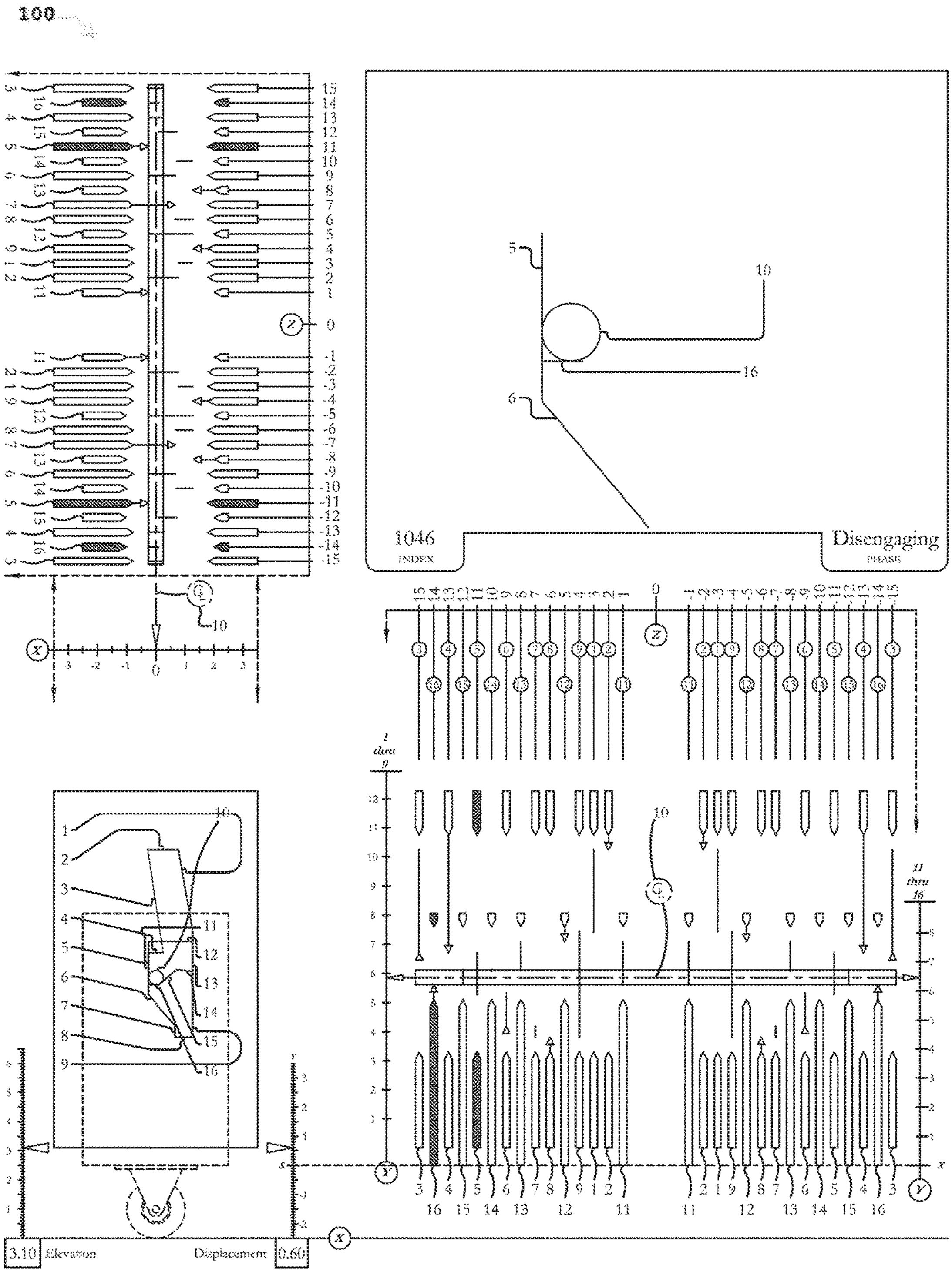
Figure 49:
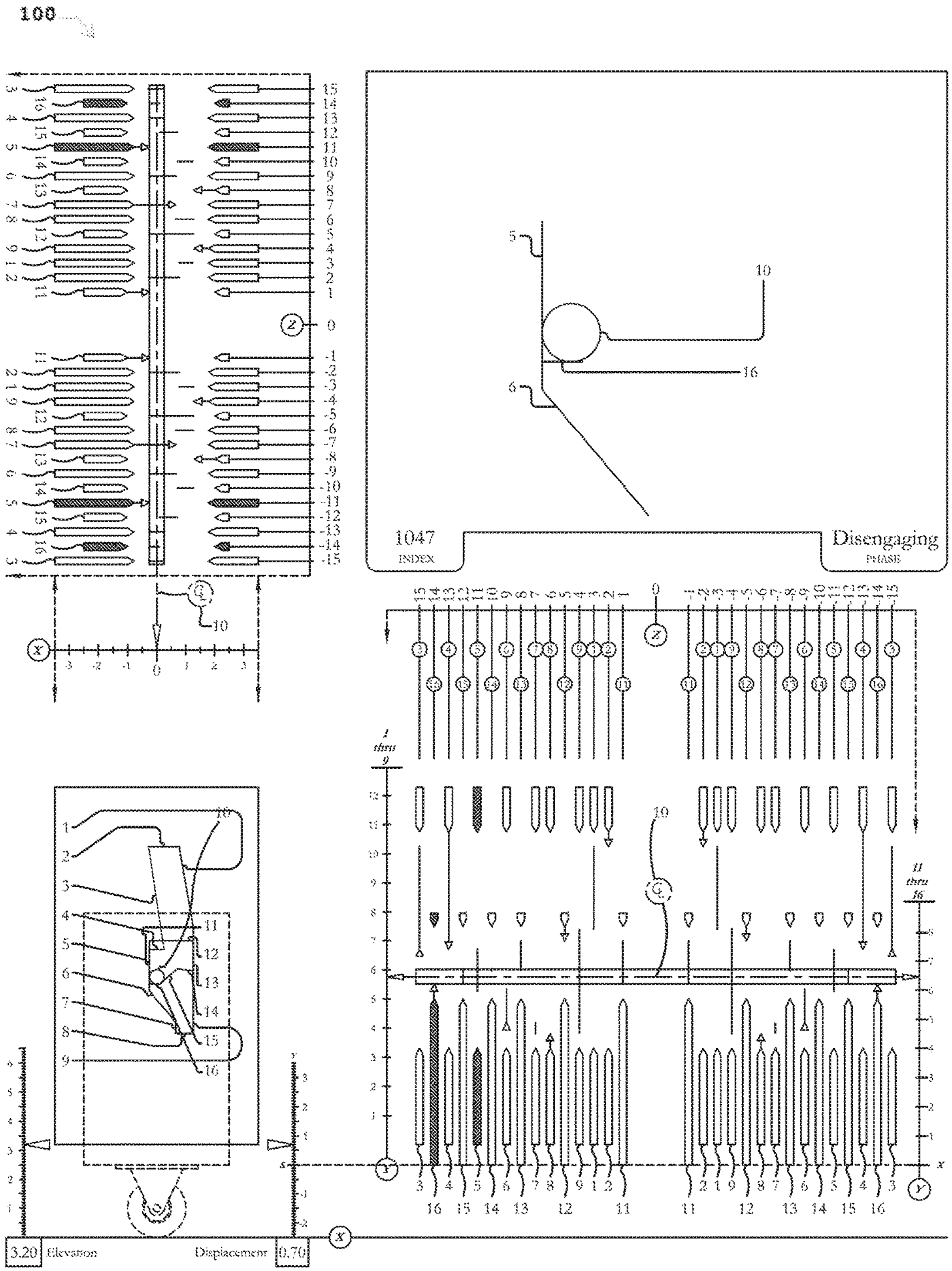
Figure 50:
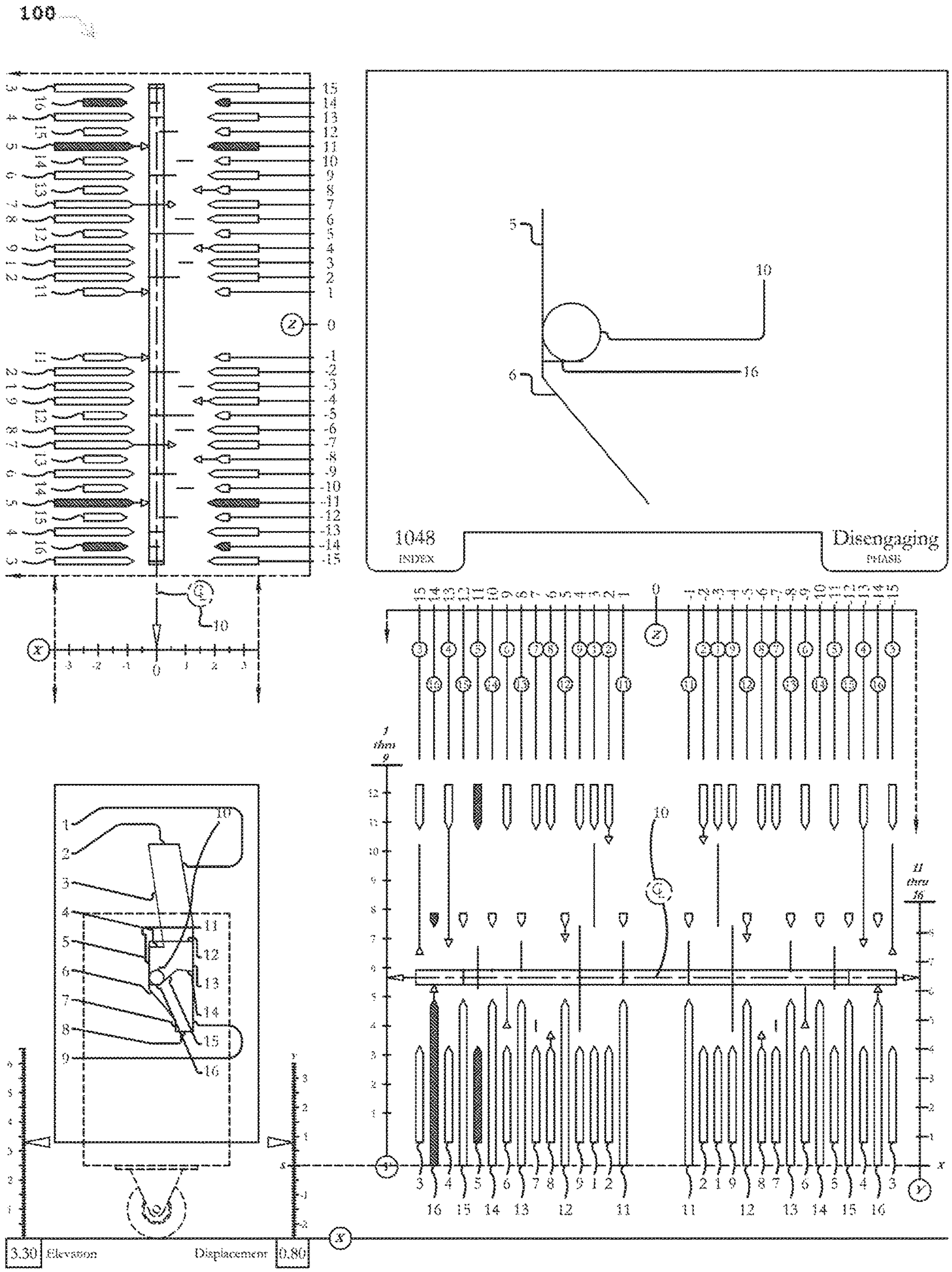
Figure 51:
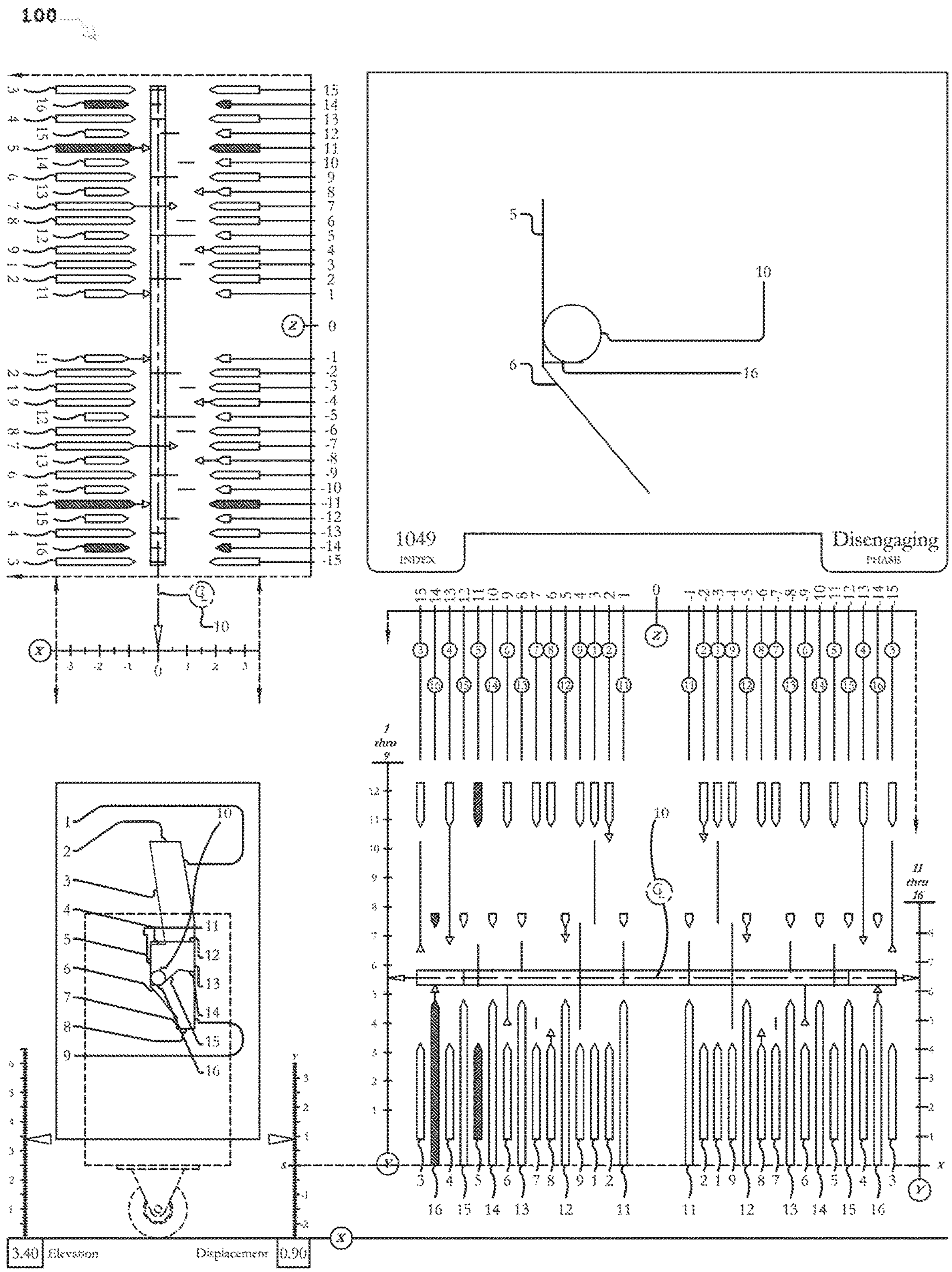
Figure 52:
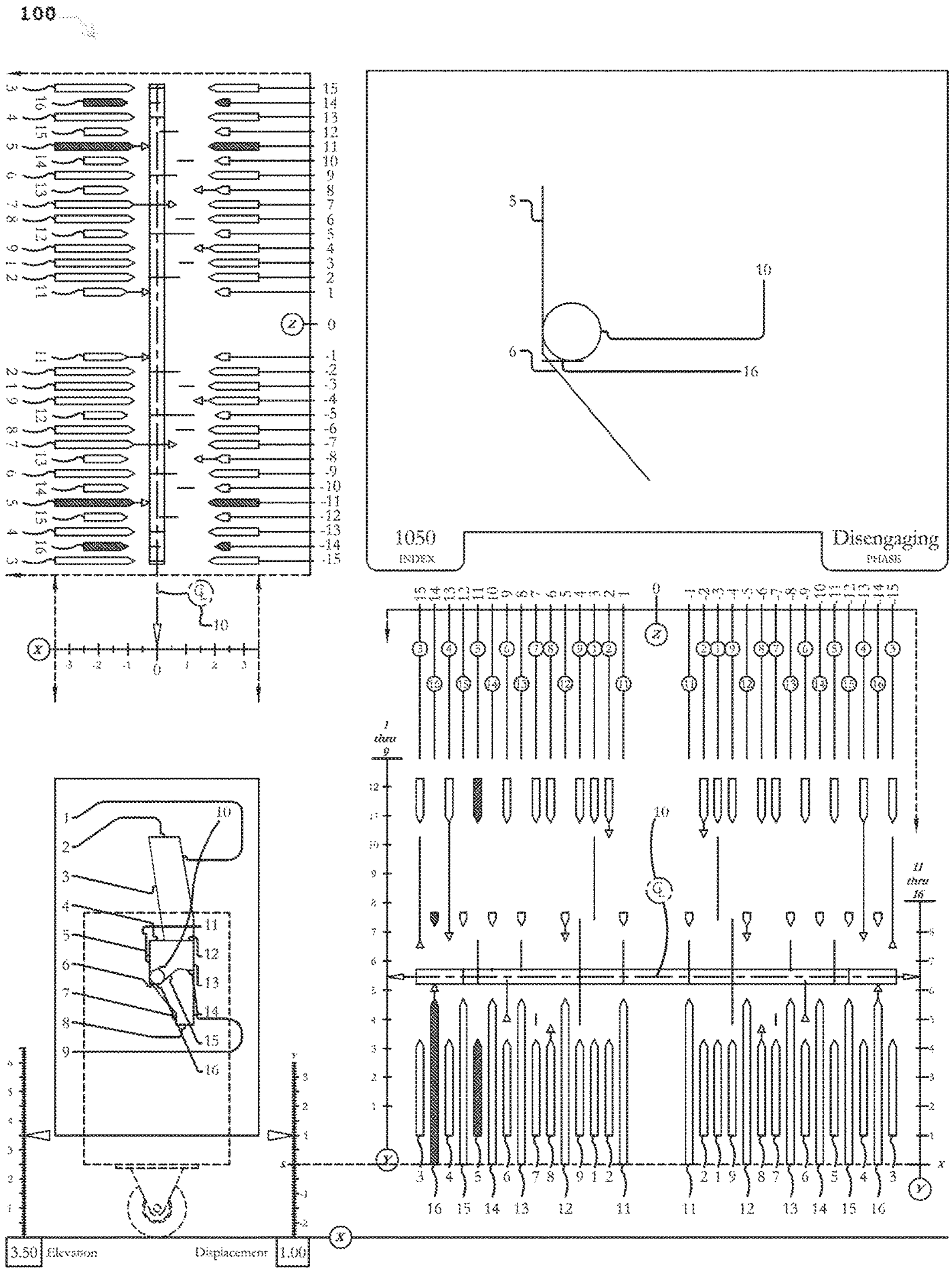
Figure 53:
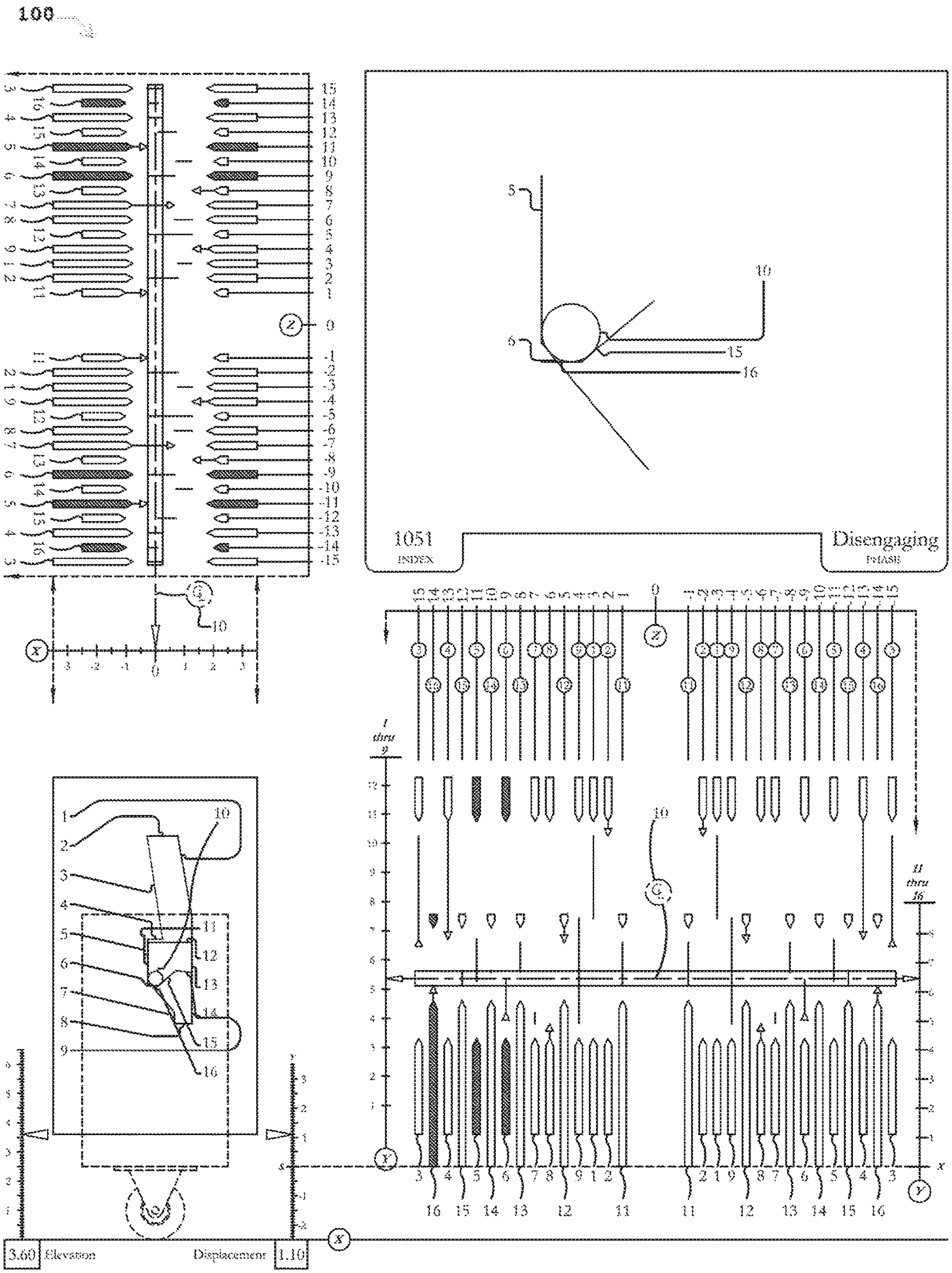
Figure 54:
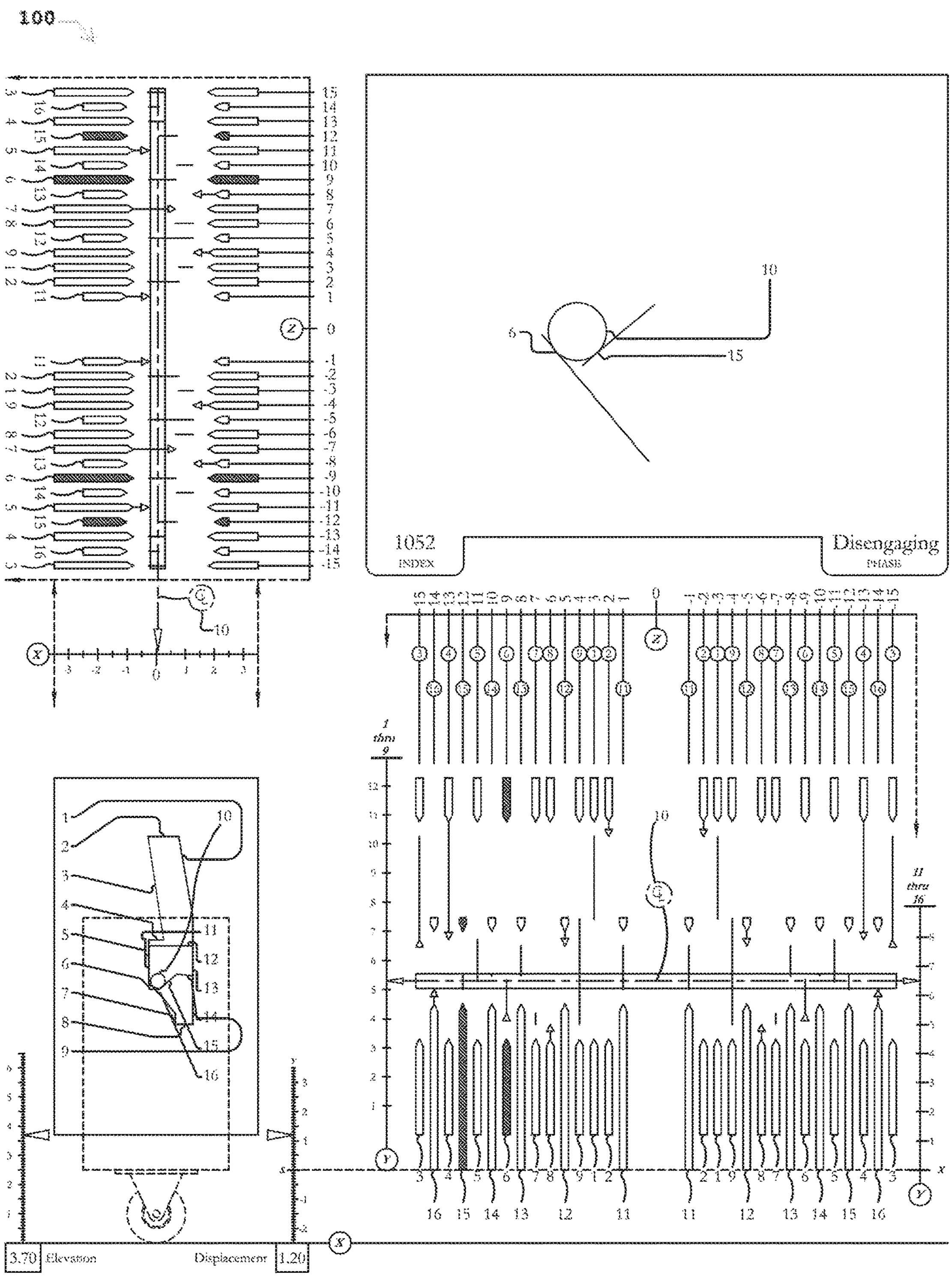
Figure 55:
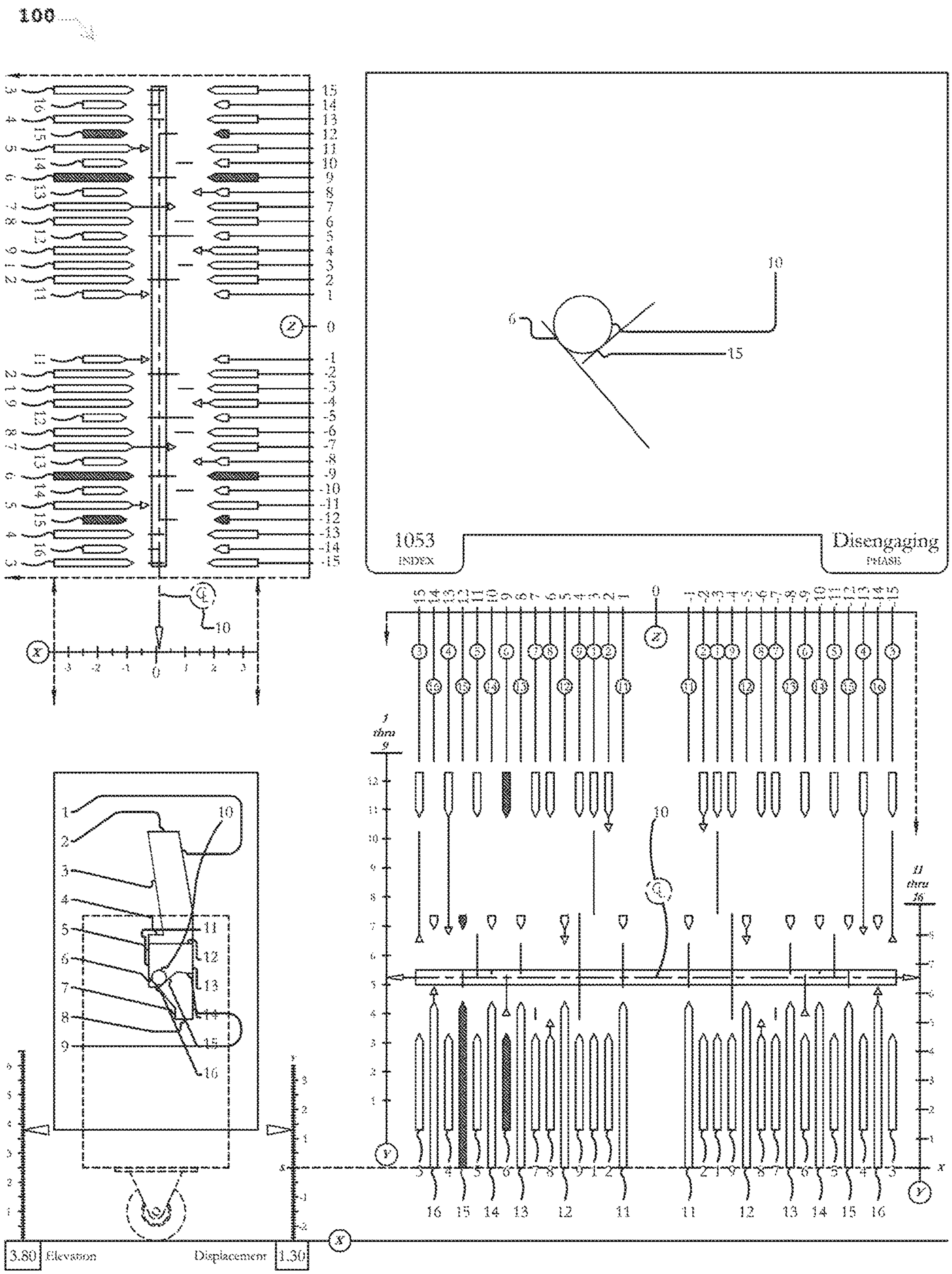
Figure 56:
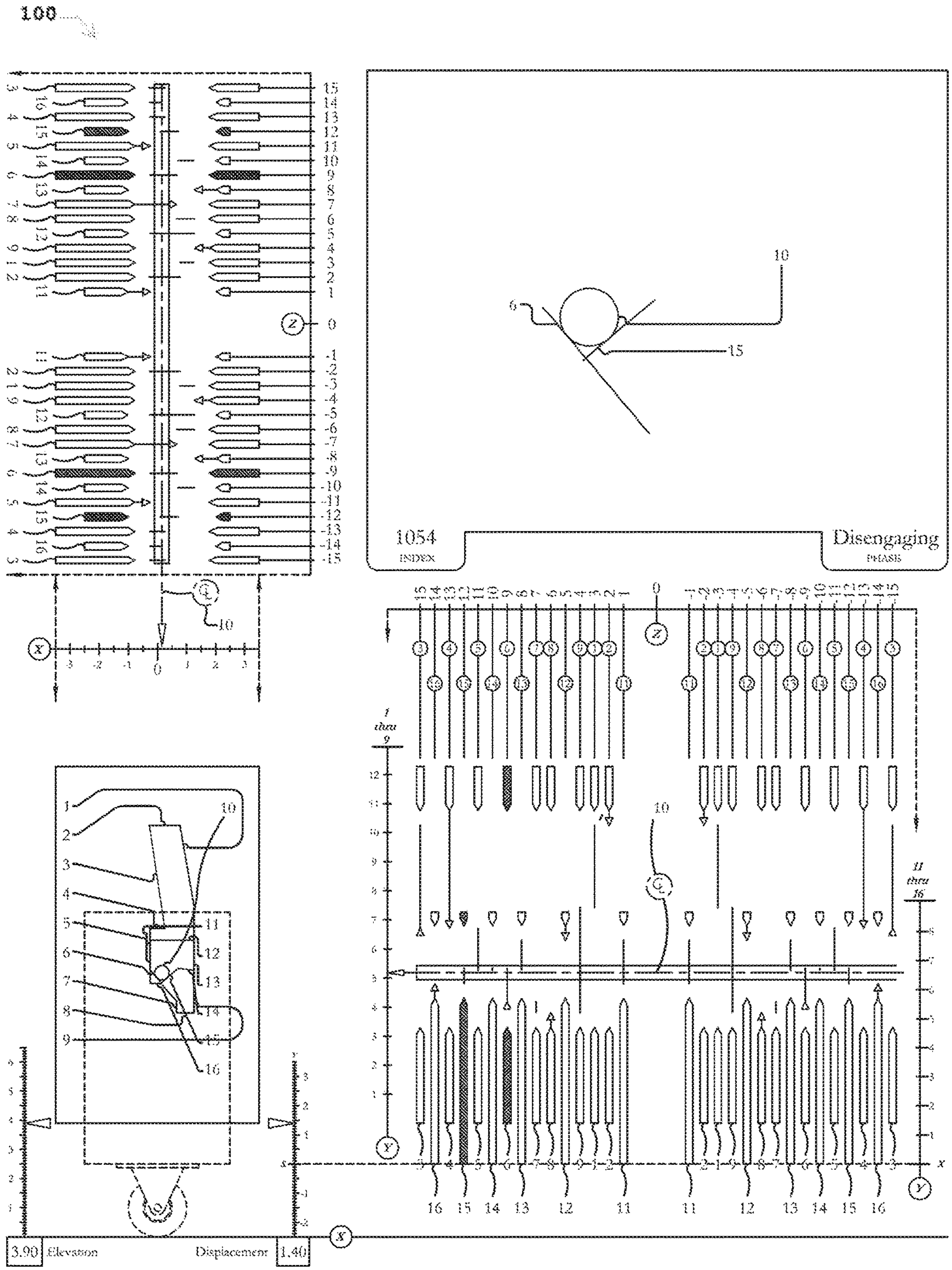
Figure 57:
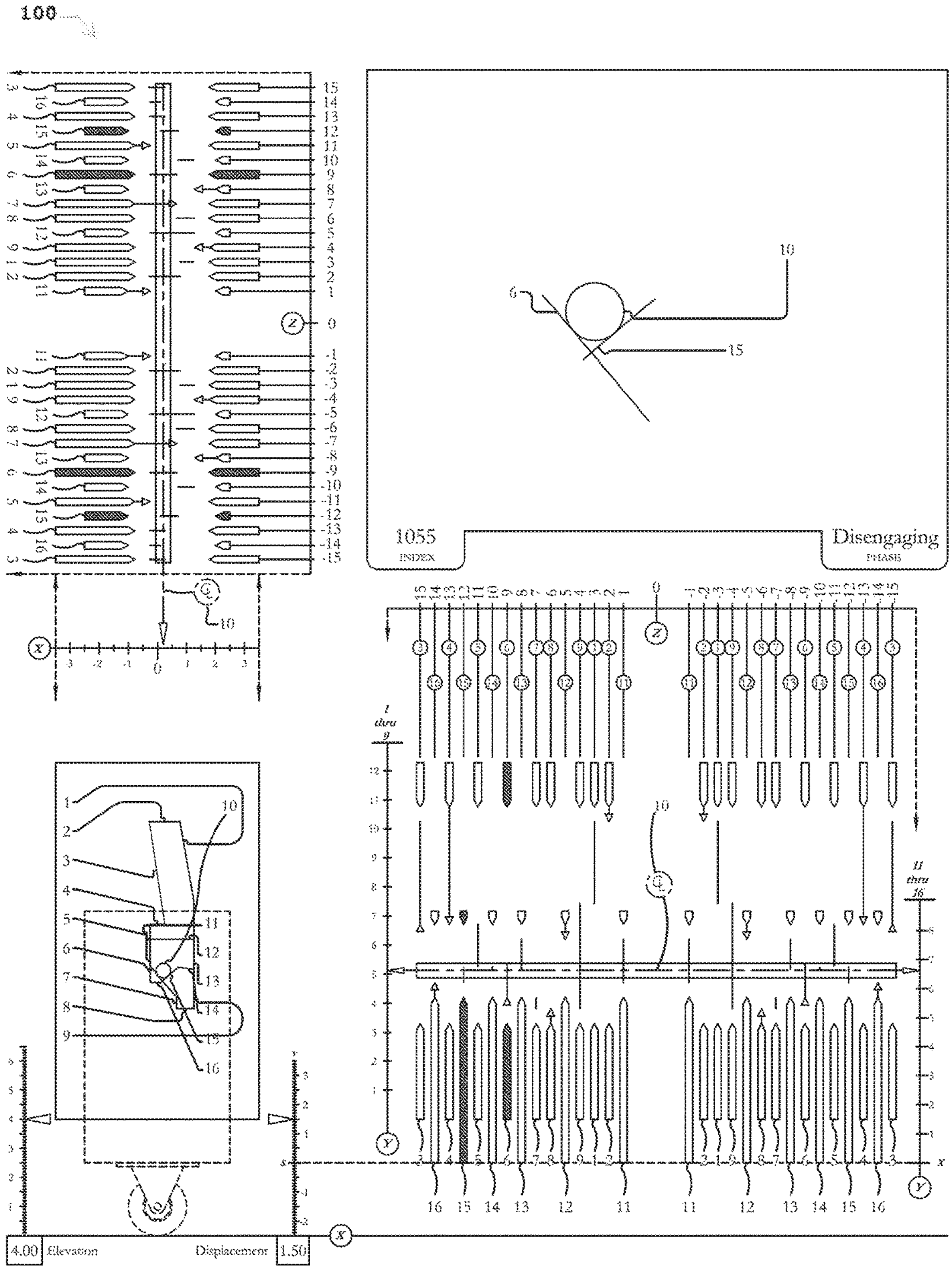
Figure 58:
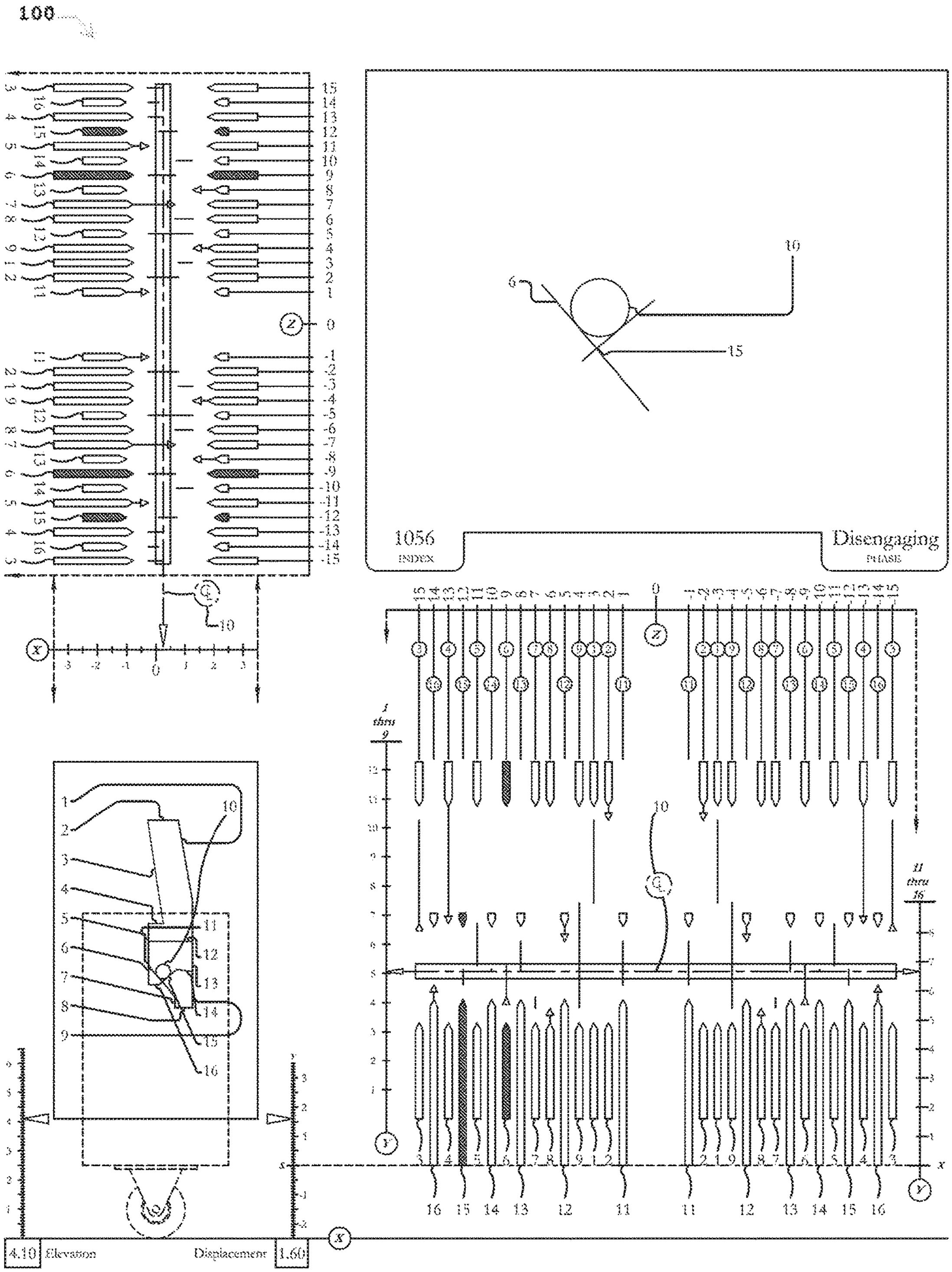
Figure 59:
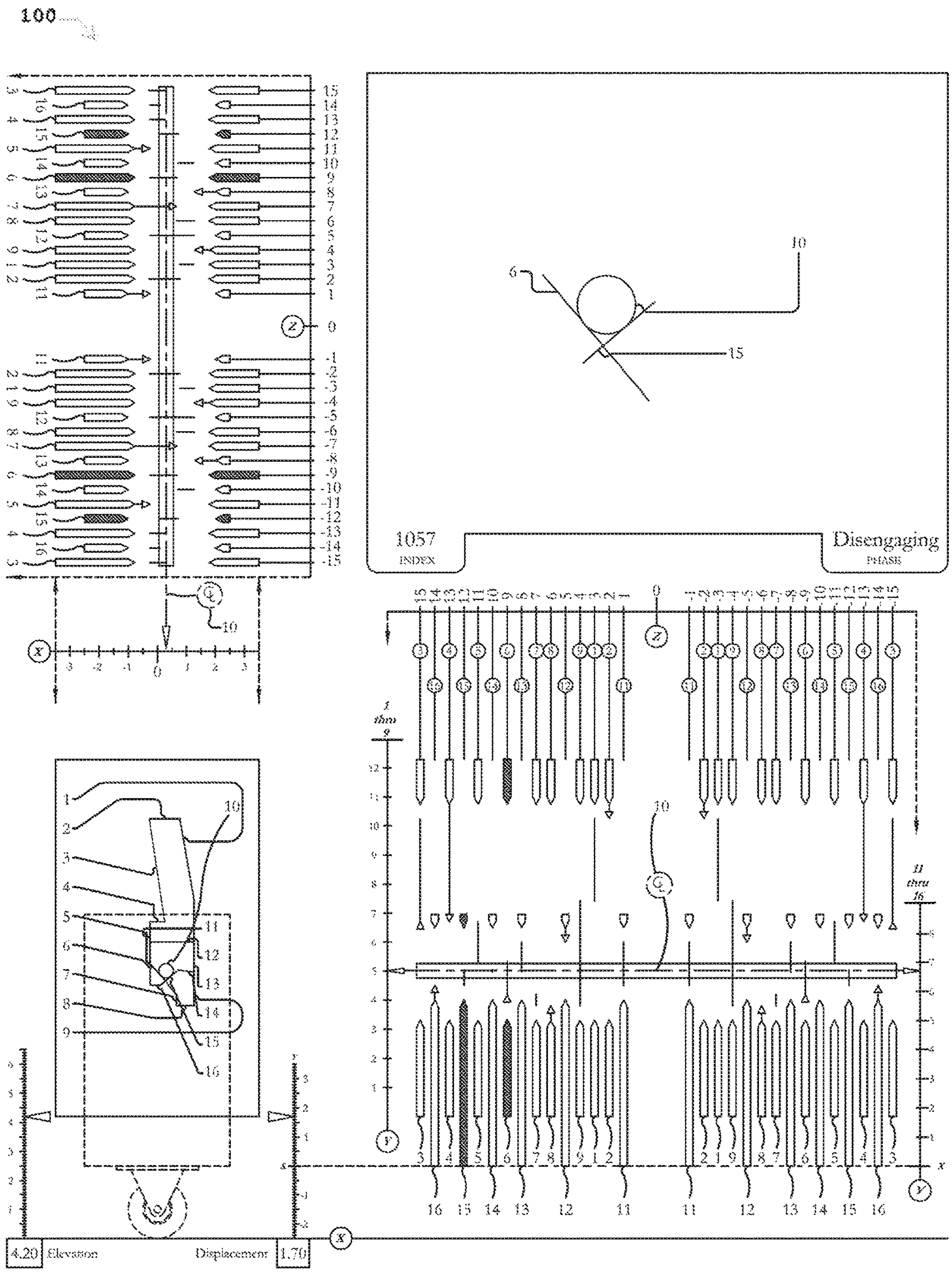
Figure 60:
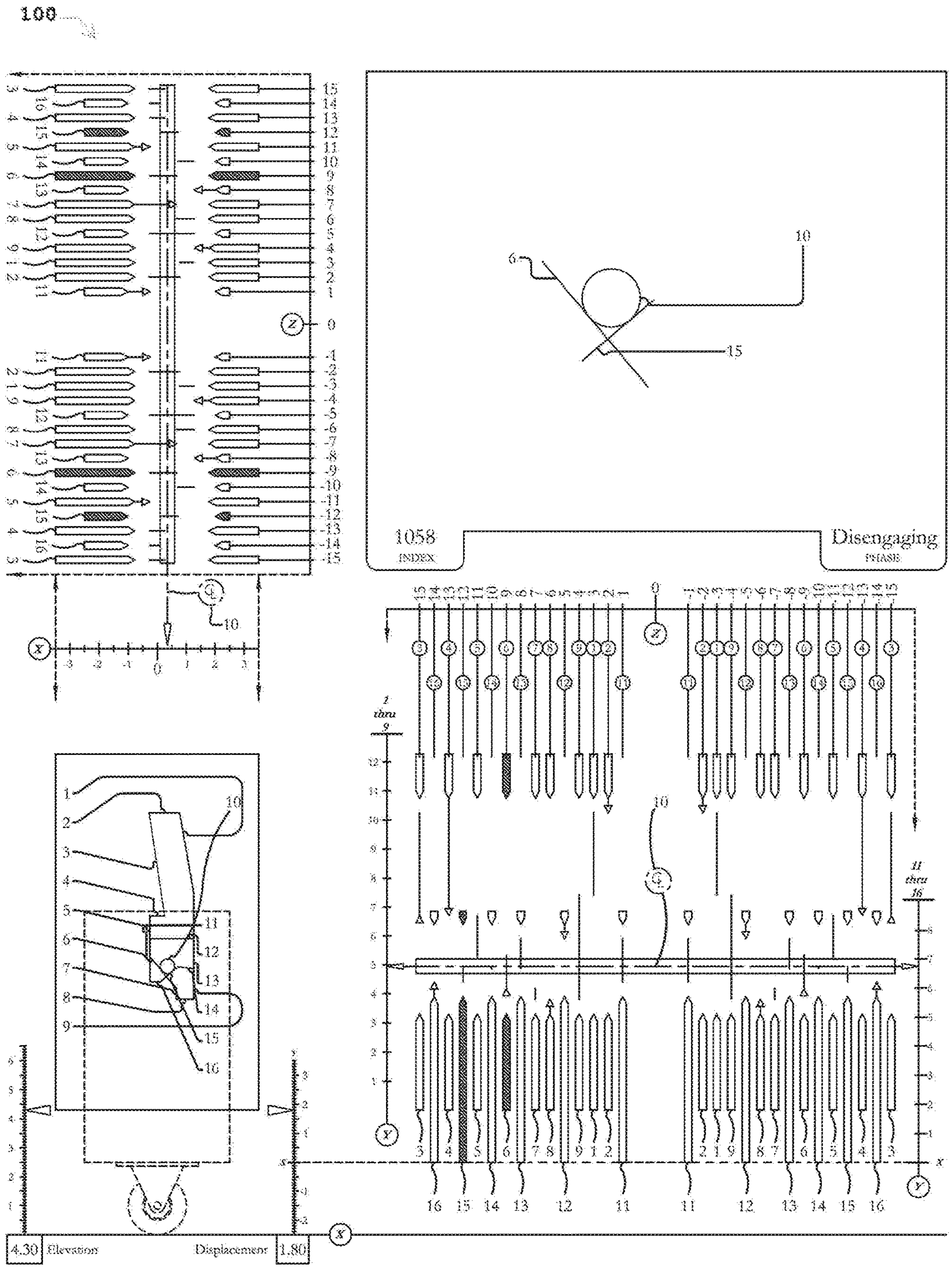
Figure 61:
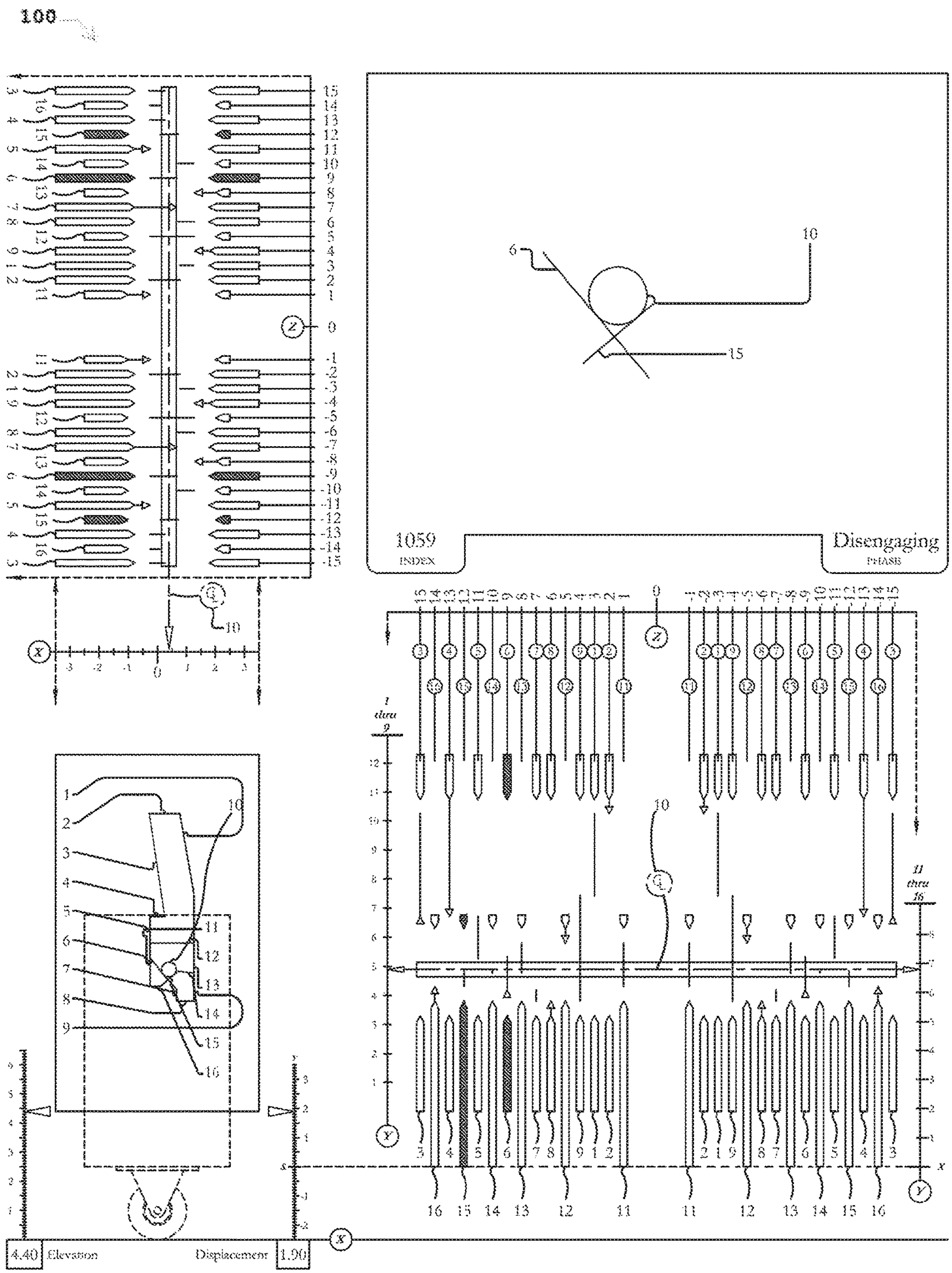
Figure 62:
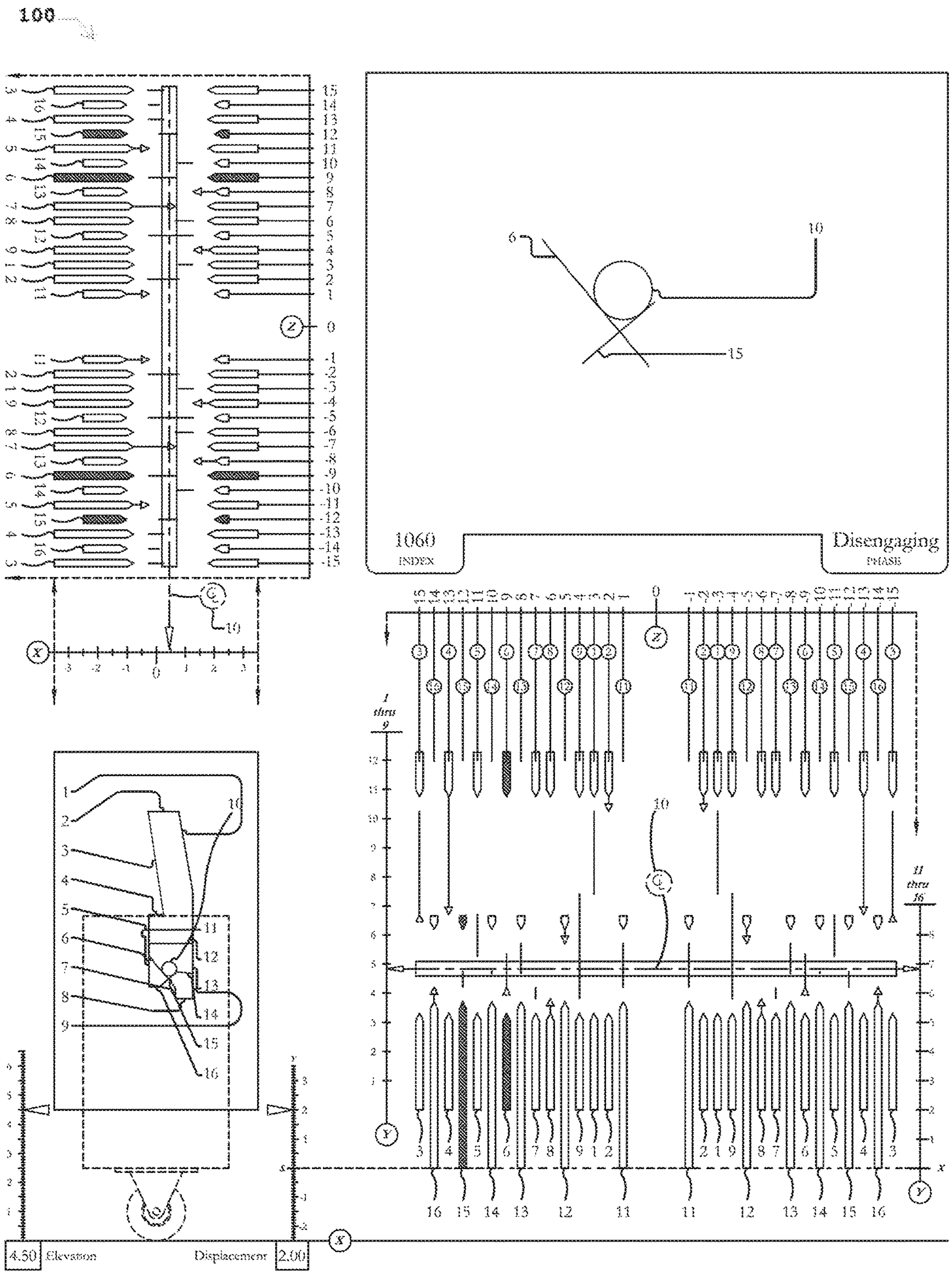
Figure 63:
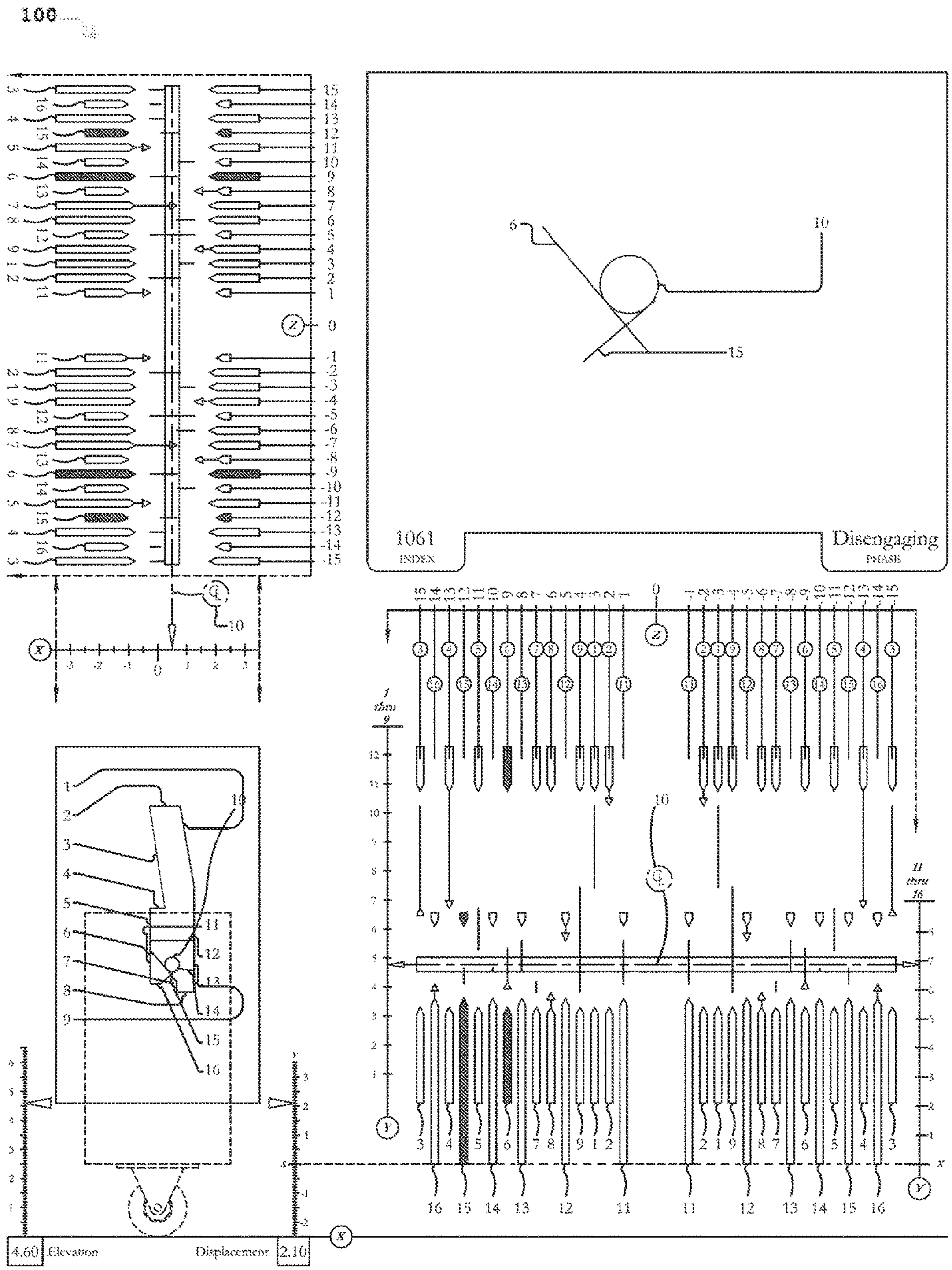
Figure 64:
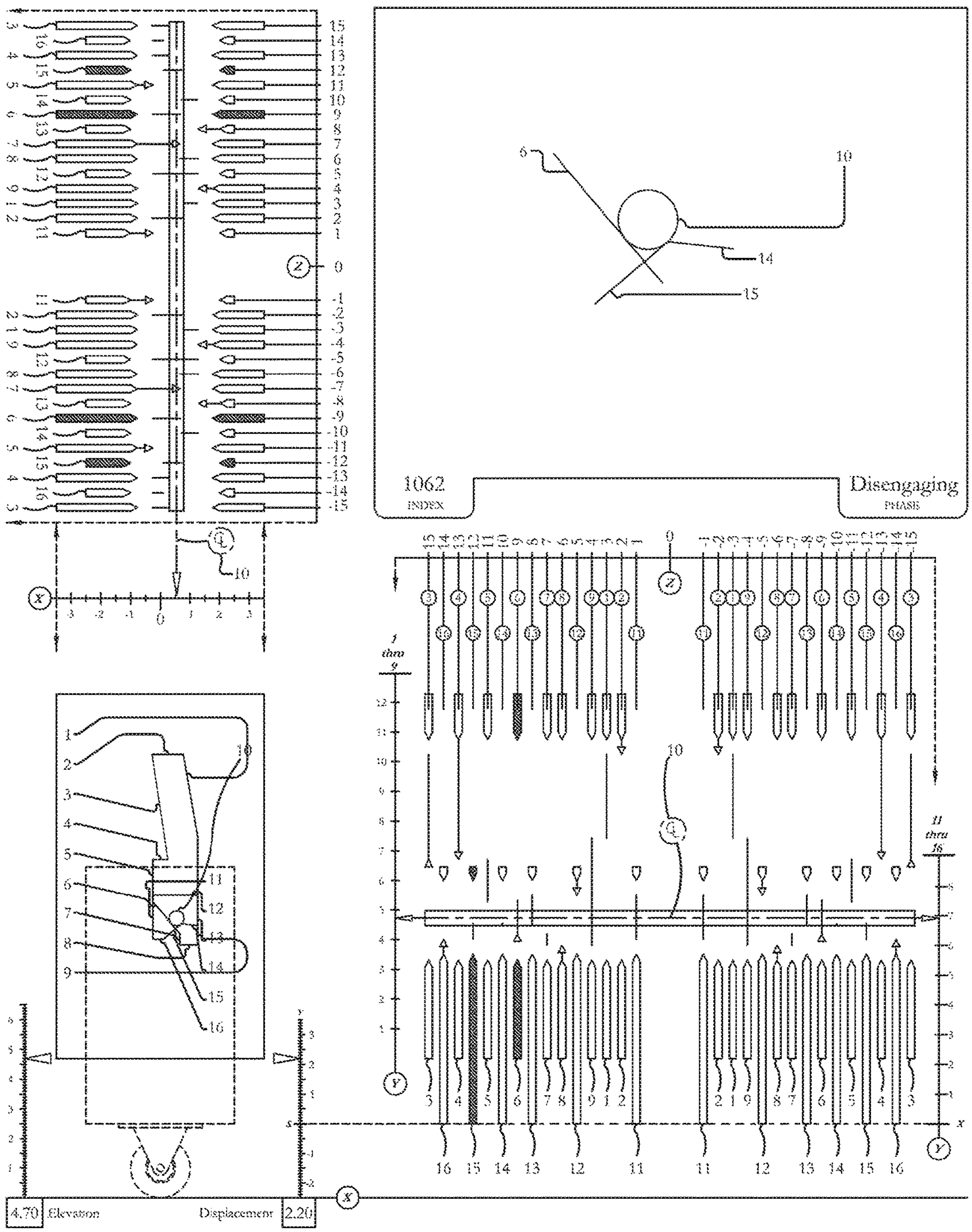
Figure 65:
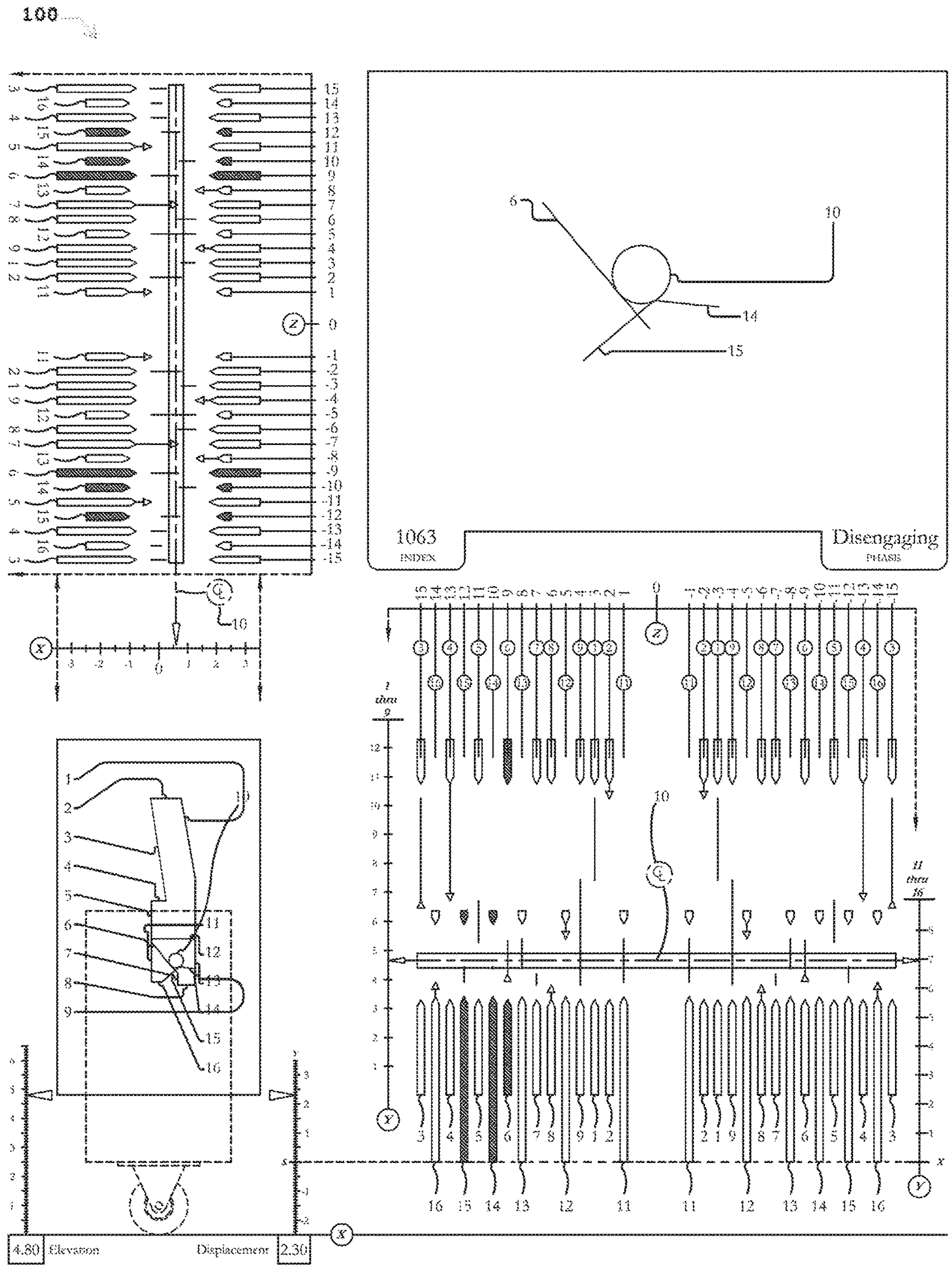
Figure 66:
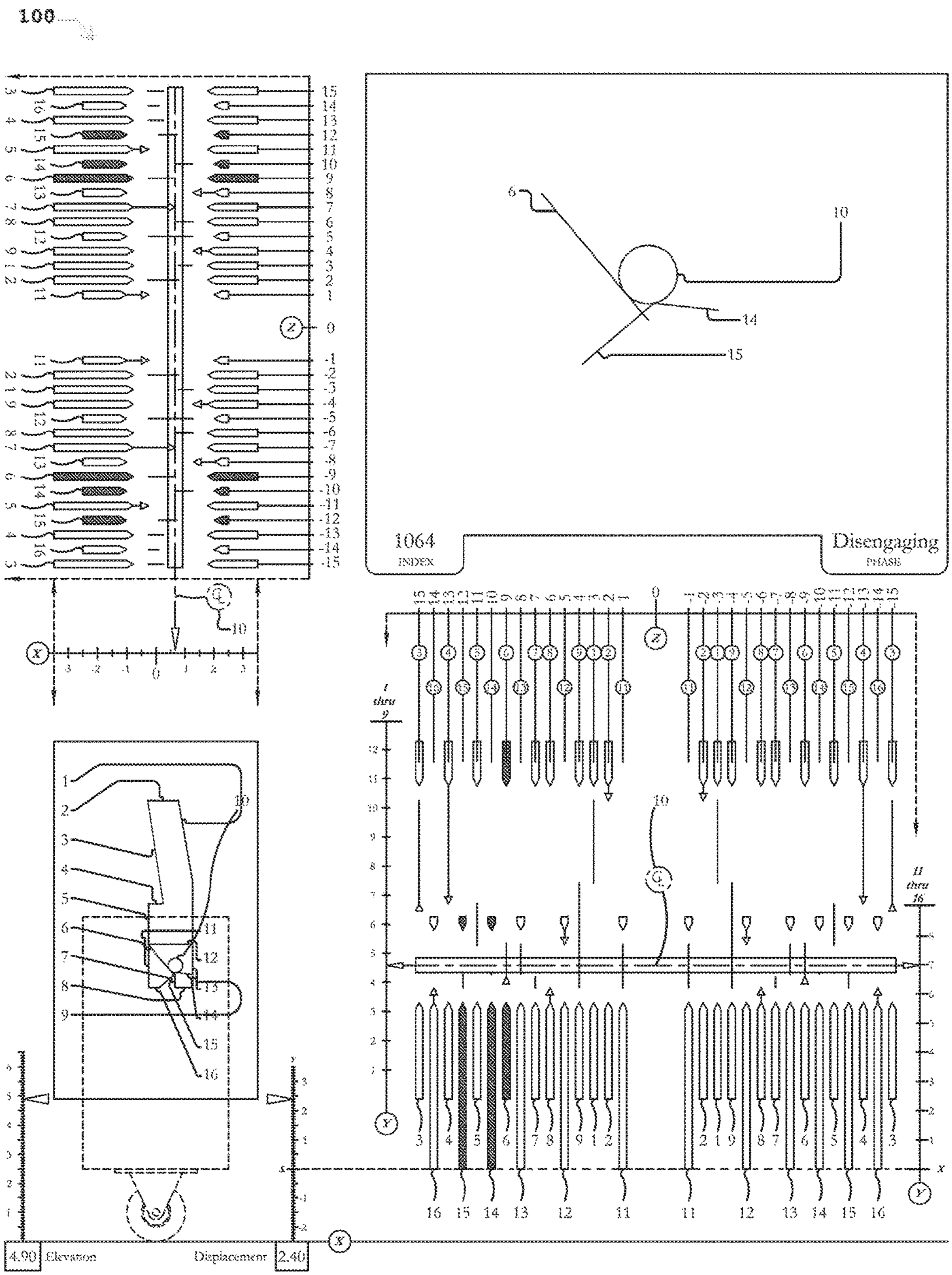
Figure 67:
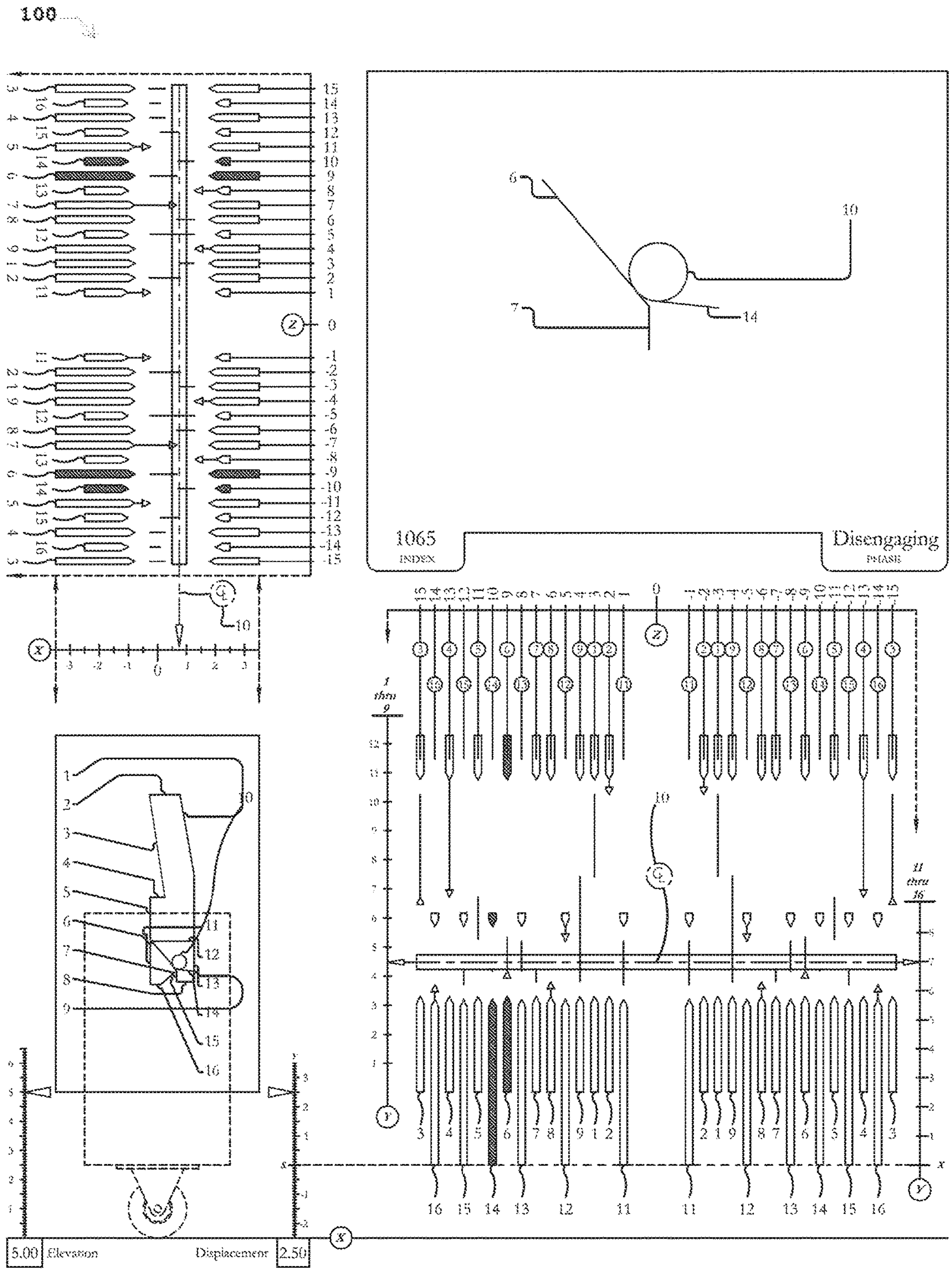
Figure 68:
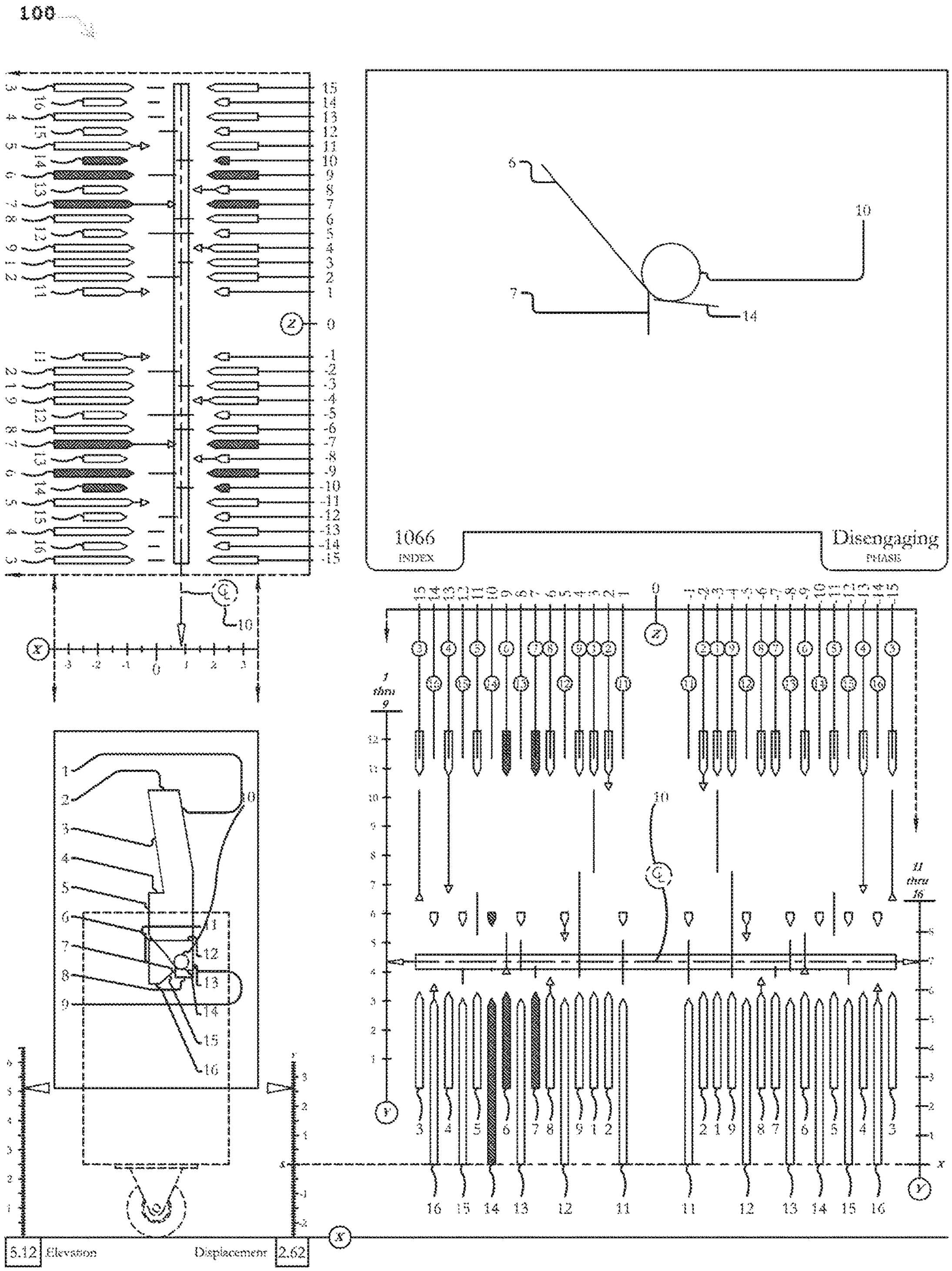
Figure 69:
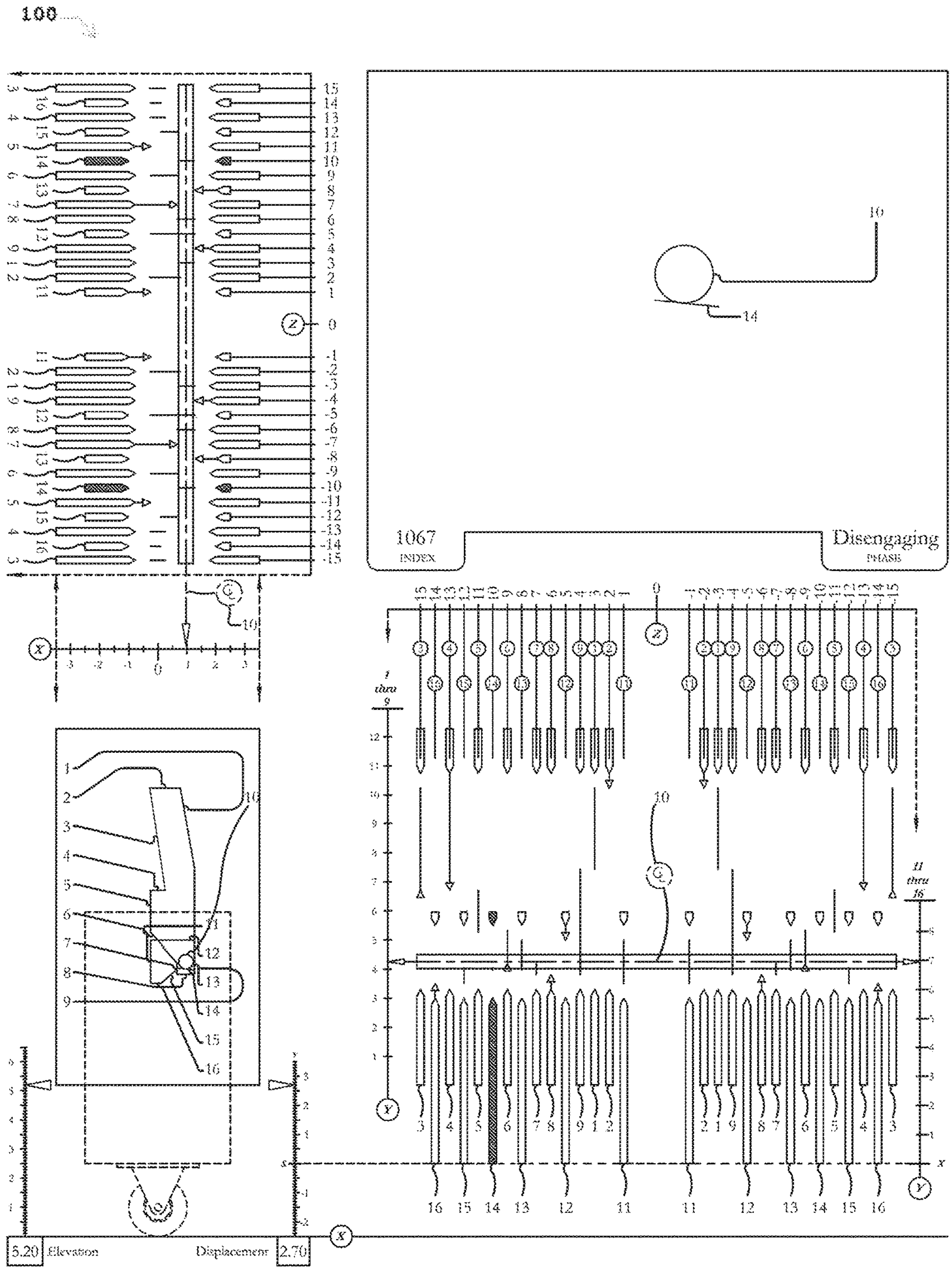
Figure 70:
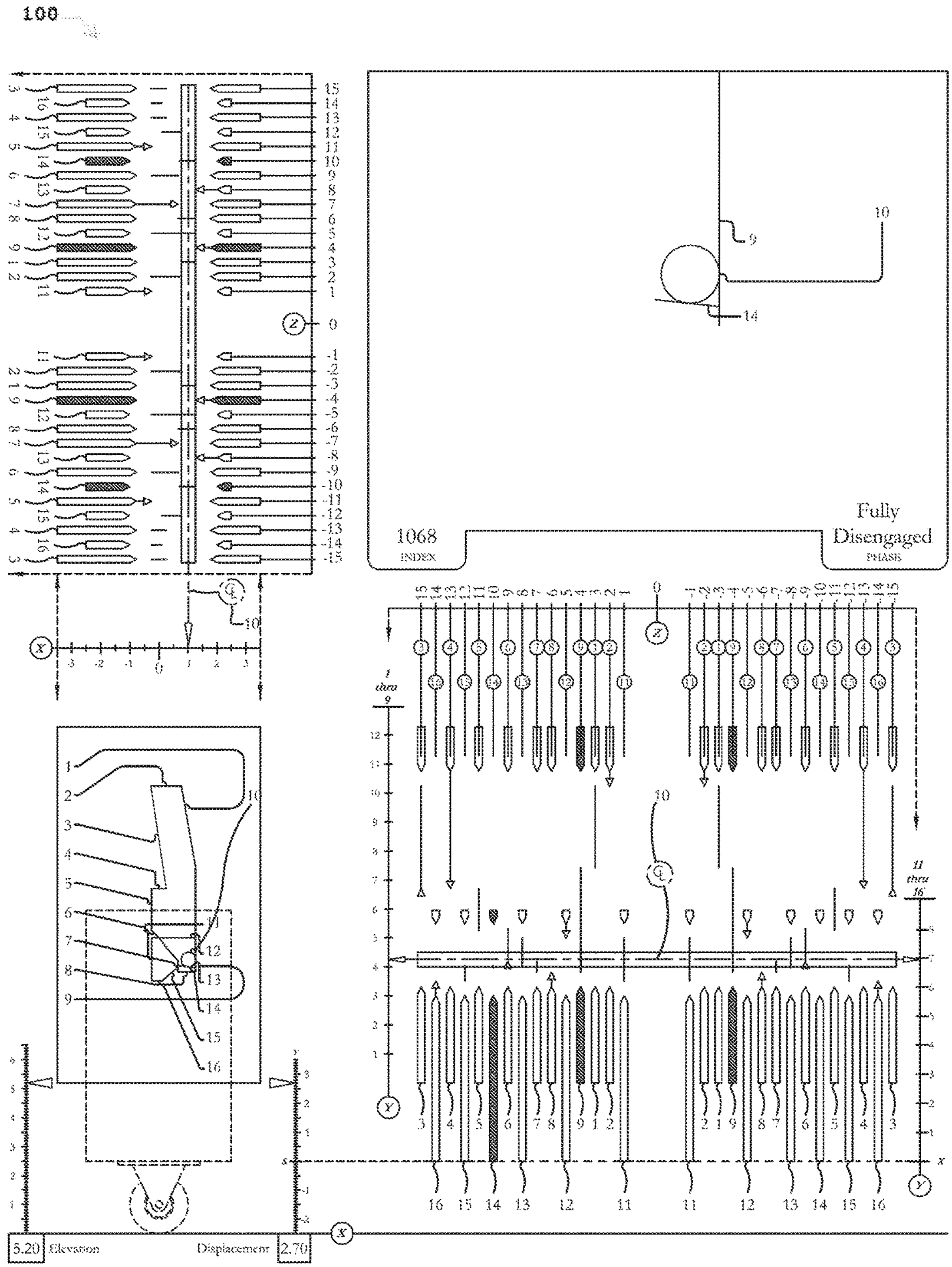
Figure 71:
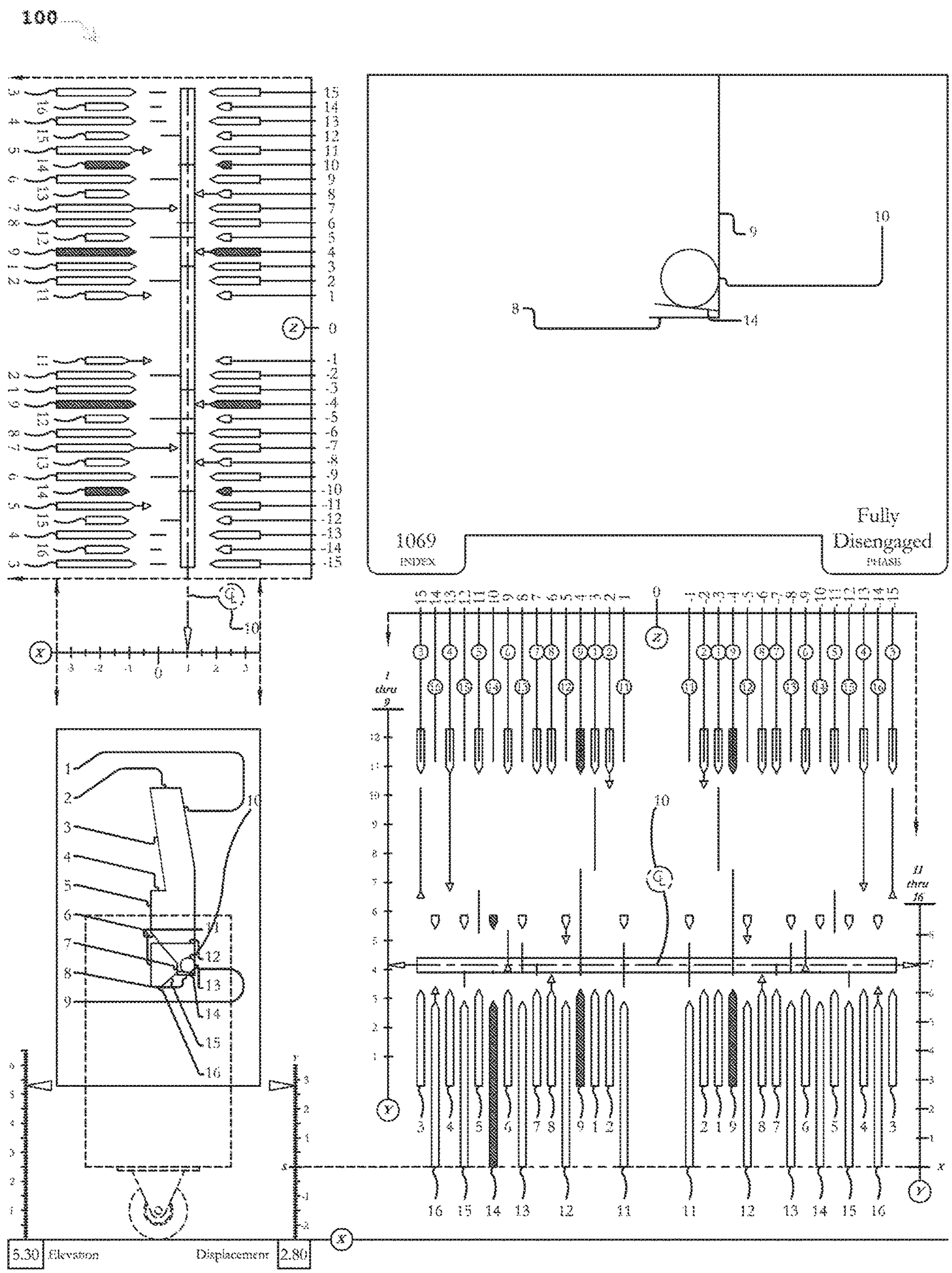
Figure 72:
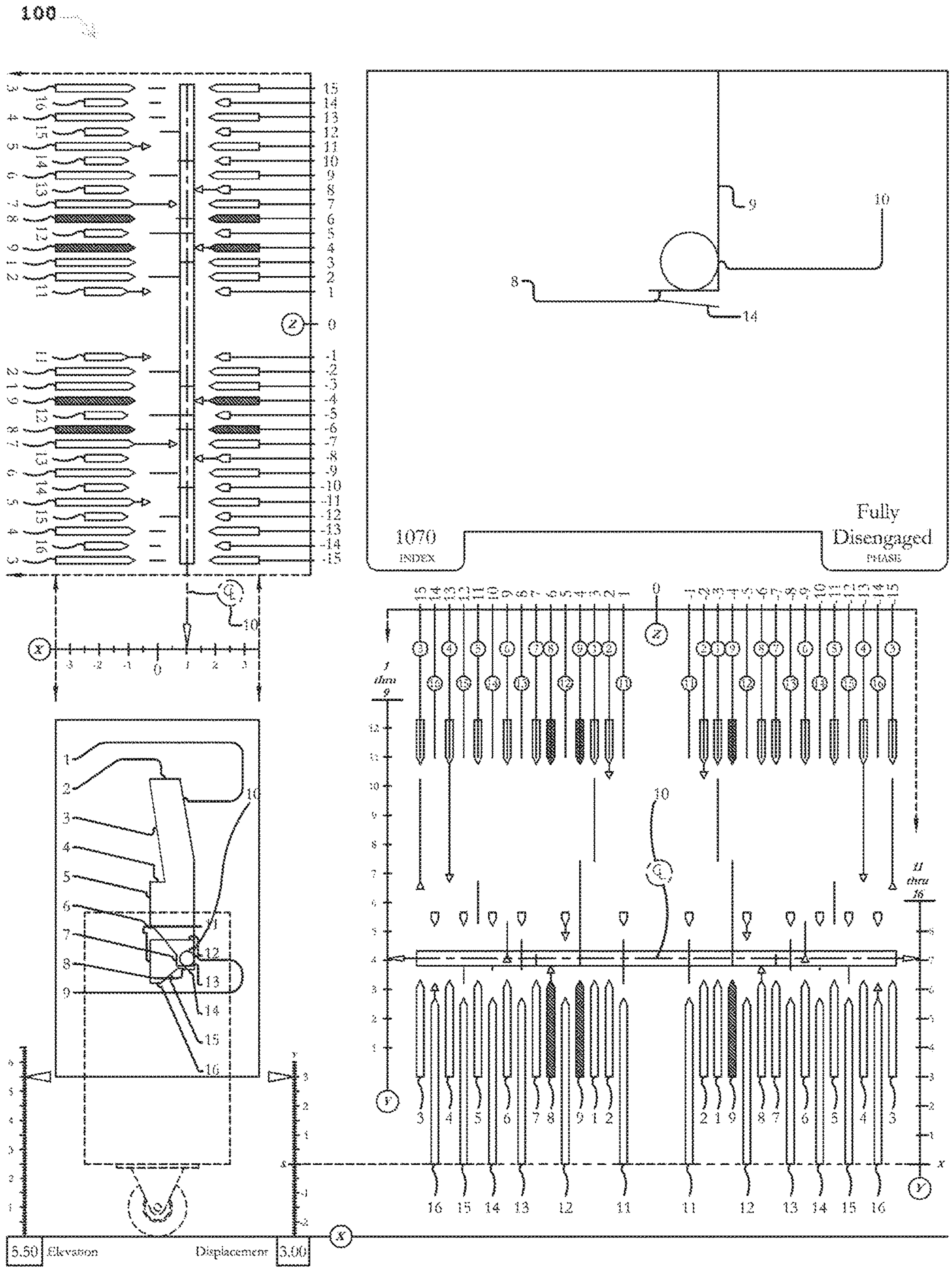
Figure 73:
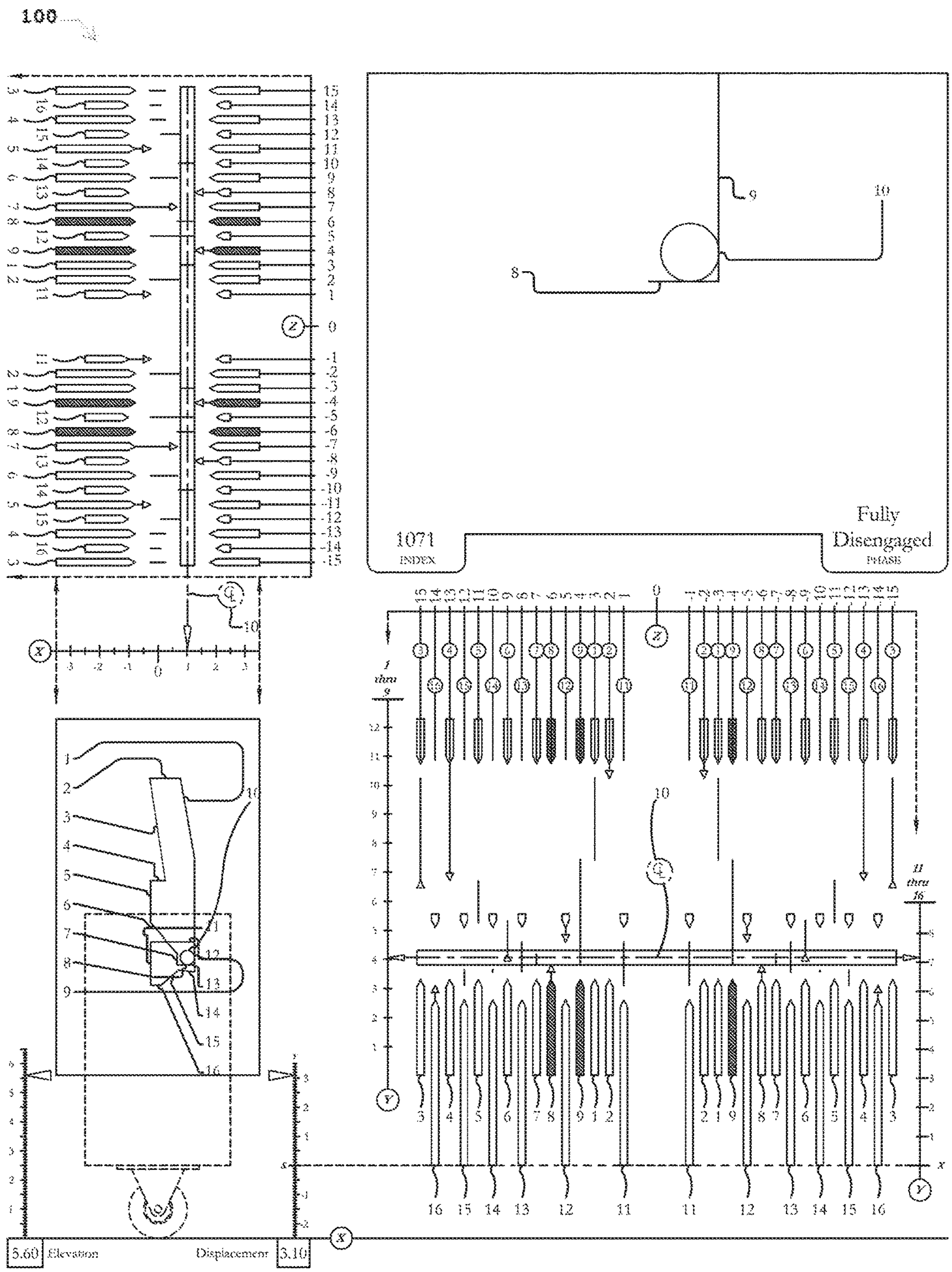
Figure 74:
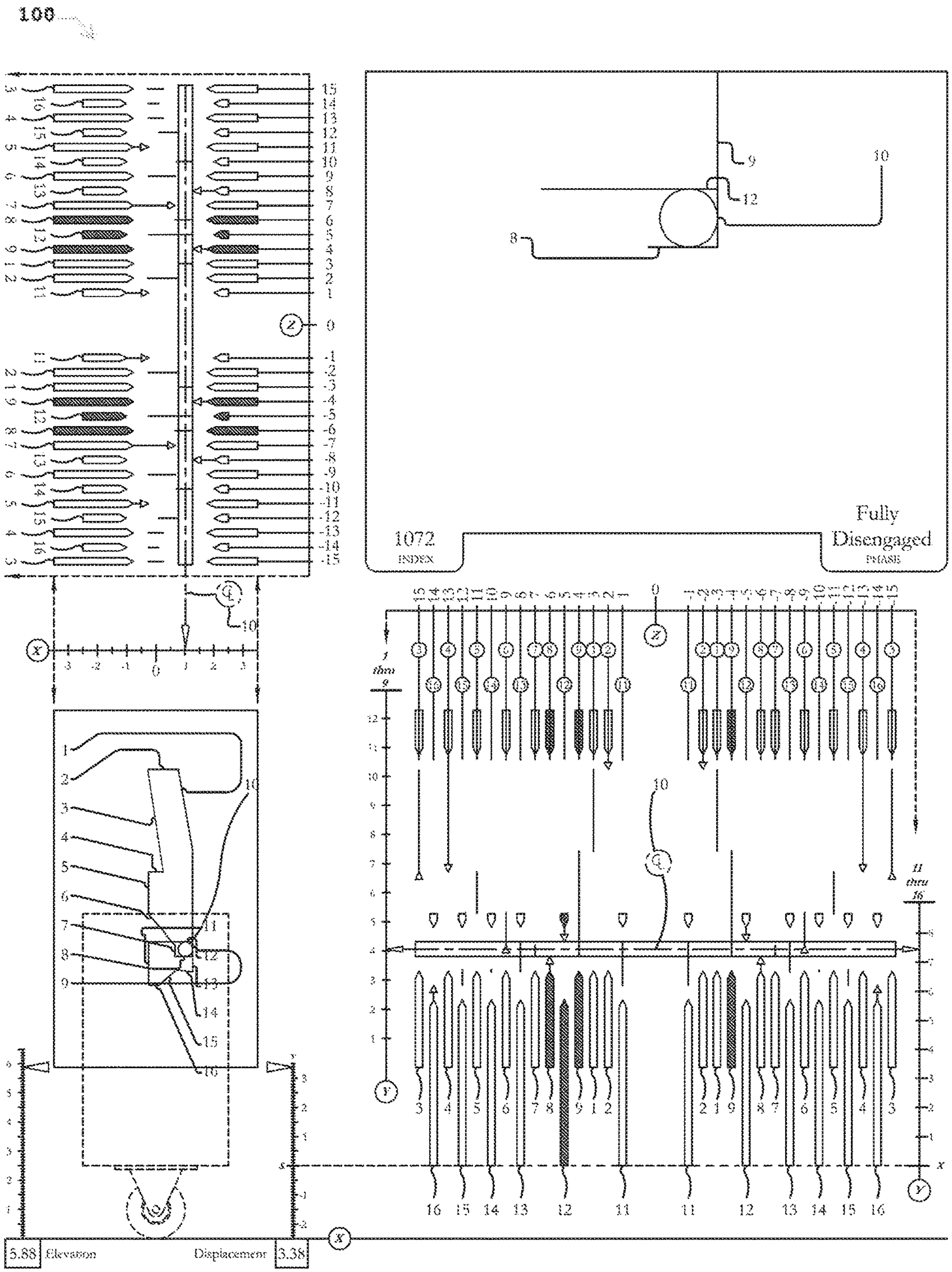
Figure 75:
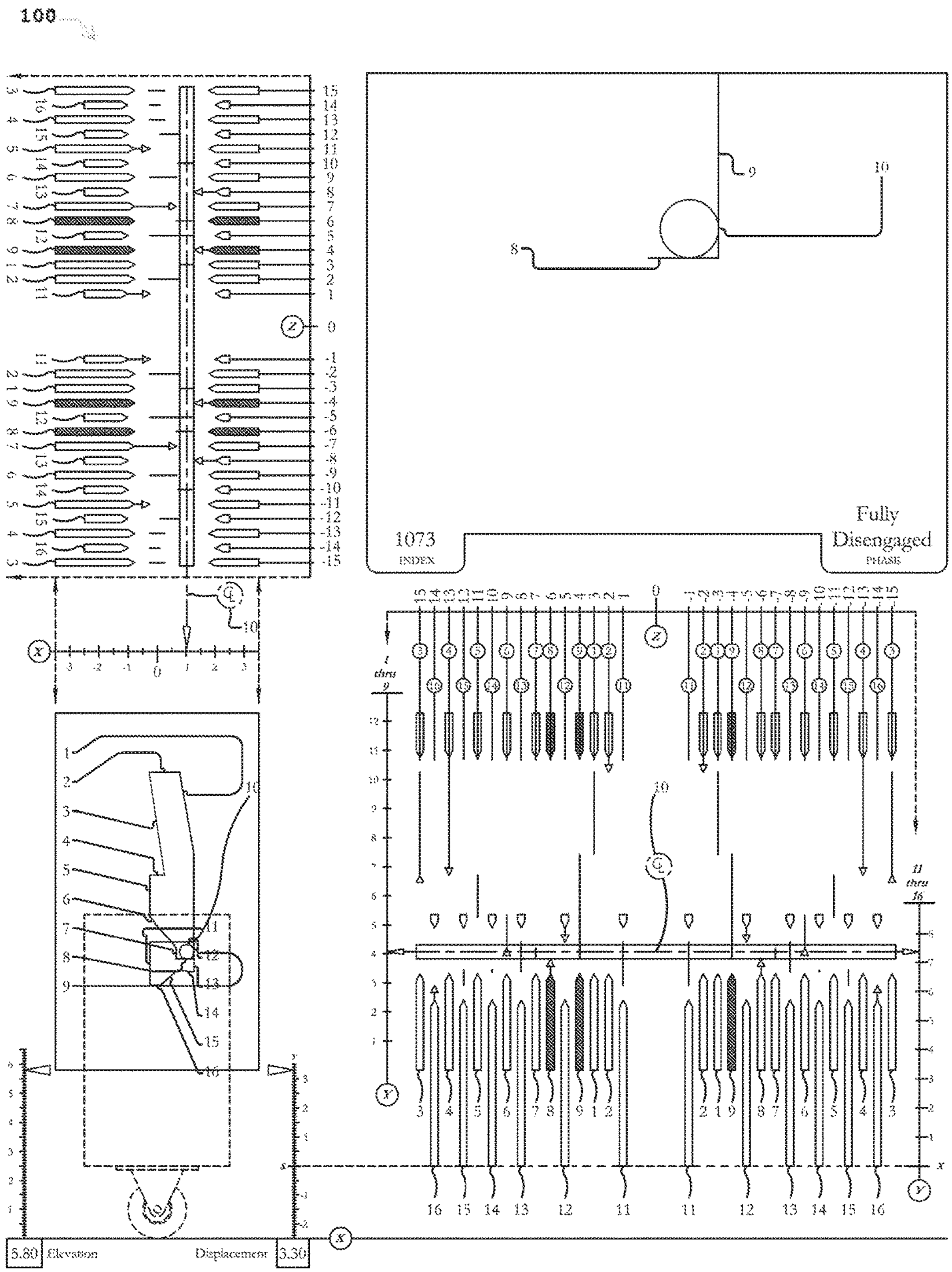
Figure 76:
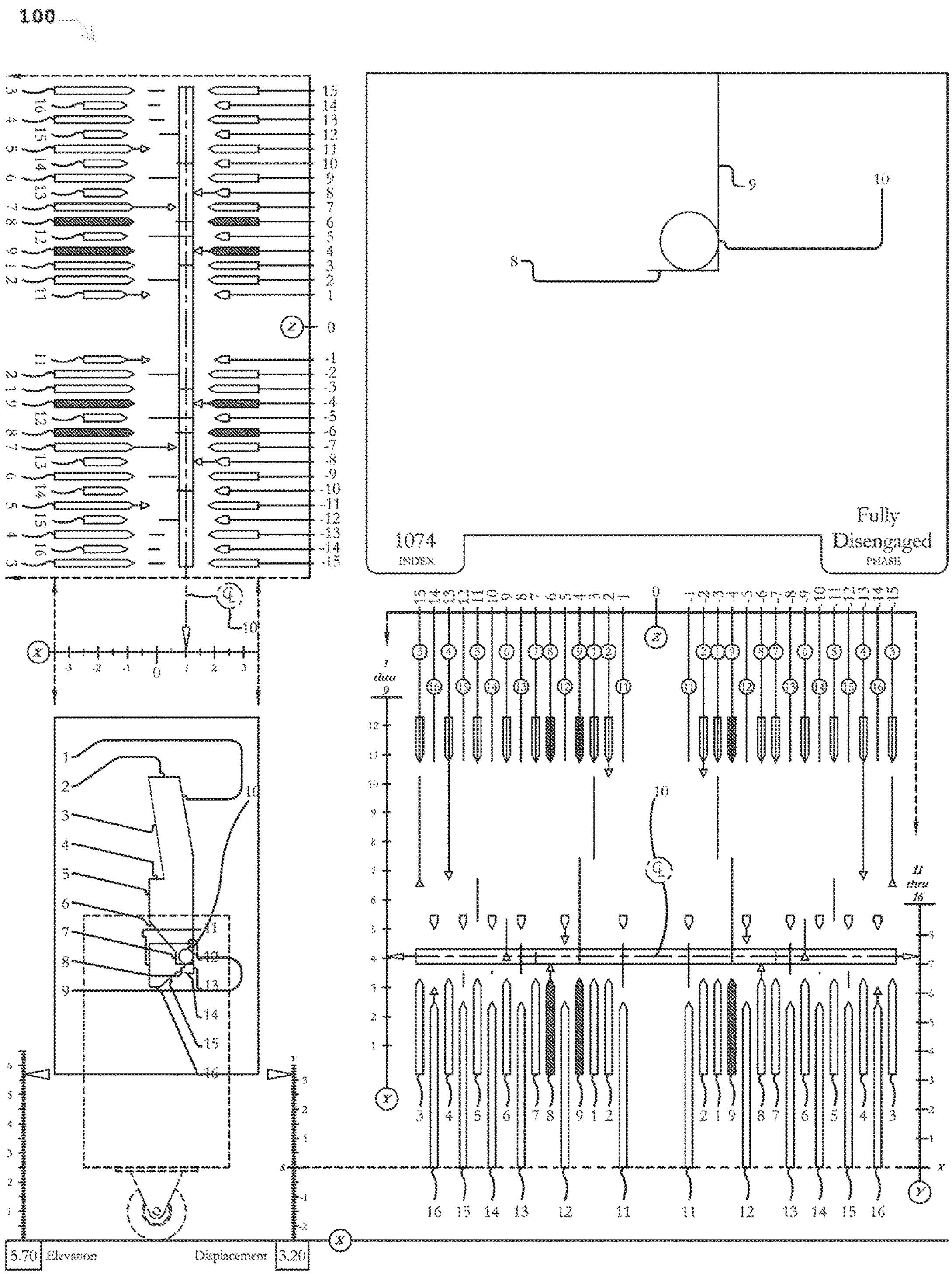
Figure 77:
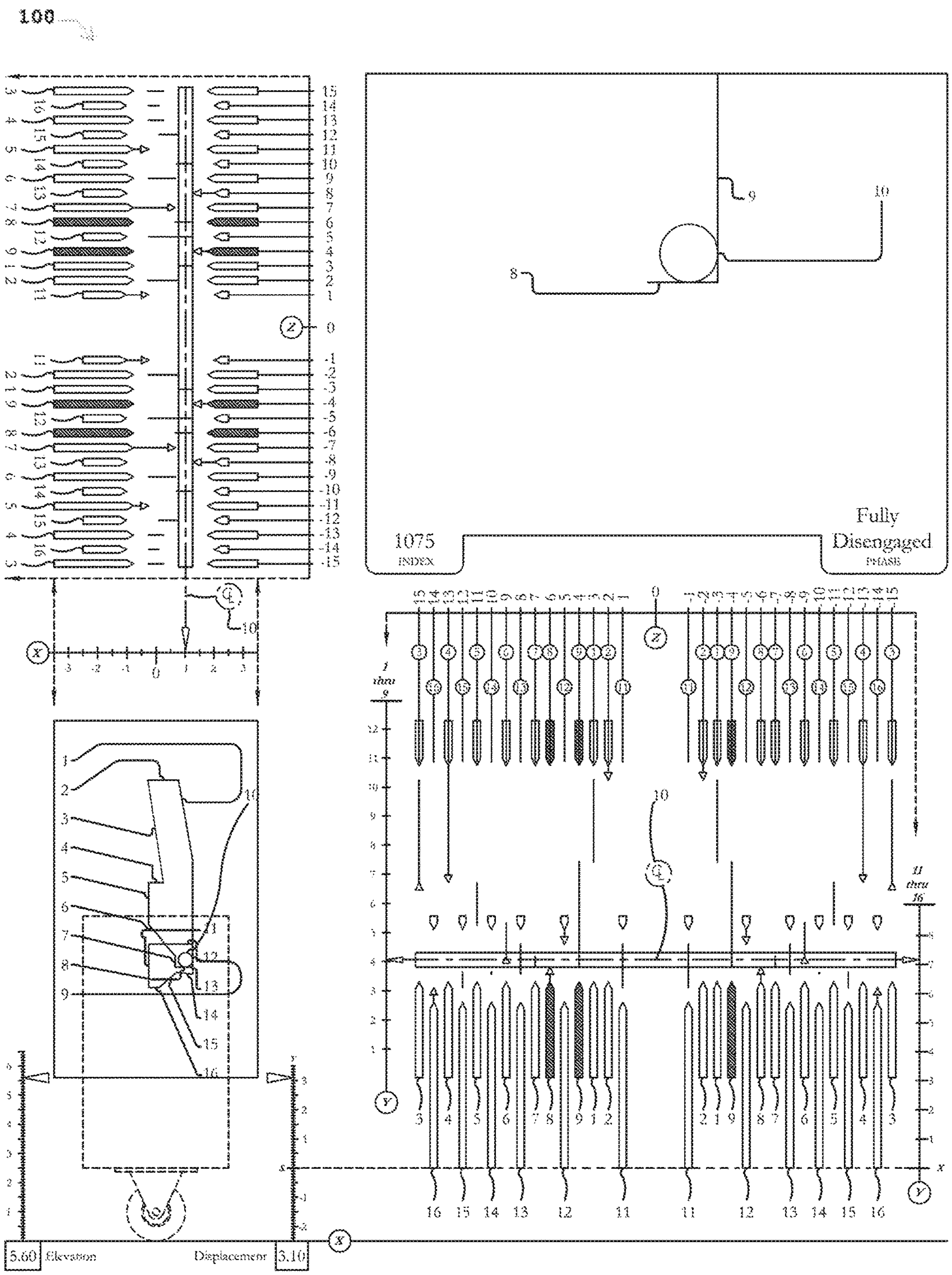
Figure 78:
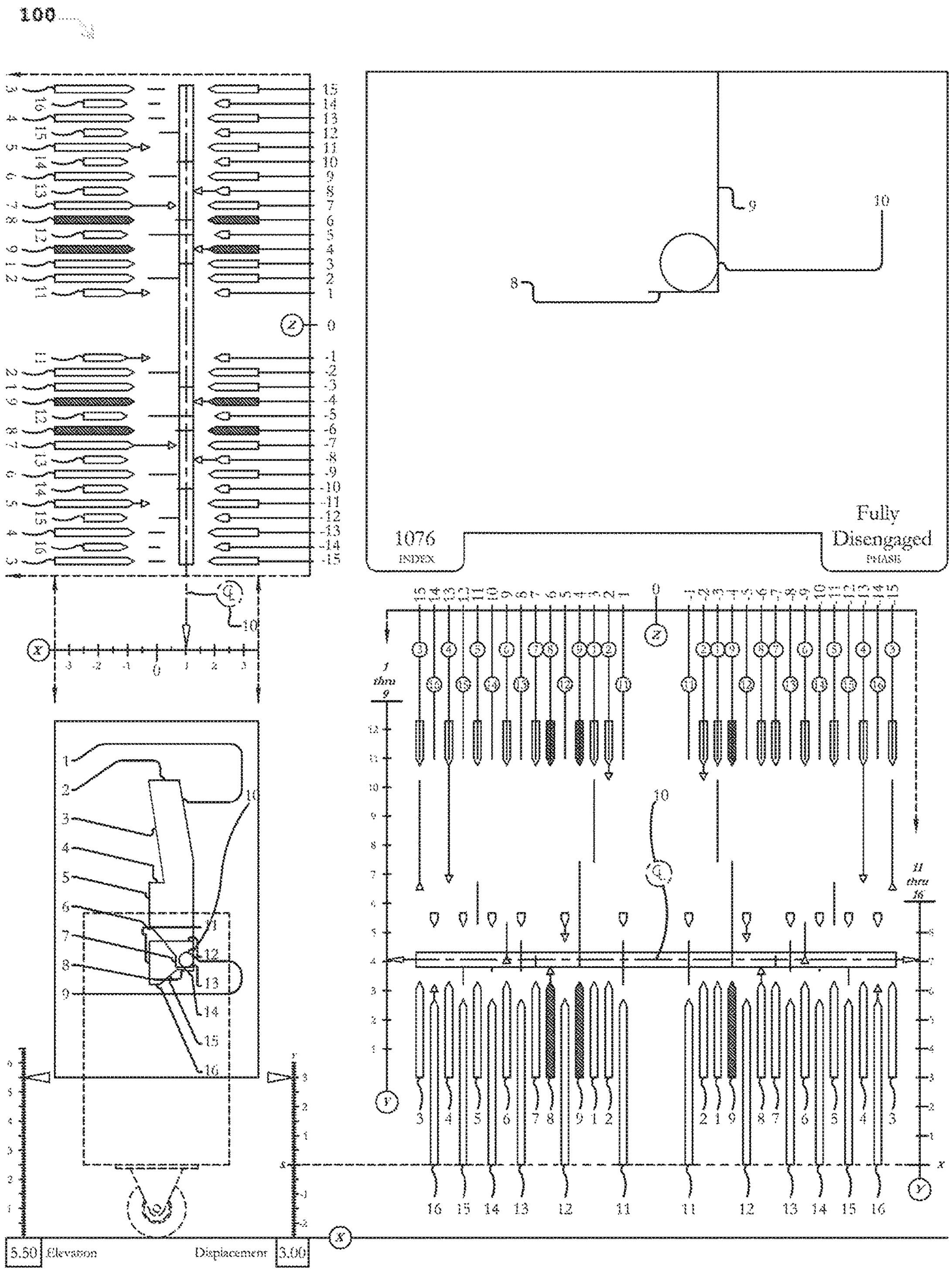
Figure 79:
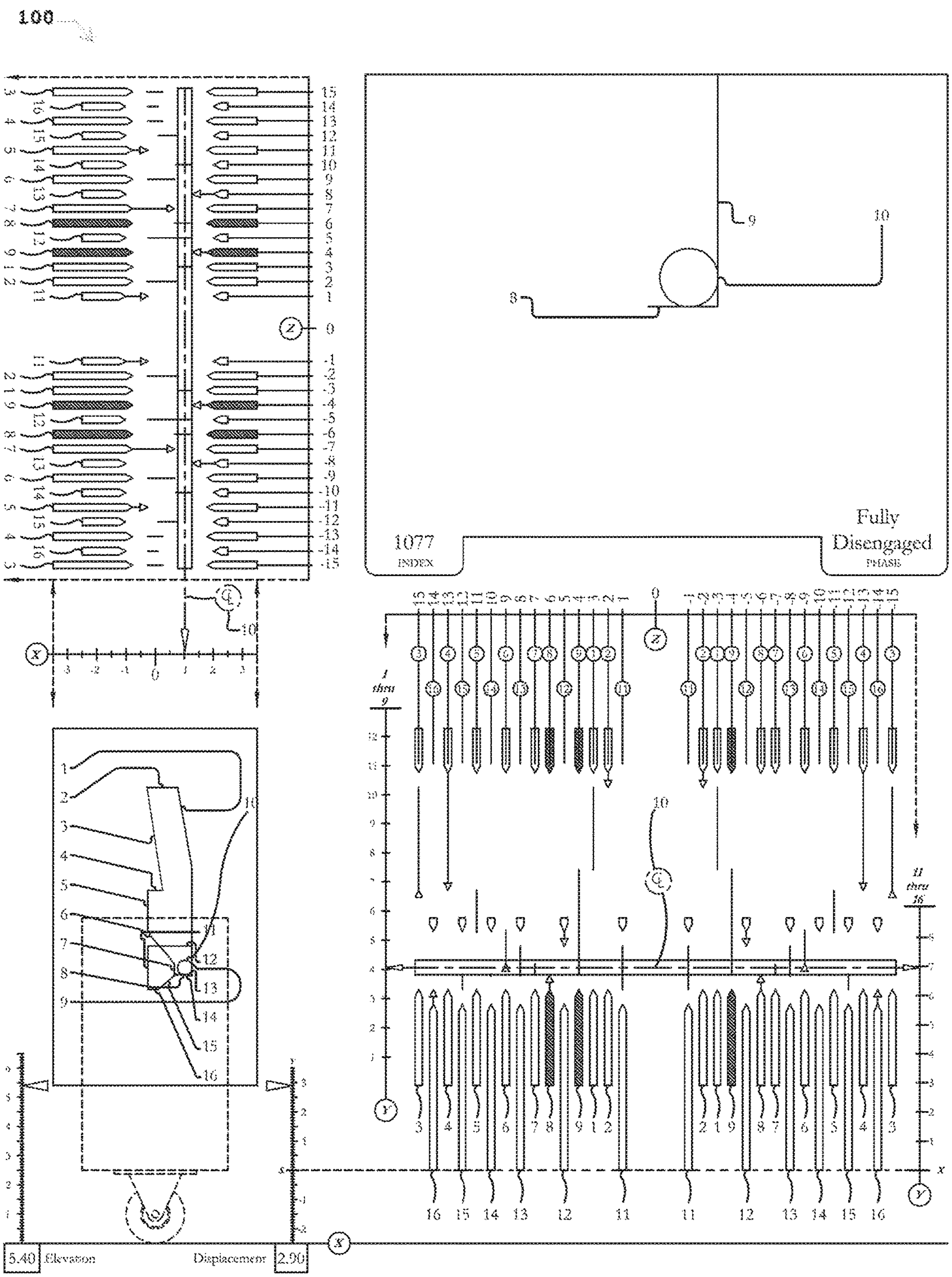
Figure 80:
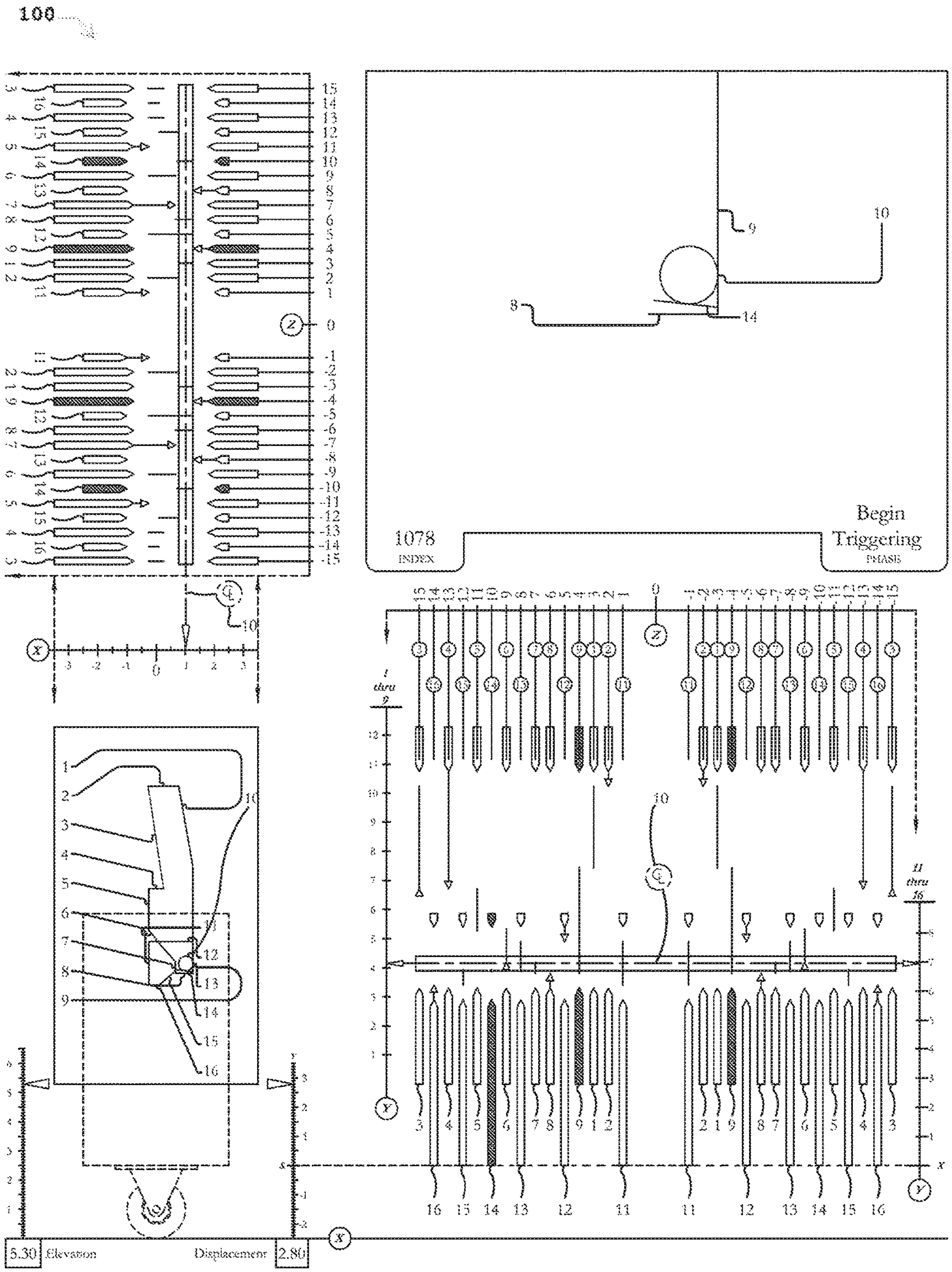
Figure 81:
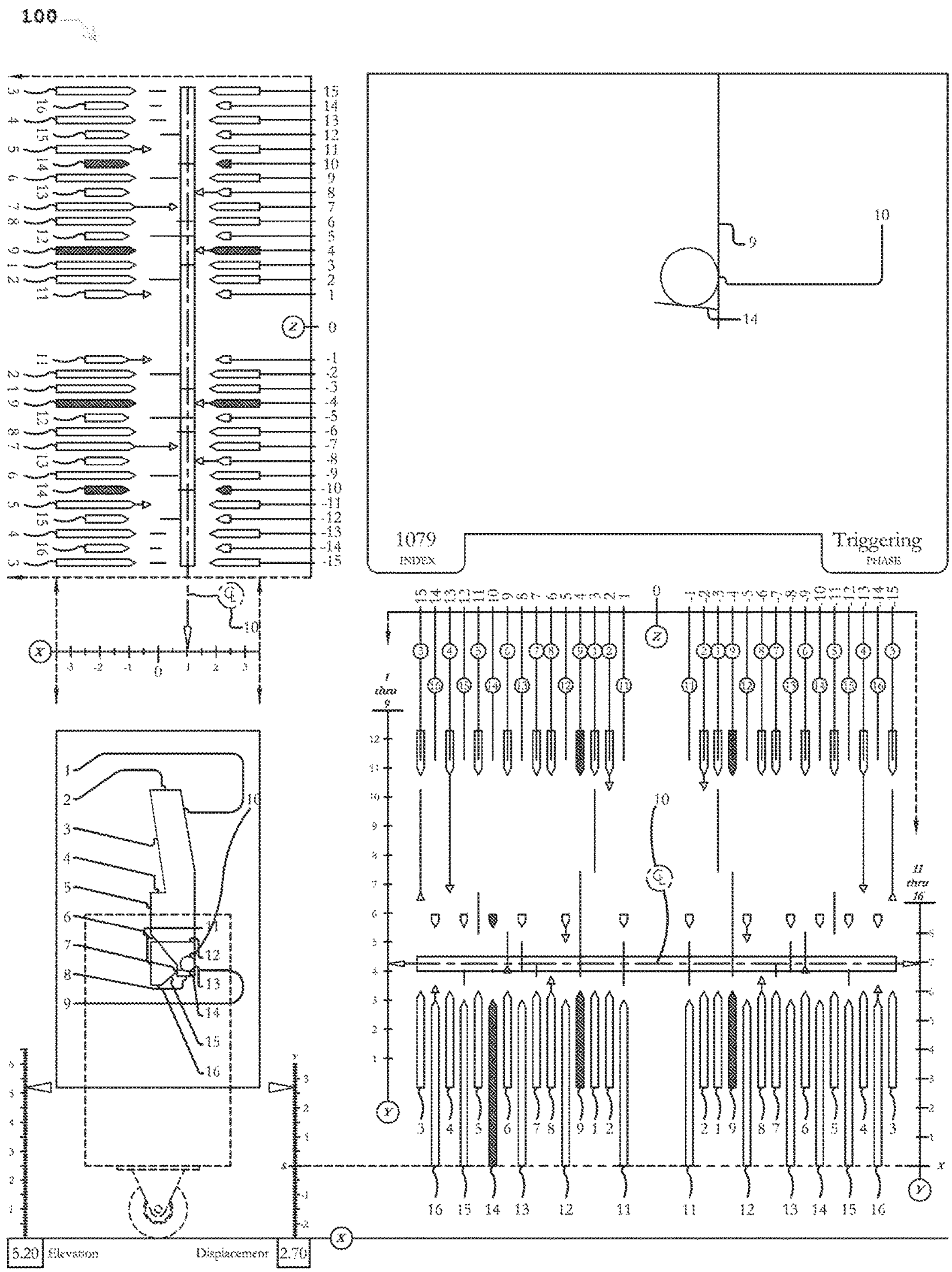
Figure 82:
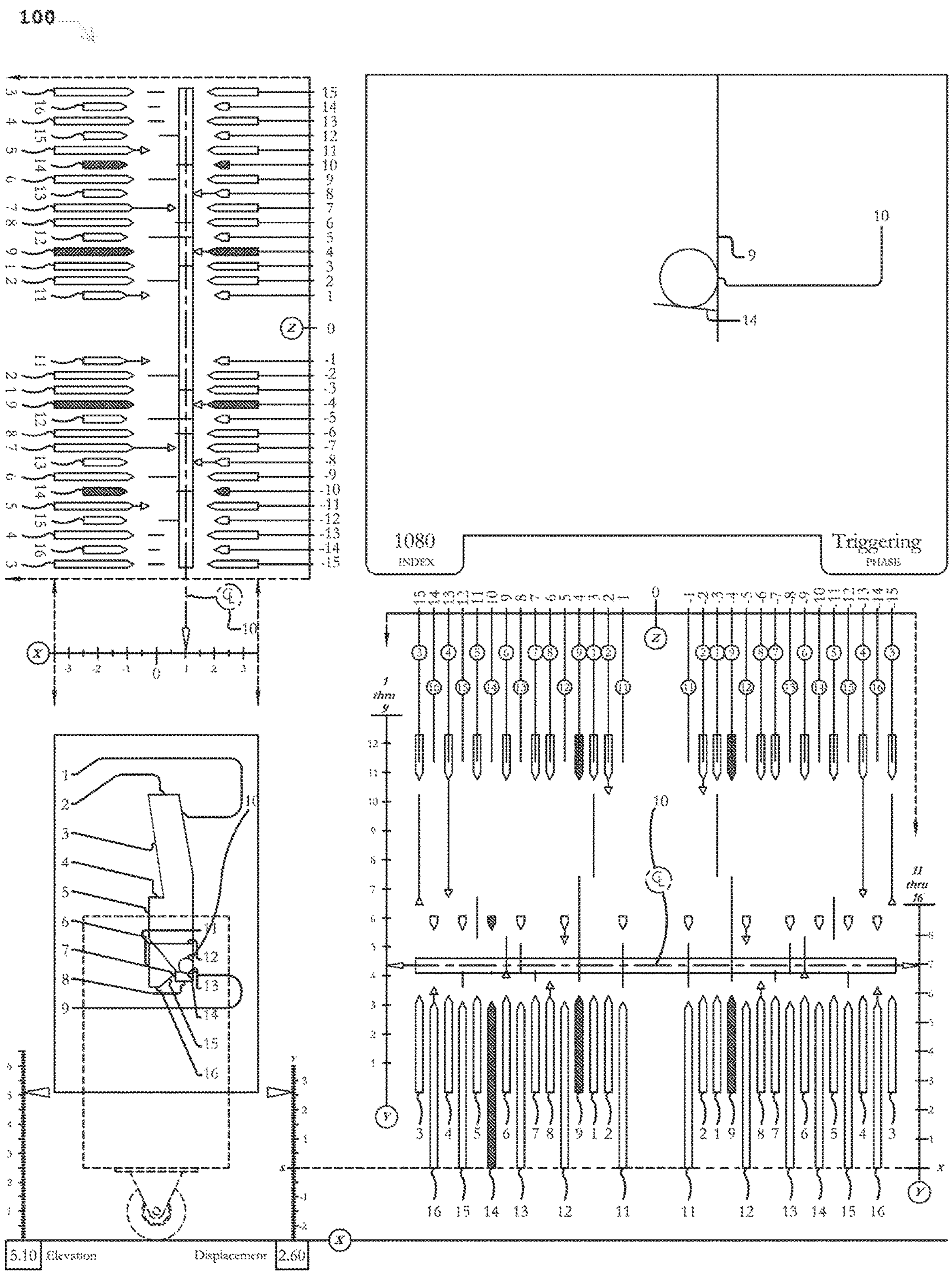
Figure 83:
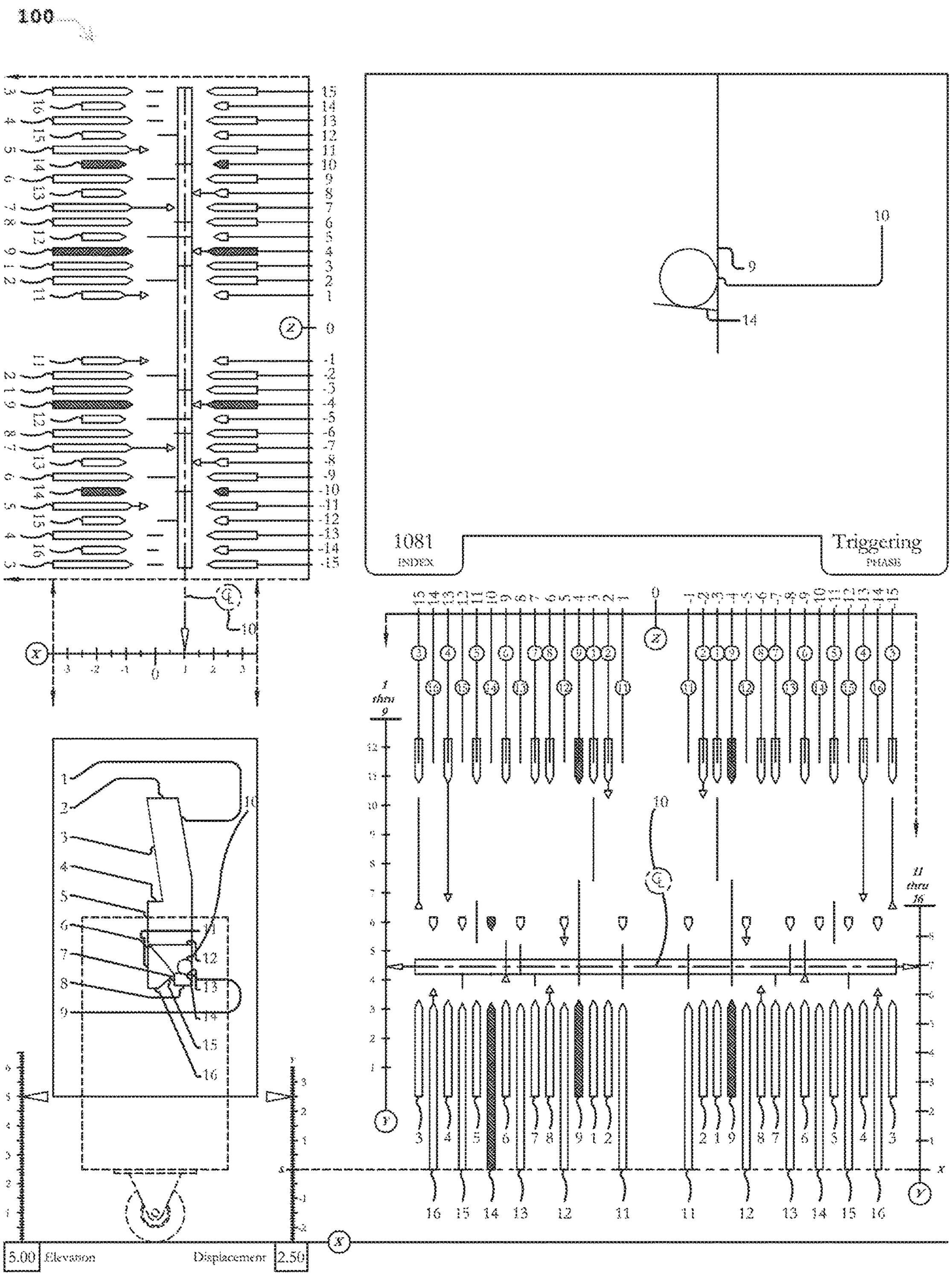
Figure 84:
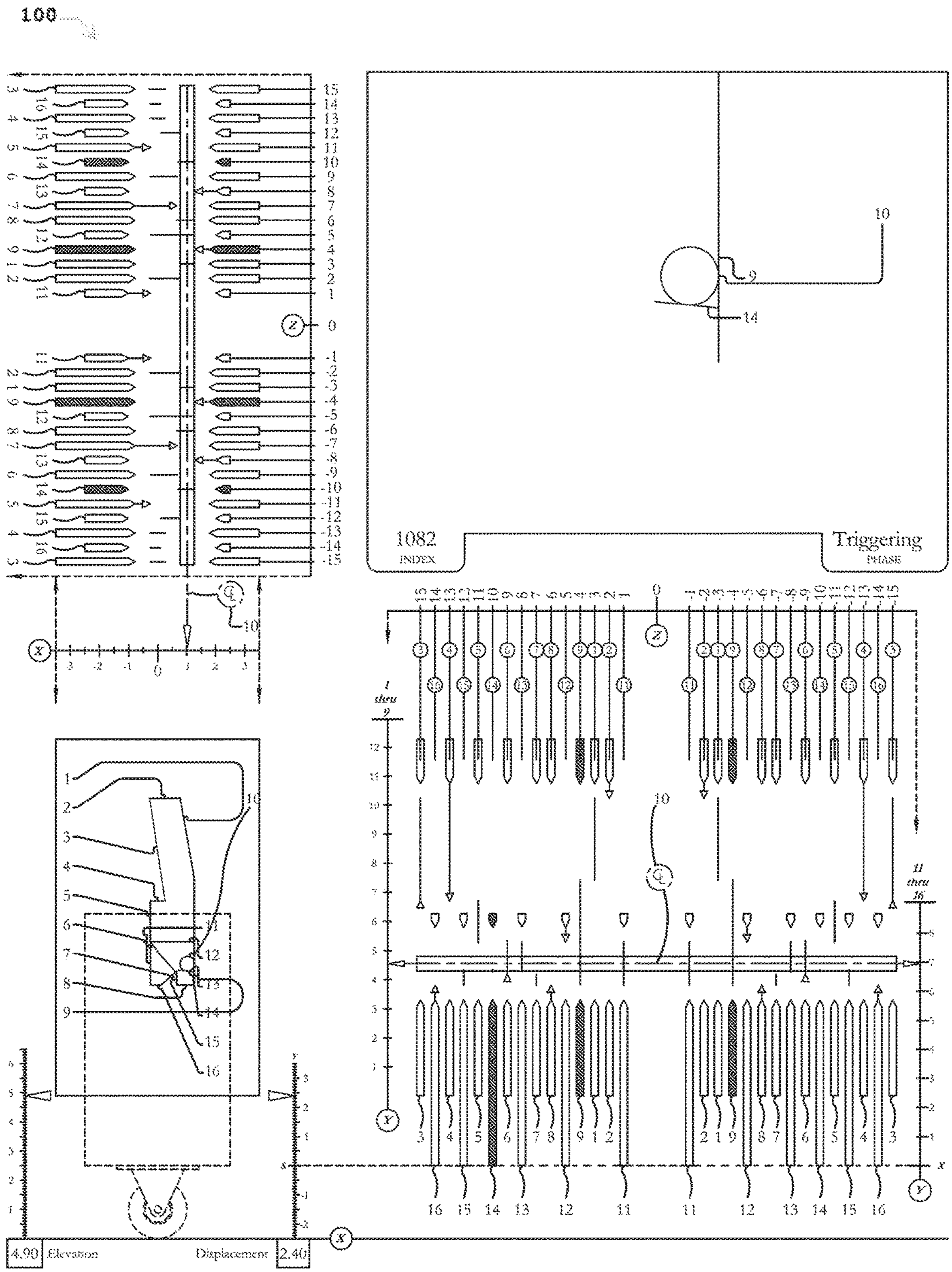
Figure 85:
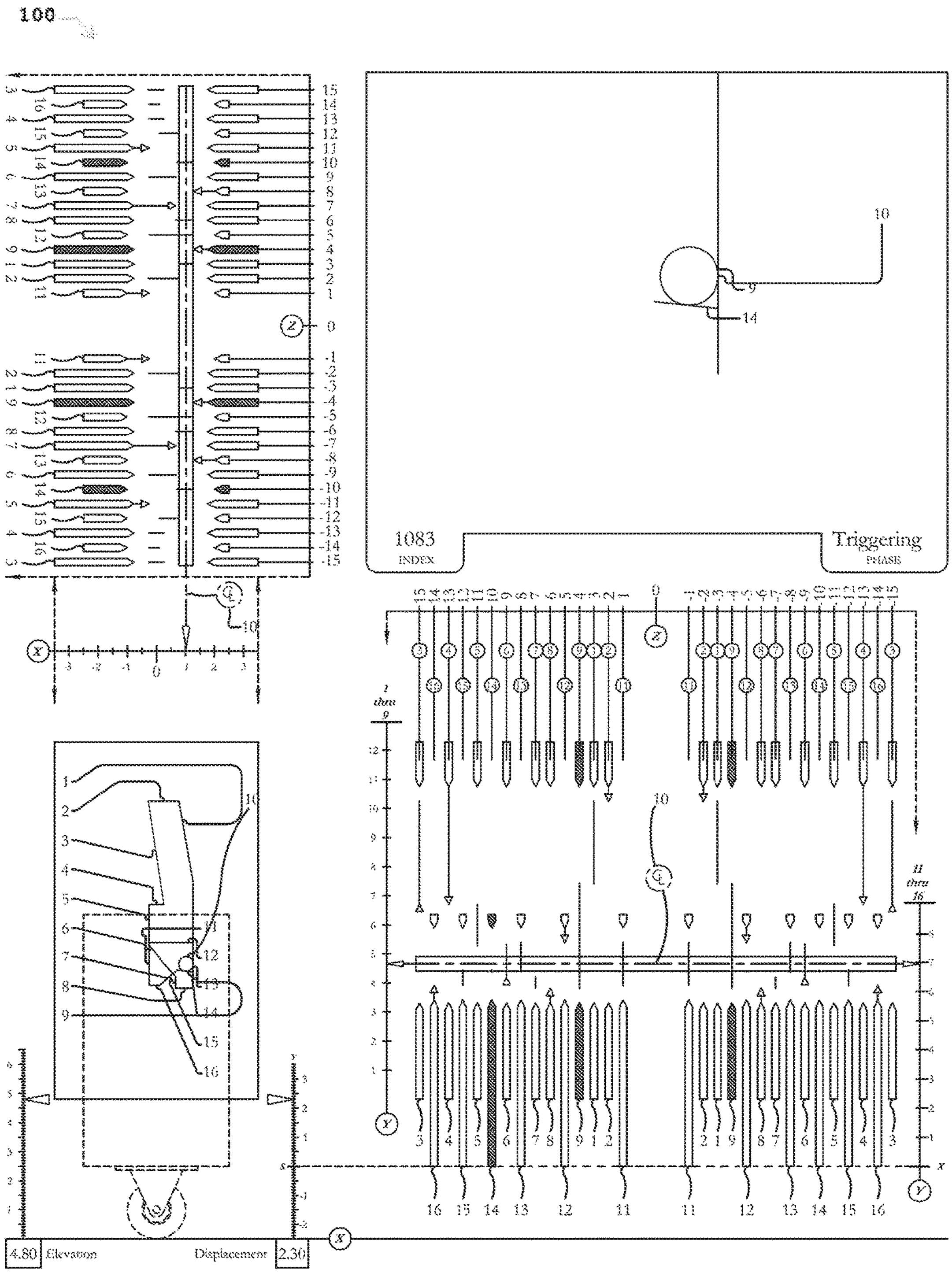
Figure 86:
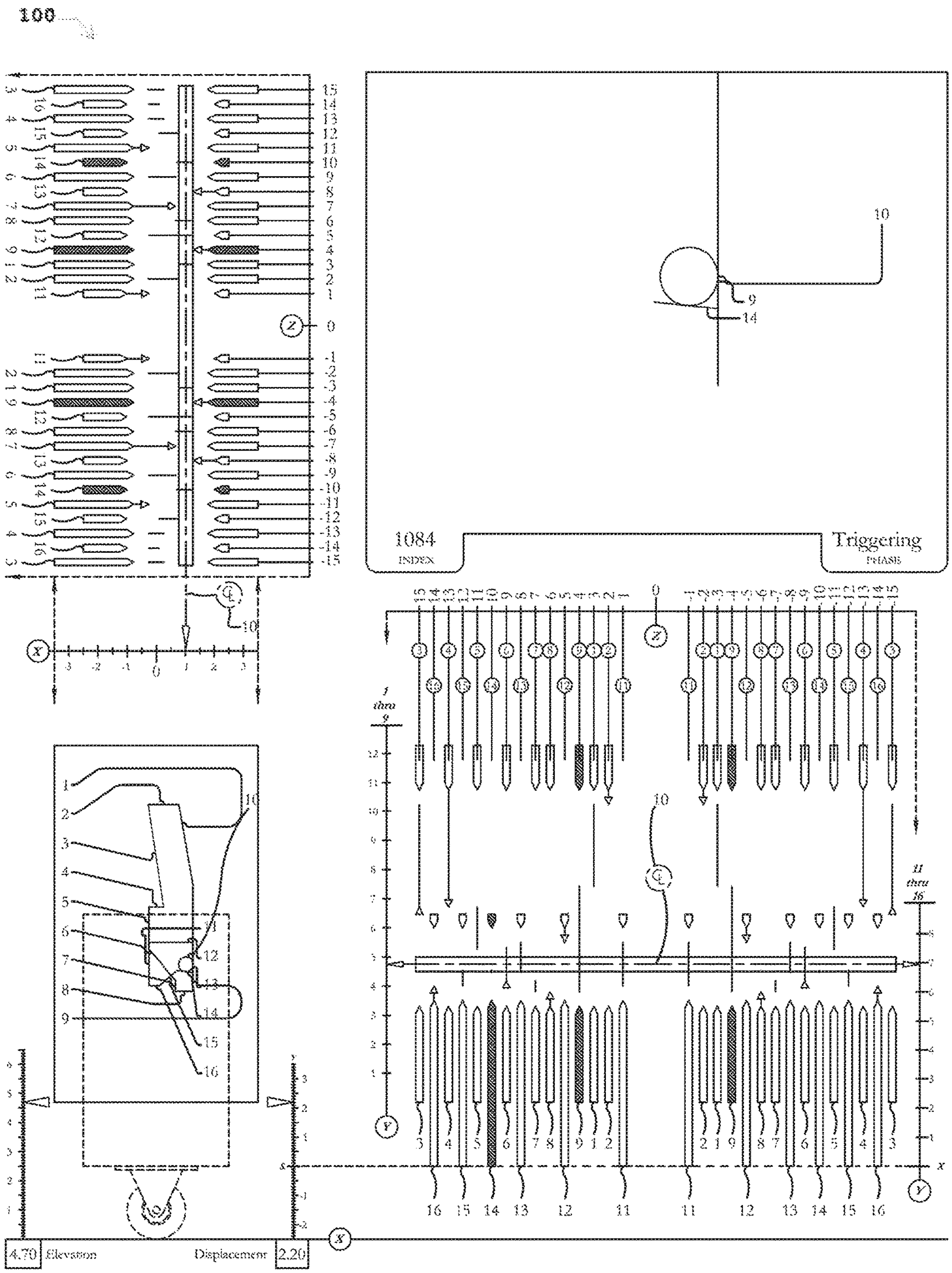
Figure 87:
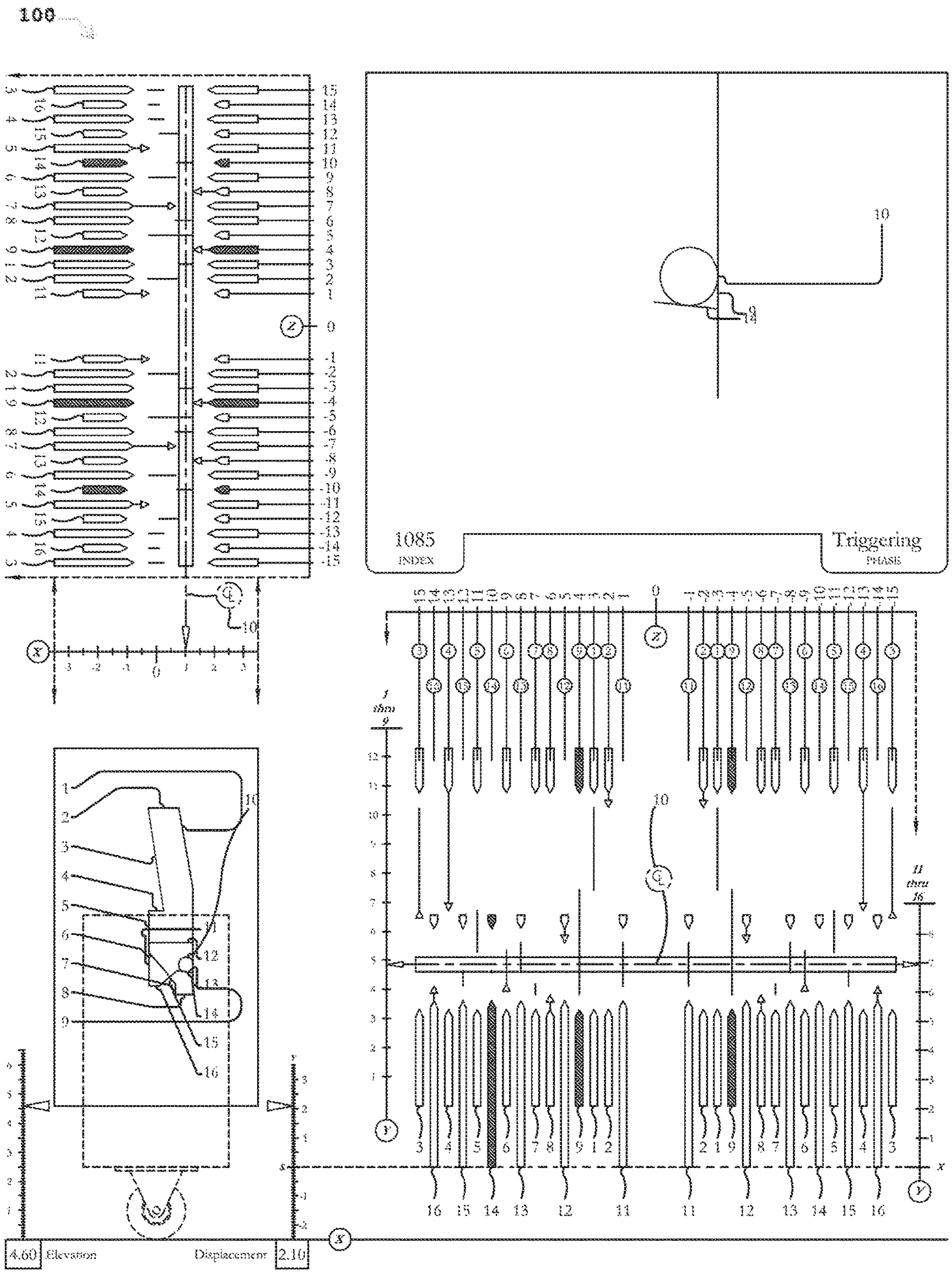
Figure 88:
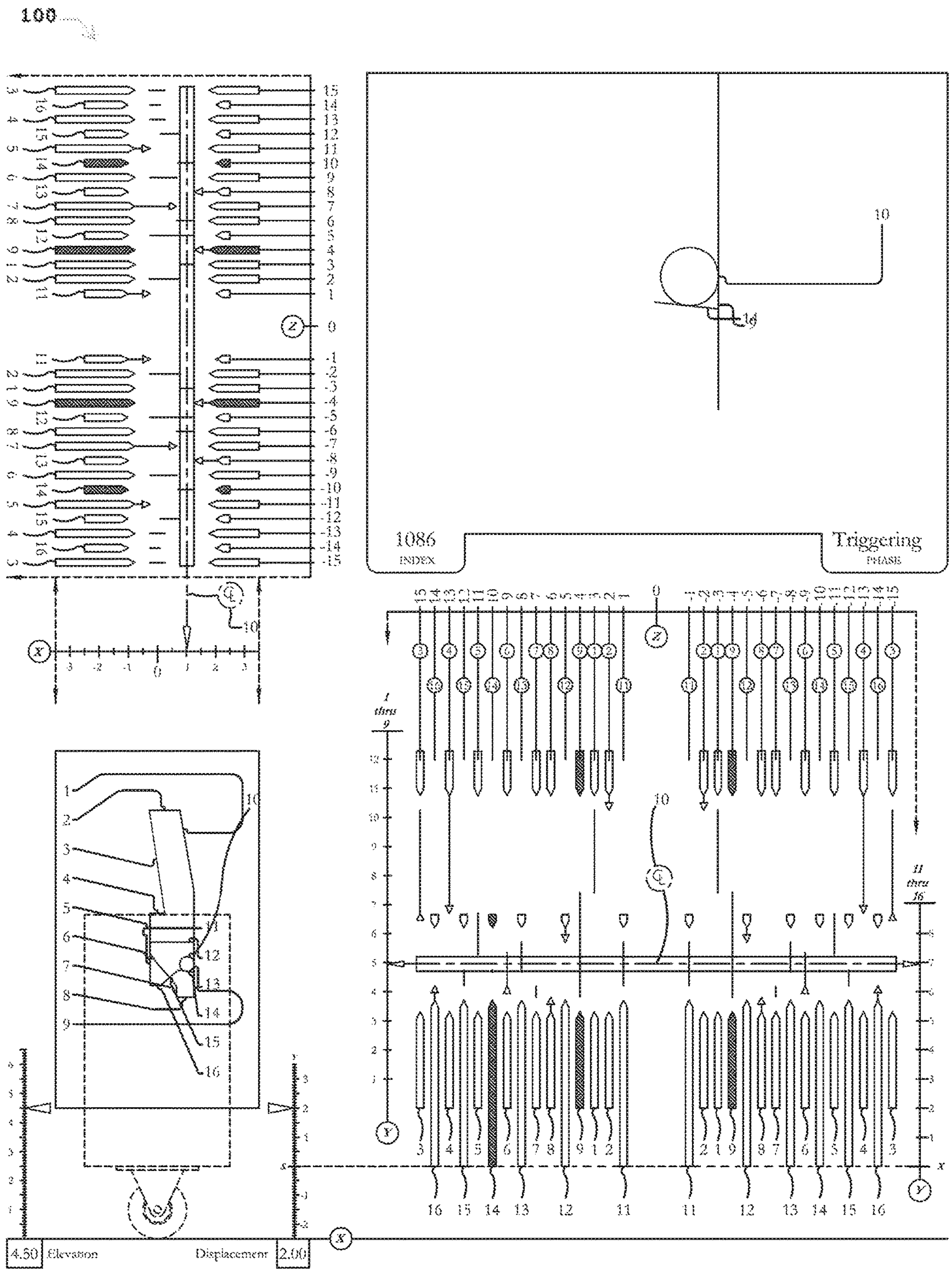
Figure 89:
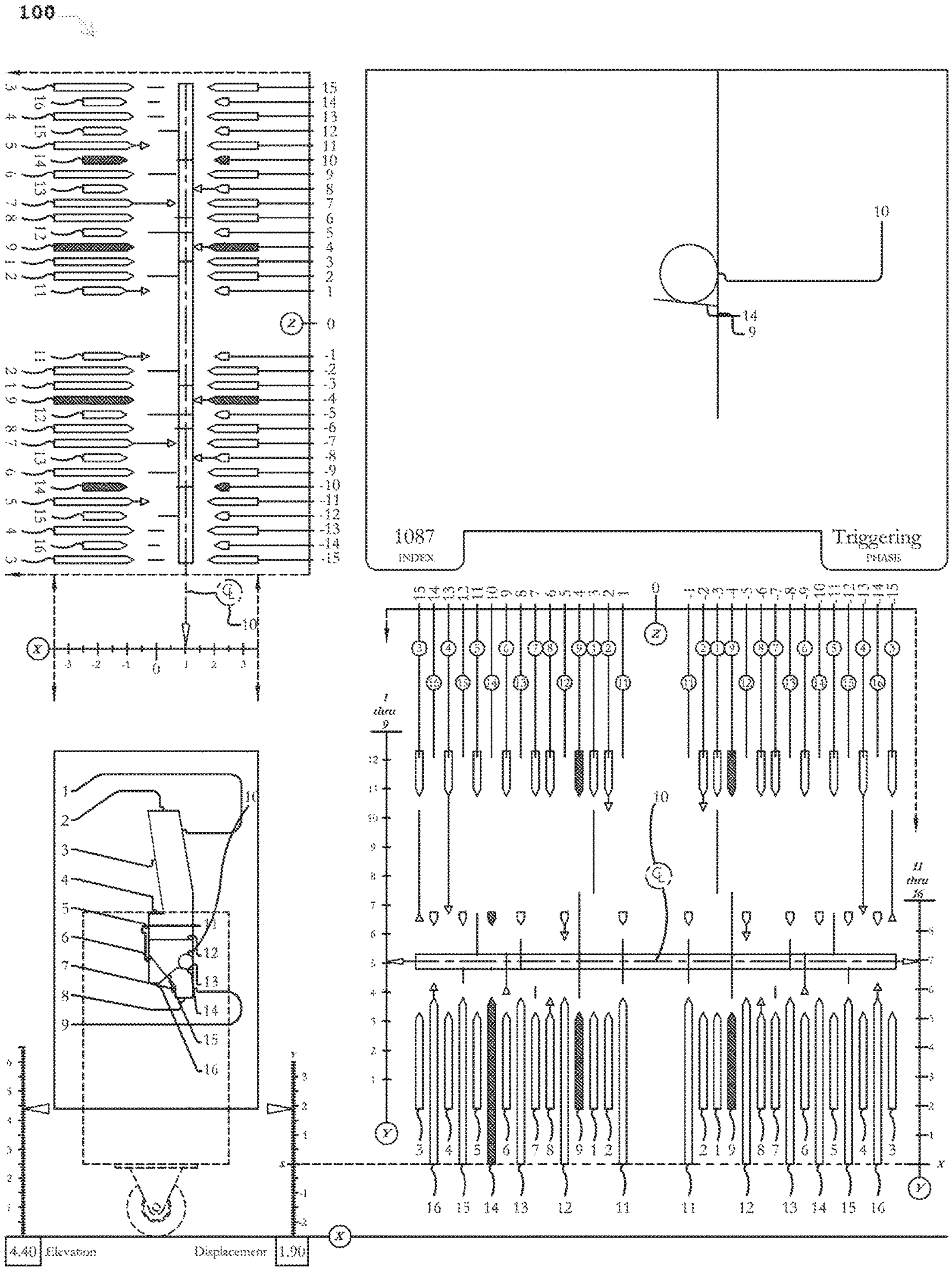
Figure 90:
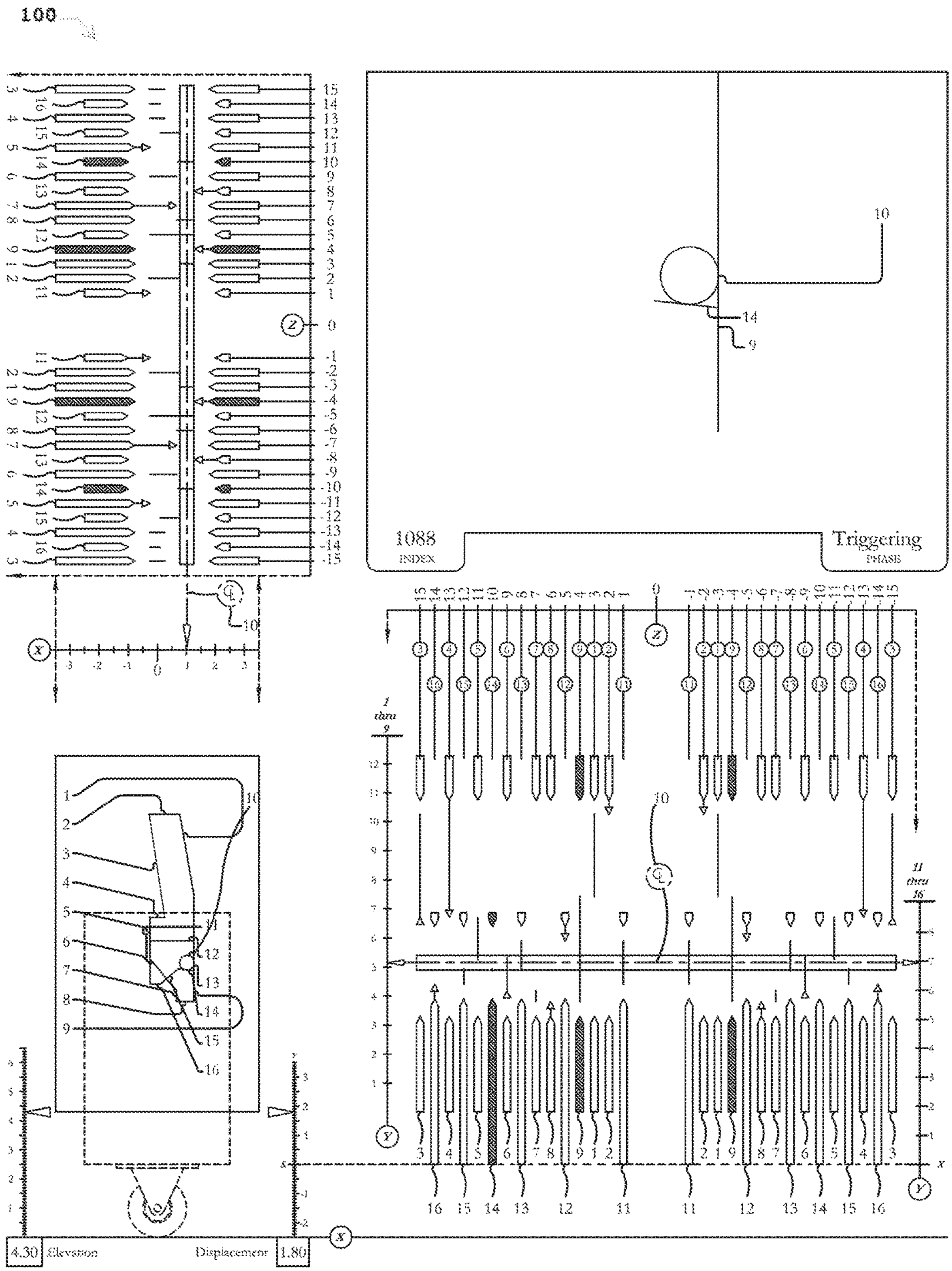
Figure 91:
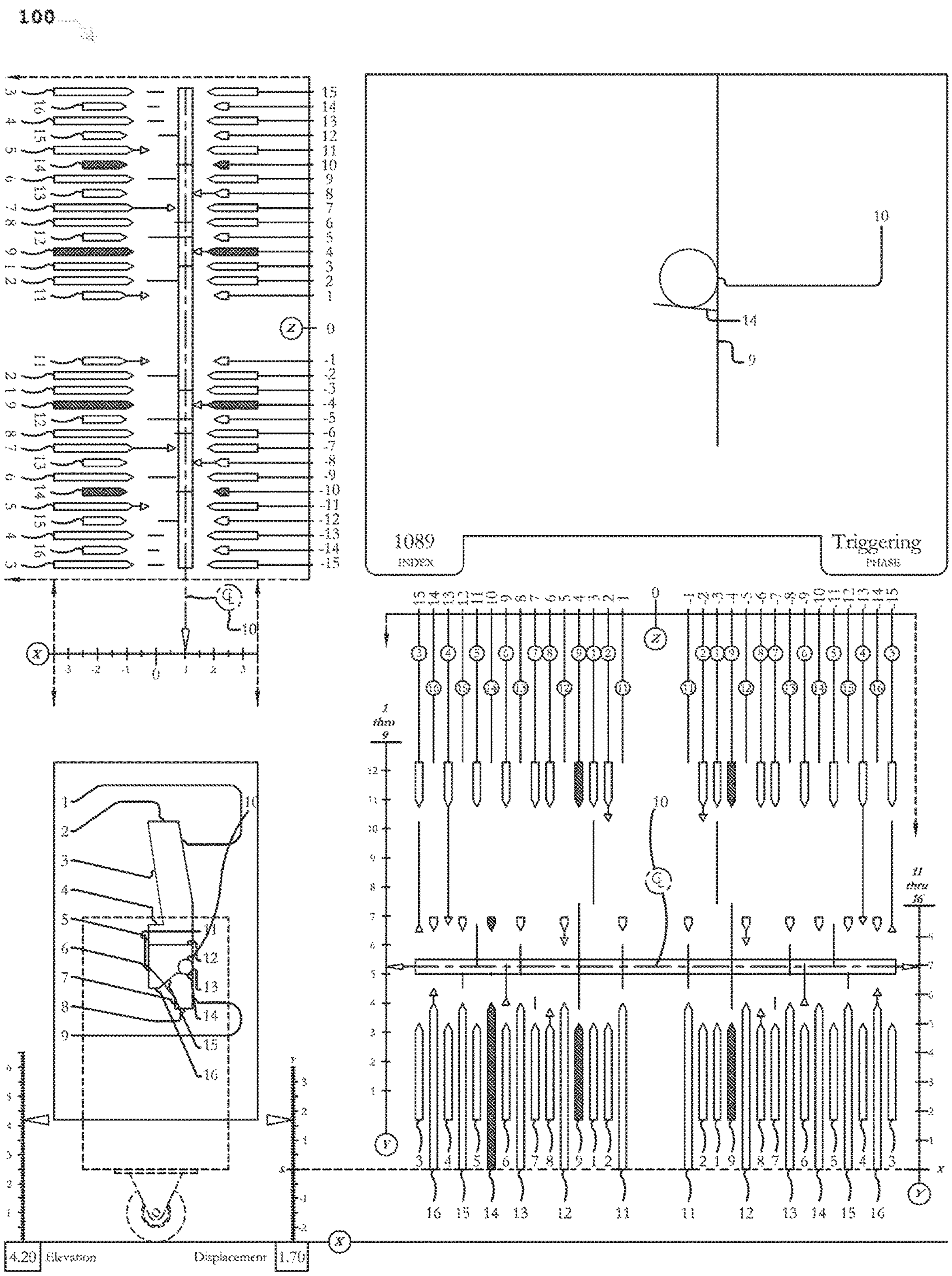
Figure 92:
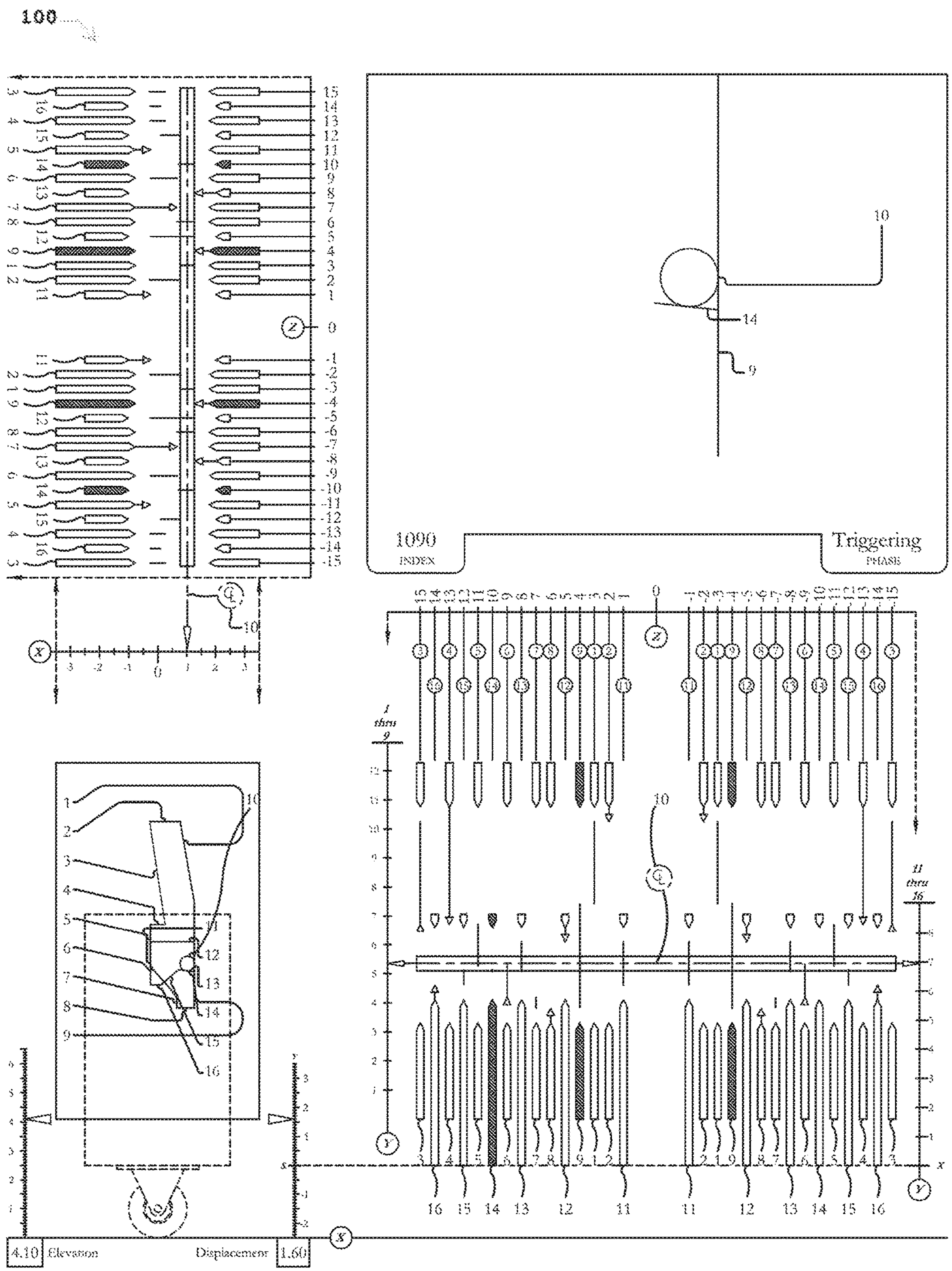
Figure 93:
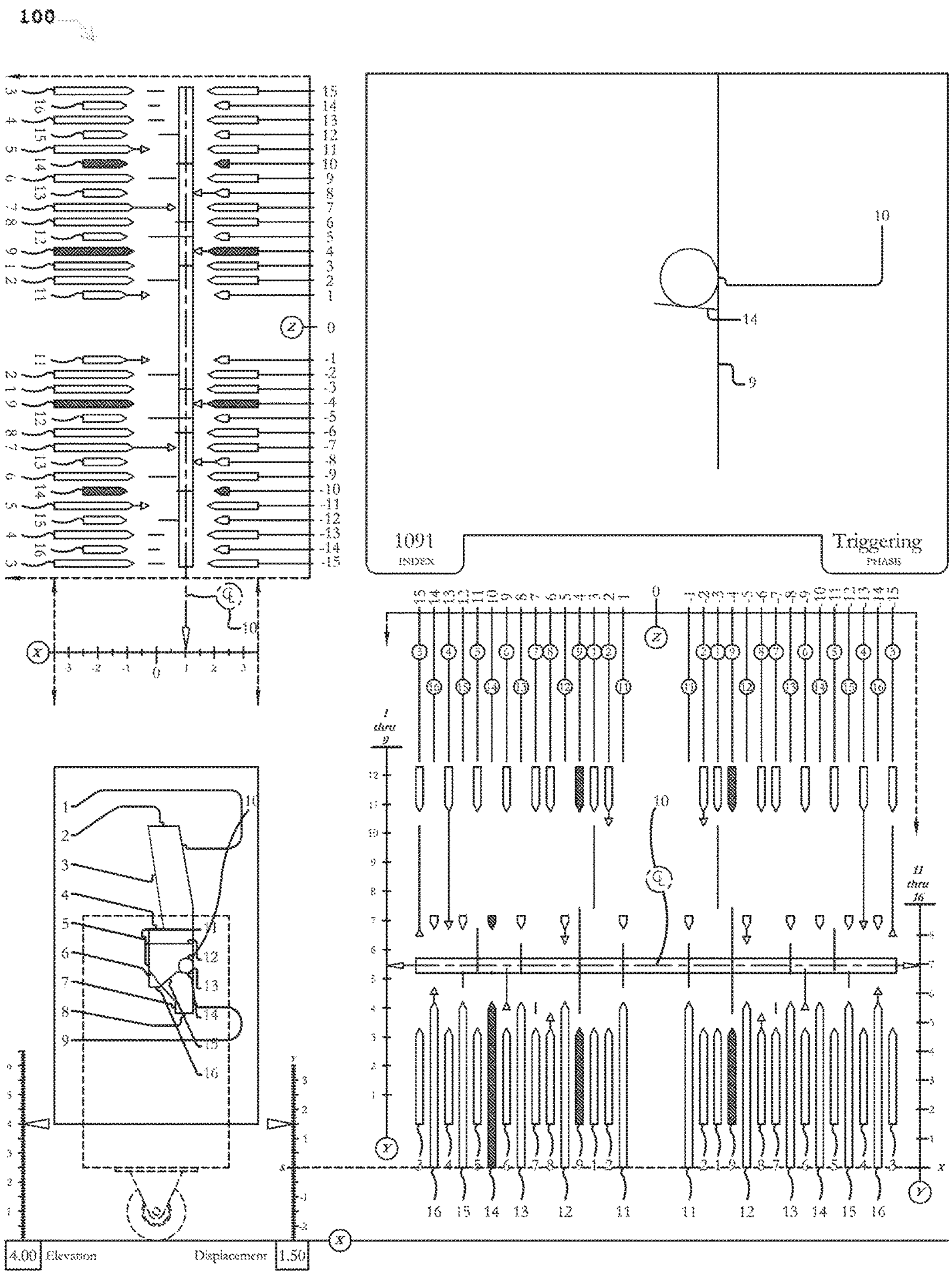
Figure 94:
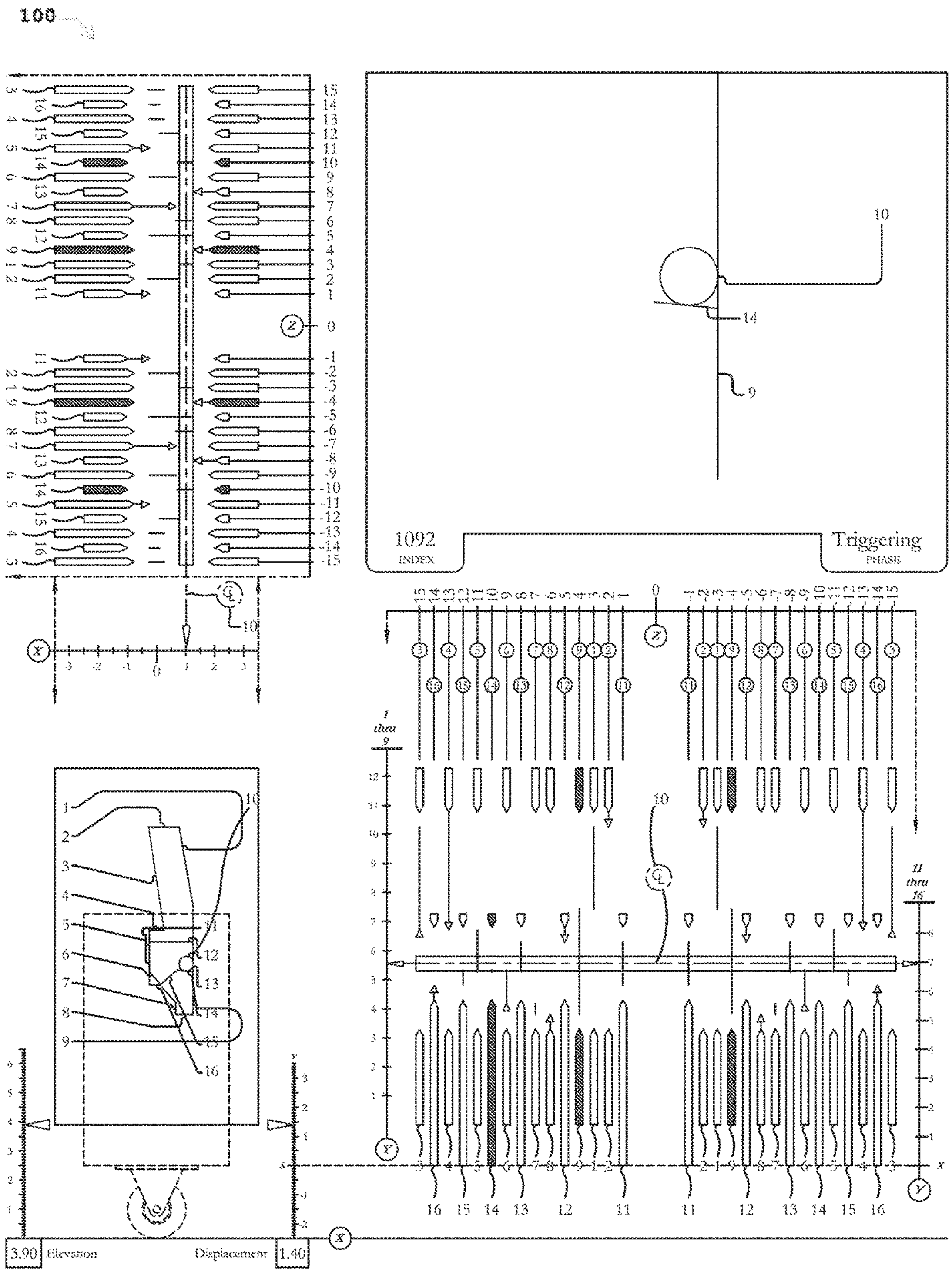
Figure 95:
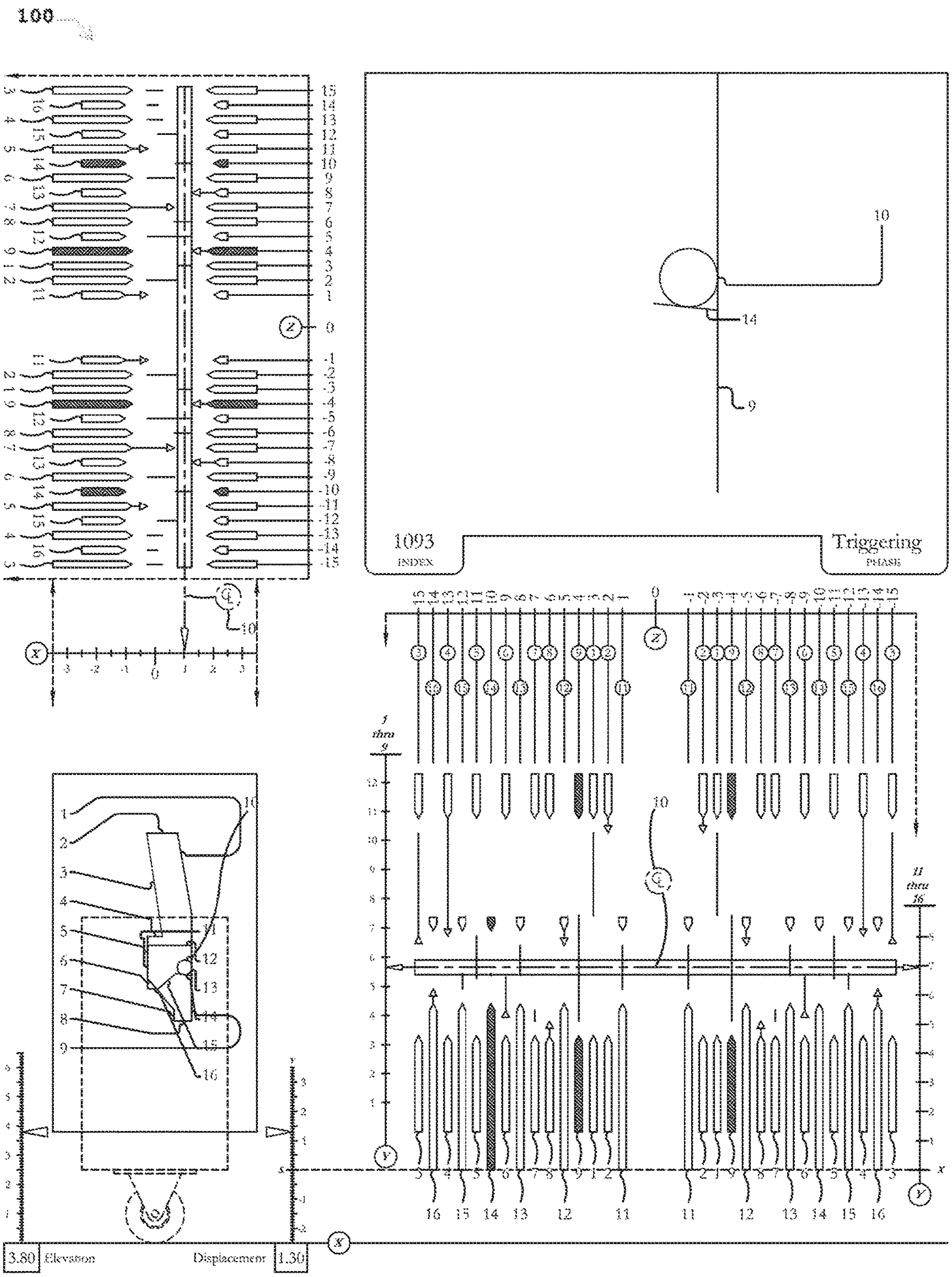
Figure 96:
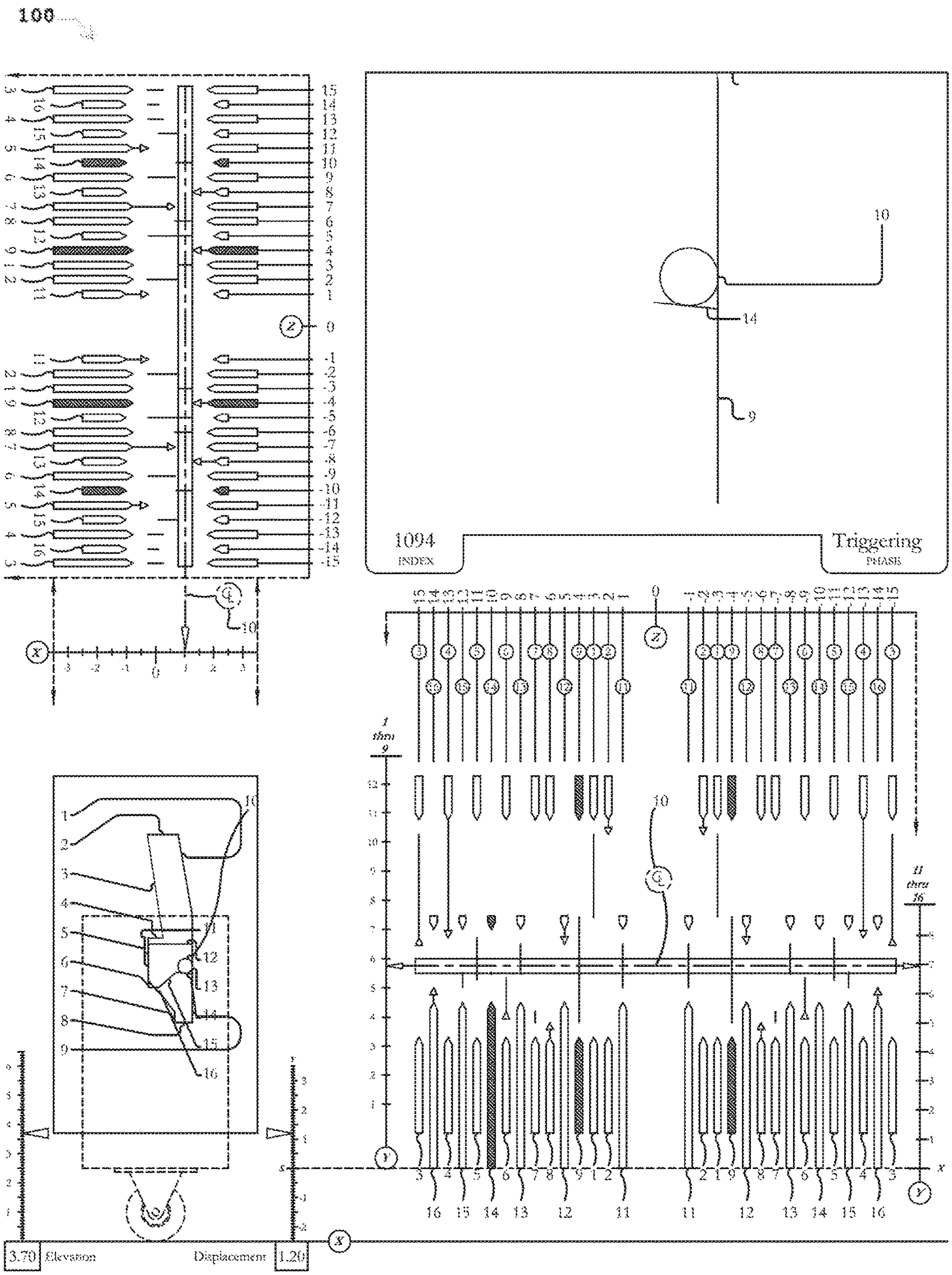
Figure 97:
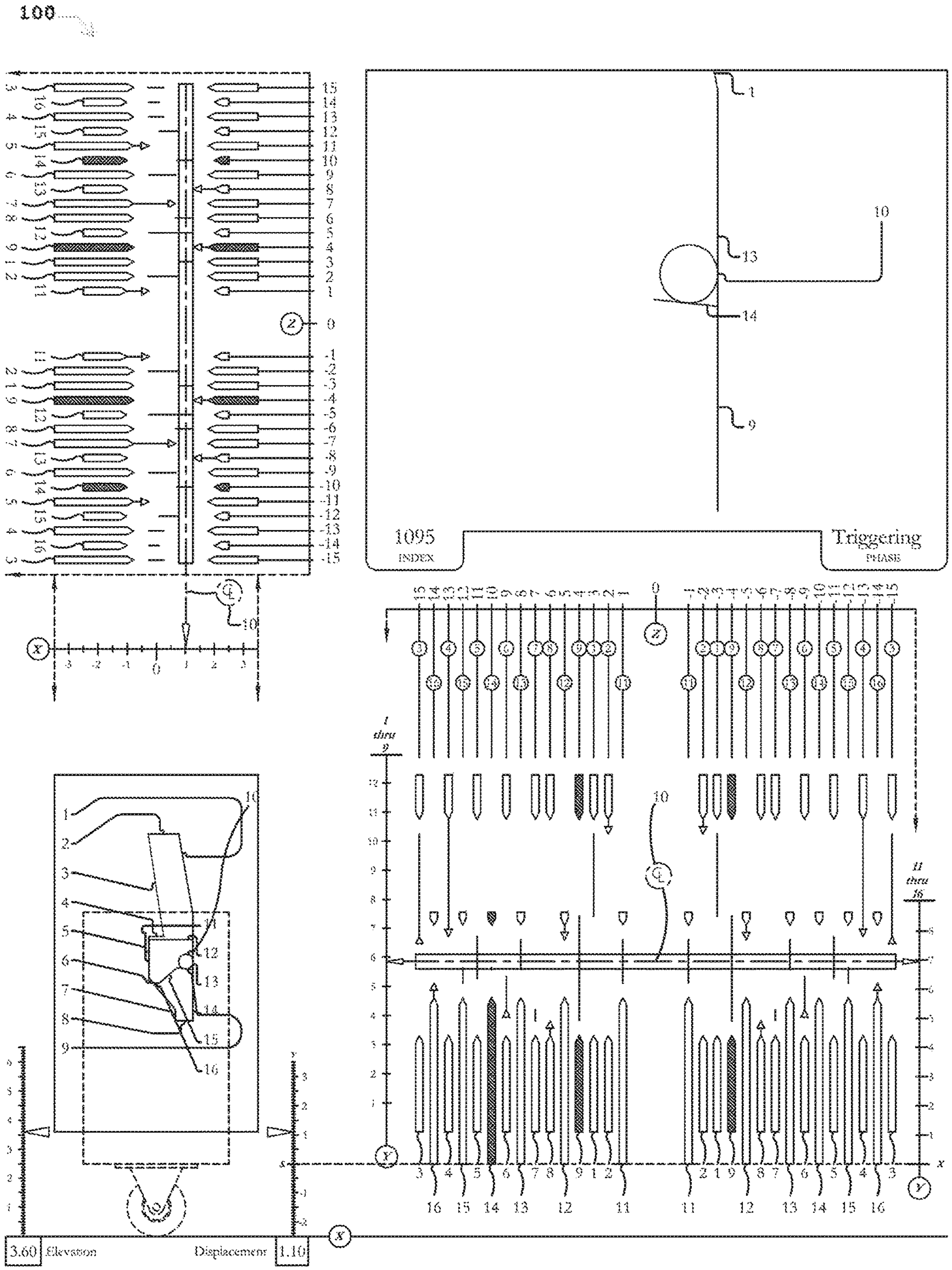
Figure 98:
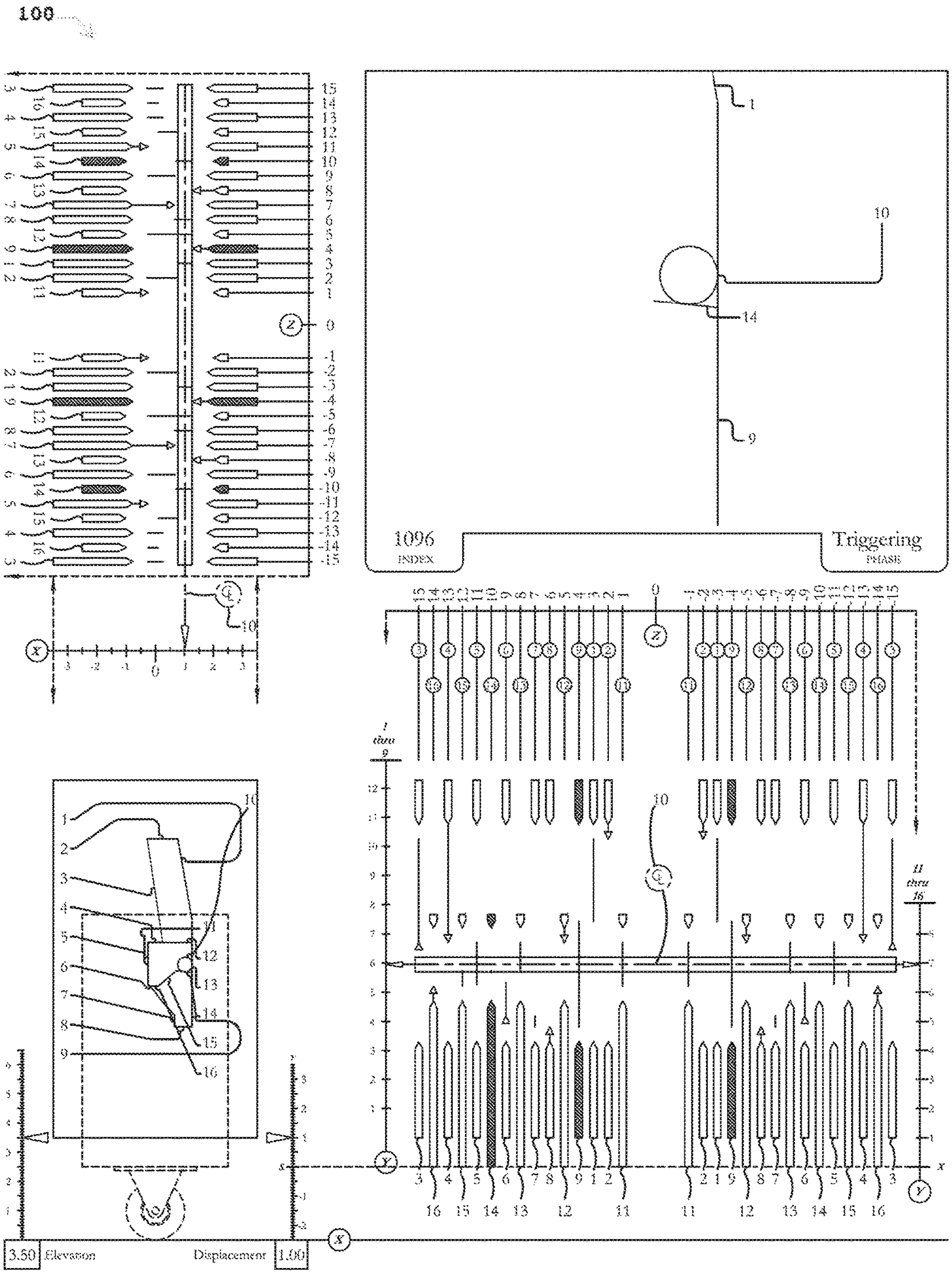
Figure 99:
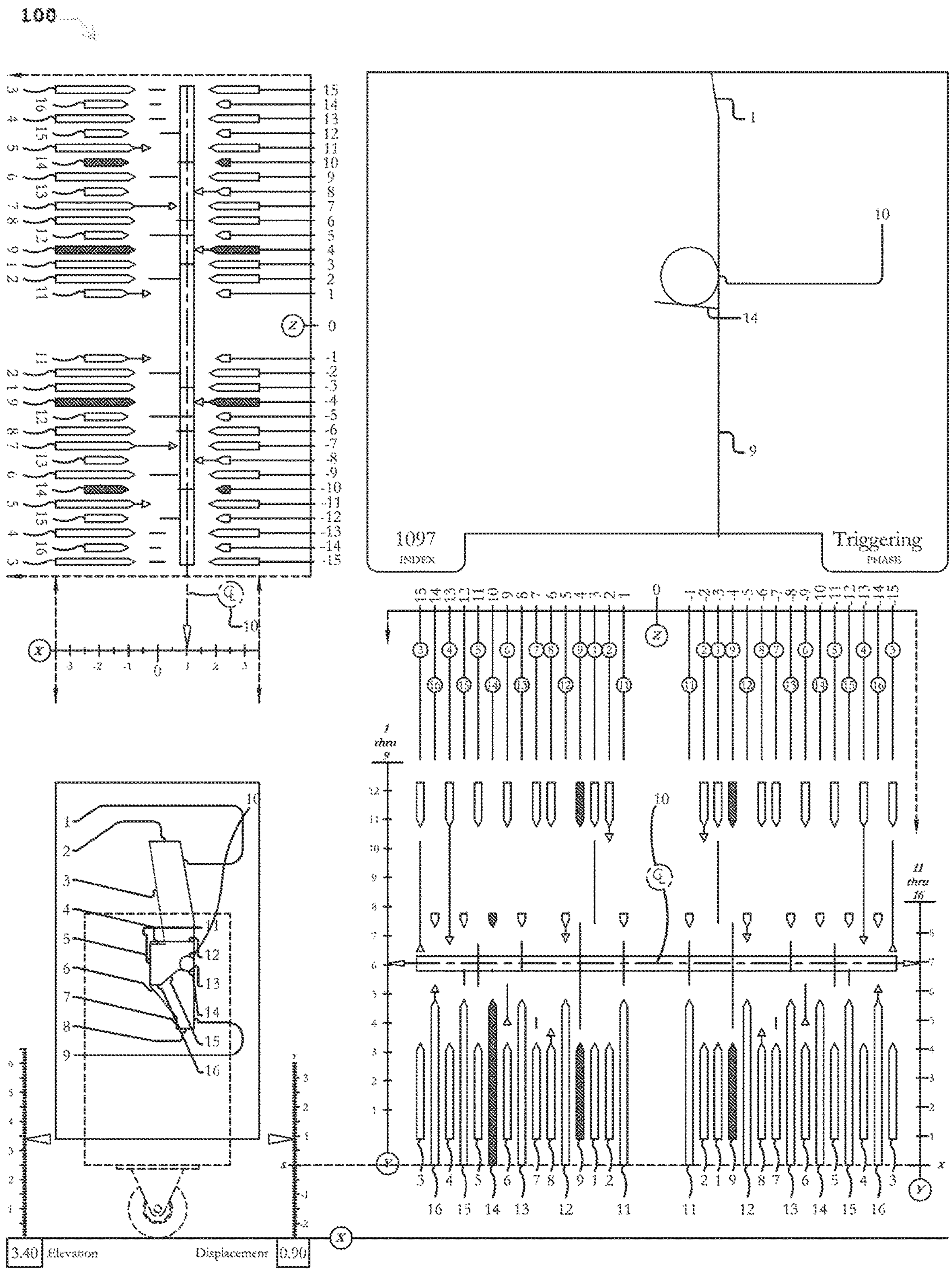
Figure 100:
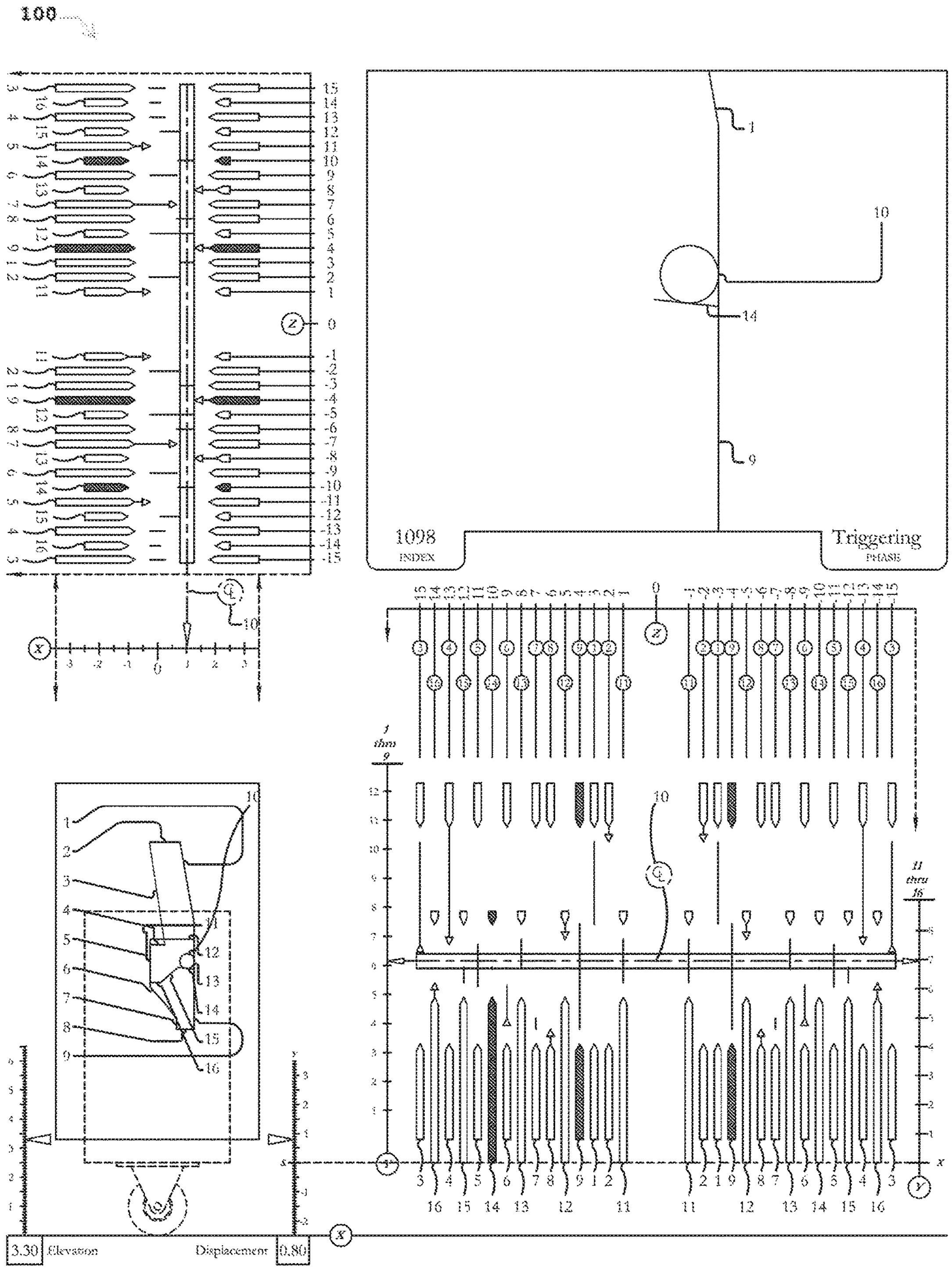
Figure 101:
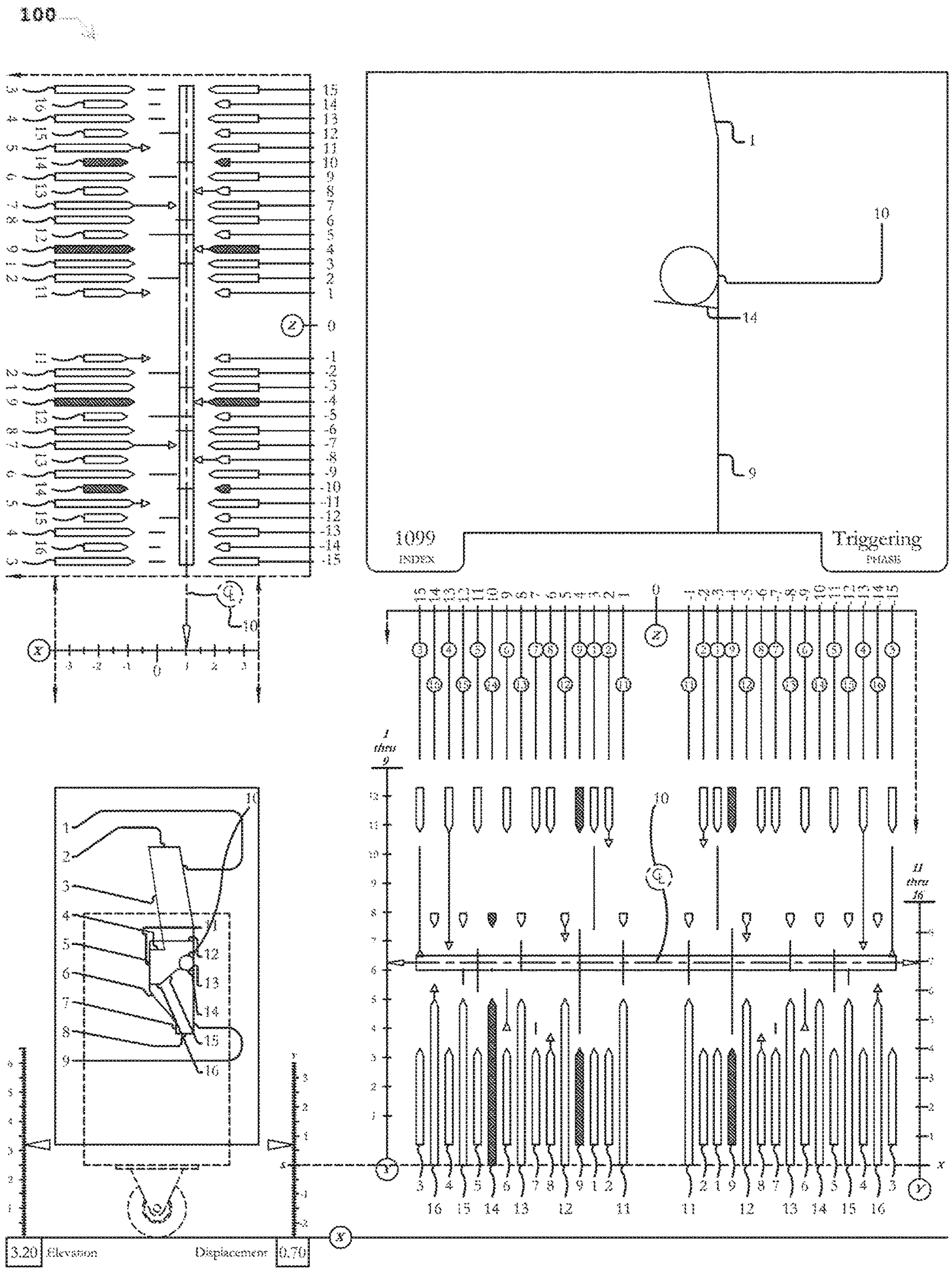
Figure 102:
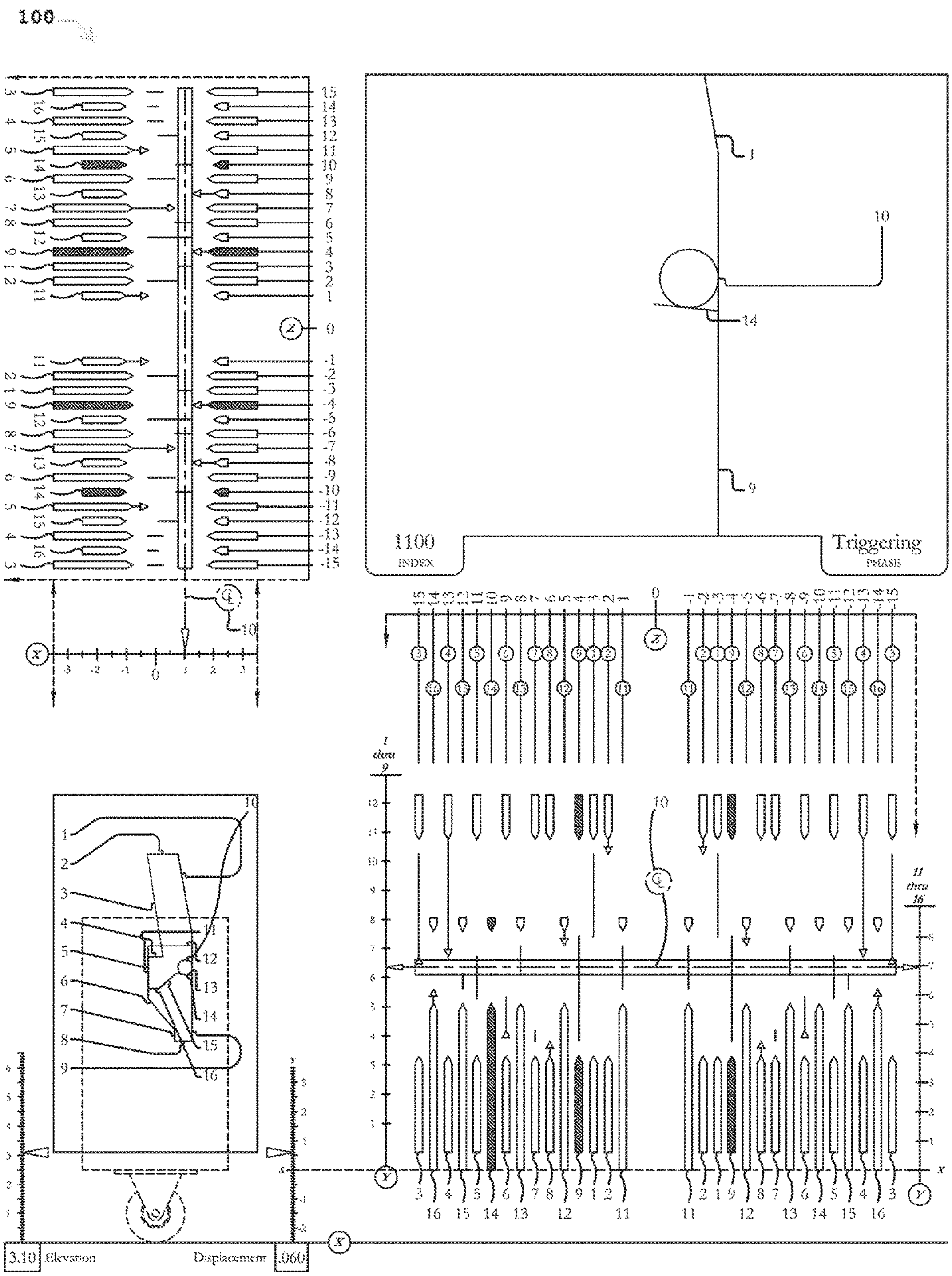
Figure 103:
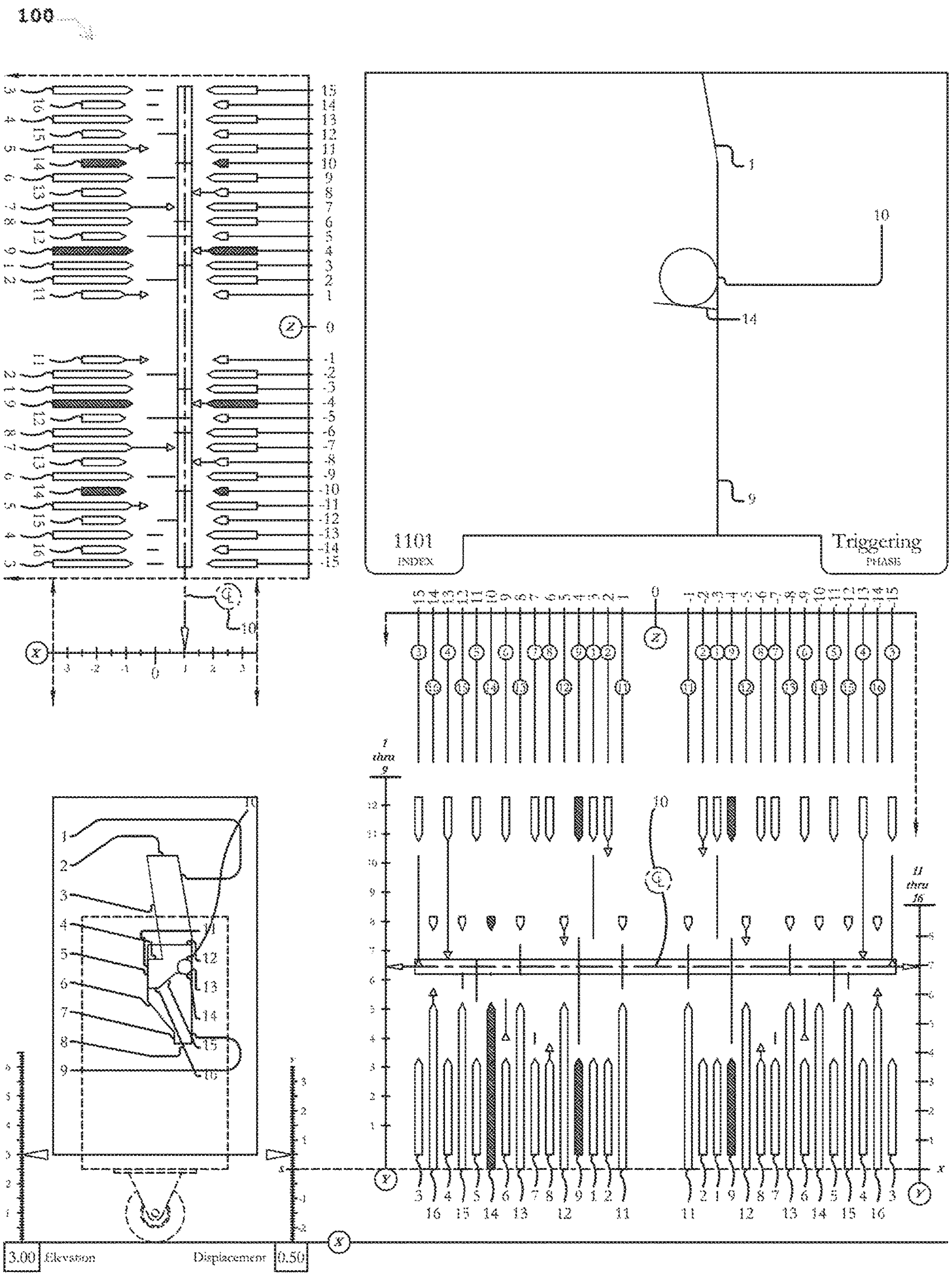
Figure 104:
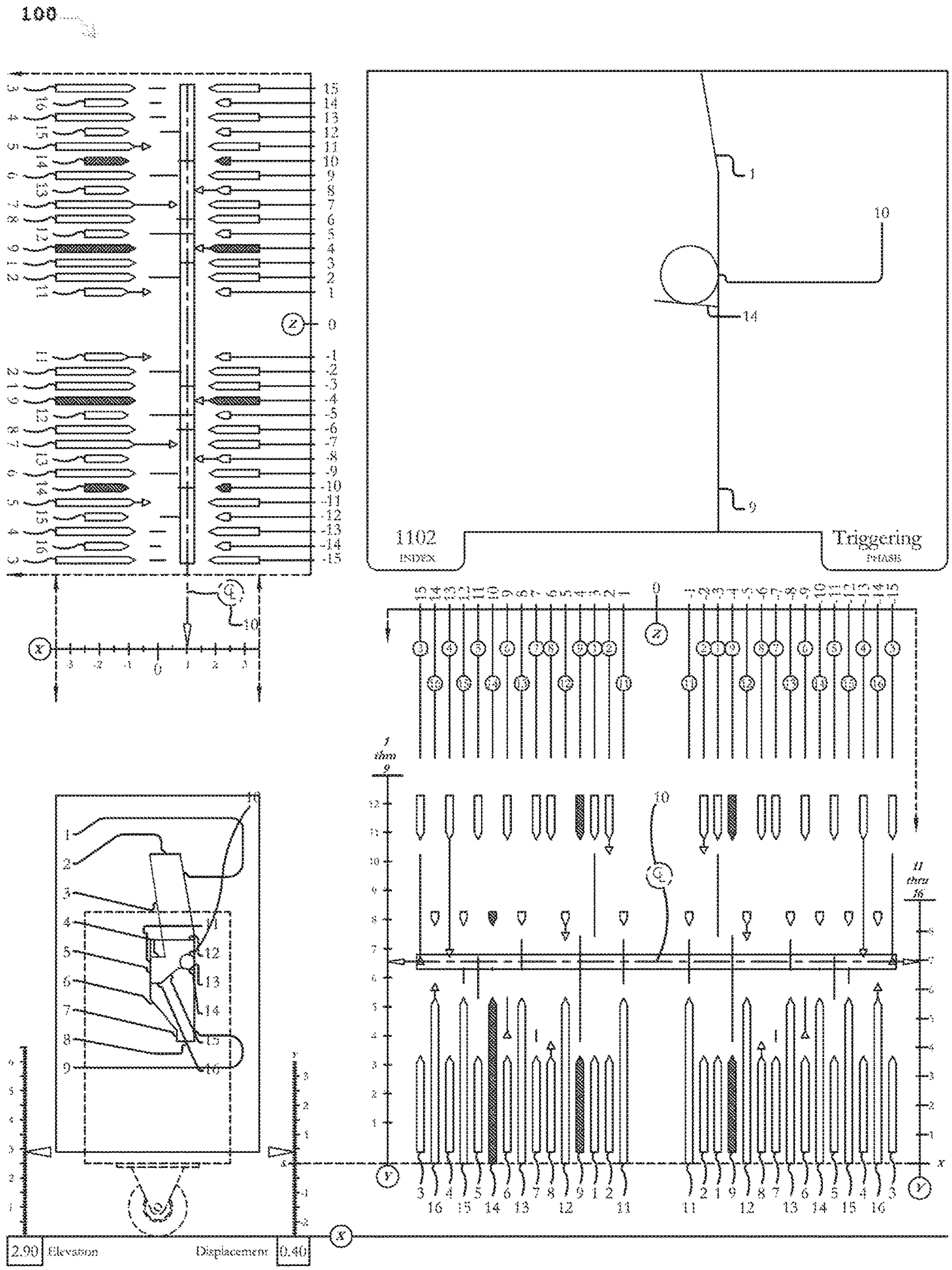
Figure 105:
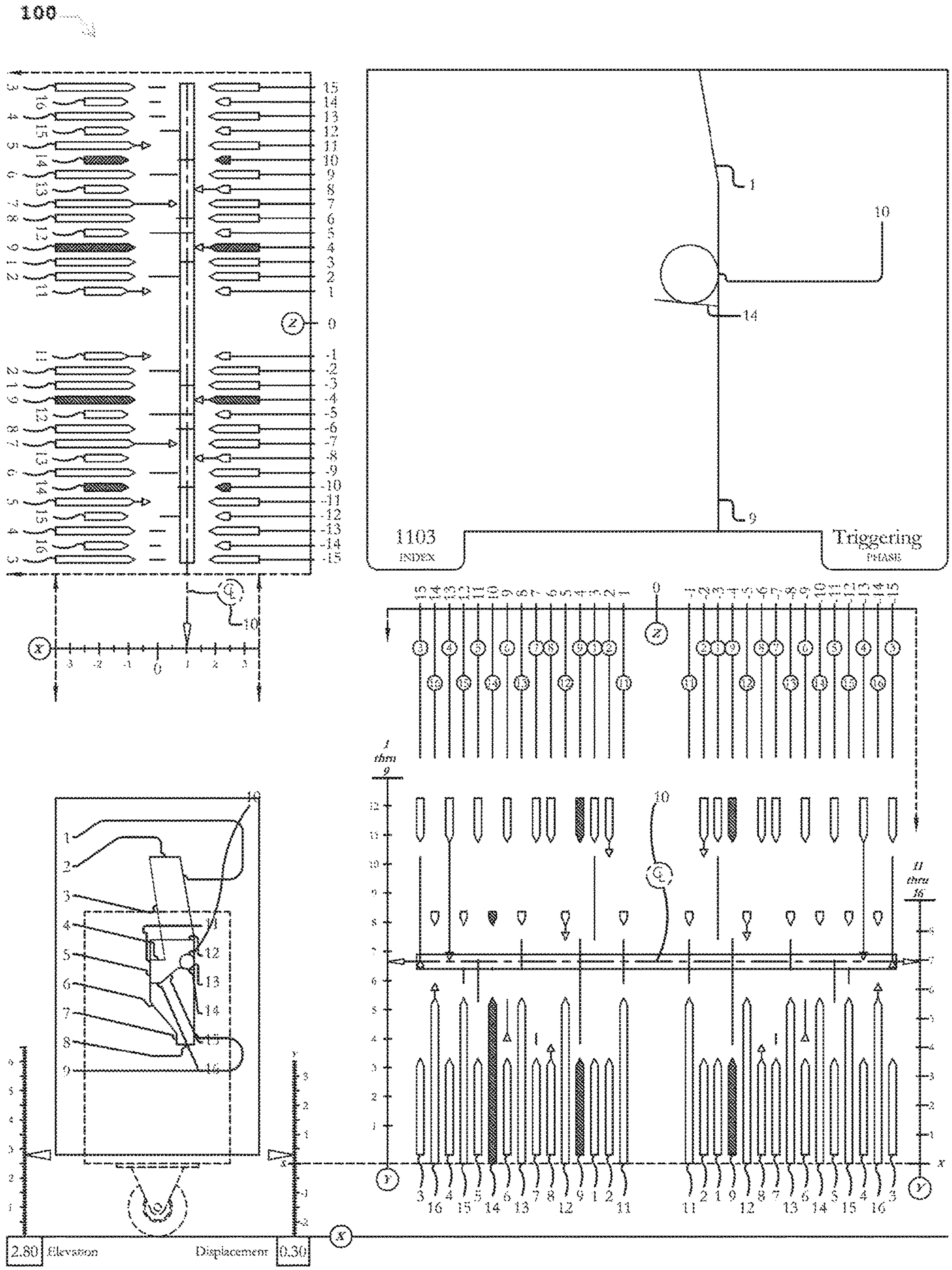
Figure 106:
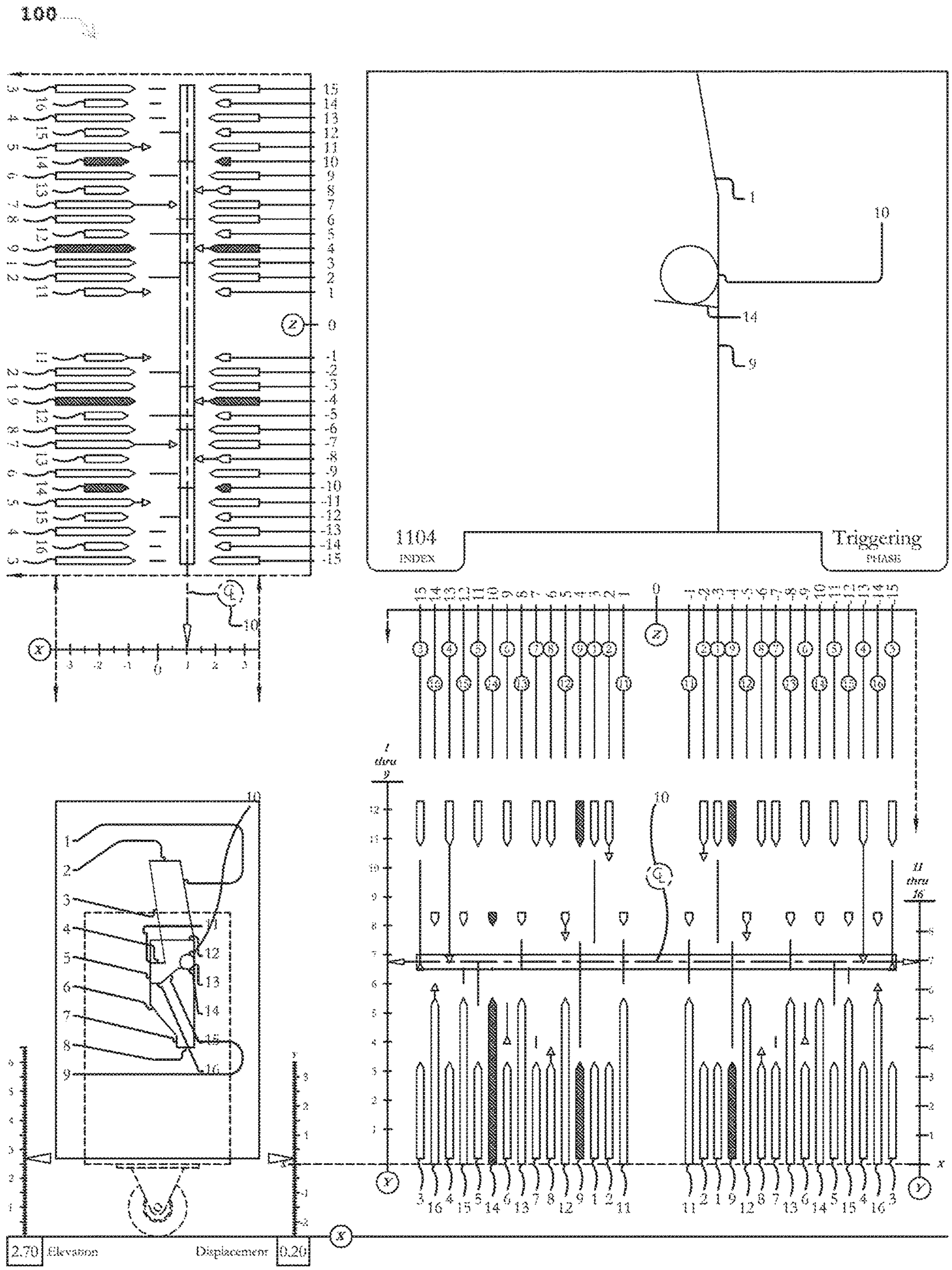
Figure 107:
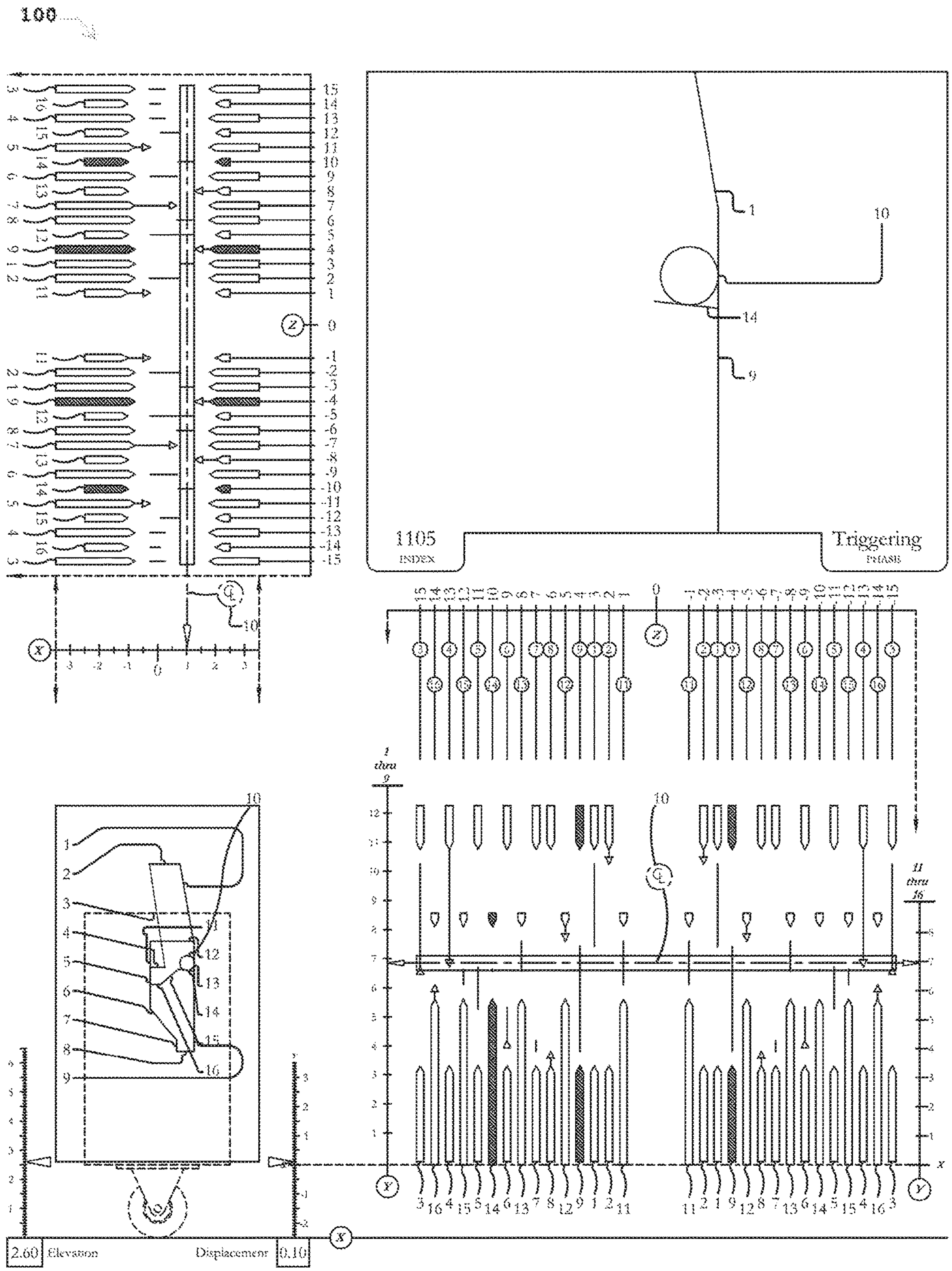
Figure 108:
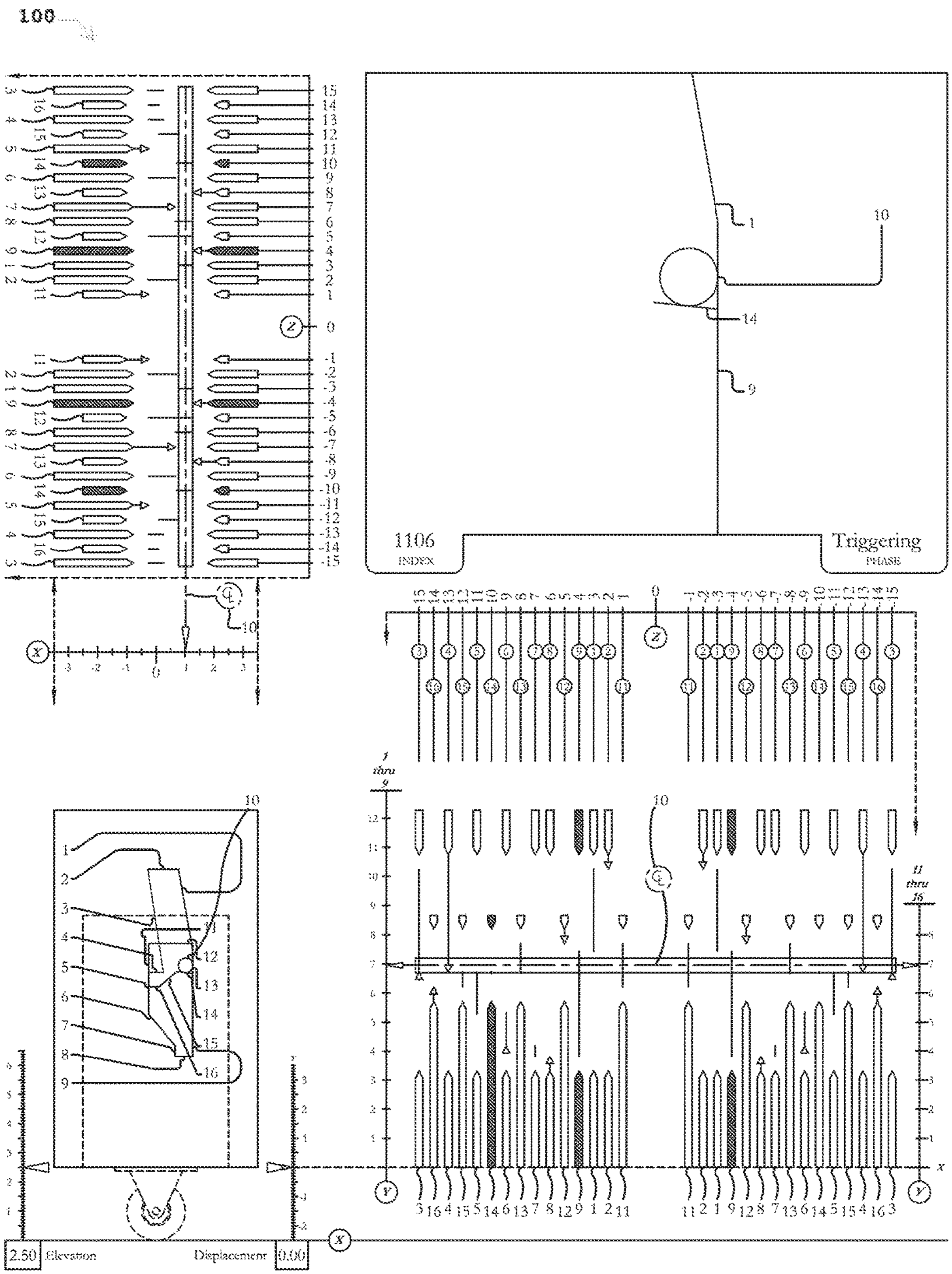
Figure 109:
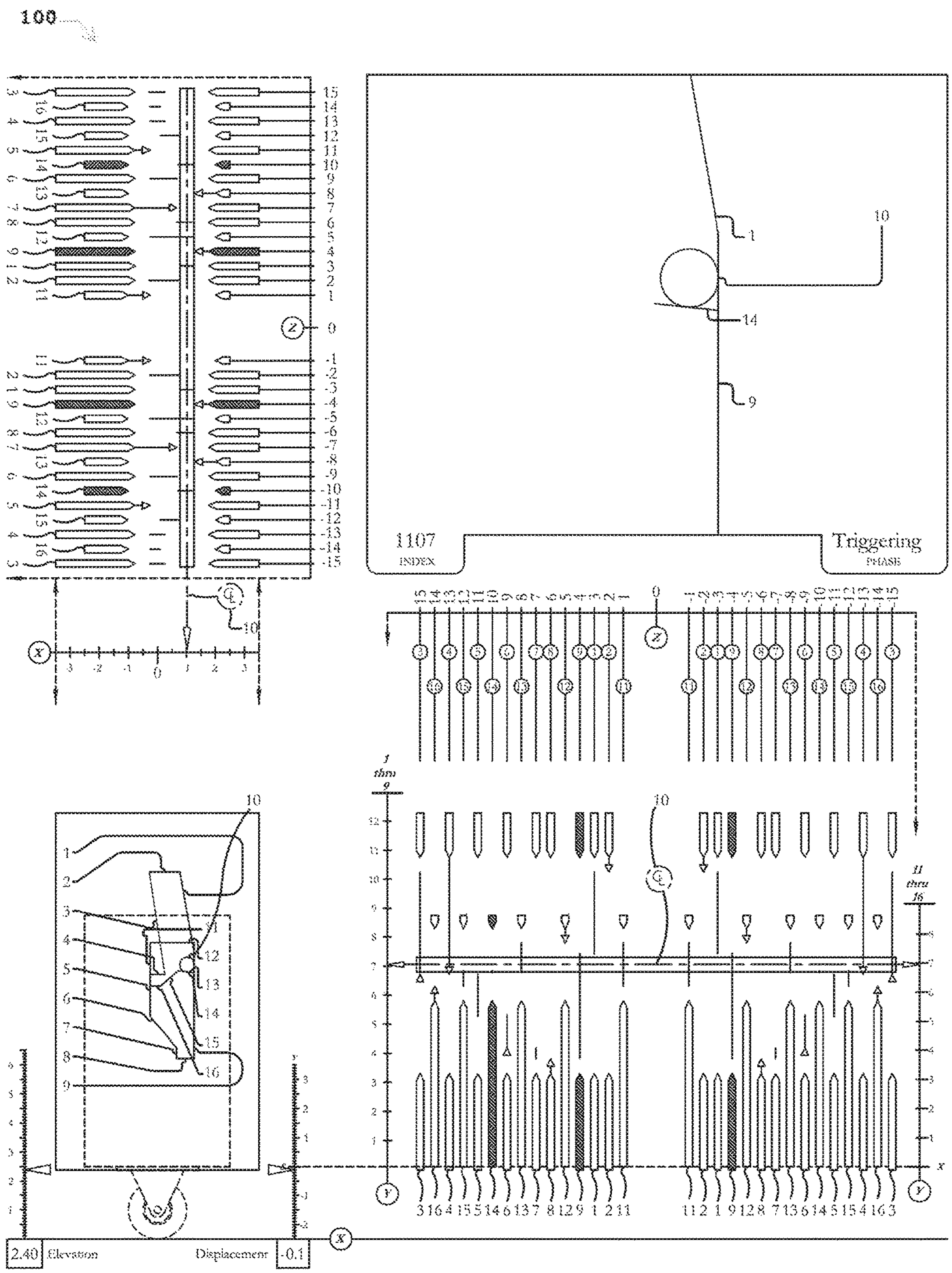
Figure 110:
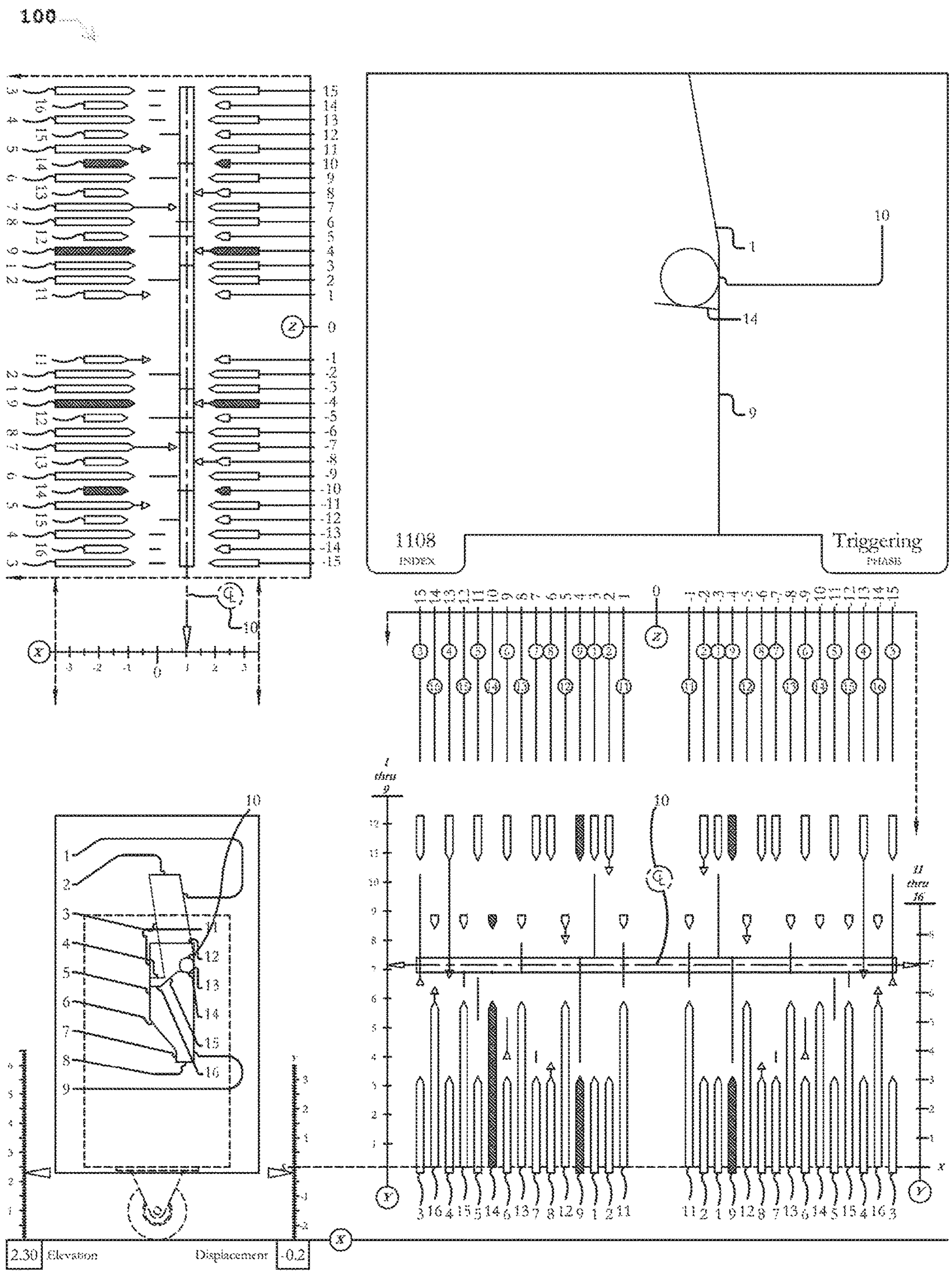
Figure 111:
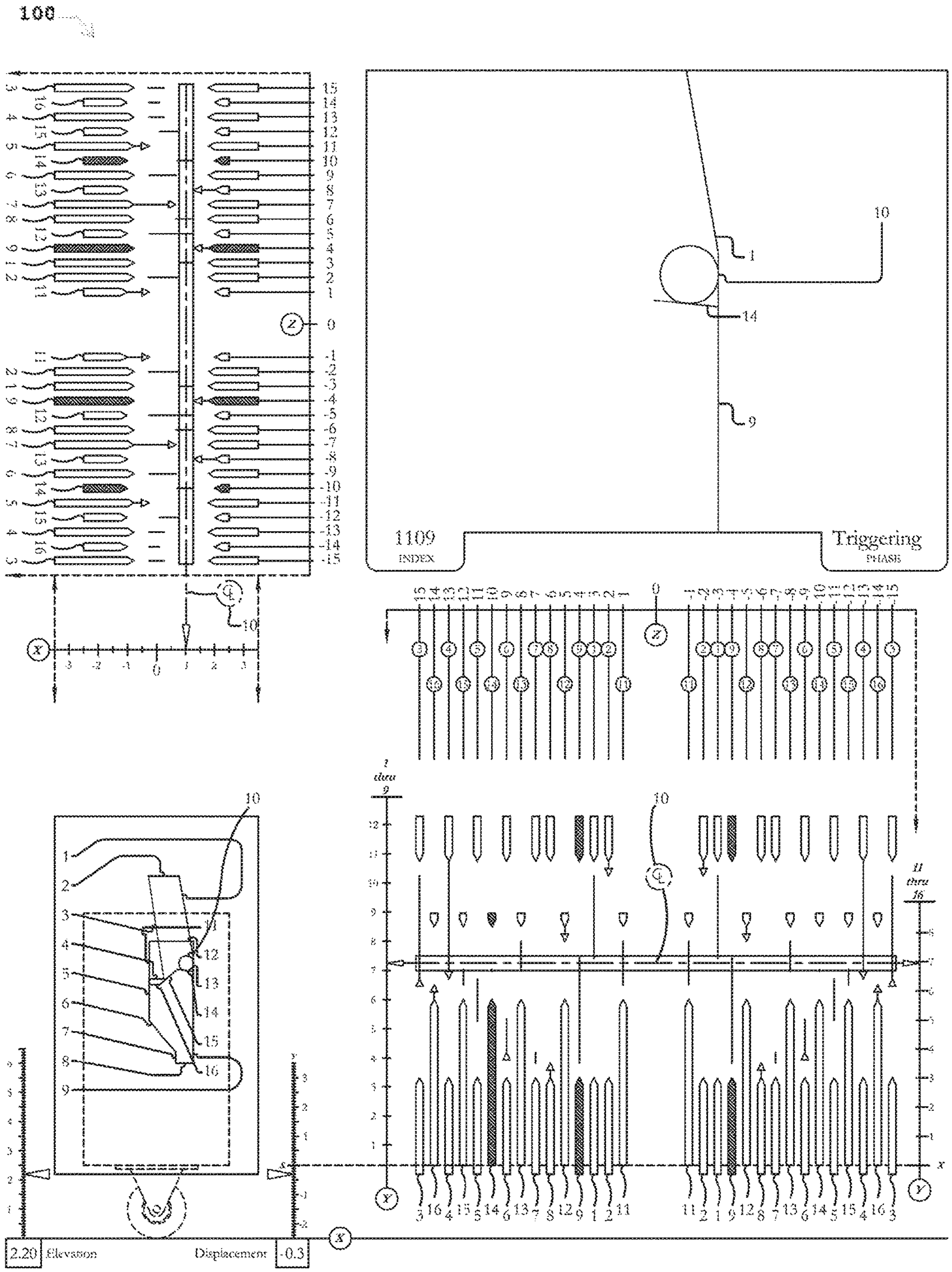
Figure 112:
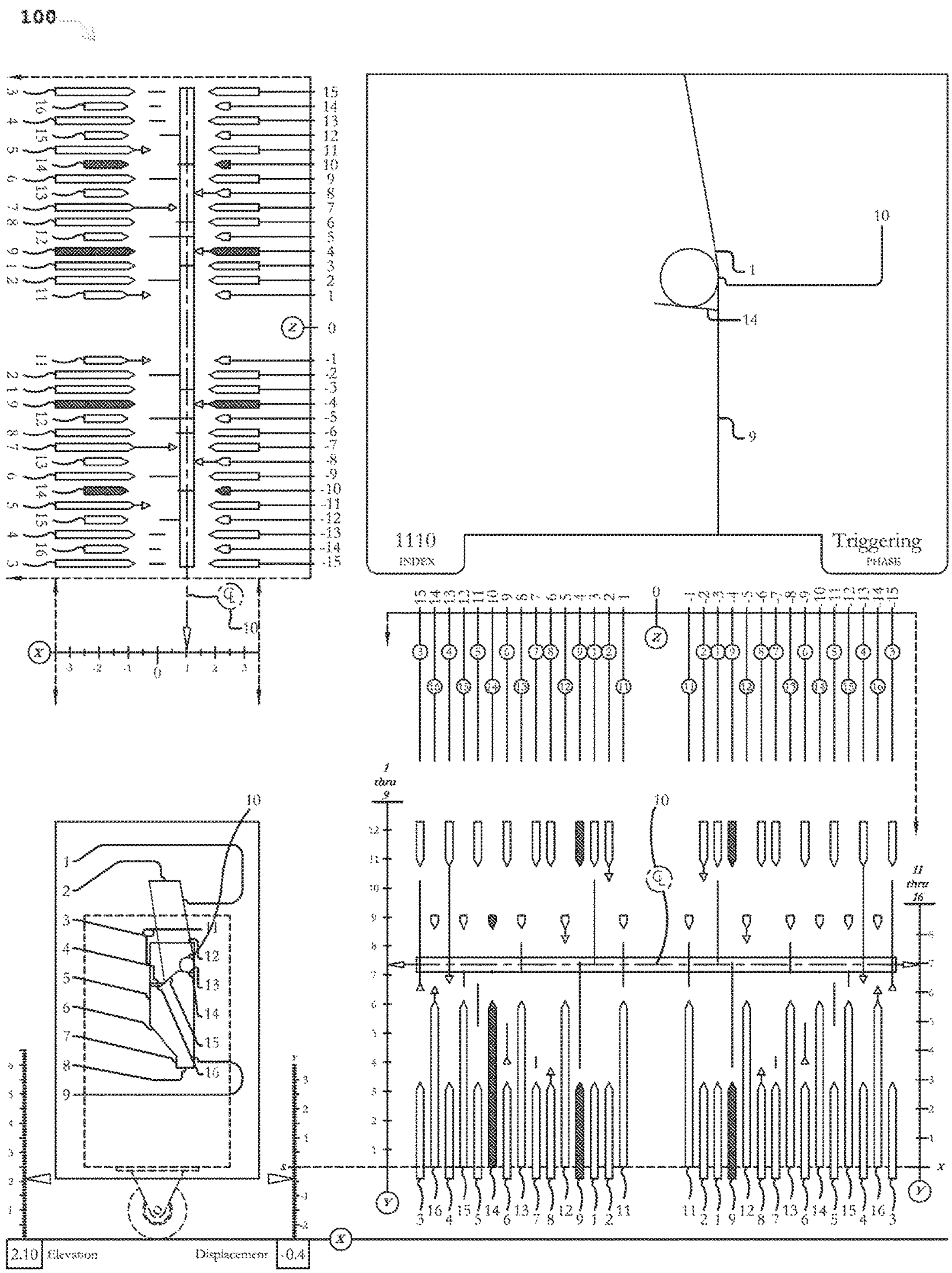
Figure 113:
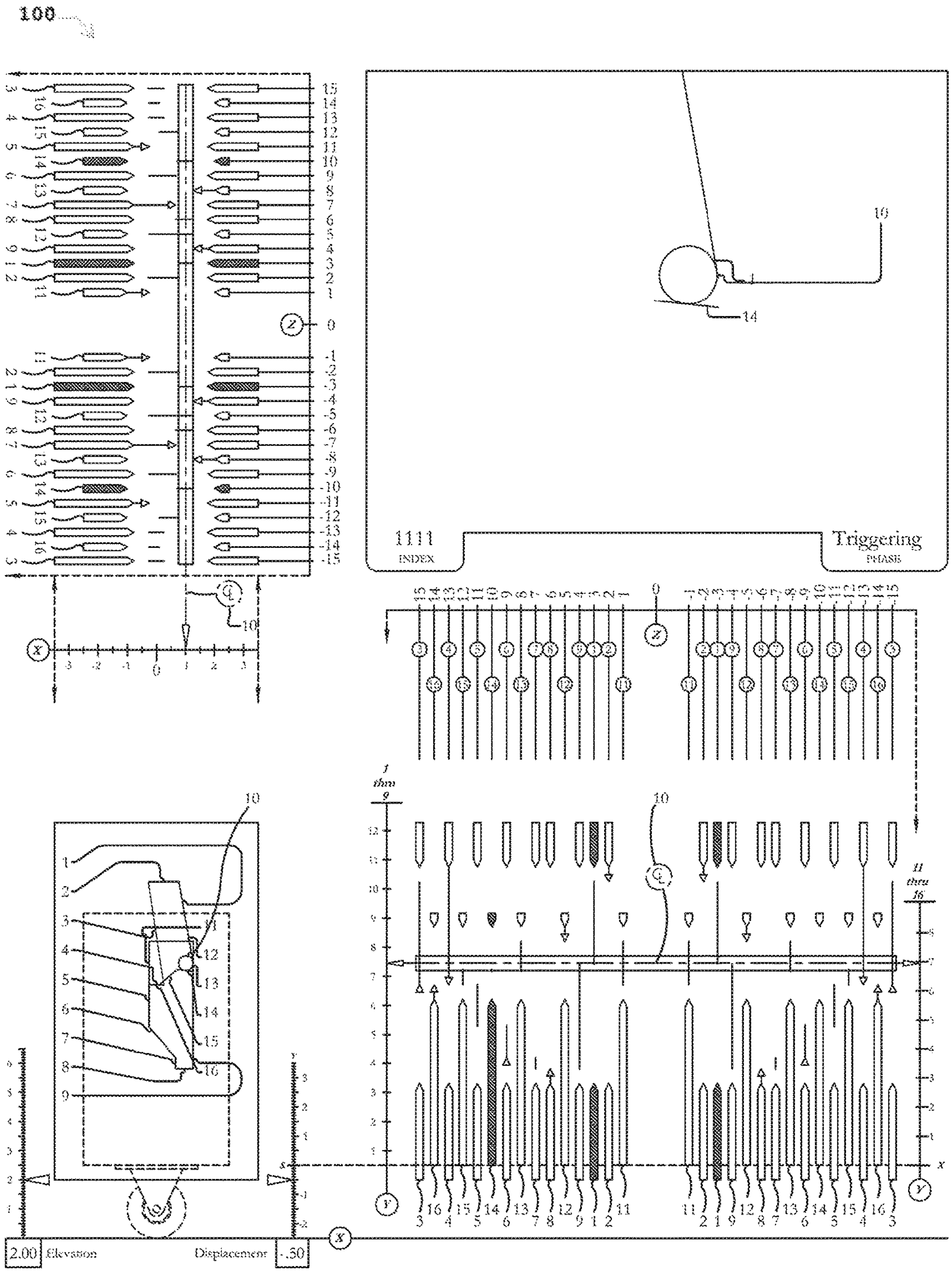
Figure 114:
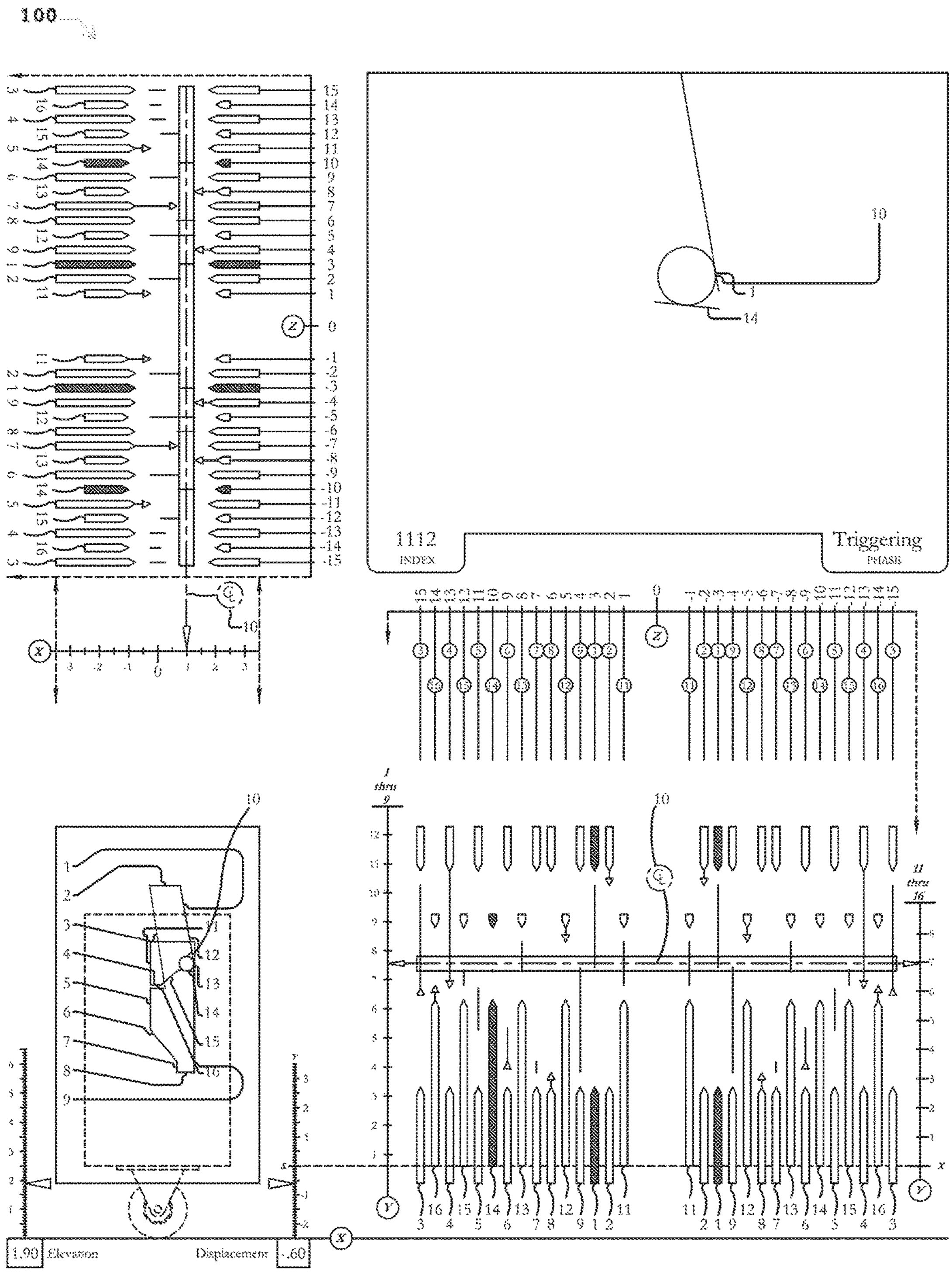
Figure 115:
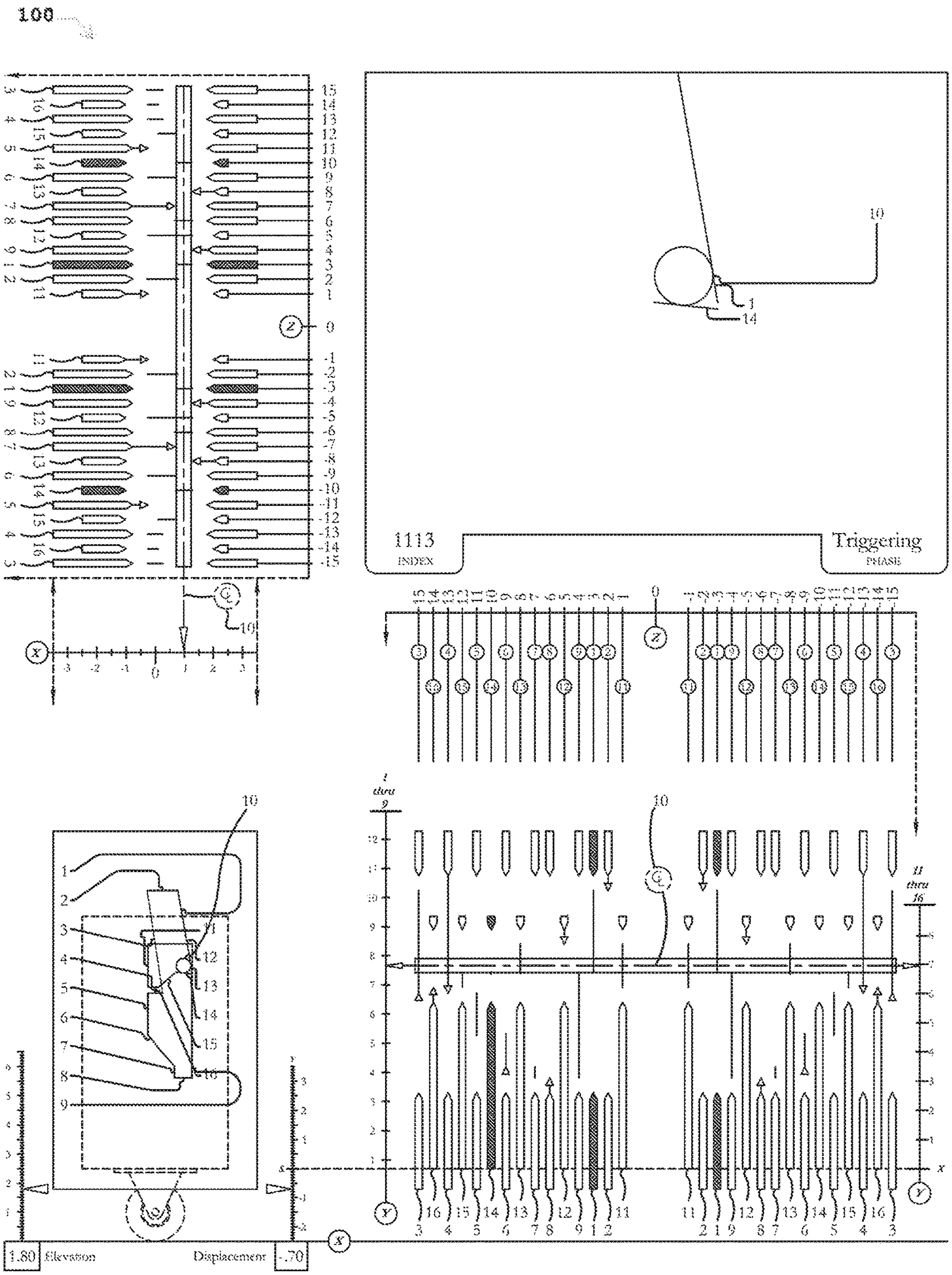
Figure 116:
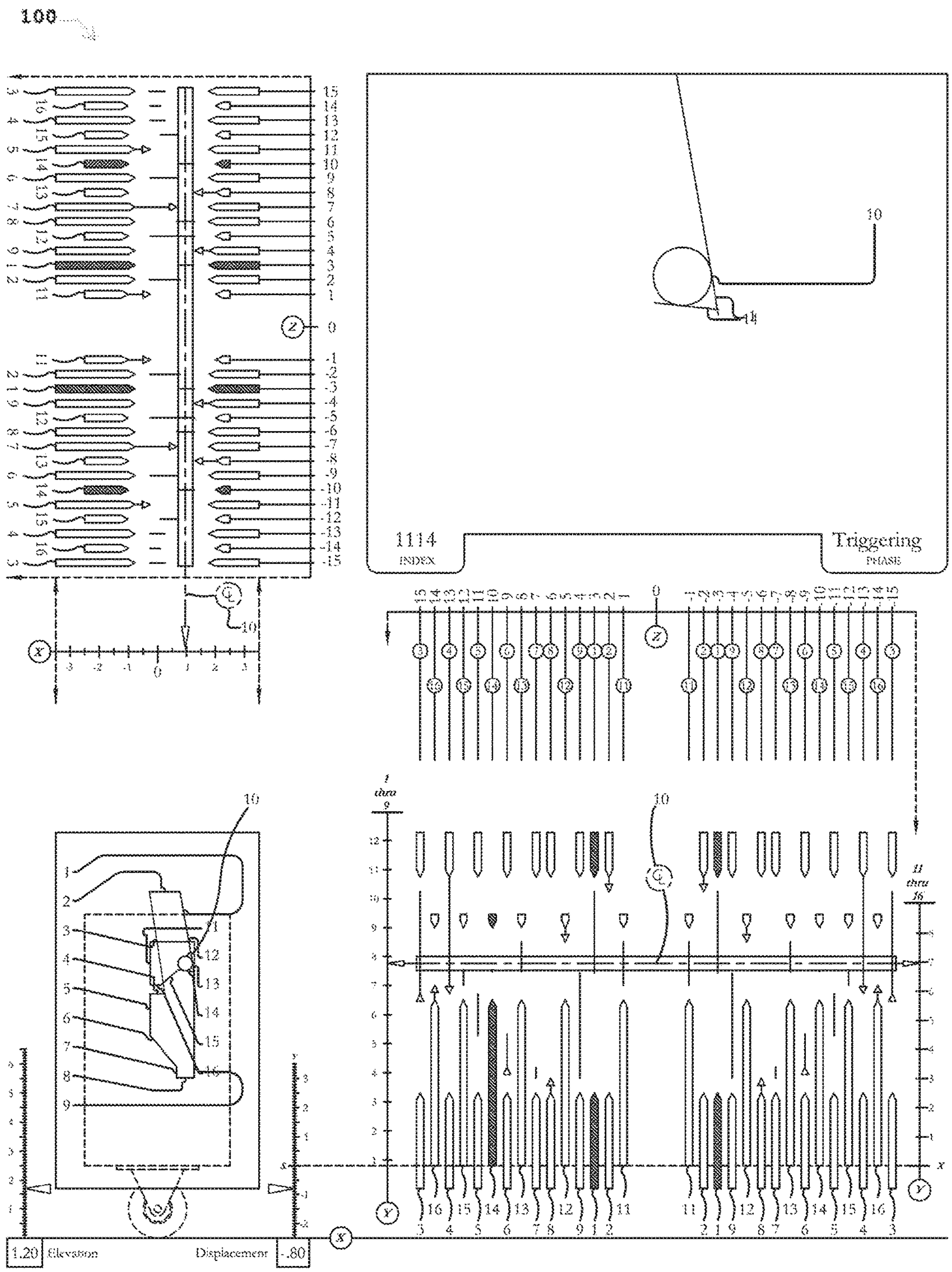
Figure 117:
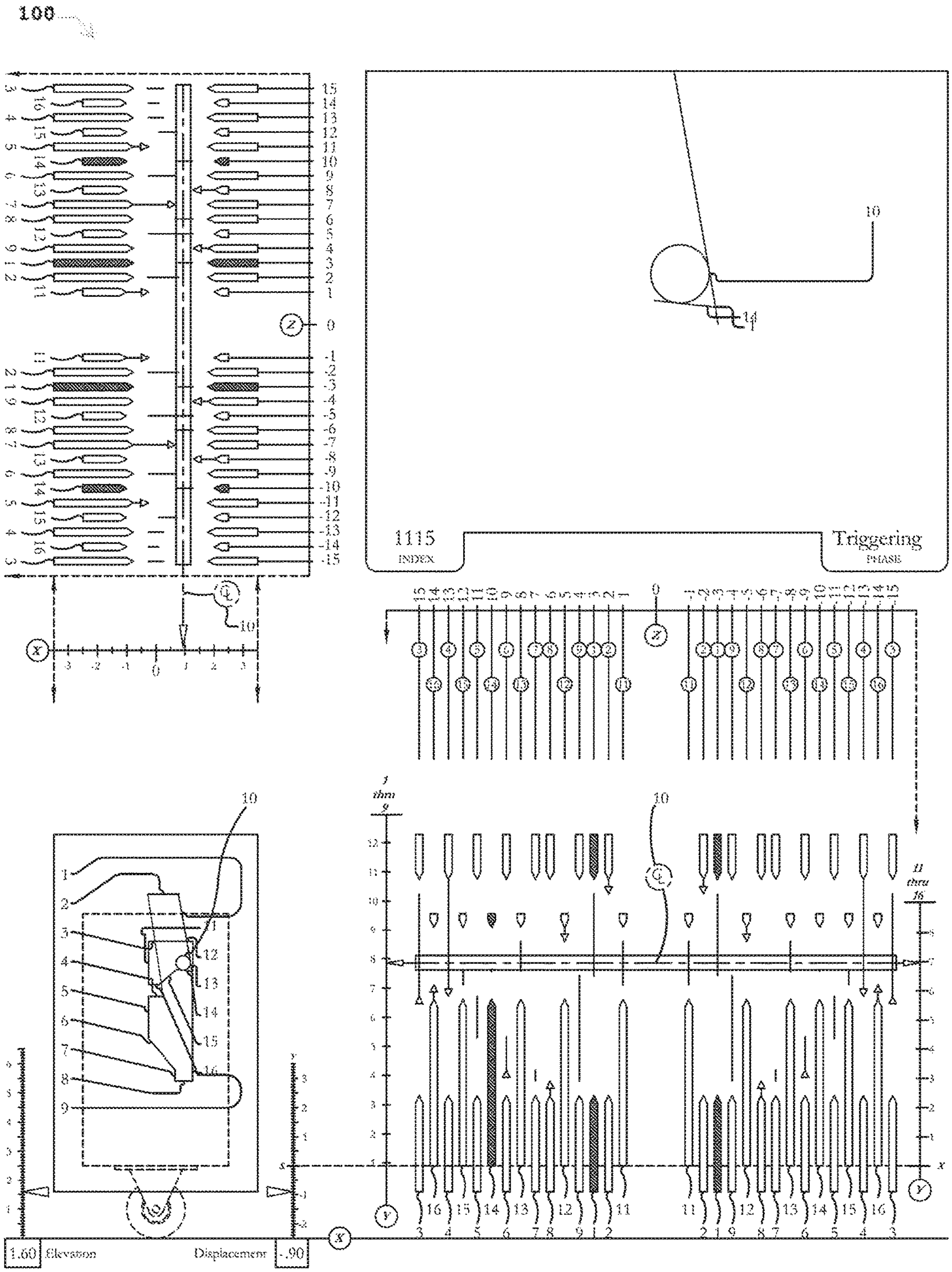
Figure 118:
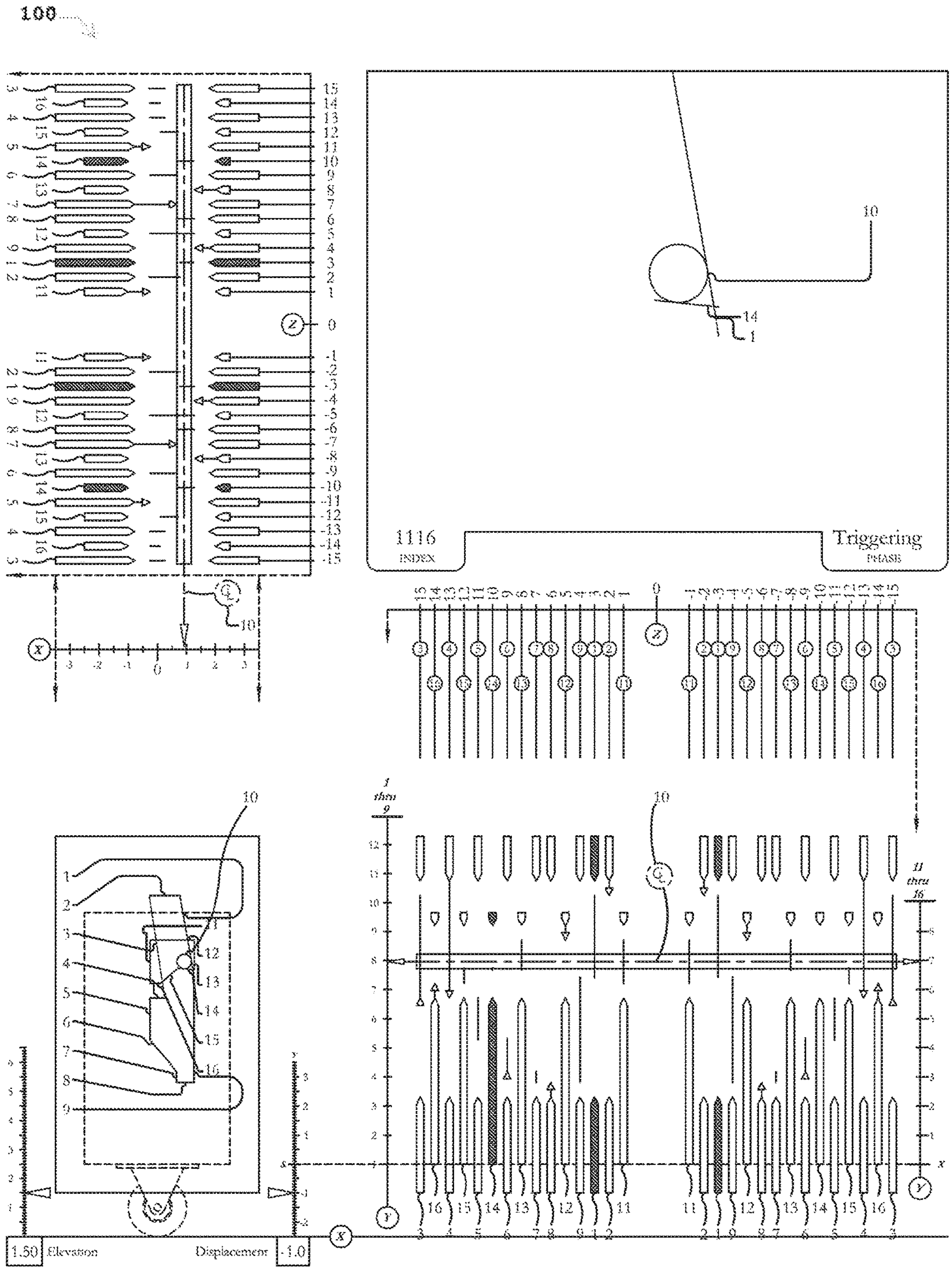
Figure 119:
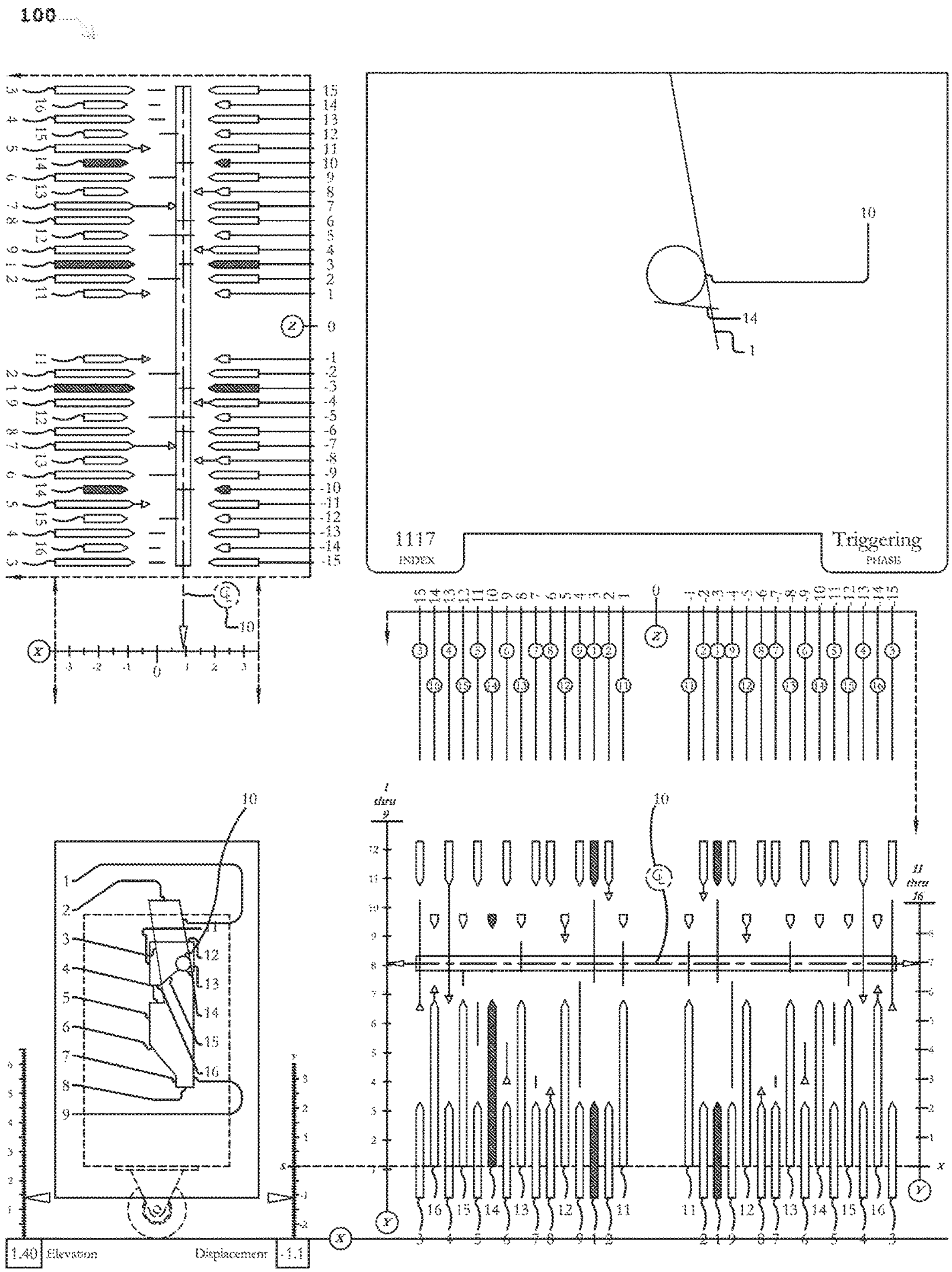
Figure 120:
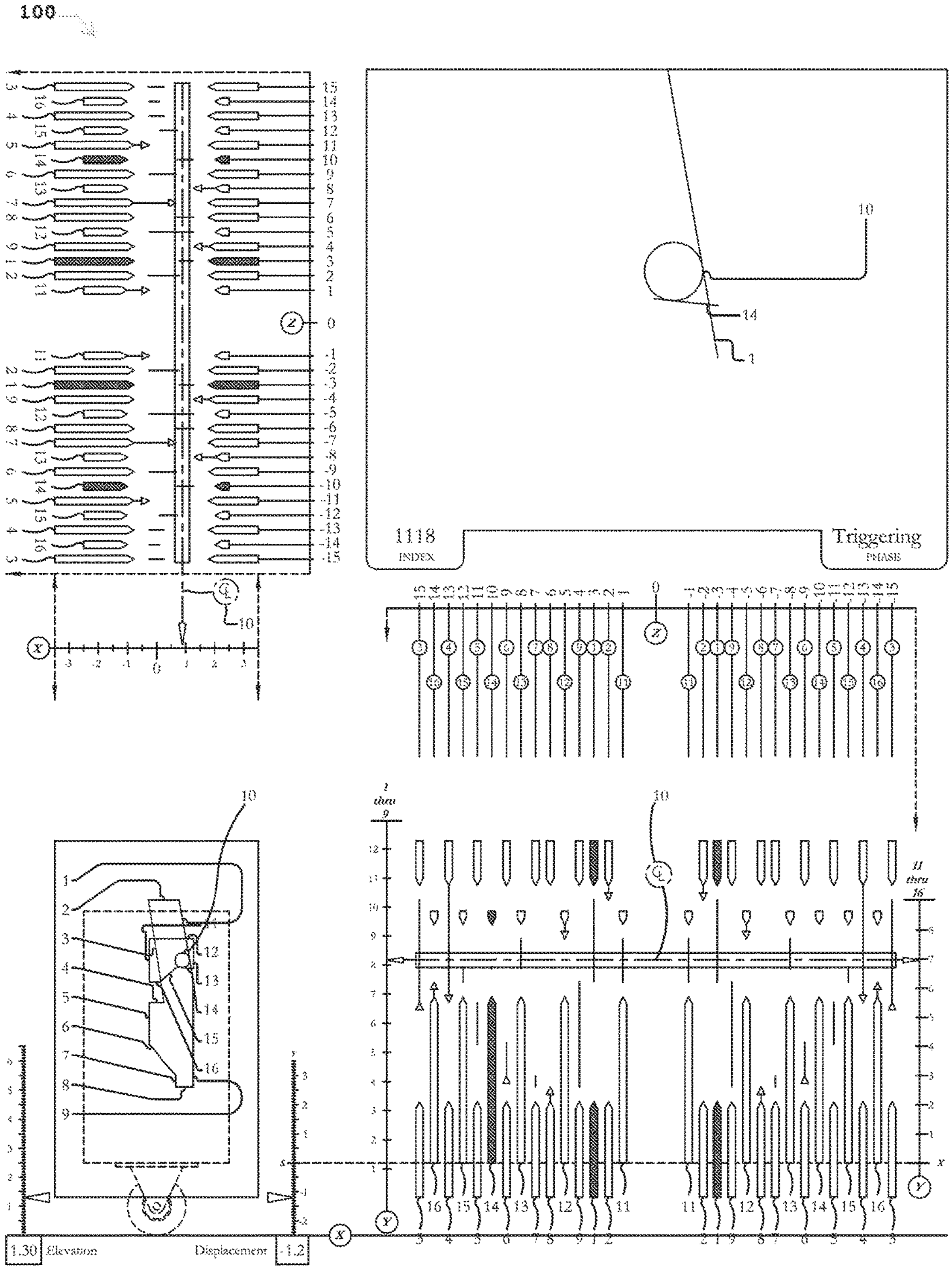
Figure 121:
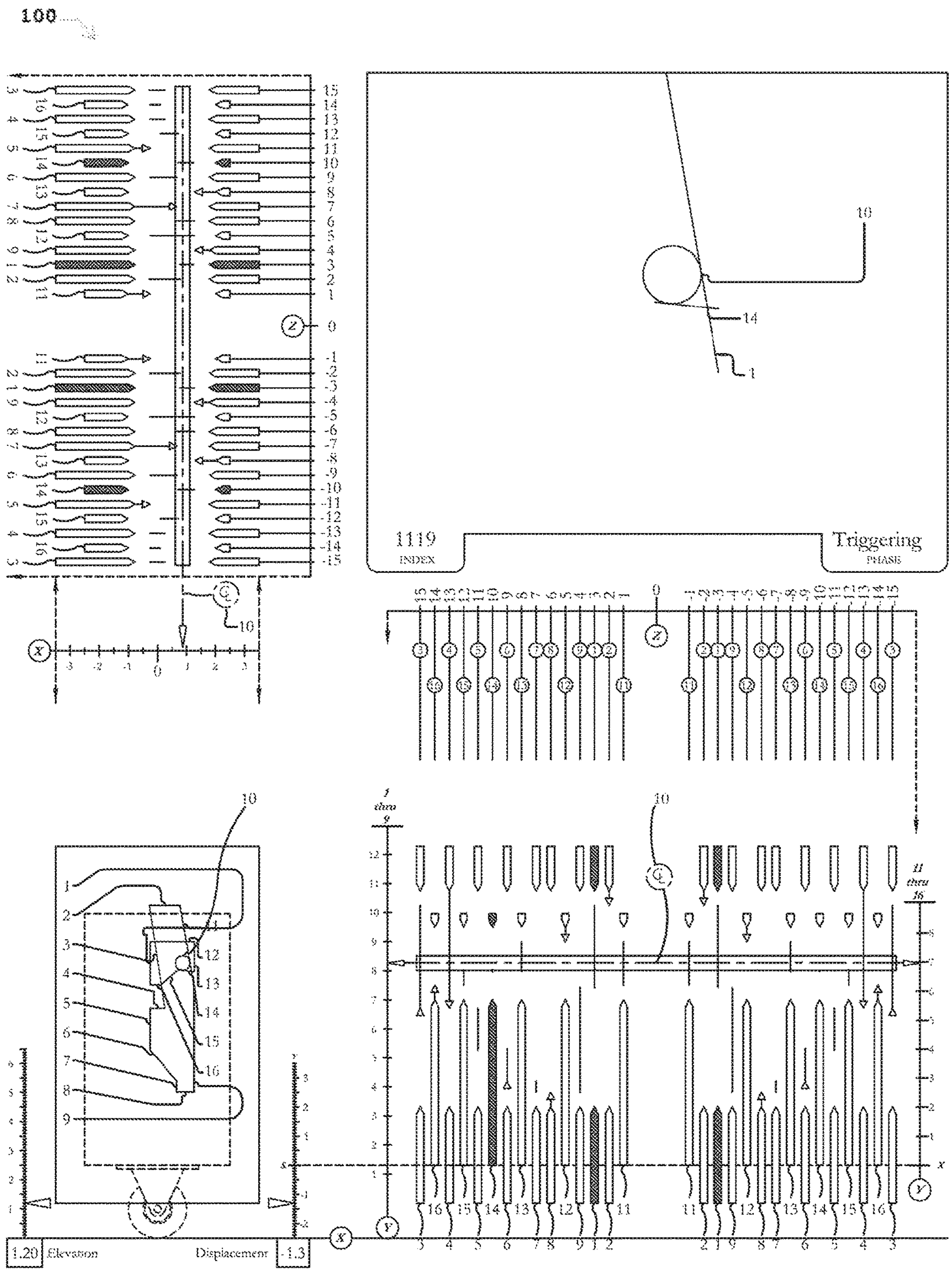
Figure 122:
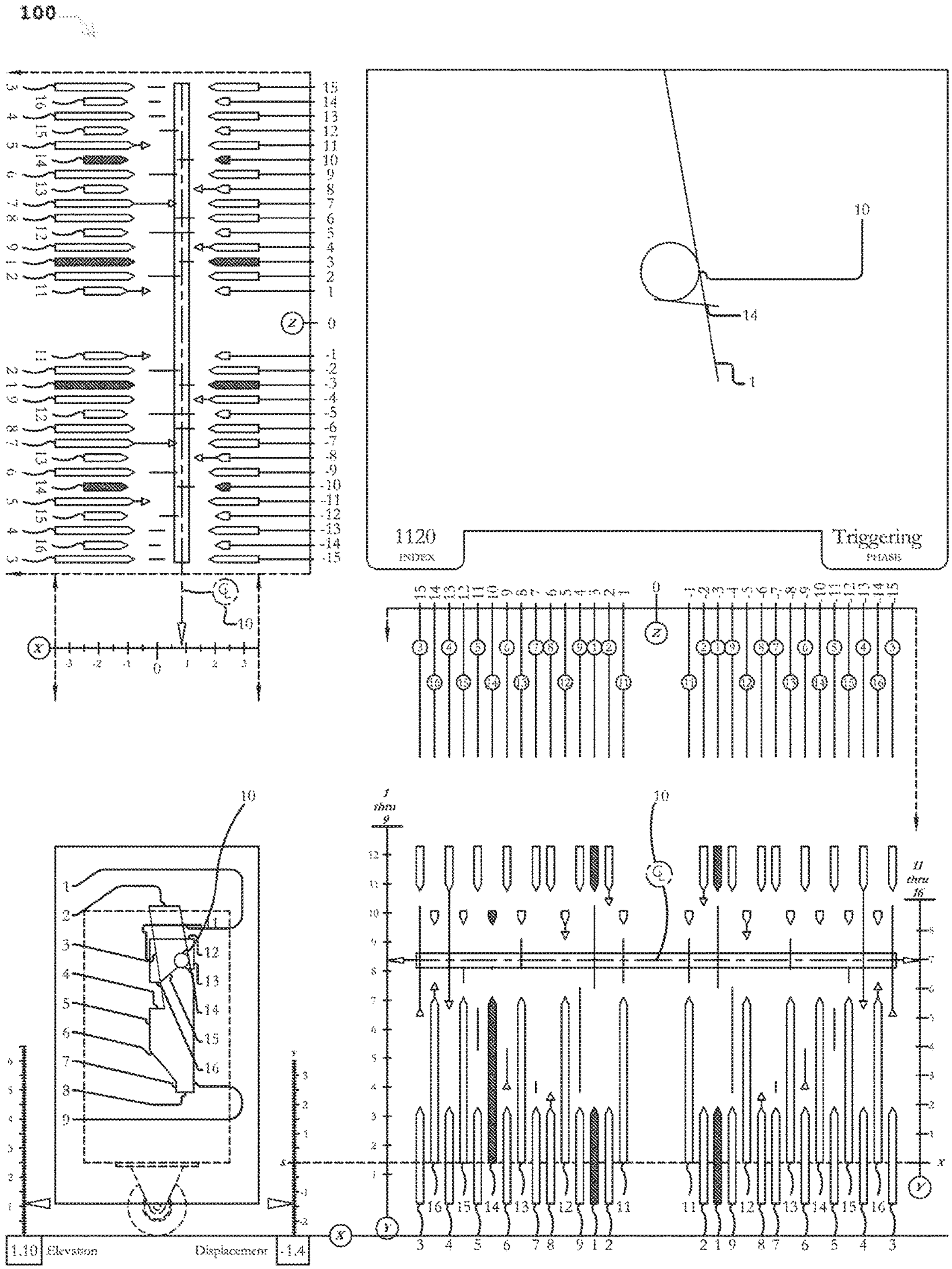
Figure 123:
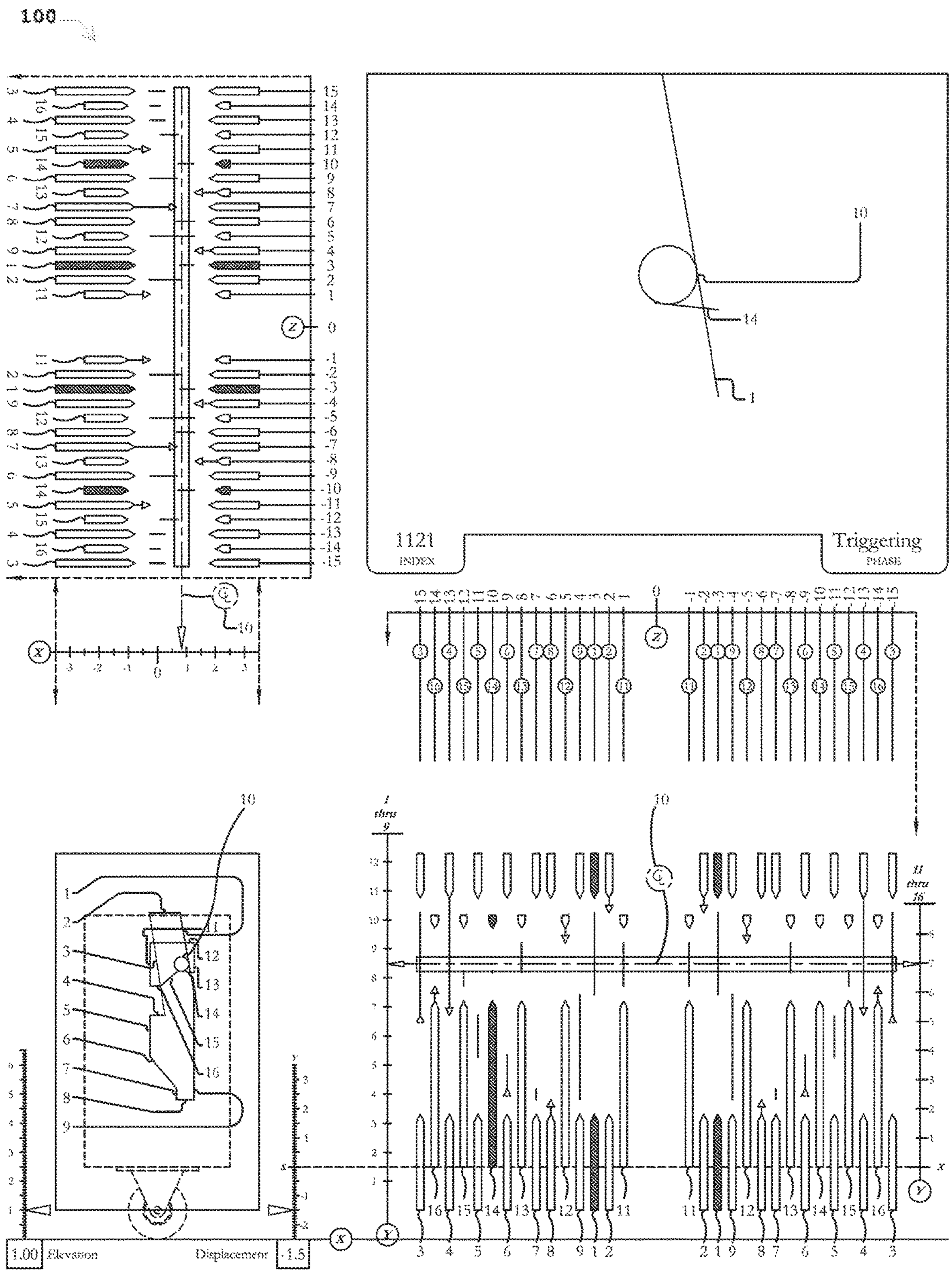
Figure 124:
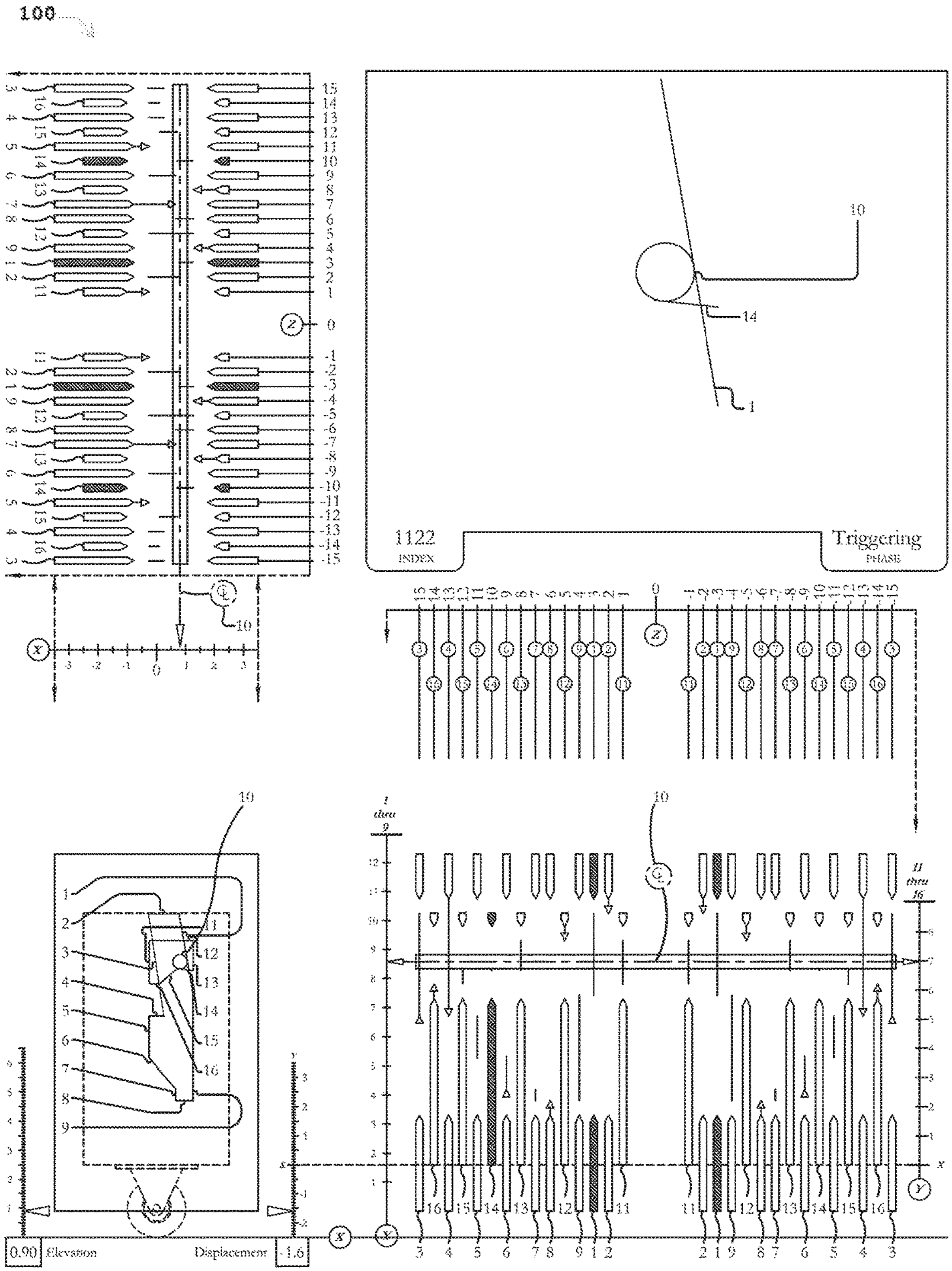
Figure 125:
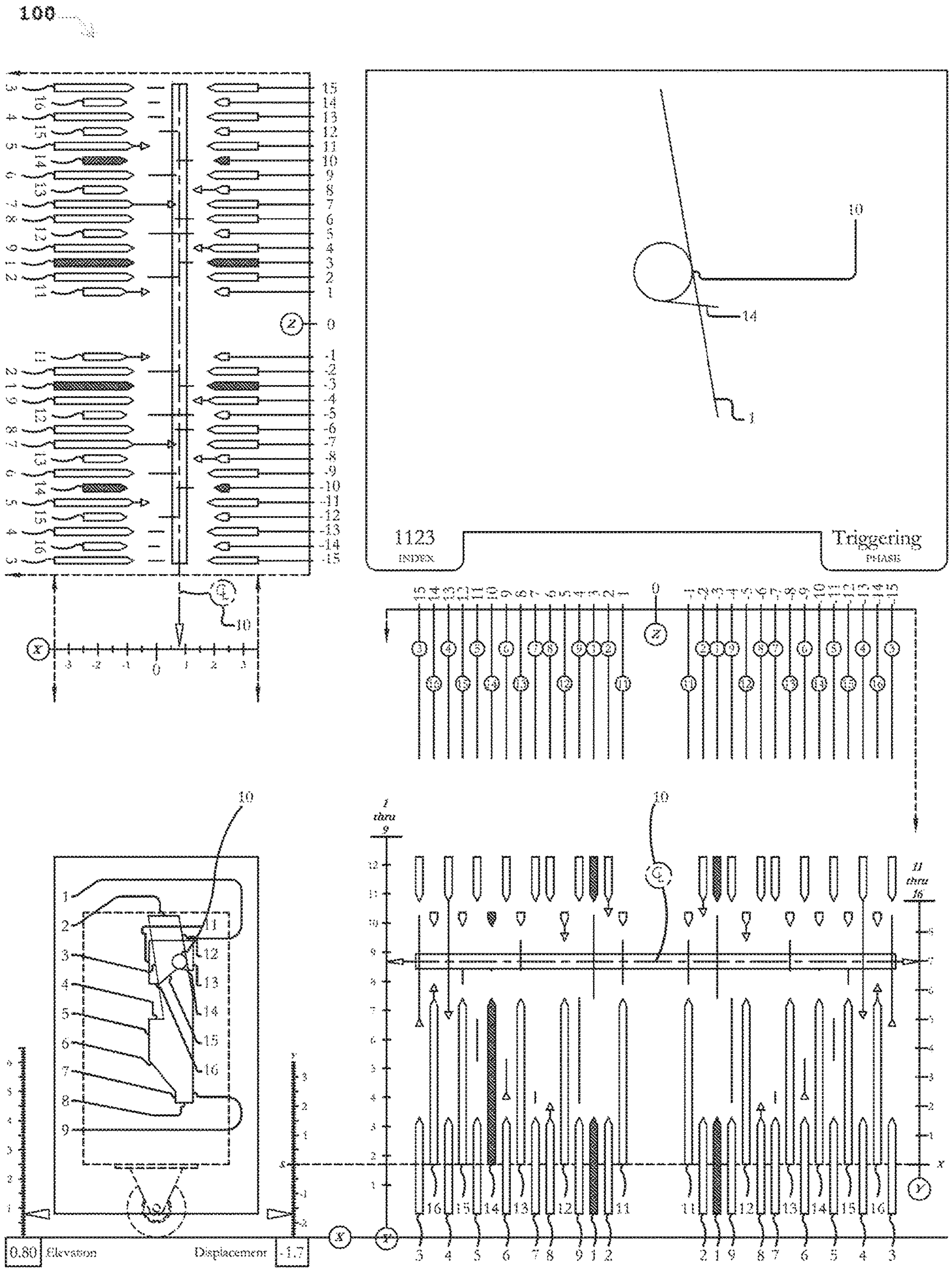
Figure 126:
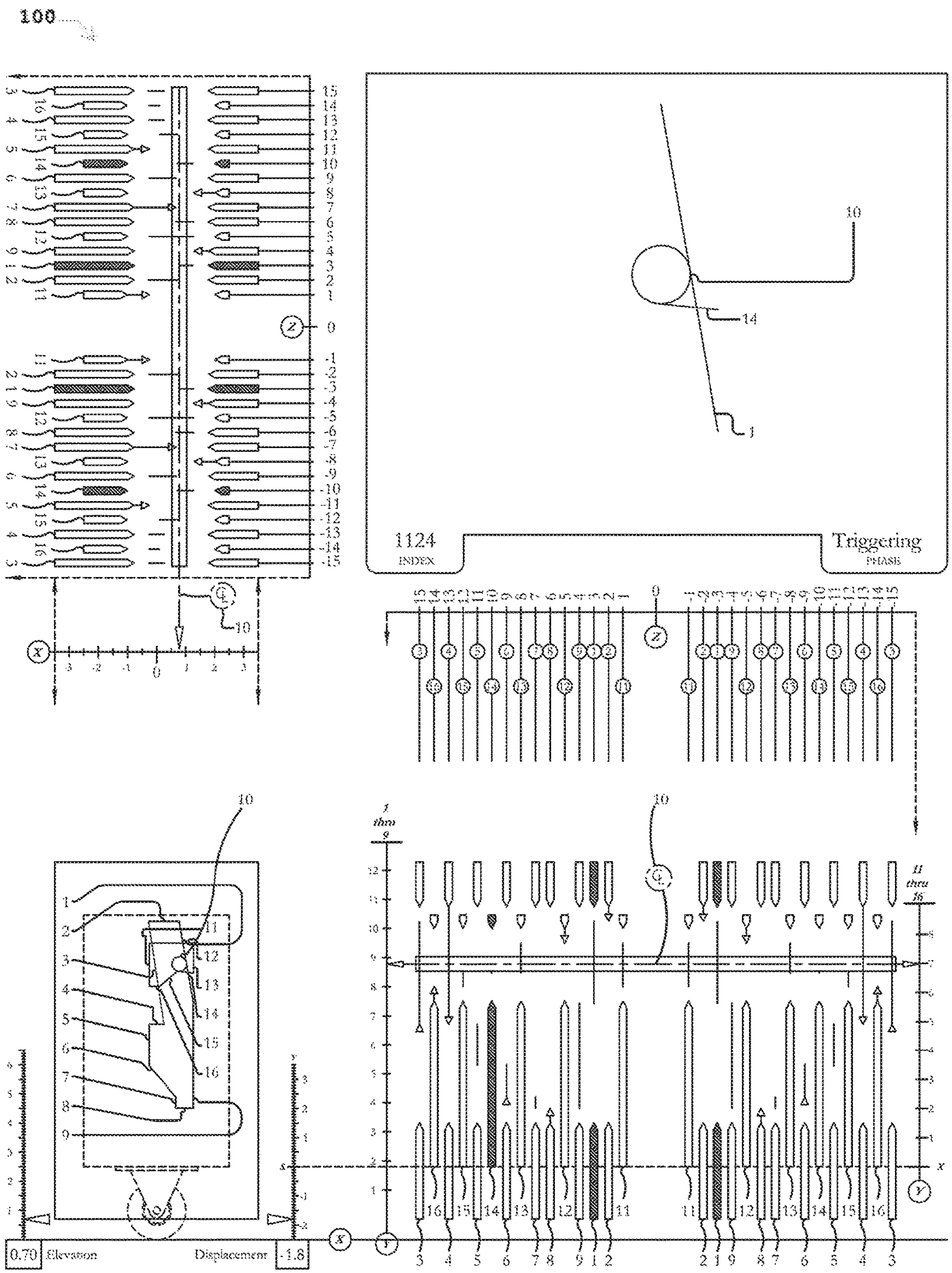
Figure 127:
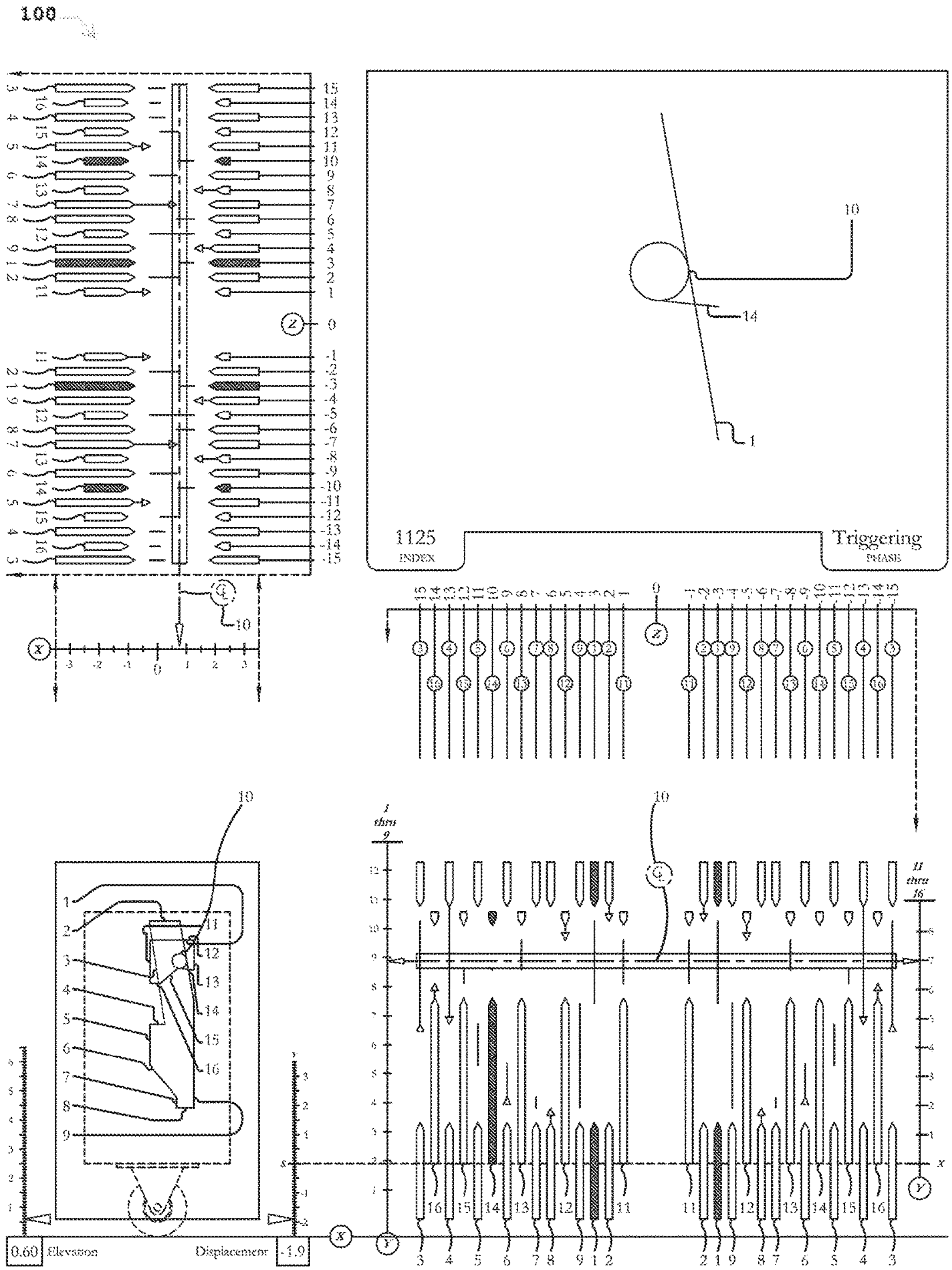
Figure 128:
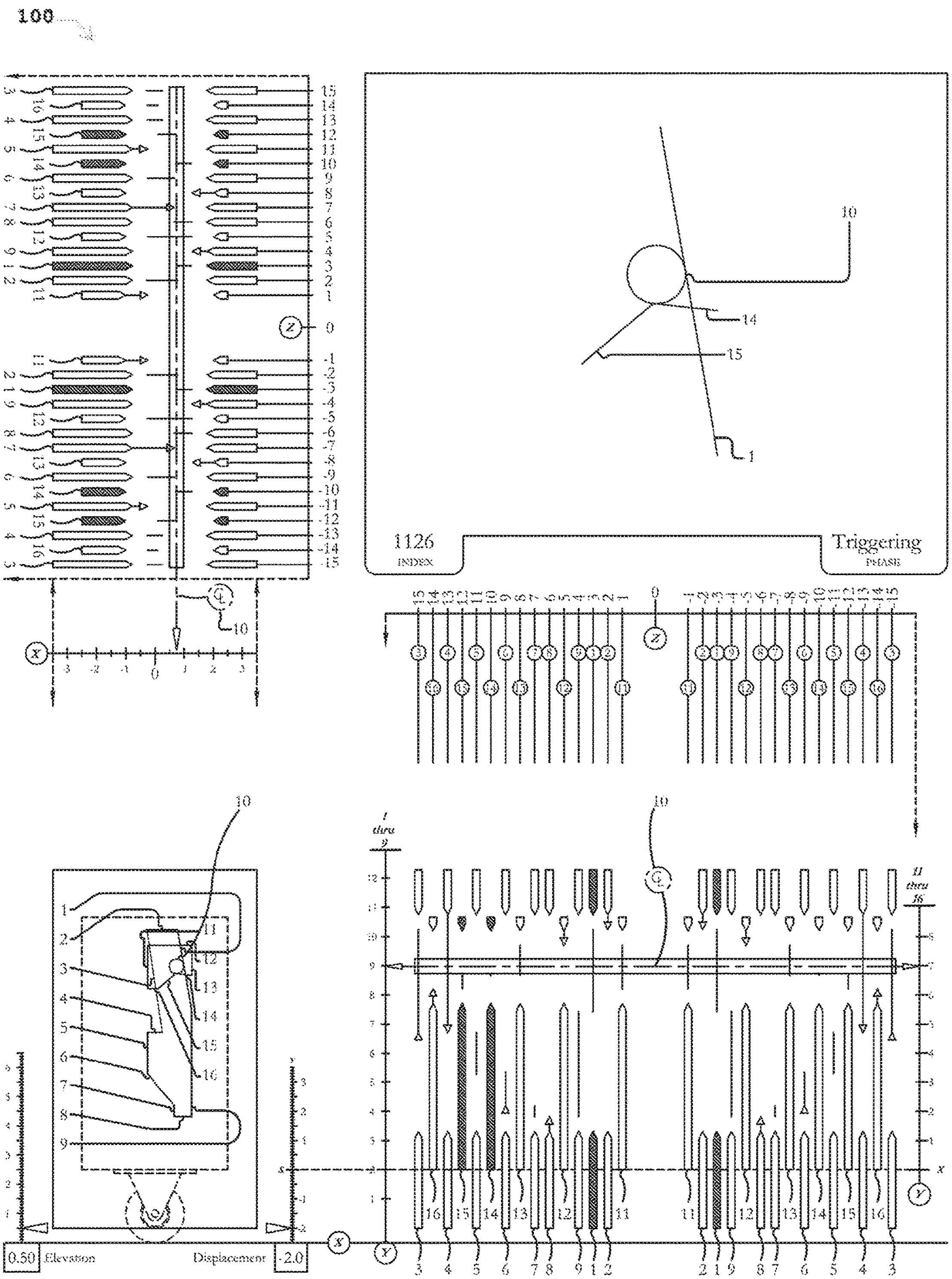
Figure 129:
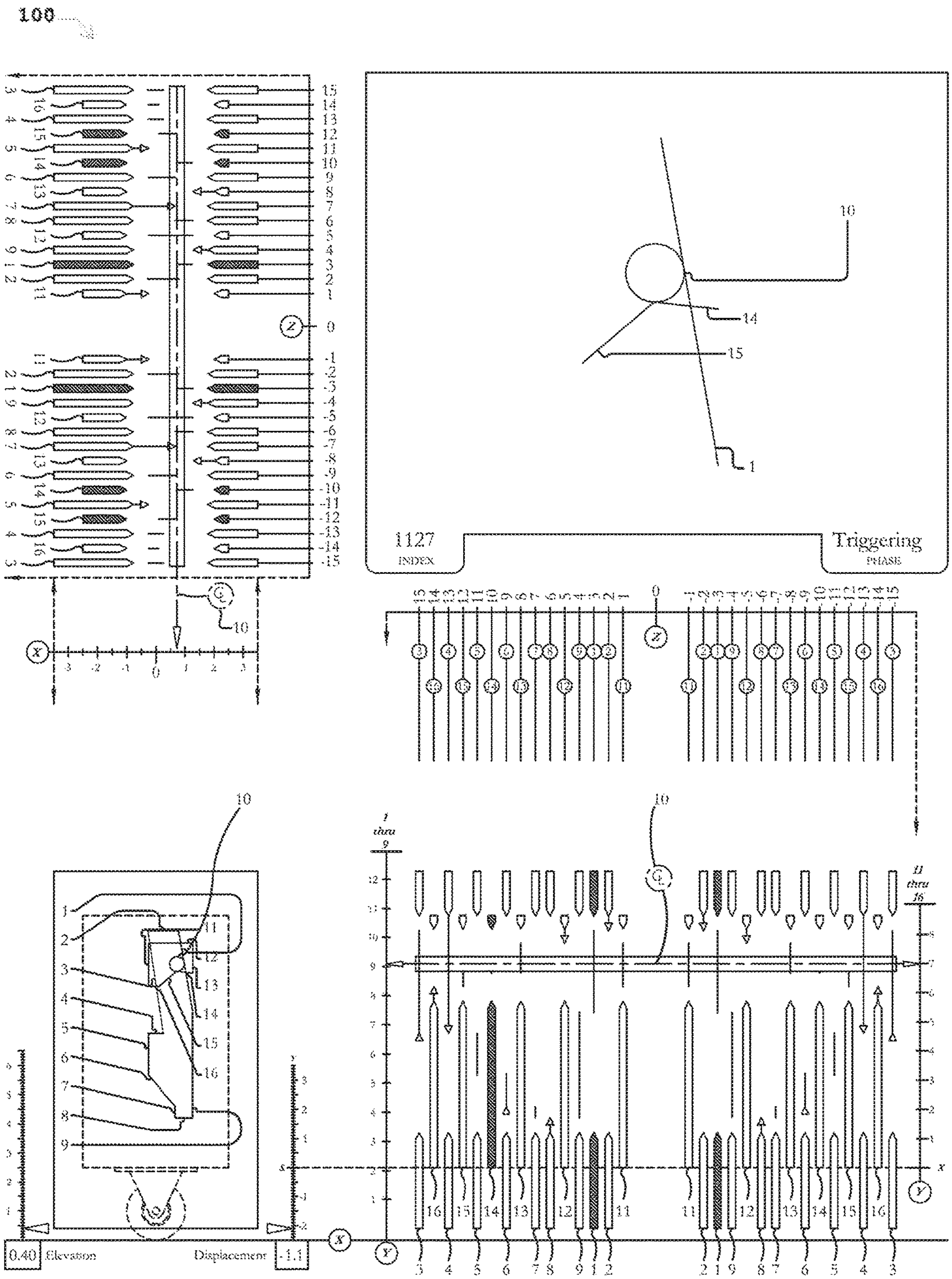
Figure 130:
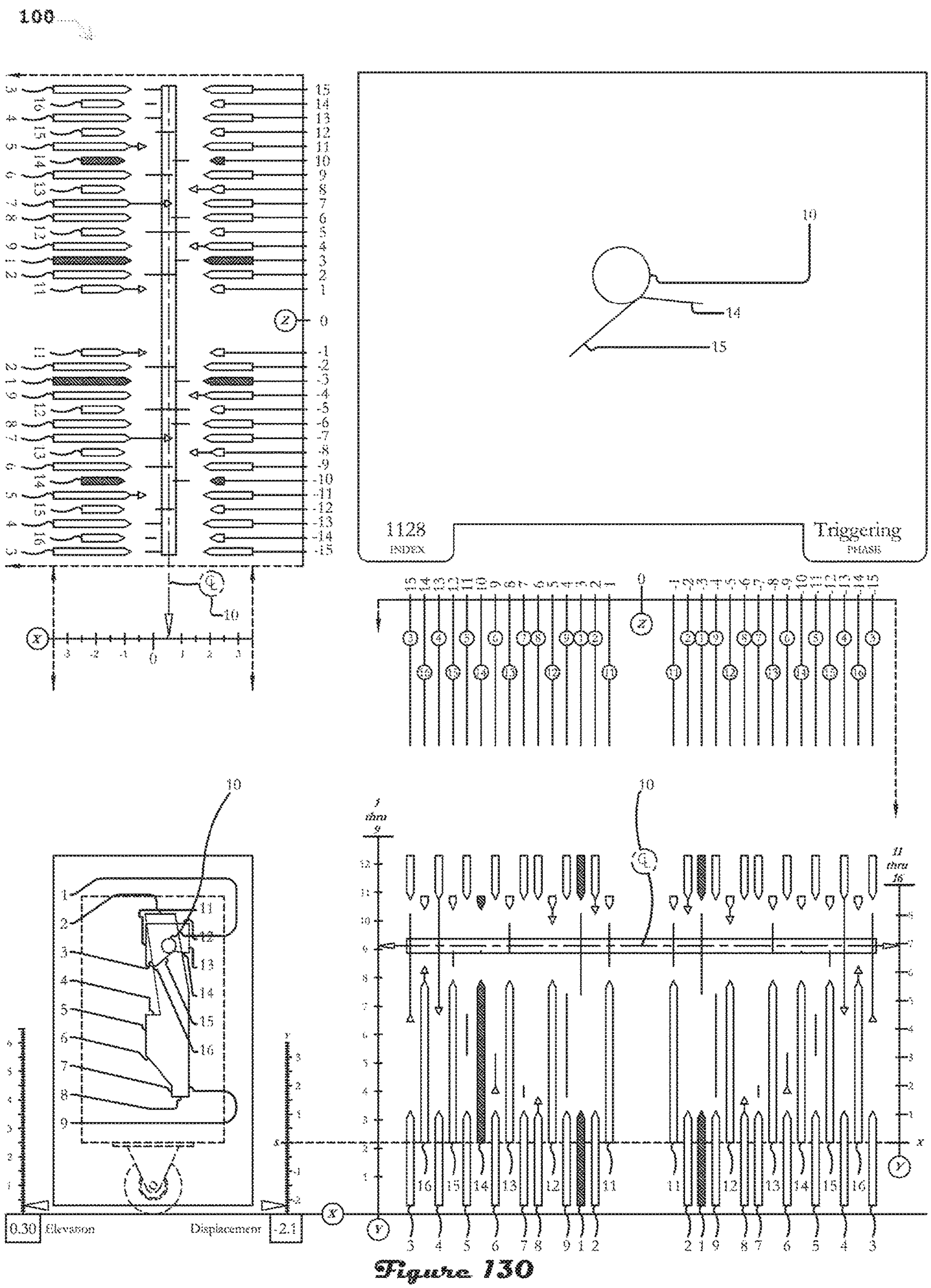
Figure 131:
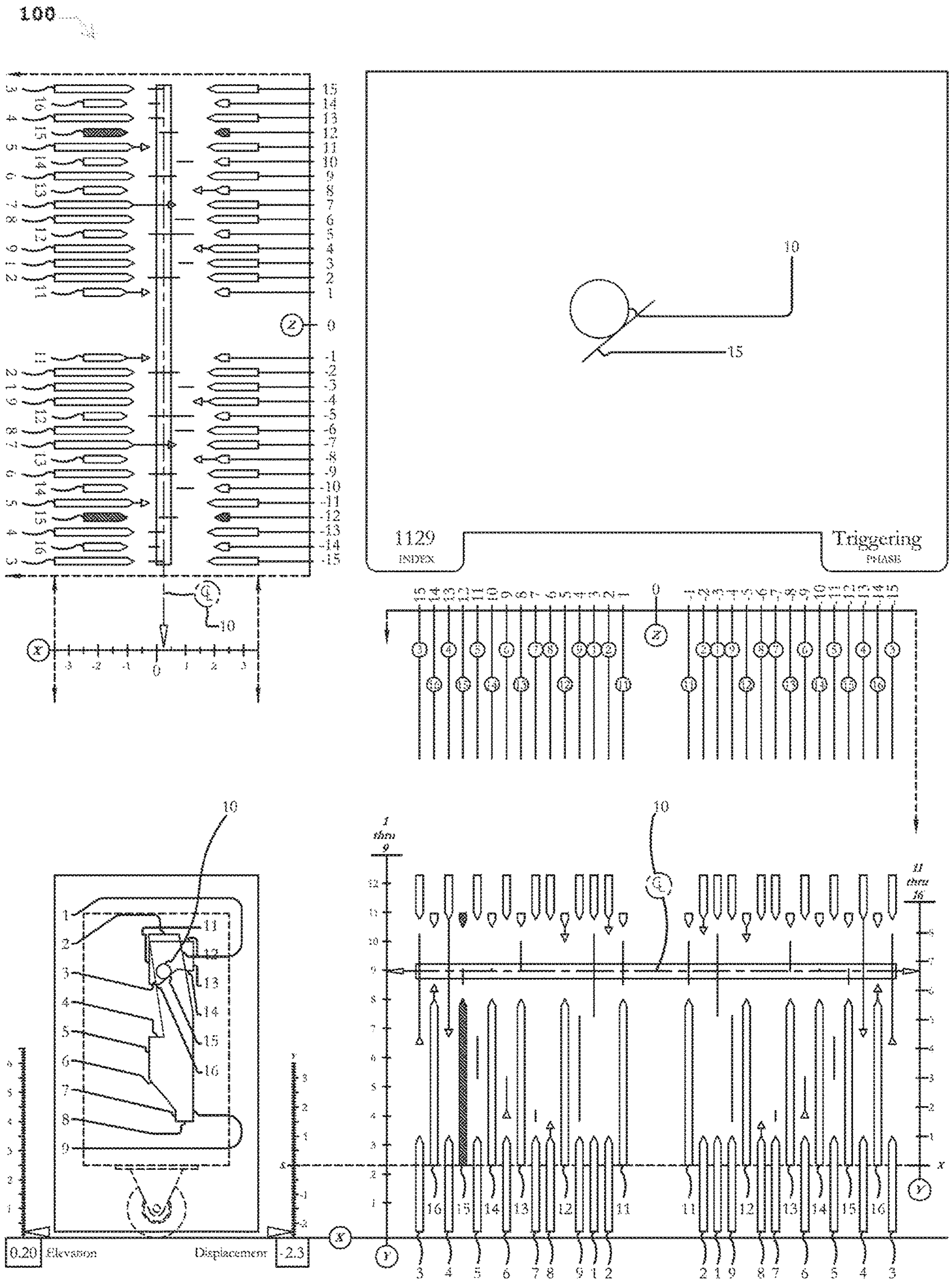
Figure 132:
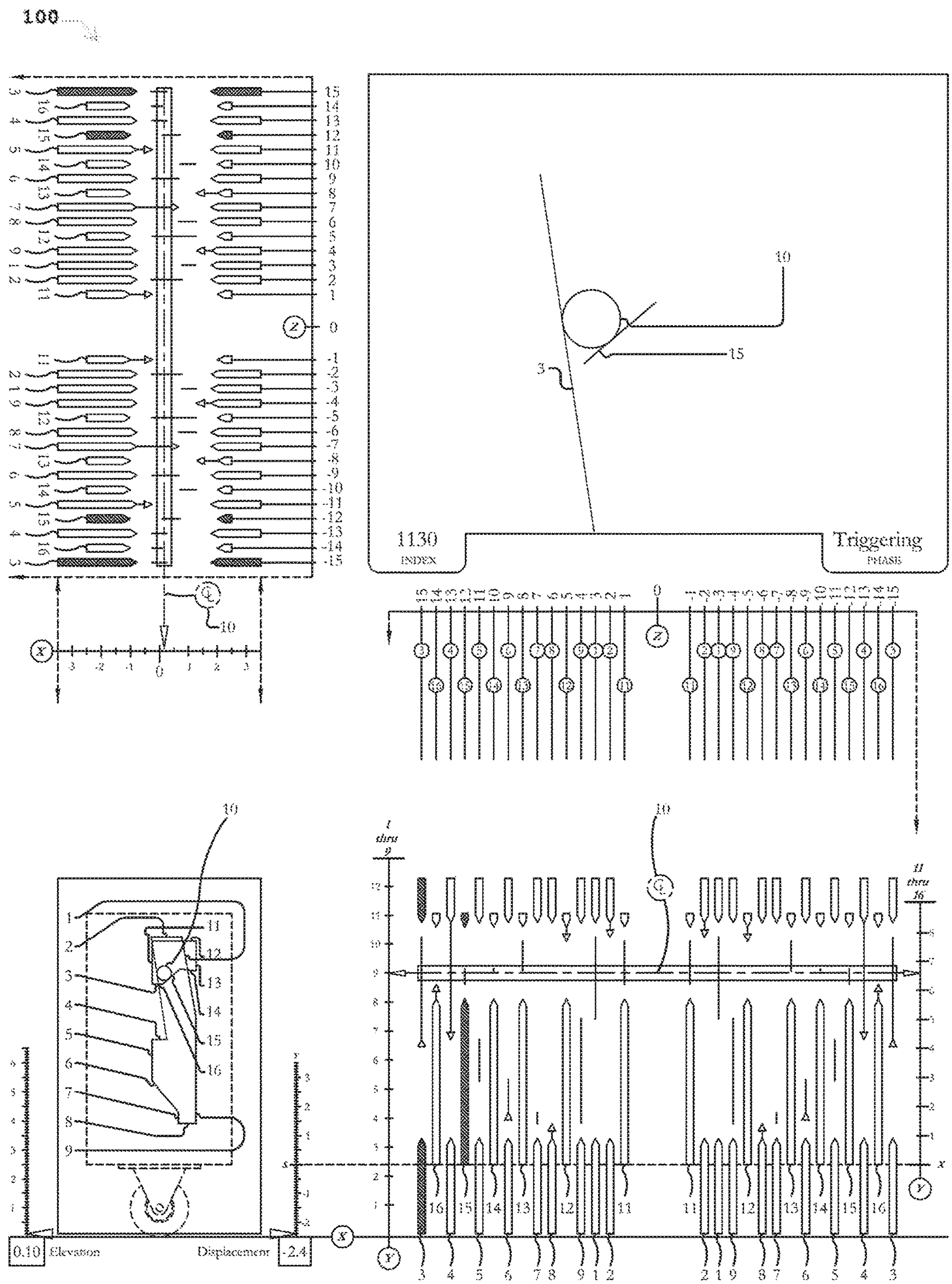

| State<br>State narrative | Event | Next State |
|---|---|---|
| One<br>Housing supported by external surface; Switch in intermediate energy level, between first energy well and energy barrier; FIGS. 2 and 133 | a. Raise Housing to displacement 0.10, then lower (FIG. 29) | One |
| | b. Raise Housing to displacement 0.28+ (FIG. 30+), but less than displacement 2.4 (FIG. 66), lower Housing to displacement 0.0 (FIG. 42) | Two |
| | c. Raise Housing to displacement 2.5+ (FIG. 67), but less than displacement 3.38 (FIG. 74) | Three |
| | d. Raise Housing to displacement 3.38+ | Four |
| Two<br>Switch falls to First Energy Well (FIG. 36); Housing supported by Switch, Switch supported by Platform (FIG. 42) | e. Raise Housing to displacement 2.4 (FIG. 66), then lower to 0.0 (FIG. 42) | Two |
| | c. Raise Housing to displacement 2.5+ (FIG. 67), but less than 3.38 (FIG. 74) | Three |
| | d. Raise Housing to displacement 3.38+ | Four |
| Three<br>Switch in or will return to second energy well (FIG. 70); Housing supported by external force; Switch supported by Housing; Platform supported by external surface | d. Raise Housing to displacement 3.38+ | Four |
| | f. Lower Housing to displacement −2.5 | One |
| Four<br>Switch in or will return to second energy well when Housing released; (FIG. 70); Housing supported by external force; Switch supported by Housing; Platform supported by Switch; FIGS. 2 and 133 | f. Lower Housing to displacement −2.5 | One |

Proceeding clockwise around FIG. 2 as an example of all of FIGS. 2 through 133, starting in the top-left quadrant, the top-left quadrant illustrates a top plan view of the First Embodiment 100, illustrating the plates which comprise the Housing and the Platform, with a width corresponding to the bottom-left quadrant. Among other features, this top-left quadrant illustrates, with pointer and ruler, how the center line of Switch 10 translates horizontally as the displacement of Housing changes relative to Platform.

The top-right quadrant illustrates a detailed side-elevation view of the First Embodiment 100, looking down the length of the center line of Switch 10. Except for FIG. 2, the top-right quadrant illustrates only those portions of the plates in contact with the Switch 10.

The bottom-right quadrant illustrates a front or rear elevation view of the First Embodiment 100, illustrating the plates which comprise the Housing and the Platform and the States Three and Four in the foregoing require an external force to support the Housing (such as a human, a fork lift, a crane, or similar). When the external force is removed following the event, then States Three and Four return to State One. If events which do not pass a point-of-no-return are removed, then the table of states and events is reduced to the following:

TABLE TWO

| State | Event | Next State |
|---|---|---|
| One | b. | Two |
| One | c. | One |
| One | d. | One |
| Two | c. | One |
| Two | d. | One |

In the foregoing, when the machine is in State One, one event, Event b, can transition the machine to State Two. In the foregoing, when the machine is in State Two, two events, Event c and d, can transition the machine to State One. Events b, c, and d are points of no return. FIG. 2 through 133 illustrate two energy wells into which the Switch 10 may fall, if allowed by the composite coordinate function defined by the Housing, the Platform, and Switch 10 geometry. The Switch 10 is illustrated in the first energy well in FIGS. 36-53; the Switch 10 is illustrated in the second energy well in FIGS. 70 and 71 and 79-112. The energy wells are separated by an energy barrier defined by the plates comprising the Platform; the Switch 10 obtains energy to move over the energy barrier from the Housing and the force and force vector transmitted to the Switch 10 by the Housing and the Platform. Because the Housing is active, the force for surmounting the energy barrier is provided by the Housing. The Switch 10 may be intermediate between an energy well and the energy barrier, as in State One.

In FIGS. 2 through 133, the Housing is in a static kinematic relationship with the Platform. The Housing has two frames of reference: i) the Housing's location in a larger physical body in which the Housing may be embedded (if any) and ii) the horizontal axis of the center of gravity of the Switch 10.

In FIGS. 2 through 133, the Platform has three frames of reference: i) the Housing, determined by the Platform's kinematic pair relationship with the Housing; ii) the vertical axis through the center of gravity of the Switch 10; and iii) the kinematic pair relationship with the external surface, which may be mediated by the accessory.

In FIGS. 2 through 133, the Switch 10 has one frame of reference: its own center of gravity.

FIGS. 134 to 166 illustrate elevation views of a Second Embodiment 200, in which a first body or Housing 201 is attached to a second body or Platform 202 at a Platform-Housing Axle 204, which bodies combine with a Switch 206 to form a composite coordinate function. Components illustrated and labeled on one side of the Second Embodiment 200 are mirror images of equivalent components on the other side of the Second Embodiment 200. The bottom portion of FIGS. 134 to 166 illustrates an entire mechanism, which may be embedded in a larger object. The top portion of FIGS. 134 to 166 illustrates a detailed view of the bottom portion. The Housing 201 and Platform 202 are illustrated as being singular components; however, they could be made from a set of plates, as illustrated in the First Embodiment 100 in FIGS. 2 through 133. In the Second Embodiment 200, the kinematic pairing between the first and second bodies imposes five constraints on the degrees of freedom in relative movement between the bodies. In the Second Embodiment 200, the kinematic pairing is revolute.

In FIGS. 134 to 166, Housing 201 may translate vertically. The vertical translation of the Housing 201 may have a rotational component; for example, in FIGS. 134 to 166, the Housing 201 is raised at one corner while the opposite corner remains on the exterior surface, which results in rotation of the Housing 201 about the opposite corner on the exterior surface. Raising the Housing 201 (with or without a rotational component) results in rotation of the Platform 202 about the Platform-Housing Axle 204, and which changes the composite coordinate function, which, via the Cut-Out 208 (which is part of the Housing) and the Switch 206, triggers the events which change the states available to the state machine.

As described further below, FIGS. 134 to 166 show the states and the triggering events of this embodiment of the finite state machine. The Switches 206 in FIGS. 134 through 166 are not round about their horizontal axis of rotation (when viewed in elevation, as in FIGS. 134 through 166). The Switches 206 may be connected at their base to the Platform 202 (such as about an axle, not shown).

The composite coordinate function is formed by the Cut-Out 208 (which is part of the Housing 201), the base of the Platform 202 (which changes elevation slightly when the Platform 202 rotates about the Platform-Housing Axle 204), and the Switch 206. The composite coordinate function defines two energy wells, a first well when the Switch 206 is leaning on the left side of the base of the Switch 206 (relative to the Switch 206 on the left side of the machine—FIGS. 134 to 141), a second well when the Switch 206 is leaning on the right side of the base of the Switch 206, and an energy barrier when the Switch 206 is vertically oriented above its base. The energy barrier and the two wells arise because the energy of the Switch 206 is highest when the Switch 206 is vertically oriented above its base. The energy wells and energy barrier are discussed further below in relation to the states available to the finite state system.

The Platforms 202 in FIGS. 134 through 166 are connected to the Housing 201 at Platform-Housing Axle 204. The Platforms 202 may be within an opening inside of the Housing 201. The Switches 206 comprise a Rod 209, or similar, which Rod 209 projects beyond the main body of the Switch 206 and contacts the Housing 201 along Cut-Out 208. The Cut-Out 208, the Platform 202, and the Switch 206 are configured to impart energy—force—and a direction—vector—to the Switch 206 as the Housing 201 is raised, transitioning the Switch 206 from one energy well to the other, over the energy barrier. The Housing 201 may be raised vertically, holding the Housing 201 horizontal as it is raised, and/or it may be raised vertically by rotating the Housing 201 about an axis, such as a corner of the Housing 201 (as illustrated in FIGS. 134 to 166).

In all of these views, a force is transmitted to the Switch 206 from the Housing; the force has a magnitude, generated by the rate of the relative displacement of the Housing and Platform, and a force vector orthogonal to the slope of the combined coordination functions of the surfaces of the Housing and Platform where they contact the Switch.

FIGS. 134 through 166 illustrate the following states and transitions:

TABLE THREE

Figure 134:
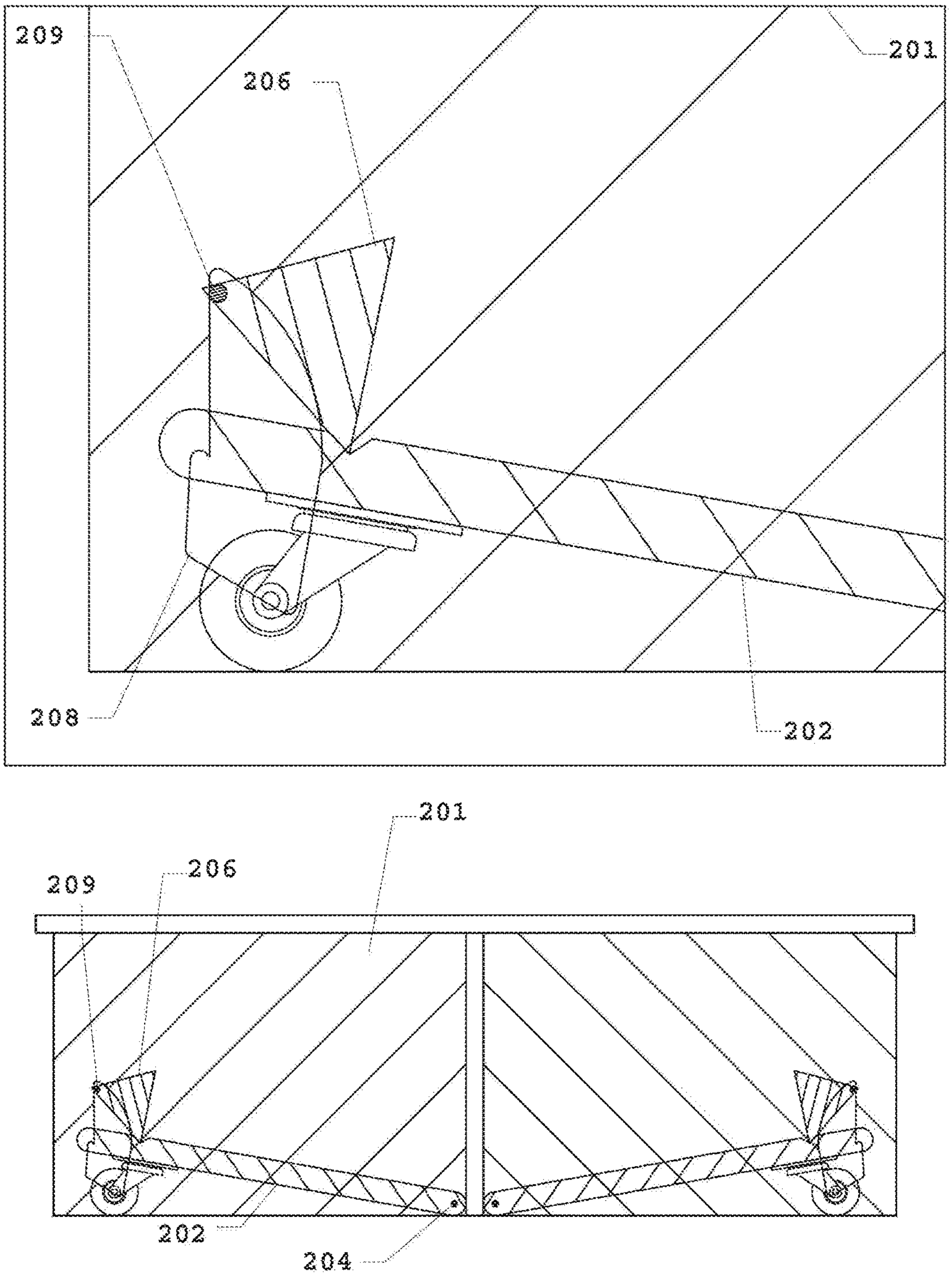
FIGS. 134 to 166 illustrate elevation views of a Second Embodiment of a kinematic finite state machine, in which the first and second bodies are connected at two axles and the switch has a non-round vertical cross section, and show the states and events of this embodiment of the finite state machine as the first body moves.
Figure 135:
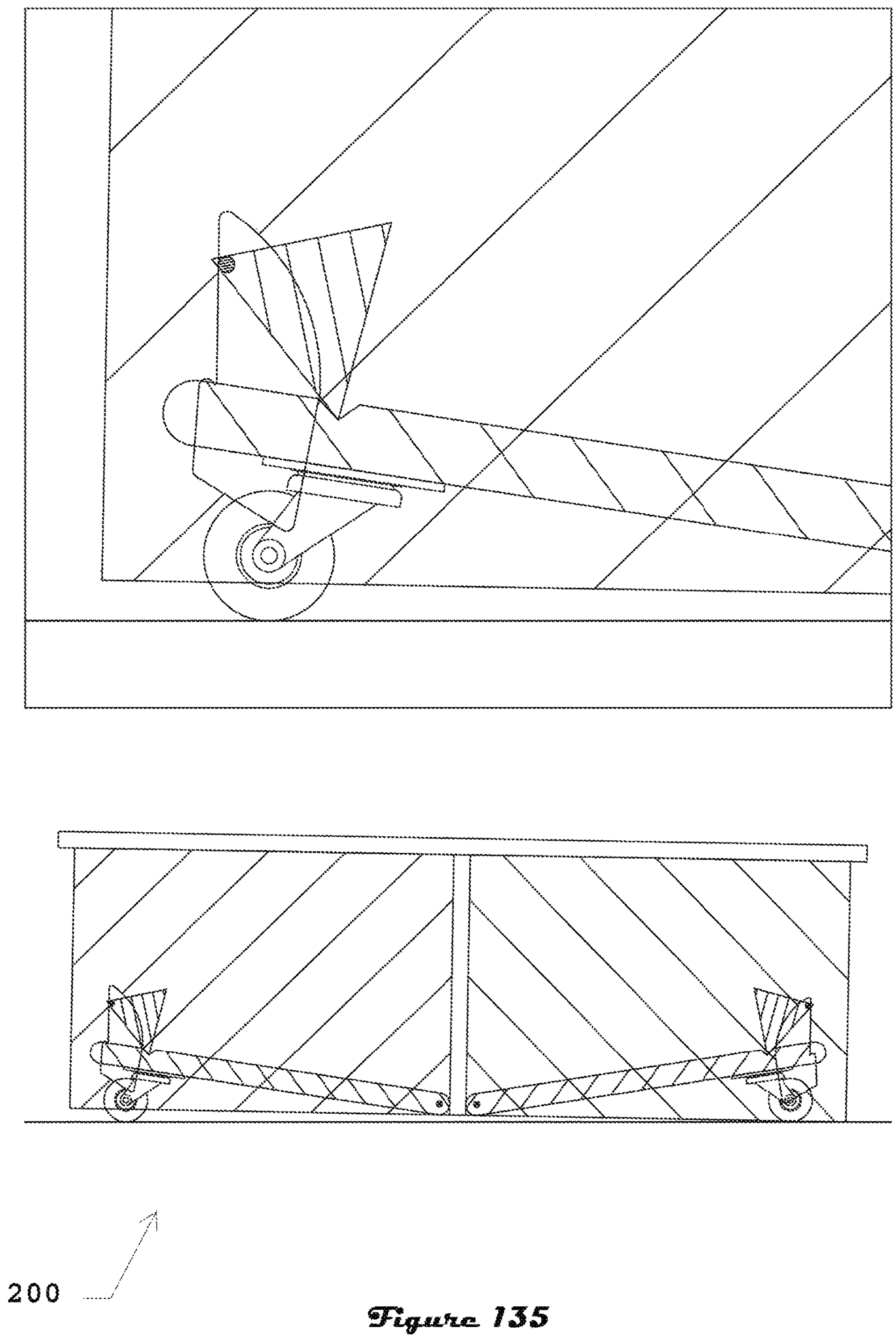
Figure 136:
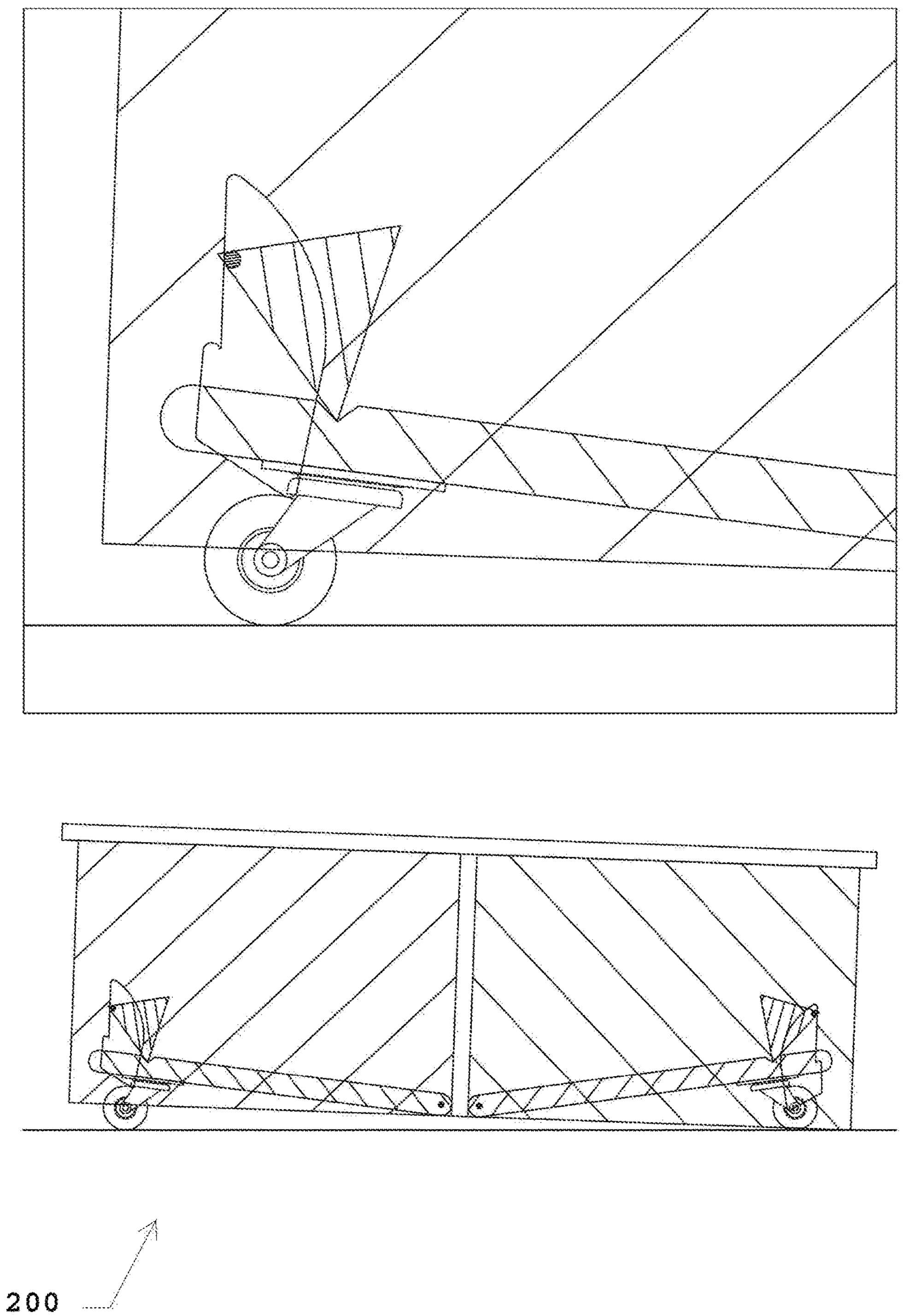
Figure 137:
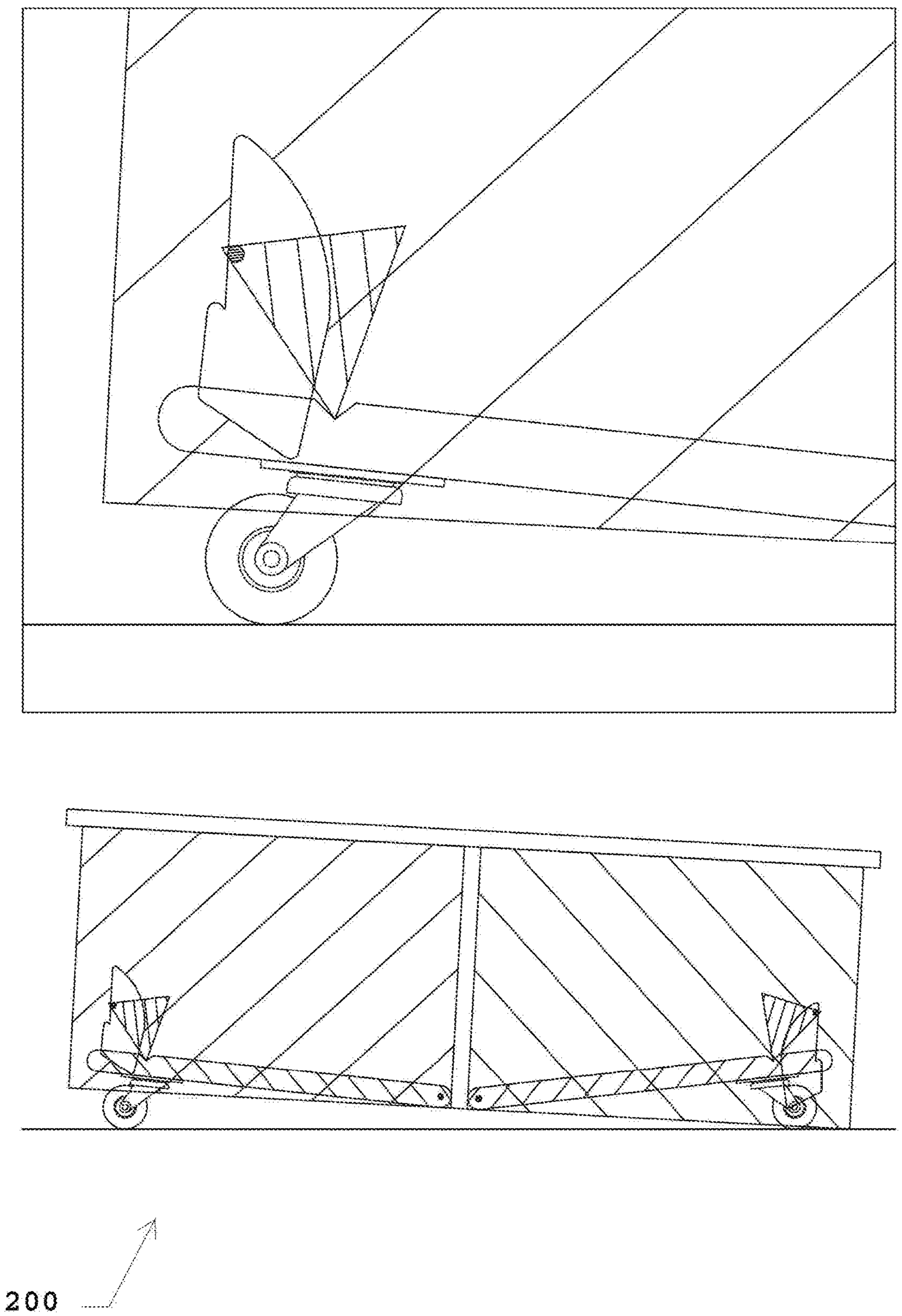
Figure 138:
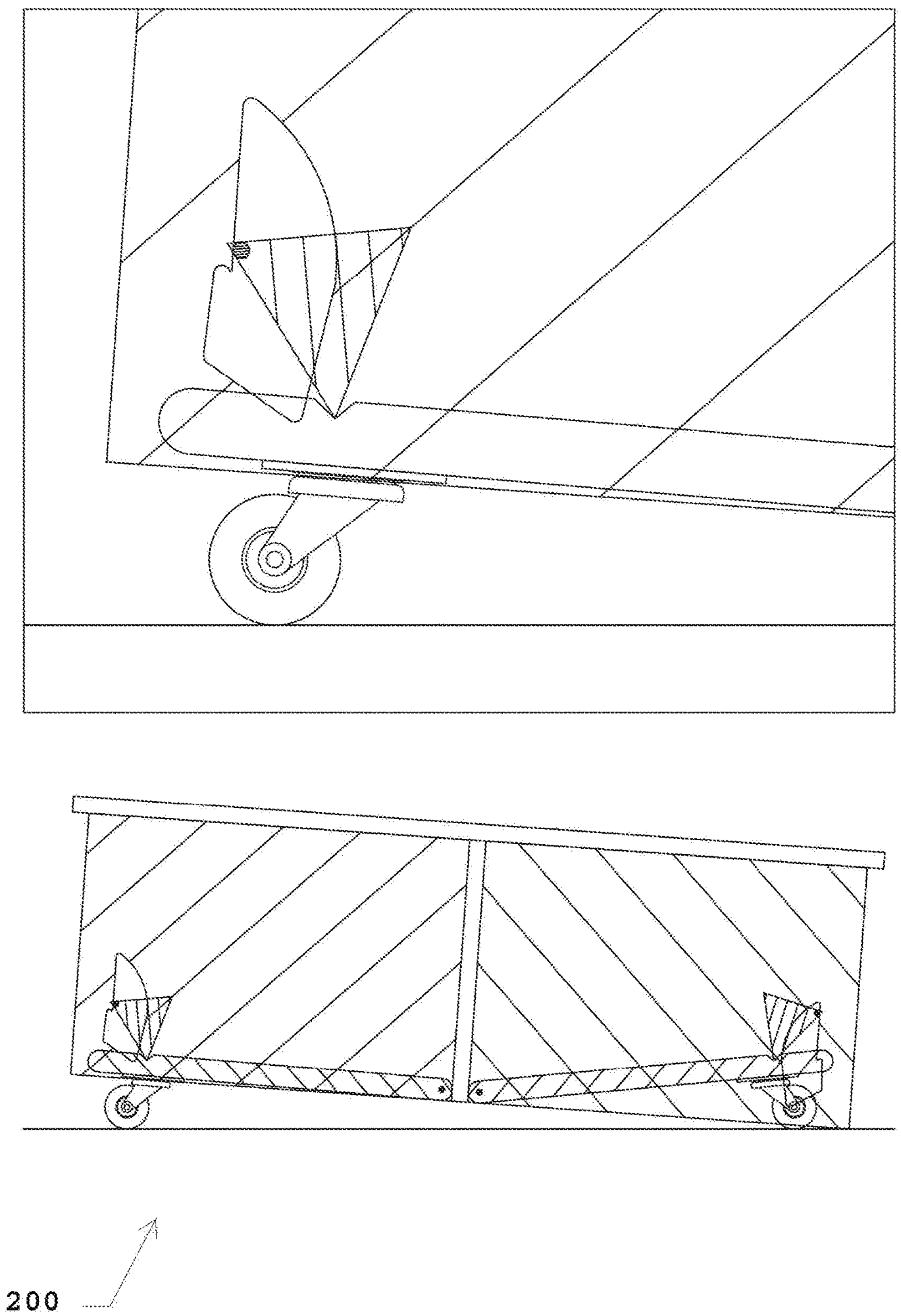
Figure 139:
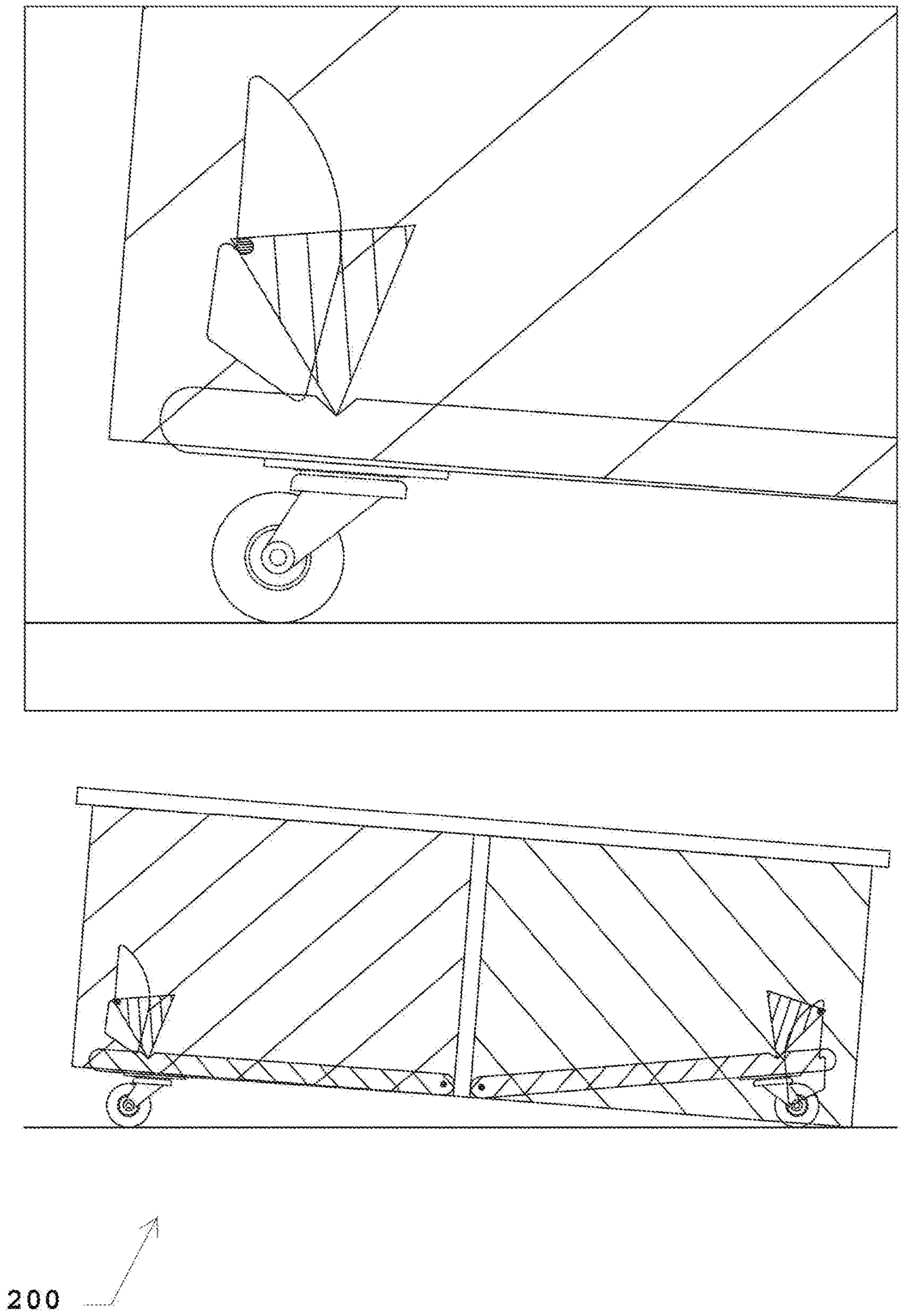
Figure 140:
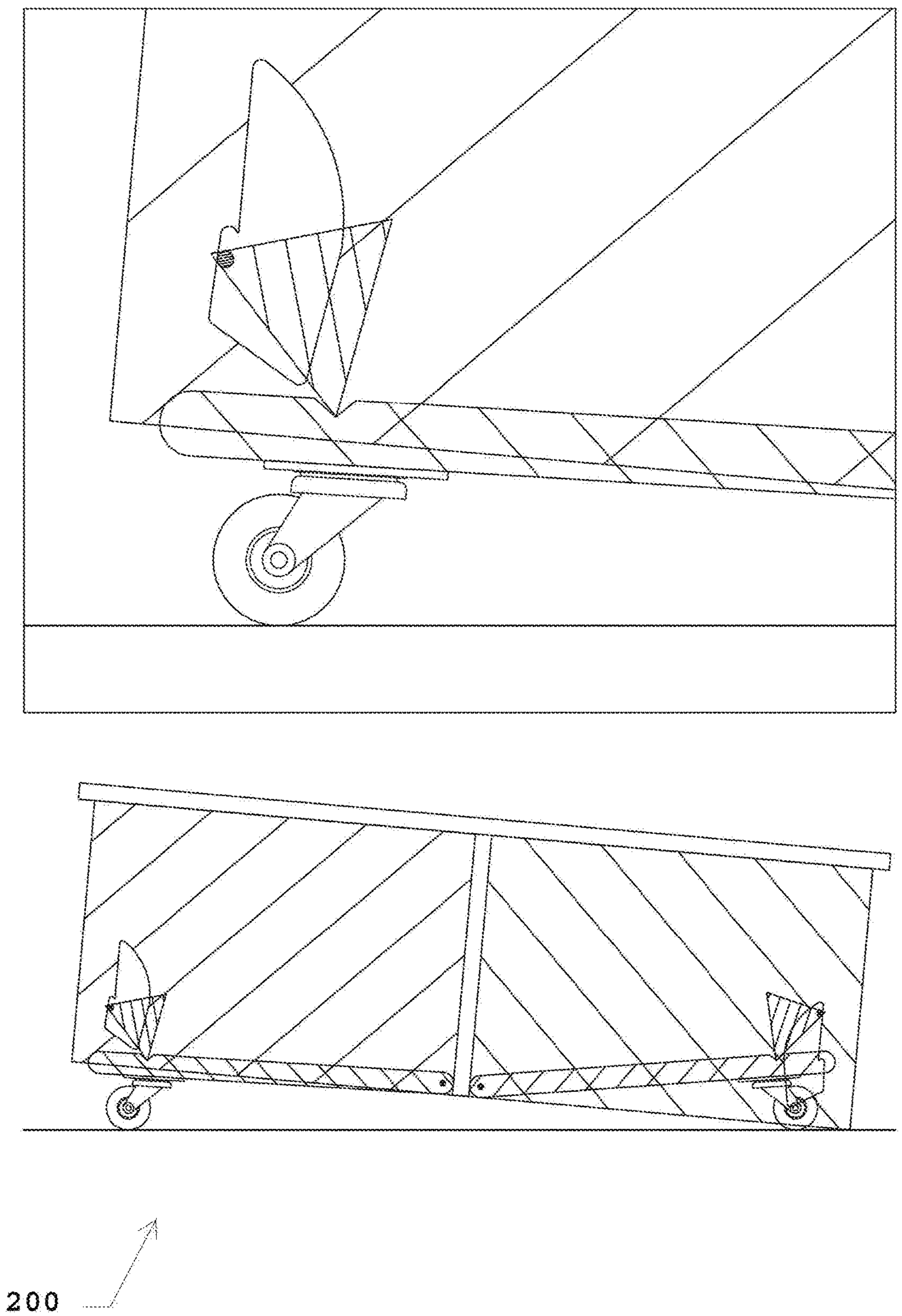
Figure 166:
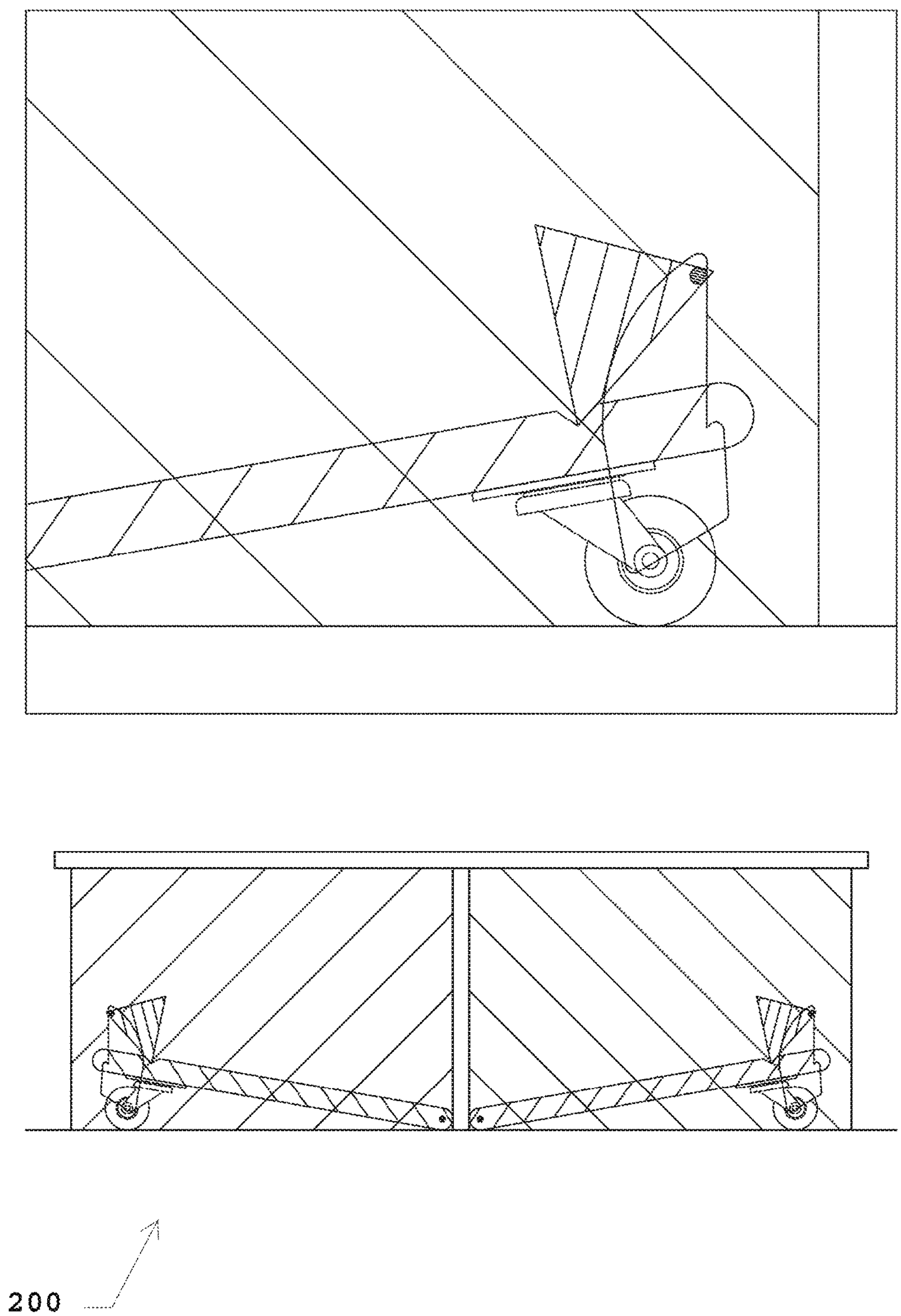

| State<br>State narrative | Event | Next State |
|---|---|---|
| One<br>Housing 201 supported by external surface; Switch 206 in intermediate energy level, between first energy well and energy barrier; FIGS. 134 and 166 | a. Raise Housing 201 to elevation less than in FIG. 140 (approximately shown in FIG. 139), then lower | One |
| | b. Raise Housing 201 to elevation greater than in FIG. 139, but less than equivalent elevation in FIG. 151, then lower | Two |

TABLE THREE-continued

Figure 141:
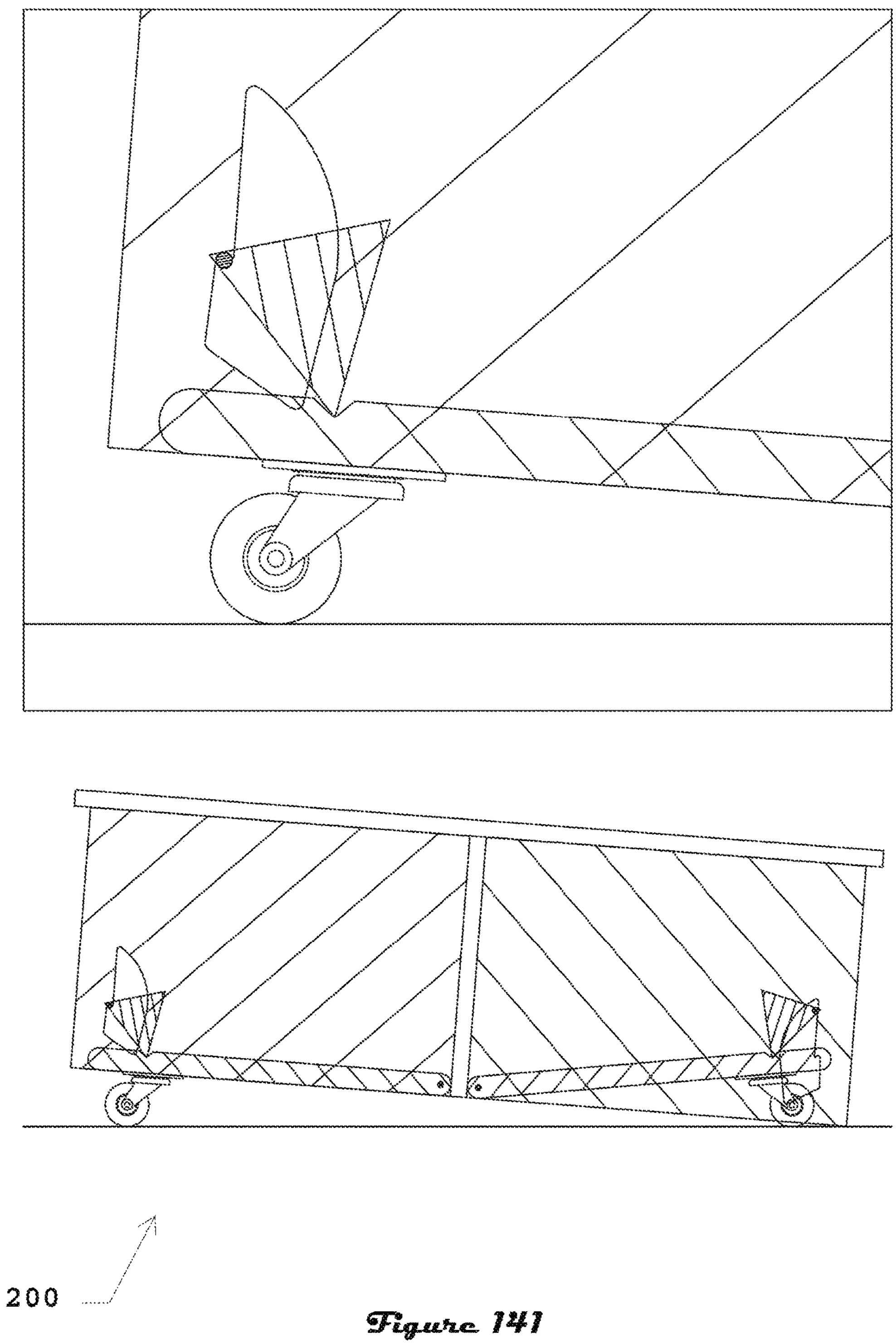
Figure 142:
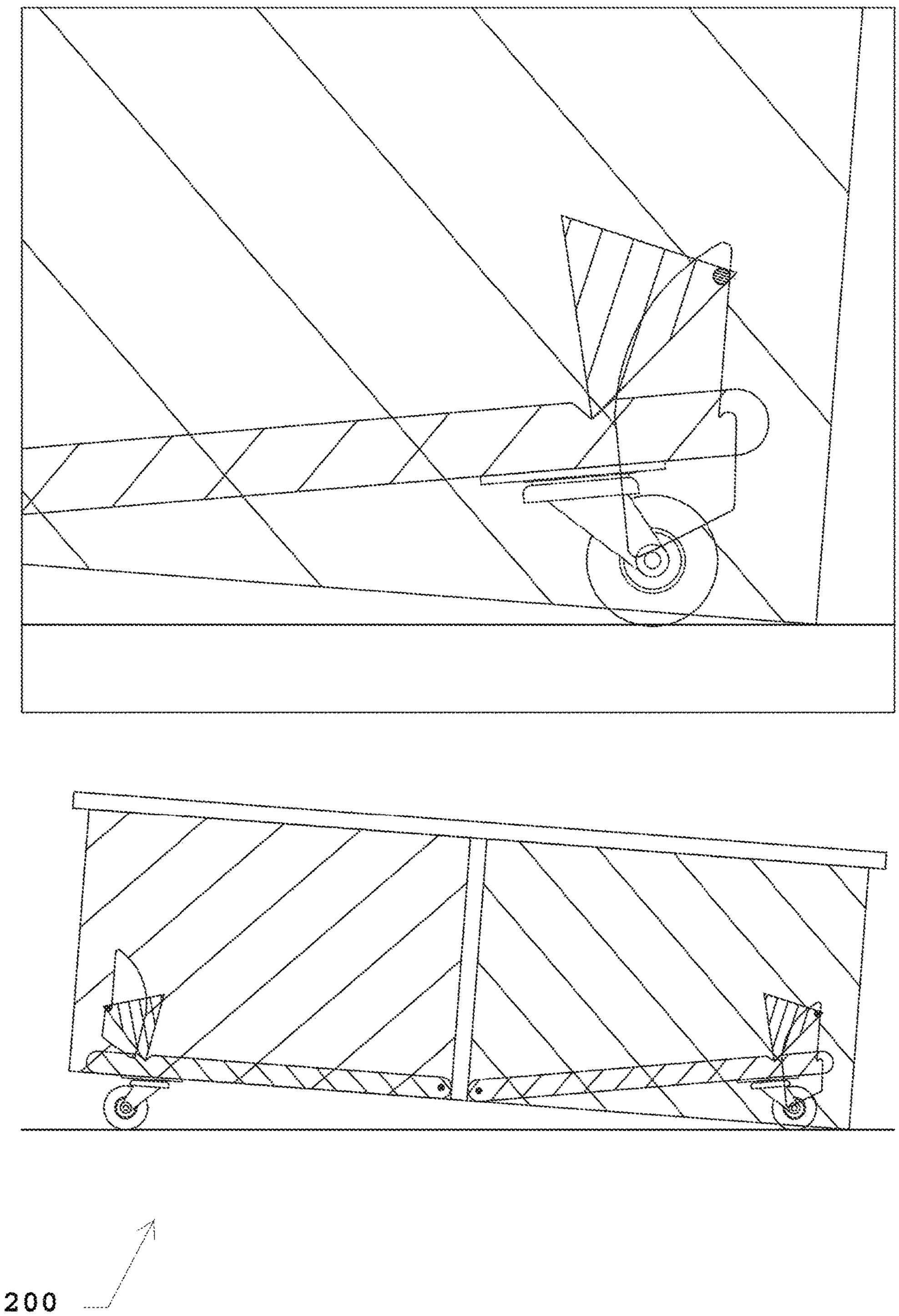
Figure 143:
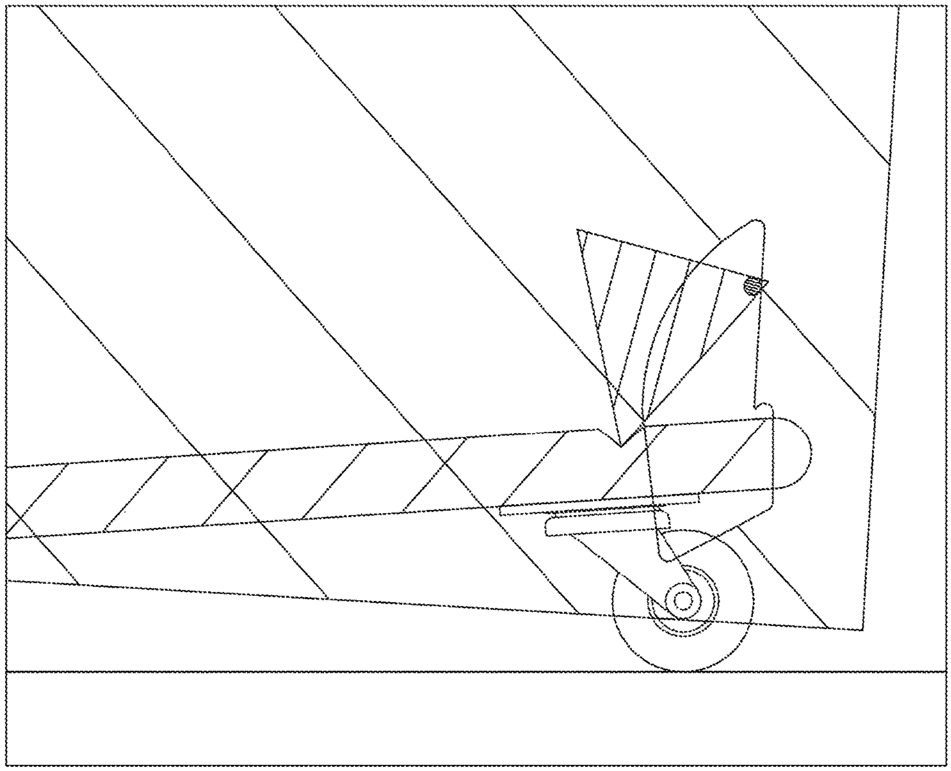
Figure 143:
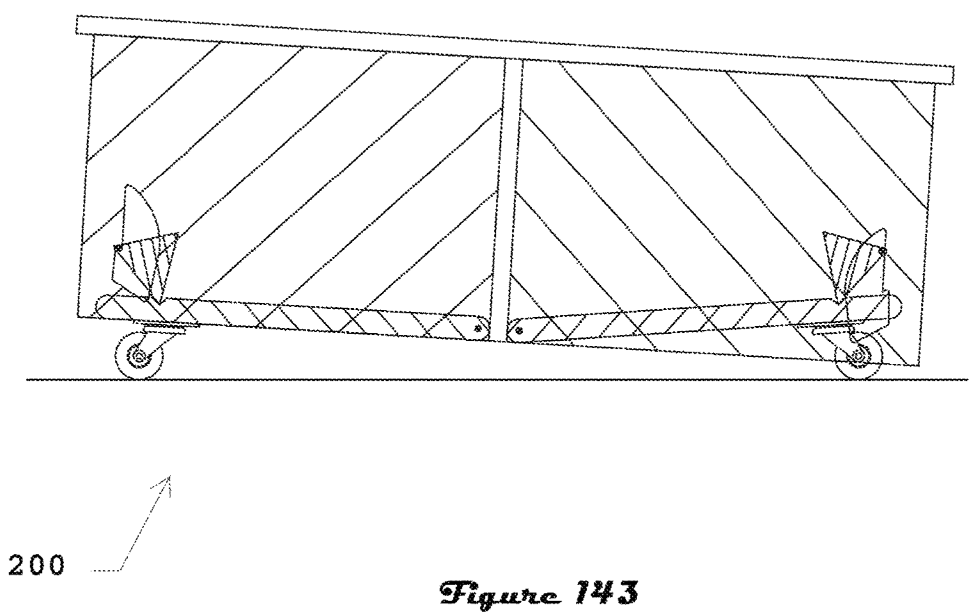
Figure 144:
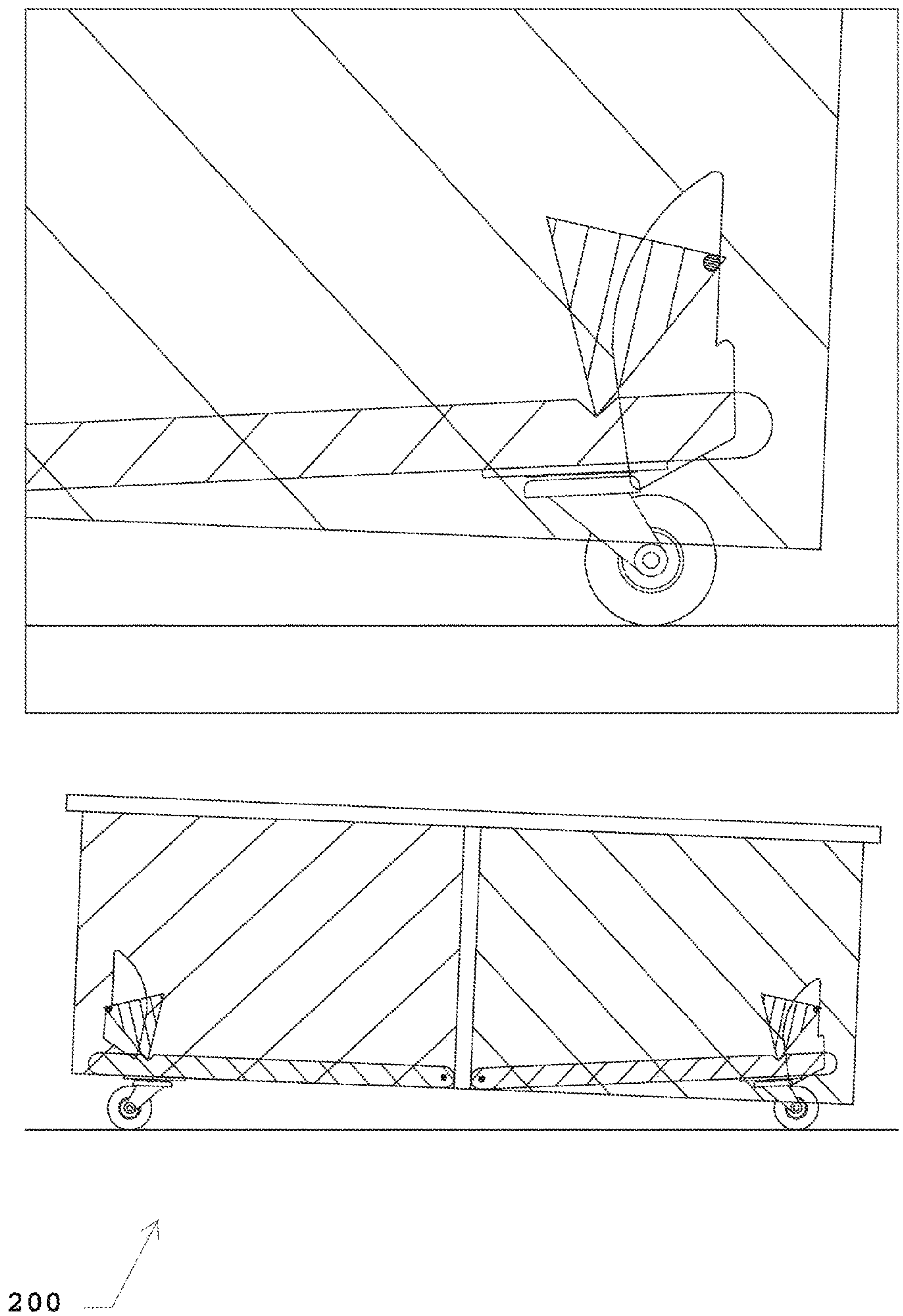
Figure 145:
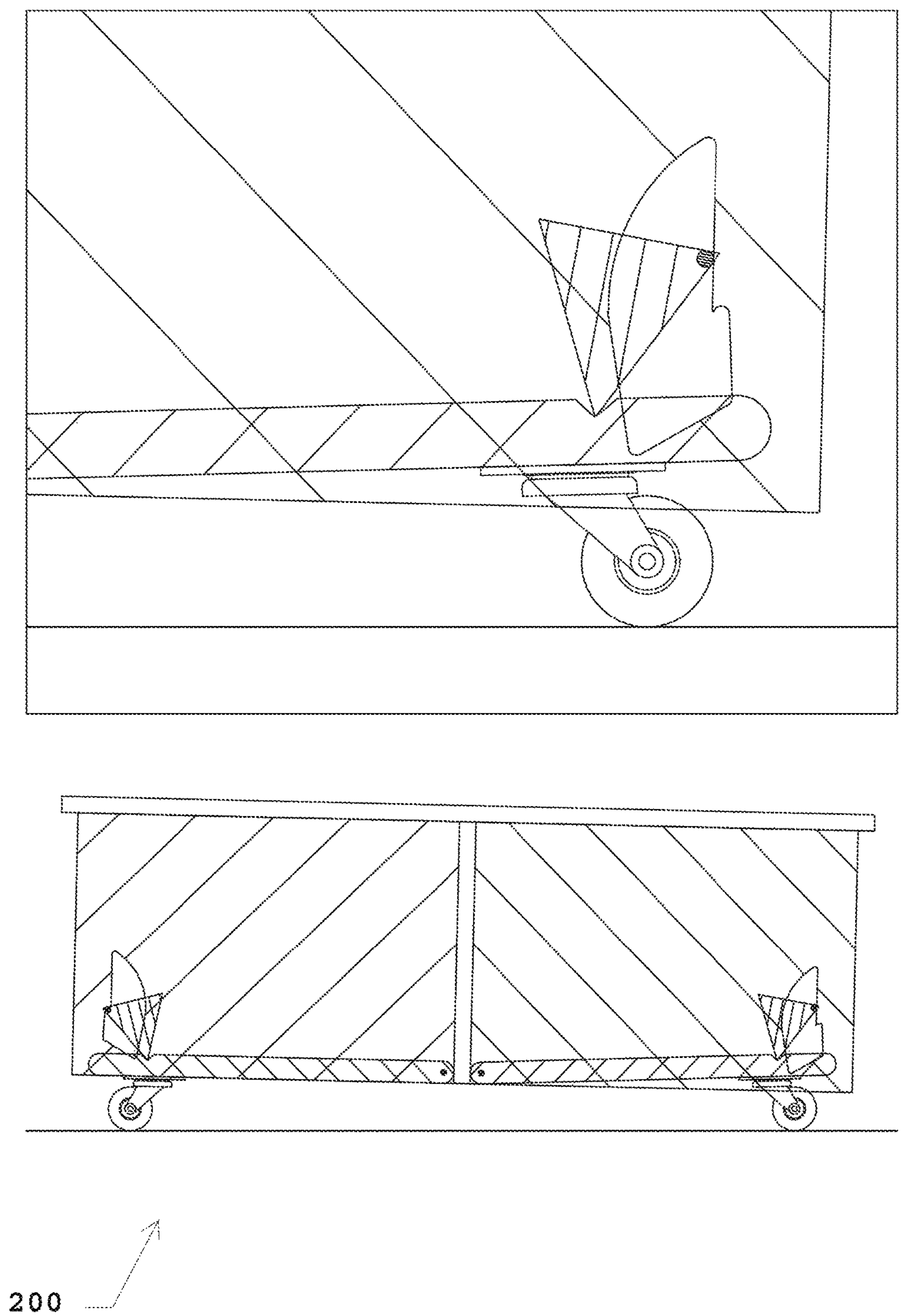
Figure 146:
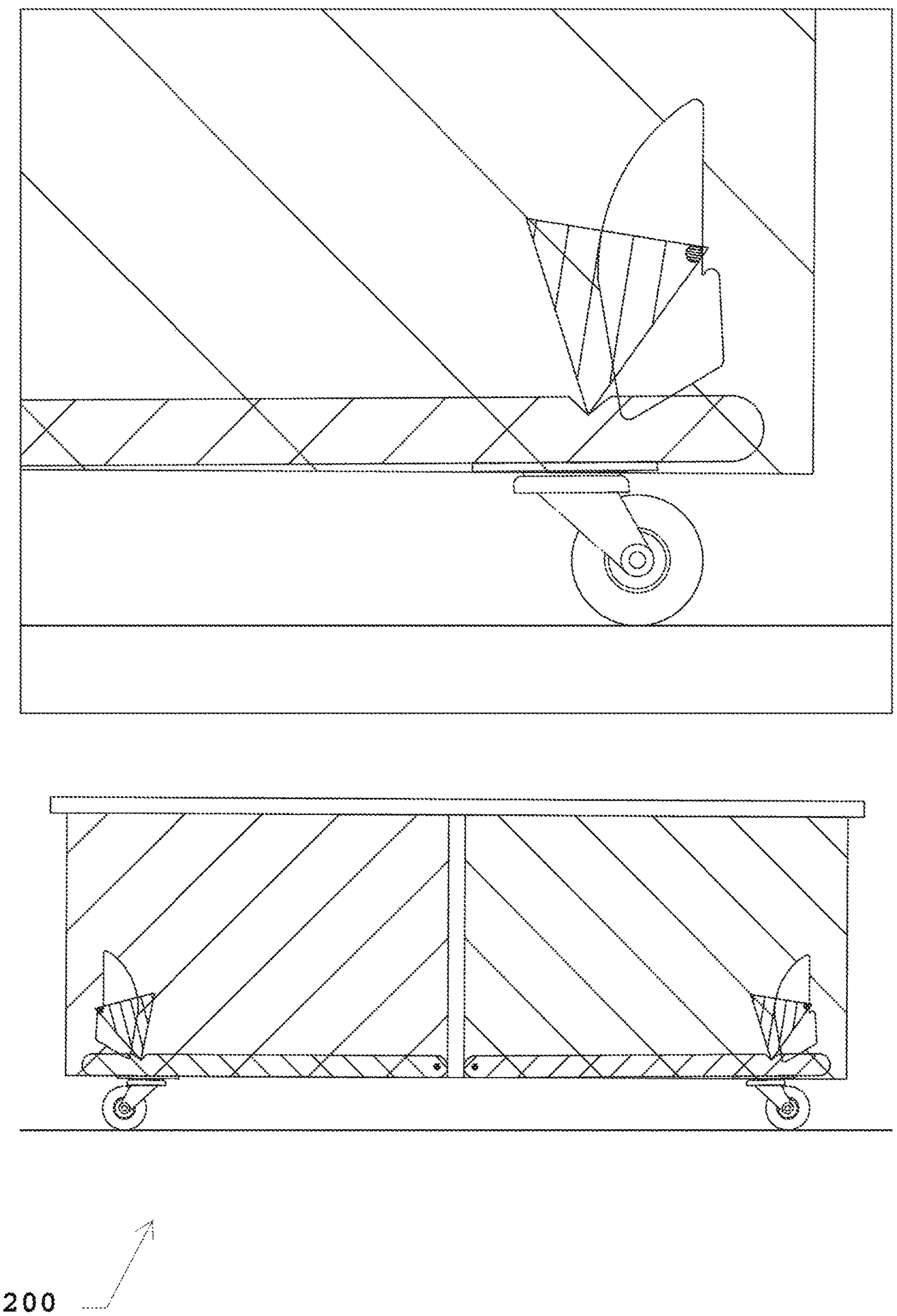
Figure 147:
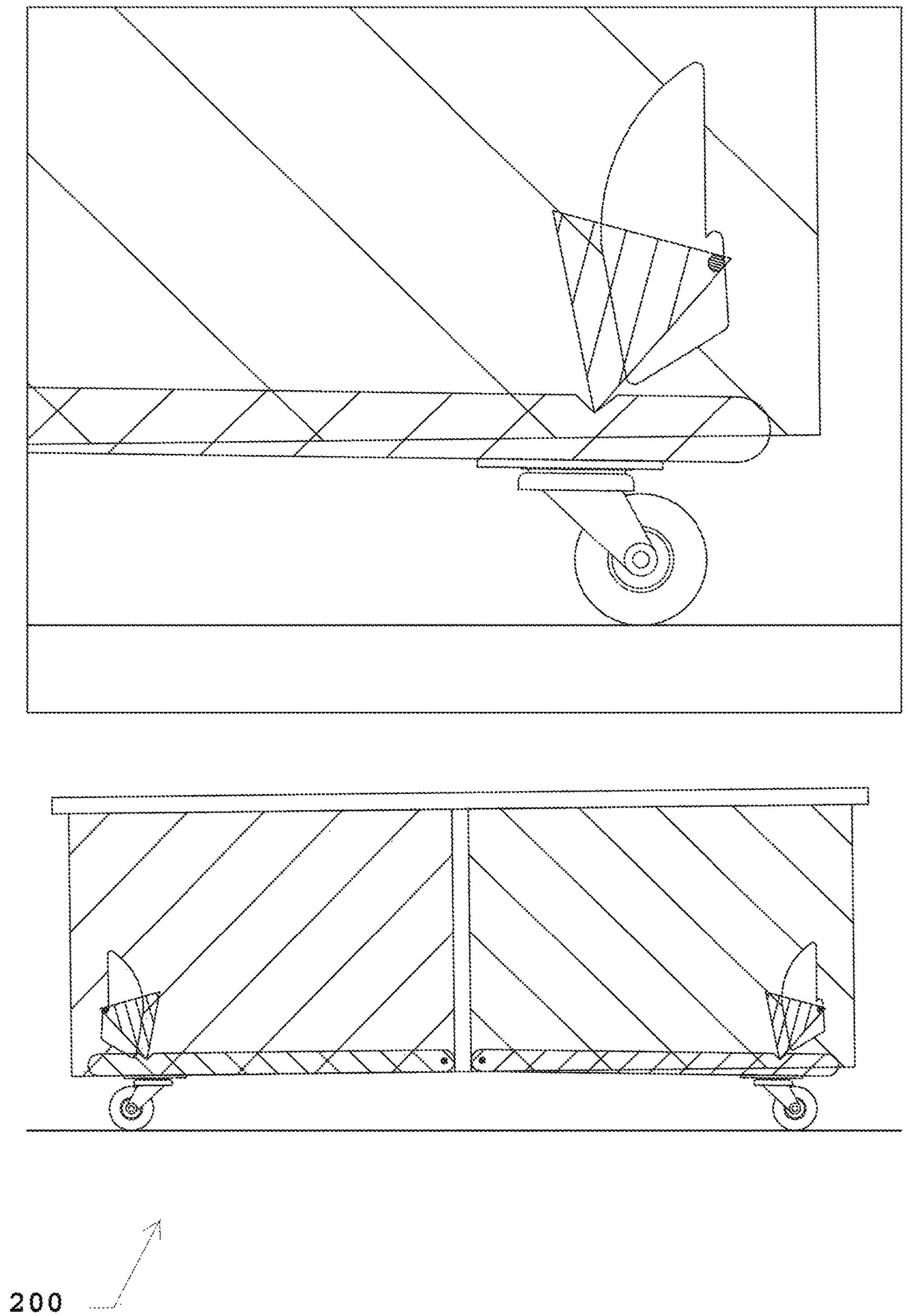
Figure 148:
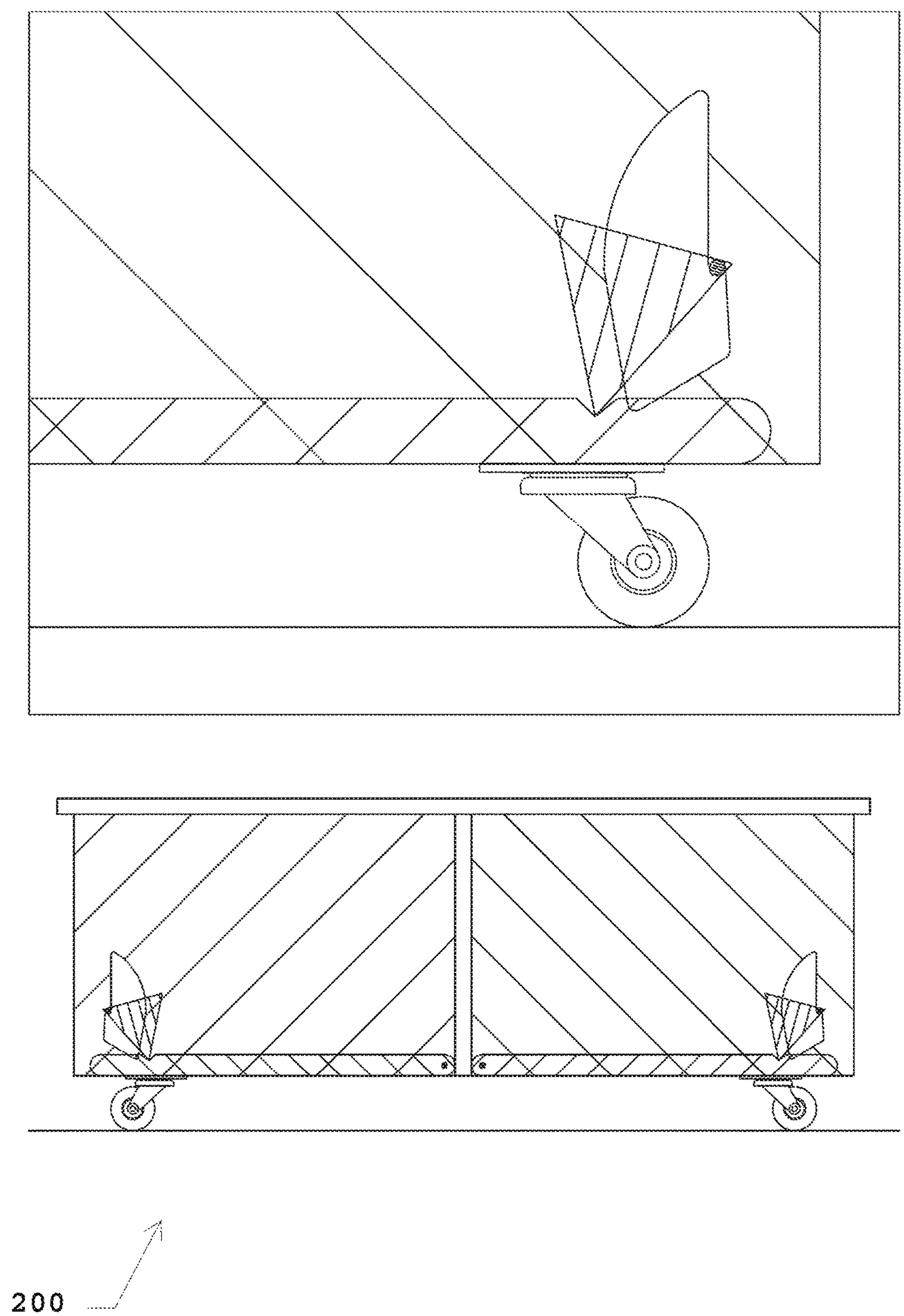
Figure 149:
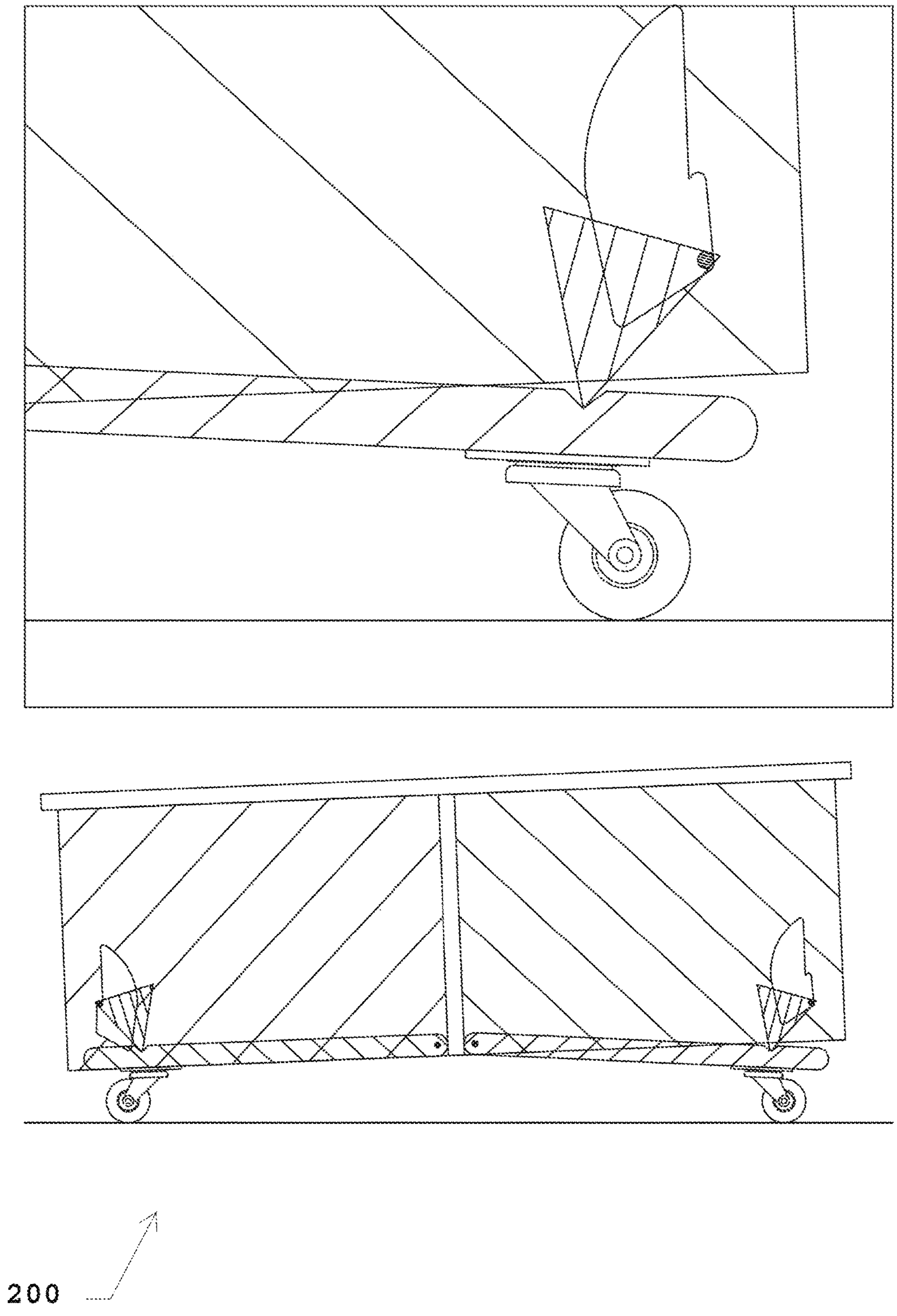
Figure 150:
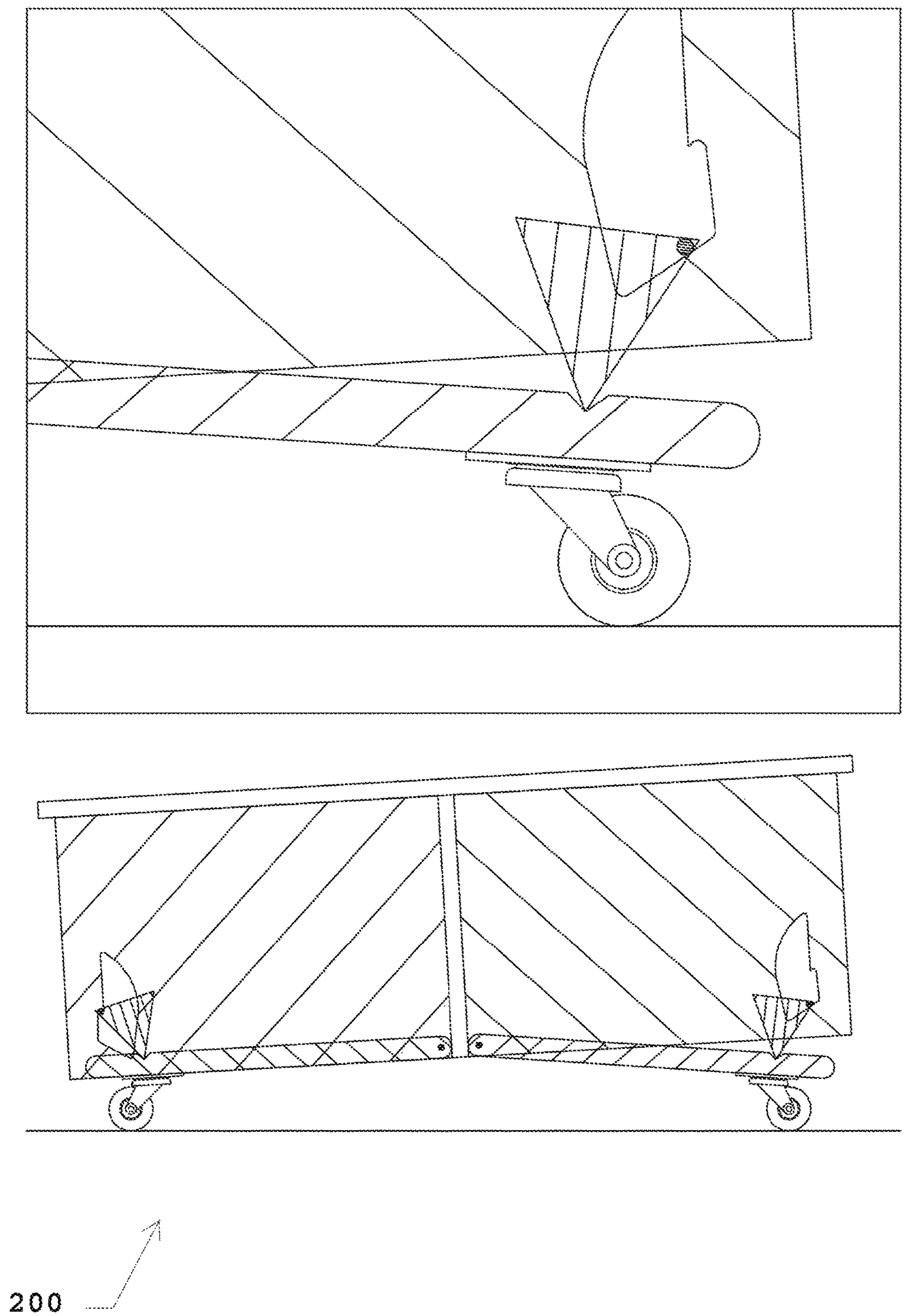
Figure 151:
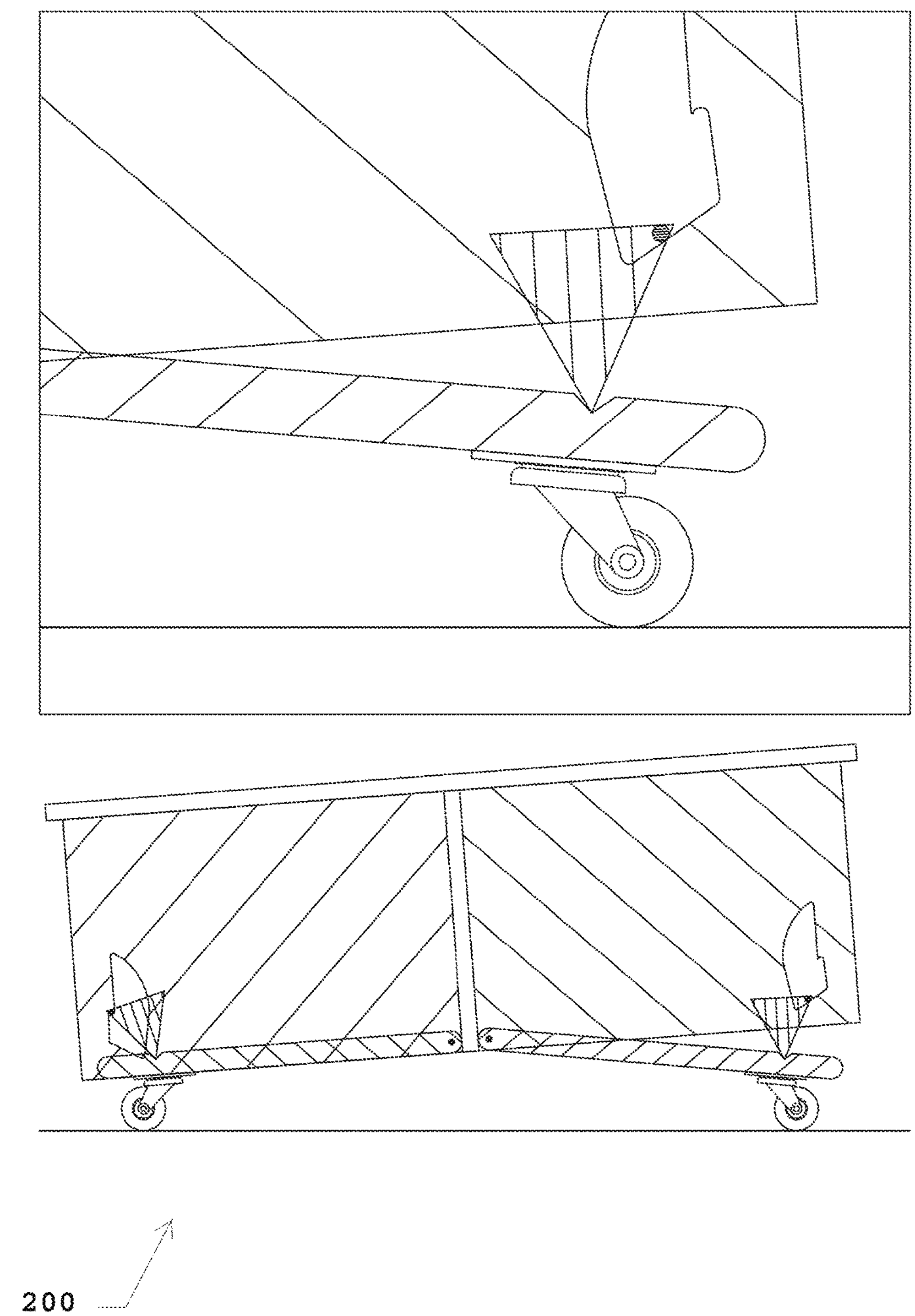
Figure 152:
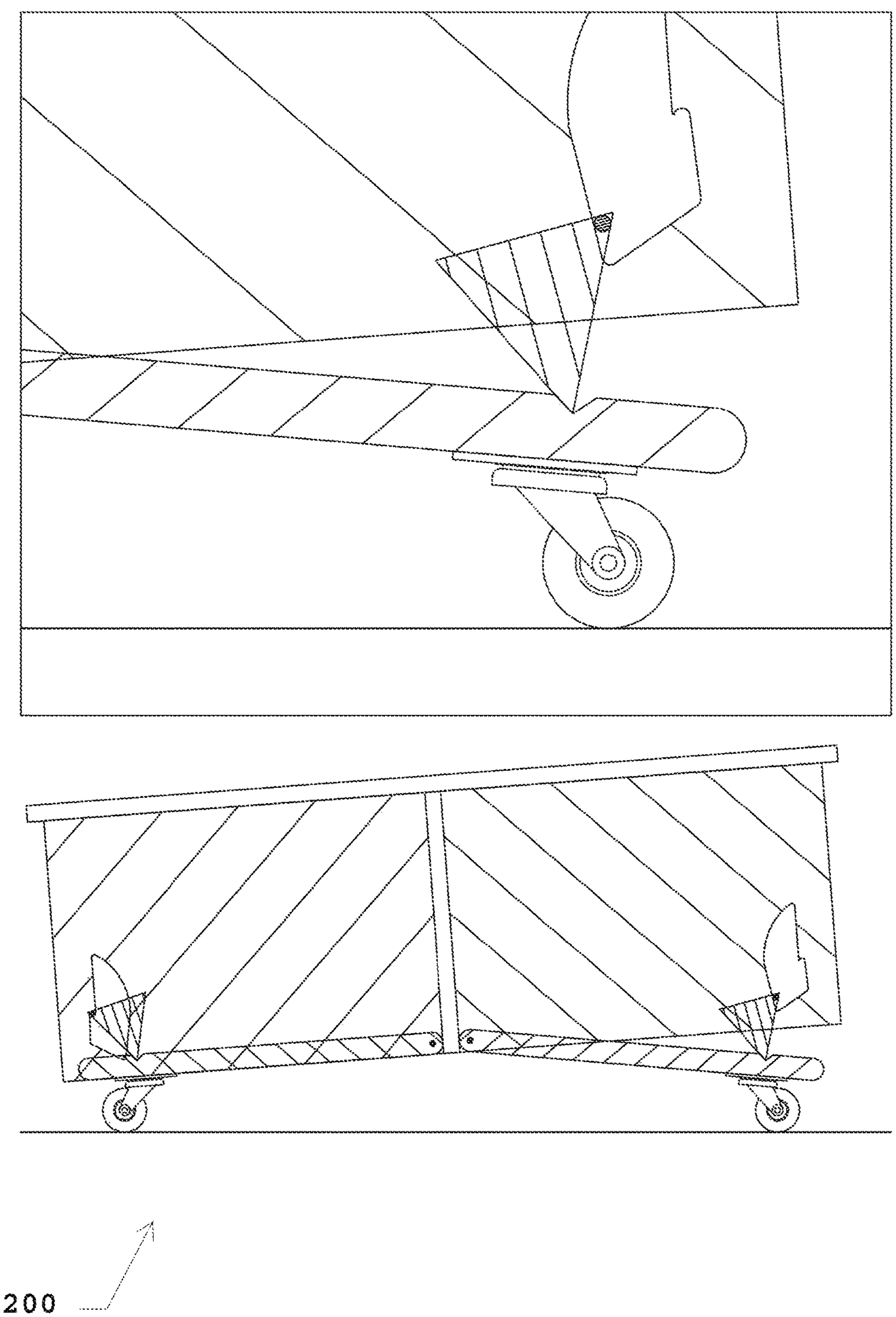
Figure 153:
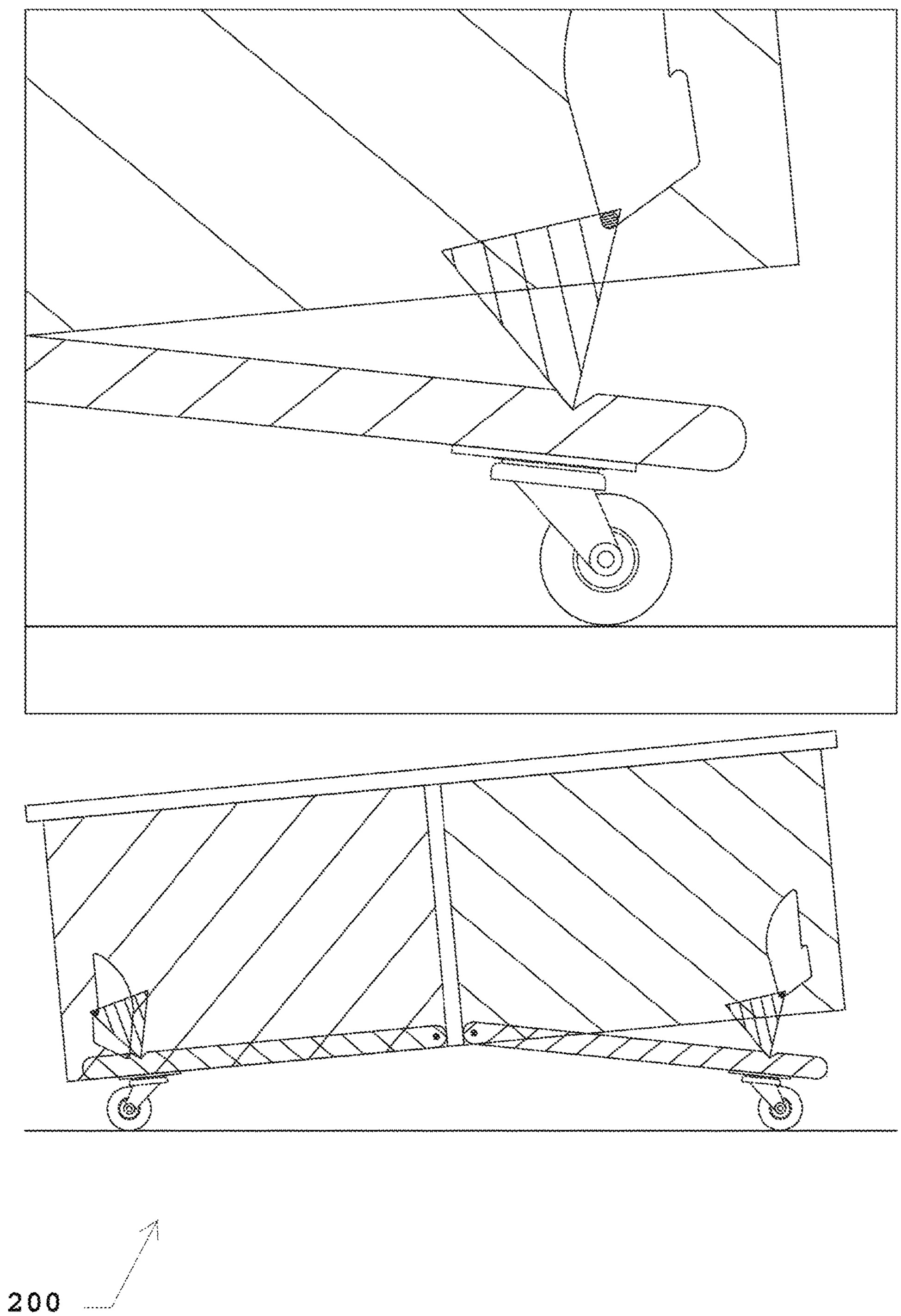
Figure 154:
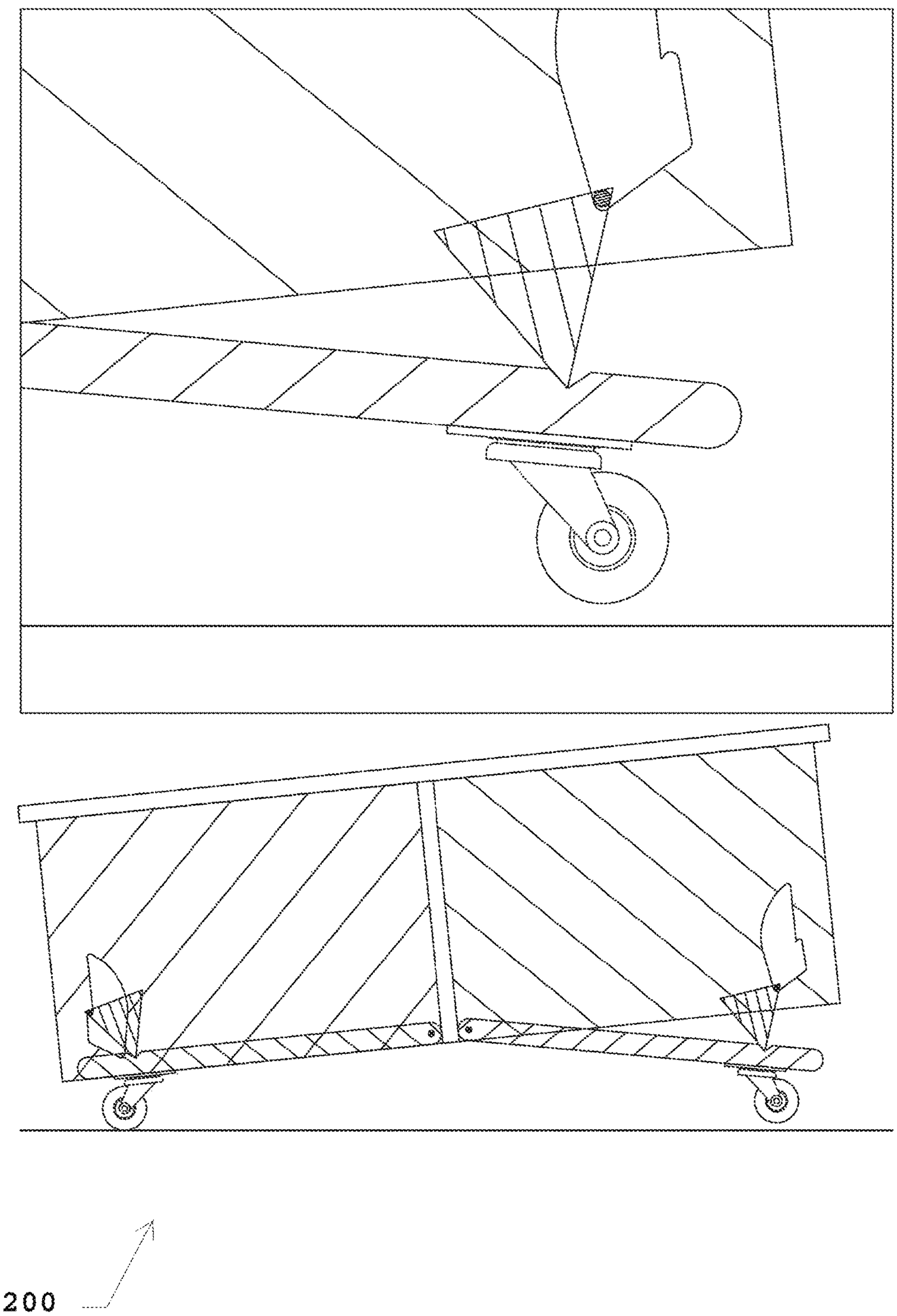
Figure 155:
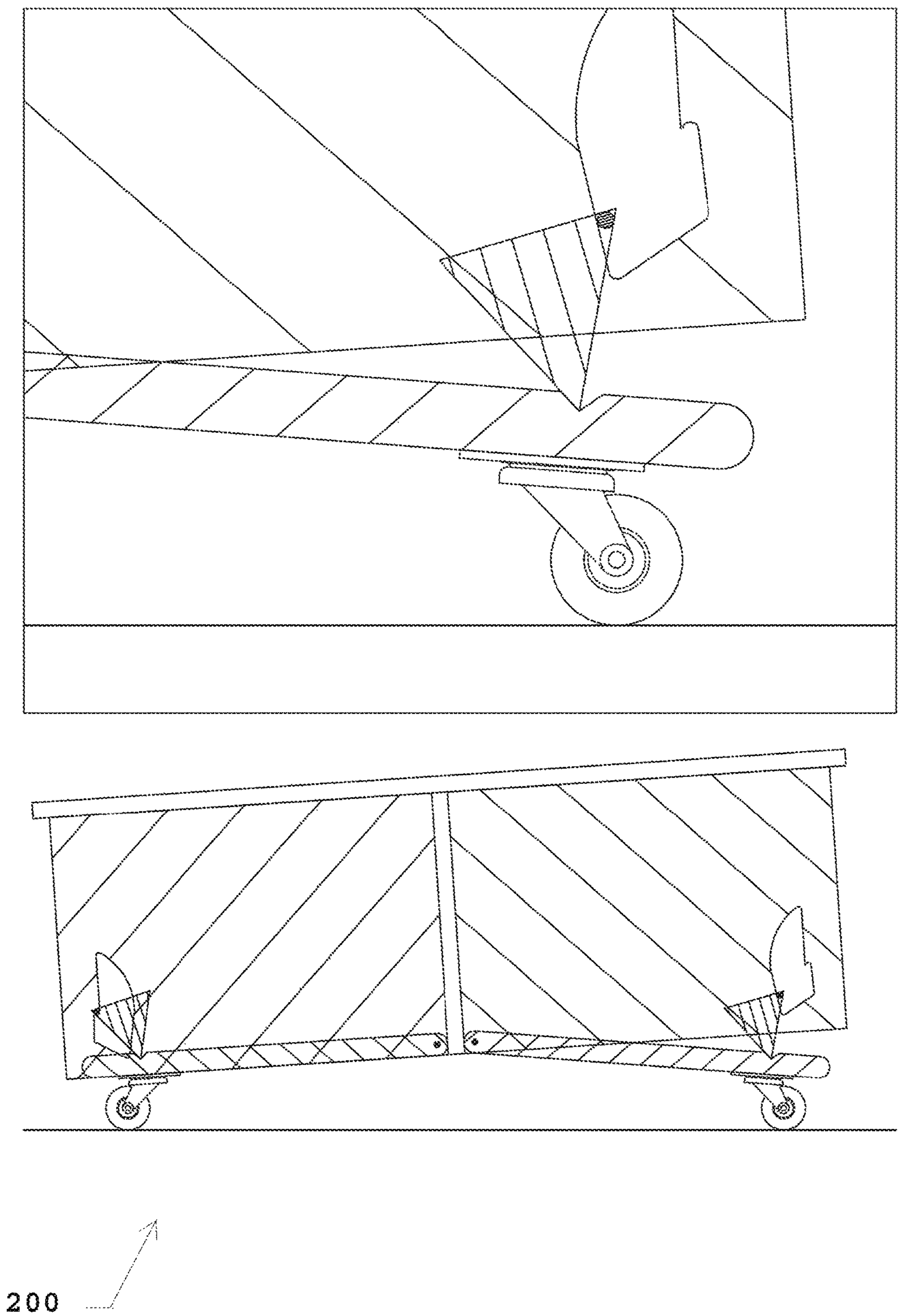
Figure 156:
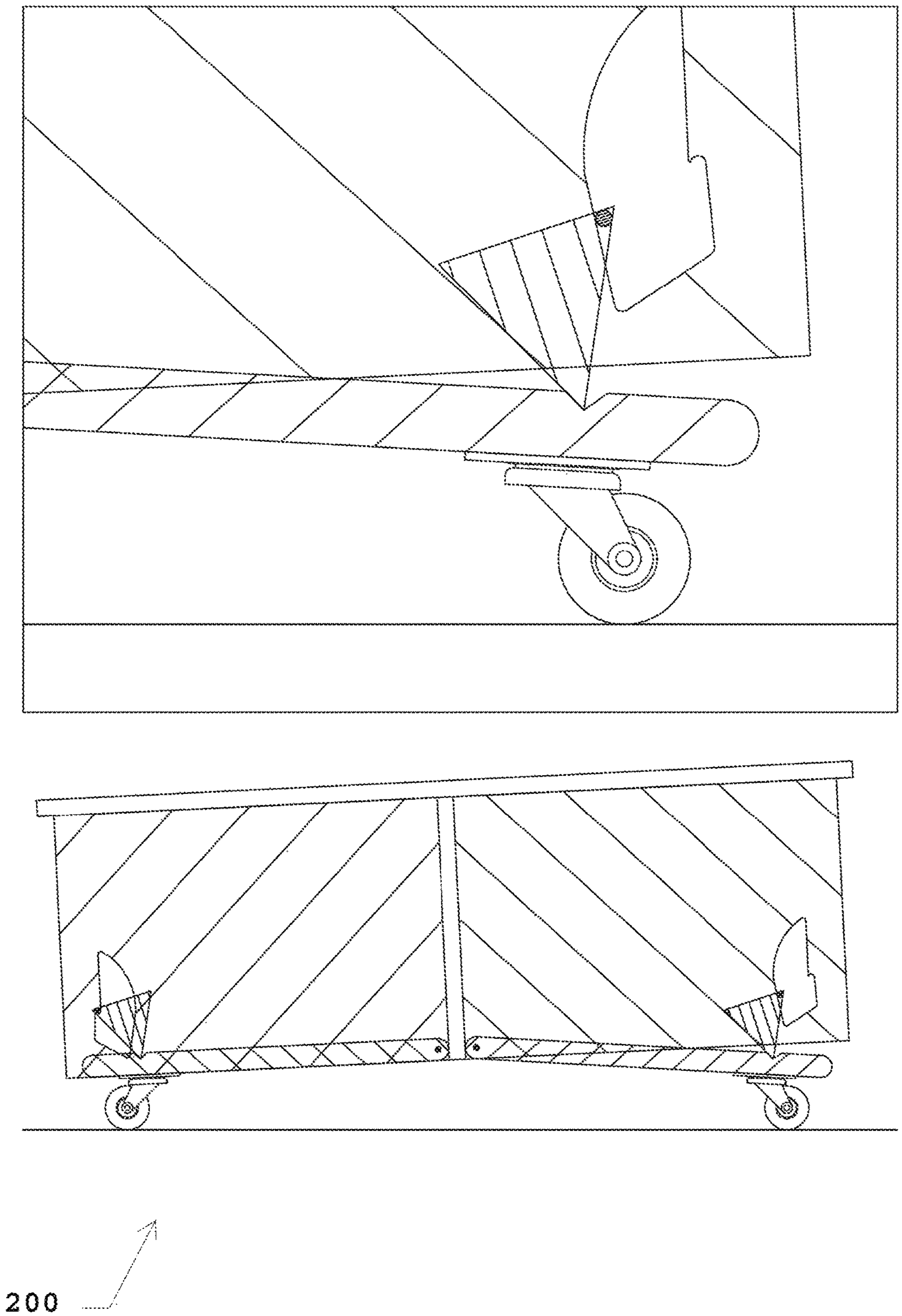
Figure 157:
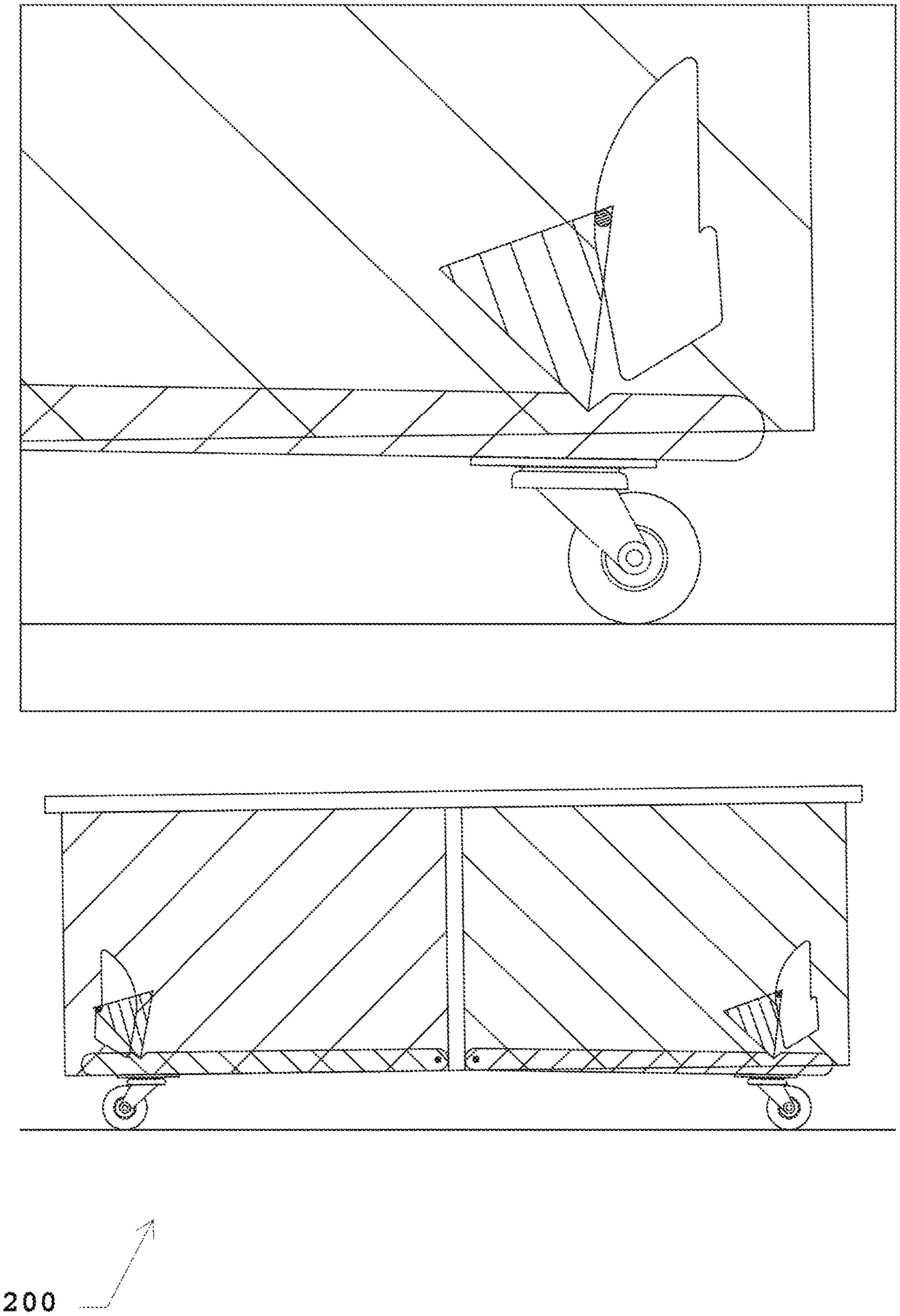
Figure 158:
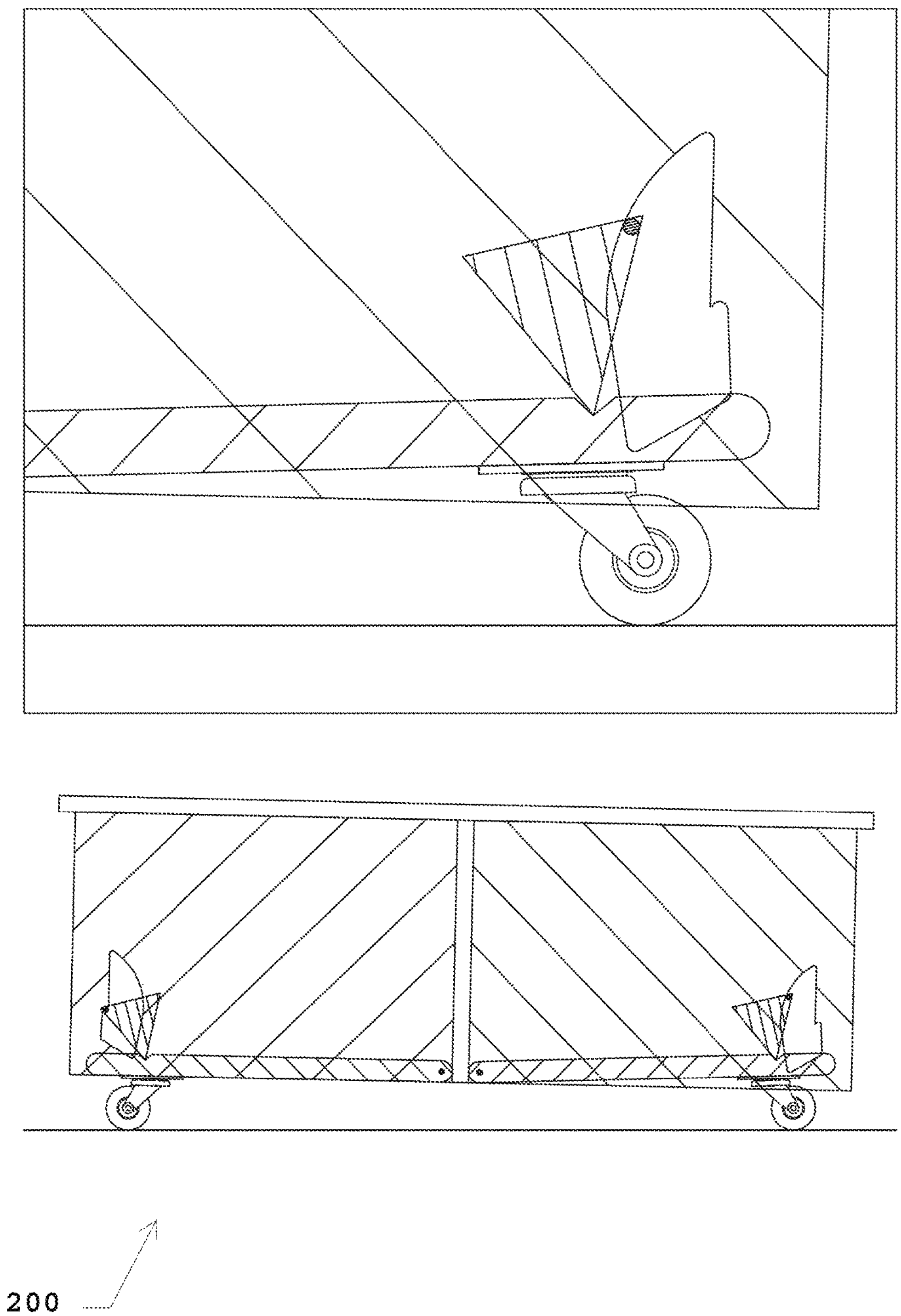
Figure 159:
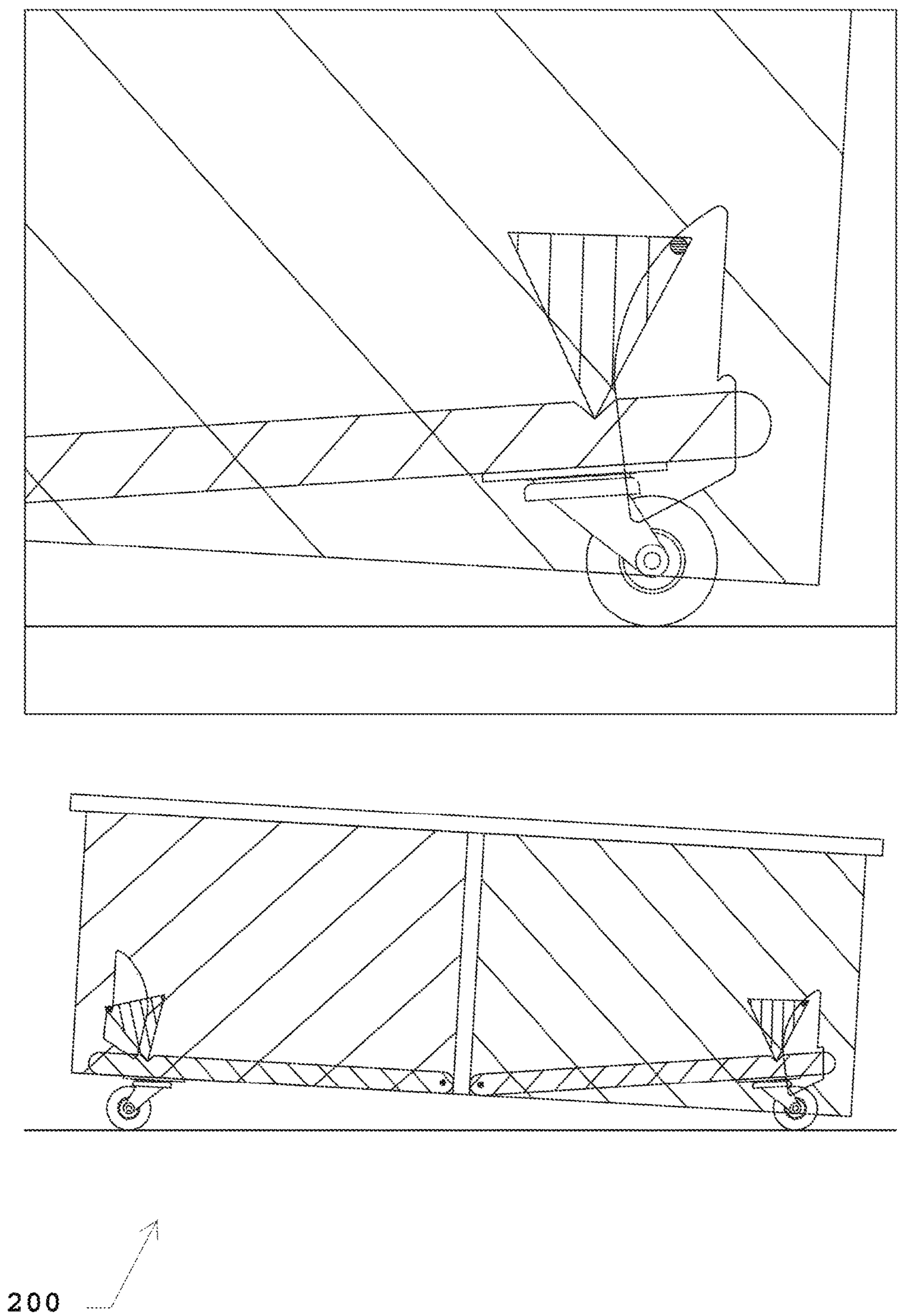
Figure 160:
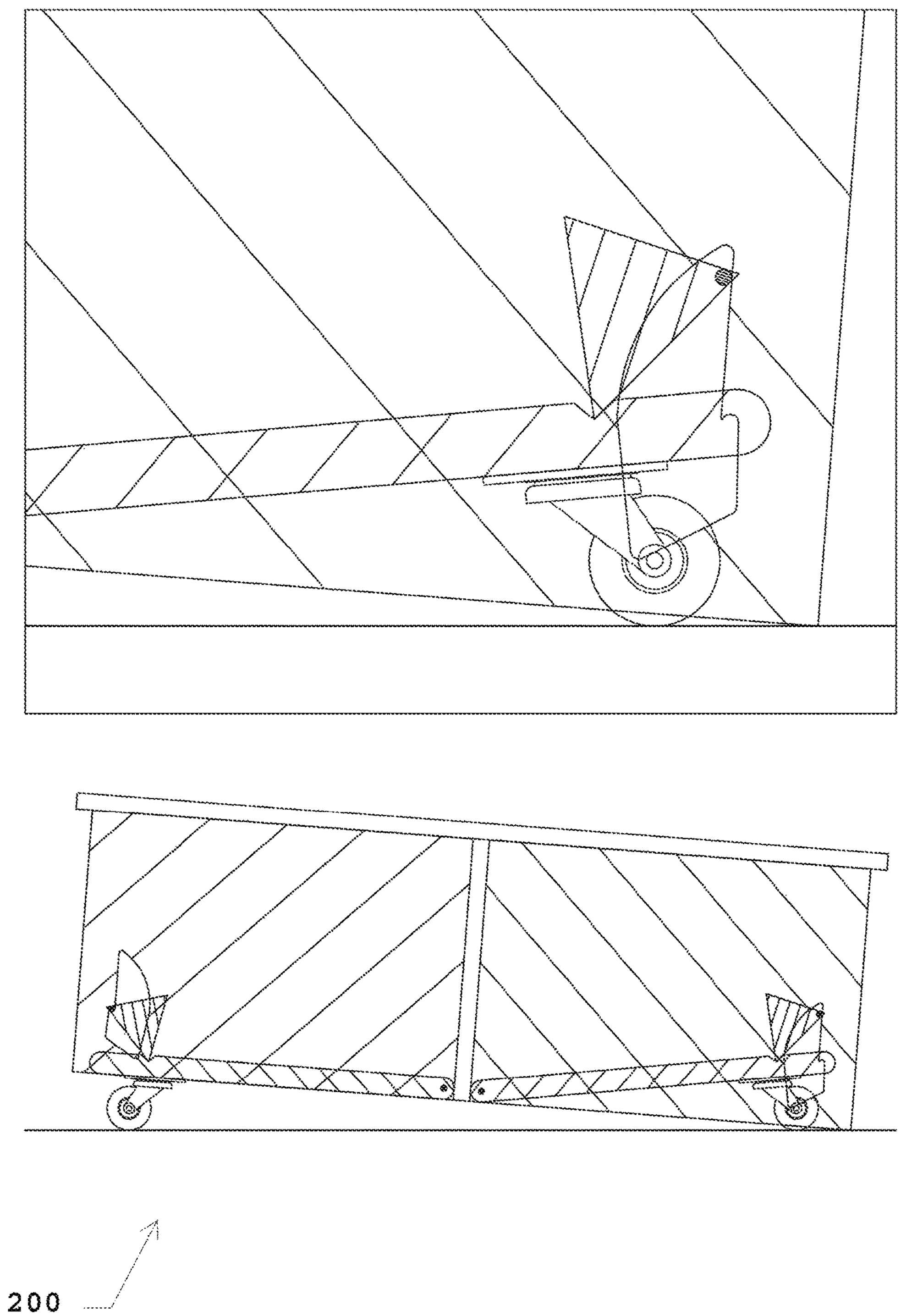
Figure 161:
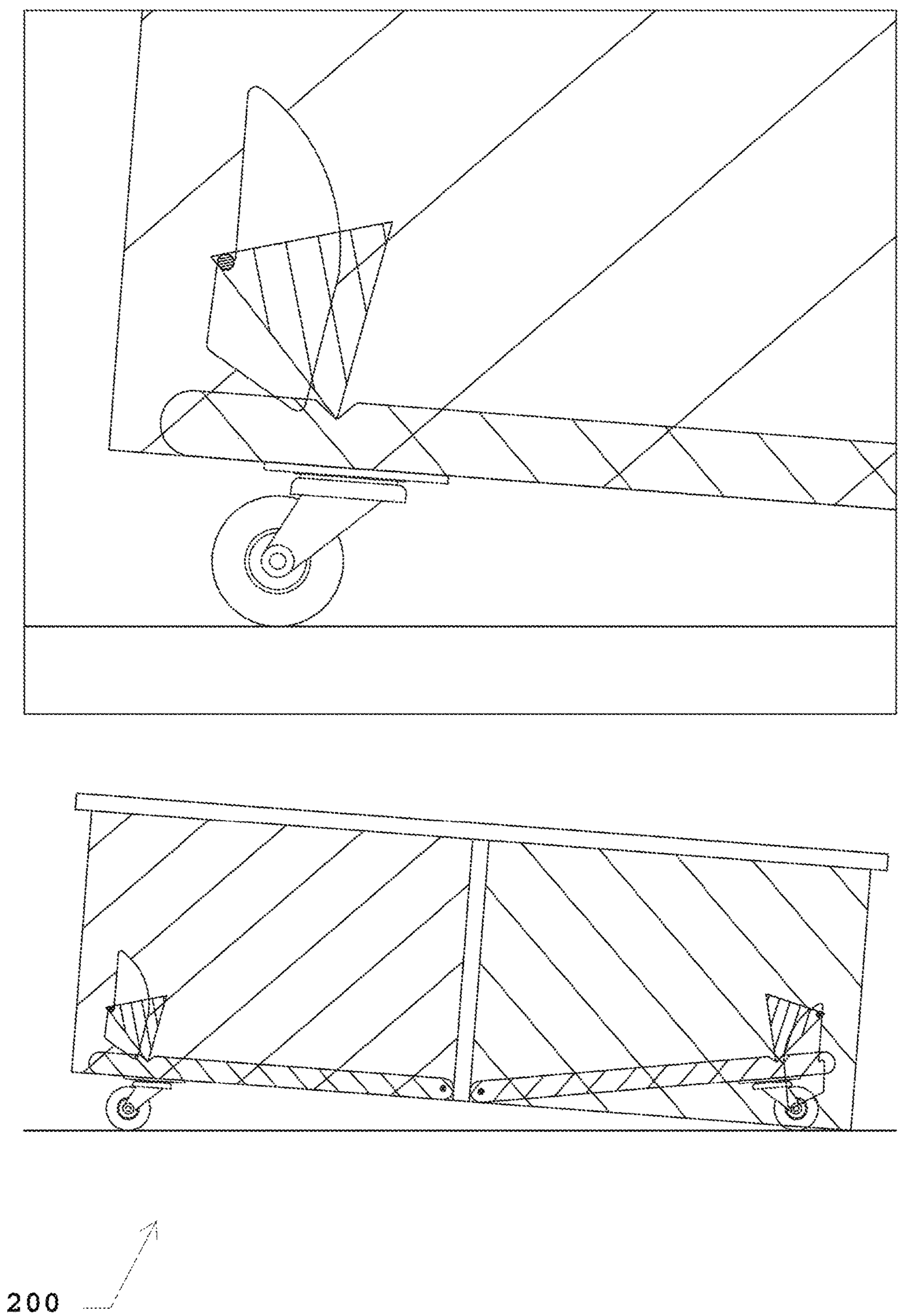
Figure 162:
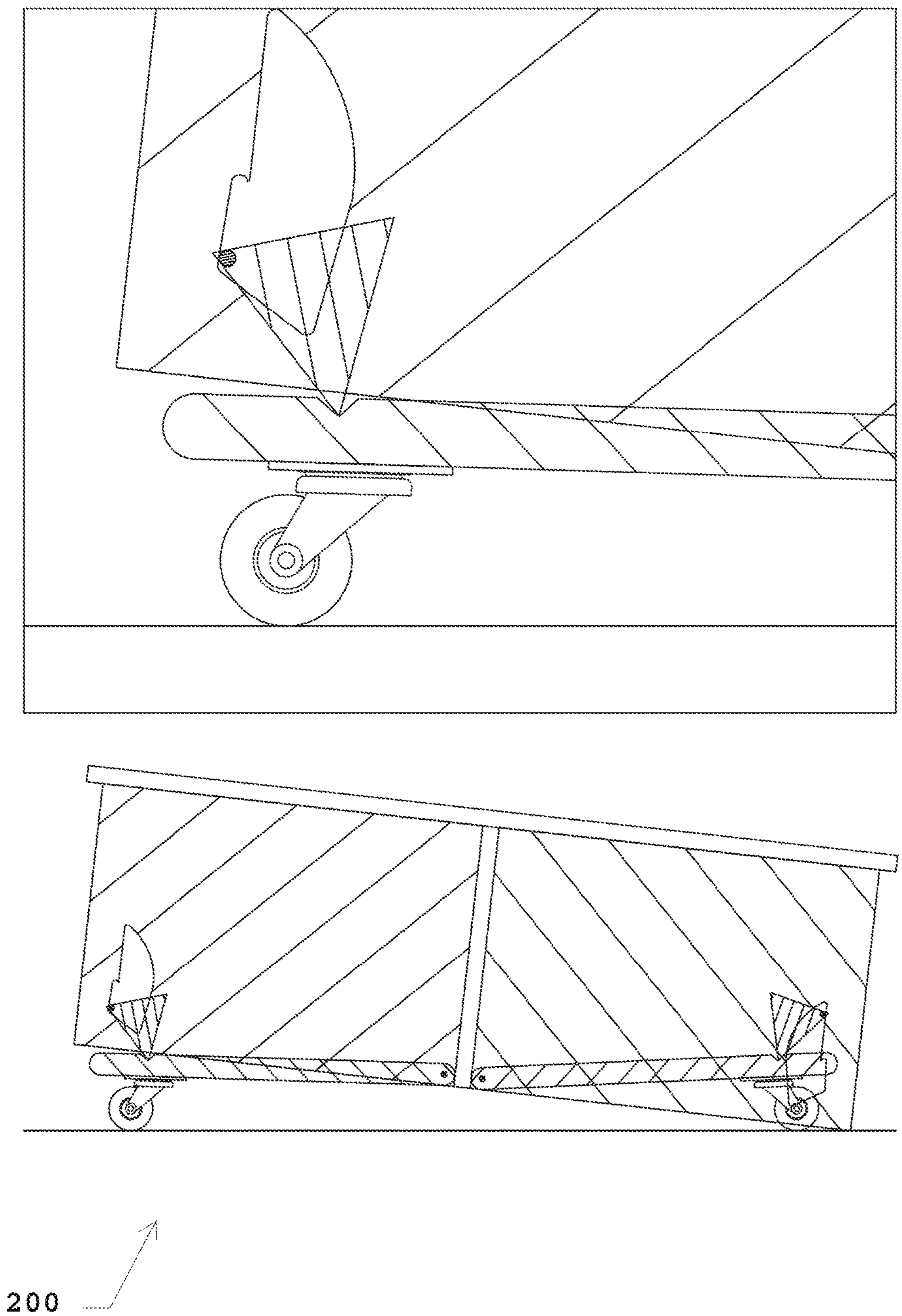
Figure 163:
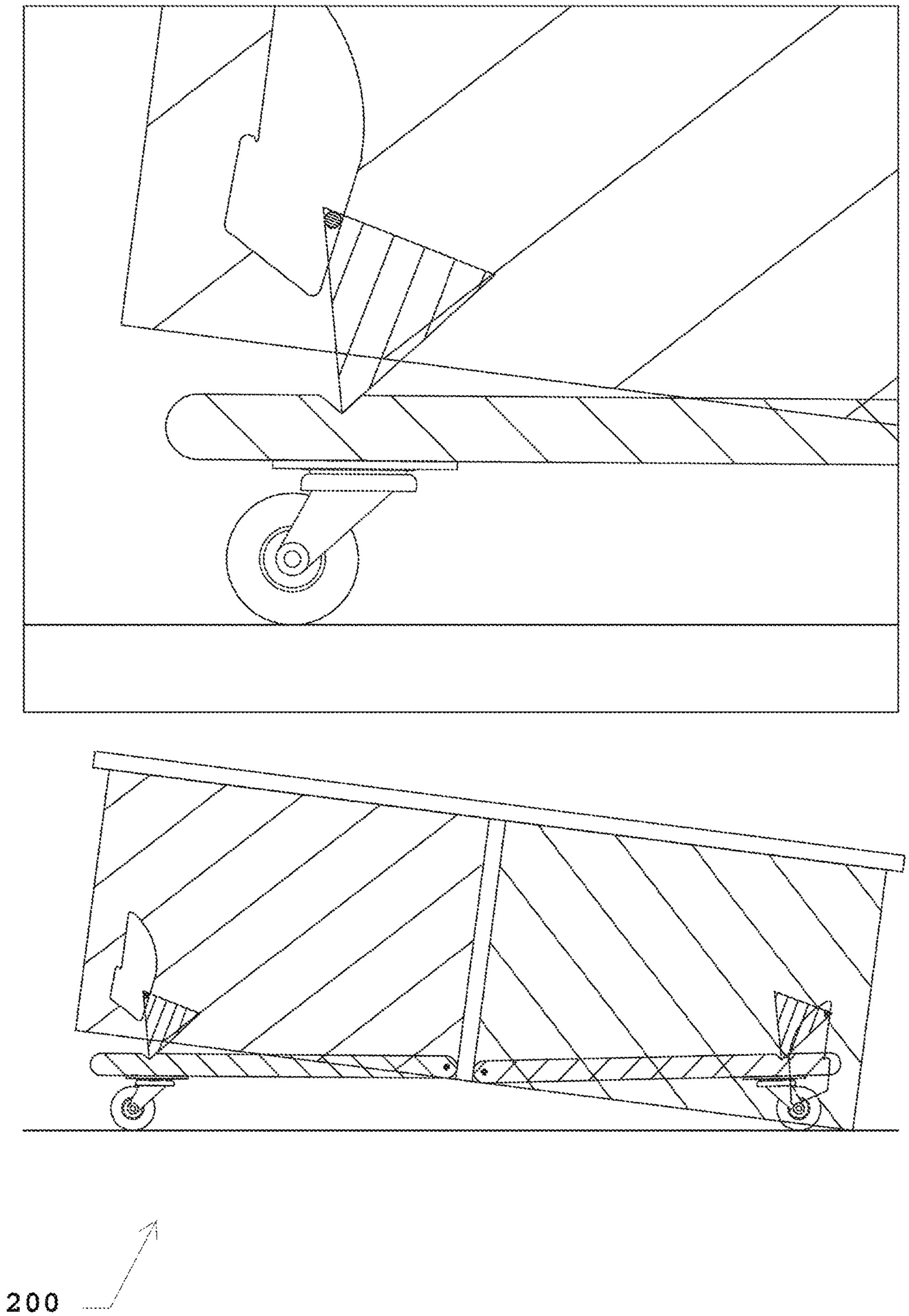
Figure 164:
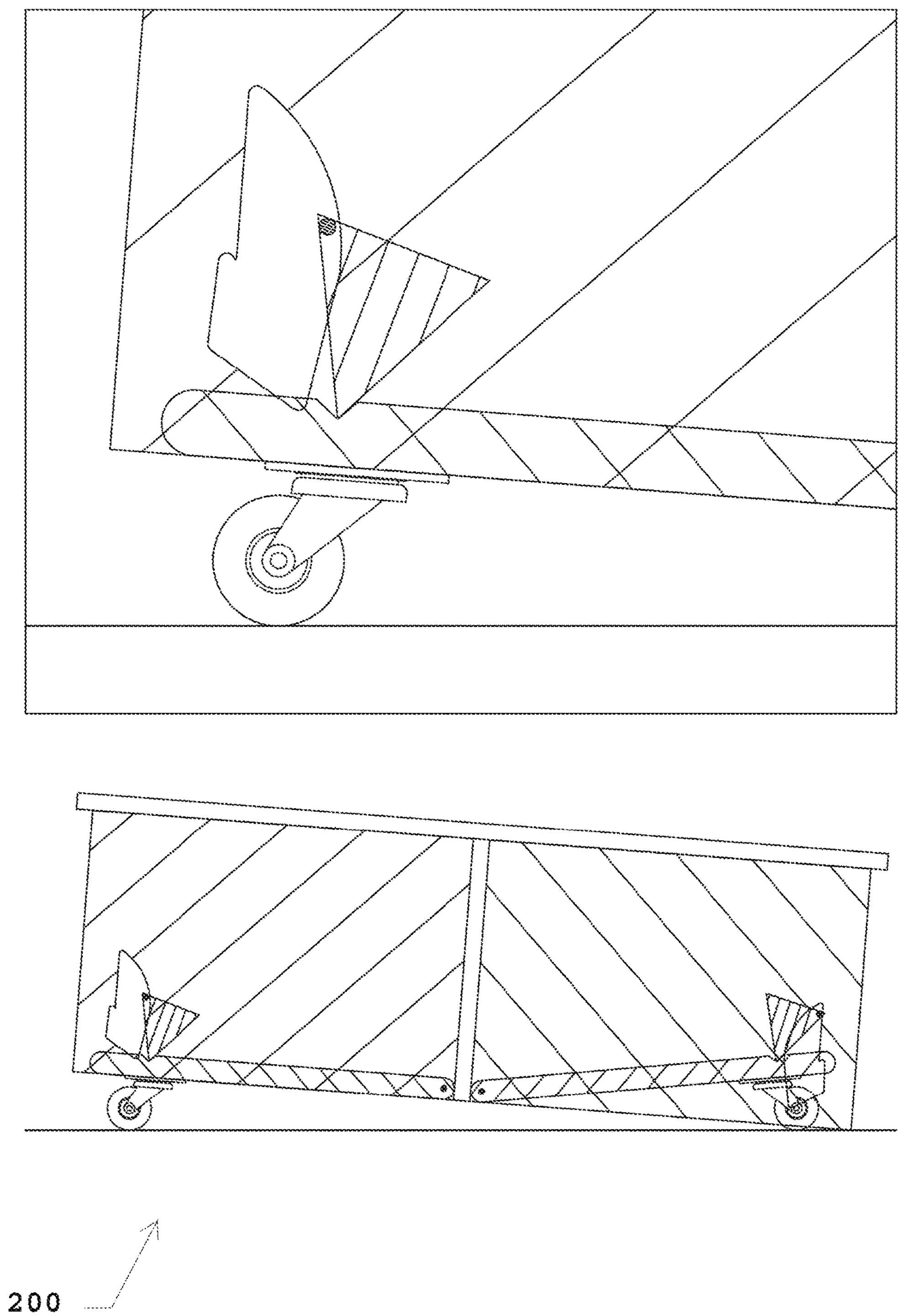
Figure 165:
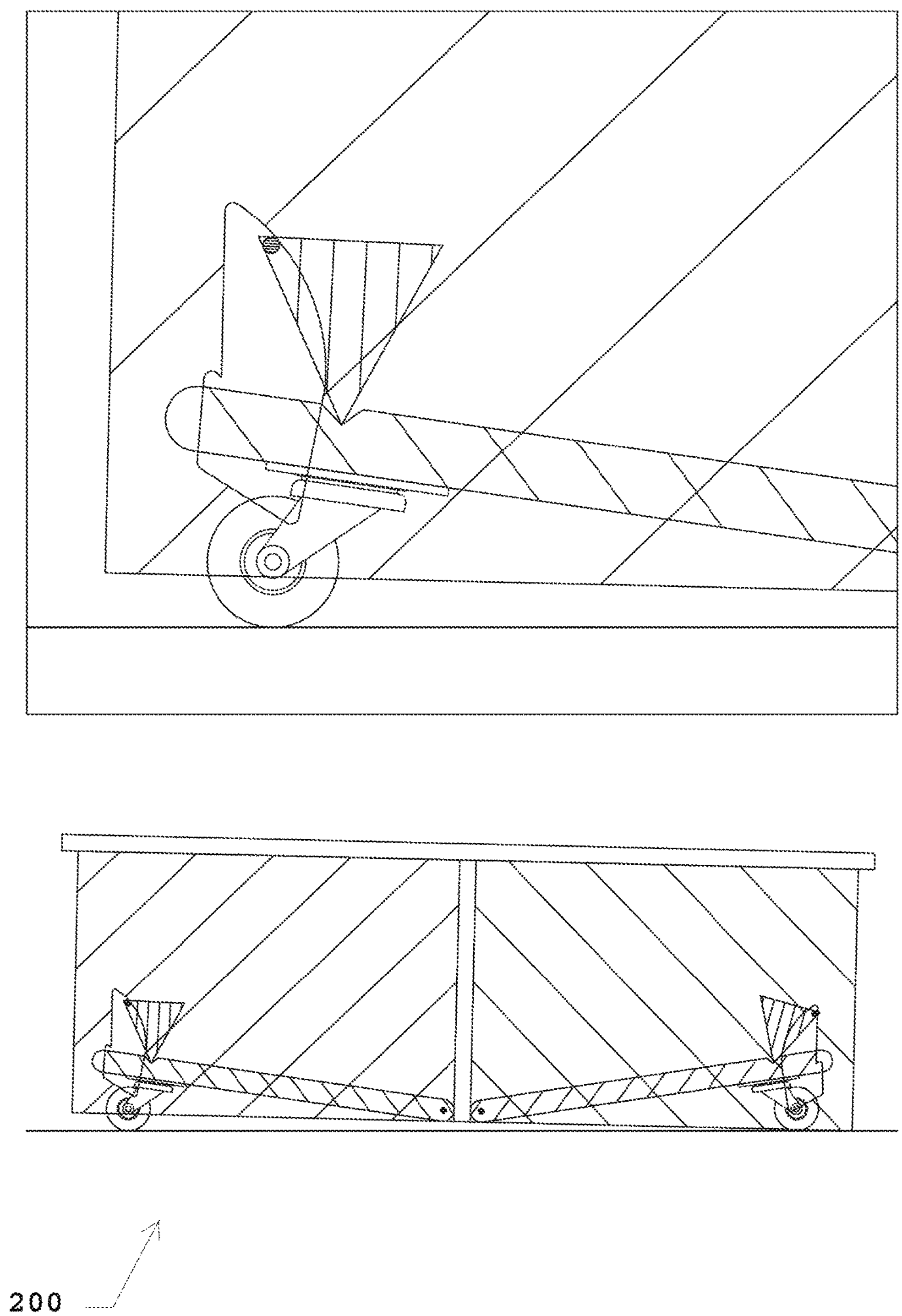

| State<br>State narrative | Event | Next State |
|---|---|---|
| | c. Raise Housing 201 to elevation in FIG. 151+, less than elevation in FIG. 153+ | Three |
| | d. Raise Housing 201 to elevation in FIG. 153+ | Four |
| Two<br>Switch 206 falls to bottom of first energy well (FIG. 141); Housing 201 supported by Switch 206, Switch 206 supported by Platform 202 (FIG. 141) | e. Raise Housing 201 to elevation less than in FIG. 151, then lower to elevation in FIG. 148 | Two |
| | c. Raise Housing 201 to elevation in FIG. 151+, less than elevation in FIG. 153+ | Three |
| | d. Raise Housing 201 to elevation in FIG. 153+ | Four |
| Three<br>Switch 206 in or will return to second energy well (FIG. 152); Housing 201 supported by external force; Switch 206 supported by Housing 201 and/or Platform 202; Platform 202 supported by external surface | d. Raise Housing 201 to elevation in FIG. 153+ | Four |
| | f. Lower Housing 201 to elevation in FIGS. 160 or 166 | One |
| Four<br>Switch 206 in or will return to second energy well; (FIG. 152); Housing 201 supported by external force; Switch 206 supported by Housing 201; Platform 202 supported by Switch 206; FIG. 154 | f. Lower Housing 201 to elevation in FIGS. 160 or 166 | One |

States Three and Four in the foregoing require an external force to support the Housing (such as a human, a fork lift, a crane, or similar). When the external force is removed following the event, then States Three and Four return to State One. If events which do not pass a point-of-no-return are removed, then the table of states and events is reduced to the following:

TABLE FOUR

| State | Event | Next State |
|---|---|---|
| One | b. | Two |
| One | c. | One |
| One | d. | One |
| Two | c. | One |
| Two | d. | One |

In the foregoing, when the machine is in State One, one event, Event b, can transition the machine to State Two. In the foregoing, when the machine is in State Two, two events, Event c and d, can transition the machine to State One. Events b, c, and d are points of no return.

FIGS. 167 to 177 illustrate a Third Embodiment 300 of a kinematic state machine. In the Third Embodiment 300, the kinematic pairing between the first and second bodies imposes five constraints on the degrees of freedom in relative movement between the bodies. In the Third Embodiment 300, the kinematic pairing is prismatic.

Figure 167:
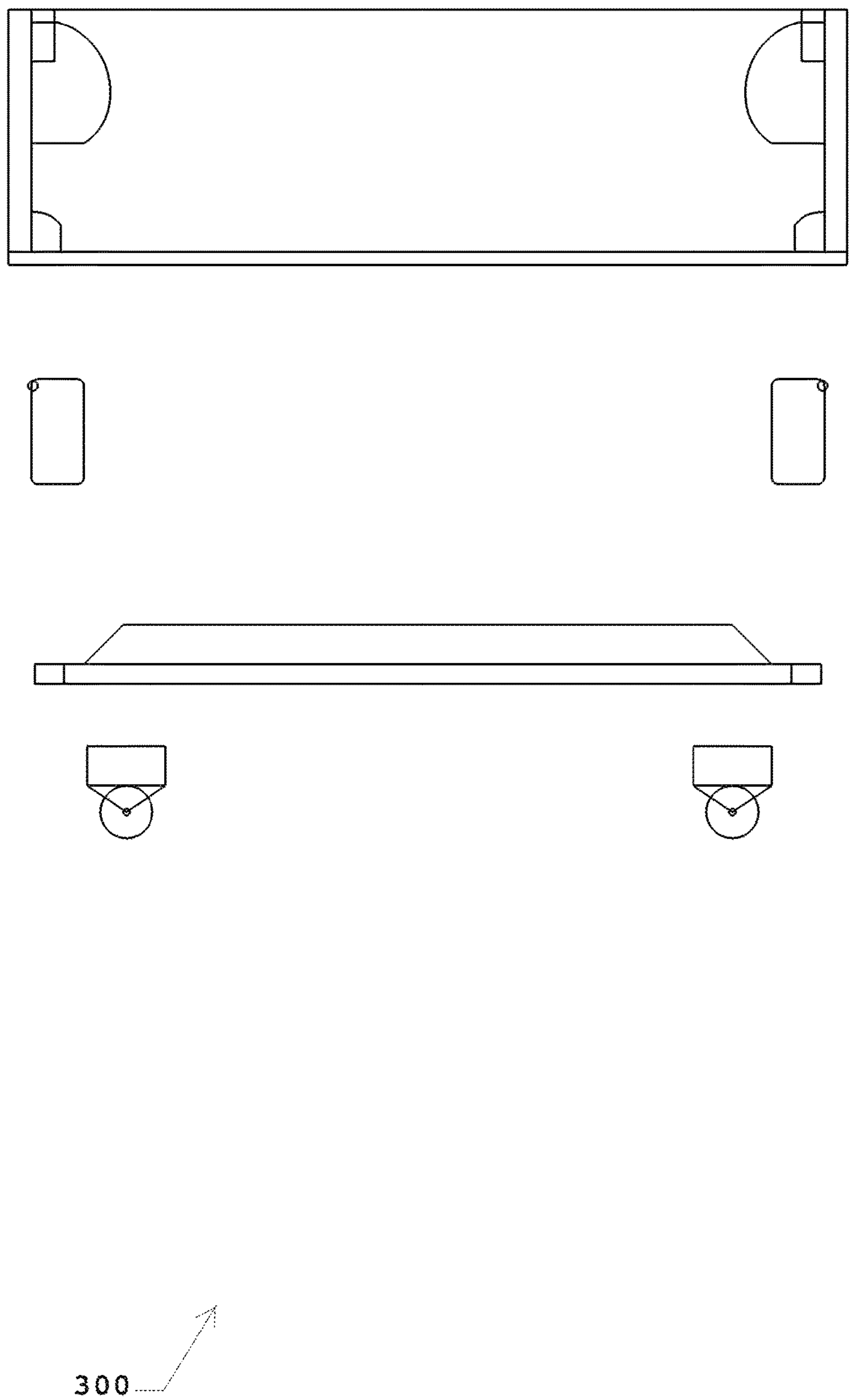
FIGS. 167 to 177 illustrate a Third Embodiment of a kinematic finite state machine, in which the first and second bodies have a piston-type relationship and the switch has a non-round vertical cross section. Within this group of figures.
Figure 168:
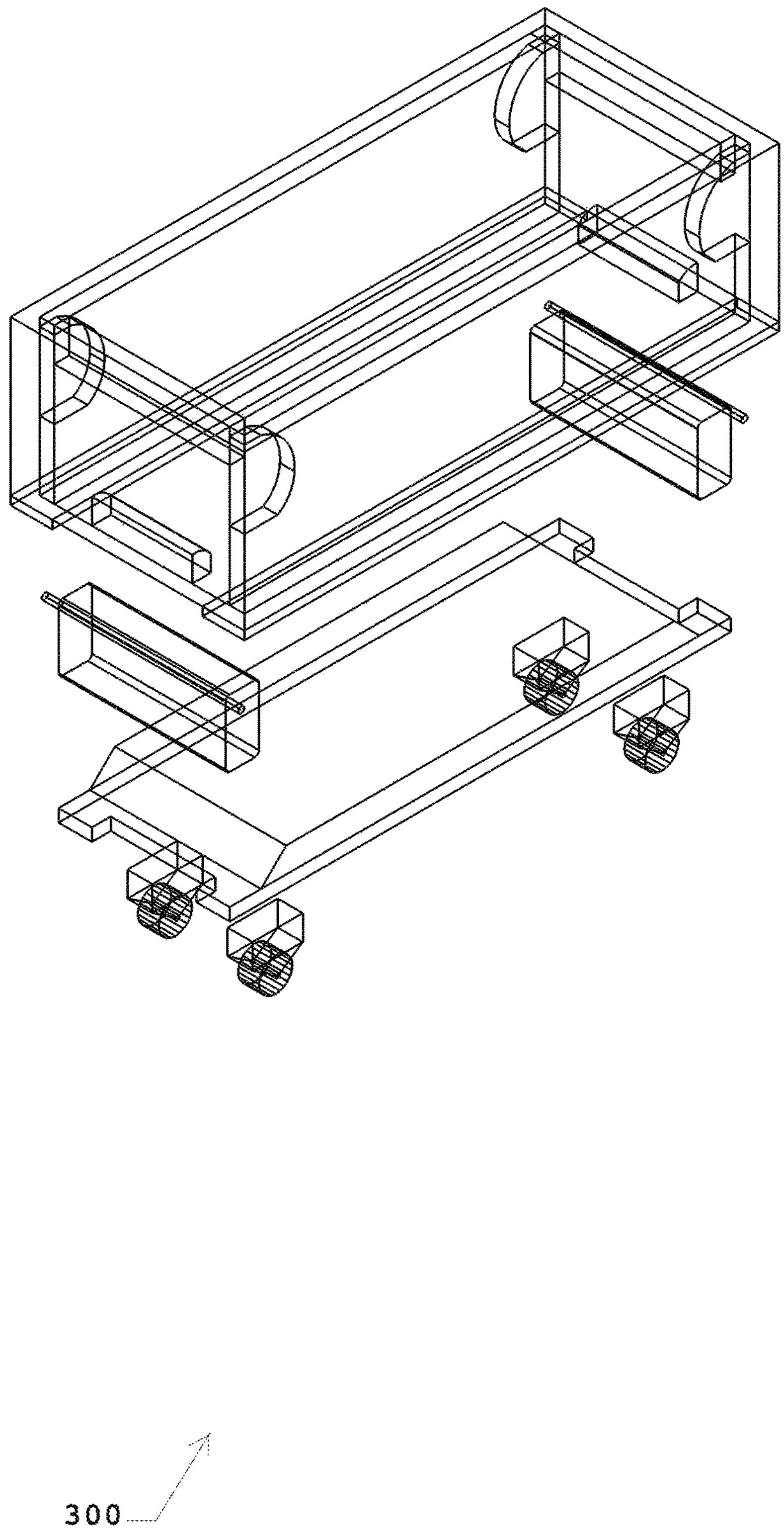
Figure 169:
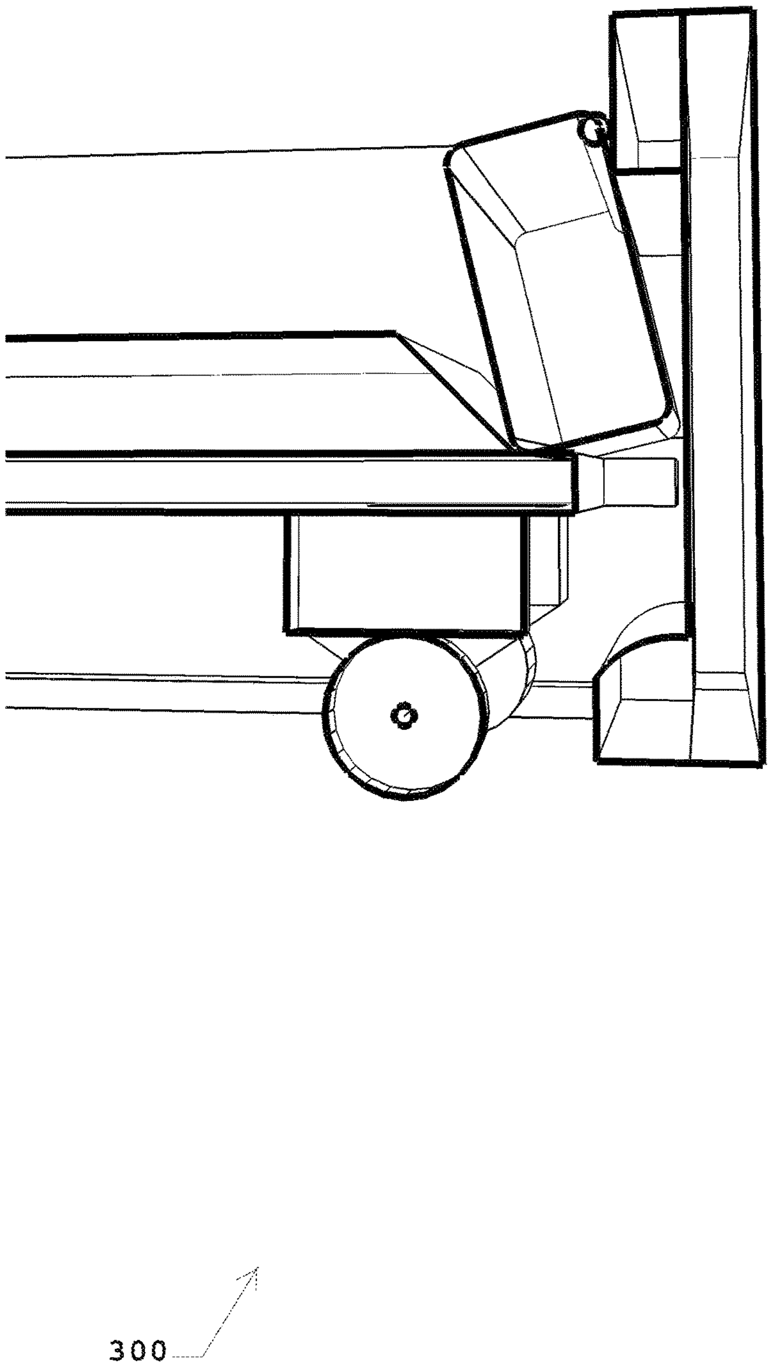
Figure 170:
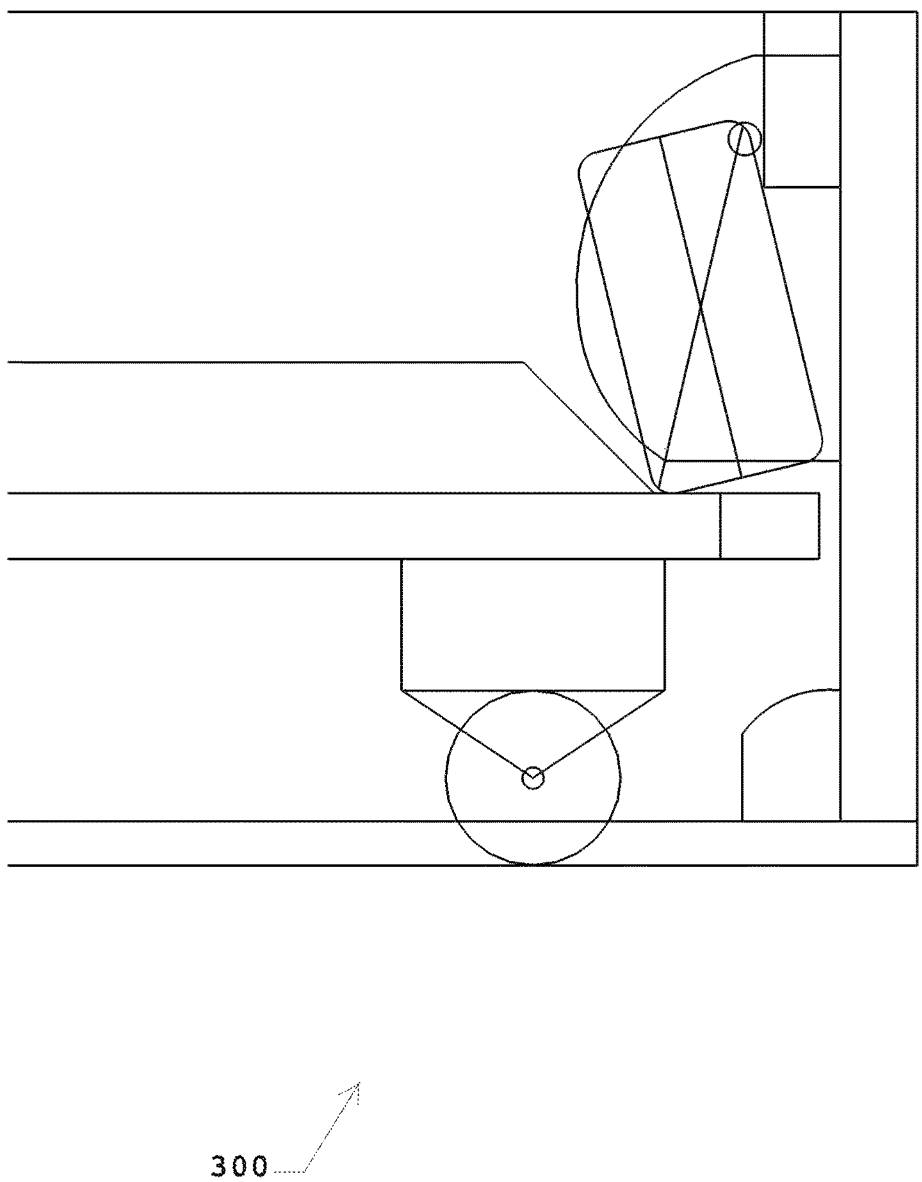
Figure 171:
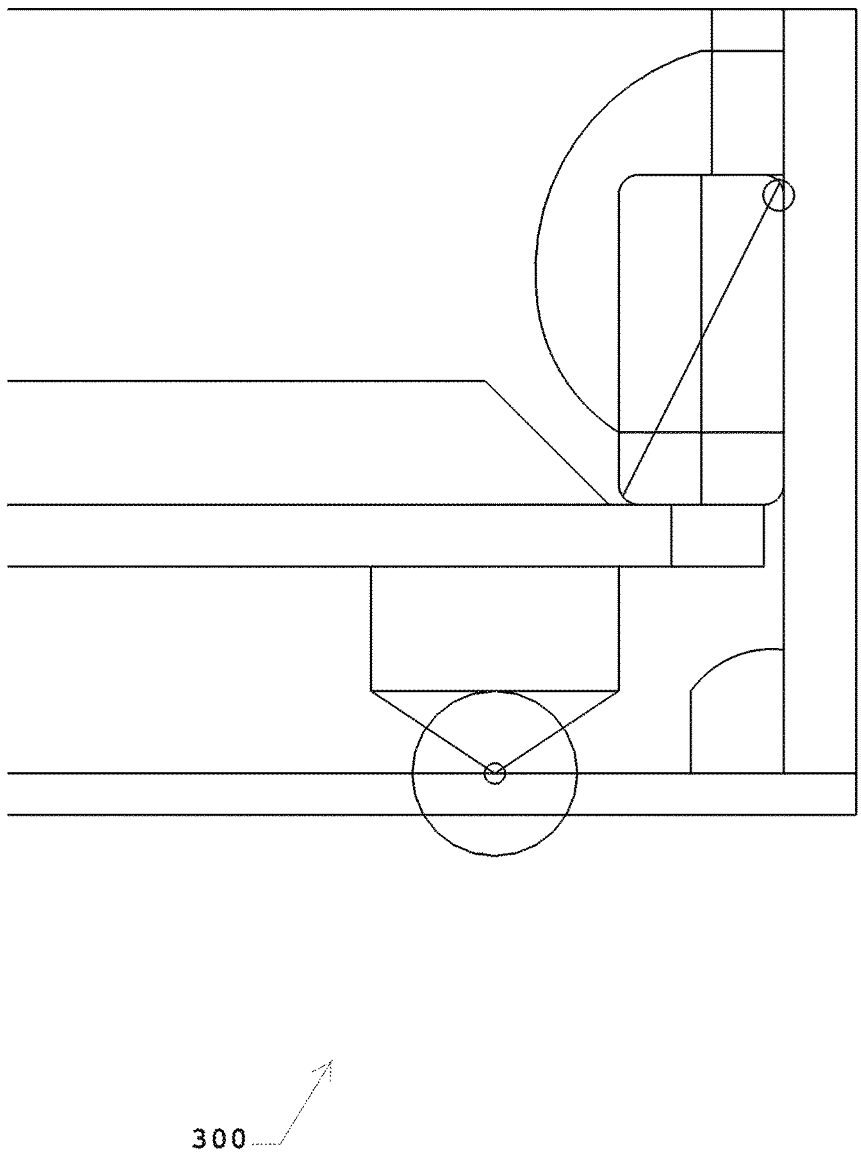
Figure 172:
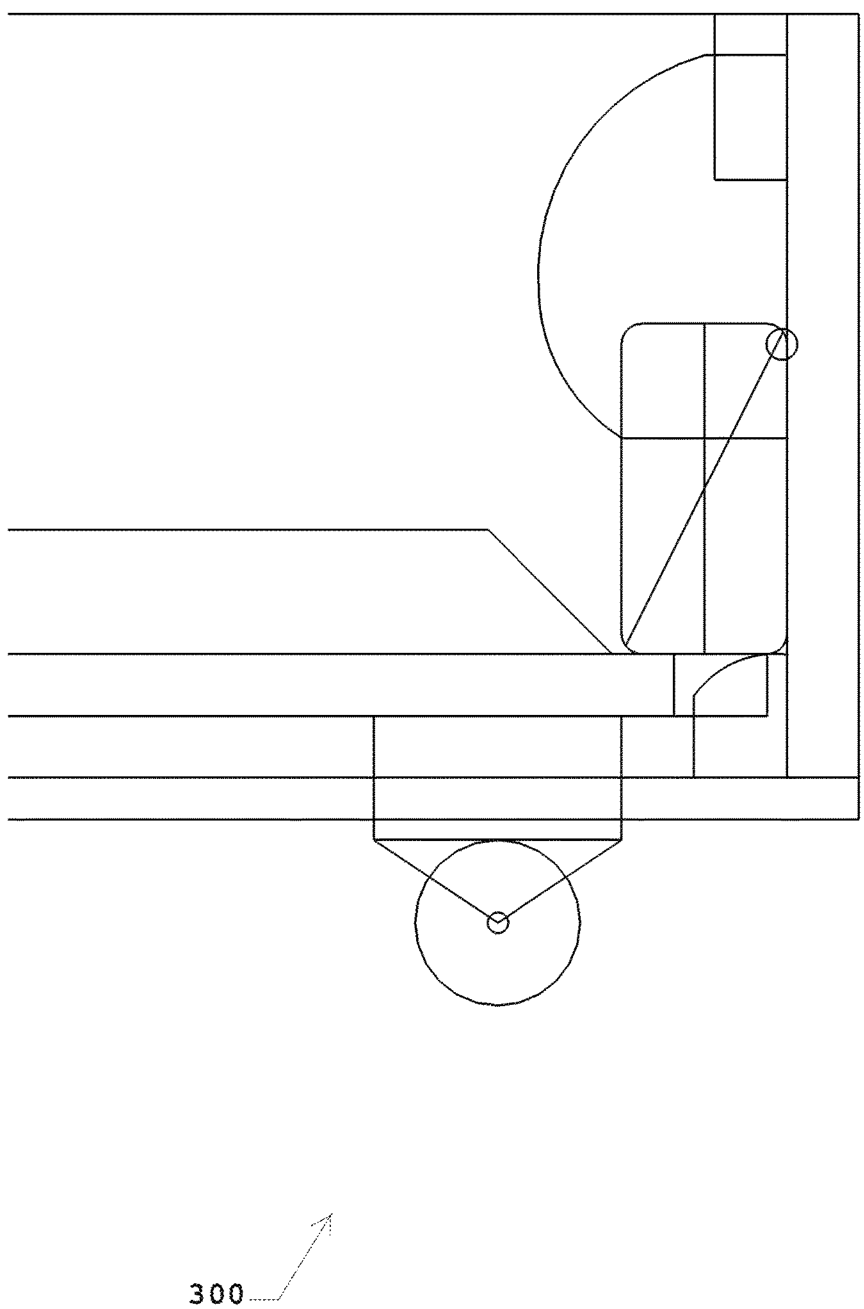
Figure 173:
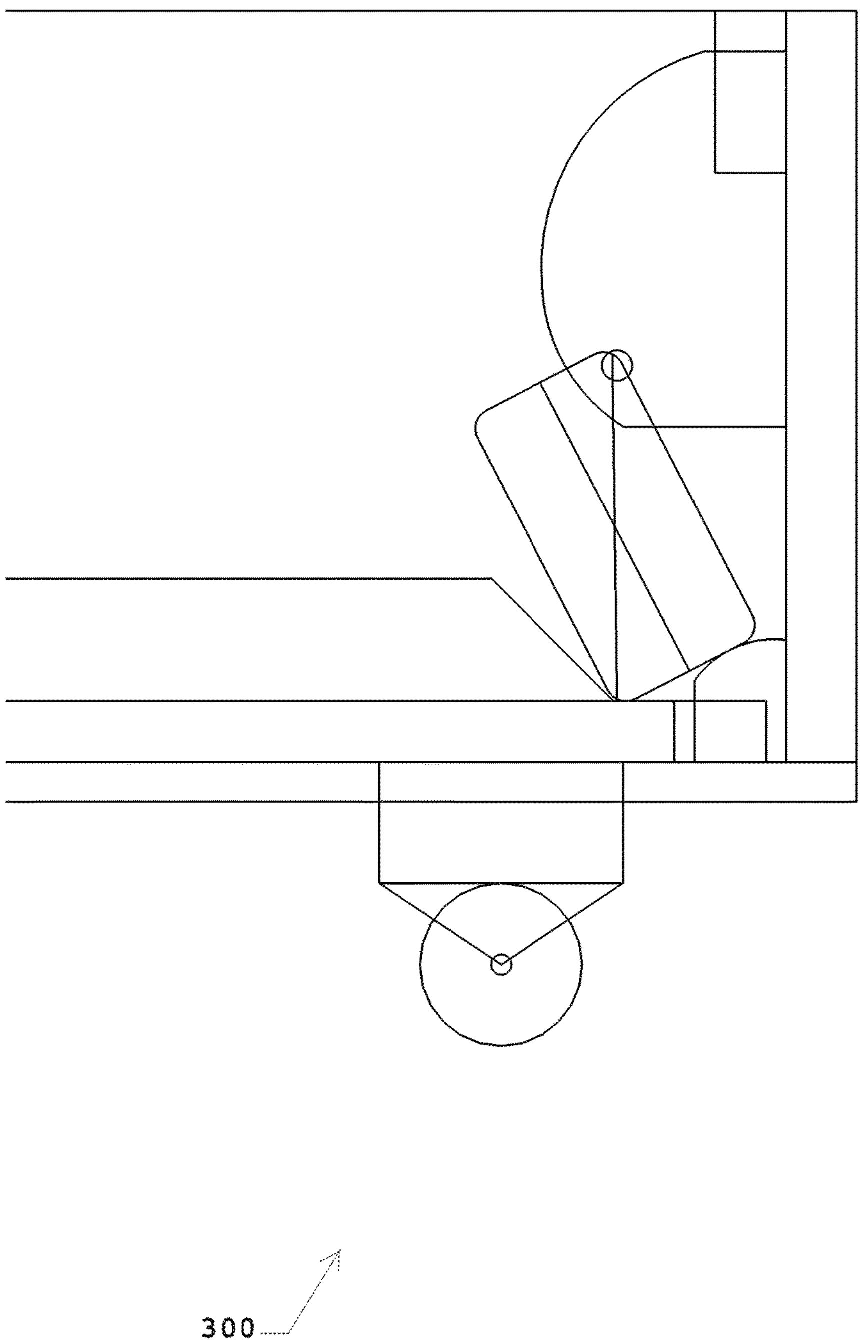
Figure 174:
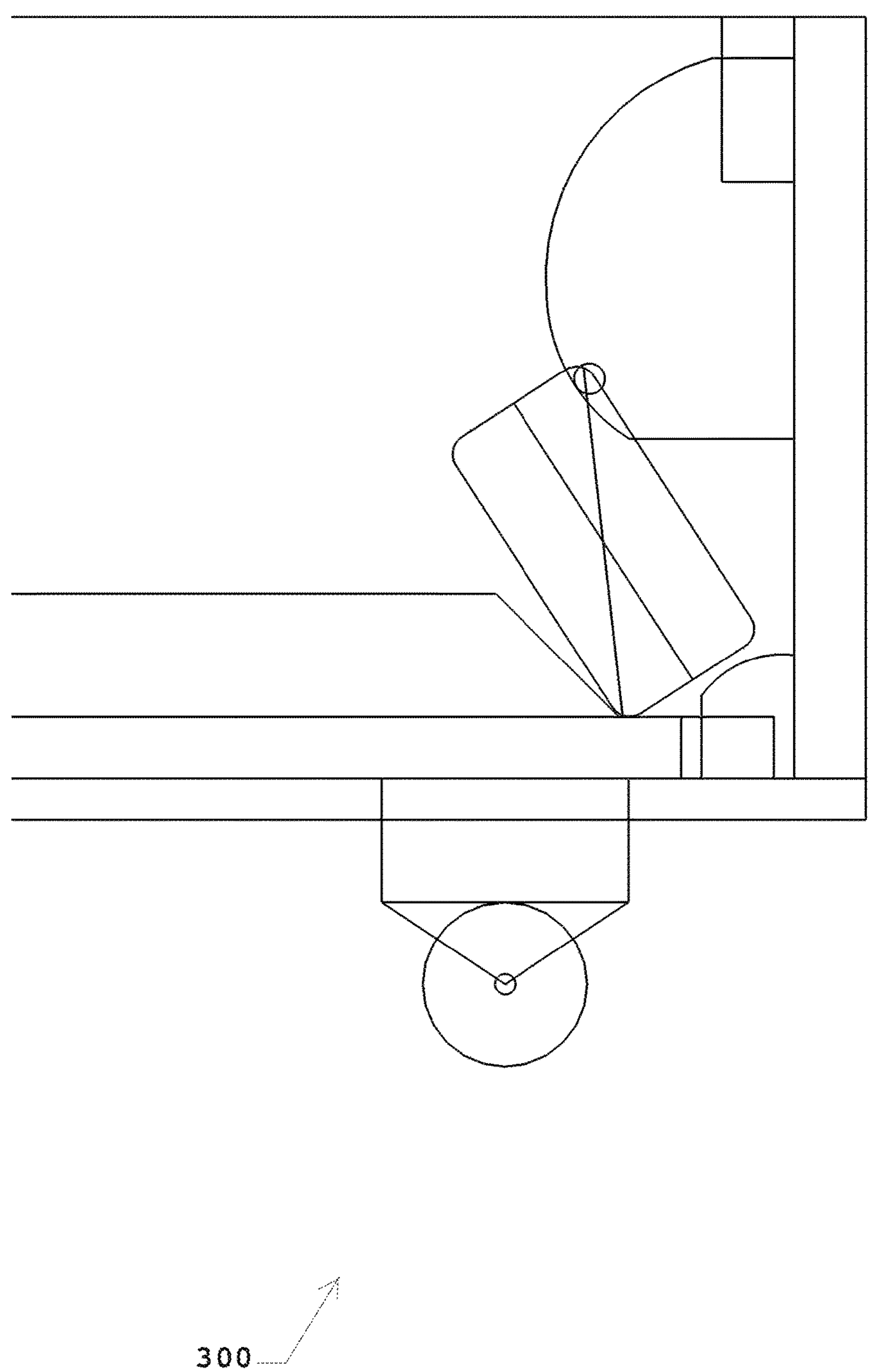
Figure 175:
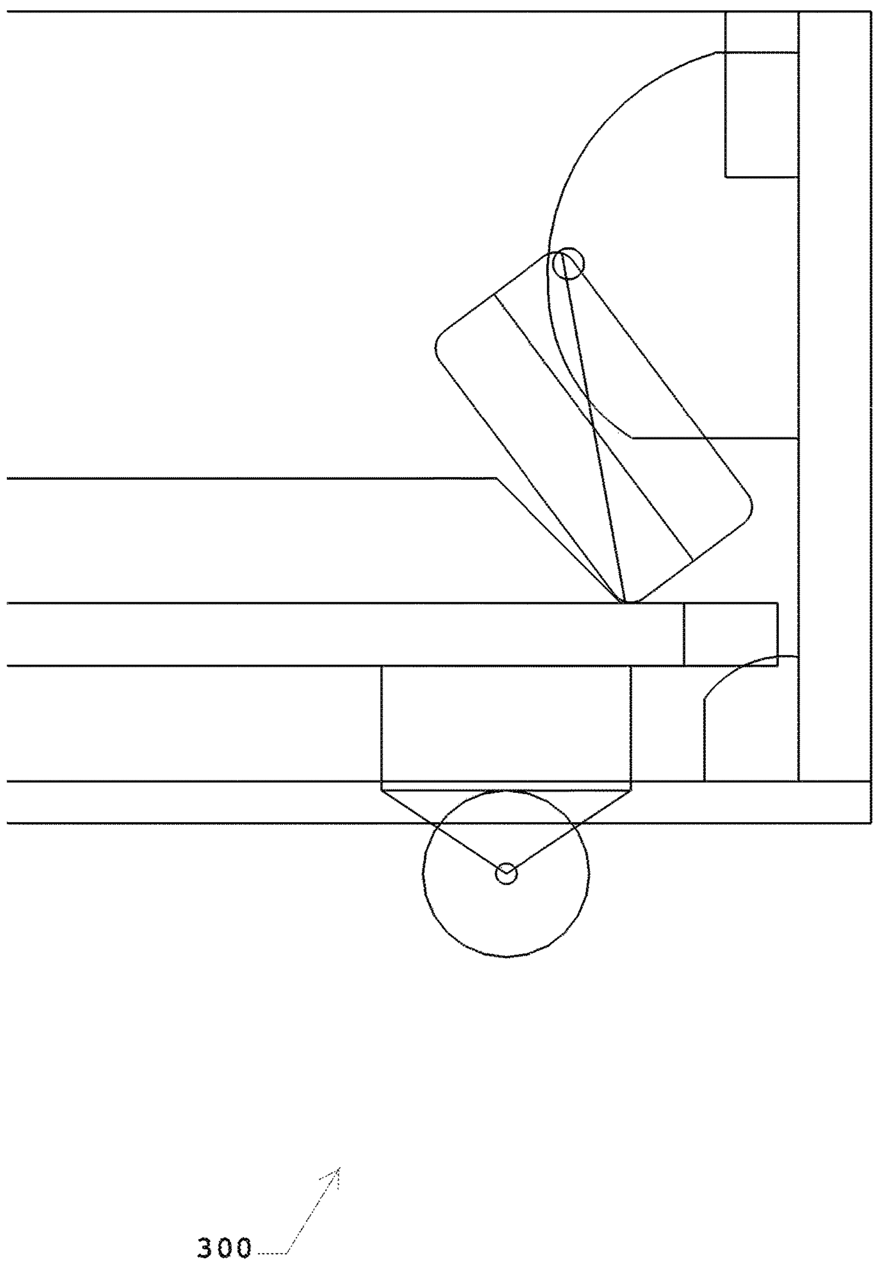
Figure 176:
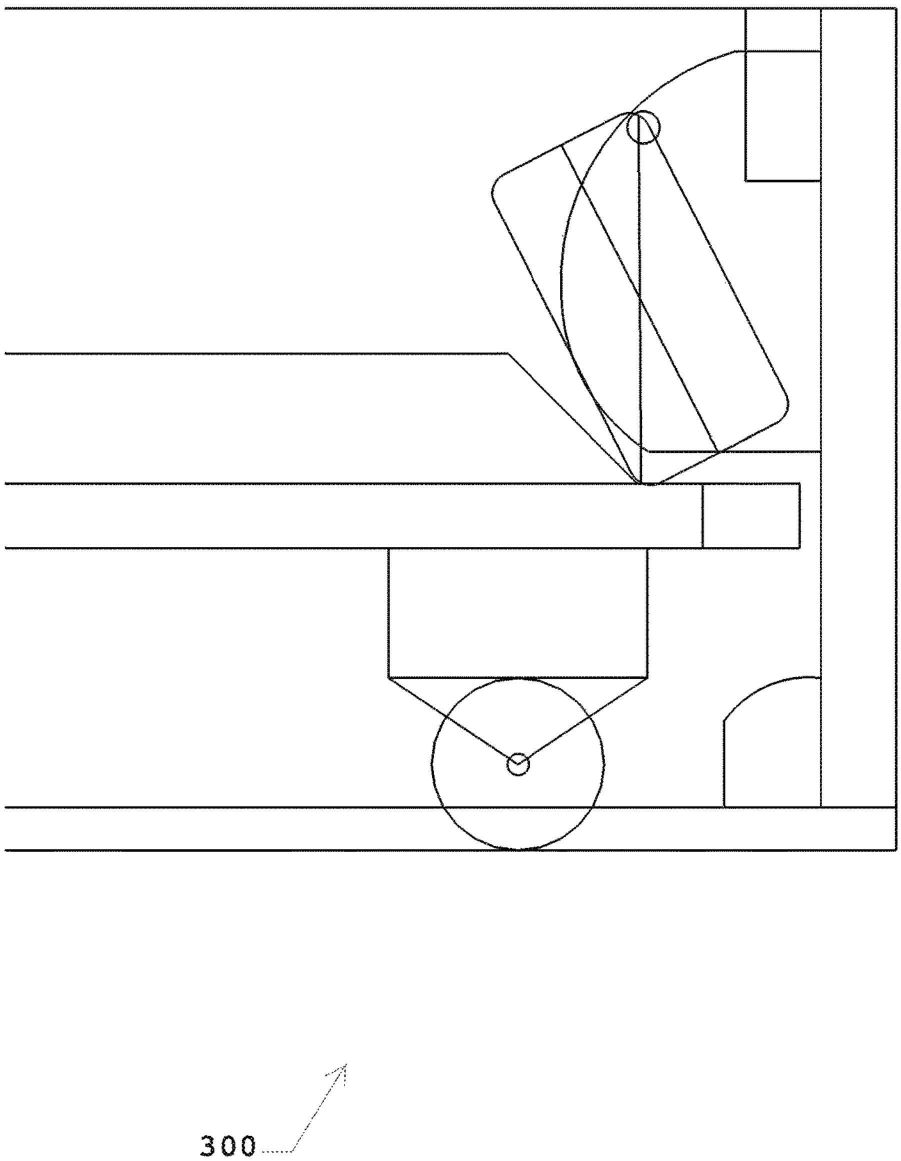
Figure 177:
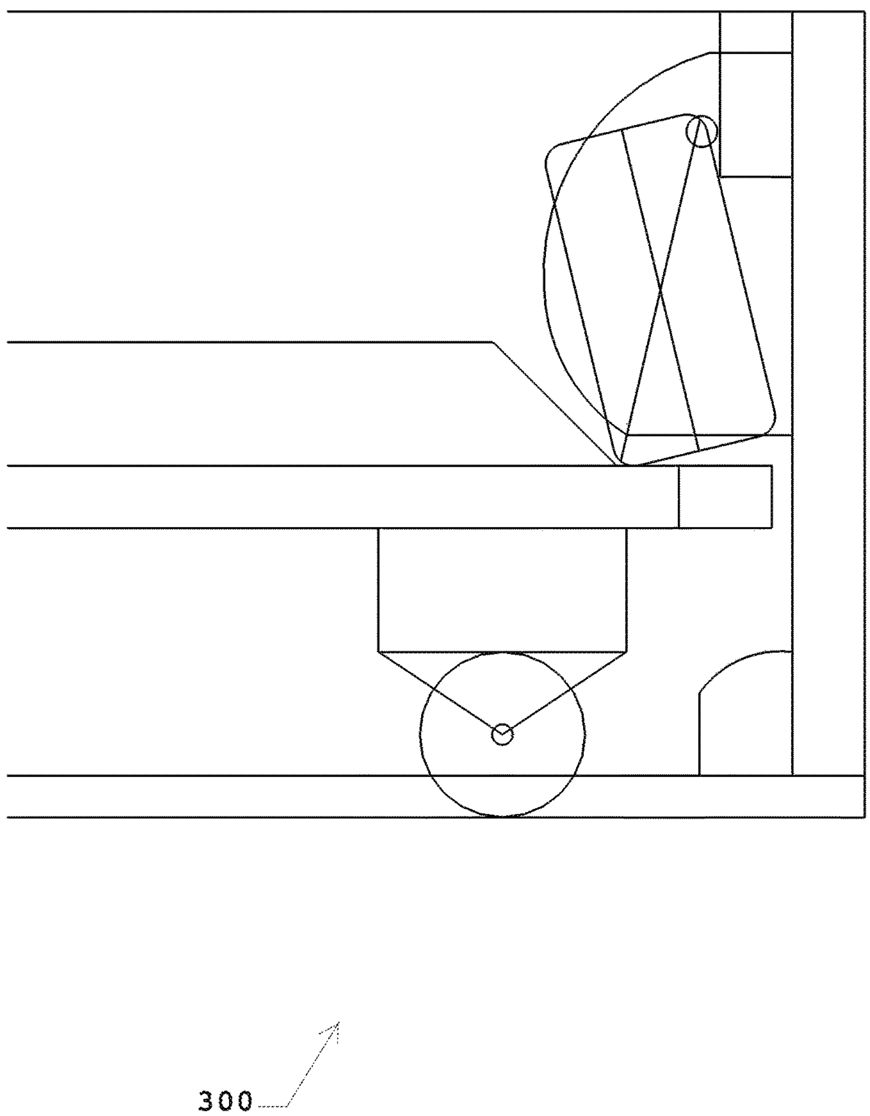
Figure 178:
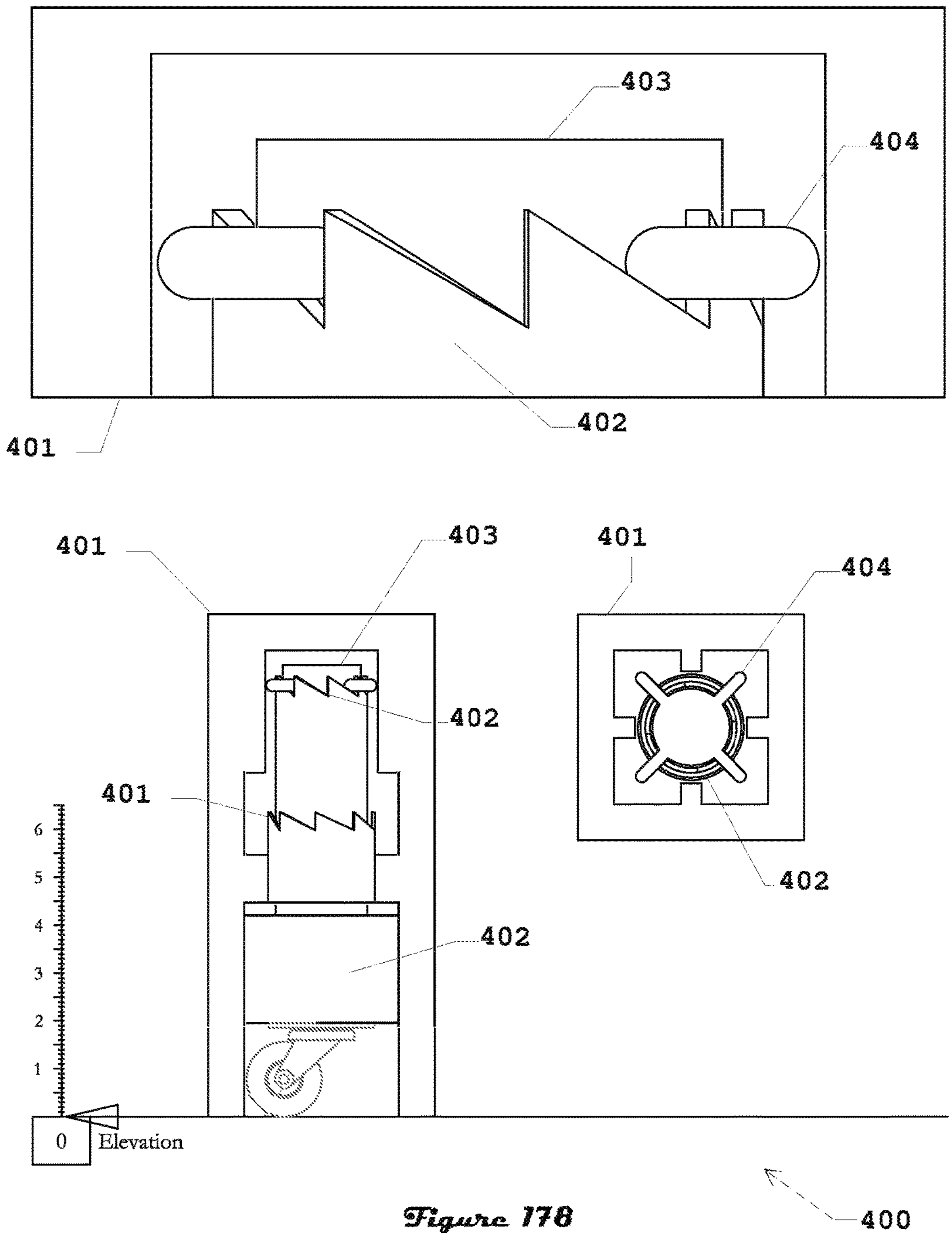
FIGS. 178 to 217 illustrate elevation, close elevation, and top plan views of a Fourth Embodiment, in which the first and second bodies have a piston-type relationship, and show the states and events of this embodiment of the finite state machine as the first body moves.
Figure 179:
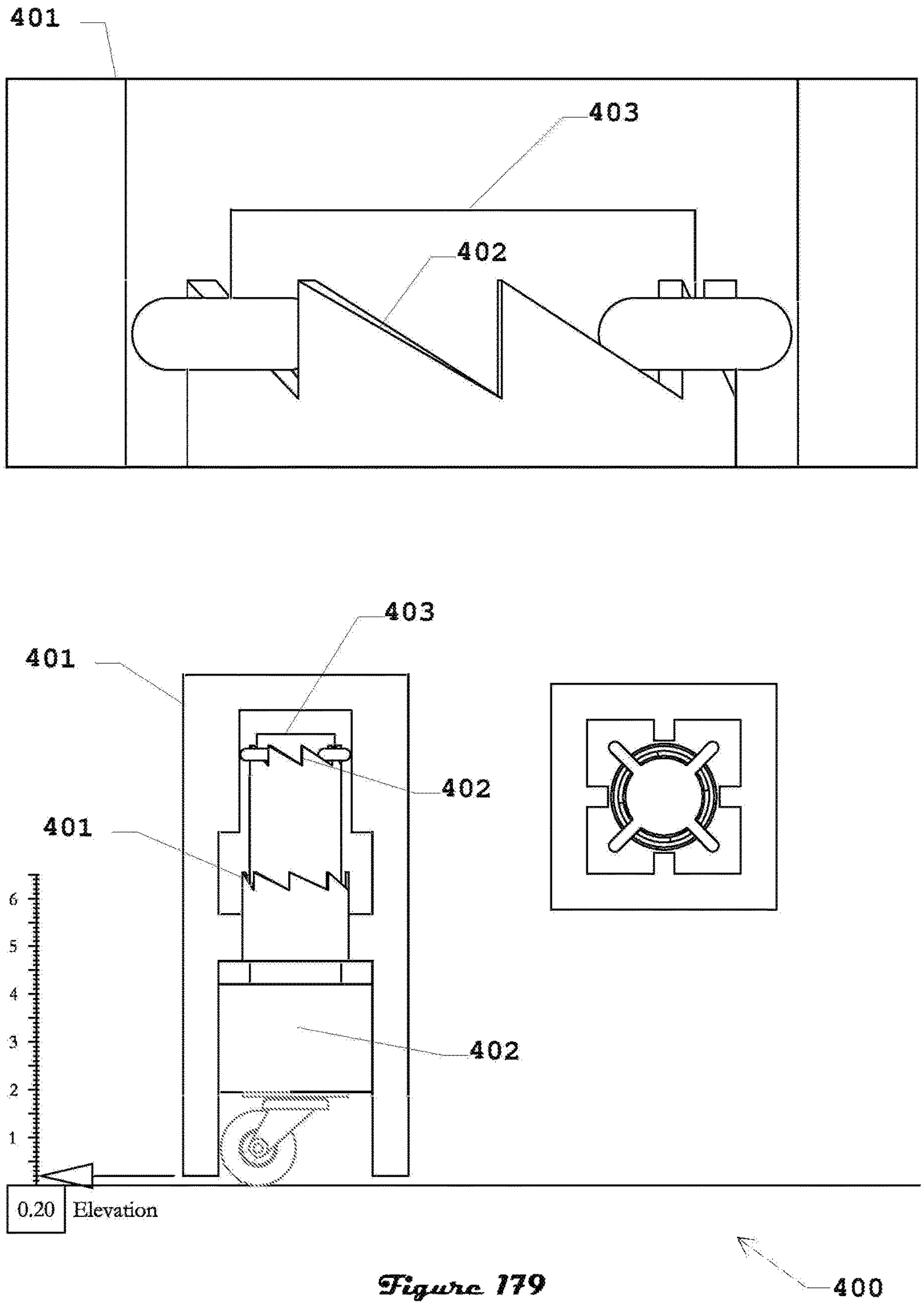
Figure 180:
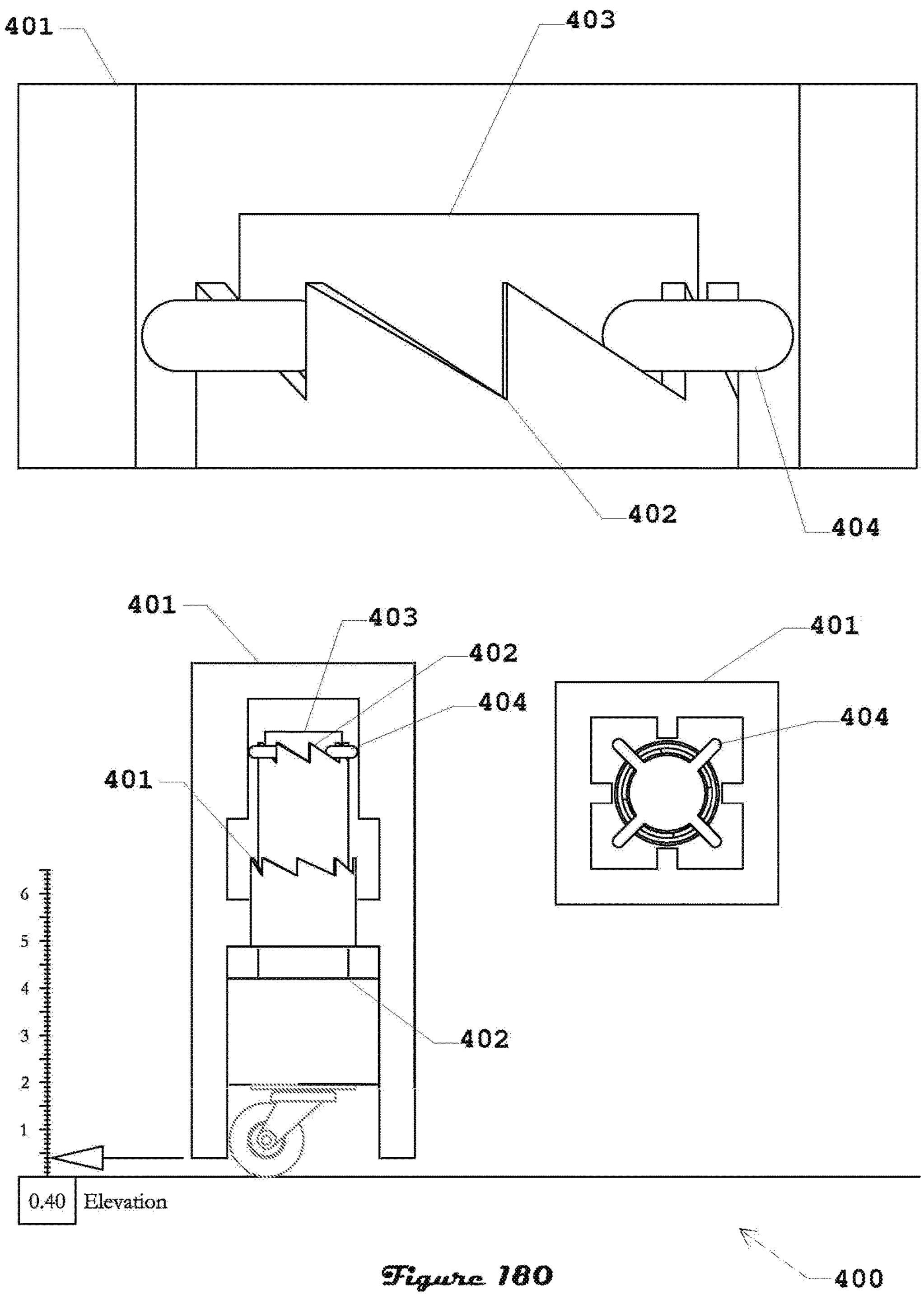
Figure 181:
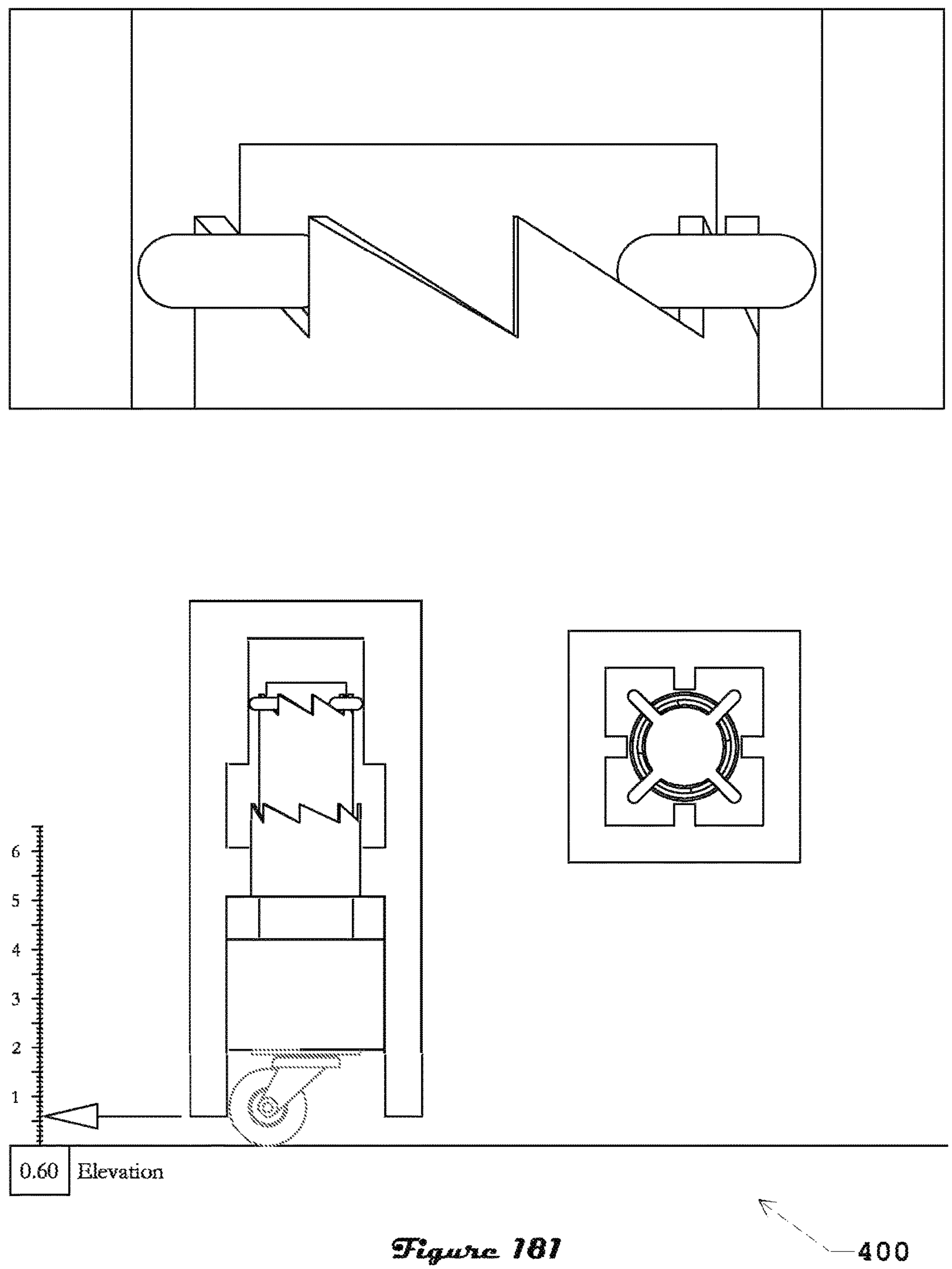
Figure 182:
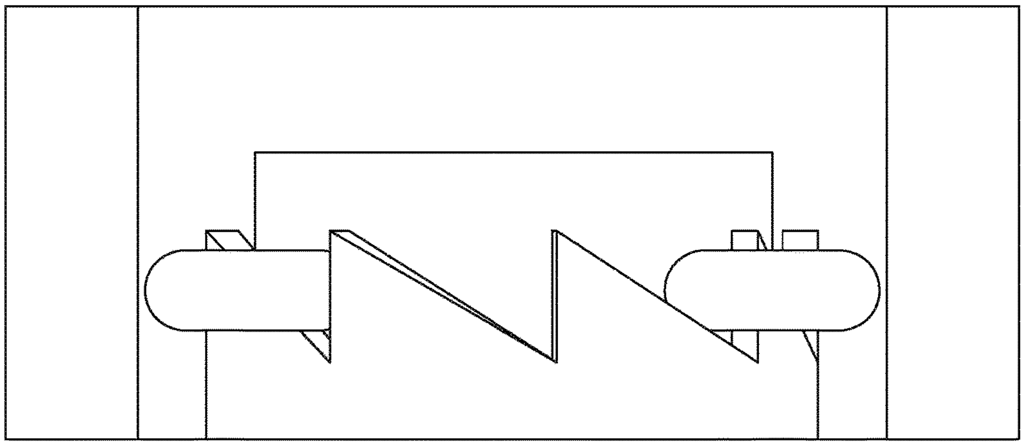
Figure 182:
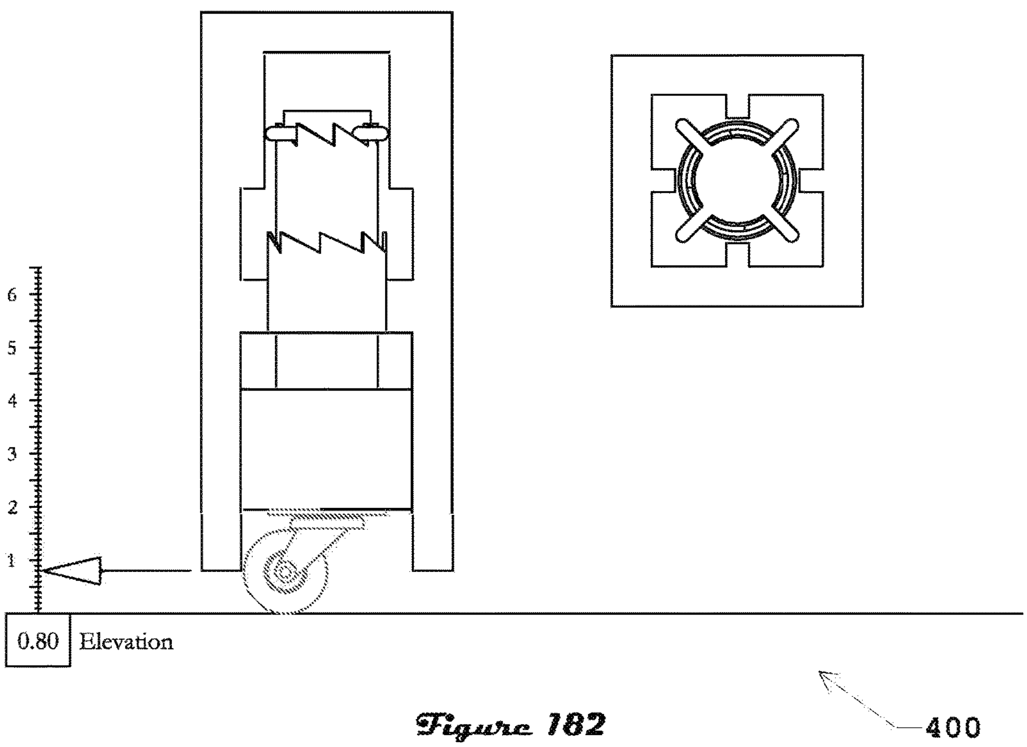
Figure 183:
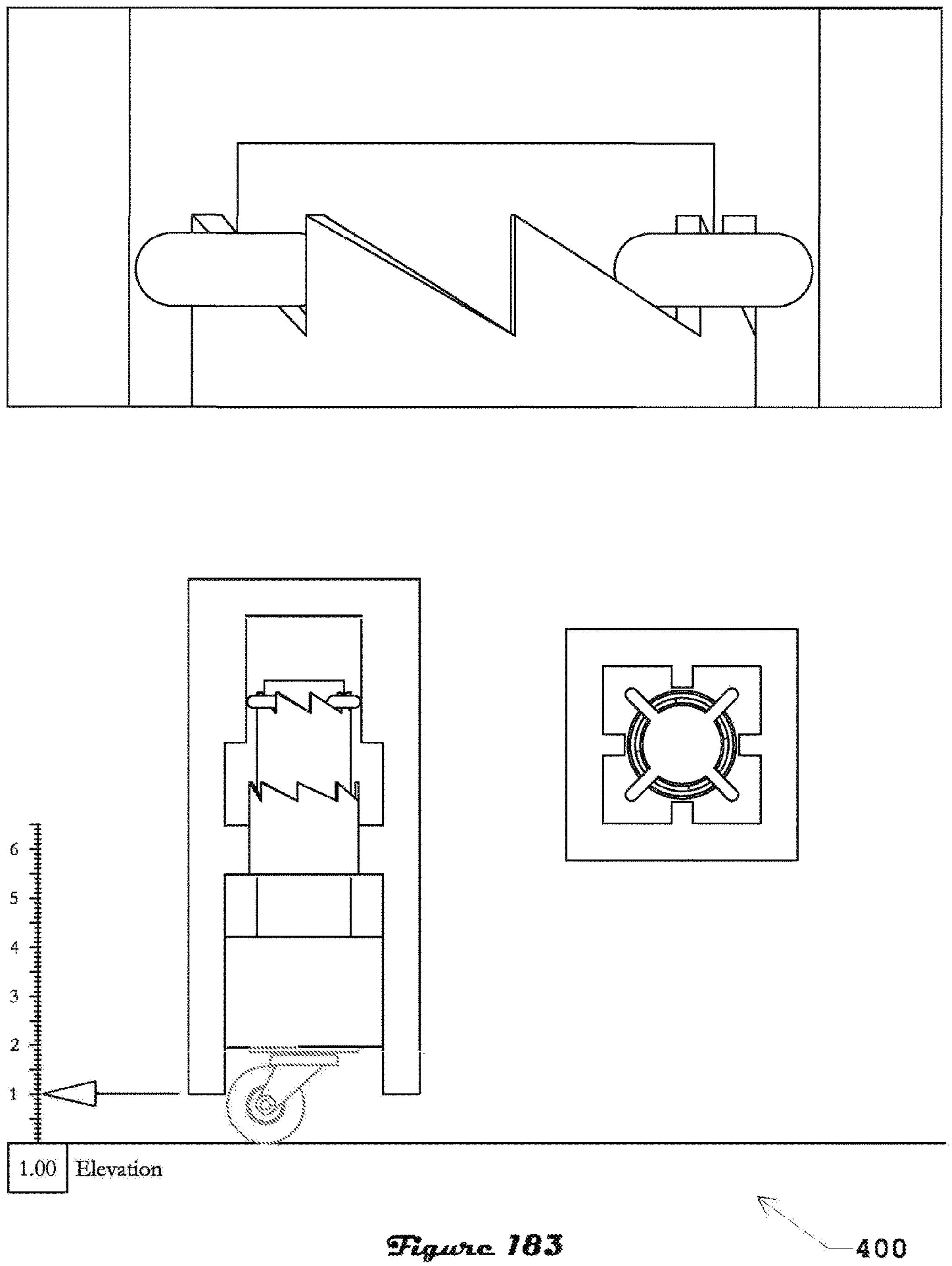
Figure 184:
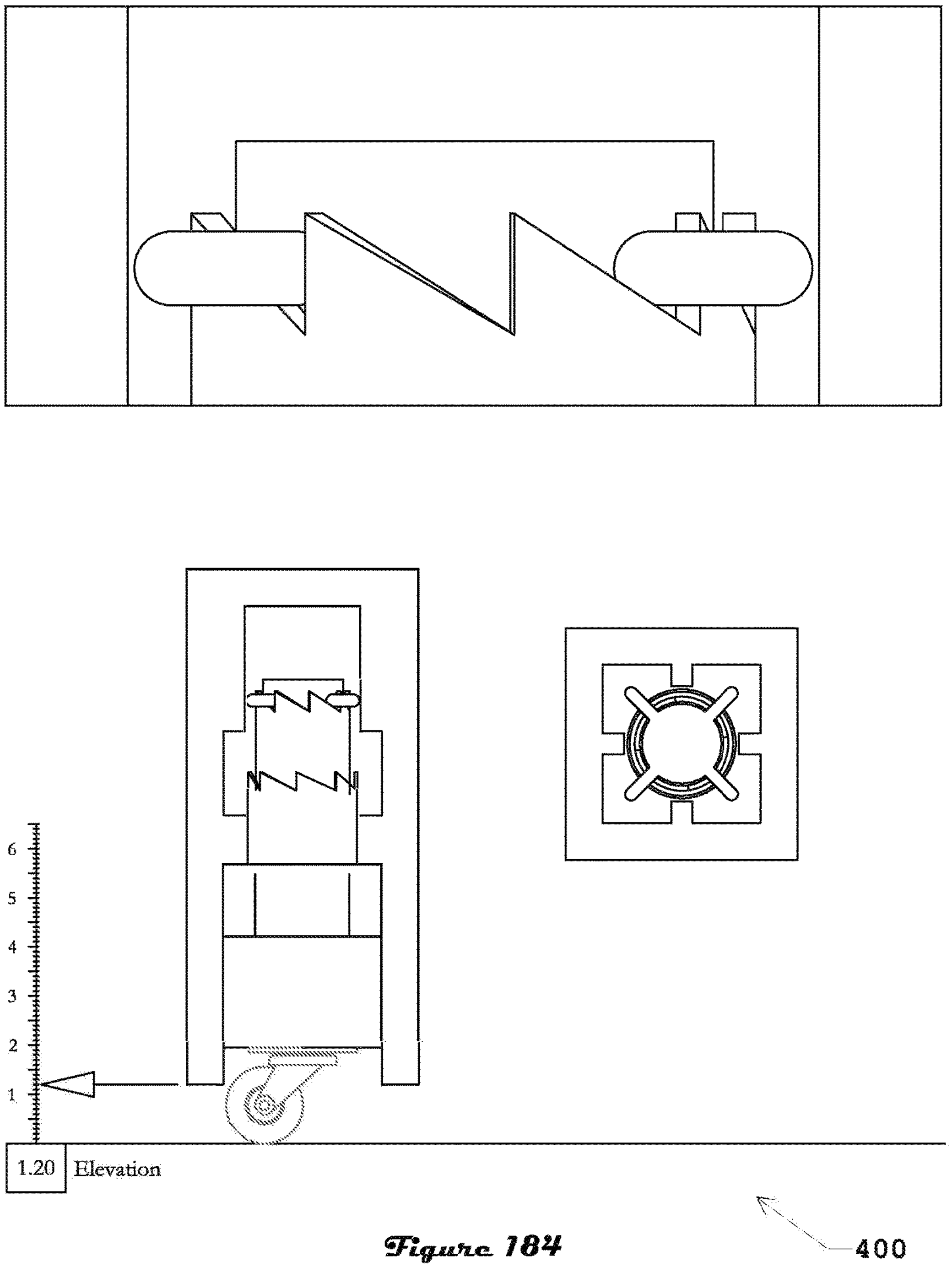
Figure 185:
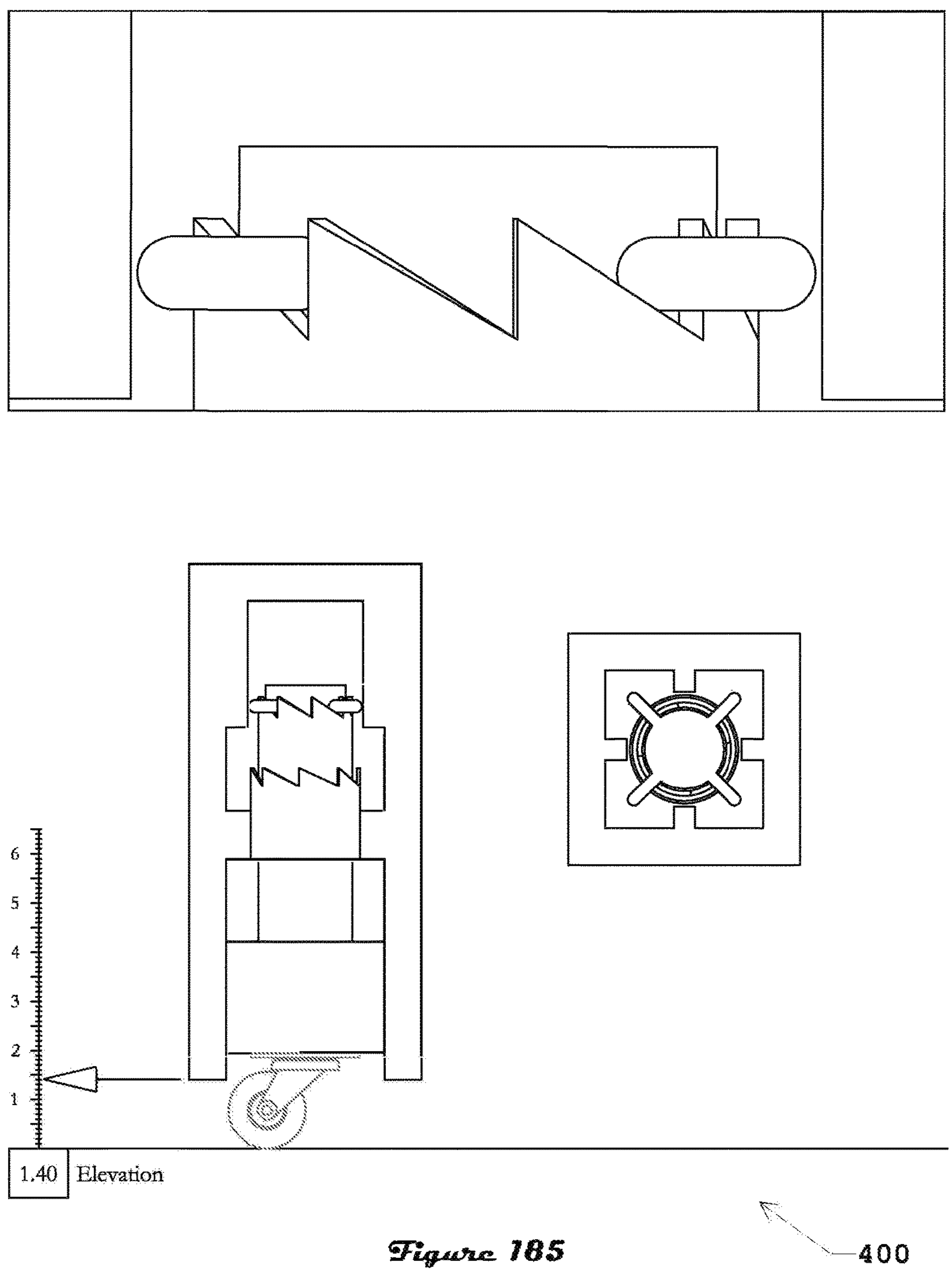
Figure 186:
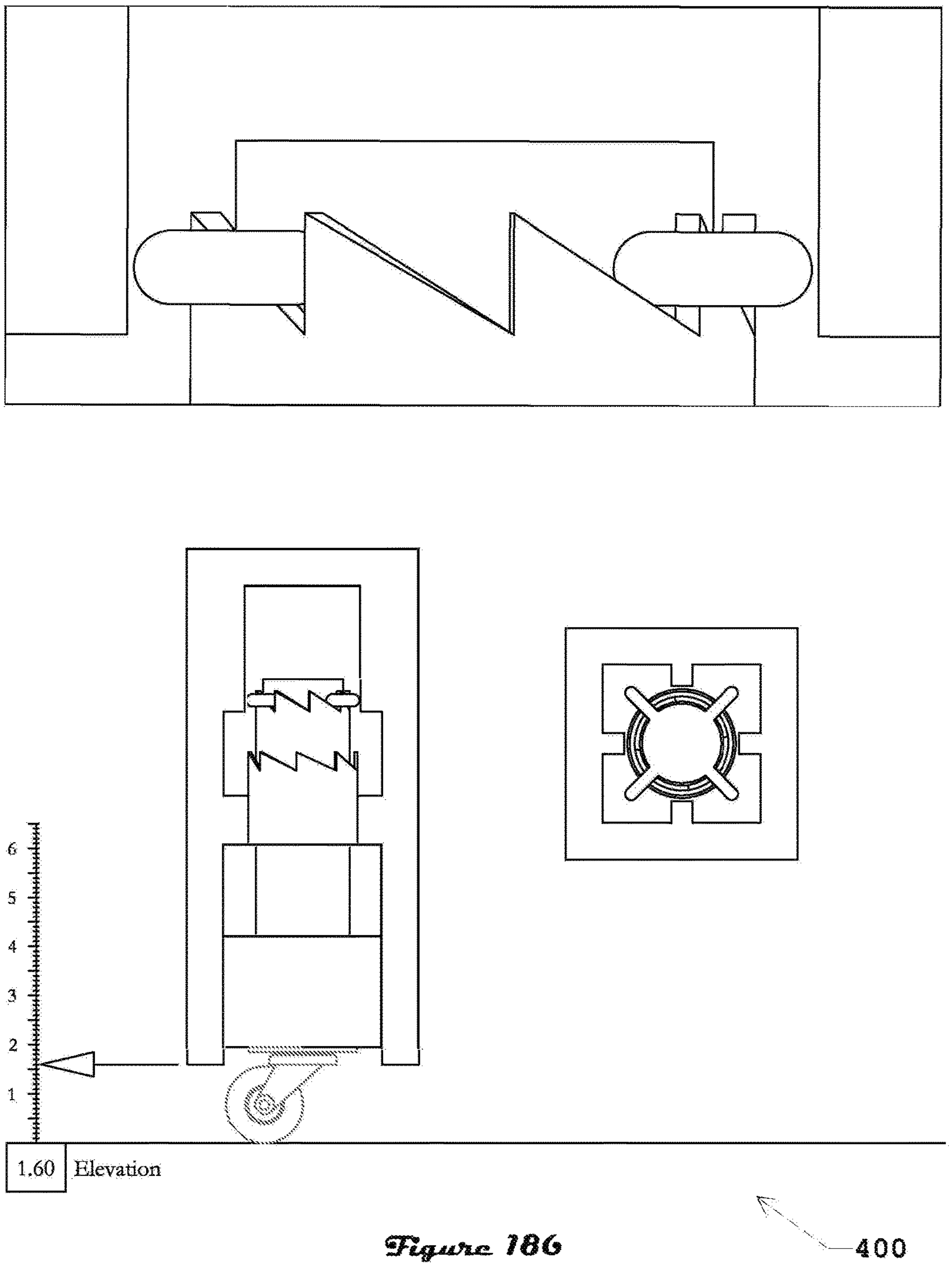
Figure 187:
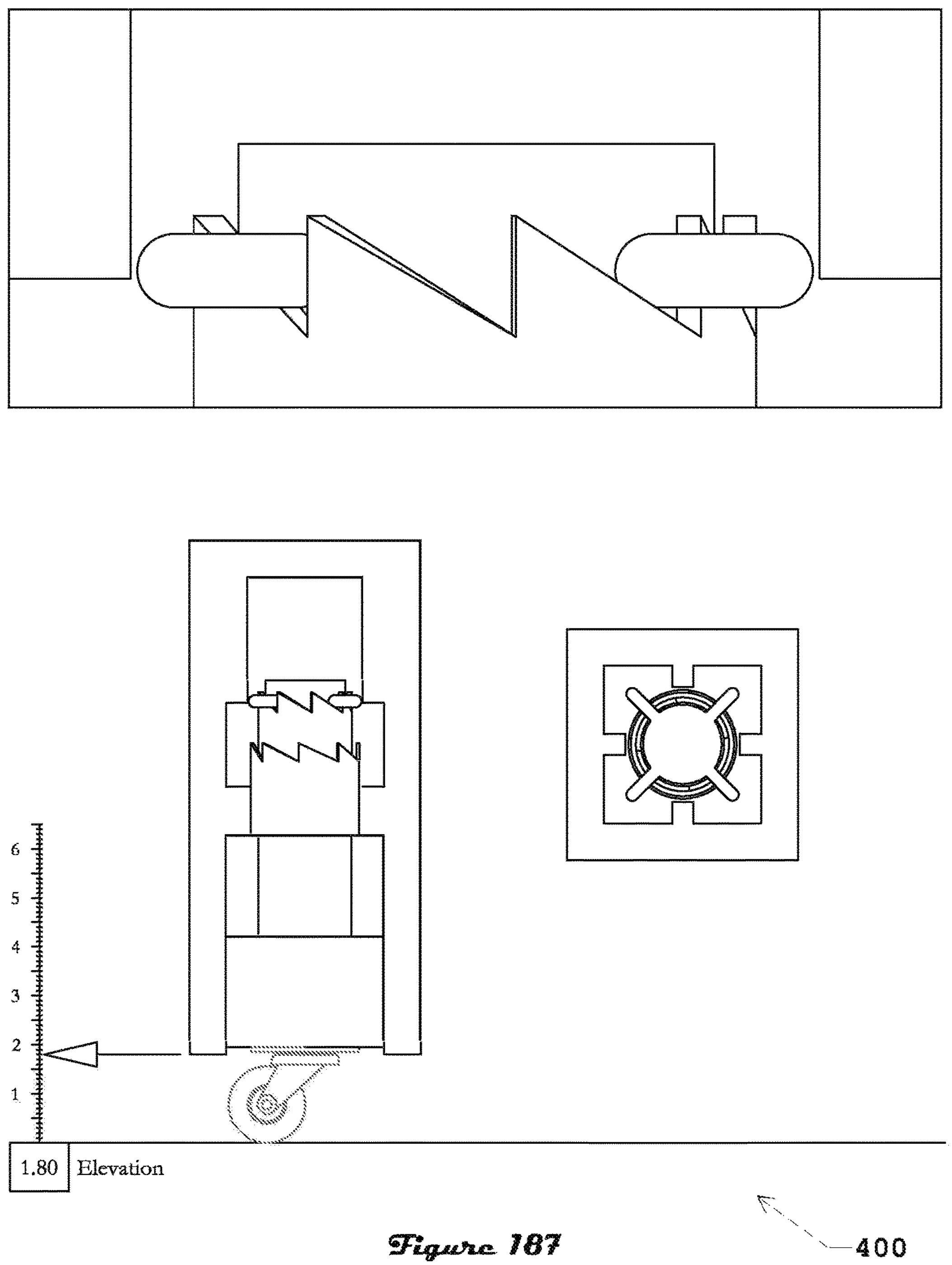
Figure 188:
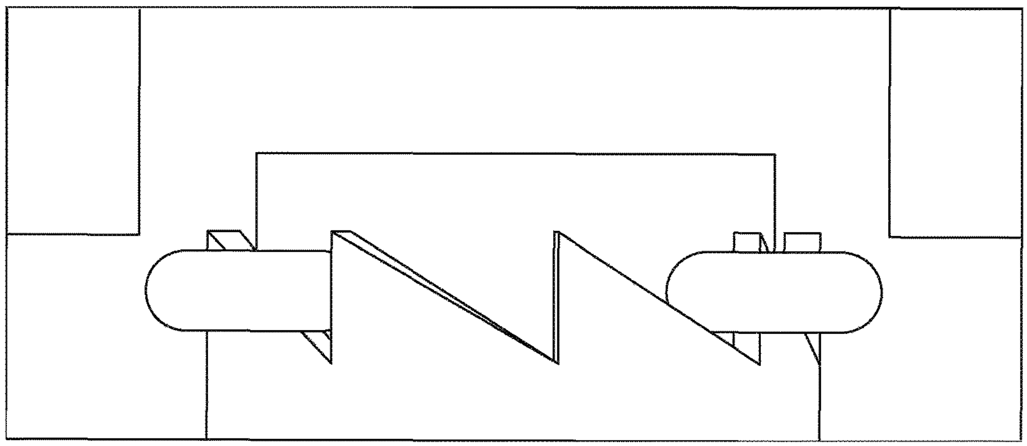
Figure 188:
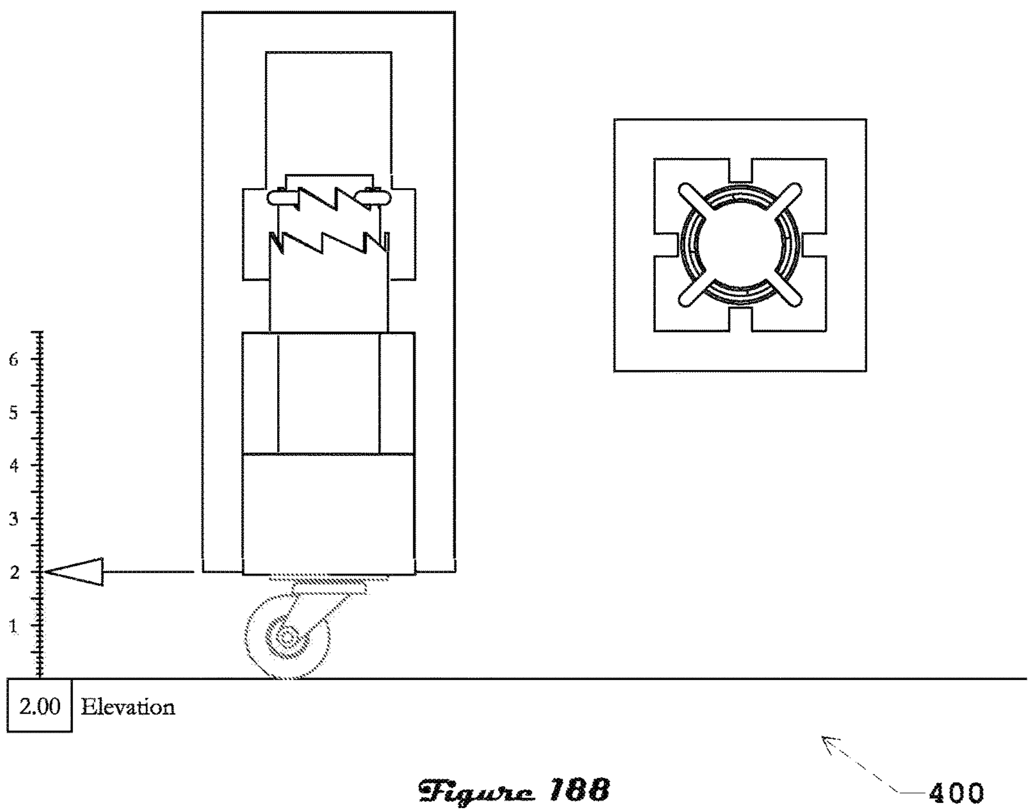
Figure 189:
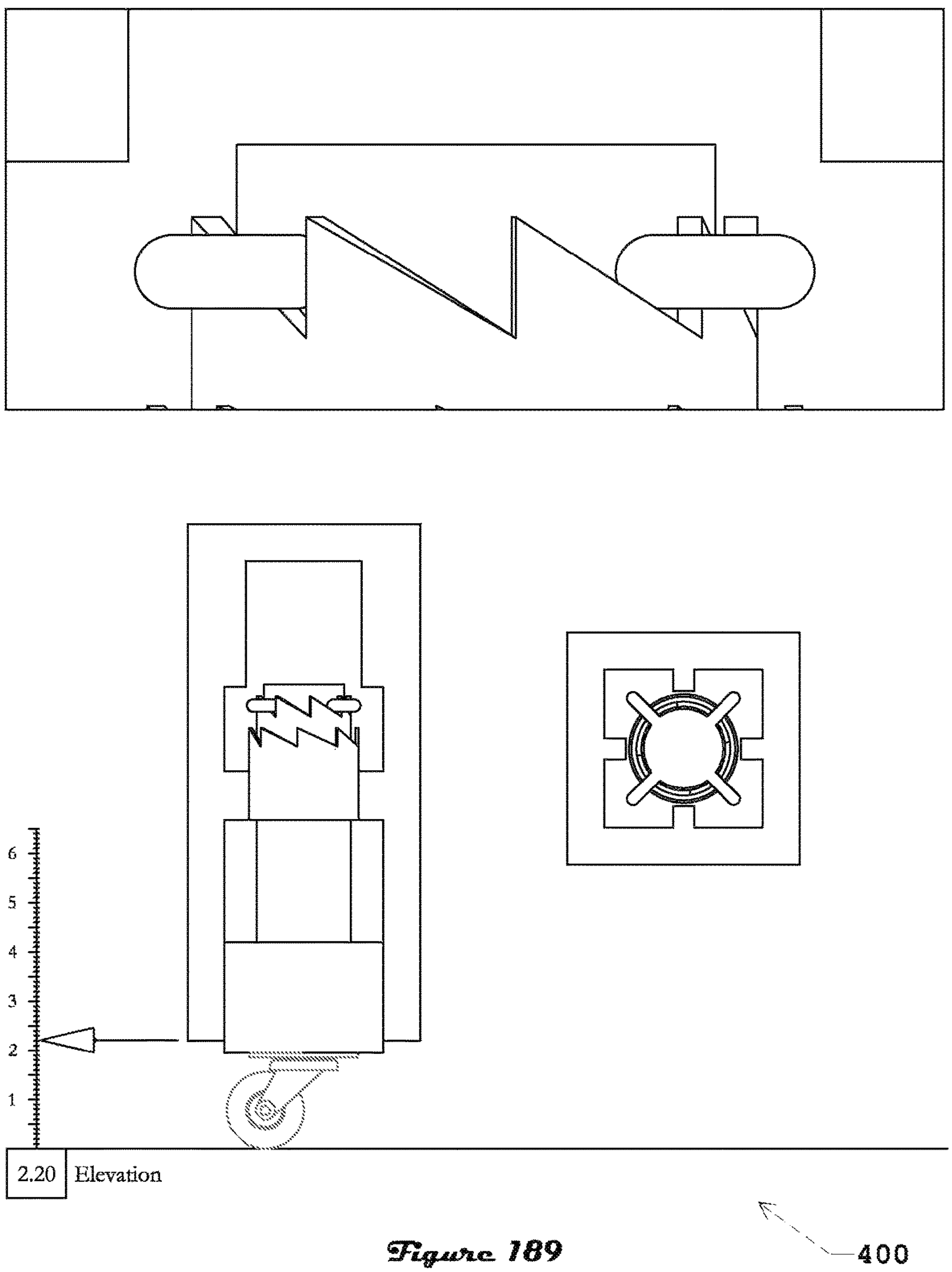
Figure 190:
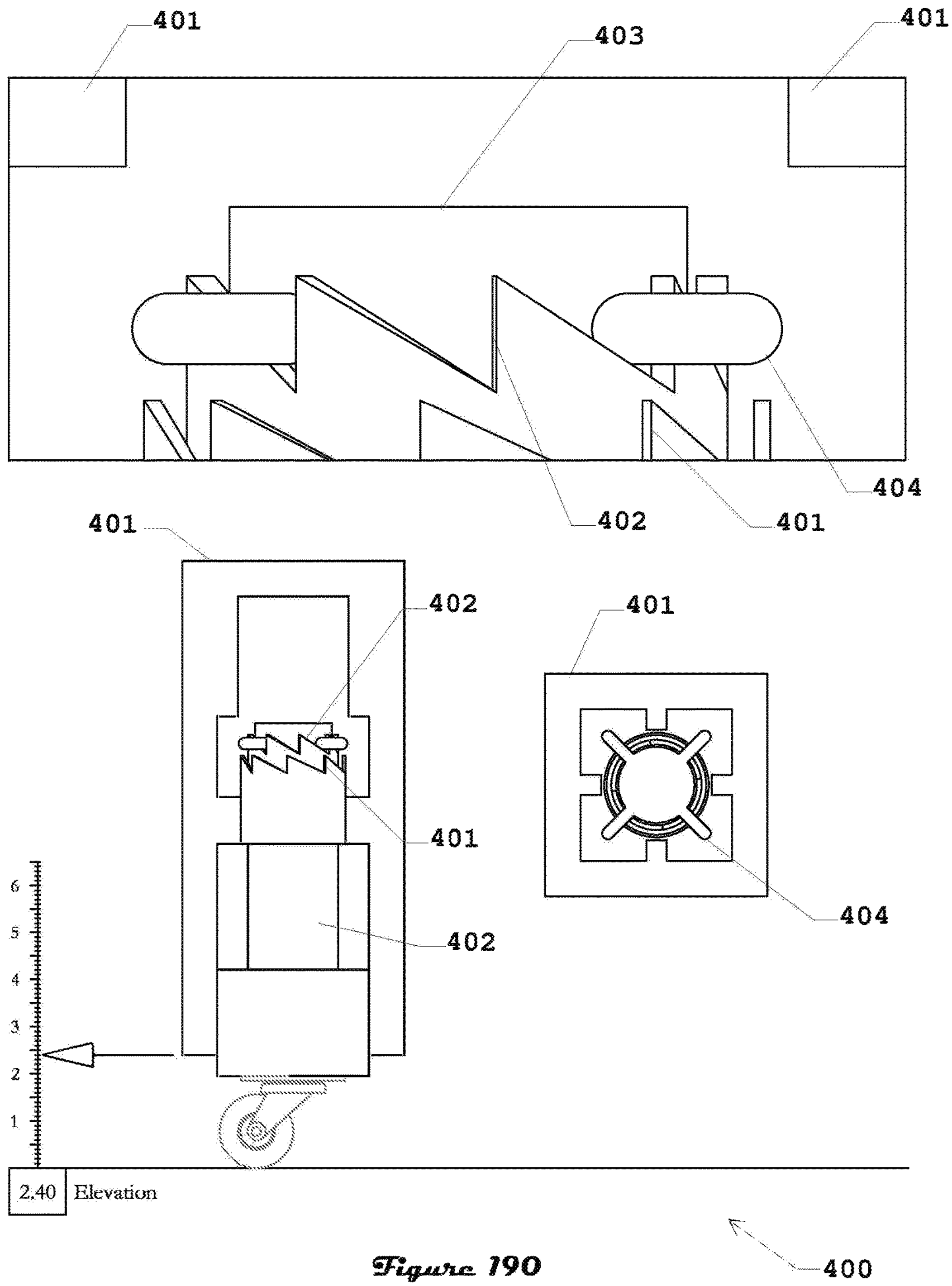
Figure 191:
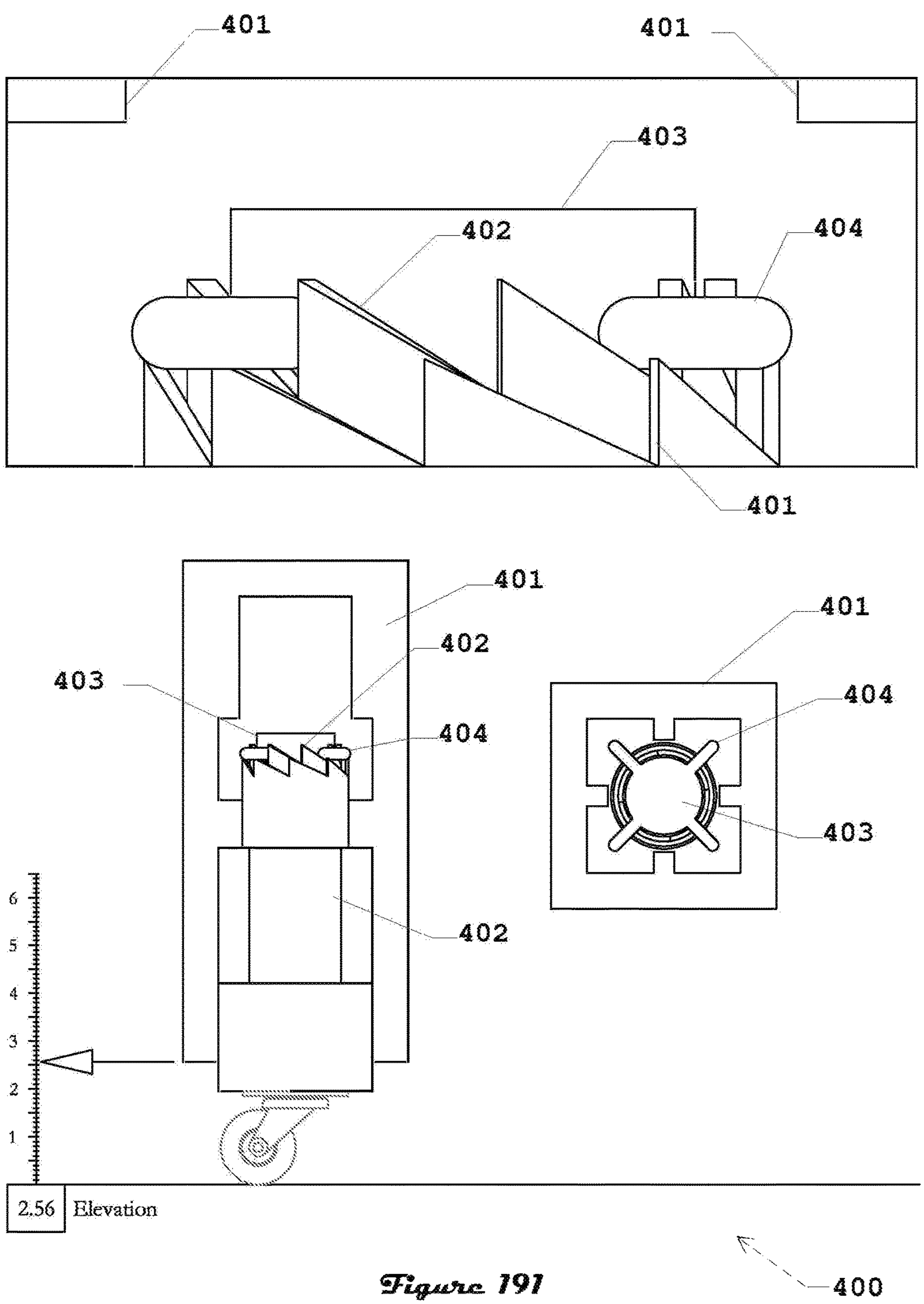

Within this set, FIG. 167 illustrates a side elevation view of exploded components of the Third Embodiment 300. FIG. 168 illustrates a top orthogonal wire frame view of the exploded components of the Third Embodiment 300. FIG. 169 illustrates a section perspective view of the Third Embodiment 300 with the components assembled and in State One of the state machine.

FIGS. 170 to 177 illustrate elevation views of the Third Embodiment 300, assembled, in which a first body, Housing 301, translates vertically relative to a second body, Platform 302. The Housing 301 and Platform 302 form a composite coordinate function which interacts with a Switch 303; vertical translation of the Housing 301 changes the composite coordination function via Cut-Out 305 (which is part of Housing 301), a Kicker 306 (which is part of Housing 301), and a Headboard 307 (which is part of Housing 301). Changes in the composite coordinate function interact with the Switch 303 at Switch-Finger 304 and trigger the events which change the states available to the state machine. The energy states of the Switch 303 (discussed in the table below) come from rotation of the Switch 303 about the lower interior corner; lines 309 and 310 on Switch 303 (see FIG. 170) illustrate the angle of the Switch 303 relative to a point of no return which occurs approximately when line 310 is just over vertical (see FIGS. 173 and 174). As described further below, these figures show the states and the triggering events of this embodiment of the kinematic state machine.

The composite coordinate function contacts the Switch 303 and imparts a force at a force vector on the Switch 303 in the ambient gravitational field or acceleration force. The shape of the Switch 303, its density distribution (which is generally uniform in this example), and the space allowed between the Housing 301 and the Platform 302 determine that the Switch 303 may occupy two energy wells, separated by an energy barrier. The energy barrier occurs when the Switch 303 is tipped up on one corner, with line 310 oriented vertically. See, for example, FIGS. 173 and 174. A first energy well occurs when the Switch 303 rests flat on its base upon the Platform 302, which, due to the space allowed between the Housing 301 and the Platform 302, occurs only when the Housing 301 is supported by the Switch 303, which is supported by the Platform 302, which is supported by the Accessory 308. See, for example, FIGS. 171 and 172. A second energy well occurs when the Switch 303 is tipped up on one corner, past the point of no return relative to the energy barrier, and the Cut-out 305 has not yet descended far enough to push the Switch 303 (via the Switch Finger 304) back over the energy barrier. See, for example, FIGS. 173 to 176.

In all of these views, a force is transmitted to the Switch 303 from the Housing 301; the force has a magnitude, generated by the rate of the relative displacement of the Housing 301 and Platform 302, and a force vector orthogonal to the slope of the combined coordination functions of the surfaces of the Housing 301 and Platform 302 where they contact the Switch 303.

FIGS. 170 through 177 illustrate the following states and transitions:

TABLE FIVE

Figure 223:
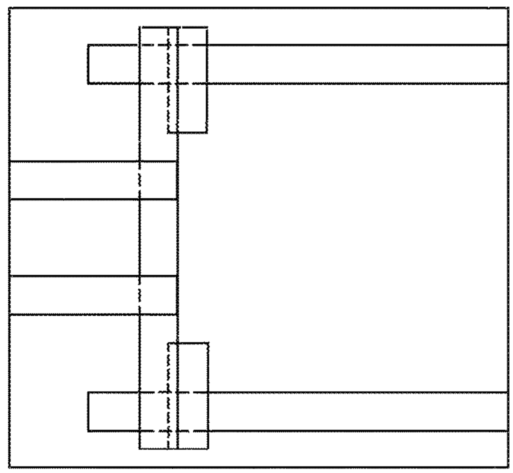
Figure 223:
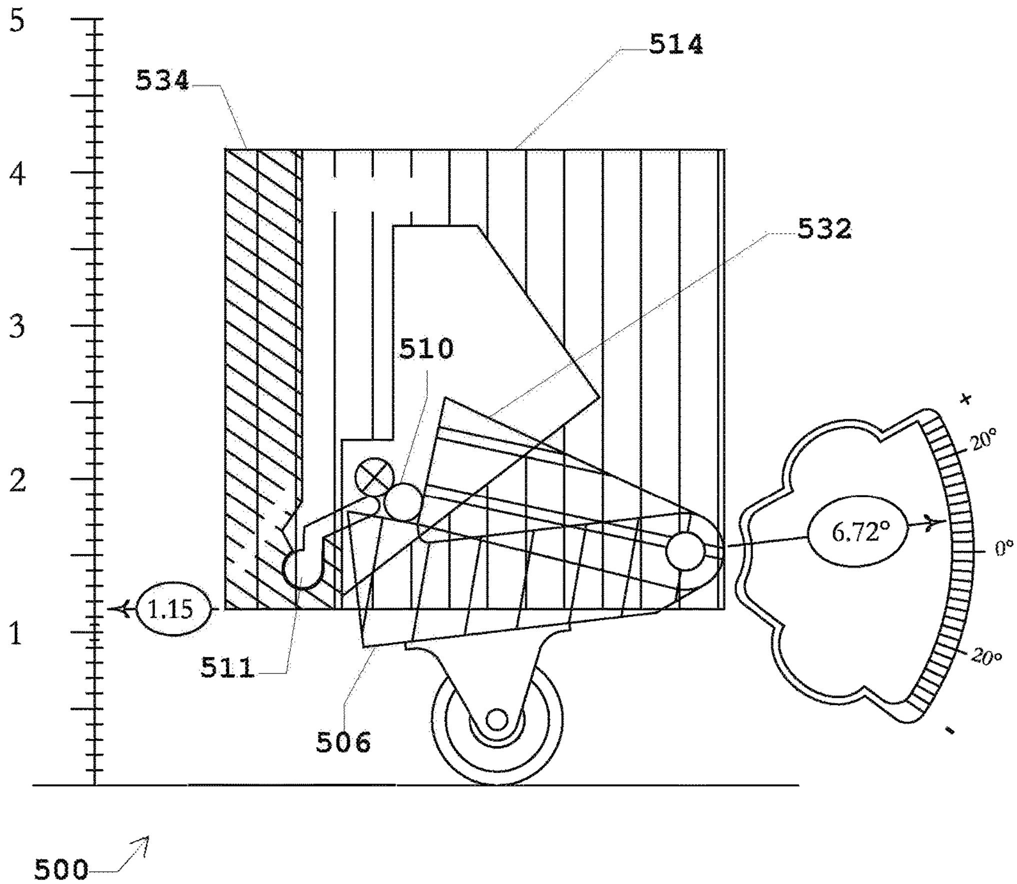
Figure 224:
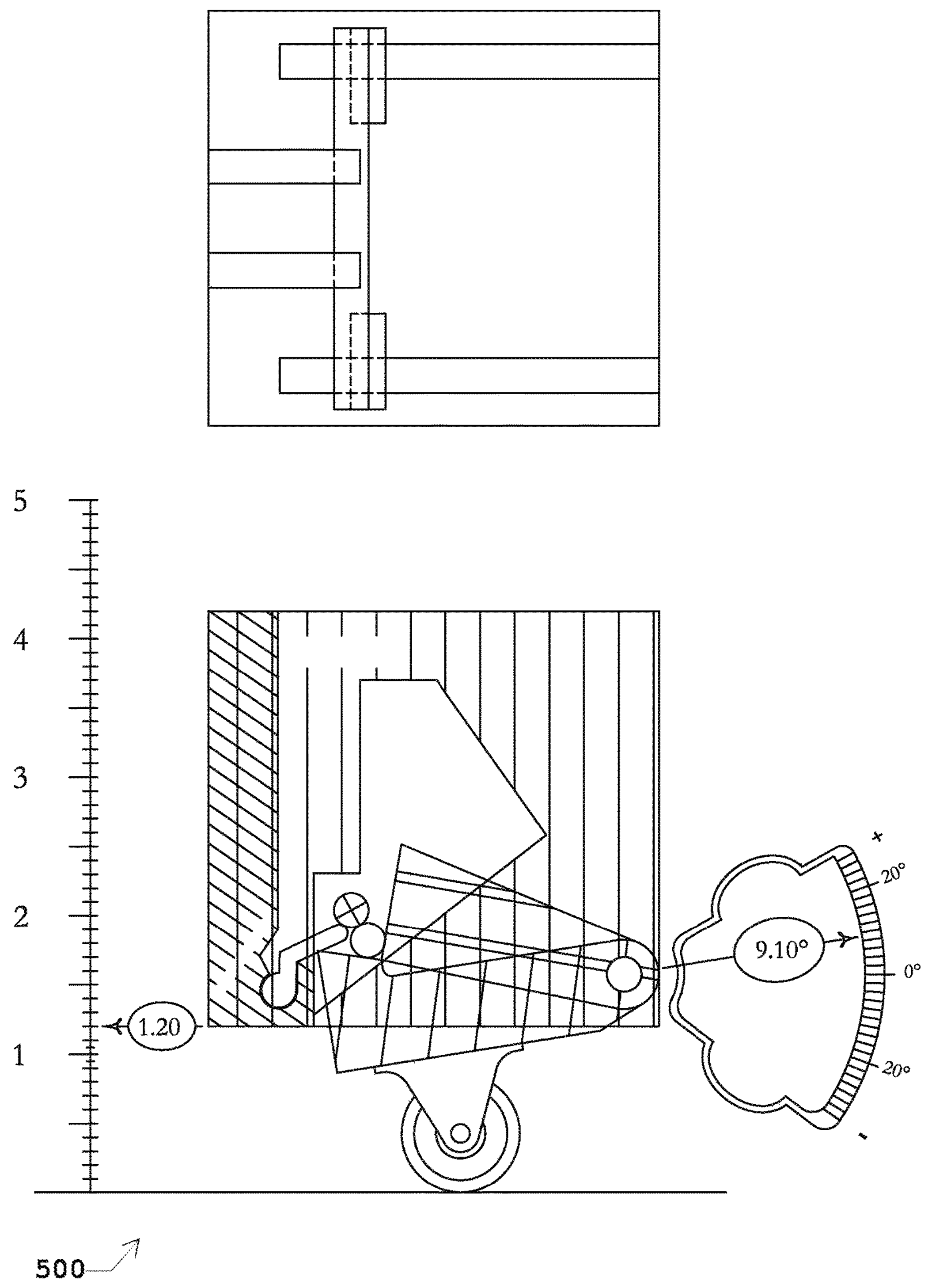
Figure 225:
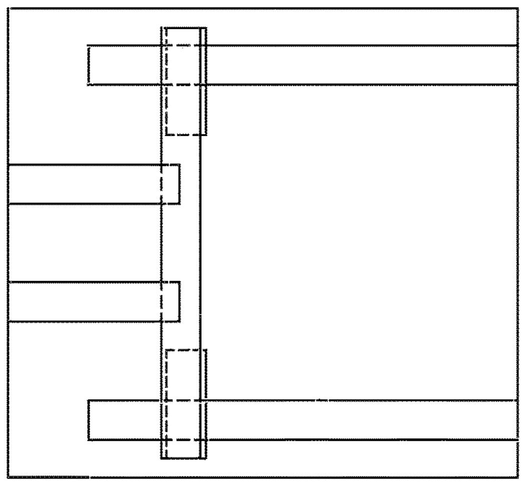
Figure 225:
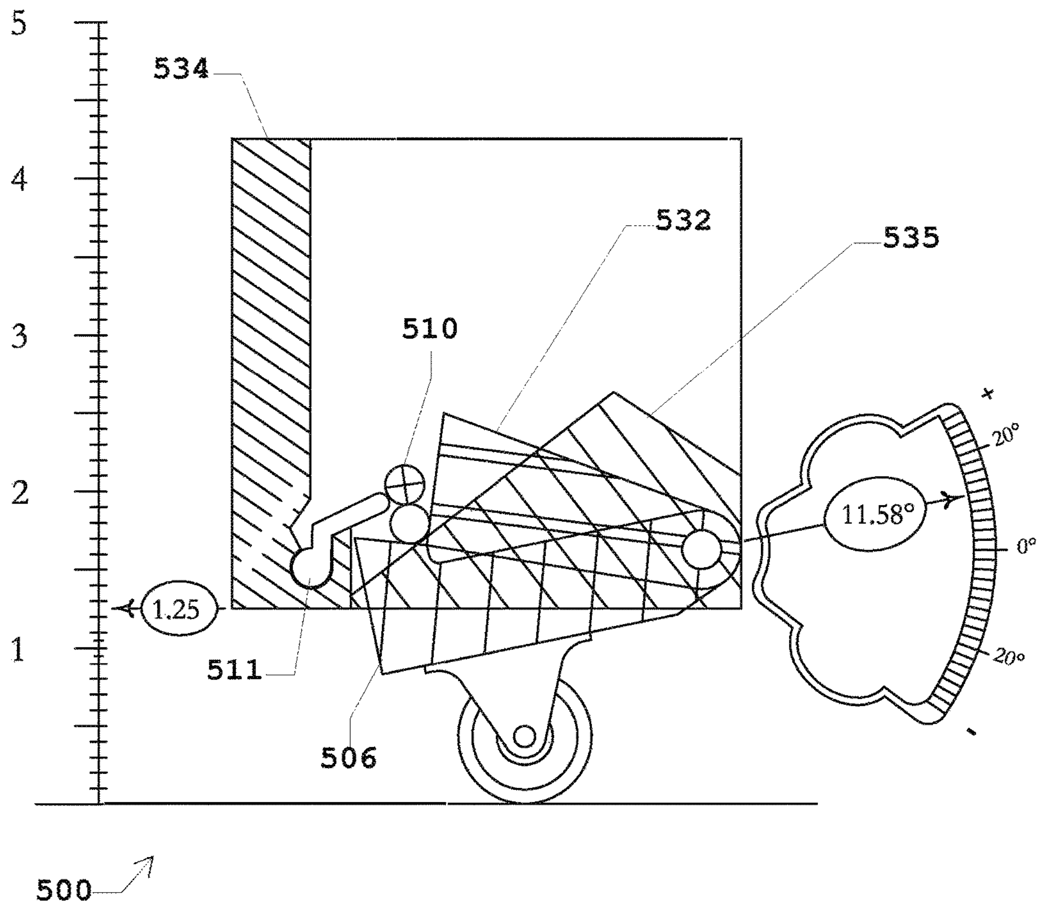
Figure 226:
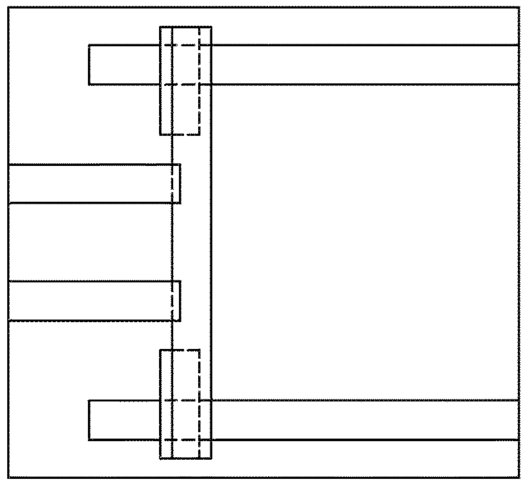
Figure 226:
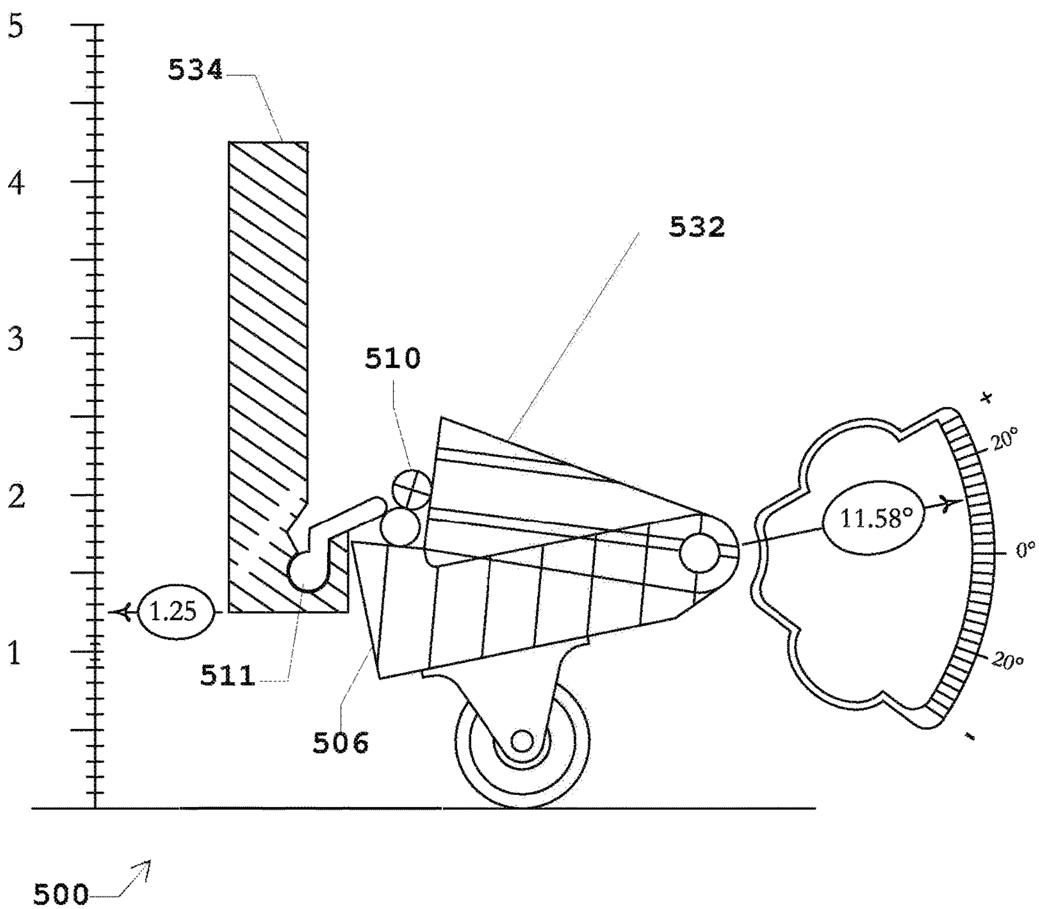
Figure 227:
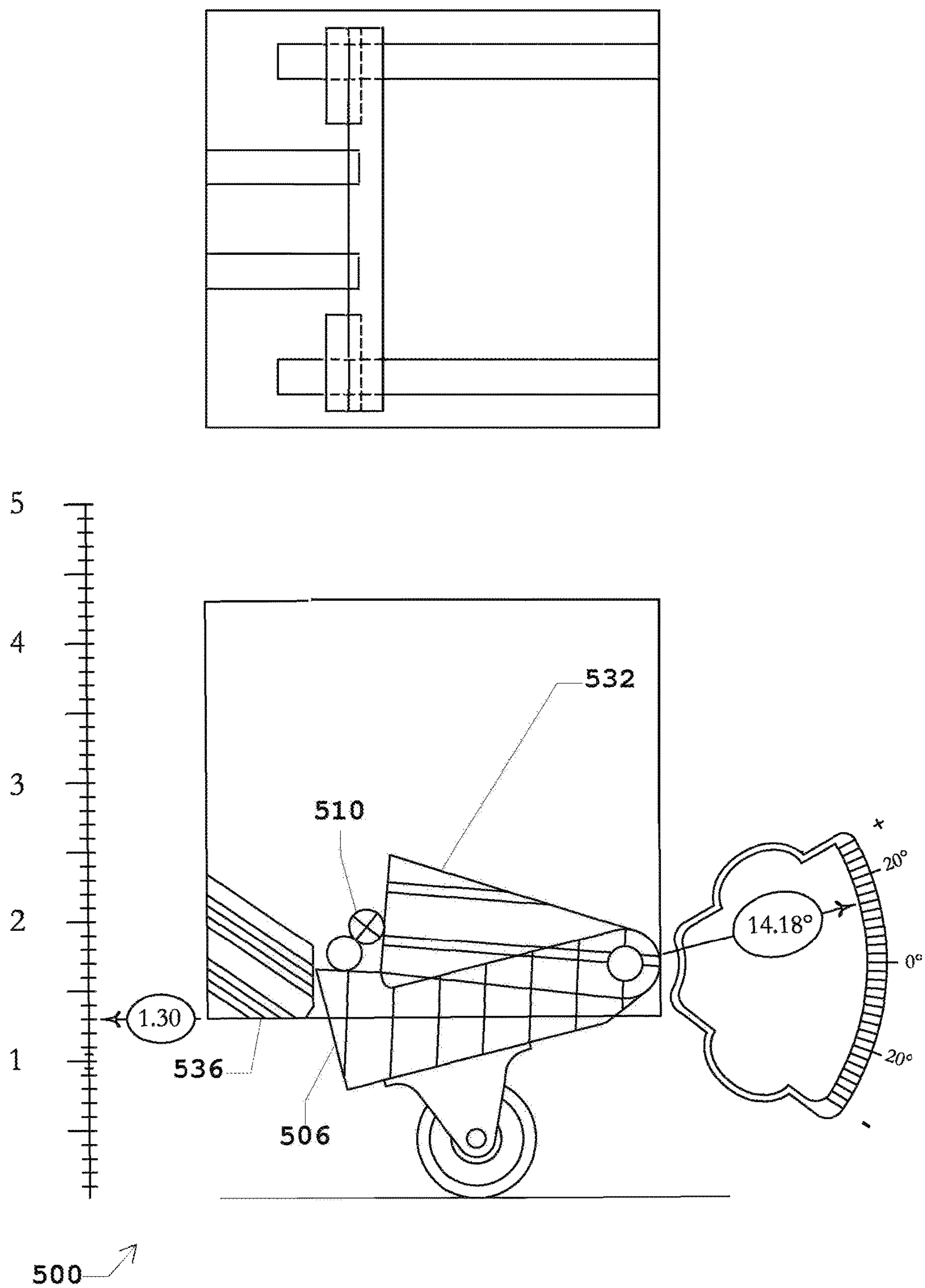
Figure 228:
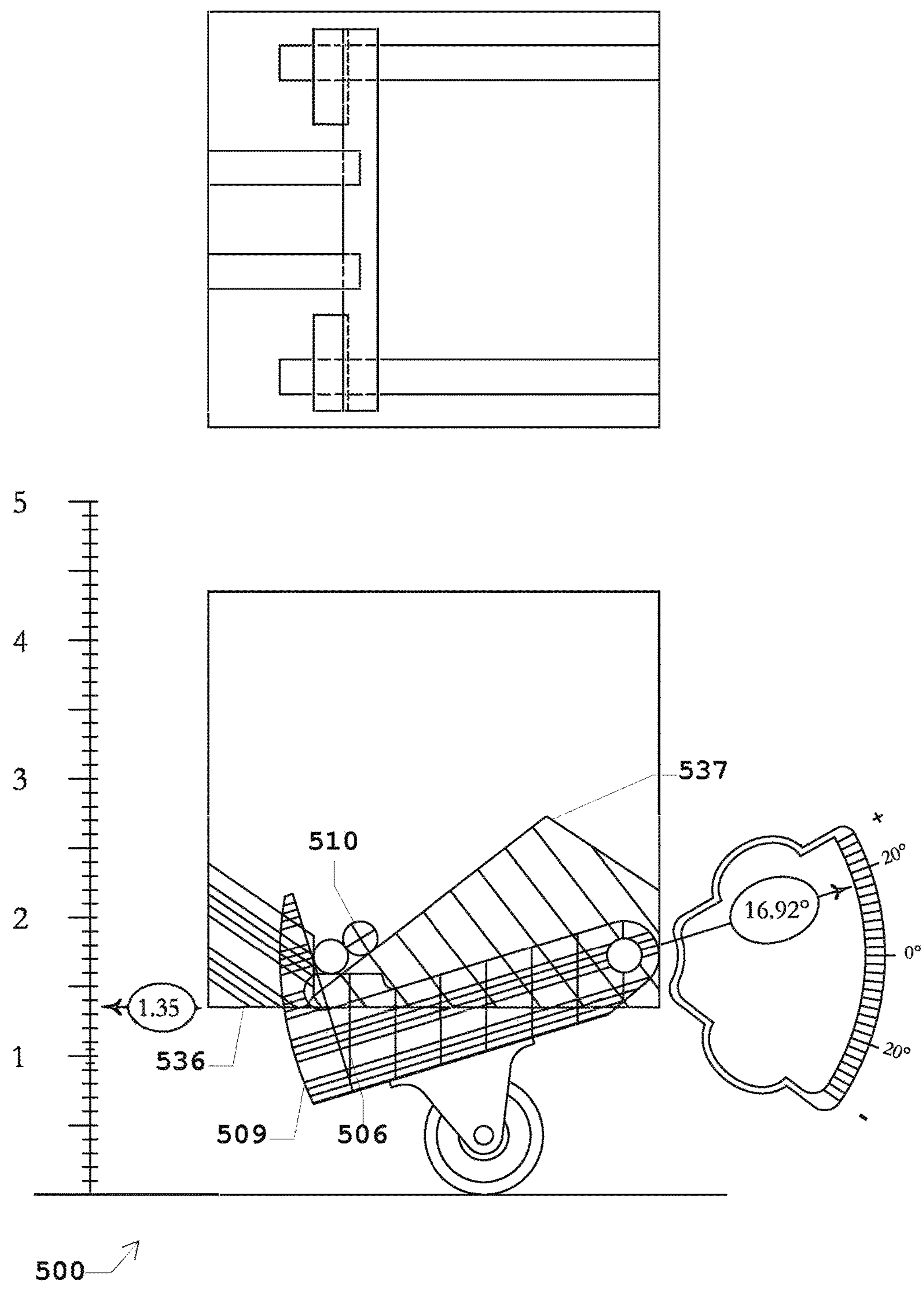
Figure 229:
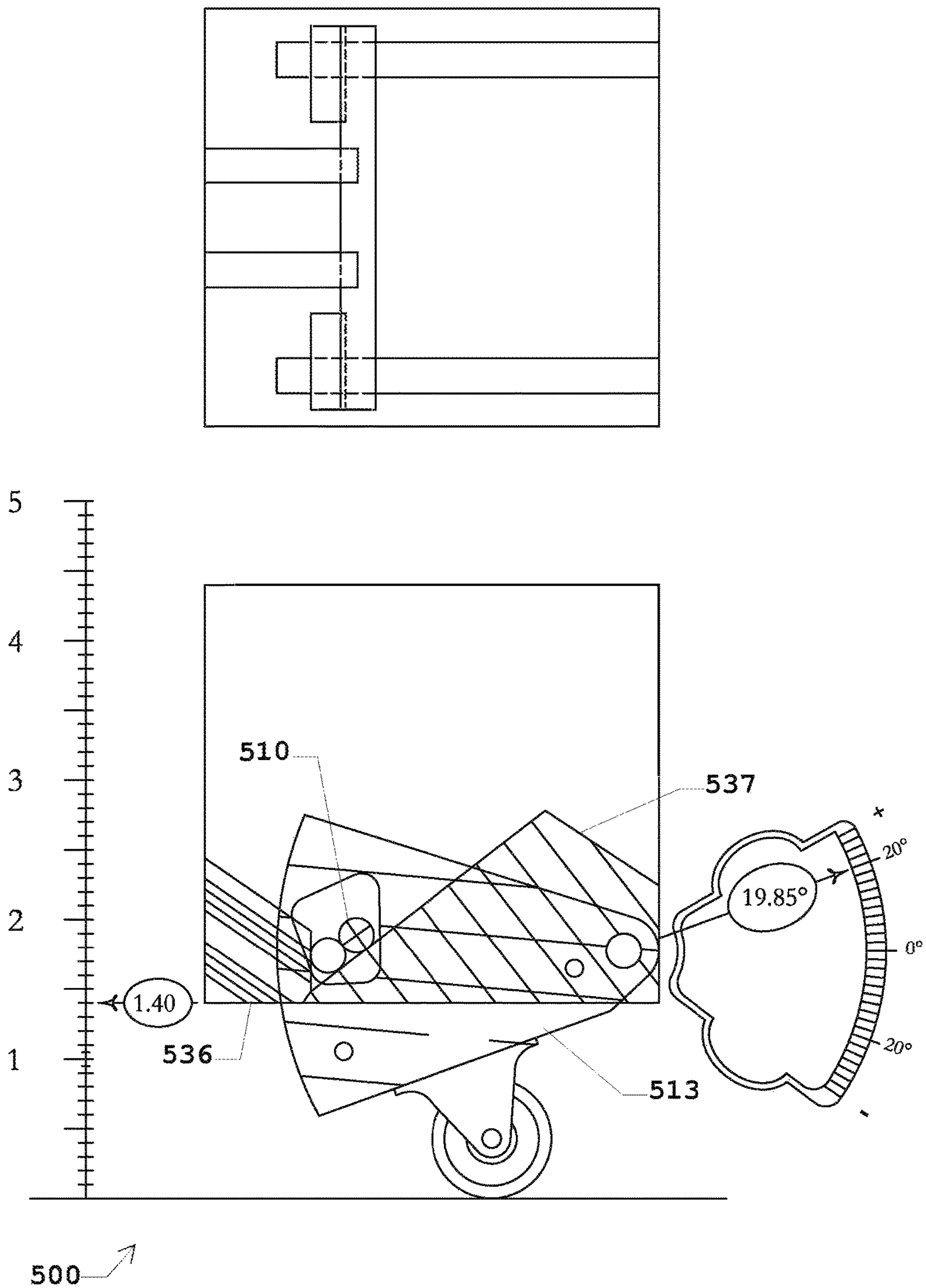
Figure 230:
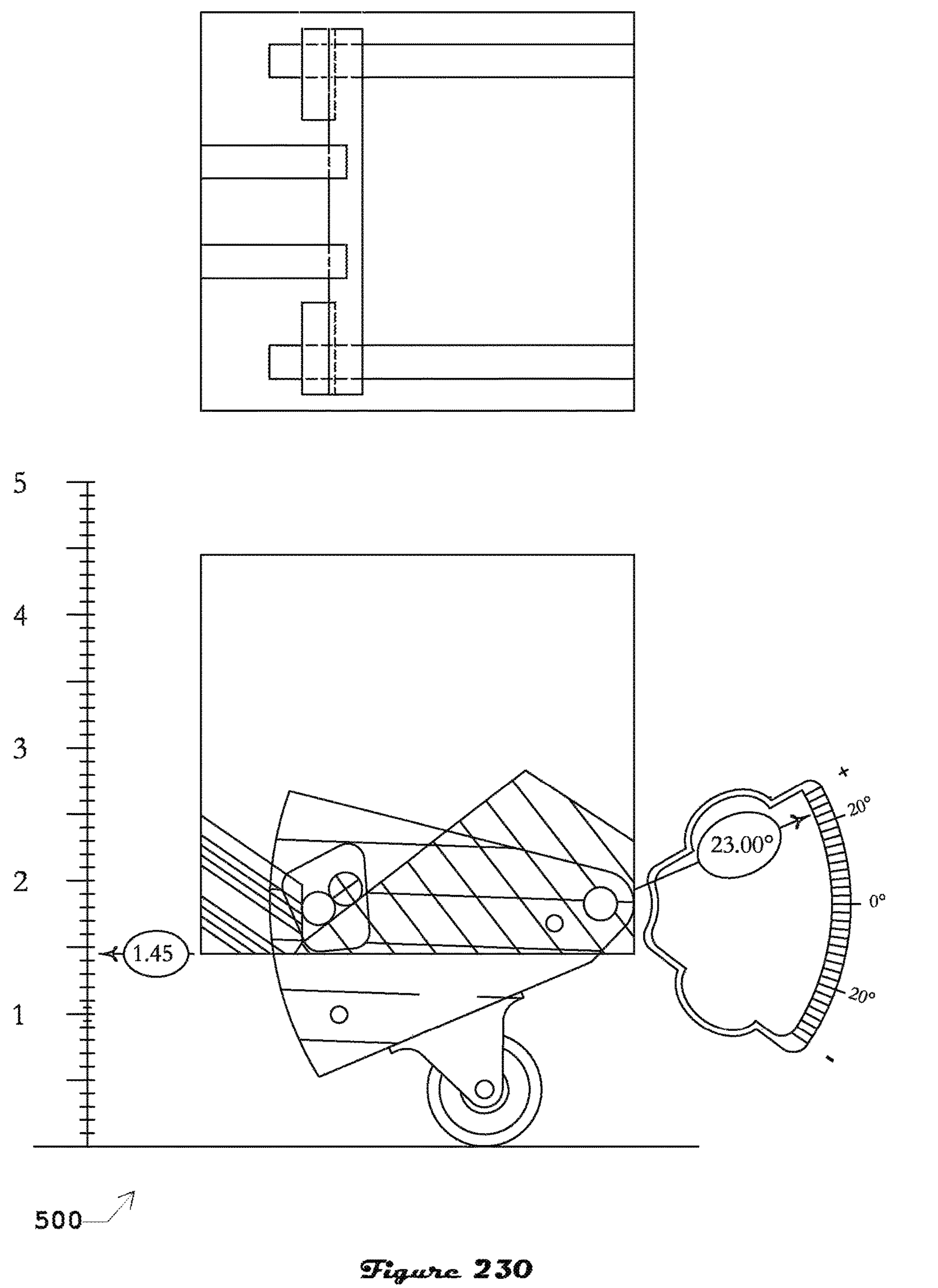
Figure 231:
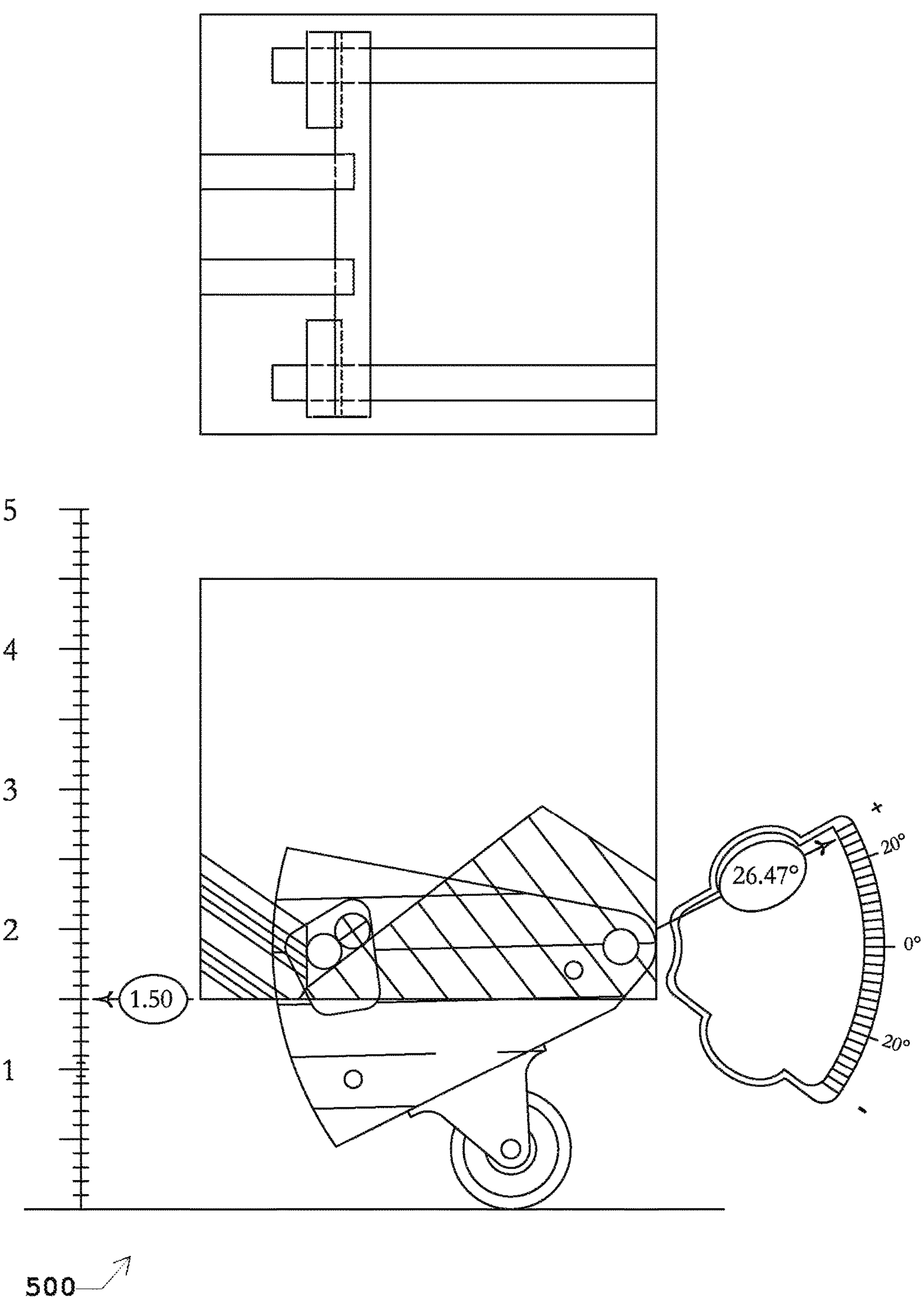

| State<br>State narrative | Event | Next State |
|---|---|---|
| One<br>Housing 301 supported by external surface; Switch 303 in intermediate energy level, between first energy well and energy barrier (FIGS. 223 and 230) | a. Raise Housing 301 below elevation where Switch 303 falls from beneath Headboard 307 to the first energy well, then release | One |
| | b. Raise Housing 301 above elevation where Switch 303 falls from beneath Headboard 307 to the first energy well, then release | Two |
| | c. Raise Housing 301 to elevation where Kicker 306 pushes Switch 303 past energy barrier, lower to where Cut-Out 305 pushes Switch 303 up to energy barrier | Three |
| | d. Raise Housing 301 to limit | Four |
| Two<br>Switch 303 falls to bottom of first energy well, Housing 301 supported by Switch 303, Switch 303 supported by Platform 302 (FIG. 224) | e. Raise Housing 301 to elevation less than in FIG. 226, then lower to elevation in FIG. 224 | Two |
| | c. Raise Housing 301 to elevation where Kicker 306 pushes Switch 303 past energy barrier, lower to where Cut-Out 305 pushes Switch 303 up to energy barrier | Three |
| | d. Raise Housing 301 to limit | Four |
| Three<br>Switch 303 in second energy well (FIGS. 226 to 229); Housing 301 supported by external force; Switch 303 supported by Housing 301 and/or Platform 302; Platform 302 supported by external surface | d. Raise Housing 301 to limit | Four |
| | f. Lower Housing 301 to contact external surface (FIGS. 223 and 230) | One |
| Four<br>Switch 303 in second energy well (FIGS. 226 to 229); Housing 301 supported by external force; Switch supported by Housing 301; Platform 302 supported by Switch; FIG. 226, no surface beneath Accessory | f. Lower Housing 301 to contact external surface (FIGS. 223 and 230) | One |

States Three and Four in the foregoing require an external force to support the Housing 301 (such as a human, a fork lift, a crane, or similar). When the external force is removed following the event, then States Three and Four return to State One. If events which do not pass a point-of-no-return are removed, then the table of states and events is reduced to the following:

TABLE SIX

| State | Event | Next State |
|---|---|---|
| One | b. | Two |
| One | c. | One |
| One | d. | One |
| Two | c. | One |
| Two | d. | One |

In the foregoing, when the machine is in State One, one event, Event b, can transition the machine to State Two. In the foregoing, when the machine is in State Two, two events, Event c and d, can transition the machine to State One. Events b, c, and d are points of no return.

FIGS. 178 to 217 illustrate elevation and top plan views of a Fourth Embodiment 400. The top portion of FIGS. 178 to 217 illustrates a close elevation view; the bottom-left portion of FIGS. 178 to 217 illustrates an elevation view; the bottom-right portion of FIGS. 178 to 217 illustrates a top plan view. In the top plan view portion of these drawings, four switch seats are illustrated as part of the Housing 401; only two switch seats are illustrated in the elevation views. As with the other Embodiments, Housing 401 and Platform 402 are illustrated as single components. In an embodiment, these components may be formed from multiple plates, as illustrated with respect to the First Embodiment 100. In the Fourth Embodiment 400, the kinematic pairing between the first and second bodies imposes five constraints on the degrees of freedom in relative movement between the bodies. In the Fourth Embodiment 400, the kinematic pairing is prismatic.

In the Fourth Embodiment 400 illustrated in FIGS. 178 to 217, a first body, Housing 401, may translate vertically relative to a second body, Platform 402, which bodies form a composite coordinate function which interacts with a Switch 403; vertical translation of the Housing 401 changes the composite coordinate function, which, via the Switch 403, triggers the events which change the states available to the state machine. As described further below, these figures show the states and the triggering events of this embodiment of the kinematic finite state machine.

In this embodiment, the Switch 403 may rotate about a central axis, when viewed in plan-view (from above). The Platform 402 in FIGS. 178 through 217 may occupy an opening within the Housing 401. The composite coordinate function in contact with the Switch 403 is formed by Housing 401 and the top of the Platform 402, which contact the Switch 403. The composite coordinate function and the Switch 403 geometry define a set of energy wells, separated by energy barriers, discussed further below in relation to the states available to the finite state system. The energy wells in this Fourth Embodiment 400 are essentially identical, though a first set of the energy wells do not position the Switch 403 between the Housing 401 and the Platform 402 while a second set of the energy wells do position the Switch 403 between the Housing 401 and the Platform 402. The energy barriers in this Fourth Embodiment 400 are found at the top of the peaks on top of the Platform 402.

The composite coordinate function is configured to impart energy to the Switch 403 as the Housing 401 is raised, transitioning the Switch 403 from one energy well to the other, over the energy barriers. As the Switch 403 moves between the energy wells, the Switch 403 rotates about its central axis and is alternatively interposed or not interposed between the Housing 401 and the Platform 402 and the finite state machine transitions between states.

In all of these views, a force is transmitted to the Switch 403 from the Housing 401; the force has a magnitude, generated by the rate of the relative displacement of the Housing 401 and Platform 402, and a force vector orthogonal to the slope of the combined coordination functions of the surfaces of the Housing 401 and Platform 402 where they contact the Switch 403.

FIGS. 178 through 217 illustrate the following states and transitions of the Fourth Embodiment 400:

TABLE SEVEN

Figure 192:
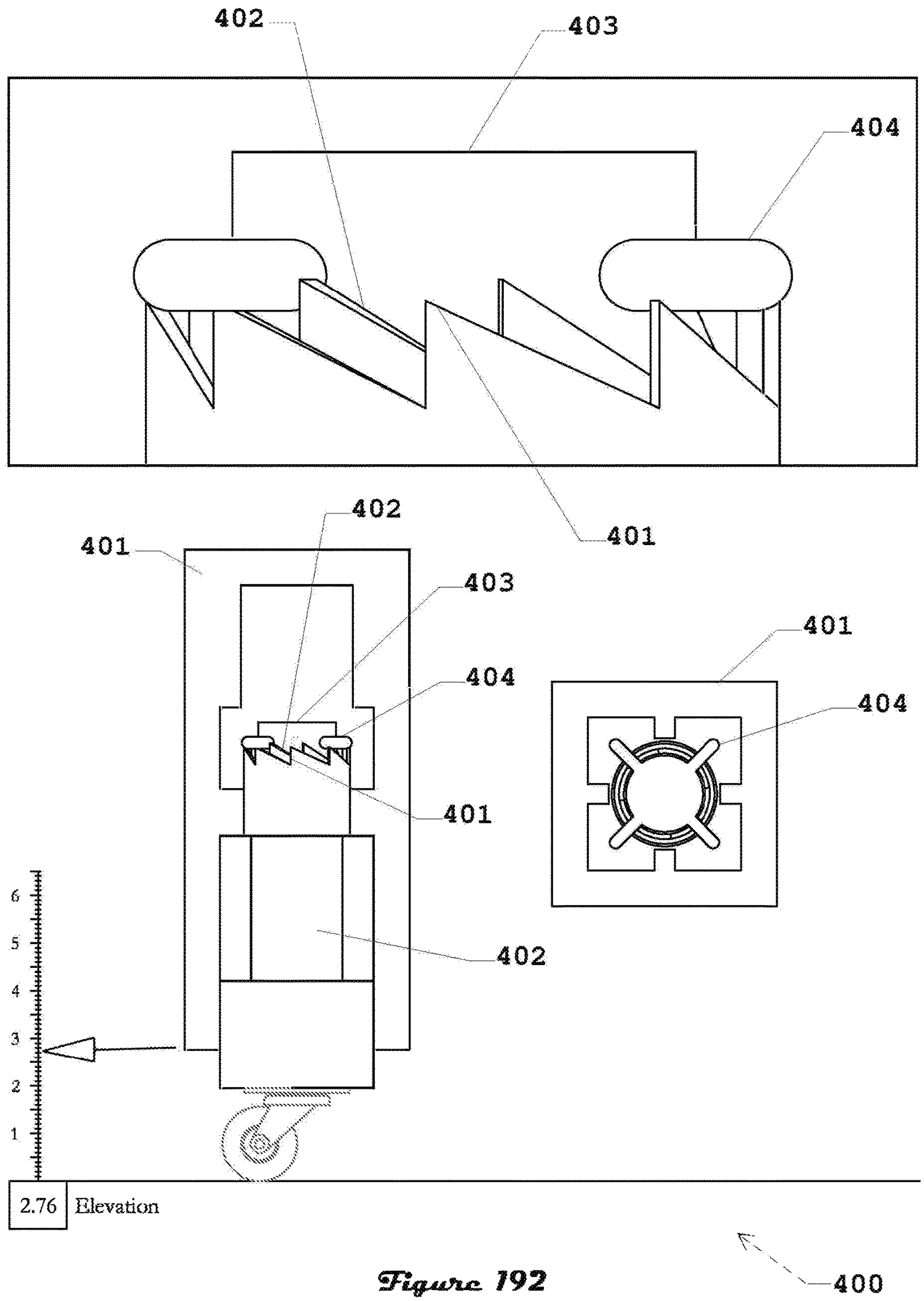
Figure 193:
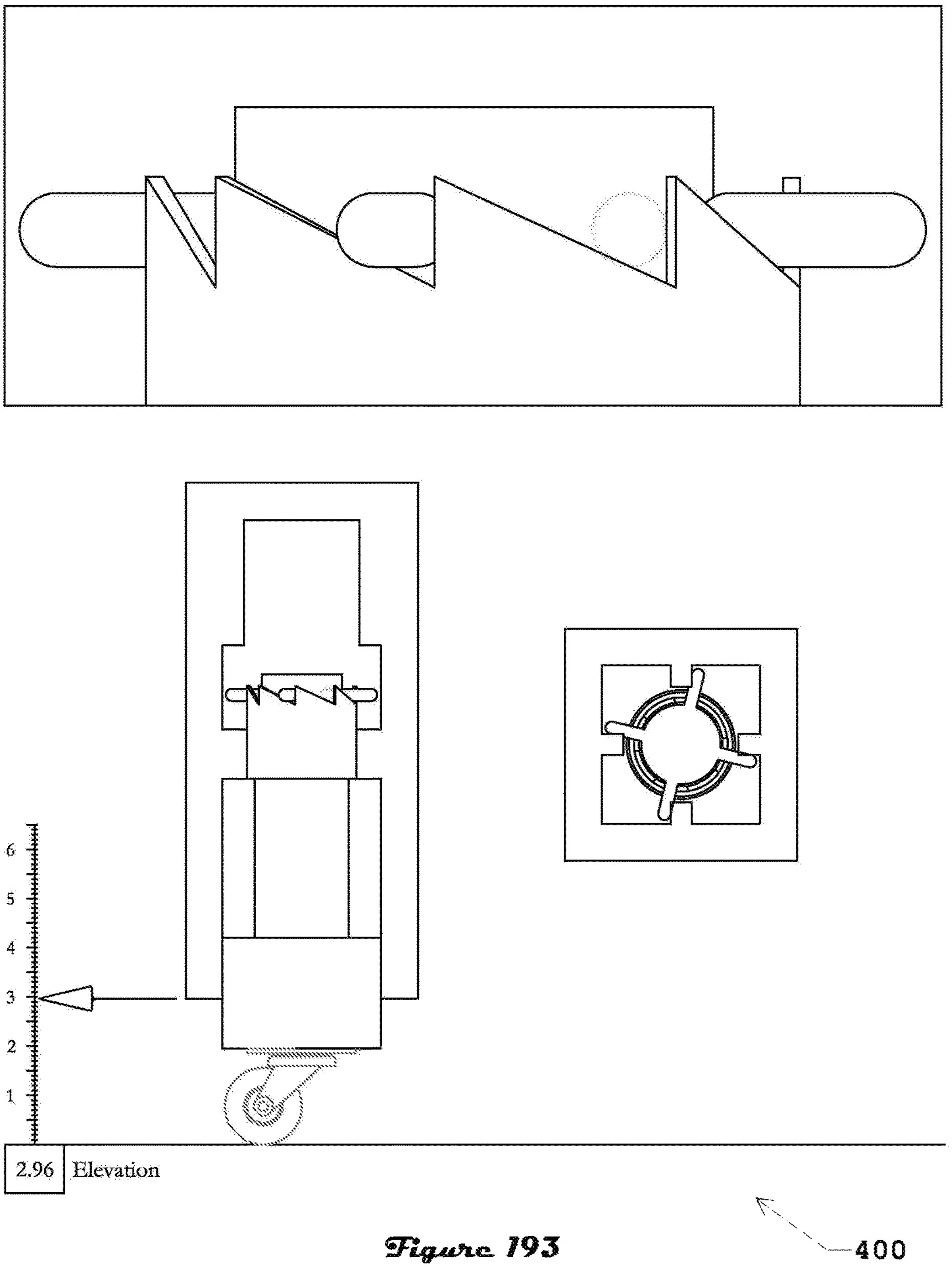
Figure 194:
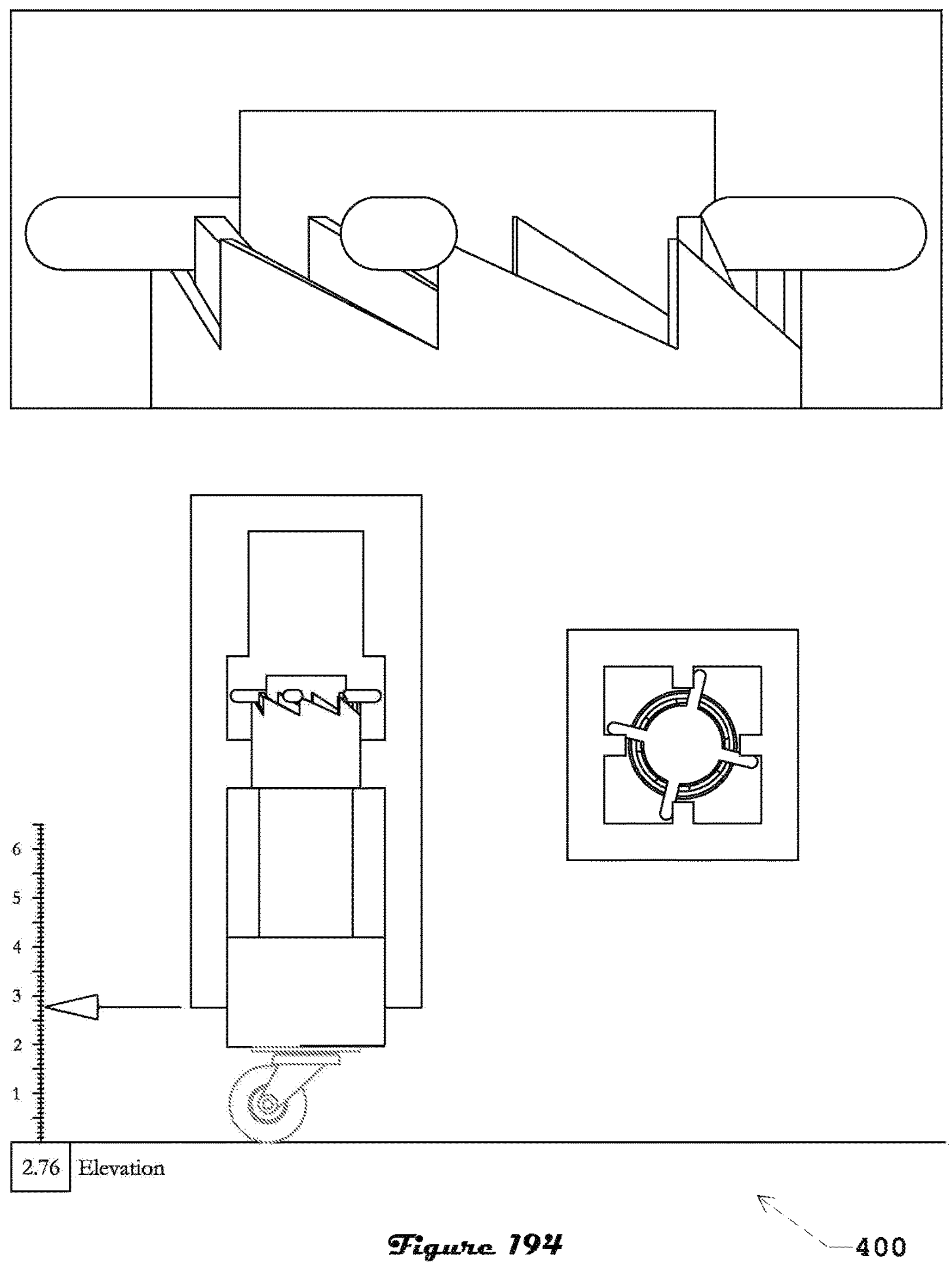
Figure 195:
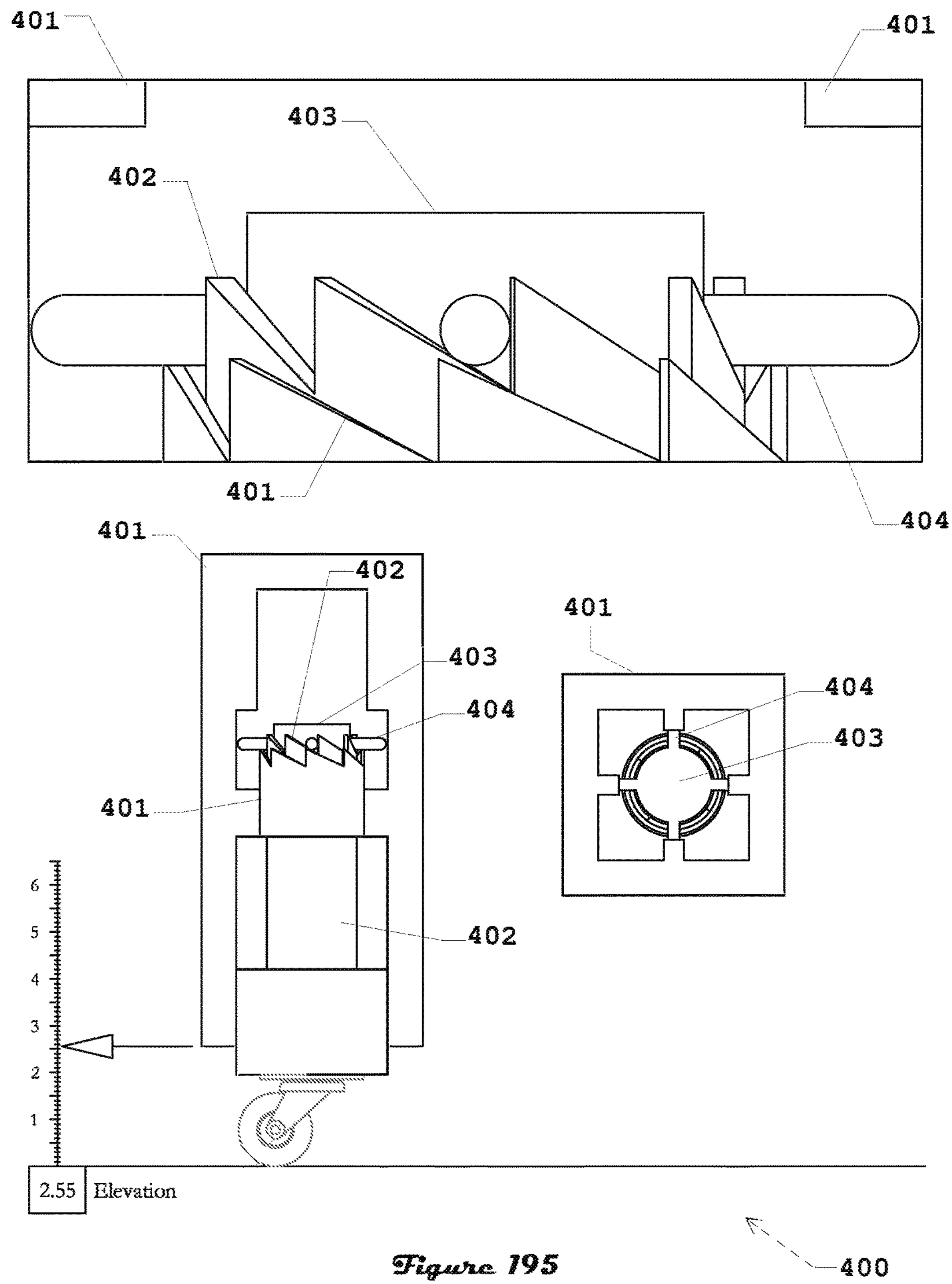
Figure 196:
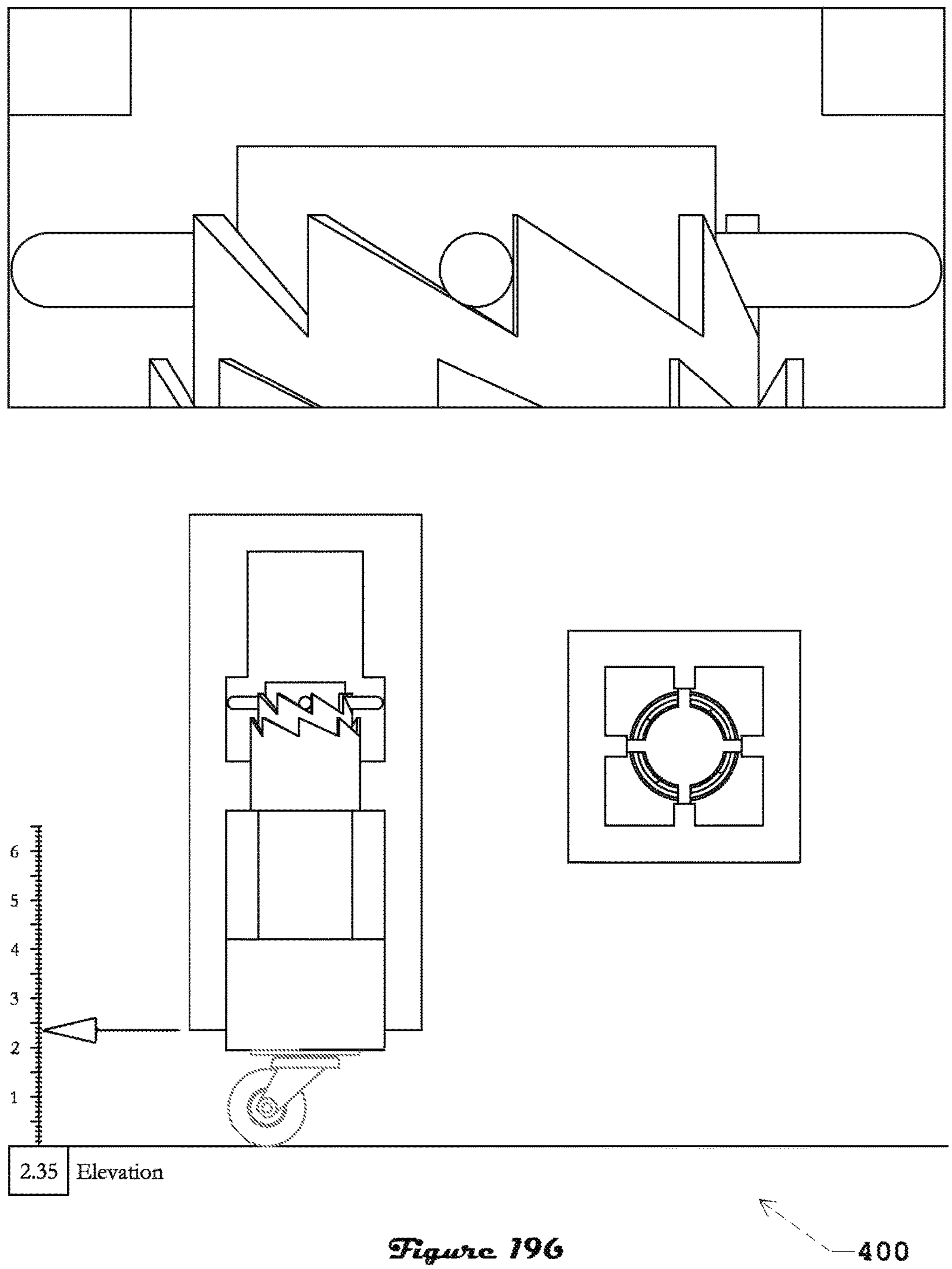
Figure 197:
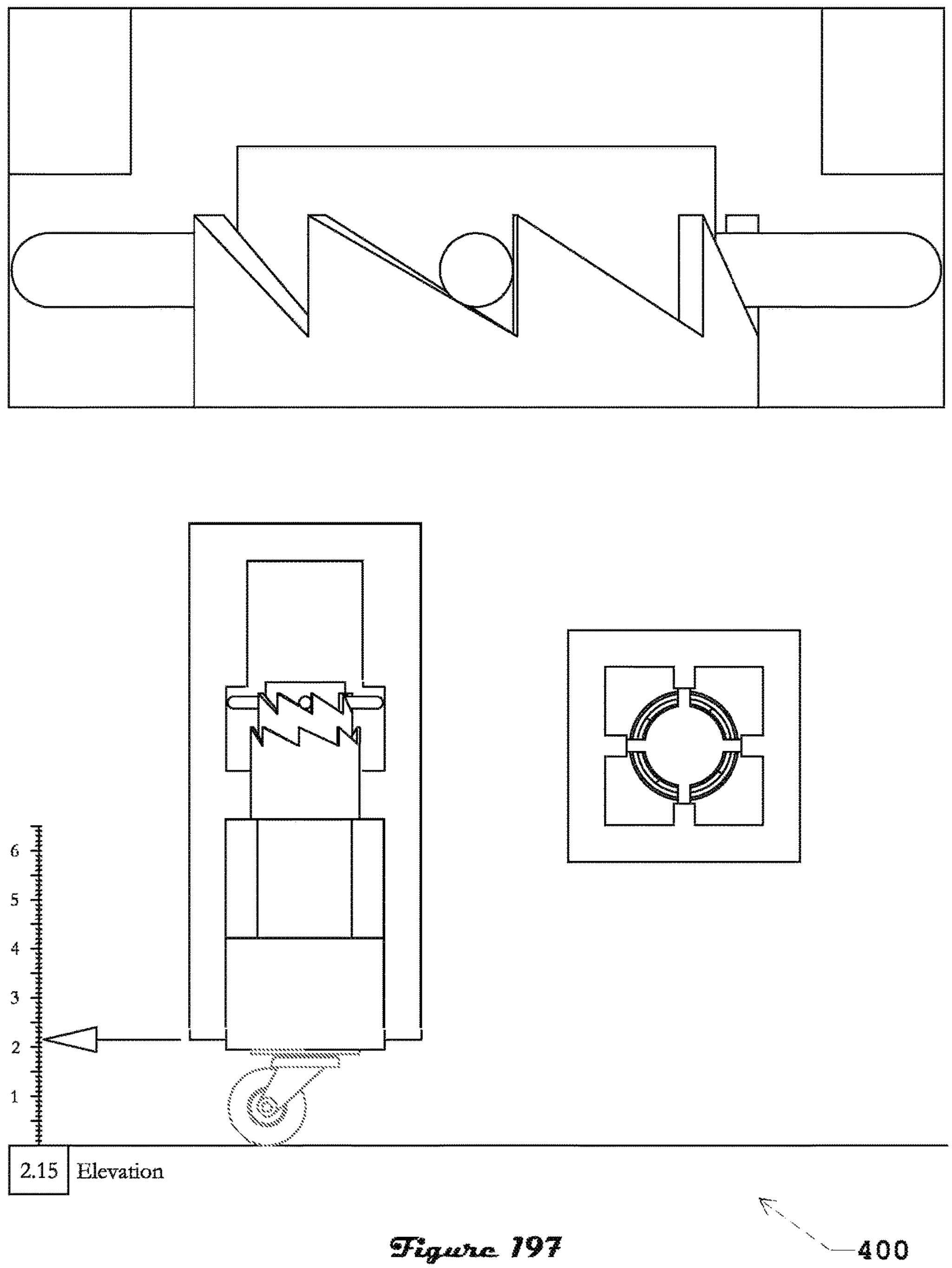
Figure 198:
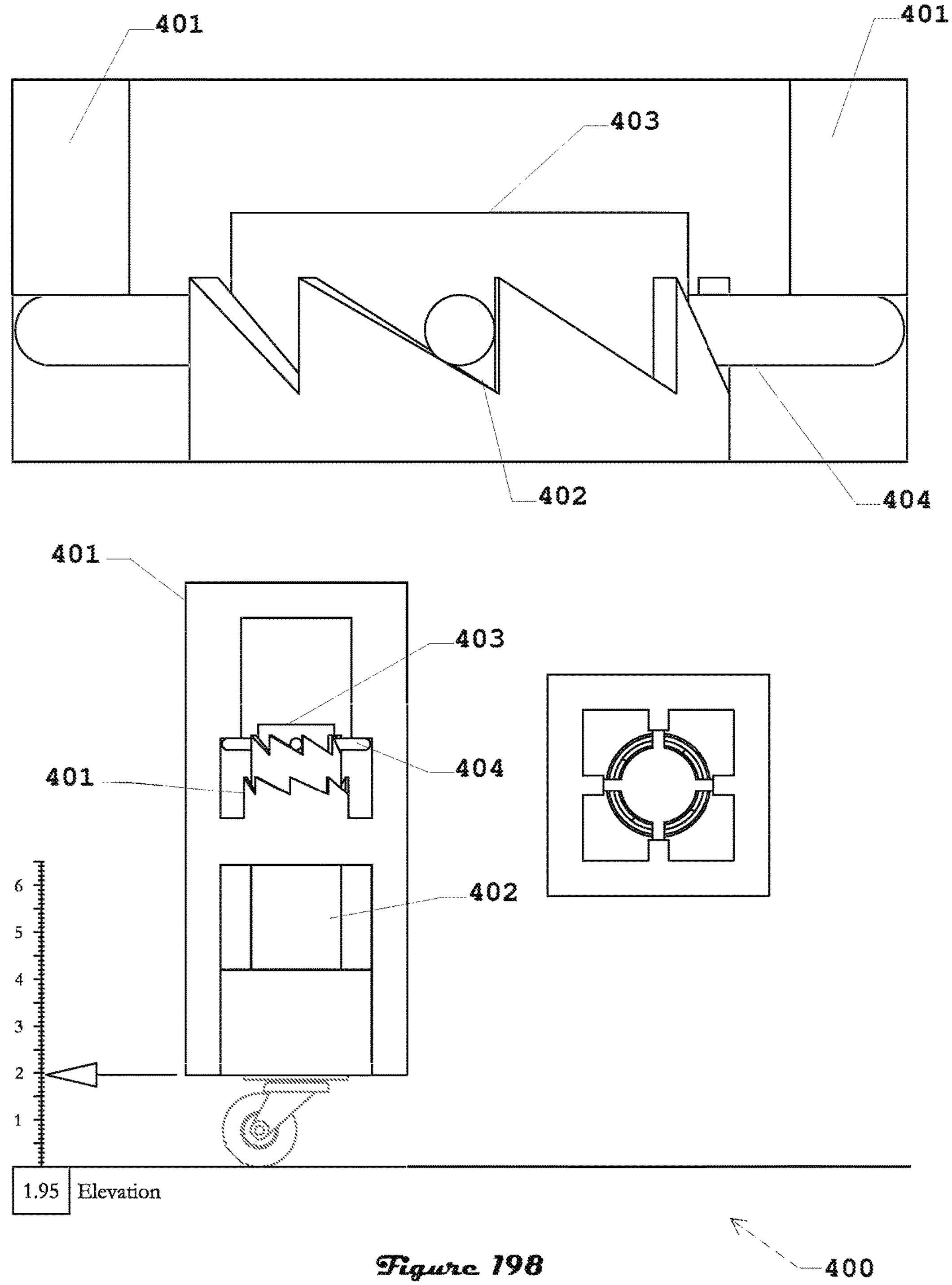
Figure 199:
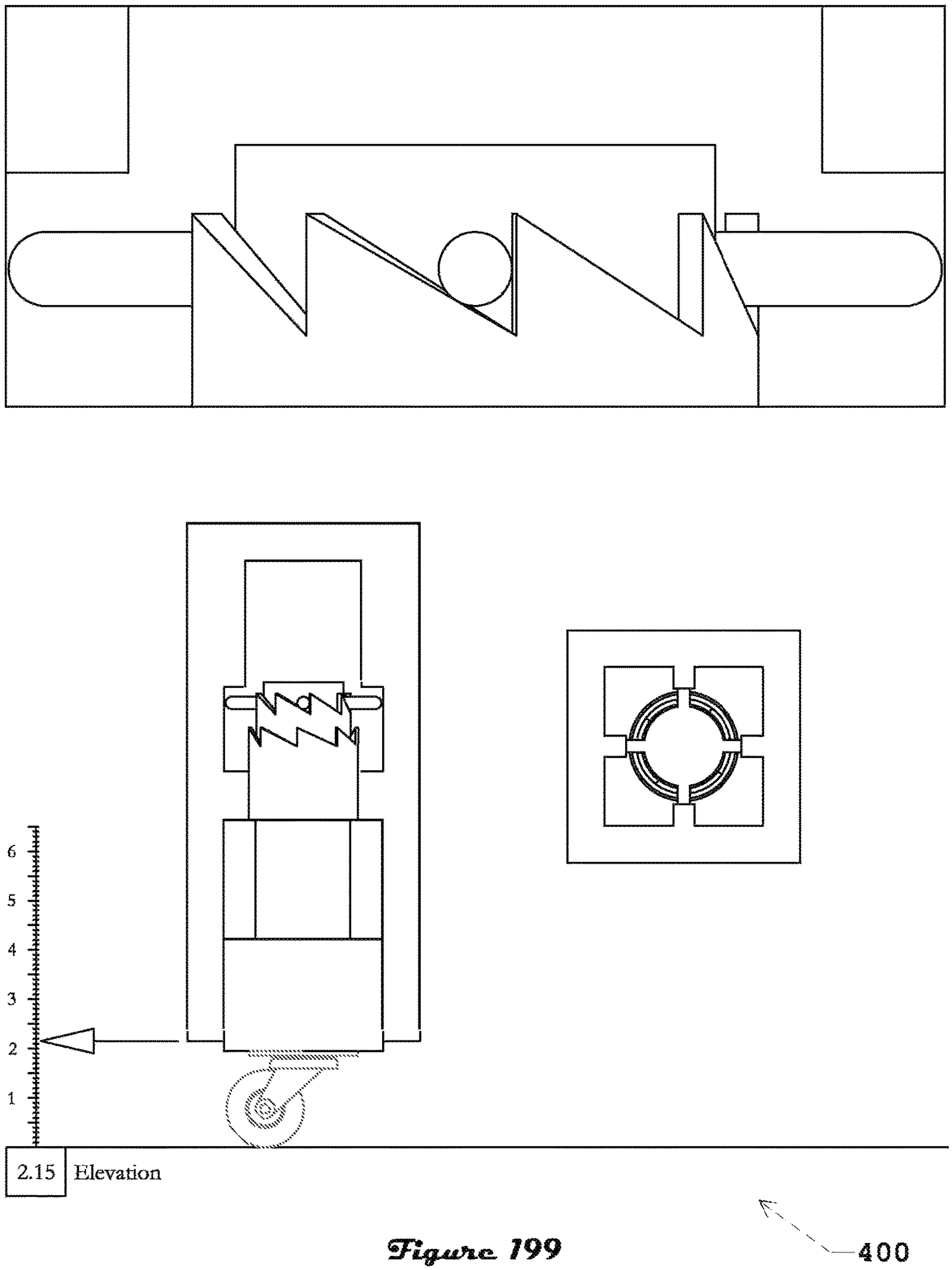
Figure 200:
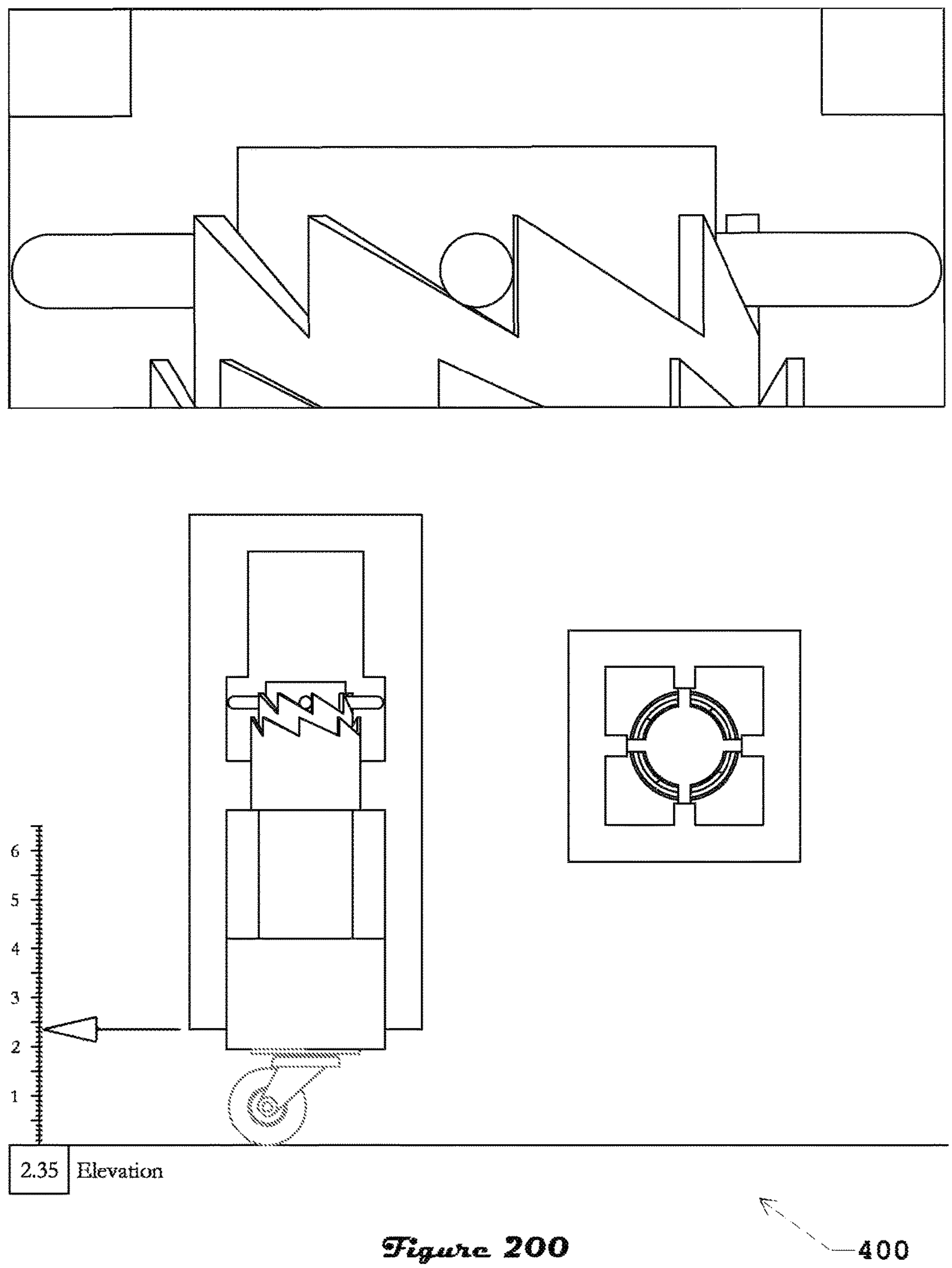
Figure 201:
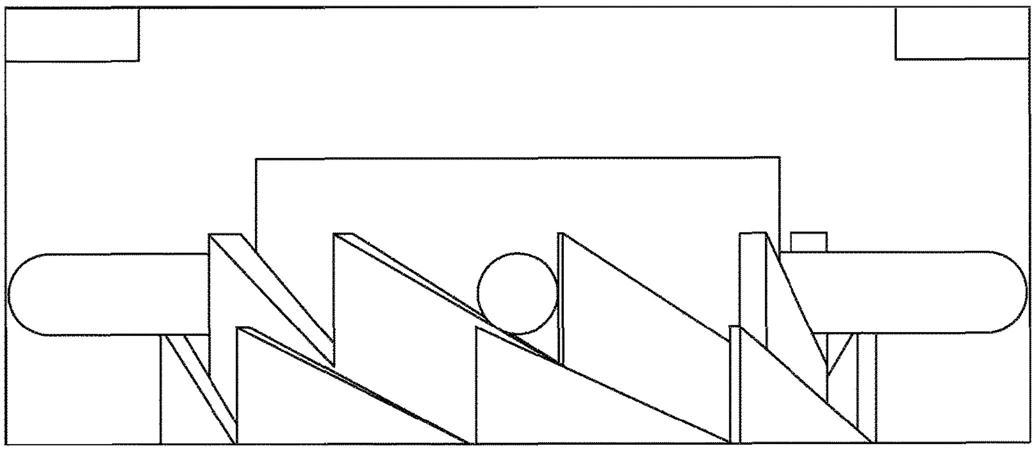
Figure 201:
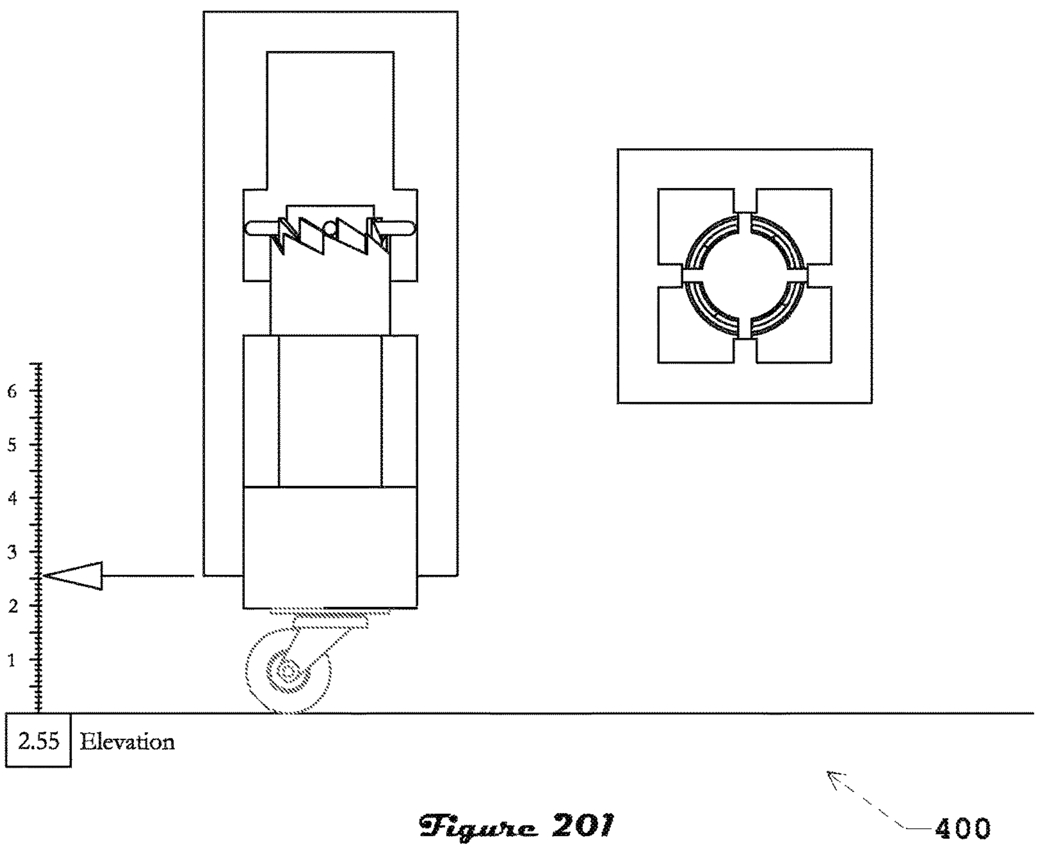
Figure 202:
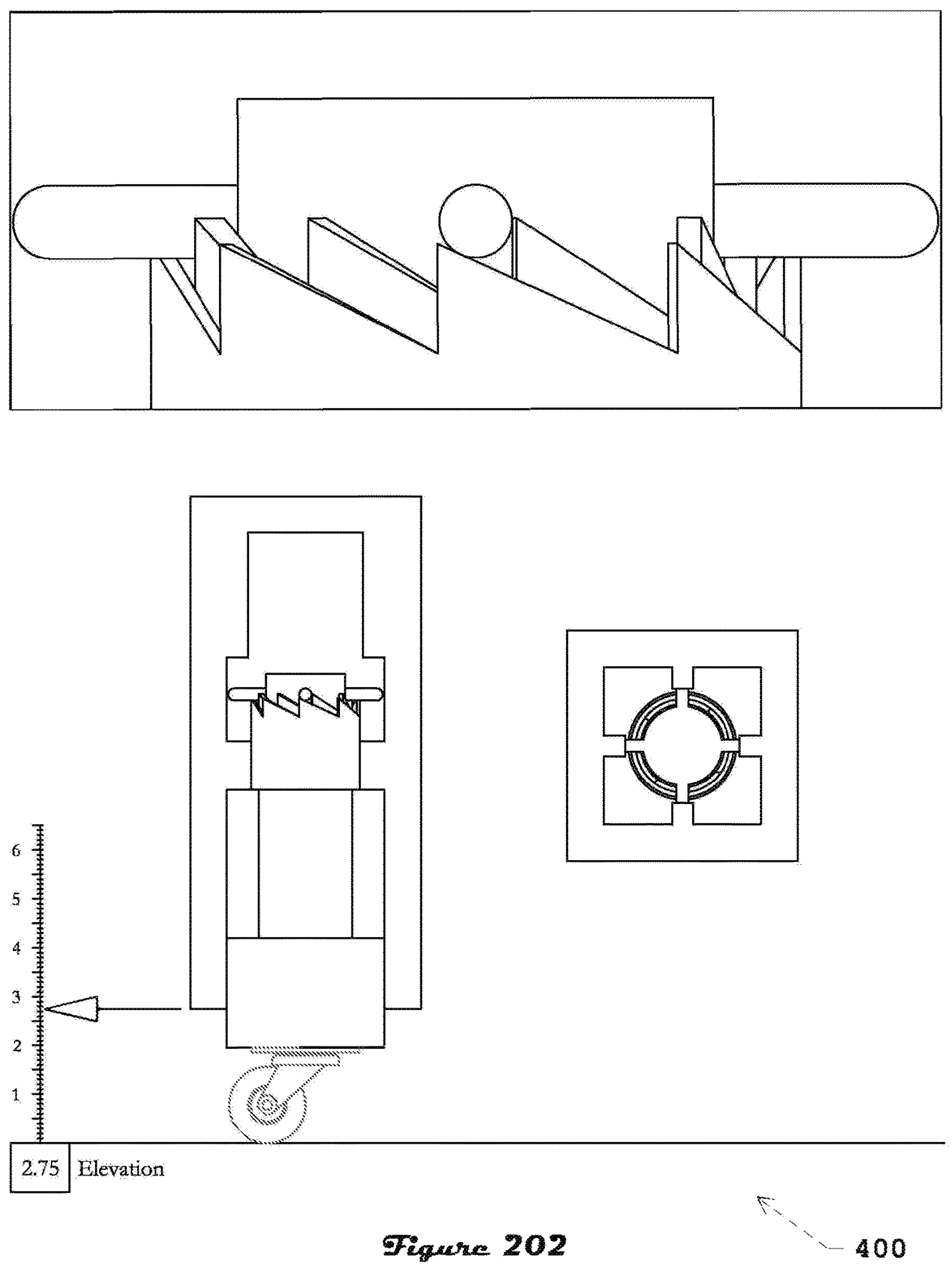
Figure 203:
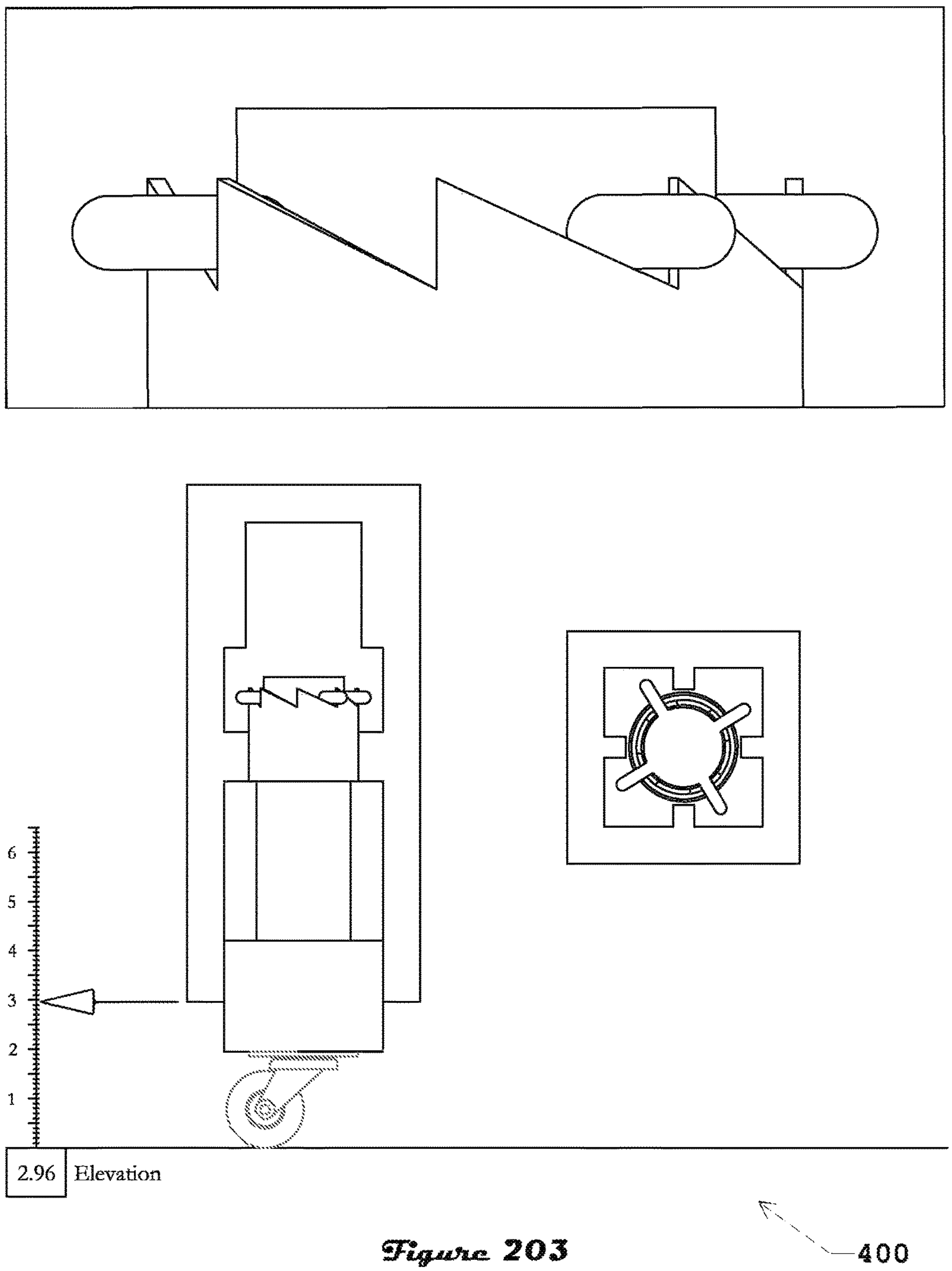
Figure 204:
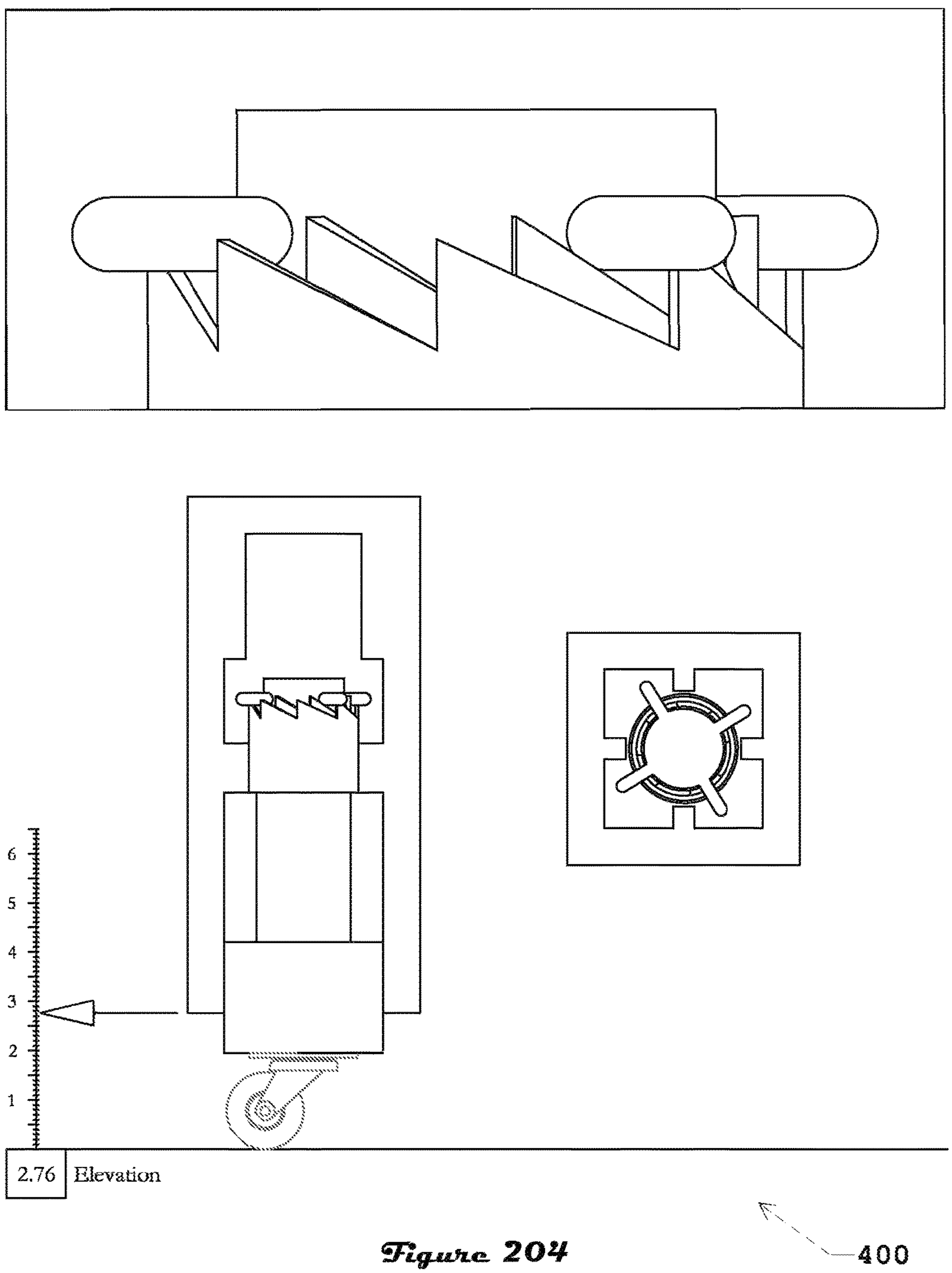
Figure 205:
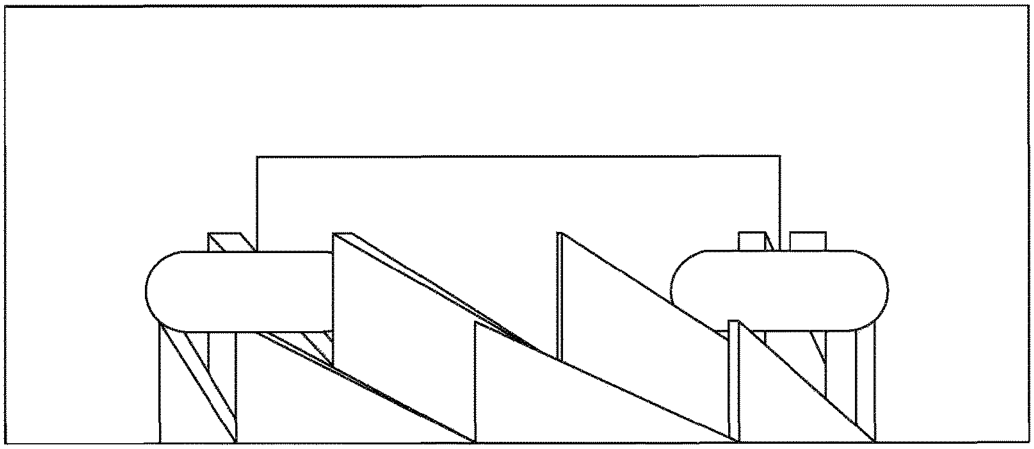
Figure 205:
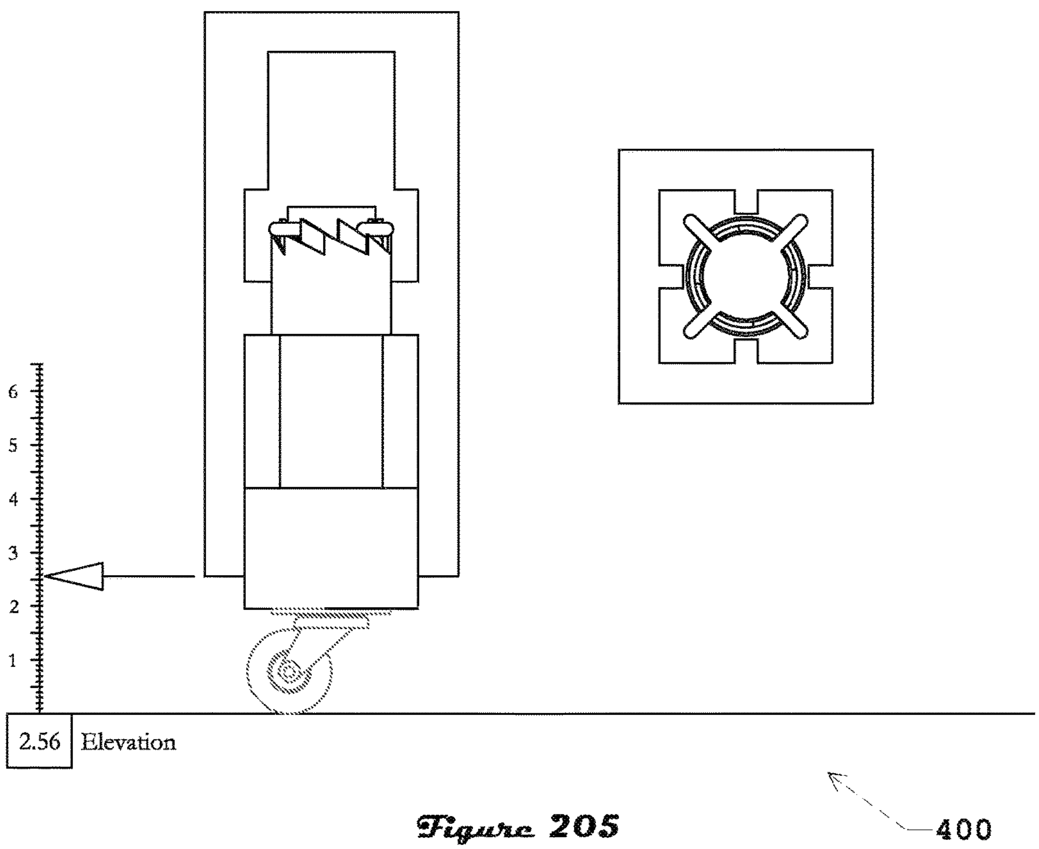
Figure 206:
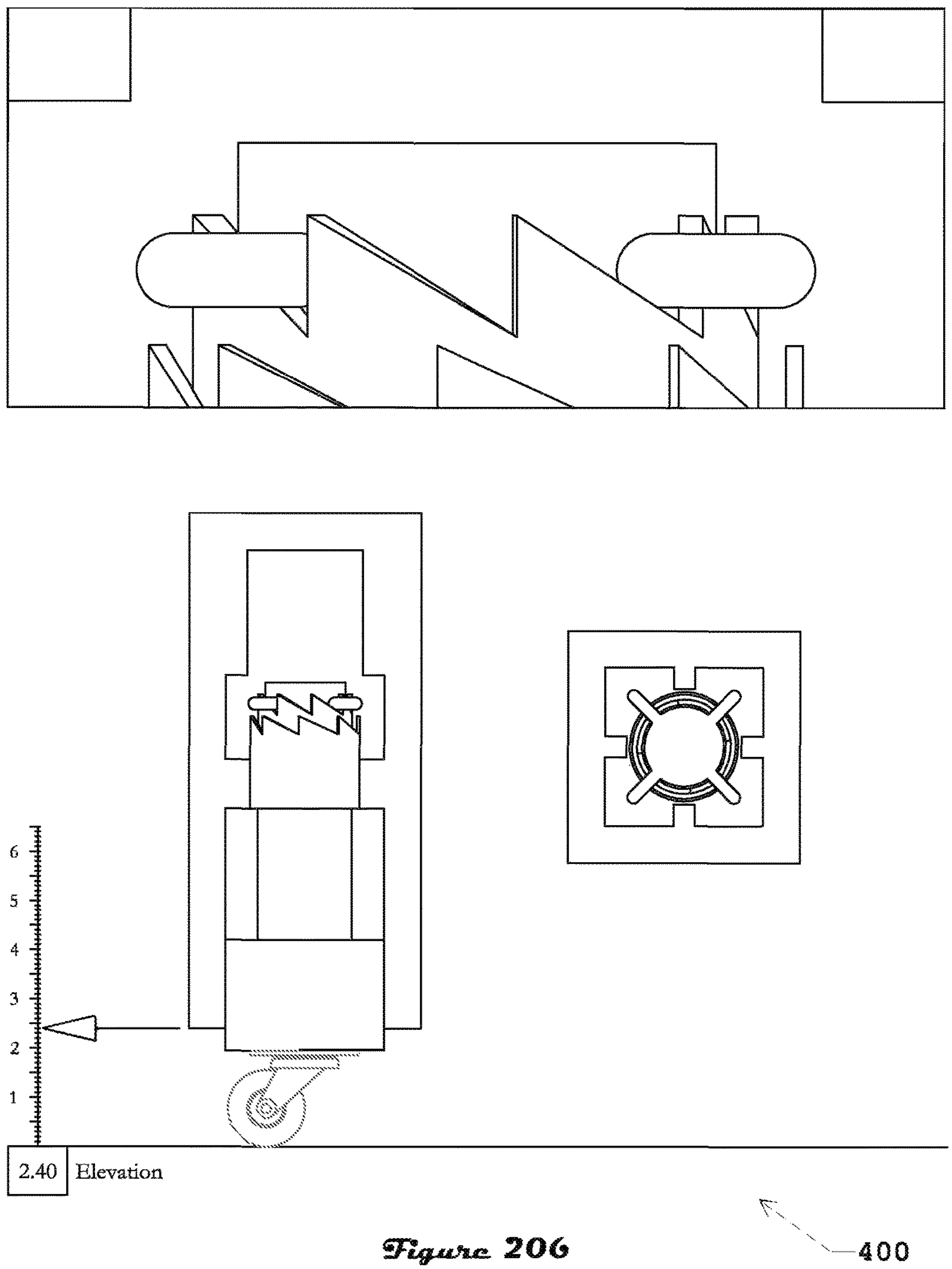
Figure 207:
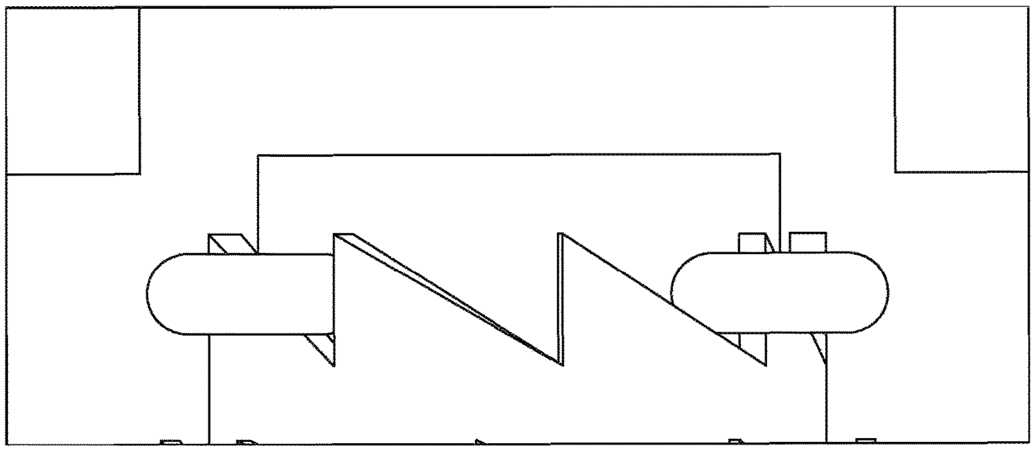
Figure 207:
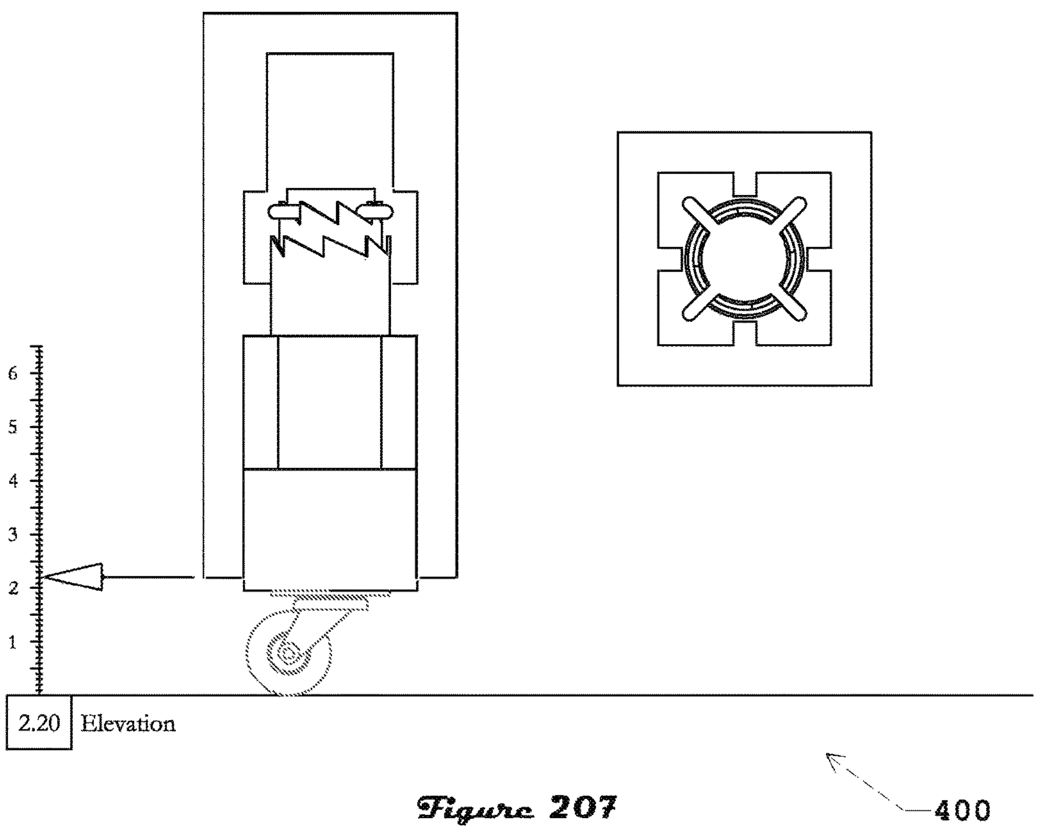
Figure 208:
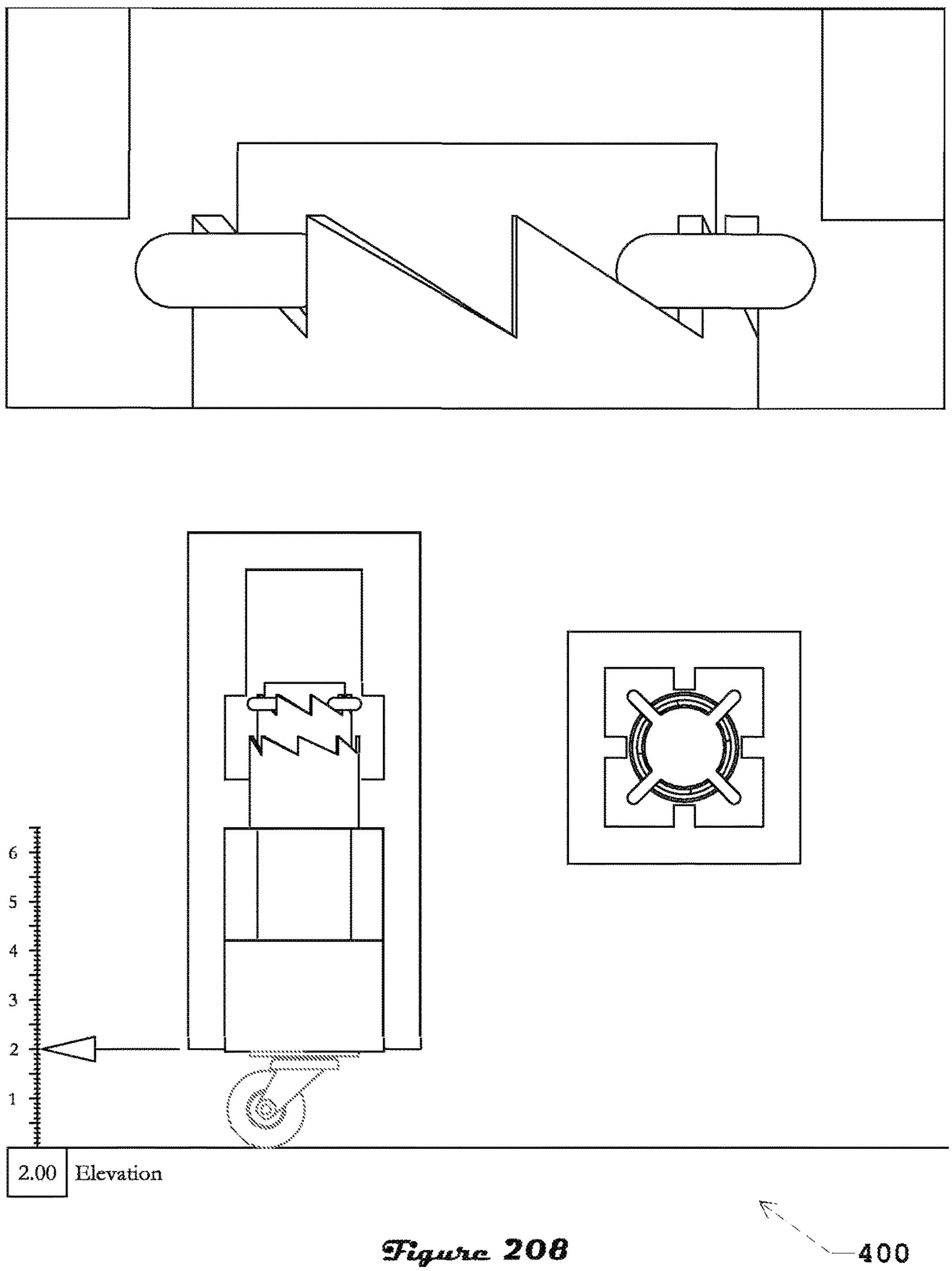
Figure 209:
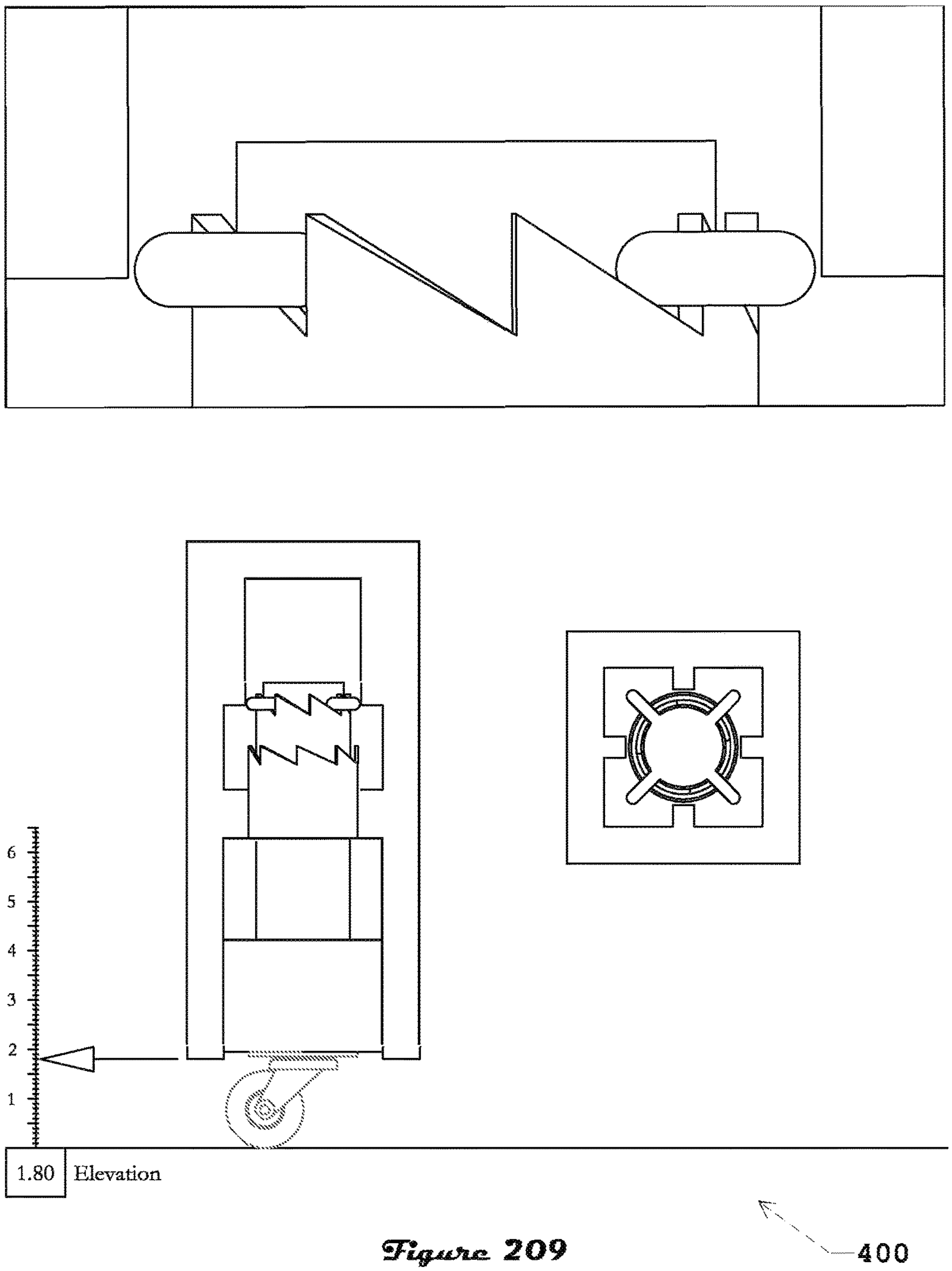
Figure 210:
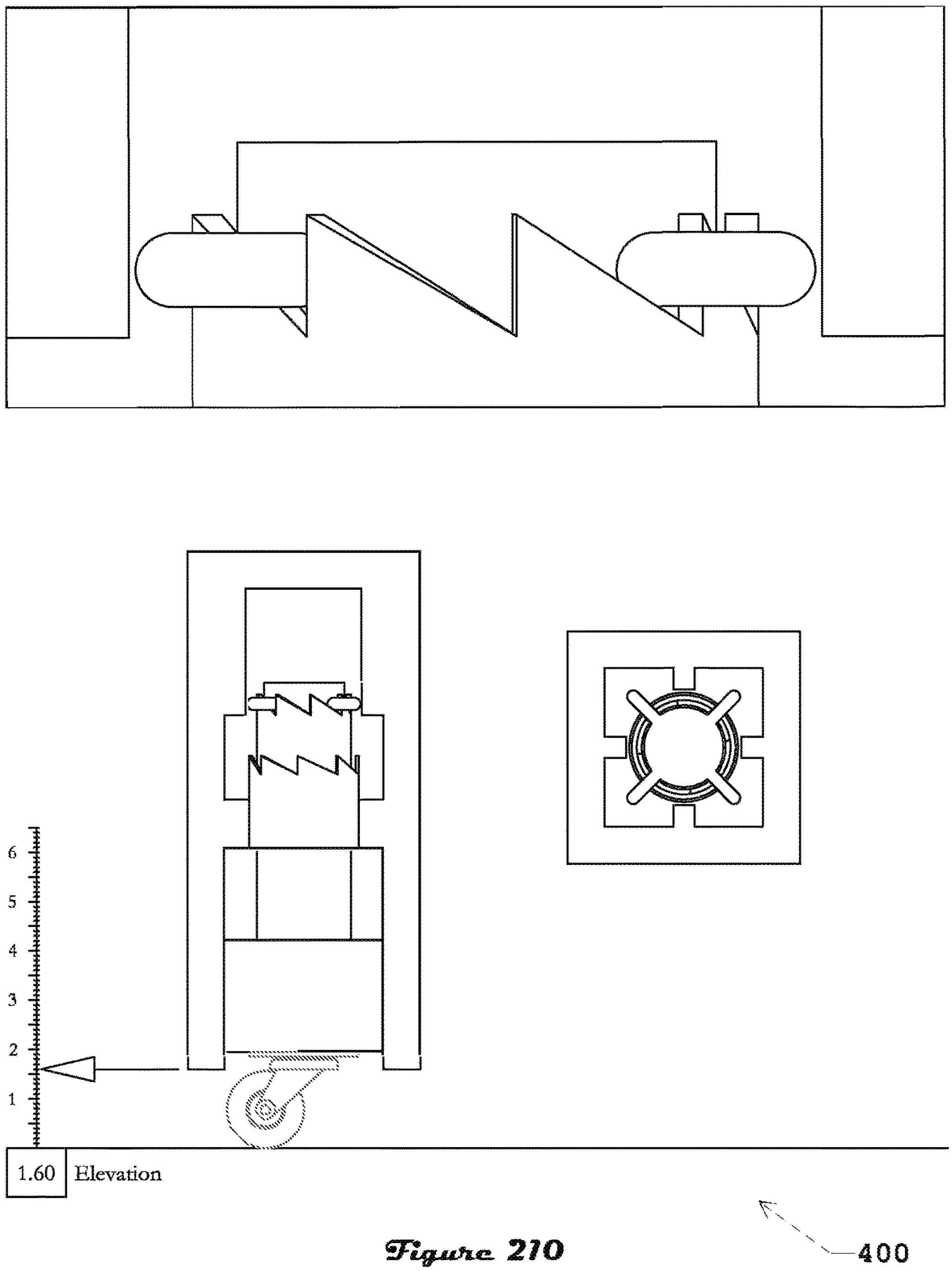
Figure 211:
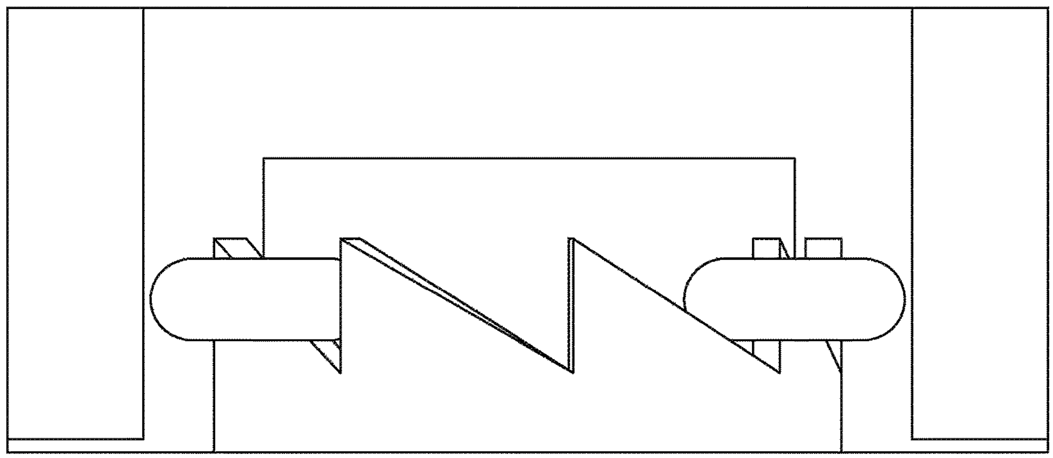
Figure 211:
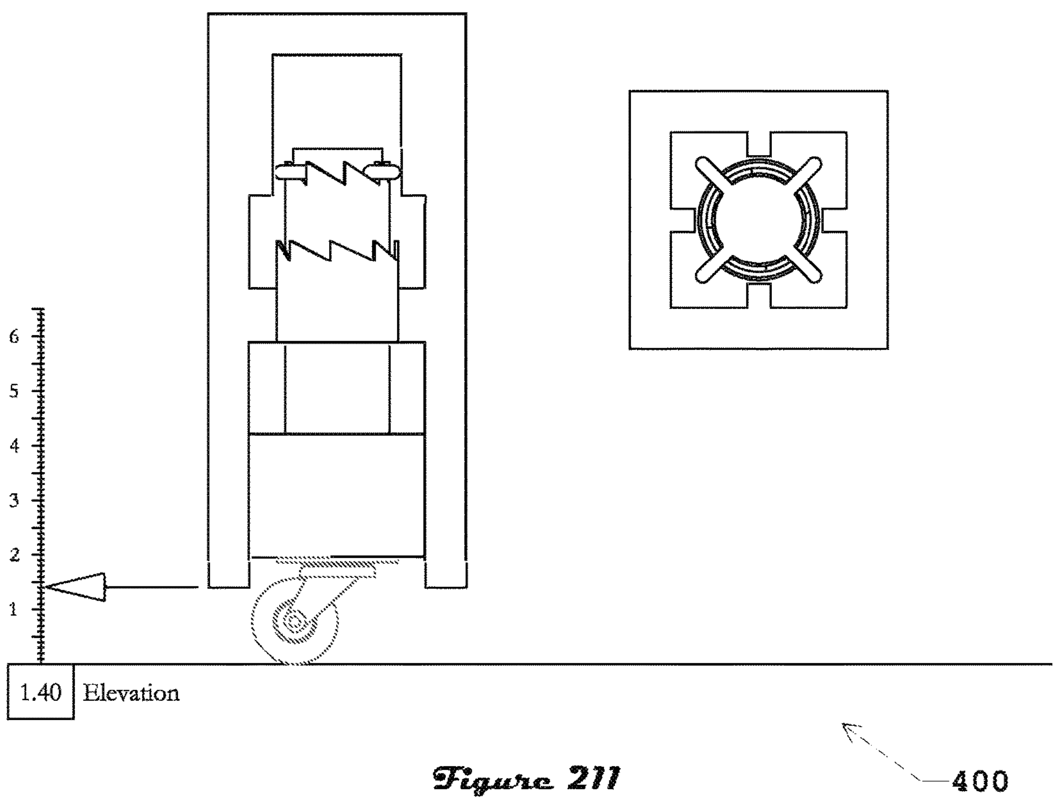
Figure 212:
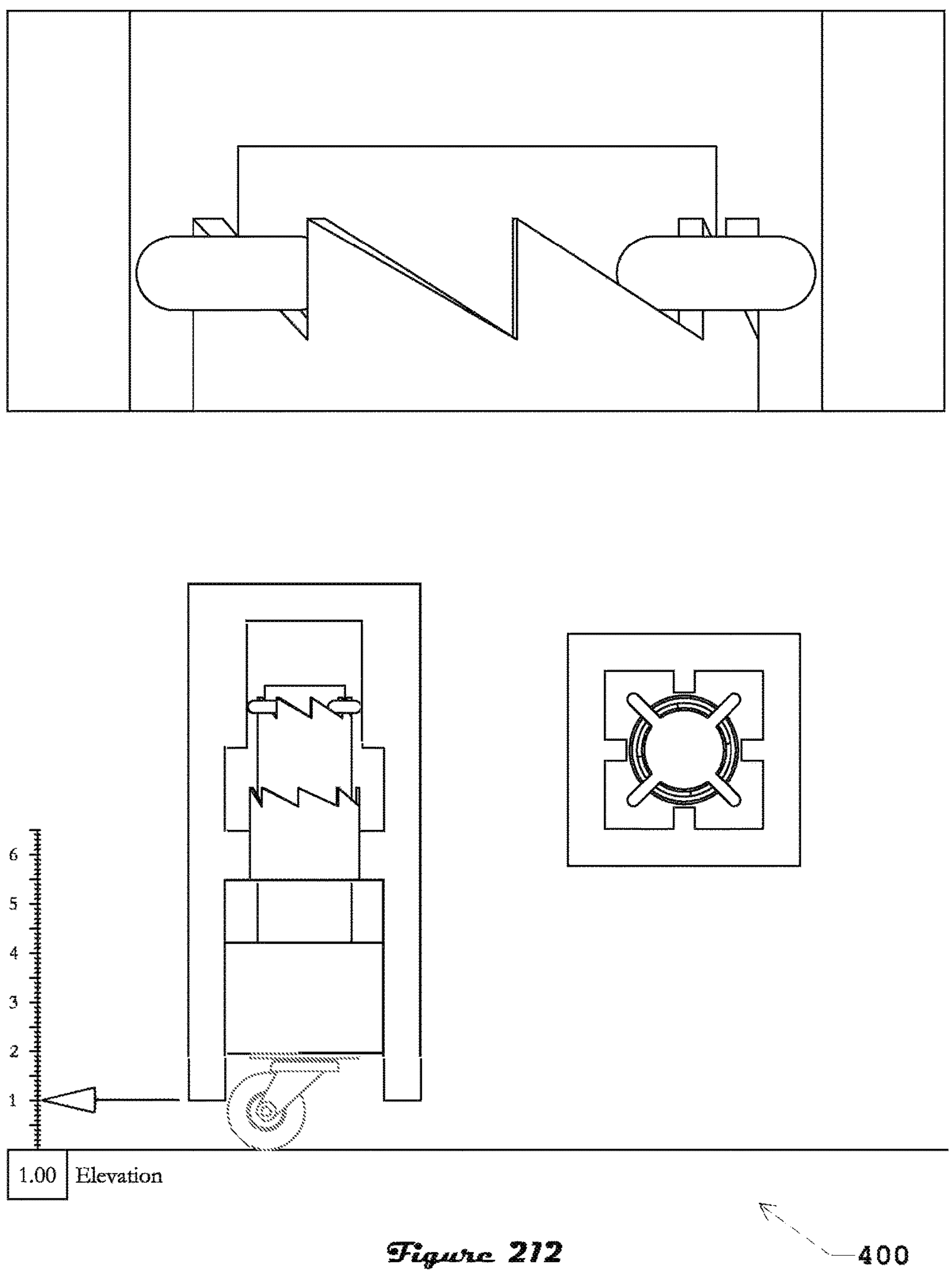
Figure 213:
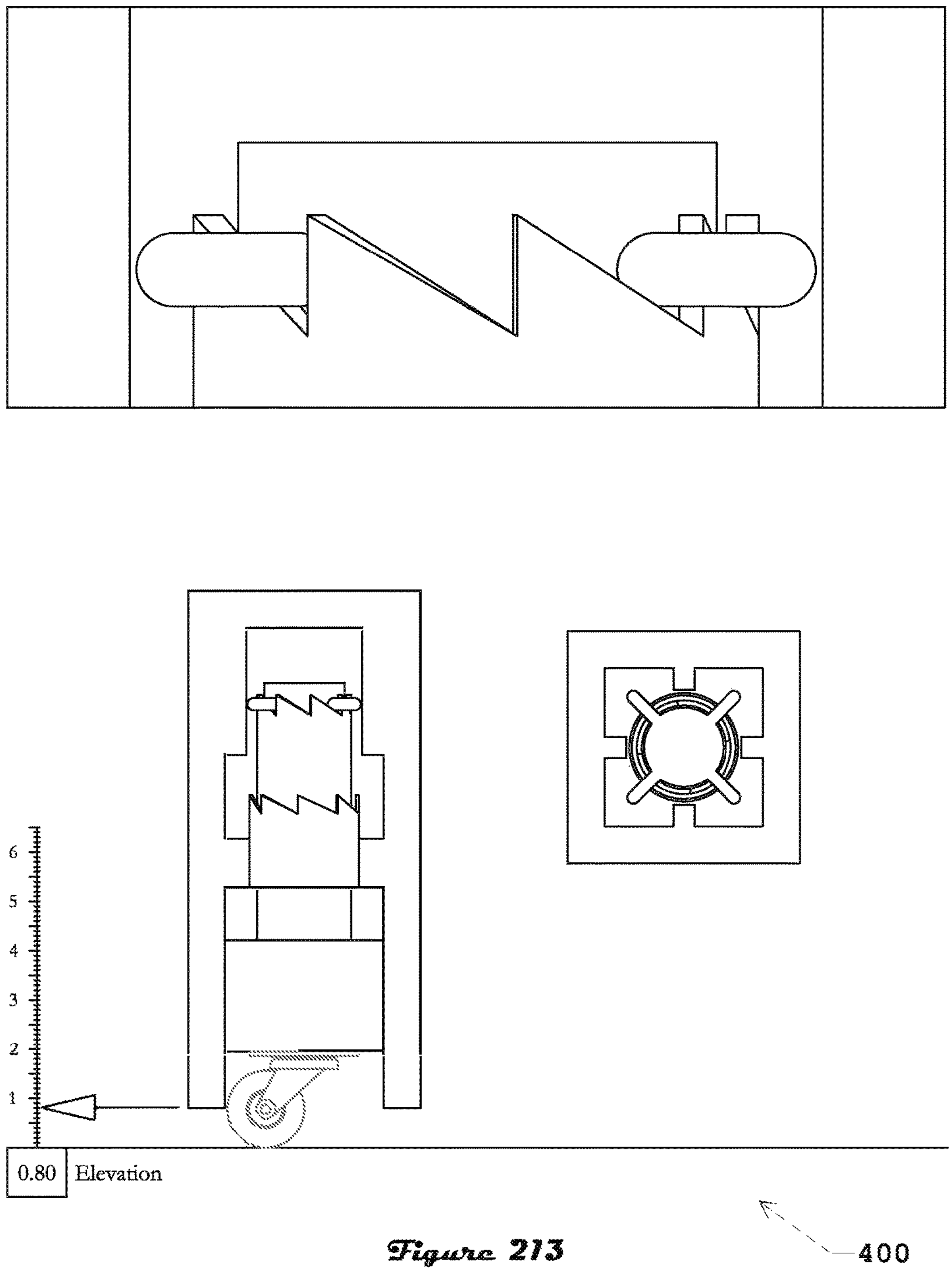
Figure 214:
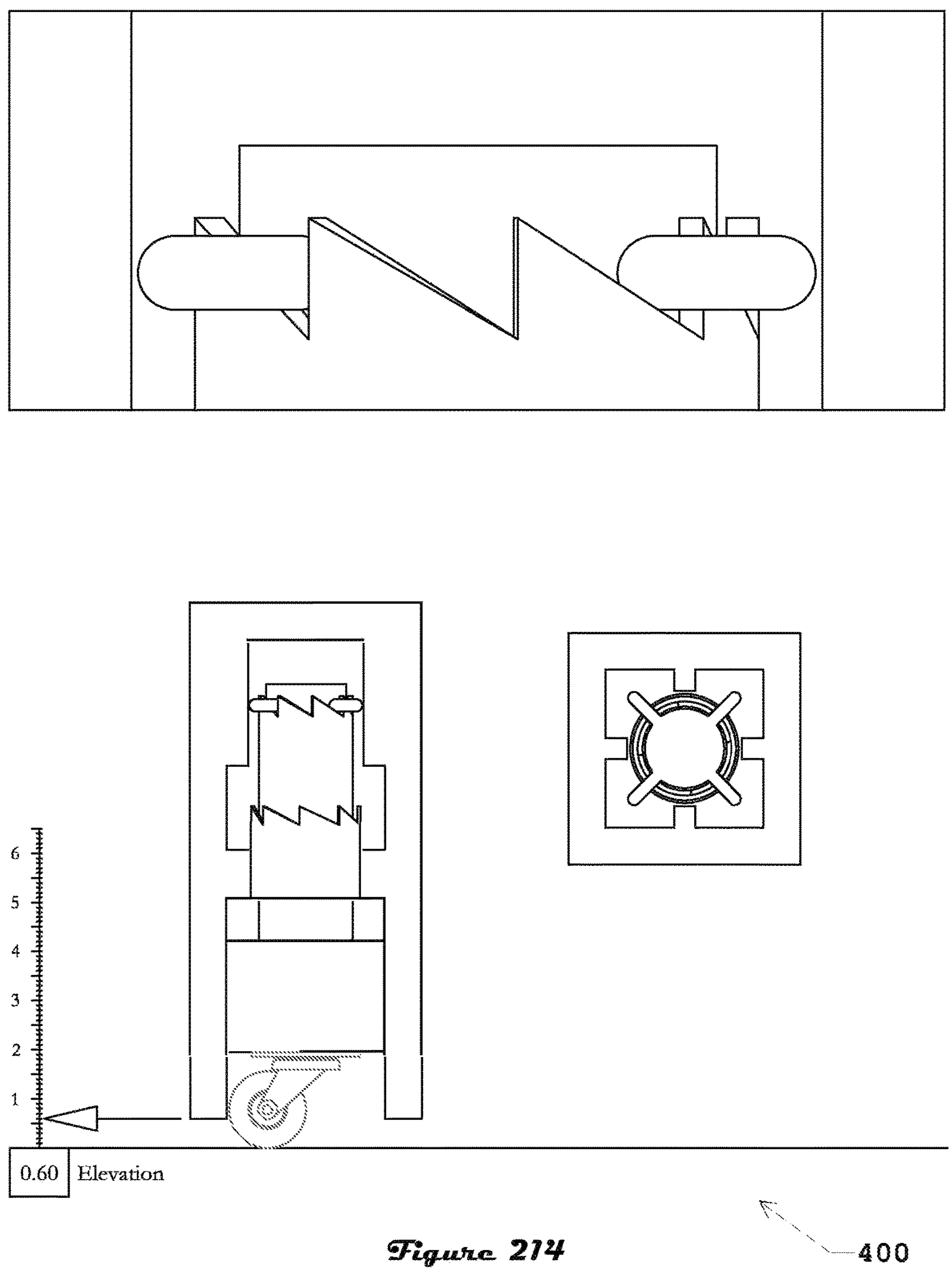
Figure 215:
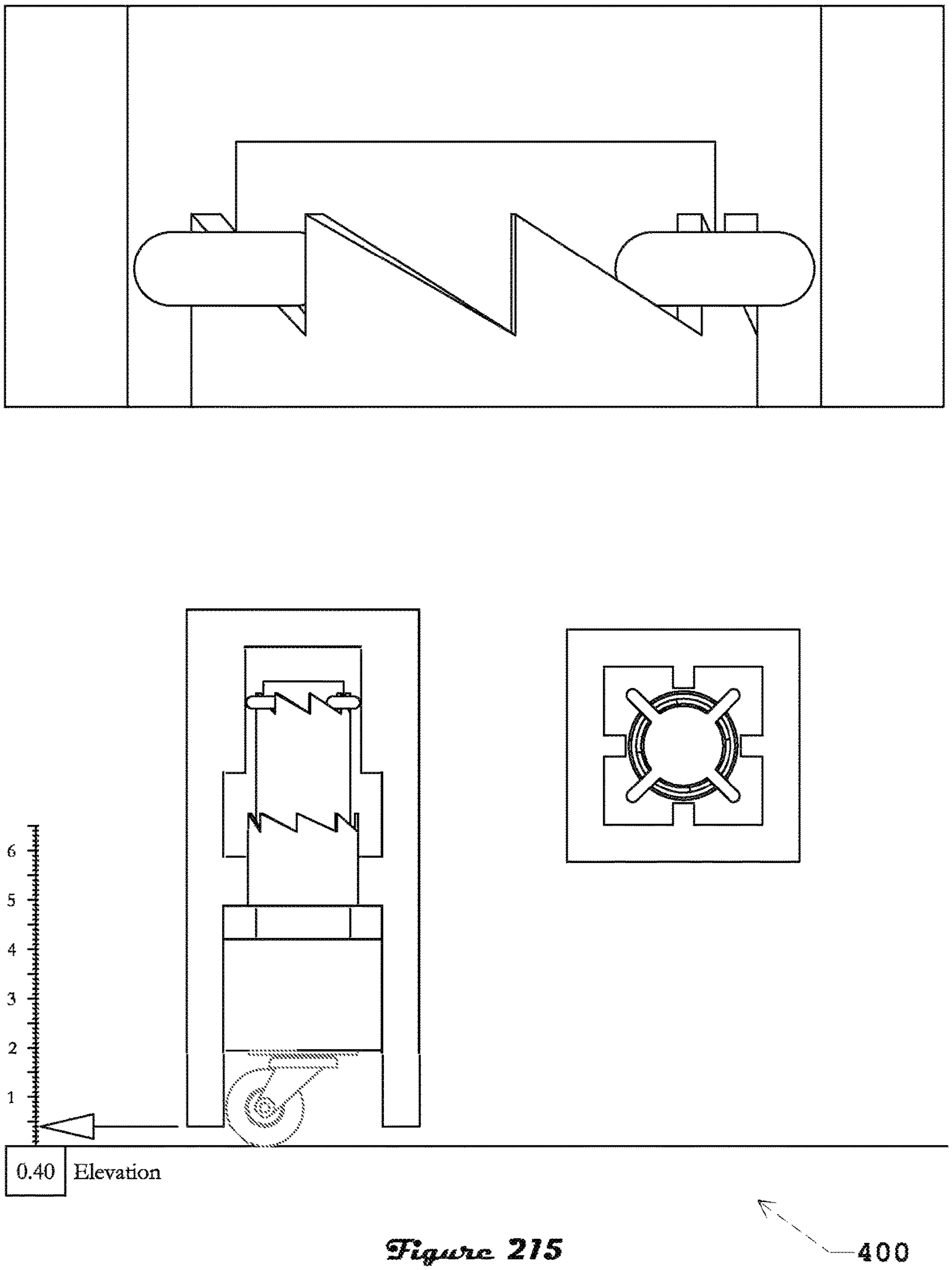
Figure 216:
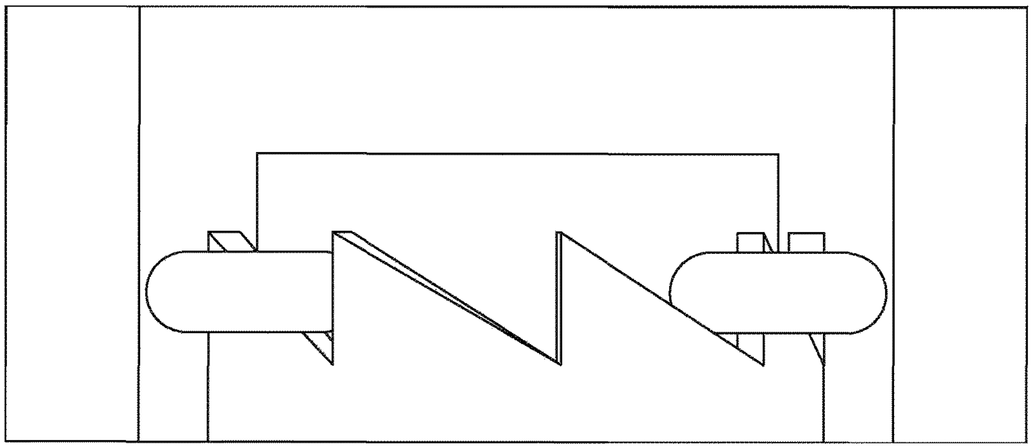
Figure 216:
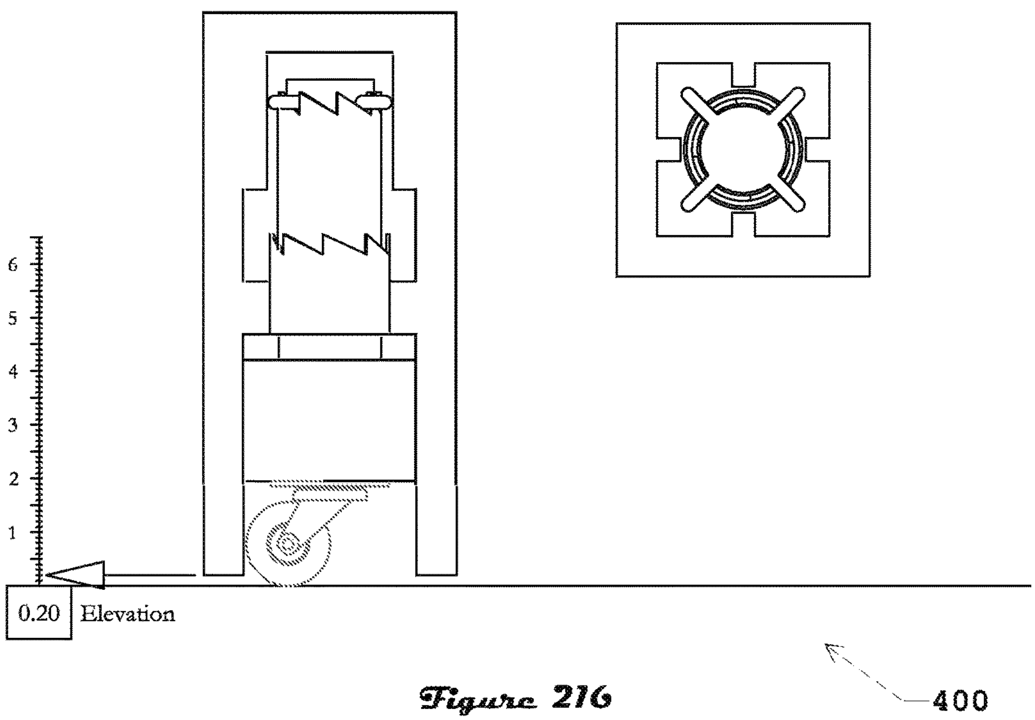
Figure 217:
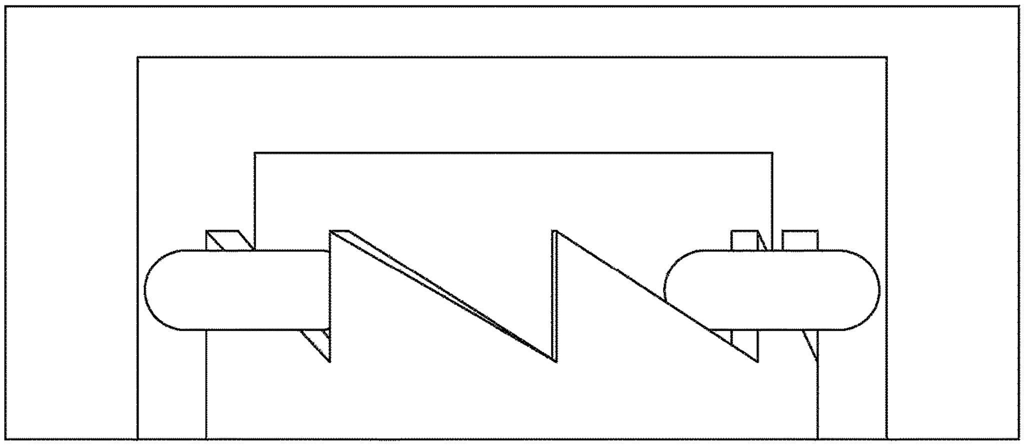
Figure 217:
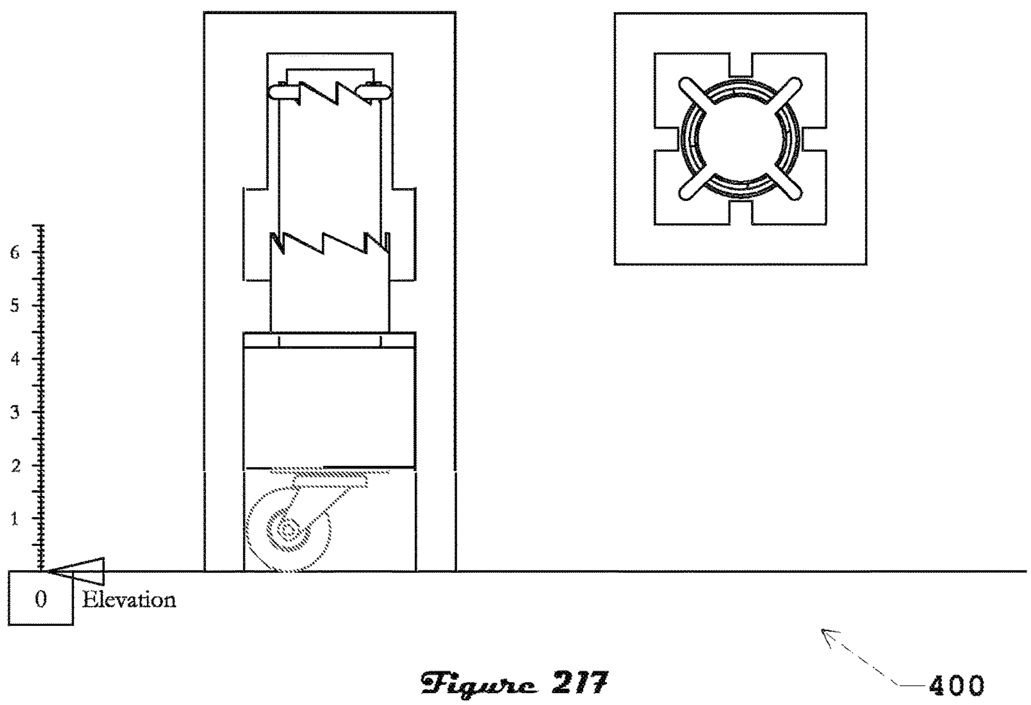
Figure 232:
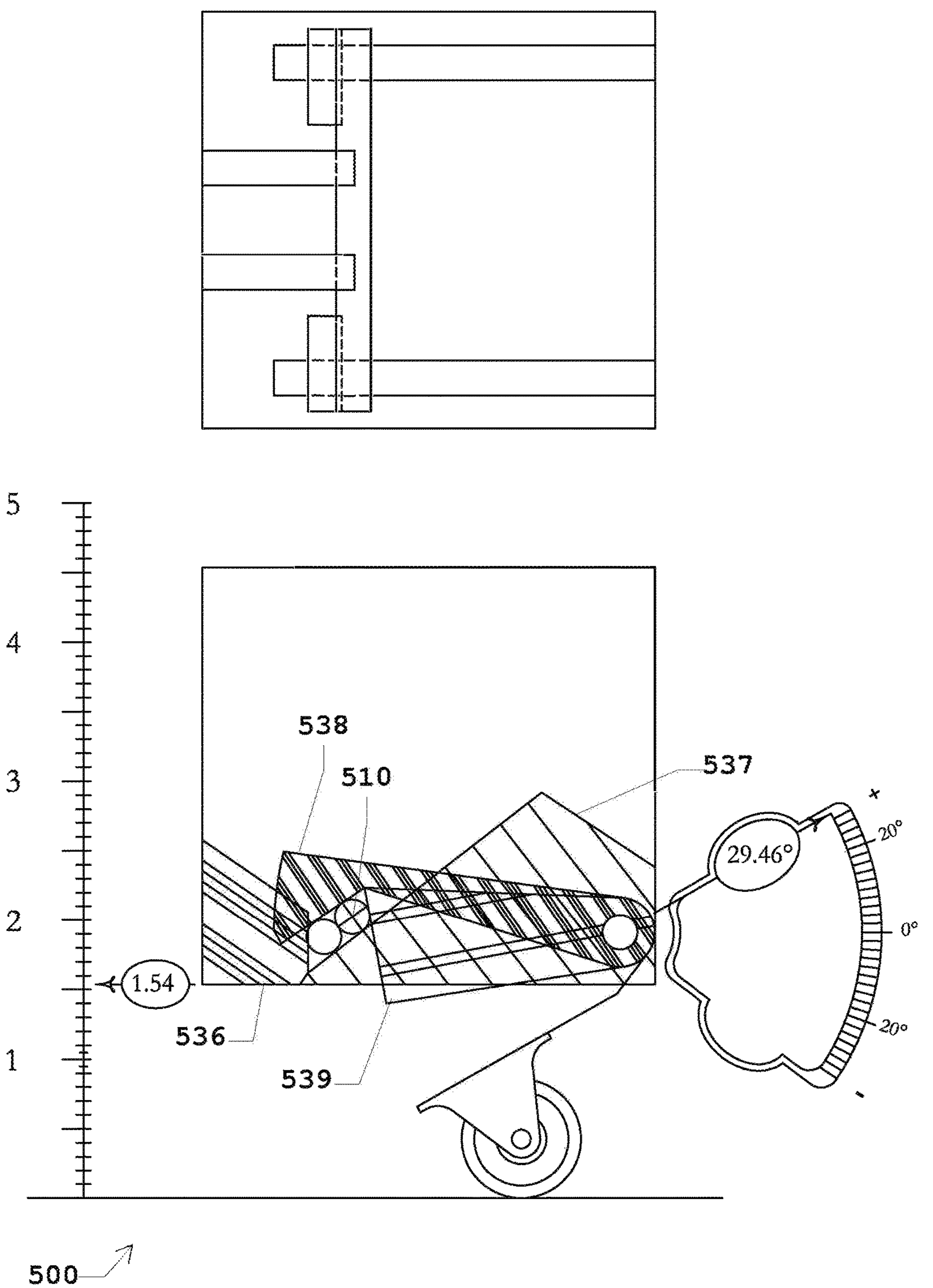
Figure 233:
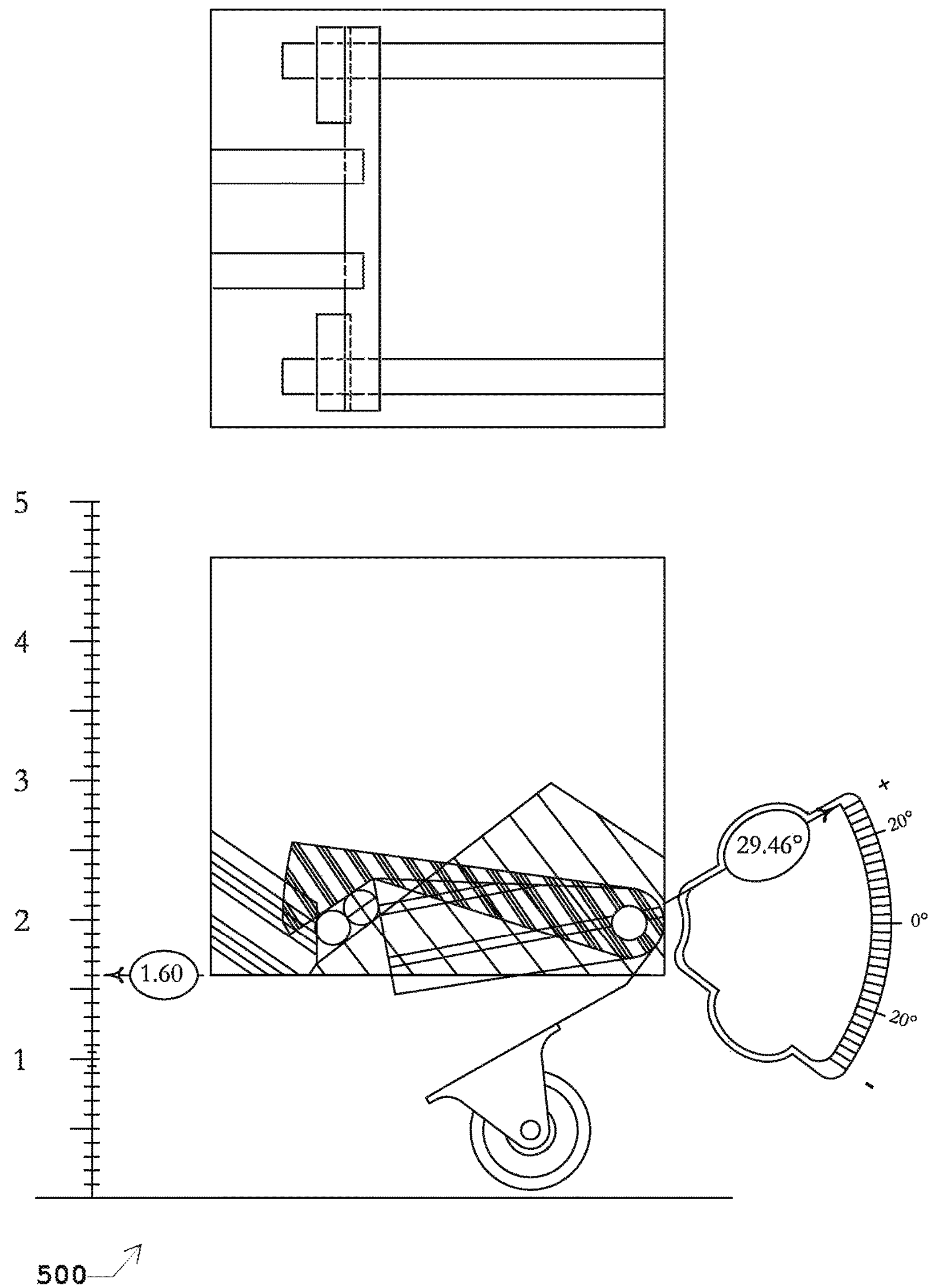
Figure 234:
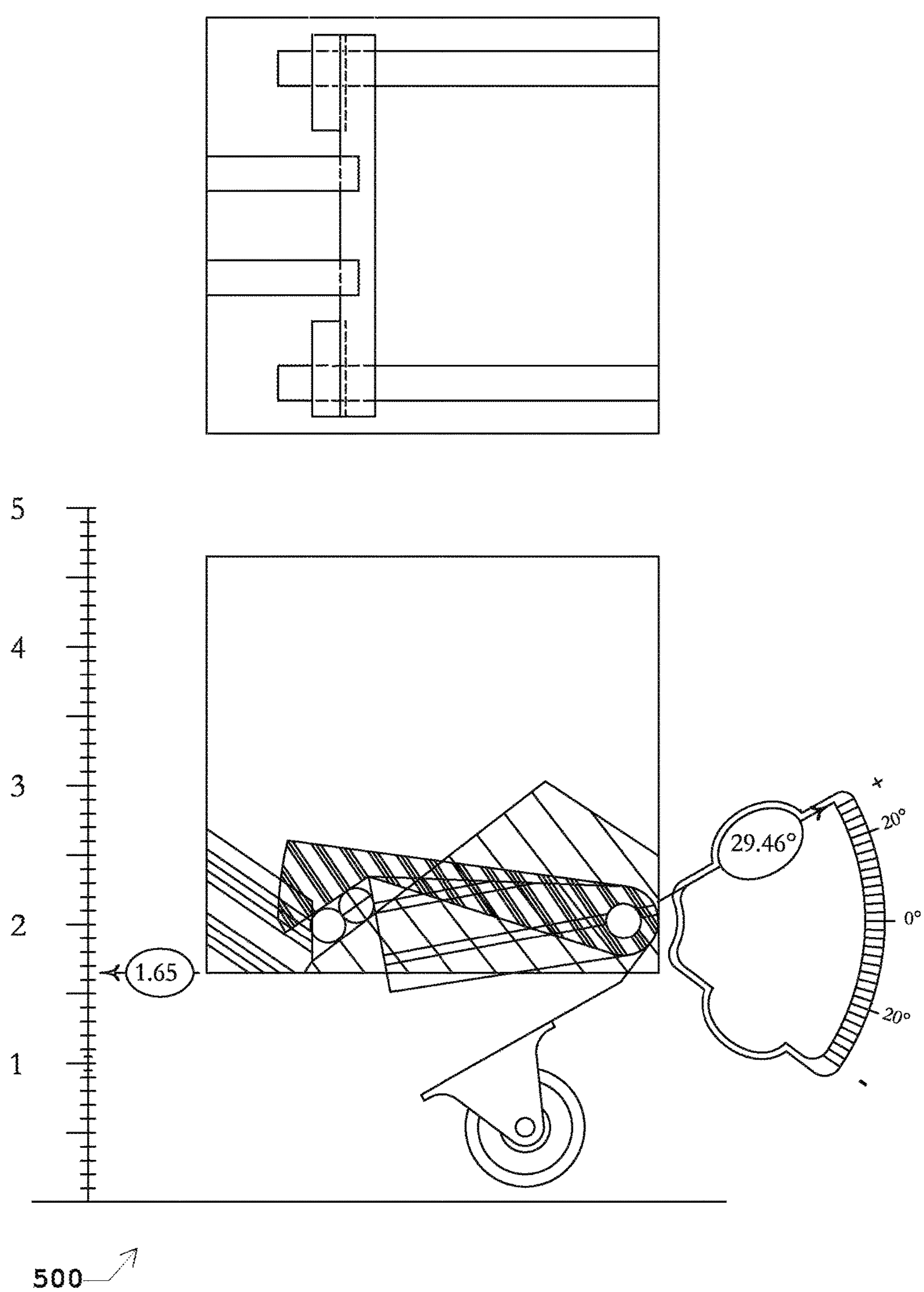
Figure 235:
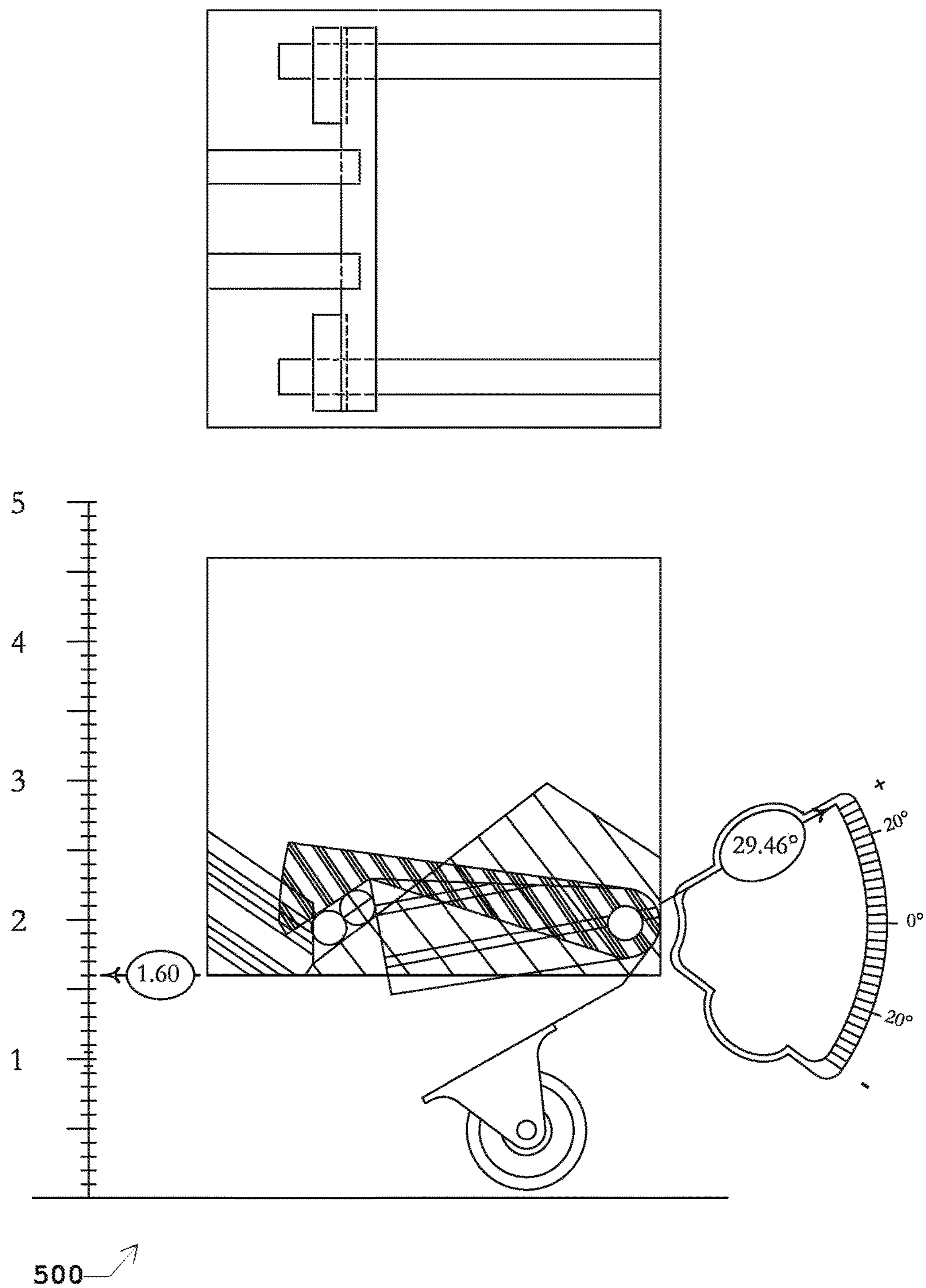
Figure 236:
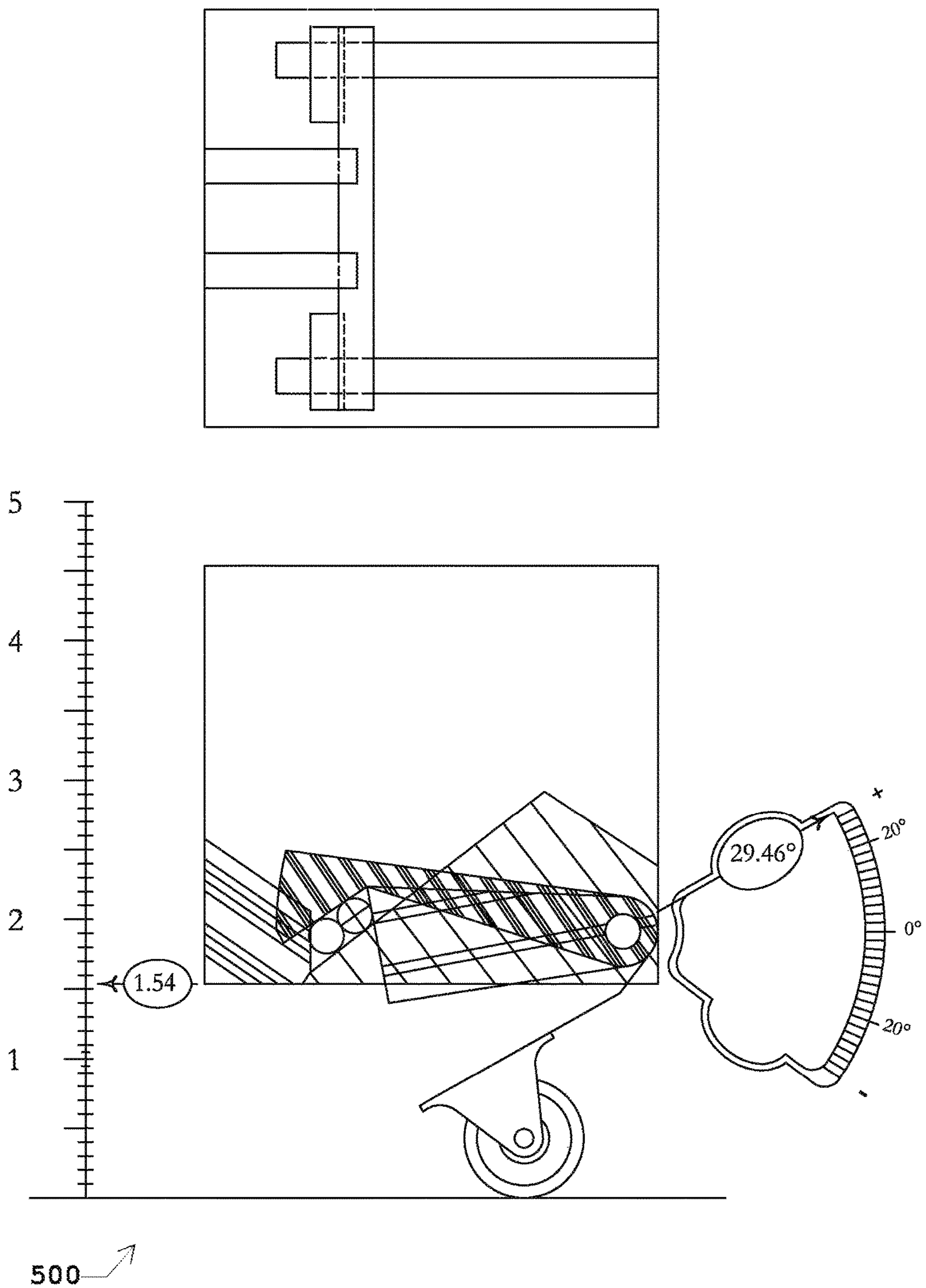
Figure 237:
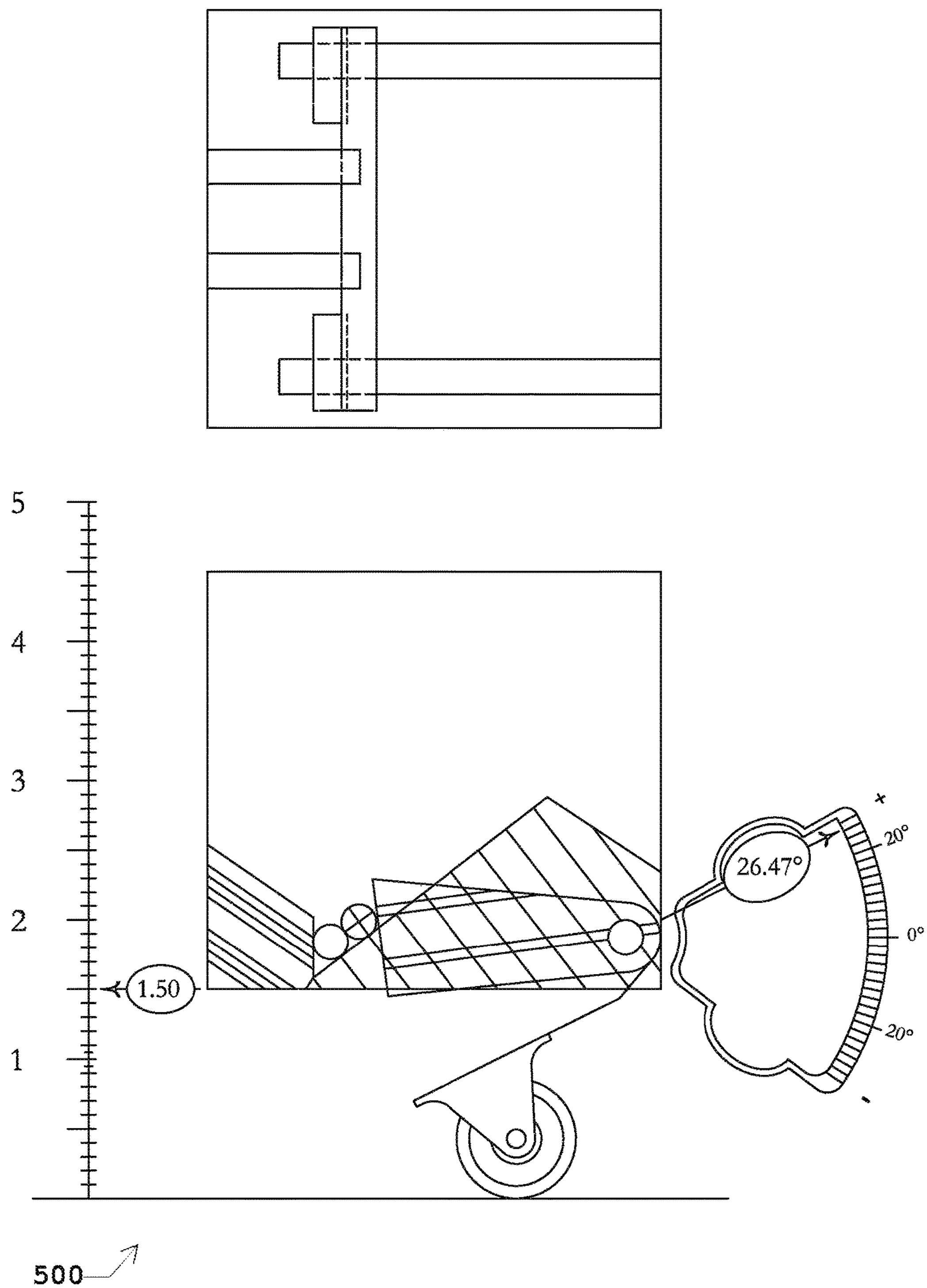
Figure 238:
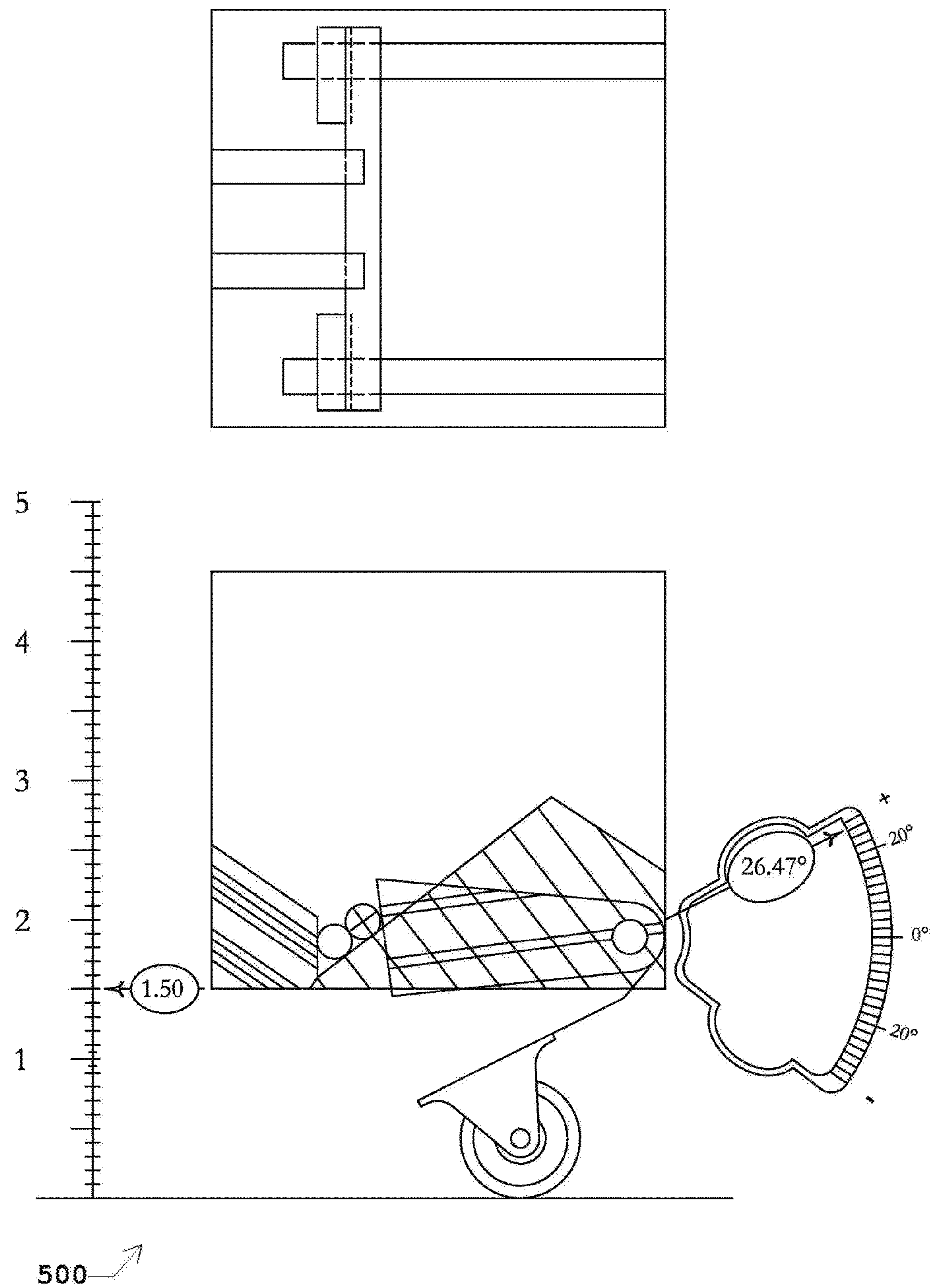
Figure 239:
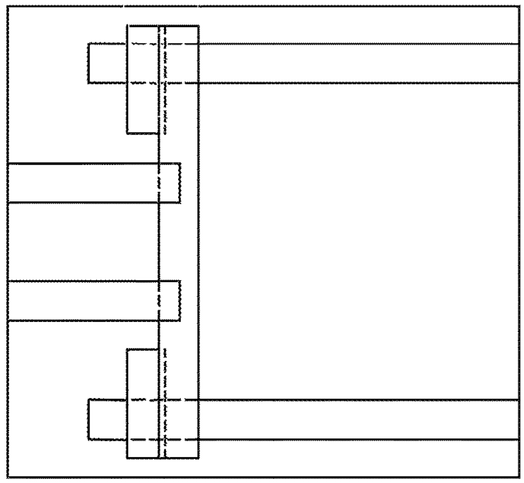
Figure 239:
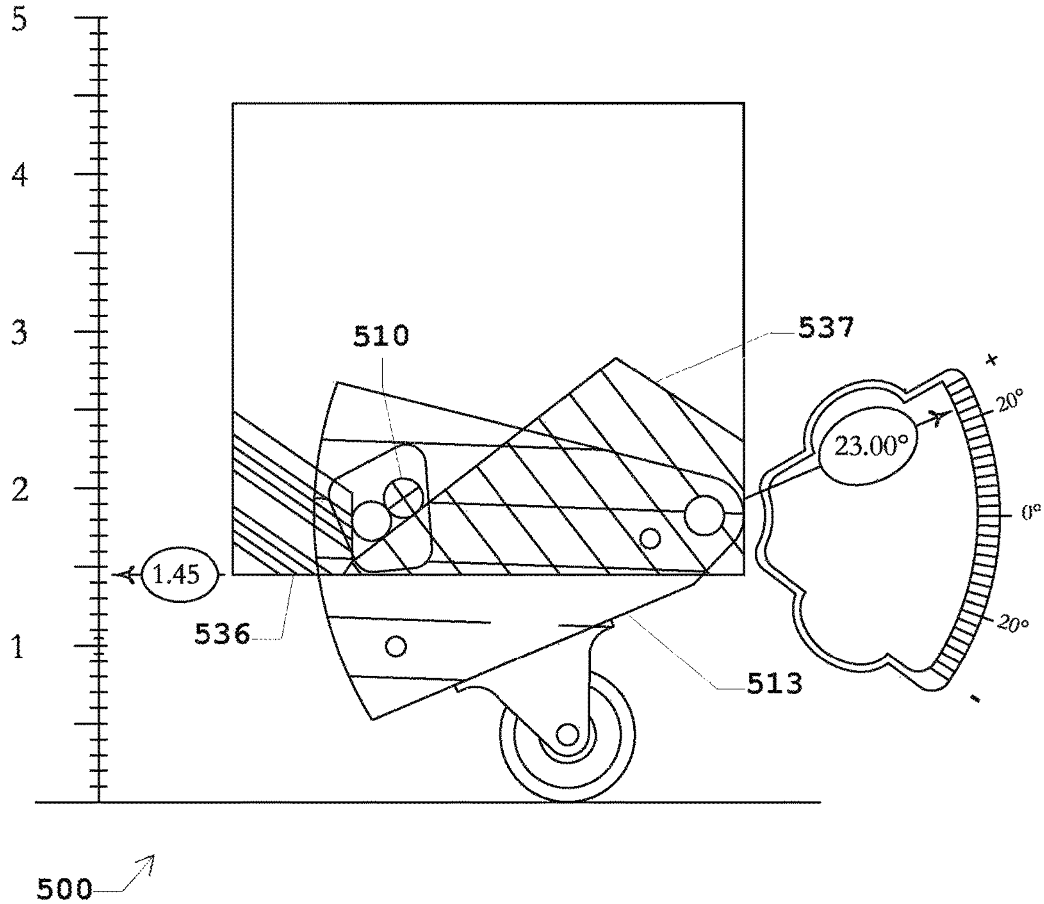
Figure 240:
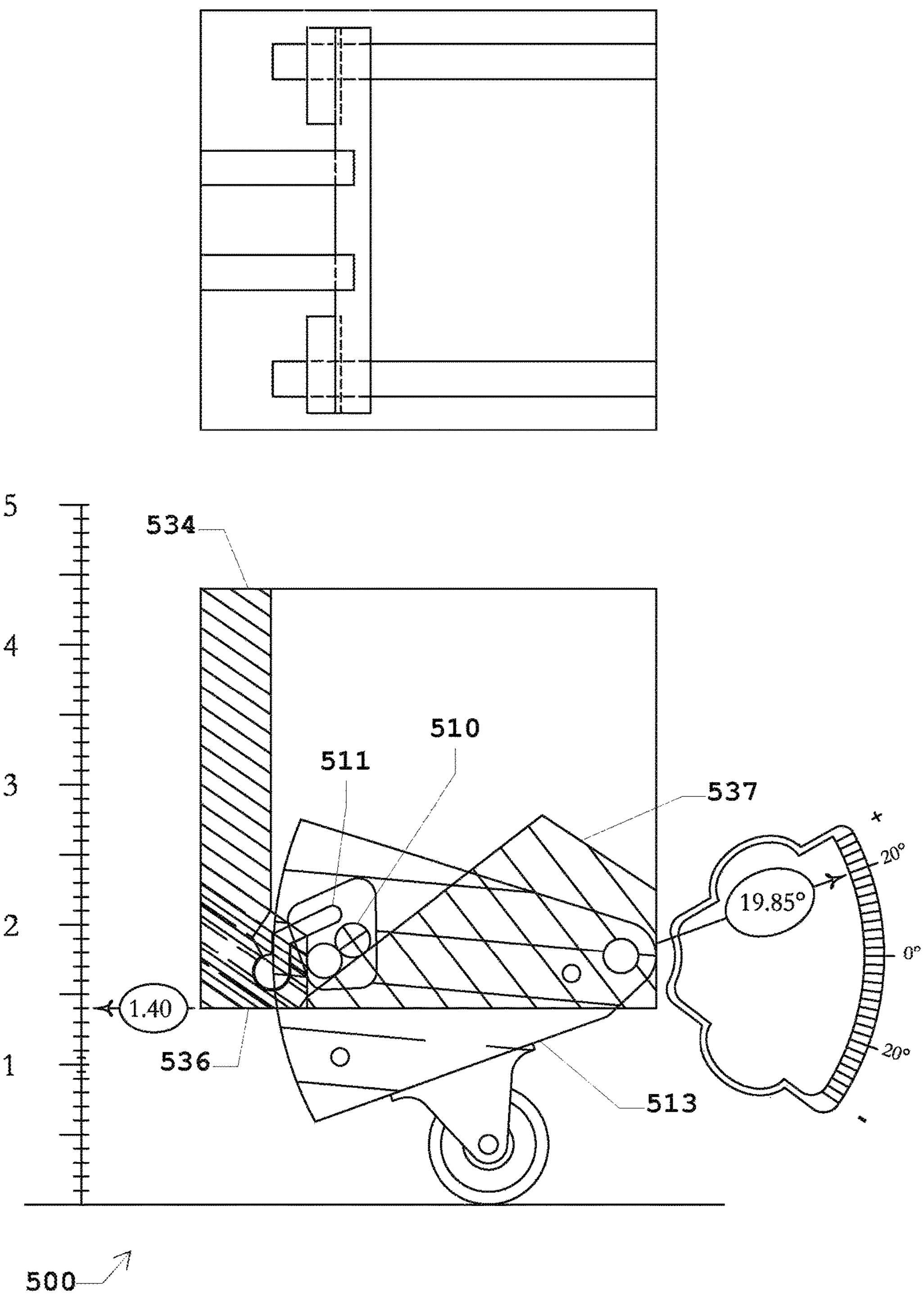
Figure 241:
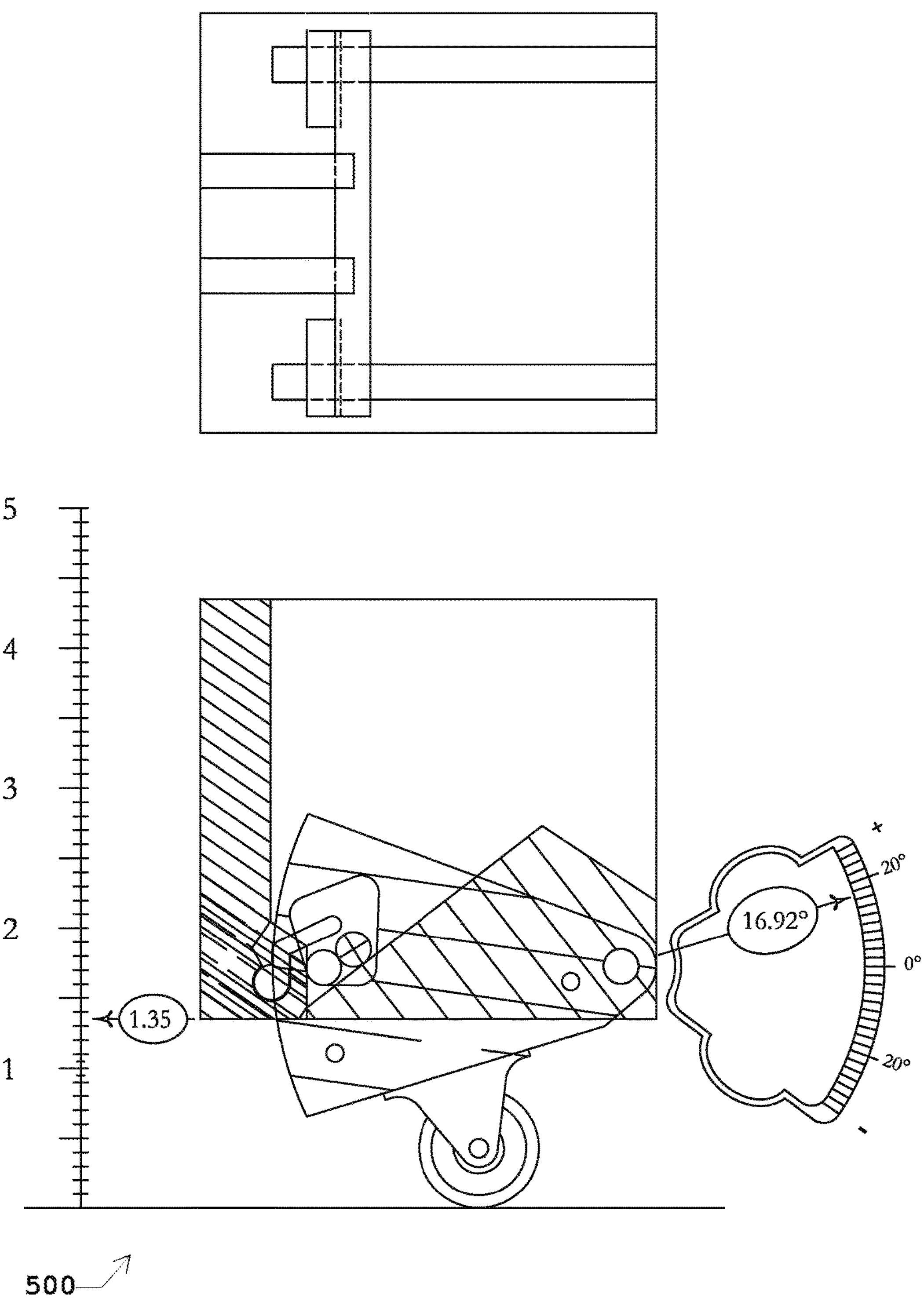
Figure 242:
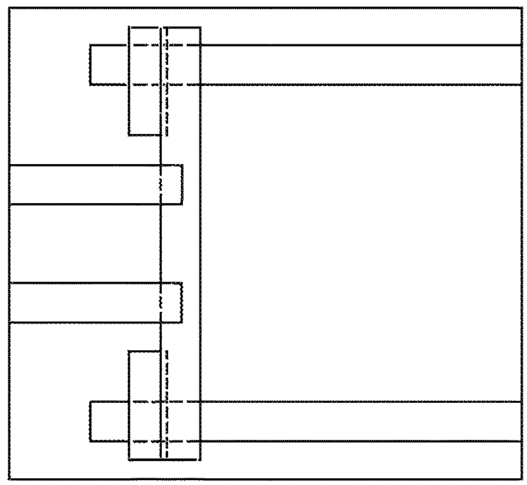
Figure 242:
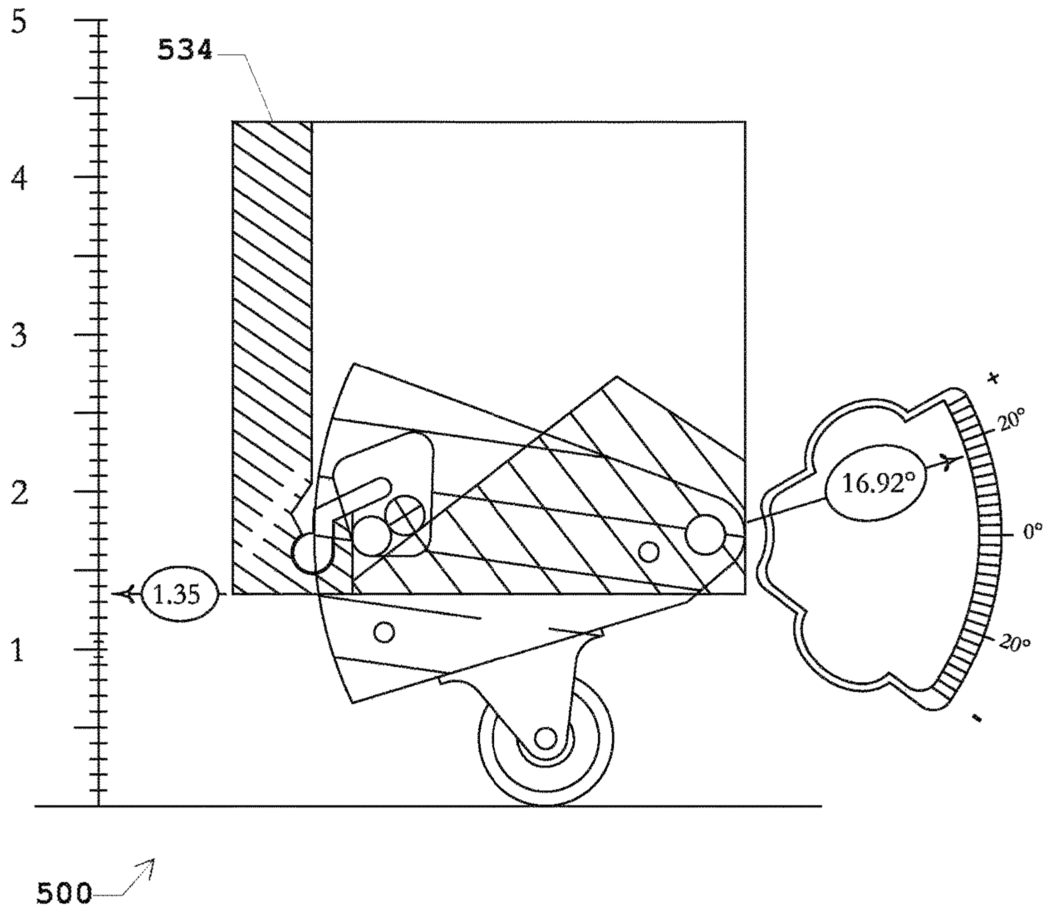
Figure 243:
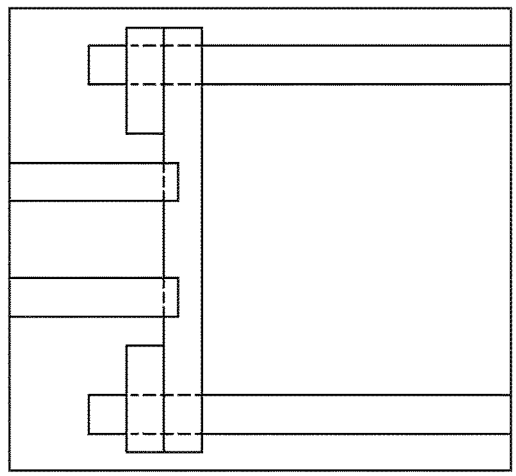
Figure 243:
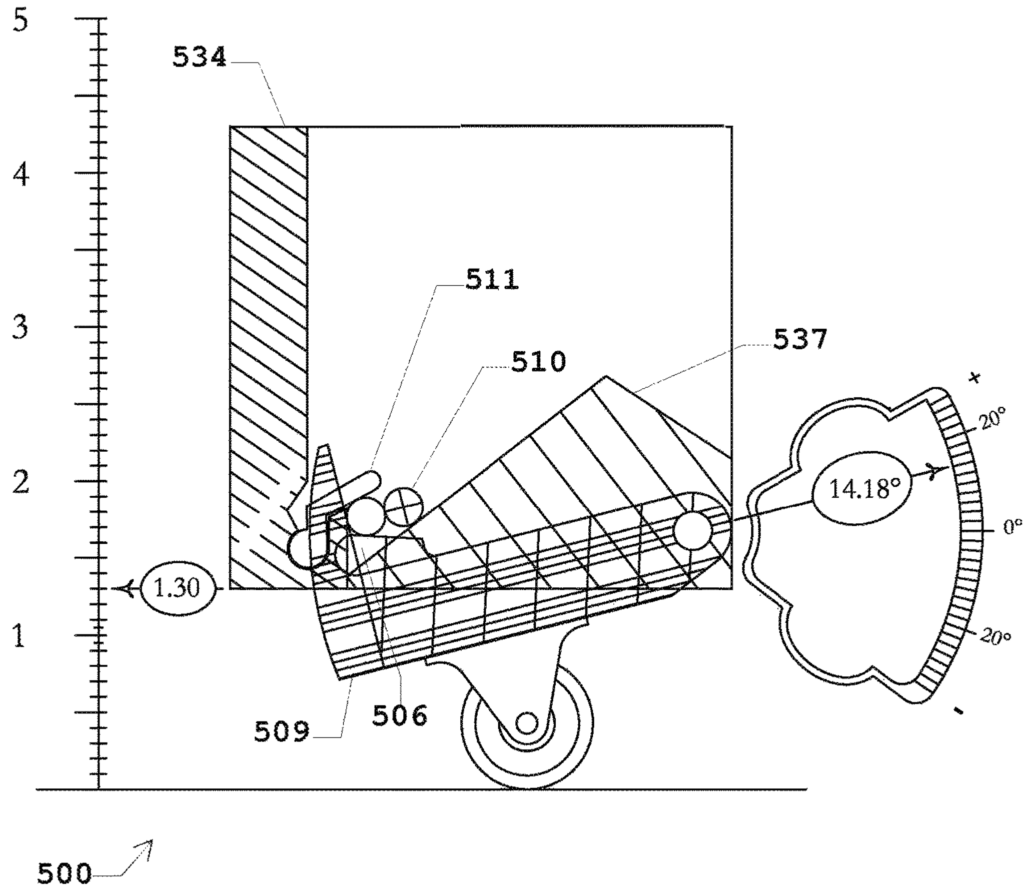
Figure 244:
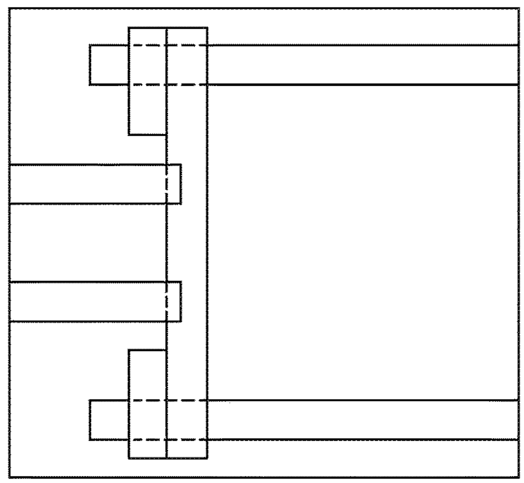
Figure 244:
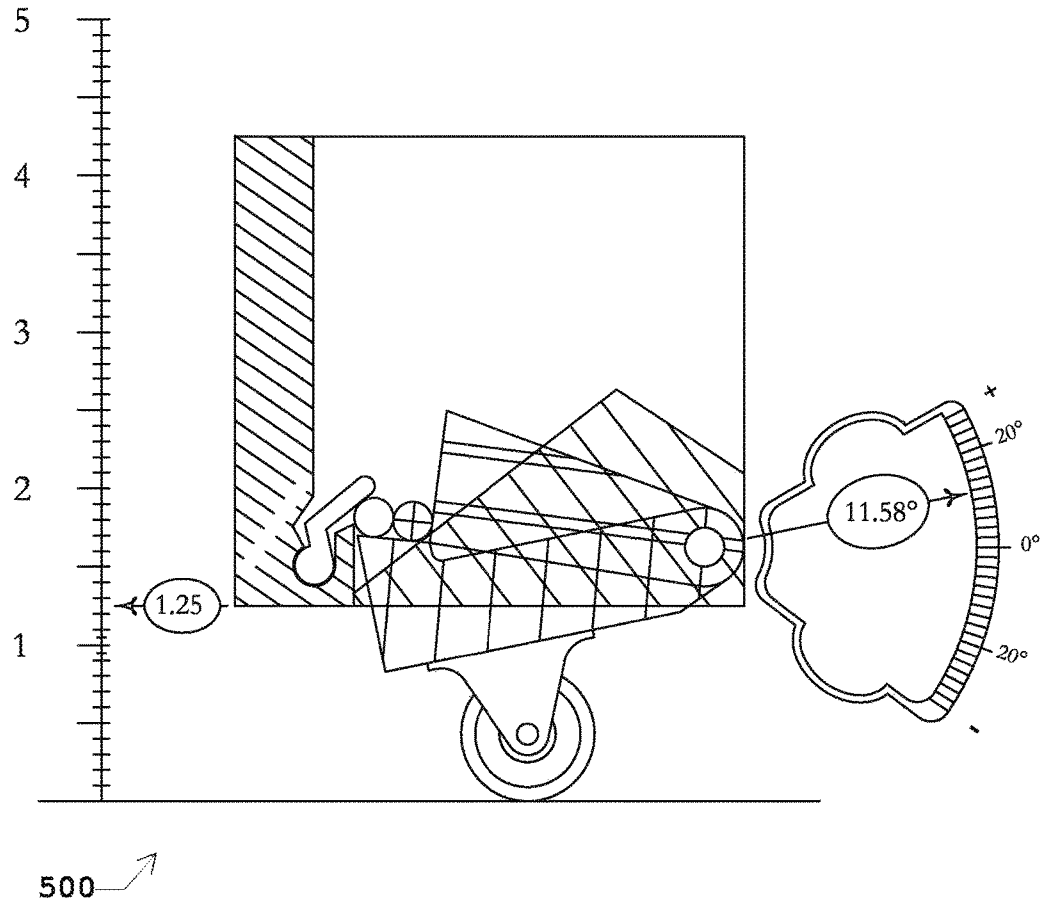
Figure 245:
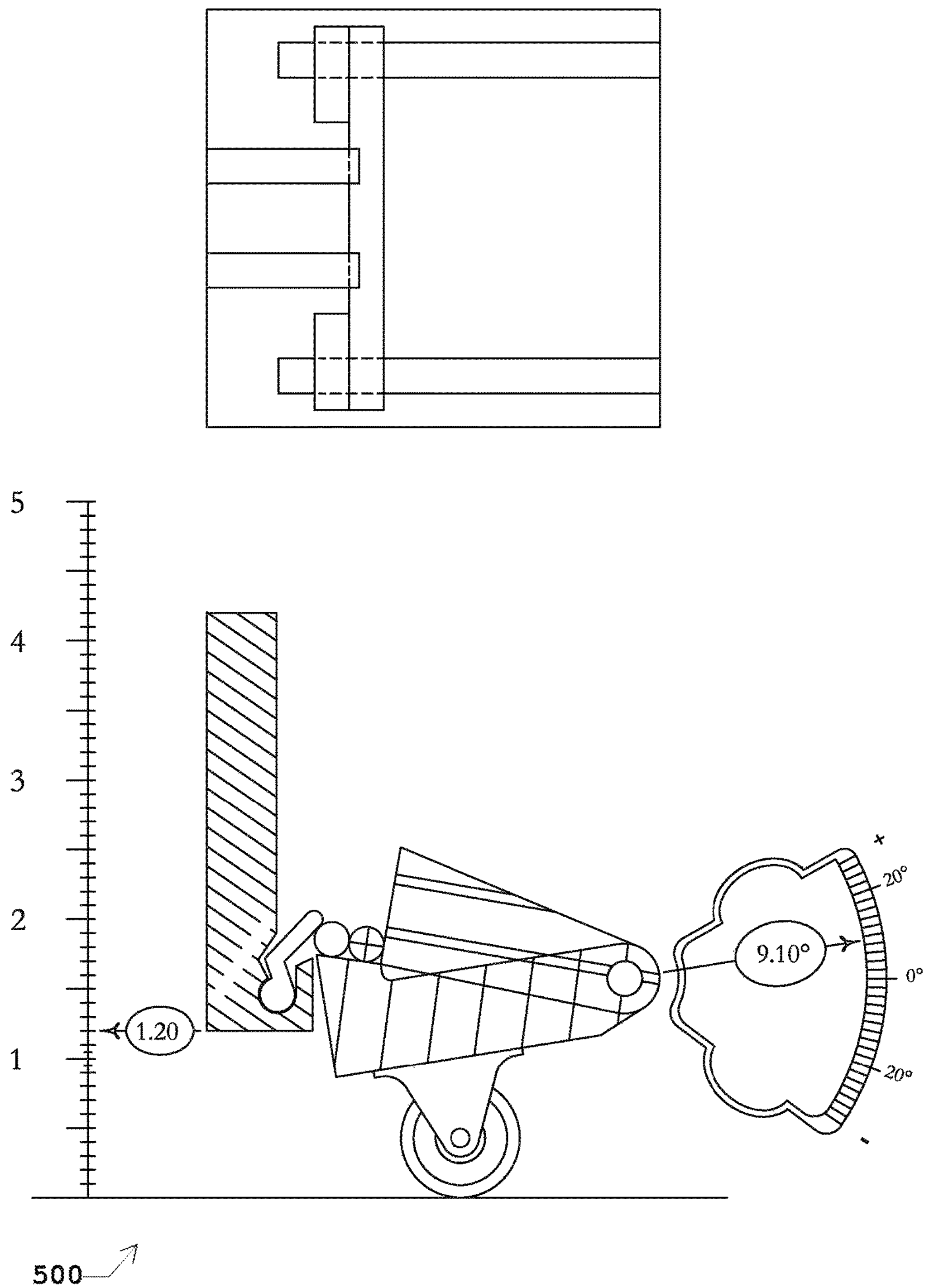
Figure 246:
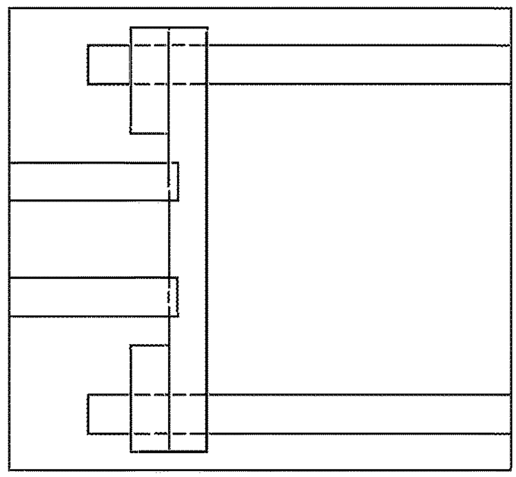
Figure 246:
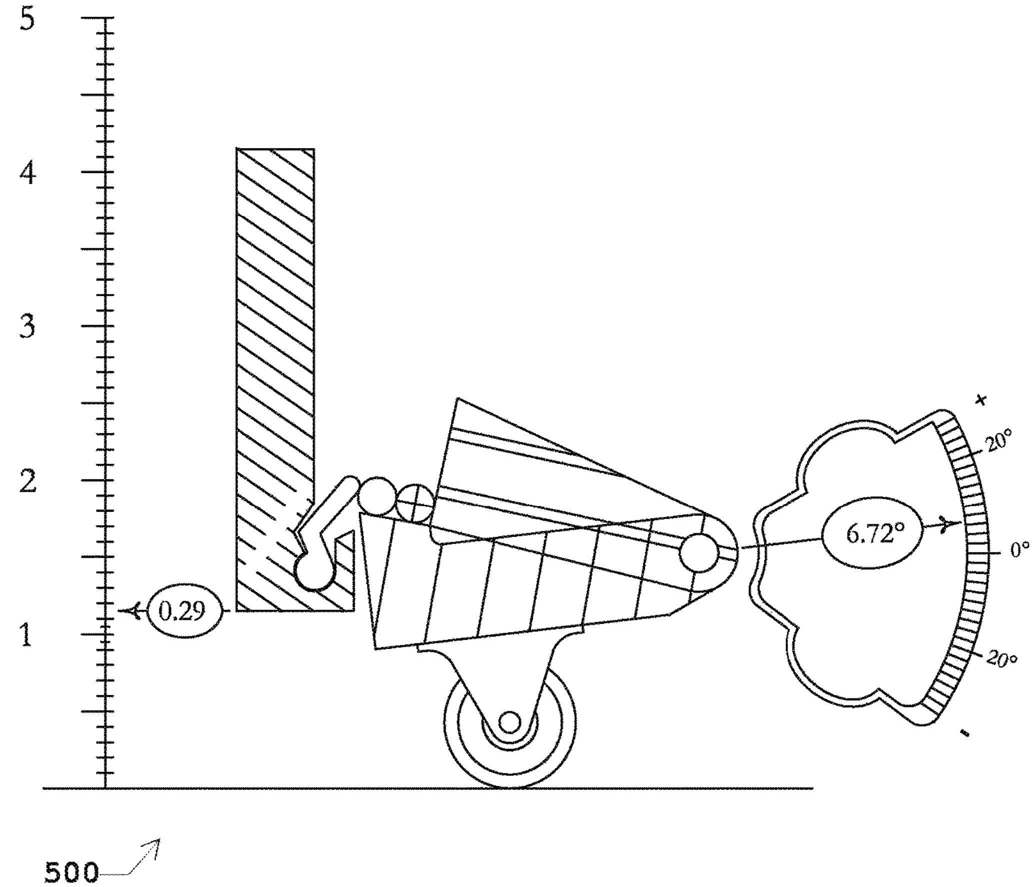
Figure 247:
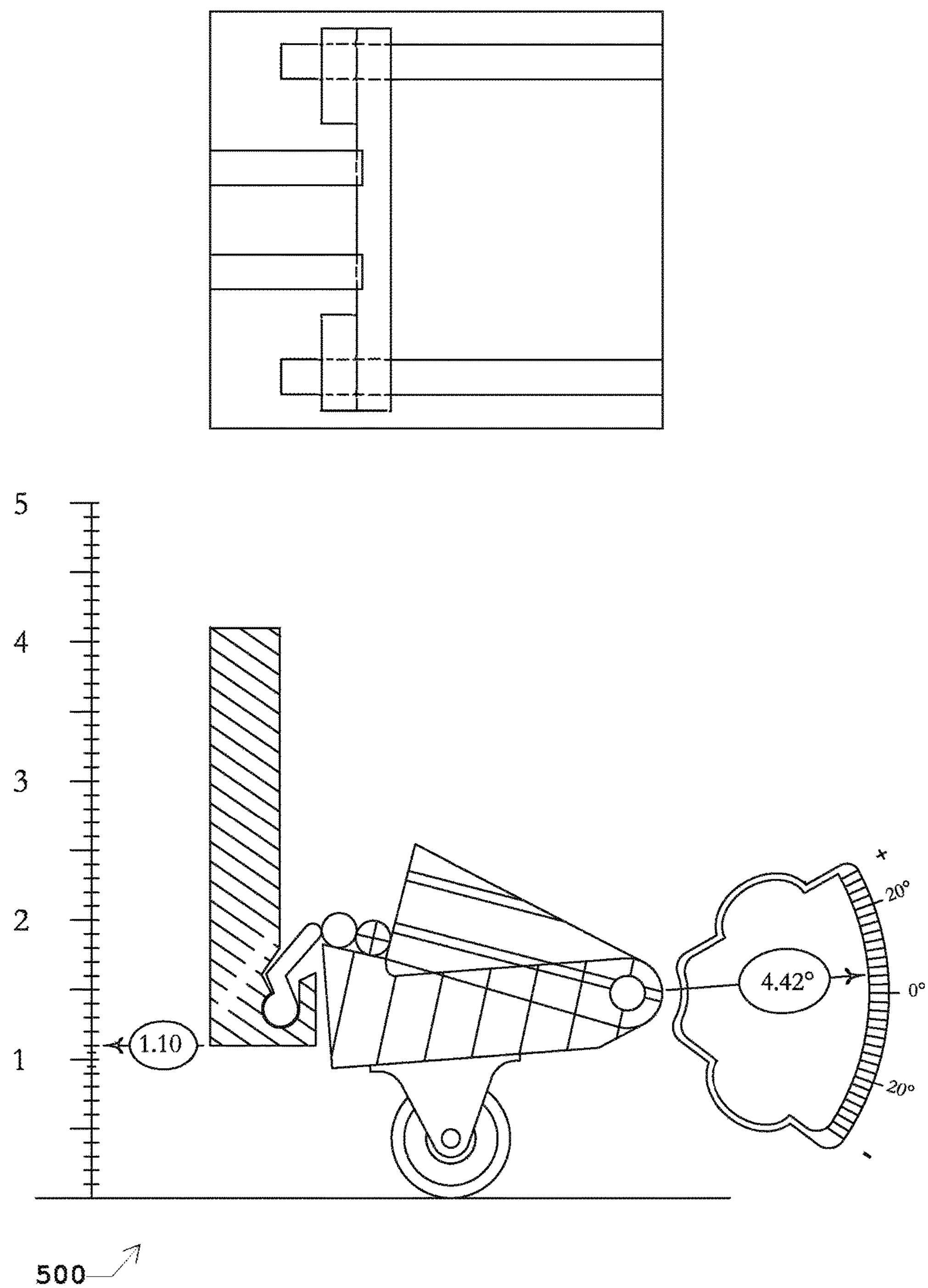
Figure 248:
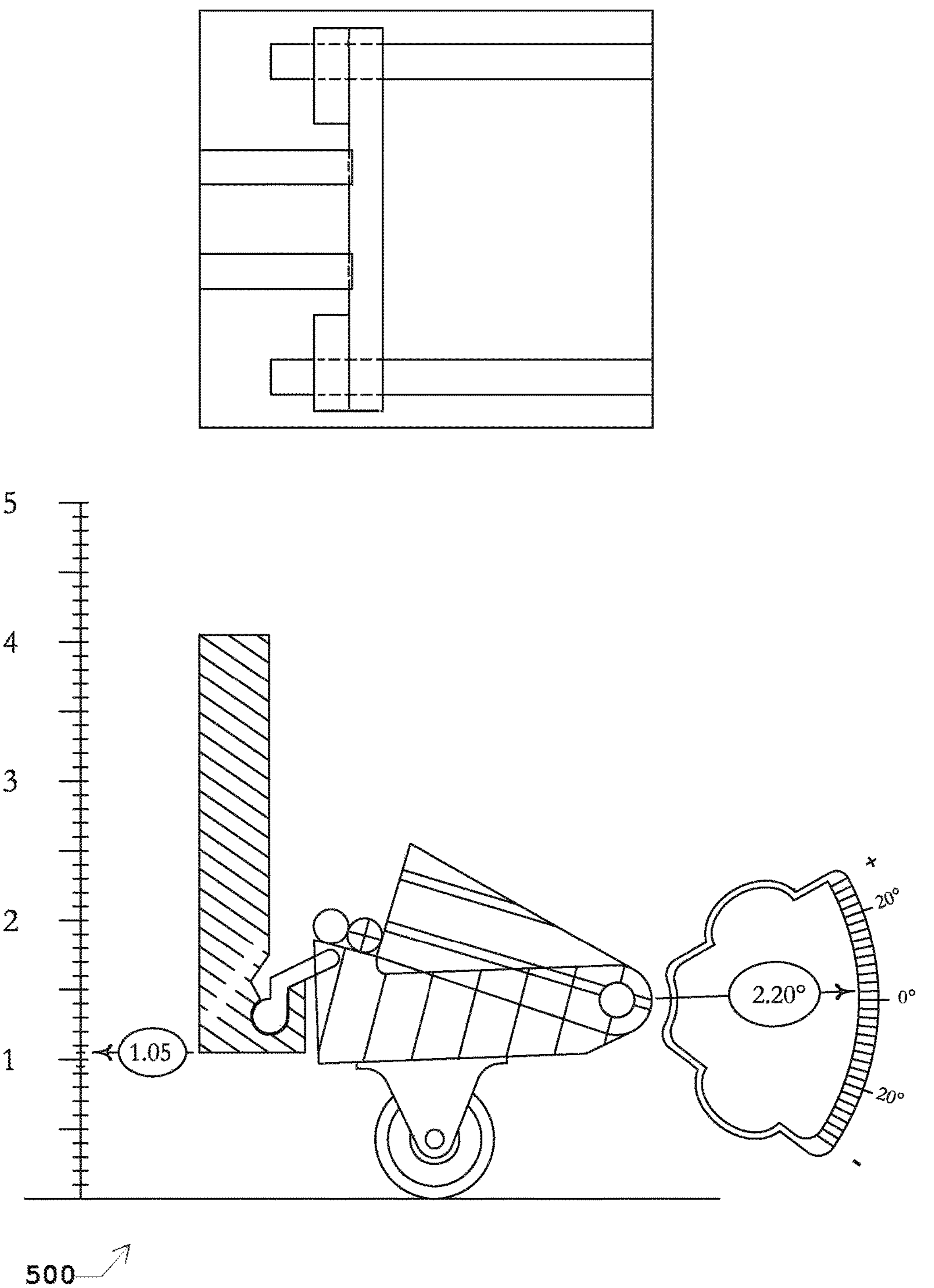
Figure 249:
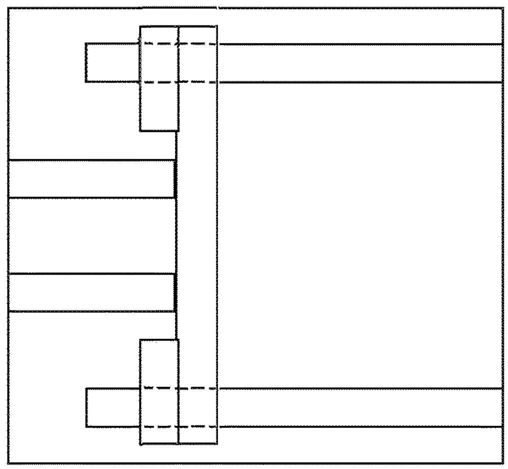
Figure 249:
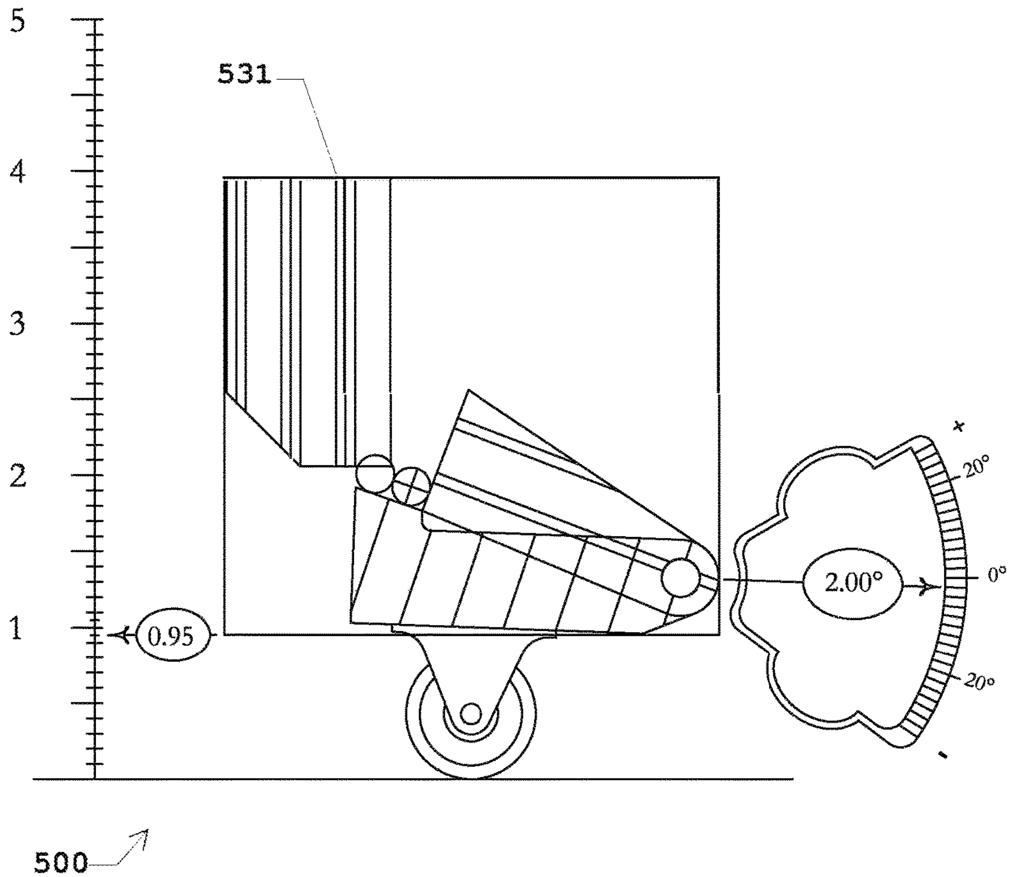
Figure 250:
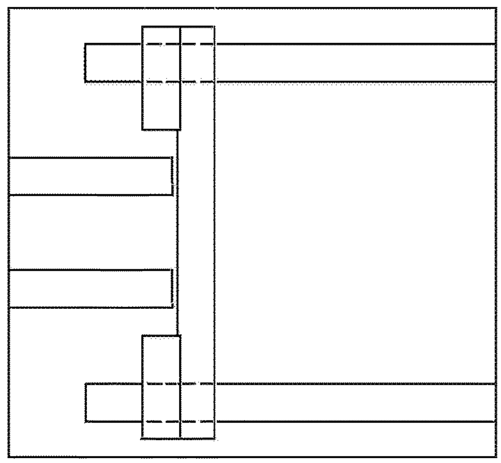
Figure 250:
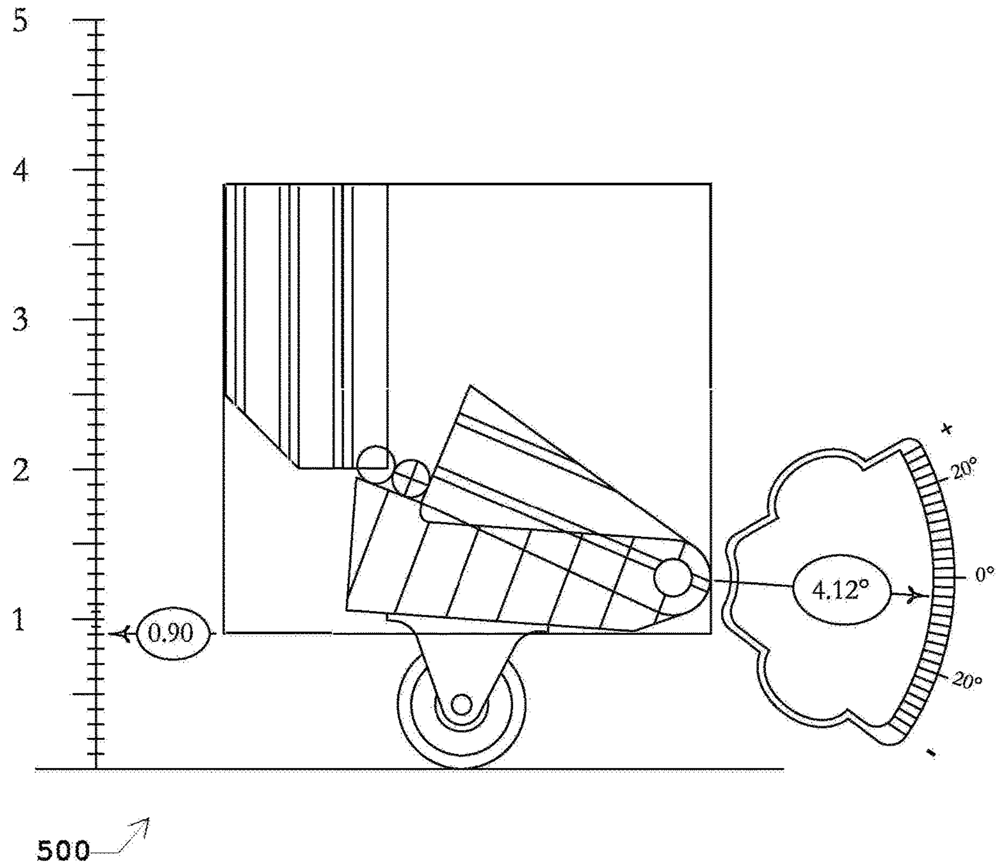
Figure 251:
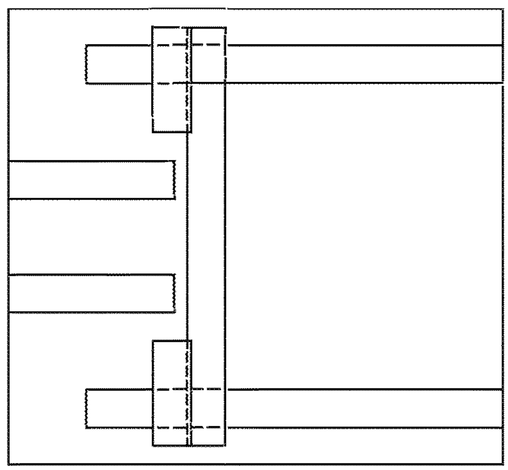
Figure 251:
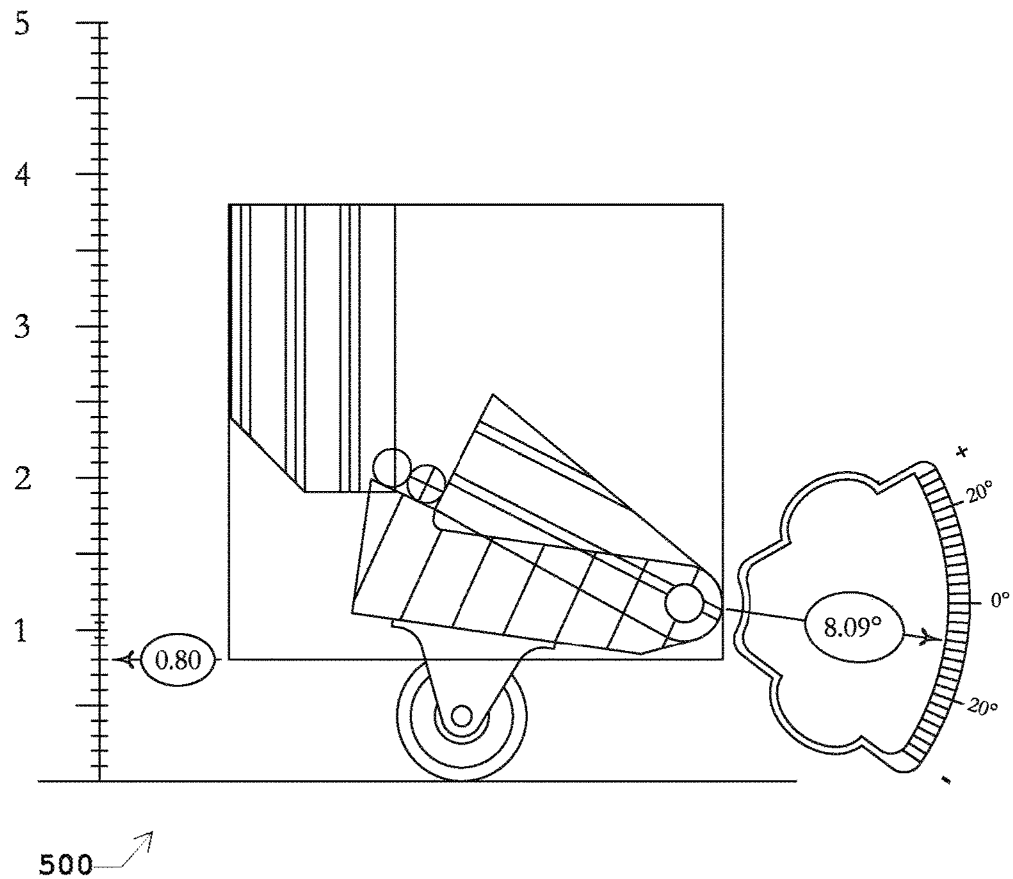
Figure 252:
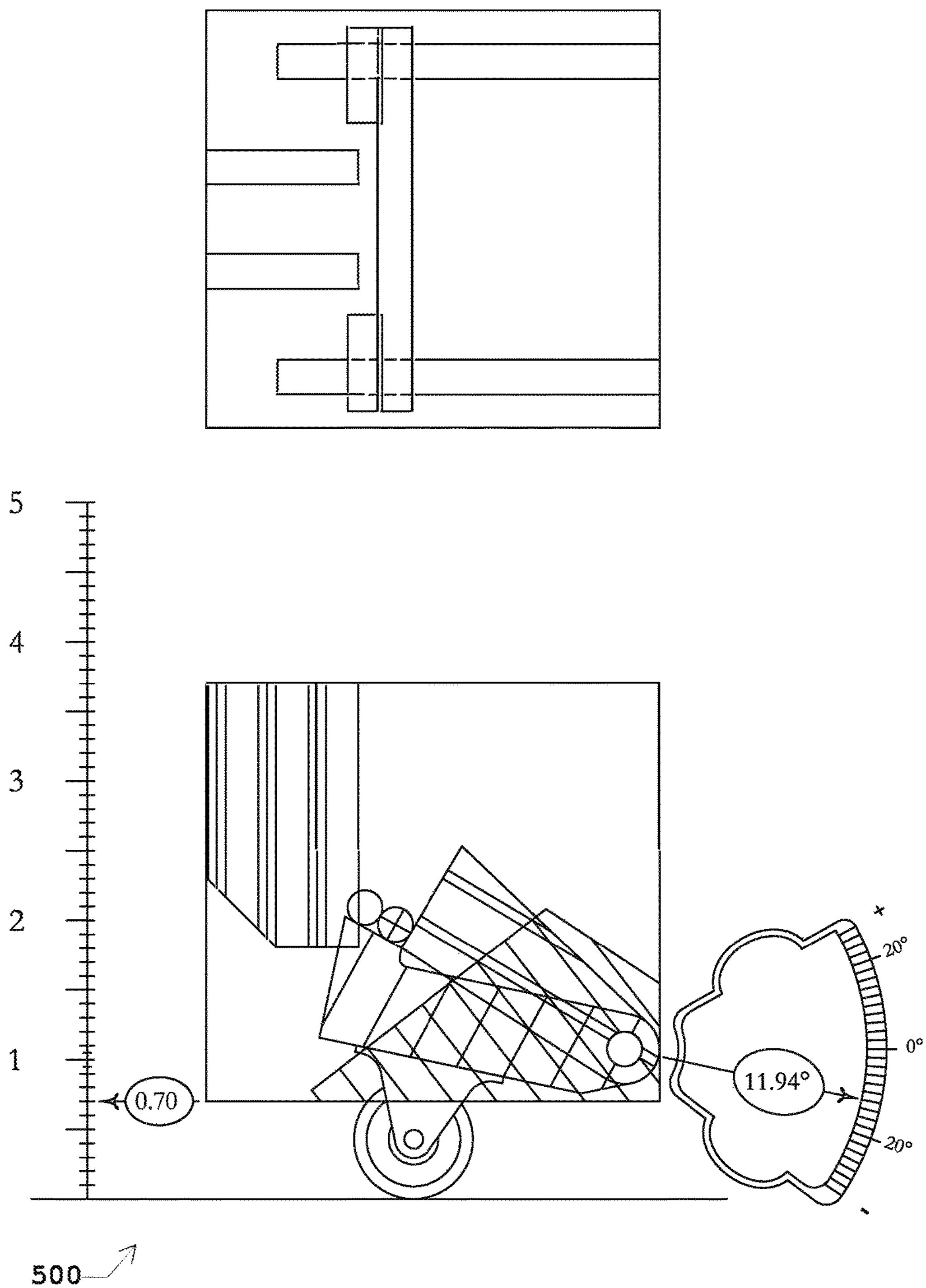
Figure 253:
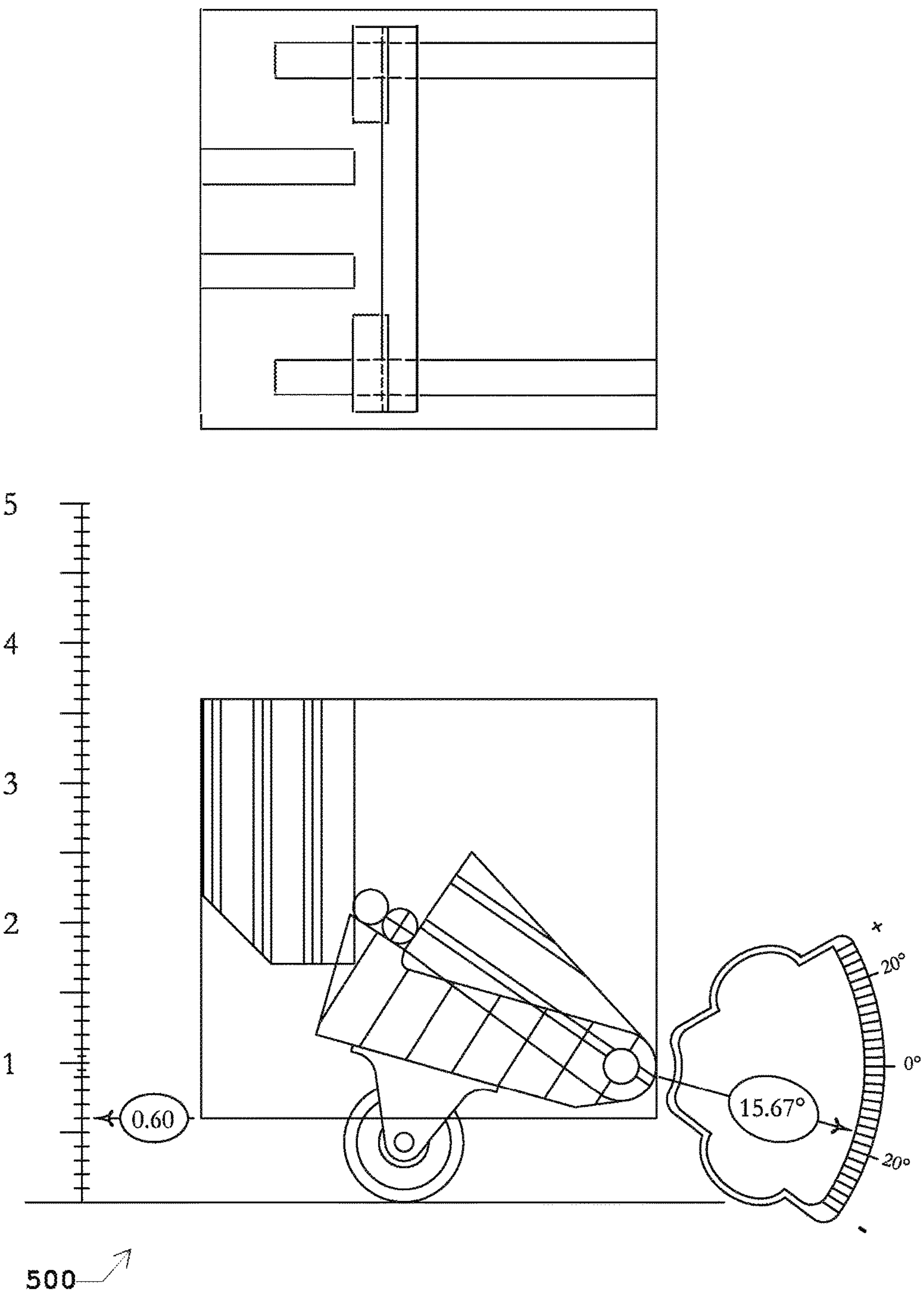
Figure 254:
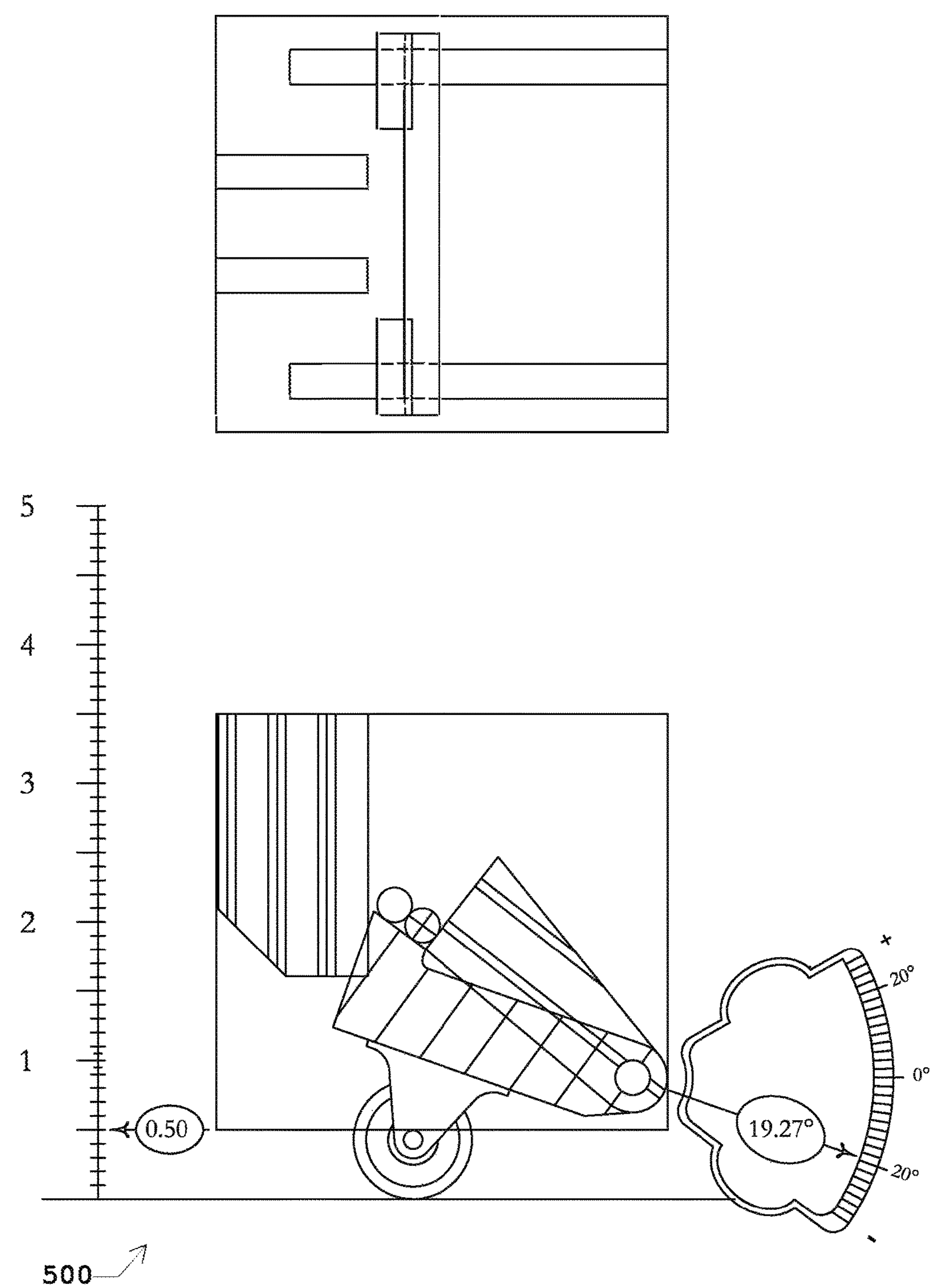
Figure 255:
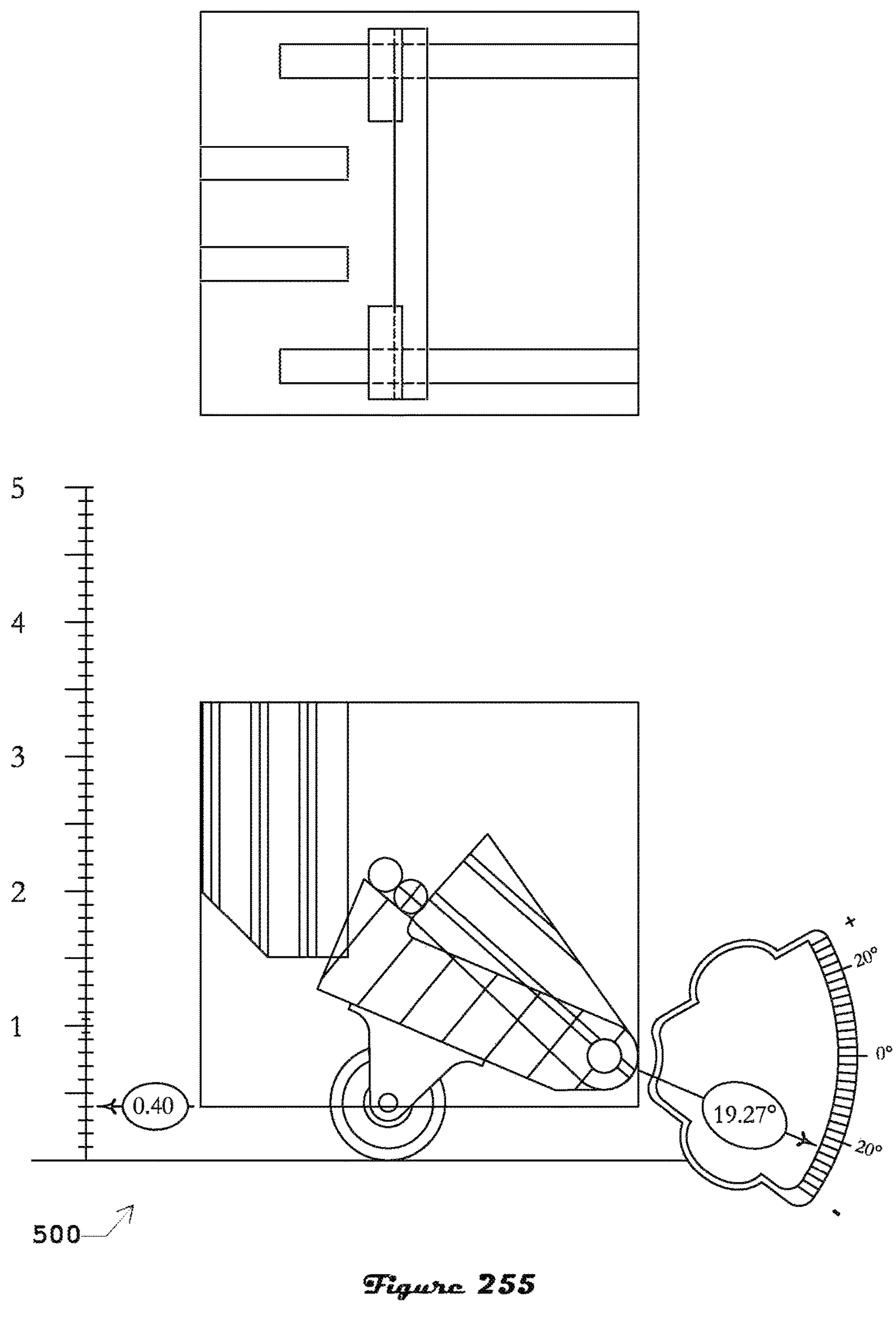
Figure 256:
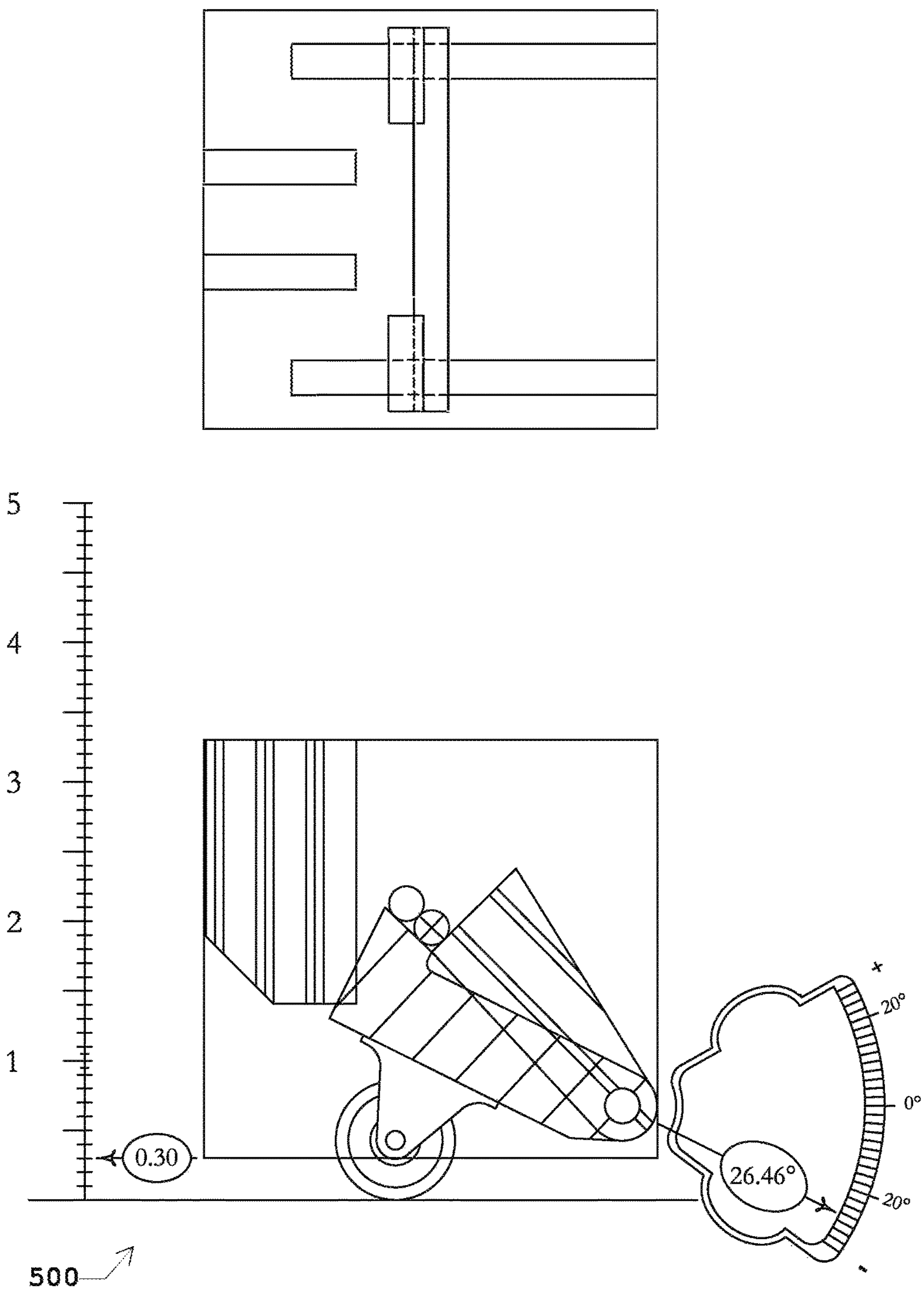
Figure 257:
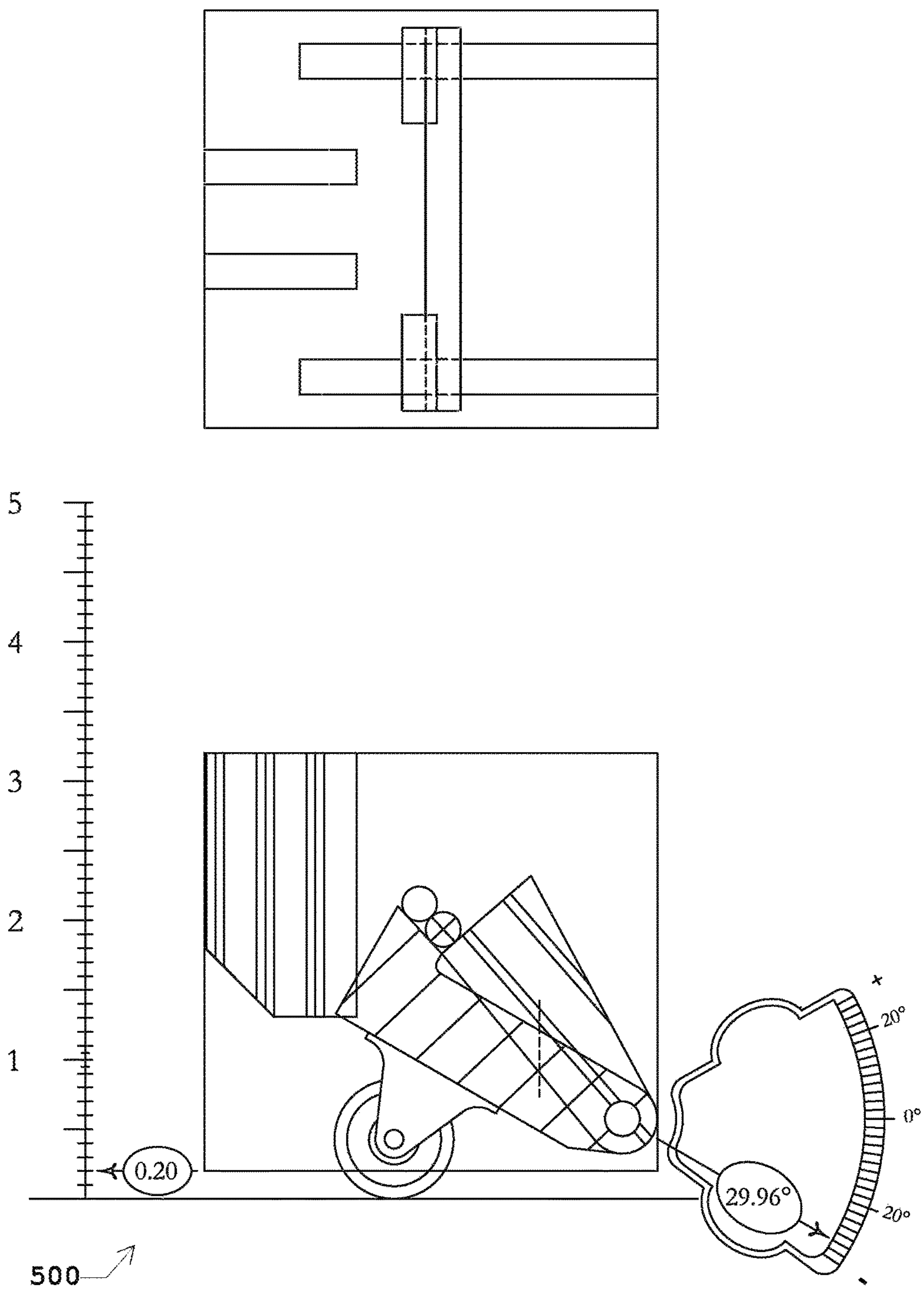
Figure 258:
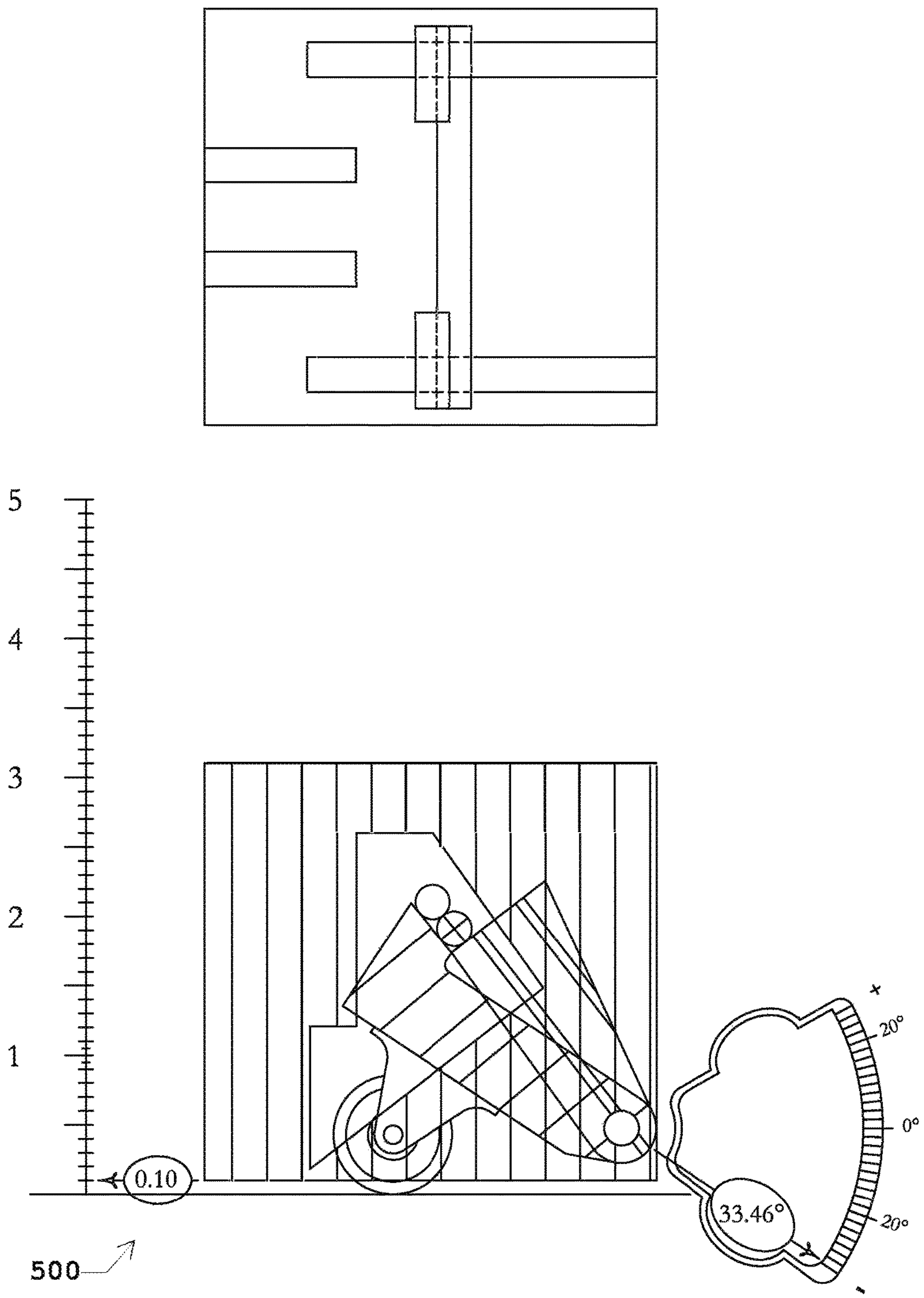
Figure 259:
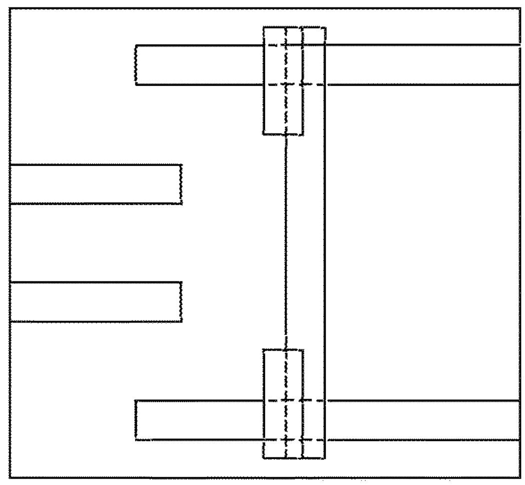
Figure 259:
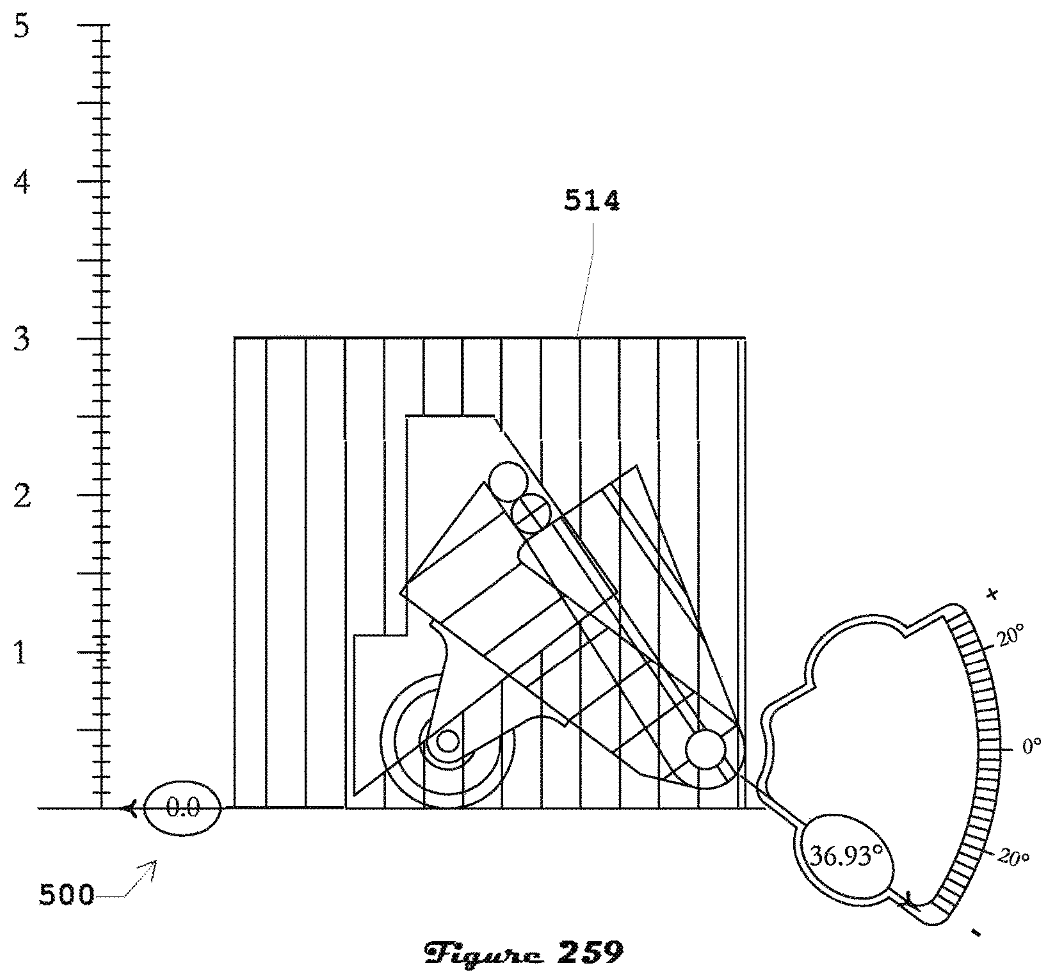

| State | Event | Next State |
|---|---|---|
| One<br>Housing 401 supported by external surface (FIGS. 232 and 234) | a. Raise Housing 401 below where Housing 401 lifts Switch Arm 404 above teeth on Platform 402 (approx. FIG. 192) | One |
| | b. Raise Housing 401 to where Housing 401 lifts Switch Arm 404 above teeth on Platform 402, and release (FIG. 193) | Two |
| | c. Raise Housing 401 above level of event b., but not to limit (FIG. 194, but then raise the Housing 401 until before the entire machine is lifted off of the surface) | Three |
| | d. Raise Housing 401 to limit (FIG. 194, but then continuing to raise the Housing 401, until the entire machine is lifted off of the surface) | Three |
| Two<br>Housing 401 supported by Switch 403, which is supported by Platform 402 | a. Raise Housing 401 below where Housing 401 lifts Switch Arm 404 above teeth on Platform 402 (approx. FIG. 192) | Two |
| | b. Raise Housing 401 to where Housing 401 lifts Switch Arm 404 above teeth on Platform 402, and release (FIG. 193) | One |
| | c. Raise Housing 401 above level of event b., but not to limit (FIG. 194, but then raise the Housing 401 until before the entire machine is lifted off of the surface) | Four |
| | d. Raise Housing 401 to limit (FIG. 194, but then continuing to raise the Housing 401, until the entire machine is lifted off of the surface) | Four |
| Three<br>Housing 401 supported by external force; Housing 401 supports Switch 403; next State when Housing 401 is lowered will be Two | d. Raise Housing 401 to limit (FIG. 194, but then continuing to raise the Housing 401, until the entire machine is lifted off of the surface) | Three |
| | f. Lower Housing 401 to contact external surface (FIGS. 232 and 234) | Two |
| Four<br>Housing 401 supported by external force; Housing 401 supports Switch 403; next State when Housing 401 is lowered will be One | d. Raise Housing 401 to limit | Four |
| | f. Lower Housing to contact external surface (FIGS. 178 and 217) | One |

States Three and Four in the foregoing require an external force to support the Housing (such as a human, a fork lift, a crane, or similar). When the external force is removed following the event, then State Three transitions to State Two and State Four transitions to State One. If events which do not pass a point-of-no-return are removed, and if transitional States Three and Four reflect their ultimate state, after the external lifting force is removed, then the table of states and events is reduced to the following:

TABLE EIGHT

| State | Event | Next State |
|---|---|---|
| One | b. | Two |
| One | c. | Two |
| One | d. | Two |
| Two | b. | One |
| Two | c. | One |
| Two | d. | One |

In the foregoing, when the machine is in State One, three events, Event b, c, and d, can transition the machine to State Two. In the foregoing, when the machine is in State Two, three events, Event b, c, and d, can transition the machine to State One. Events b, c, and d are points of no return.

FIGS. 218 to 260 illustrate a Fifth Embodiment 500 of a kinematic finite state machine, in which the first and second bodies are connected at an axle, in which there are two Switches, 510 and 511, neither of which has a single round vertical cross section, and show the states and events of this embodiment of the finite state machine as the first body moves.

Figure 218:
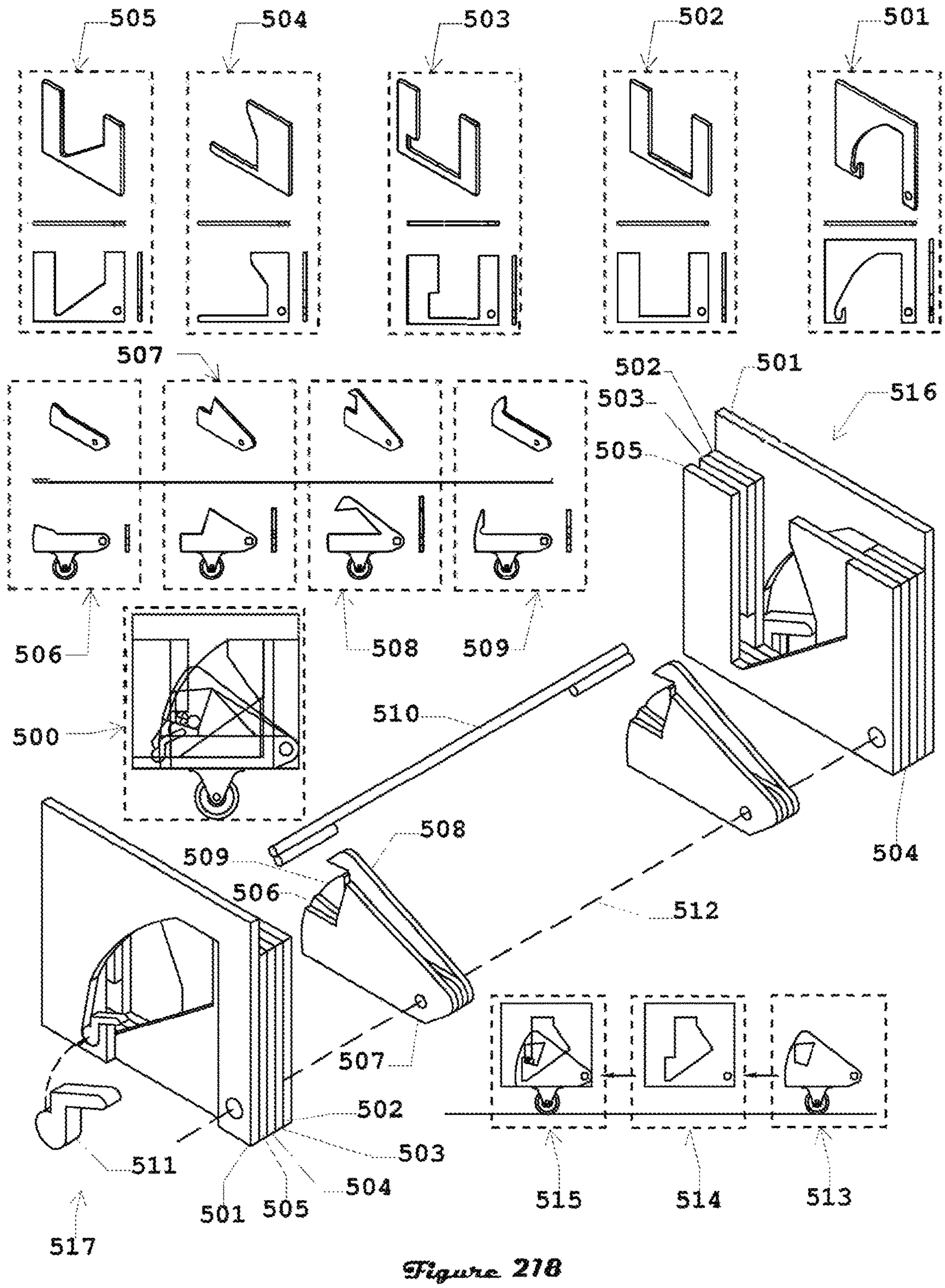
FIGS. 218 to 260 illustrate a Fifth Embodiment of a kinematic finite state machine, in which the first and second bodies are connected at an axle, in which there are two switches, neither of which has a round vertical cross section, and show the states and events of this embodiment of the finite state machine as the first body moves.
Figure 219:
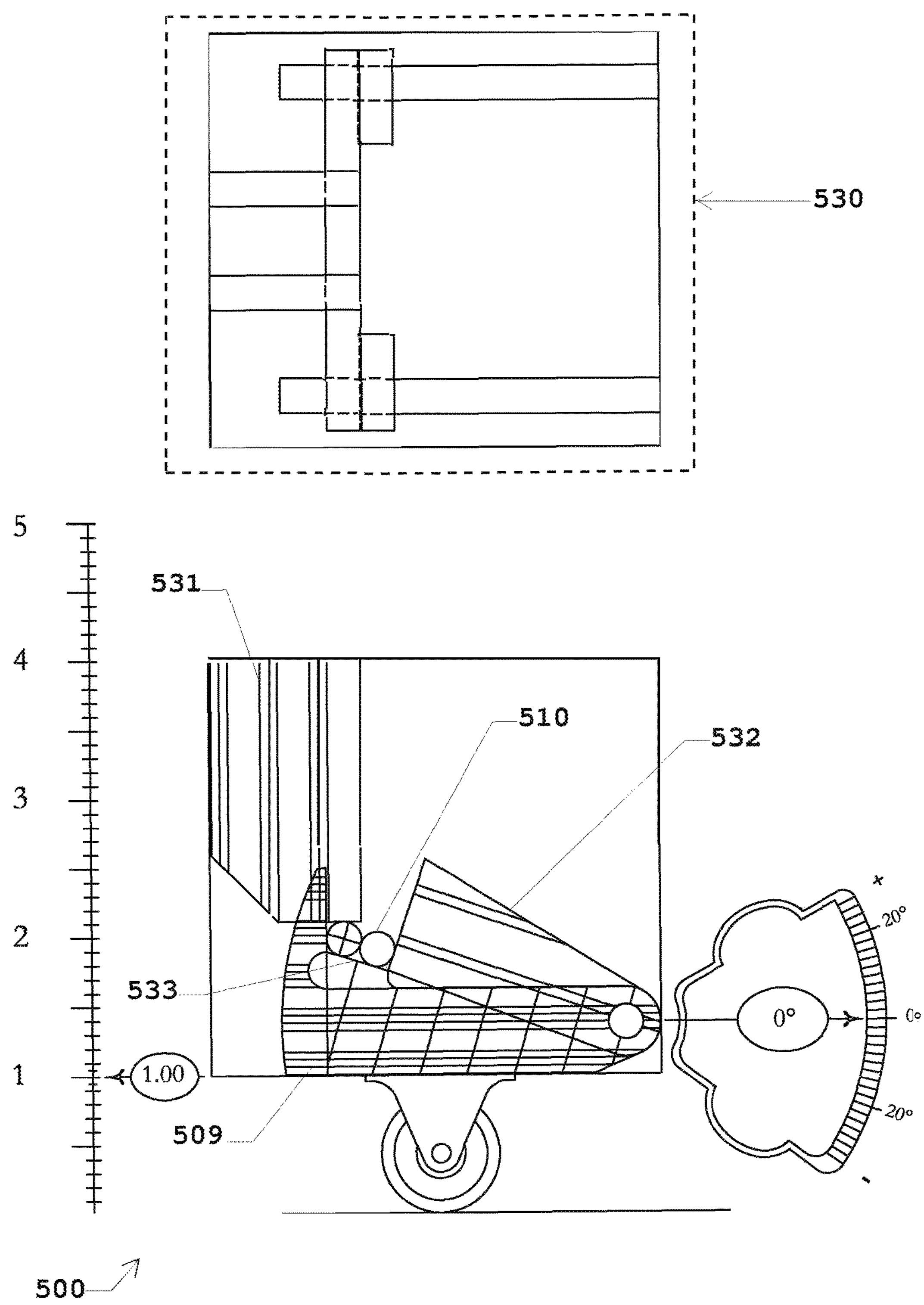
Figure 220:
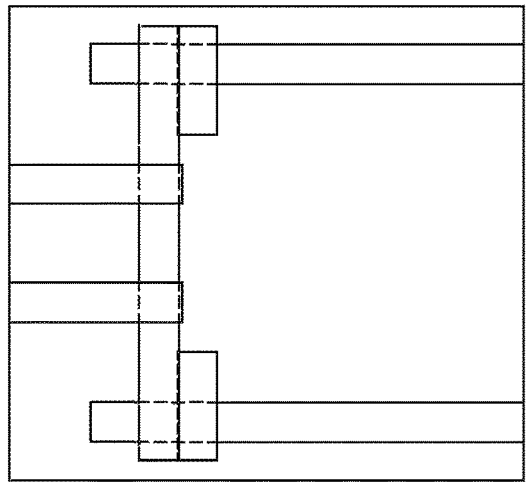
Figure 220:
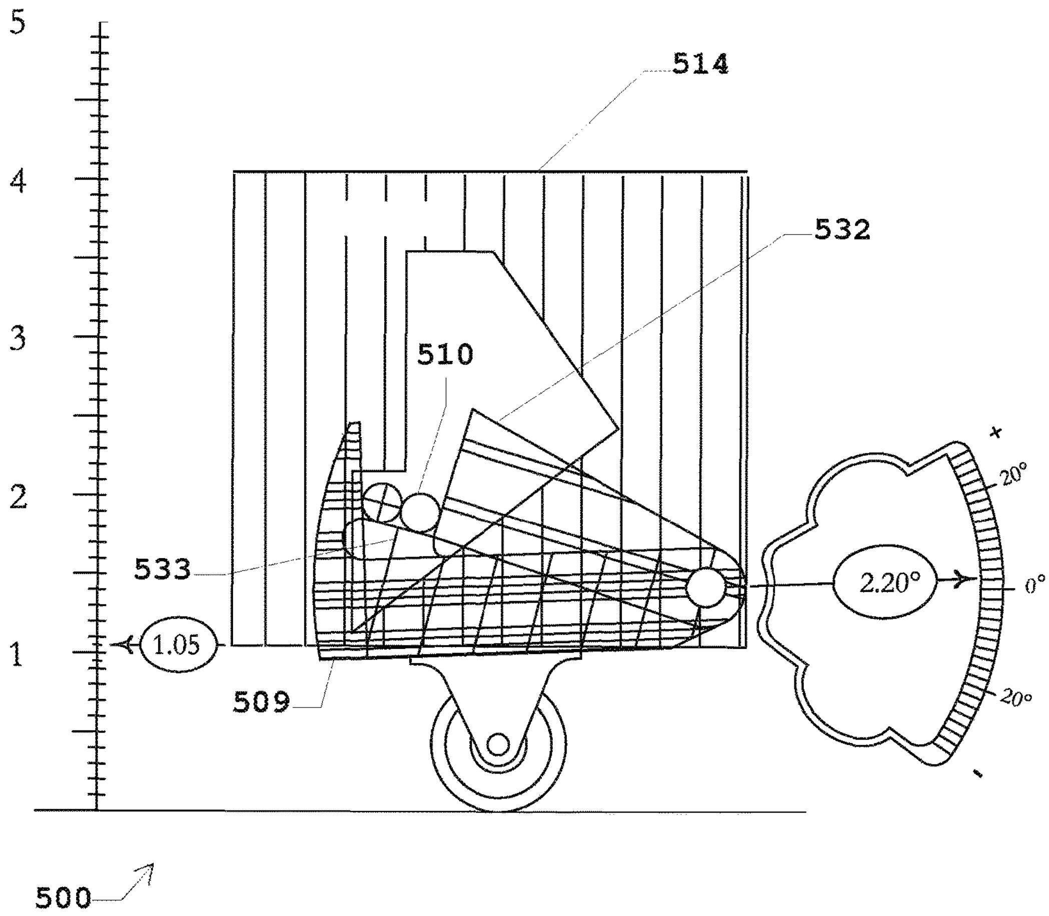
Figure 221:
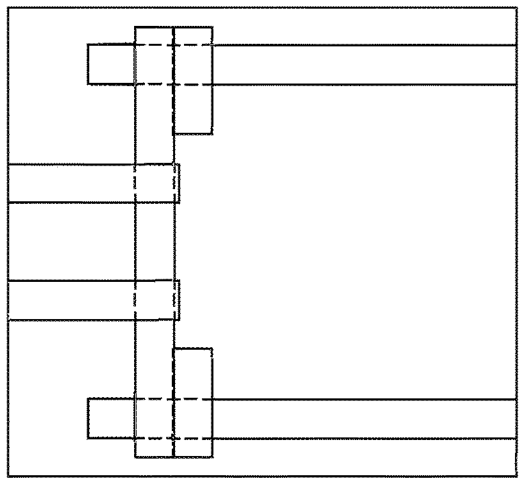
Figure 221:
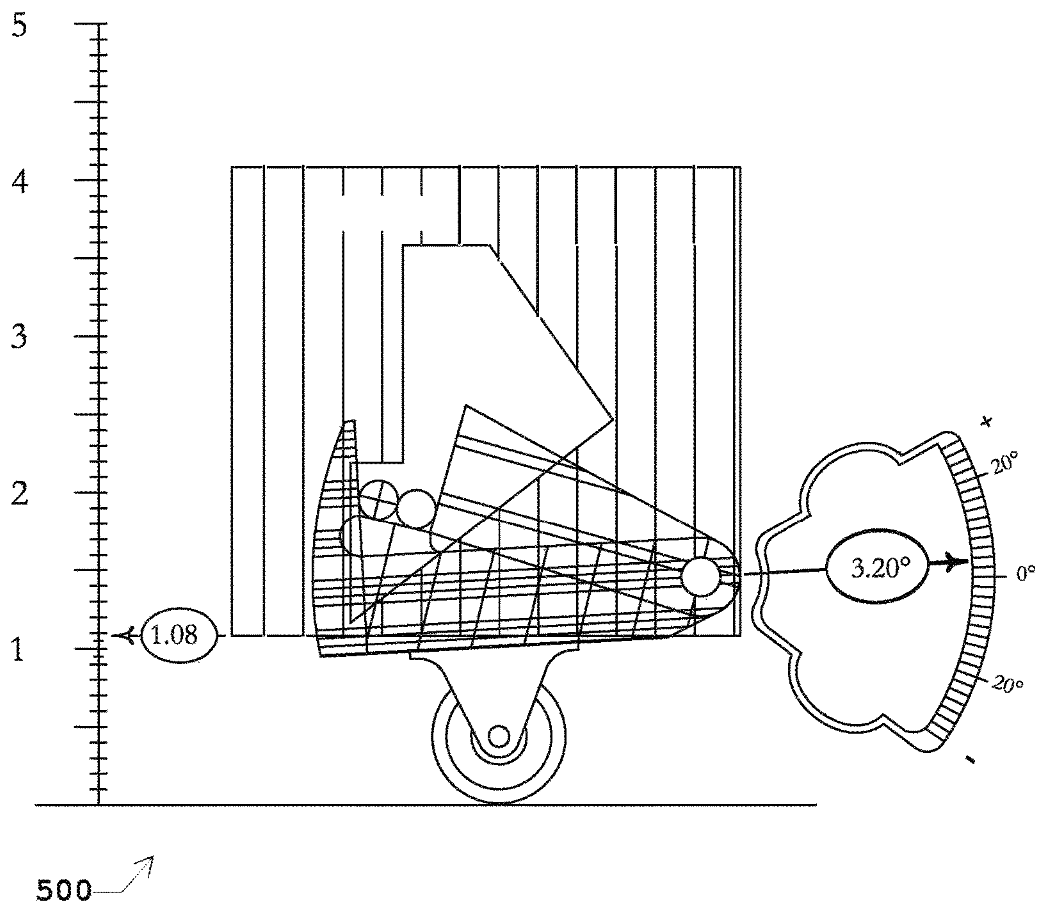
Figure 222:
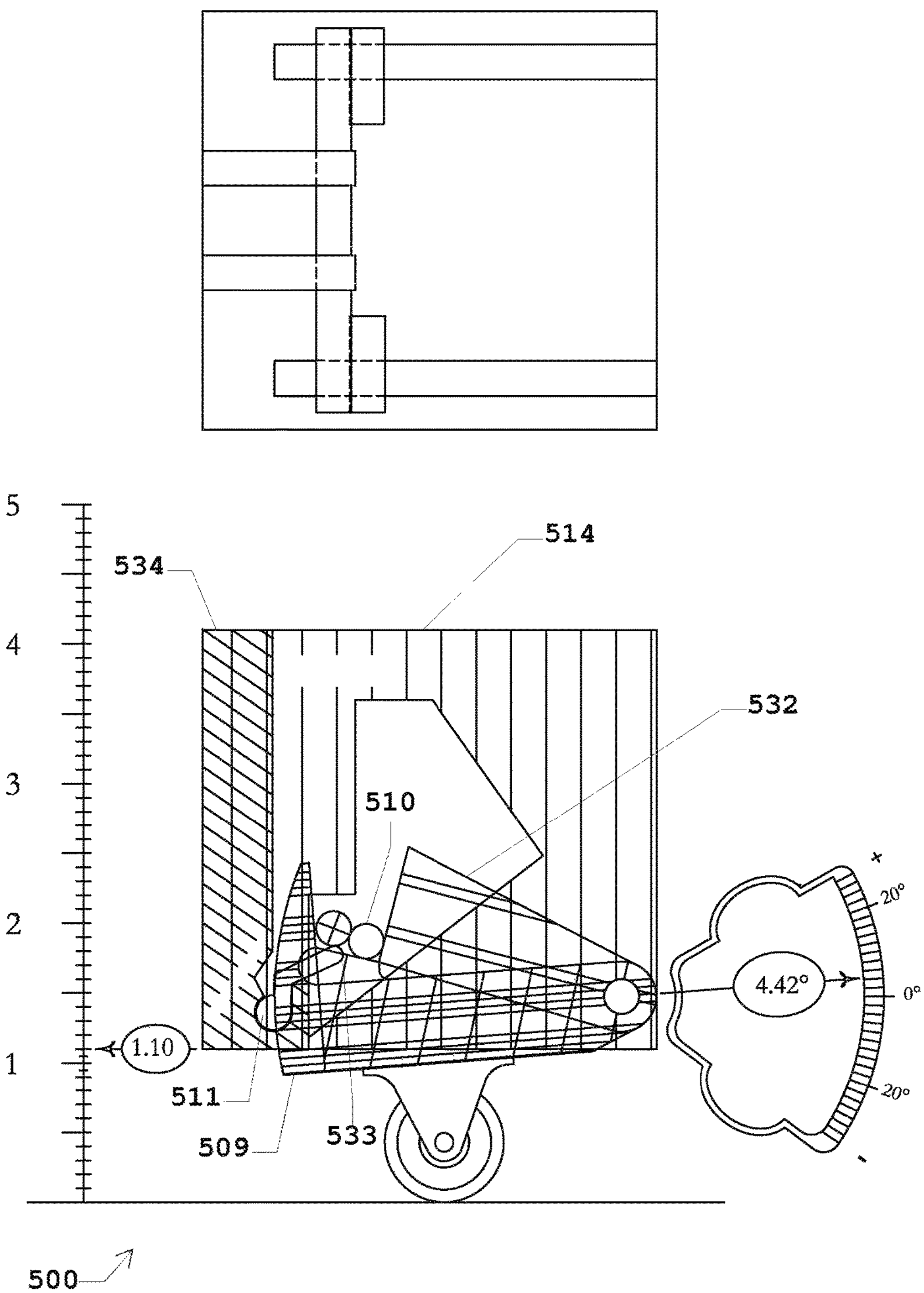

In FIG. 218, plates 501-505 illustrate Housing components. Elements 516 and 517 illustrate assembly of these Plates into Housing 516 and 517; note: the stacking order of Plates in Housing 516 is not the same as the stacking order of Plates in Housing 517. A side elevation of both Housings is illustrated in box 514 (not including the Switches and omitting Housing Plate 501).

In FIG. 218, plates 506-509 illustrate Platform components. A side elevation of both Platforms (and an accessory) is illustrated in box 513. Box 515 illustrates a side elevation of both Platforms and Housings, assembled around axle 512.

In FIG. 218, elements 510 and 511 are Switches.

Within FIGS. 218 to 260, FIGS. 219 to 259 show the states and events of the Fifth Embodiment 500 of the finite state machine as the first body moves. In these Figures, box 530 shows a schematic view of interaction of Switch 510 with components of Housing and Platform. Box 530 is not separately labeled in FIGS. 219 to 259, but can be seen in a consistent position within these Figures. In FIGS. 219 to 259, element 531 is a portion of Housing Plate 503; element 532 is a portion of Platform Plate 507; element 533 is a portion of Platform Plate 506; element 534 is a portion of Housing Plate 501; element 535 is a portion of Housing Plate 505; element 536 is a portion of Housing Plate 502; element 537 is a portion of Platform Plate 507; element 538 is a portion of Platform Plate 508; and element 539 is a portion of Housing Plate 504. Only portions of the Plates are illustrated to focus on the control surfaces which interact with the Switches and to illustrate that the size of the Plates is not significant, so long as the space occupied by the Switches is not impinged upon as the composite coordinate function formed by the Housing and Platform is executed by raising and lowering the Housing.

Figure 260:
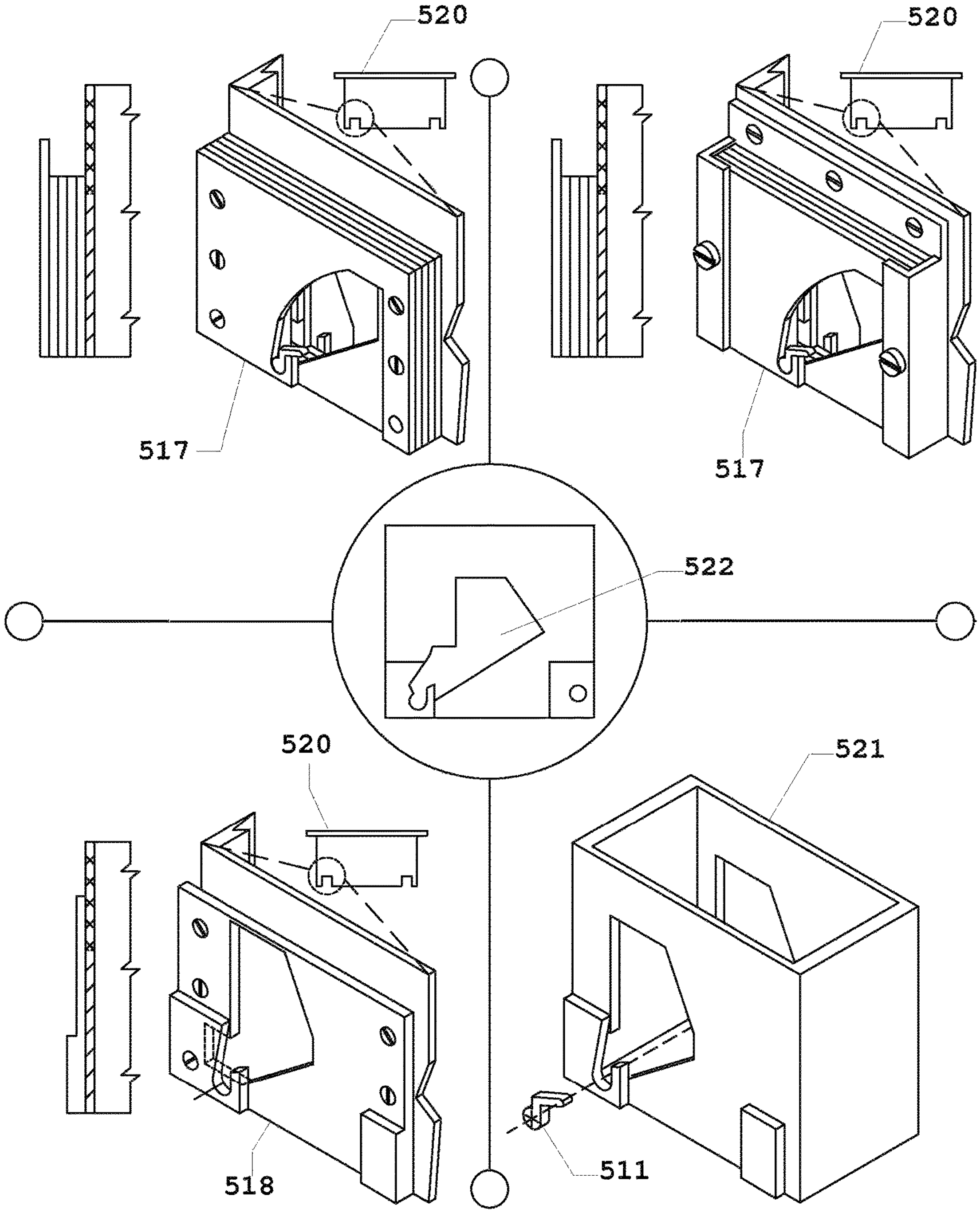

FIG. 260 illustrates the Housing 517 or Housing 518 of the Fifth Embodiment 500 embedded in a larger solid body, element 520. Element 521 illustrates a solid body with an opening consistent with Housing 514. Element 522 illustrates an elevation view of Housing 514 and Housing Plate 501.

Figure 261:
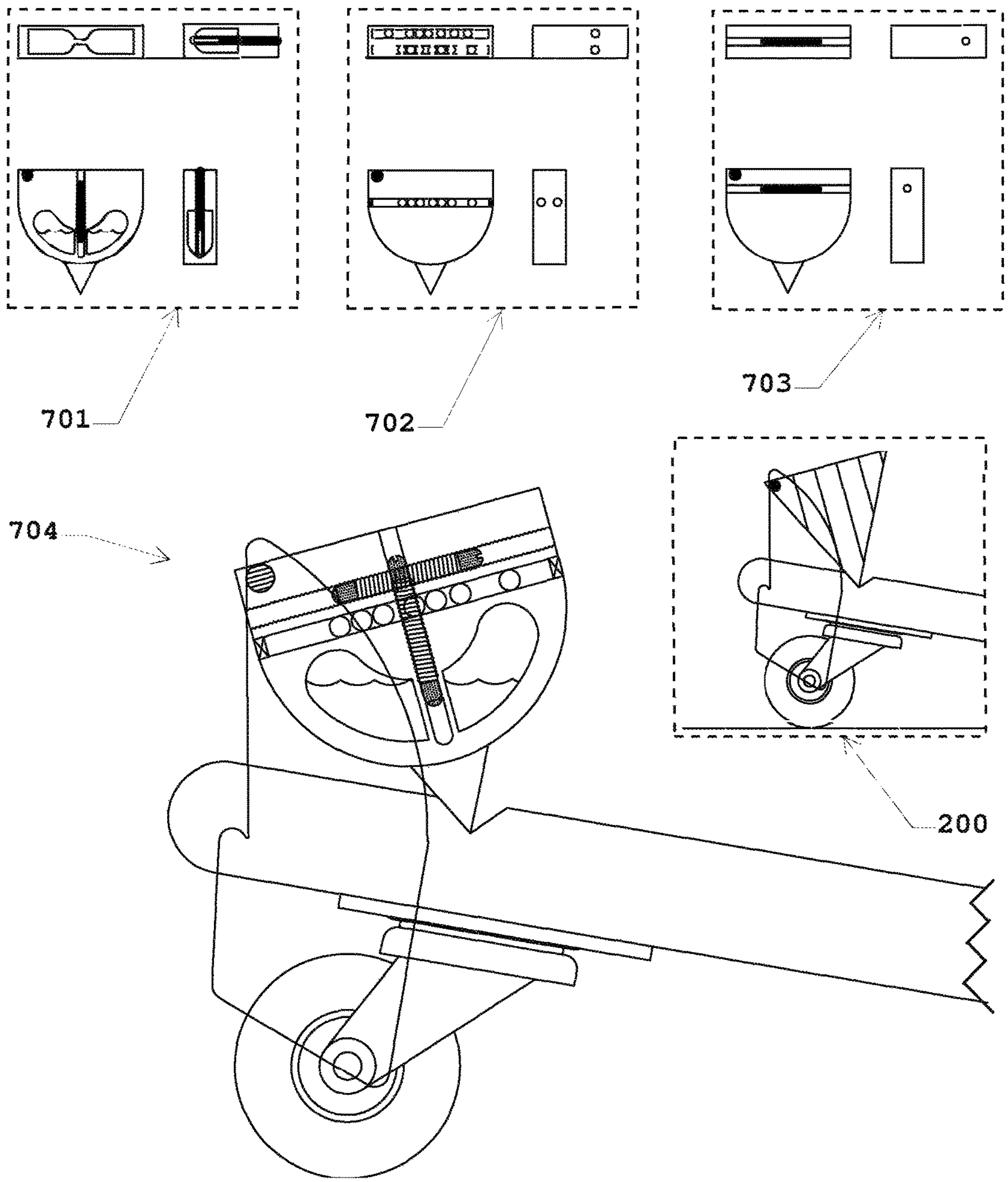
FIG. 261 illustrates variations on a Switch, generally a Switch similar to the one illustrated in Embodiment Two.

FIG. 261 illustrates variations on the Switch, generally a Switch similar to the one illustrated in Embodiment Two (FIGS. 134 to 166). These variations show mechanisms to dampen or delay the events (and state transitions), such as, for example, a viscous fluid which can flow from one side of the Switch to the other through an adjustable needle valve, 701, ball bearings able to translate back and forth within a tube, 702, or a horizontal screw which can be adjusted to change the center of gravity of the switch, 703. These variations are shown together, 704, in an embodiment of a Switch similar to the Switch illustrated in the Second Embodiment 200.

The finite state machines described herein may be summarized as follows: Each comprises two bodies and a switch. The two bodies may move separately with at least one degree of freedom and a defined range of motion therein. The bodies may be connected at an axle and/or the bodies may interlock, with an allowed range of motion prior to the interlock. One or both of the bodies may contact an external surface.

At least one, if not two, of the bodies may form a composite coordinate function in conjunction with the geometry of the switch. The composite coordinate function may comprise coordinate functions obtained from each separate body and/or from components within one body (such as from plates which together comprise one body). The coordinate functions illustrated in this paper are generally linear equations (straight lines with a slope), but may be non-linear. The composite coordinate function transmits a force at a force vector to the switch, which force vector counteracts the force vector experienced by the switch in the gravitational field or acceleration force. The composite coordinate function changes as one of the bodies moves relative to the other.

The switch has a geometric structure, a density distribution, and is subject to gravity (or another acceleration force). Because the geometric structure and density distribution of the switch are known, because the composite coordination function is known based on the then-current relative position of the two bodies, and if, when relevant, the preceding state of the finite state machine is known (the state of certain finite state machines depends on the prior state of the finite state machine), the position of the switch relative to the composite coordinate function is also known. The position of the switch relative to the two bodies determines the state of the finite state machine.

The finite state machine may have at least two states: A first state wherein a first body contacts and/or is supported by an exterior surface, without being supported by the switch; and a second state wherein the first body is supported by the switch, which switch is supported by the second body, which second body is supported by an accessory and/or by an exterior surface. The first state transitions to the second state when the first body is raised, the variable surface formed by the first and/or second body either i) provides a force and force vector which counteract the force and force vector experienced by the switch in the gravitational field and moves the switch past a point of no return and transitions the switch from a first energy well over an energy barrier into a second energy well (Embodiment 4), or ii) releases a force and force vector which were counteracting the force and force vector experienced by the switch in the gravitational field and allows the switch to fall into the second energy well (Embodiments 1 through 3) whereupon the first body may be lowered into the second state, wherein the first body is supported by the switch and the second body. The second state does not change if the state machine is released. The second state may transition to the first state when the first body is raised past the point of no return where the composite coordinate function formed by the first and/or second body contacts the switch and provides a force and force vector which moves the switch past a point of no return and transitions the switch from the second energy well over the energy barrier, and into i) the side of the first energy well (Embodiments 1 through 3), or ii) entirely into the first energy well (Embodiment 4), whereupon the first body may be lowered to the ground, and, in the case of Embodiments 1 through 3, the composite coordinate function contacts the switch and provides a force and force vector which moves the switch past a point of no return and transitions the switch from the first energy well over the energy barrier, and into a position intermediate between the second energy well and the energy barrier.

Third and fourth transitional states may result, but require that one of the bodies be supported by an external force.

The finite state machines in Embodiments 1 through 3 exhibit the following state/transitions:

TABLE NINE

| state # --> (transitioning to) state #, showing all states | state # --> state #, eliminating intermediate states |
|---|---|
| 1 --> 2 | 1 --> 2 |
| 1 --> 3 or 4 (limit), then 3 or 4 --> (through, but not stopping in, 2) 1 | 1 --> 1 |
| 2 --> 3 or 4, then 3 or 4 --> 1 | 2 --> 1 |
| 2--> 1 | 2 --> 1 |

The finite state machine in Embodiment 4 exhibit the following state/transitions:

TABLE TEN

| state # --> (transitioning to) state #, showing all states | state # --> state #, eliminating intermediate states |
|---|---|
| 1 --> 2 | 1 --> 2 |
| 1 --> 3 or 4 (limit), then 3--> 2; | 1 --> 2 |
| 2 --> 3 or 4, then 3 or 4 --> 1 | 2 --> 1 |
| 2 --> 1 | 2 --> 1 |

A larger object may comprise more than one finite state machine. For example, and without limitation, a table may comprise a finite state machine on each corner of the table; the Housing-component of the table may be lifted vertically, without a rotational component, triggering events for each of the finite state machines on each corner. If the finite state machines in this example are identical, then the events would occur at essentially the same time. For example, and without limitation, a table may comprise a finite state machine on each corner of the table; the Housing-component of the table may be rotated along an axis at the base of one side of the table, in which case the finite state machines at the opposite side of the table (assuming they are all identical) would experience events at essentially the same time. A single object may comprise multiple different finite state machines, such as, for example, four different state machines being attached to the four corners of a table. In this way, different states, events, and state sequences may occur at each of the four corners, depending on how the table is raised.

The first or second objects—or a larger object to which the first and/or second objects may be attached—may have any shape which is consistent with the allowed range of motion of the first and second objects and which does not imping upon the area occupied by the switch due to the composite coordinate function.

The control surfaces of the first and second objects, discussed herein in terms of the composite coordinate function, have a frame of reference which is an axis through the center of gravity of the Switch, which axis is in a plane perpendicular to the gravitational field of the machine. The Housing has two frames of reference: i) an attachment, if any, to a larger solid body to which the Housing may be attached (such as a table) and/or to an external surface upon which the Housing may come to rest; and ii) an axis through the center of gravity of the Switch, which axis is in a plane perpendicular to the gravitational field of the machine. The Platform has three frames of reference: i) the Housing, as determined by the kinematic pair relationship between the Housing and the Platform; ii) the axis through the center of gravity of the Switch, which axis is in a plane perpendicular to the gravitational field of the machine; and iii) an attachment, if any, to an accessory to which the Platform may be attached (such as a wheel) and/or to an external surface upon which the Platform may rest. The Housing and Platform have at least one shared frame of reference in the axis through the center of gravity of the Switch.

The state machines disclosed herein may be programmable by a user. For example, if the state machine is composed of joined plates, the user may remove one or more plates and replace the removed plates with other plates which may, for example, allow the state machine to bear a heavier load, or which scale the size of the state machine in one or more dimensions. Additional or different plates may be utilized to increase or decrease the number of states which are available to the machine.

At least one of the bodies may be connected or attached to an accessory, such as, for example, a wheel, a foot, a scale, a sensor.

The states available to the machine may be understood of as information states, wherein the information in the machine is processed based on the then-current state and the then-current event, with the output of processing the information states being a next state of the kinematic machine.

In the Embodiments illustrated herein, a first rigid body is an active component with a 3-dimensional load bearing surface with a minimum length and which physically embodies a coordinate function or a set of coordinate functions. A second rigid body is a passive component with a 3-dimensional load bearing surface with a minimum length and which physically embodies a coordinate function or a set of coordinate functions. The active and passive components have an allowed (limited) range of motion relative to one another. The coordinate functions of the active and passive components—together, a composite coordinate function—intersect with the surface of a switch as the first body is moved relative to the second body within the allowed range of motion. The active and passive components share a frame of reference in an axis which passes through the horizontal center of gravity of the switch and a plane which is perpendicular to a gravitational field in which the components are present. The composite coordinate function translates and/or rotates the switch through a volume occupied by the switch. In certain positions or orientations, the engaged positions, the switch engages with both bodies to transfer a force from the first body to the second, which force is greater than the weight of the switch by itself. In other positions or orientations, the disengaged positions, the switch experiences reactive forces from the composite coordinate function, which reactive forces are no greater than those produced by the weight of the switch (the mass multiplied by the acceleration of the switch, with acceleration driven by movement of the active component or caused by the gravitational field). The engaged and disengaged states of the switch define at least a subset of the states available to the machine. The states are generally separated by energy barriers defined by the gravitational field in which the machine exists, the composite coordinate function, and the switch geometry and center of gravity. The states, the composite coordinate function, the switch geometry and center of gravity, and the allowed range of motion between the first and second bodies define the volume which the switch occupies and the shapes of load bearing surfaces of the first and second bodies.

The raising limit of a finite state machine may be defined by the axle and/or the allowed range of motion of the interlocking bodies. For example, to provide the raising limit, a first body may comprise a cable, "U" shaped bracket or similar which projects through an opening in the second body or around a surface of the second body, which cable or similar comprises a nut or similar physical object which cannot pass through the opening or around the surface of the second body and which thereby interlocks with the second body at the raising limit (beyond which there is no change in state for the state machine).

The invention claimed is:

1. A kinematic state machine comprising:

a first rigid body with a first surface, wherein the first surface defines a first coordinate function;

a second rigid body with a second surface, wherein the second surface defines a second coordinate function;

a switch with a switch geometry; wherein the first and second rigid bodies have an allowed range of motion relative to one another and, together, form a composite surface, wherein at least a portion of the composite surface contacts the switch geometry and wherein the composite surface and the switch geometry define a composite coordinate function, wherein the composite coordinate function varies with the relative position of the first and second rigid bodies;

the kinematic state machine may be in a plurality of states comprising a first state and a second state, wherein a plurality of events cause the composite coordinate function to transmit a plurality of forces at a plurality of force vectors to the switch, thereby moving the switch between a plurality of potential energy wells and causing the kinematic state machine to transition between the plurality of states;

when the kinematic state machine is in the first state in the plurality of states, movement of the first and second rigid bodies relative to one another through a first state transition causes a first event in the plurality of events, wherein the first event transitions the kinematic state machine from the first state to the second state in the plurality of states;

when the kinematic state machine is in the second state in the plurality of states, movement of the first and second rigid bodies relative to one another through a second state transition causes a second event in the plurality of events, wherein the second event transitions the kinematic state machine from the second state to the first state in the plurality of states, wherein in the first event the composite coordinate function transmits a first force in the plurality of forces at a first force vector in the plurality of force vectors to the switch and transitions the switch from a first potential energy well in the plurality of potential energy wells over a potential energy barrier into a second potential energy well in the plurality of energy wells and in the second event the composite coordinate function transmits a second force in the plurality of forces at a second force vector in the plurality of force vectors to the switch and over the potential energy barrier.

2. The kinematic state machine of claim 1 wherein the first state comprises when the switch is in the first potential energy well and does not transmit a load greater than a force produced by a weight of the switch, through the switch, to the second rigid body and the second state comprises when the switch is in the second potential energy well and transmits the load greater than the force produced by the weight of the switch from the first rigid body, through the switch, to the second rigid body.

3. The kinematic state machine of claim 2 wherein the first state further comprises when the first rigid body and the second rigid body rest upon an external surface.

4. The kinematic state machine of claim 2 wherein the second state further comprises the first rigid body resting upon the switch and, via the switch, upon the second rigid body.

5. The kinematic state machine of claim 1 further comprising a third state in the plurality of states, wherein when the kinematic state machine is in the third state, the switch transmits a third force in the plurality of forces from the first rigid body, through the switch, to the second rigid body, wherein the third force lifts the second rigid body.

6. The kinematic state machine of claim 1 wherein the range of motion allows the second rigid body to be lifted vertically, relative to the first rigid body.

7. The kinematic state machine of claim 1 wherein the switch is rotated during the first event.

8. The kinematic state machine of claim 1 wherein the switch is subject only to i) gravity, ii) the plurality of forces, or iii) a load from the first rigid body, wherein the load is transferred from the first surface to the second surface by the switch.

9. A kinematic state machine comprising:

a first rigid body with a first surface, where the first surface defines a first coordinate function;

a second rigid body with a second surface, wherein the second surface defines a second coordinate function;

a switch with a switch geometry; wherein the first and second rigid bodies have an allowed range of motion relative to one another and, together, form a composite surface, wherein at least a portion of the composite surface contacts the switch geometry and wherein the composite surface and the switch geometry define a composite coordinate function, wherein the composite coordinate function varies with the relative position of the first and second rigid bodies within the allowed range of motion;

wherein the kinematic state machine may be in a plurality of states comprising a first state, a second state and a third state, wherein a plurality of events cause the composite coordinate function to transmit a plurality of forces at a plurality of force vectors to the switch, thereby moving the switch between a plurality of potential energy wells and causing the kinematic state machine to transition between the plurality of states; wherein when the kinematic state machine is in the first state in the plurality of states, movement within the allowed range of motion of the first and second rigid bodies relative to one another through a first state transition causes a first event in the plurality of events, wherein the first event transitions the kinematic state machine from the first state to the second state in the plurality of states;

when the kinematic state machine is in the second state in the plurality of states, movement within the allowed range of motion of the first and second rigid bodies relative to one another through a second state transition causes a second event in the plurality of events, wherein the second event transitions the kinematic state machine from the second state to the third state in the plurality of states; and when the kinematic state machine is in the third state in the plurality of states, movement within the allowed range of motion of the first and second rigid bodies relative to one another through a third state transition causes a third event in the plurality of events, wherein the third event transitions the kinematic state machine from the third state to the first state in the plurality of states: wherein in the first event the composite coordinate function transmits a first force in the plurality of forces at a first force vector in the plurality of force vectors to the switch geometry and transitions the switch from a position intermediate between a first potential energy well in the plurality of potential energy wells and a potential energy barrier over the potential energy barrier into a second potential energy well in the plurality of potential energy wells, in the second event the composite coordinate function transmits a second force in the plurality of forces at a second force vector in the plurality of force vectors to the switch geometry and transitions the switch from the second potential energy well into the first potential energy well over the potential energy barrier; and in the third event the composite coordinate function transmits a third force in the plurality of forces at a third force vector in the plurality of force vectors to the switch geometry and transitions the switch out of the first potential energy well into the position intermediate between the first potential energy well and the potential energy barrier.

10. The kinematic state machine of claim 9 wherein the first state comprises when the switch is intermediate between the first potential energy well and the potential energy barrier and does not transmit a load greater than a force produced by a weight of the switch, through the switch, to the second rigid body; the second state comprises when the switch is in the second potential energy well; and the third state comprises when the switch is in the first potential energy well and transmits the load greater than the force produced by the weight of the switch from the first rigid body, through the switch, to the second rigid body.

11. The kinematic state machine of claim 10 wherein the first state further comprises the first rigid body and the second rigid body resting upon an external surface.

12. The kinematic state machine of claim 10 wherein the third state further comprises the first rigid body resting upon the switch and, via the switch, upon the second rigid body.

13. The kinematic state machine of claim 9 further comprising a fourth state in the plurality of states, wherein when the kinematic state machine is in the fourth state, the switch transmits a fourth force in the plurality of forces from the first rigid body, through the switch, to the second rigid body, wherein the fourth force lifts the second rigid body.

14. The kinematic state machine of claim 9 wherein the switch has a round vertical cross-section.

15. The kinematic state machine of claim 14 wherein the potential energy barrier is provided by a vertical apex in the composite surface, wherein the switch must surmount the vertical apex during the first event.

16. The kinematic state machine of claim 15 wherein vertical translation of the first rigid body produces a fifth force in the plurality of forces at a horizontal force vector in the plurality of force vectors on the switch, wherein the fifth force and horizontal force vector is converted to vertical translation of the switch by the vertical apex.

17. The kinematic state machine of claim 9 wherein the switch has a non-round vertical cross-section or a non-uniform density.

18. The kinematic state machine of claim 17 wherein the potential energy barrier is provided by the third event, wherein the third event rotates the switch and raises a potential energy of the switch.

19. The kinematic state machine of claim 18 wherein the third event obtains energy for the third event to occur from vertical translation of the first rigid body while the second rigid body remains stationary.

20. The kinematic state machine of claim 18 wherein the third event obtains energy for the third event to occur from vertical translation of the first rigid body while the second rigid body rotates about an axle.

21. The kinematic state machine of claim 18 wherein the switch rotates about a contact between the switch and the second rigid body, energy for the third event comes from vertical translation of the first rigid body, and rotation of the switch is produced by the third force and third force vector acting on the switch and the switch being constrained by the contact between the switch and the second rigid body.

22. The kinematic state machine of claim 9 wherein the switch is subject only to i) gravity, ii) the plurality of forces, or iii) a load from the first rigid body, wherein the load is transferred from the first surface to the second surface by the switch.

23. The kinematic state machine of claim 9 wherein the second event allows the switch to lose potential energy and drop into the first potential energy well.

24. The kinematic state machine of claim 9 wherein the range of motion allows the second rigid body to be lifted vertically, relative to the first rigid body.

25. The kinematic state machine of claim 9 wherein the first rigid body and the second rigid body are attached at an axle.

26. The kinematic state machine of claim 25 wherein the range of motion allows the second rigid body to rotate about the axle.

27. The kinematic state machine of claim 9 wherein the first and second rigid bodies may have any shape i) consistent with the allowed range of motion and ii) which does not impinge on the area occupied by the switch.

28. The kinematic state machine of claim 9 wherein the kinematic state machine is embedded in a larger object.

* * * * *